US012464041B2

(12) United States Patent
Sachs et al.

(10) Patent No.: US 12,464,041 B2
(45) Date of Patent: Nov. 4, 2025

(54) INDUSTRIAL AUTOMATION WITH 5G AND BEYOND

(71) Applicant: Telefonaktiebolaget LM Ericsson (publ), Stockholm (SE)

(72) Inventors: Joachim Sachs, Sollentuna (SE); Abdulrahman Alabbasi, Kista (SE); Mattias Andersson, Sundbyberg (SE); Niklas Andgart, Södra Sandby (SE); Ola Angelsmark, Ystad (SE); José Araújo, Stockholm (SE); Muhammad Ikram Ashraf, Espoo (FI); Kumar Balachandran, Pleasanton, CA (US); Robert Baldemair, Solna (SE); Rodrigo Berg, Helsingborg (SE); Yufei Blankenship, Kildeer, IL (US); Fedor Chernogorov, Espoo (FI); John Walter Diachina, Garner, NC (US); Torsten Dudda, Aachen (DE); Henrik Enbuske, Stockholm (SE); Sorour Falahati, Stockholm (SE); János Farkas, Kecskemét (HU); Jonas Fröberg Olsson, Ljungsbro (SE); Majid Gerami, Lund (SE); Harald Gustafsson, Lund (SE); Kimmo Hiltunen, Esbo (FI); Andreas Höglund, Hägersten (SE);

(Continued)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 261 days.

(21) Appl. No.: 16/274,800

(22) Filed: Feb. 13, 2019

(65) Prior Publication Data

US 2020/0259896 A1 Aug. 13, 2020

(51) Int. Cl.
*H04L 29/08* (2006.01)
*G06F 15/16* (2006.01)
(Continued)

(52) U.S. Cl.
CPC .... *H04L 67/1046* (2013.01); *G06K 19/06028* (2013.01); *G06K 19/06037* (2013.01);
(Continued)

(58) Field of Classification Search
CPC ........... H04L 67/1046; G06K 19/0723; G06K 19/06037; G06K 19/06028; H04W 48/08;
(Continued)

(56) References Cited

U.S. PATENT DOCUMENTS 5,774,467 A * 6/1998 Herrera Van Der Nood ............... H04L 69/04 370/428
2007/0273502 A1* 11/2007 Raphael .................. G01S 19/23 342/357.62
(Continued)

FOREIGN PATENT DOCUMENTS

CN 102356588 A 2/2012
CN 103002513 A 3/2013
(Continued)

OTHER PUBLICATIONS

3GPP , "3rd Generation Partnership Project; Technical Specification Group Services and System Aspects; Service requirements for cyber-physical control applications in vertical domains; Stage 1 (Release 16)", 3GPP TS 22.104 V16.0.0, Dec. 2012, 1-55.
(Continued)

*Primary Examiner* — Emmanuel L Moise
*Assistant Examiner* — Berhanu Shitayewoldetadik
(74) *Attorney, Agent, or Firm* — Murphy, Bilak & Homiller, PLLC

(57) ABSTRACT

Techniques for enhancing performance in Industrial Internet-of-Things (IIoT) scenarios, including techniques for
(Continued)

time-sensitive networking (TSN) and 5G wireless network integration. An example method, performed by a wireless device, comprises receiving system information (SI) from a radio base station (RBS) of a radio access network (RAN), the SI being indicative of support for TSN through the RBS, and establishing at least one TSN stream with an external data network, through the RBS. The example method further includes receiving a first timing signal from the wireless communications network, via the RBS, receiving a second timing signal from the external TSN data network to which the wireless device is connected, comparing the first timing signal to the second timing signal to determine an offset, and transmitting the offset to the wireless communications network.

61 Claims, 152 Drawing Sheets

(72) Inventors: Torgny Holmberg, Lund (SE); Zsolt Kenesi, Budapest (HU); András Kern, Budapest (HU); Kittipong Kittichokechai, Järfälla (SE); Anna Larmo, Espoo (FI); Johan Lundsjö, Spånga (SE); György Miklós, Pilisborosjenö (HU); Hubertus Munz, Aachen (DE); Gabor Nemeth, Budapest (HU); Johannes Nygren, Uppsala (SE); Johan Olsson, Malmö (SE); Alexandros Palaios, Moers (DE); Dhruvin Patel, Aachen (DE); Joakim Persson, Lund (SE); Per Persson, Södra Sandby (EC); Jose Luis Pradas, Stockholm (SE); Sándor Rácz, Cegléd (HU); Pradeepa Ramachandra, Linköping (SE); Norbert Reider, Tényö (HU); Dinand Roeland, Sollentuna (SE); Stefano Ruffini, Rome (IT); Patrik Salmela, Espoo (FI); Sara Sandberg, Luleå (SE); Magnus Sandgren, Staffanstrop (SE); Paul Schliwa-Bertling, Ljungsbro (SE); Alexey Shapin, Luleå (SE); Nianshan Shi, Järfälla (SE); Bikramjit Singh, Espoo (FI); Per Skarin, Lund (SE); Bernard Smeets, Dalby (SE); Ying Sun, Sundbyberg (SE); Dennis Sundman, Sollentuna (SE); Fredrik Svensson, Malmö (SE); Malgorzata Svensson, Nättraby (SE); Geza Szabo, Kecskemet (HU); Wolfgang Tonutti, Aachen (DE); Balázs Varga, Budapest (HU); Mårten Wahlström, Hägersten (SE); Kun Wang, Solna (SE); Yi-Pin Eric Wang, Fremont, CA (US); Osman Nuri Can Yilmaz, Espoo (FI); Zhenhua Zou, Solna (SE); Miguel Lopez, Solna (SE)

(51) Int. Cl.

| | |
|---|---|
| ***G06K 19/06*** | (2006.01) |
| ***G06K 19/07*** | (2006.01) |
| ***G07C 9/00*** | (2020.01) |
| ***H04L 1/18*** | (2023.01) |
| ***H04L 12/861*** | (2013.01) |
| ***H04L 15/16*** | (2006.01) |
| ***H04L 67/104*** | (2022.01) |
| ***H04W 4/50*** | (2018.01) |
| ***H04W 12/04*** | (2021.01) |
| ***H04W 48/08*** | (2009.01) |
| ***H04W 56/00*** | (2009.01) |
| ***H04W 72/12*** | (2023.01) |
| *H04W 84/18* | (2009.01) |
| *H04W 92/18* | (2009.01) |

(52) U.S. Cl.
CPC ..... *G06K 19/0723* (2013.01); *G07C 9/00174* (2013.01); *H04W 4/50* (2018.02); *H04W 12/04* (2013.01); *H04W 48/08* (2013.01); *H04W 56/001* (2013.01); *H04W 56/0065* (2013.01); *H04W 84/18* (2013.01); *H04W 92/18* (2013.01)

(58) Field of Classification Search
CPC ..... H04W 12/04; H04W 4/50; H04W 56/001; H04W 56/0065; H04W 92/18; H04W 84/18; G07C 9/00174
USPC .......... 709/222
See application file for complete search history.

(56) References Cited

U.S. PATENT DOCUMENTS

| | | | | |
|---|---|---|---|---|
| 2009/0016321 | A1* | 1/2009 | Li | H04W 56/002 370/350 |
| 2010/0323627 | A1 | 12/2010 | Alanara | |
| 2011/0158116 | A1* | 6/2011 | Tenny | H04W 56/0045 370/336 |
| 2012/0140743 | A1 | 6/2012 | Pelletier et al. | |
| 2012/0188907 | A1* | 7/2012 | Dayal | H04W 72/1215 370/254 |
| 2013/0170479 | A1 | 7/2013 | Fong et al. | |
| 2013/0301541 | A1 | 11/2013 | Mukherjee et al. | |
| 2014/0056192 | A1* | 2/2014 | Meylan | H04W 48/16 370/311 |
| 2016/0066242 | A1 | 3/2016 | Su et al. | |
| 2016/0295426 | A1* | 10/2016 | Gormley | H04W 24/02 |
| 2017/0111932 | A1 | 4/2017 | Uemura | |
| 2018/0084513 | A1* | 3/2018 | Sheashua | H04W 56/00 |
| 2018/0132234 | A1* | 5/2018 | Cavalcanti | H04W 72/02 |
| 2018/0309655 | A1* | 10/2018 | Joseph | H04L 43/50 |
| 2019/0044894 | A1* | 2/2019 | Bonomi | H04L 47/28 |
| 2019/0190635 | A1* | 6/2019 | Goel | H04W 56/001 |
| 2019/0254057 | A1* | 8/2019 | Hampel | H04J 3/0635 |
| 2019/0335379 | A1 | 10/2019 | Joseph et al. | |
| 2020/0015241 | A1* | 1/2020 | Marinier | H04W 72/02 |
| 2020/0059829 | A1* | 2/2020 | Joseph | H04W 36/0011 |
| 2020/0068629 | A1* | 2/2020 | May | H04W 4/50 |
| 2020/0084663 | A1* | 3/2020 | Park | H04W 8/08 |
| 2020/0084702 | A1* | 3/2020 | Li | H04W 28/10 |
| 2020/0092154 | A1* | 3/2020 | Kwon | H04B 7/022 |
| 2020/0120536 | A1* | 4/2020 | Prakash | H04W 72/12 |
| 2020/0229055 | A1* | 7/2020 | Chien | H04W 76/22 |

FOREIGN PATENT DOCUMENTS

| | | | | |
|---|---|---|---|---|
| CN | 104811997 | A | 7/2015 | |
| CN | 111614573 | A | 9/2020 | |
| CN | 111935034 | A | 11/2020 | |
| CO | 7481356 | A2 | 12/2015 | |
| CO | 20180000079 | A2 | 1/2018 | |
| EP | 2165573 | B1 | 12/2017 | |
| KR | 20170139665 | A | 12/2017 | |
| TW | 201830925 | A | 8/2018 | |
| WO | 2013106060 | A2 | 7/2013 | |
| WO | 2014130366 | A1 | 8/2014 | |
| WO | 2017007638 | A1 | 1/2017 | |
| WO | WO-2017000131 | A1 * | 1/2017 | H04W 72/569 |
| WO | 2017171907 | A1 | 10/2017 | |

(56) References Cited

FOREIGN PATENT DOCUMENTS

| | | | | |
|---|---|---|---|---|
| WO | 2018189726 A1 | | 10/2018 | |
| WO | WO-2020005208 A1 | * | 1/2020 | ........ H04W 28/0263 |
| WO | WO-2020057766 A1 | * | 3/2020 | .......... H04W 72/543 |
| WO | WO-2020081060 A1 | * | 4/2020 | ............. H04L 69/28 |
| WO | WO-2020081388 A1 | * | 4/2020 | ............ H04W 28/24 |
| WO | WO-2020151806 A1 | * | 7/2020 | ........ H04W 56/0015 |

OTHER PUBLICATIONS

3GPP , "3rd Generation Partnership Project; Technical Specification Group Services and System Aspects; System Architecture for the 5G System; Stage 2 (Release 15)", 3GPP TS 23.501 V15.2.0, Jun. 2018, 1-217.
Belliardi , et al., "Use Cases IEC/IEEE 60802", V 1.3, Sep. 13, 2018, 1-74.
Farkas , et al., "Time-Sensitive Networking Standards", IEEE Communications Standards Magazine, Jun. 2018, 20-21.
Finn, Norman , "Introduction to Time-Sensitive Networking", IEEE Communications Standards Magazine, Jun. 2018, 22-28.
Gardiner, Eric , et al., "Theory of Operation for TSN-enabled Systems Applied to Industrial Markets", Avnu Alliance Best Practices, Feb. 28, 2017, 1-71.
GSMA , "An Introduction to Network Slicing", Nov. 2017, 1-20.
IEEE , "Bridges and Bridged Networks", IEEE P802.1Qcc/D2.3, May 3, 2018, 1-214.
Kehoe , et al., "A Survey of Research on Cloud Robotics and Automation", IEEE Transaction on Automation Science and Engineering, Nov. 2014, 1-11.
Messenger, John L., et al., "Time-Sensitive Networking: An Introduction", IEEE Communications Standards Magazine, Jun. 2018, 29-33.
Nasrallah , et al., "Ultra-Low Latency (ULL) Networks: The IEEE TSN and IETF DetNet Standards and Related 5G ULL Research", IEEE Communications Surveys & Tutorials, Sep. 2018, 1-59.
Pop, Paul , et al., "Enabling Fog Computing for Industrial Automation Through Time-Sensitive Networking (TSN)", IEEE Communication Standards Magazine, Jun. 201, 55-61.
Samii , et al., "Level 5 by Layer 2: Time-Sensitive Networkind for Autonomous Vehicles", IEEE Communications Standards Magazine, Jun. 2018, 62-68.
Simon, Csaba , et al., "Design Aspects of Low-Latency Services with Time-Sensitive Networking", IEEE Communications Standard Magazine, Jun. 2018, 48-54.
Stanton, Kevin B., et al., "Distributing Deterministic, Accurate Time and Tightly Coordinated Network and Software Applications: IEEE 802.1AS, the TSN Profile of PTP", IEEE Communications Standards Magazine, Jun. 2018, 34-40.
Steiner , et al., "Traffic Planning for Time-Sensitive Communication", IEEE Communication Standards Magazine, Jun. 2018, 42-47.
Szabó , et al., "QoC-aware Remote Control of a Hexapod Platform", SIGCOMM '18, Budapest, Hungary, Aug. 2018, 1-2.
3GPP, "3rd Generation Partnership Project; Technical Specification Group Services and System Aspects; Study on 5GS Enhanced support of Vertical and LAN Services (Release 16)", 3GPP TR 23.734 V0.2.0, Sep. 2018, pp. 1-39.
3GPP, "3rd Generation Partnership Project; Technical Specification Group Services and System Aspects; Study on Enhancement of 5GS for Vertical and LAN Services (Release 16)", 3GPP TR 23.734 Draft V16.0.0+, Feb. 2019, pp. 1-110.
Unknown, Author, "Enhancement for Time-Sensitive Networking", 3GPP TSG-RAN WG2 Meeting #103bis, R2-1815270, Chengdu, China, Oct. 8-12, 2018, pp. 1-10.
Unknown, Author, "Timing and Synchronization for Time-Sensitive Applications", LAN/MAN Standards Committee of the IEEE Computer Society, IEEE P802.1AS-Rev/D7.5, Dec. 18, 2018, pp. 1-300.
Unknown, Author, "TSN-QoS", SA WG2 Meeting #130, S2-1900559, Kochi, India, Jan. 21-25, 2019, pp. 1-4.
3GPP, "3rd Generation Partnership Project; Technical Specification Group Services and System Aspects; Study on enhancement of 5GS for Vertical and LAN Services (Release 16)", TR 23.734 V16.0.0 (Dec. 2018), Dec. 2018, 1-107.
Unknown, Author, "Ethernet Header Compression for TSN", 3GPP TSG-RAN WG2 Meeting #104, R2-1817269, Spokane, USA, Nov. 12-16, 2018, 1-4.
Unknown, Author, "Timing and Synchronization for Time-Sensitive Applications", IEEE P802.1AS-Rev/D7.5, Dec. 18, 2018, 1-444.
3GPP , "3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 15)", 3GPP TS 36.305 V15.1.0, Sep. 2018, 1-87.
3GPP , "3rd Generation Partnership Project; Technical Specification Group Services and System Aspects; Study on Communication for Automation in Vertical Domains (Release 16)", 3GPP TR 22.804 V16.2.0, Dec. 2018, 1-198.
3GPP , "3rd Generation Partnership Project; Technical Specification Group Services and System Aspects; Study on the security aspects of the next generation system (Release 14)", 3GPP TR 33.899 V1.3.0, Aug. 2017, 1-605.
3GPP , "3rd Generation Partnership Project; Technical Specification Group Services and System Aspects; System Architecture for the 5G System; Stage 2 (Release 15) 3GPP TS 23.501 V15.4.0", 3GPP TS 23.501 V15.4.0, Dec. 2018, 1-236.
Unknown, Author , "Analysis of Time Synchronization Accuracy over Uu Interface", 3GPP TSG RAN WG1 Ad-Hoc Meeting 1901 Tdoc R1-1901353, Taipei, Taiwan, Jan. 21-25, 2019, 1-6.
Unknown, Author , "TSN Time Synchronization", 3GPP TSG-RAN WG3 Meeting #102 R3-186705, Spokane, USA, Nov. 12-16, 2018, 1-6.

* cited by examiner

CSIF – Communication Service Interface between distributed automation application/function and 5G system Packet replication and elimination.

Packet replication and elimination.

| Frame size (w/o FCS) | Gain with compression of header to 3 bytes (%) (src, dst, VID, E-type) |
|---|---|
| 64 | 23.44 |
| 128 | 11.72 |
| 256 | 5.86 |
| 512 | 2.93 |
| 1024 | 1.46 |
| 1518 | 0.99 |

| Frame size (w/o FCS) | Gain with compression of header to 5 bytes (%) (src, dst, VID, E-type) |
|---|---|
| 64 | 20.31 |
| 128 | 10.16 |
| 256 | 5.08 |
| 512 | 2.54 |
| 1024 | 1.27 |
| 1518 | 0.86 |

| | | | | | | | |
|---|---|---|---|---|---|---|---|
| 56 Bits | 8 Bits | 6 Byte | 6 Byte | 2 byte | 2 byte | 36..1490 bytes | 4 byte |
| Preamble | SYNCH | Dest Addr | Src Addr | Ether type | Frame ID | RT.-User data | FCS |

UPF: User Plane Function
NRF: Network Repository Function
AMF: Access Management Function
SMF: Session Management Function
NEF: Network Exposure Function
PCF: Policy Control Function
UDM: Unified Data Management c)

* BS calculates additional clock signal based on offset provided by UE

** As both clocks are not in synch they might drift away from each other; periodic resync/offset re-calculation is required

PTP Message Header Format

| Bits | | | | | | | | Octets | Offset |
|---|---|---|---|---|---|---|---|---|---|
| 7 | 6 | 5 | 4 | 3 | 2 | 1 | 0 | | |
| transportSpecific | | | | messageType | | | | 1 | 0 |
| Reserved | | | | versionPTP | | | | 1 | 1 |
| messageLength | | | | | | | | 2 | 2 |
| domainNumber | | | | | | | | 1 | 4 |
| Reserved | | | | | | | | 1 | 5 |
| Flags | | | | | | | | 2 | 6 |
| correctionField | | | | | | | | 8 | 8 |
| Reserved | | | | | | | | 4 | 16 |
| sourcePortIdentity | | | | | | | | 10 | 20 |
| sequenceID | | | | | | | | 2 | 30 |
| controlField | | | | | | | | 1 | 32 |
| logMessageInterval | | | | | | | | 1 | 33 |

*Fig. 214*

INDUSTRIAL AUTOMATION WITH 5G AND BEYOND

TECHNICAL FIELD

The present disclosure is related to wireless communications networks and describes network architecture, wireless devices, and wireless network nodes suitable for industrial applications, using a fifth-generation (5G) or other wireless communications network.

BACKGROUND

The fifth generation of mobile technology (5G) will be able to provide wider range of services than the existing 3G/4G technologies. Three main use cases of 5G are: Enhanced Mobile Broadband (eMBB), Massive Machine Type of Communication (mMTC) and Ultra Reliable Low Latency Communication (URLLC). A key objective of the 5G system is to be able to support the stringent system requirements from vertical markets. Those requirements include simultaneously supporting multiple combinations of reliability, latency, throughput, positioning, and availability, as well as, local deployments with local survivability, local data/routing, local managements, security, data integrity and privacy.

An industrial network perspective of 5G system is illustrated in FIG. 1. The service performance requirements are coming from the automation applications. 5G system is providing the communication service to the automation applications. In order to support automation in vertical domains, 5G systems need to be reliable and flexible to meet service performance requirements to serve specific applications and use cases. They need to come with the system properties of reliability, availability, maintainability, safety, and integrity.

Specifications for 5G are under development by members of the $3^{rd}$-Generation Partnership Project (3GPP). The document "Service Requirements for Cyber-Physical Control Applications in Vertical Domains, Stage 1," 3GPP TS 22.104, v. 16.0.0 (January 2019), specifies the requirements that provide various sets of performance criteria that need to be met to satisfactorily support different use cases of cyber-physical control applications used by various vertical markets.

In the industrial applications space, requirements include support for mixed services in factory and manufacturing environments, including support for different service levels, such as massive Machine-Type Communications (mMTC), enhanced Mobile Broadband (eMBB), and ultra-reliable low-latency communications (URLLC) traffic in the same deployment. Support for industrial deterministic service is needed. Integration between the 5G System (5 GS) and existing industrial networks is also required. Interoperability, including support for non-public networks and interoperability with the public land mobile network (PLMN) is required.

With respect to system availability and reliability, the 5G system as a communication service provider shall comply with the 3GPP definition of availability and reliability. Communication service availability is defined as the percentage value of the amount of time the end-to-end communication service is delivered according to an agreed quality of service (QoS), divided by the amount of time the system is expected to deliver the end-to-end service according to the specification in a specific area. Required availability is to be determined by business aspects considering the trade-off between monetary loss at times the system is not available vs. complexity to increase the availability, e.g. by increasing redundancy. It will be appreciated that availability beyond 99.95% usually requires an extra power source to prevent the public energy grid (99.9-99.99% availability in Europe) from becoming the weakest component.

Communication service reliability is defined as the ability of the communication service to perform as required for a given time interval, under given conditions. These conditions include aspects that affect reliability, such as: mode of operation, stress levels, and environmental conditions. Reliability may be quantified using appropriate measures such as mean time to failure, or the probability of no failure within a specified period of time.

The use of 5G in industrial applications must meet safety requirements, where safety is defined as the condition of being protected from or unlikely to cause danger, risk, or injury. Safe systems thus should be designed to be functionally safe from the start. Automatic protection functions can be built into the system to ensure safety for the system while in operation. Safety aspects to be considered in system design to ensure automatic protection should, for example, include human errors, hardware and software failures, and operational and environmental stress factors.

Many industries today are in full control of their local network deployments. Thus, local deployment aspect regarding local survivability, local data/routing and local management become requirements for industrial networks. In short, the factory network should run normally even when the connection to the outside world is lost. Furthermore, there may be requirements around data not leaving the premises as well as local IT staff being able to manage and change the network deployment on demand.

Security, data integrity and privacy are important requirements for the industries as well. Business critical information on processes and data from the manufacturing process should not be leaked.

SUMMARY

Described herein in detail are various techniques for enhancing performance in Industrial Internet-of-Things (IIoT) scenarios, including techniques for time-sensitive networking (TSN) and 5G wireless network integration. Corresponding devices and nodes are also described in detail.

An example method, performed by a wireless device comprises receiving system information (SI) from a radio base station (RBS) of a radio access network (RAN), the SI being indicative of support for TSN through the RBS, and establishing at least one TSN stream with an external data network, through the RBS. The example method further includes receiving a first timing signal from the wireless communications network, via the RBS, receiving a second timing signal from the external TSN data network to which the wireless device is connected, comparing the first timing signal to the second timing signal to determine an offset, and transmitting the offset to the wireless communications network.

Another example method is performed in one or more nodes of a core network associated with a radio access network (RAN) and is for handling a time-sensitive data stream associated with a user equipment (UE) and an external network. This example method comprises receiving, from the external network, a transmission schedule associated with a time-sensitive data stream and sending, to the RAN, a request to allocate radio resources for communication of the data stream between the RAN and a first UE, wherein the request further comprises information related to the transmission schedule. The method further comprises receiving, from the RAN, a response indicating whether radio resources can be allocated to meet the transmission schedule associated with the data stream. The method still further comprises obtaining configuration information for the data stream, the configuration information indicating respective values for one or more fields within a header of data packets associated with the data stream which are to remain static, initiating transmission of the configuration information to the first UE, receiving a data packet associated with the data stream from the external data network, removing the one or more fields from the data packet to generate a compressed data packet, and initiating transmission of the compressed data packet to the first UE.

Another example method is performed by a wireless device associated with a wireless communications network and is for transport of data packets associated with a data stream in an external data network. This example method comprises receiving SI from an RBS of a RAN, the SI being indicative of support for TSN through the RBS, and establishing at least one TSN stream with the external data network, through the RBS. This method further comprises obtaining configuration information for the TSN stream, the configuration information indicating respective values for one or more fields within a header of data packets associated with the TSN stream which are to remain static, receiving, from the RBS, a data packet associated with the TSN stream, and adding the one or more fields to the data packet to generate a decompressed data packet.

Another example method is performed by a wireless device configured for communication with a RAN and is for scheduling resources in the RAN according to a transmission schedule associated with an external network. This example method comprises receiving SI from an RBS of the RAN, the SI being indicative of support for TSN through the RBS, and establishing at least one TSN stream with the external data network, through the RBS. This example method further comprises receiving, from the external network, a transmission schedule associated with the TSN stream, sending, to a network associated with the RAN, a request to allocate radio resources for communication of the TSN stream between the wireless device and the RAN, wherein the request further comprises information related to the transmission schedule, and receiving, from the network, a response indicating whether radio resources can be allocated to meet the transmission schedule associated with the TSN stream Still another example method, performed by a wireless device, comprises receiving SI from an RBS of a RAN, the SI being indicative of support for TSN through the RBS, and establishing at least one TSN stream with an external data network, through the RBS. This method further comprises obtaining configuration information for the TSN stream, the configuration information indicating respective values for one or more fields within a header of data packets associated with the TSN stream which are to remain static. The method further comprises receiving, from the RBS, a data packet associated with the TSN stream, and adding the one or more fields to the data packet to generate a decompressed data packet.

Yet another example method is performed by a first device, and is for assisting enrollment of a second device to an Internet of Things (IoT) environment and using the second device. This example method comprises obtaining a representation of an enrollment function associated with the second device, wherein the enrollment function is associated with at least one serialized enrollment application comprising enrollment information associated with the first and second device, deserializing the enrollment application such that enrollment information associated with the first device is separated from enrollment information associated with the second device, and transmitting the enrollment information associated with the second device to the second device for initiating execution by the second device of the enrollment process of the second device by configuring the second device based on the enrollment information associated with the second device. This method further comprises receiving, from the second device, configuration information associated with the second device, and using a first runtime environment executing on the first device to transfer a code module to a second runtime environment executing on the second device, where the code module is configured to execute within the second runtime environment and expose a function of the second device, supported by the second runtime environment, to the first device. The method further comprises executing an application within the first runtime environment, the application remotely invoking the function of the second device via the transferred code module and the second runtime environment.

A corresponding method is carried out by a second device and is for executing an enrollment process to an IoT environment assisted by a first device and providing the first device with access to a function of the second device. This example method comprises receiving, from the first device, enrollment information associated with the second device, executing the enrollment process by configuring the second device based on the enrollment information, and transmitting configuration information associated with the second device to the first device. The method further comprises receiving a code module from a first runtime environment executing on the first device, to a second runtime environment executing on the second device, to expose a function of the second device supported by the second runtime environment to the first device, and using the second runtime environment to control performance of the function of the second device responsive to a remote invocation of the function received via the code module from an application executing within the first runtime environment.

These and other methods are described in detail below and illustrated in the attached figures. Corresponding devices, network nodes, and the like are also described in detail, as are the network arrangements and environments in which these techniques may be advantageously used.

BRIEF DESCRIPTION OF THE DRAWINGS

FIG. 120 is a block diagram of an exemplary communications system, according to various exemplary embodiments of the present disclosure.

Figure 121:
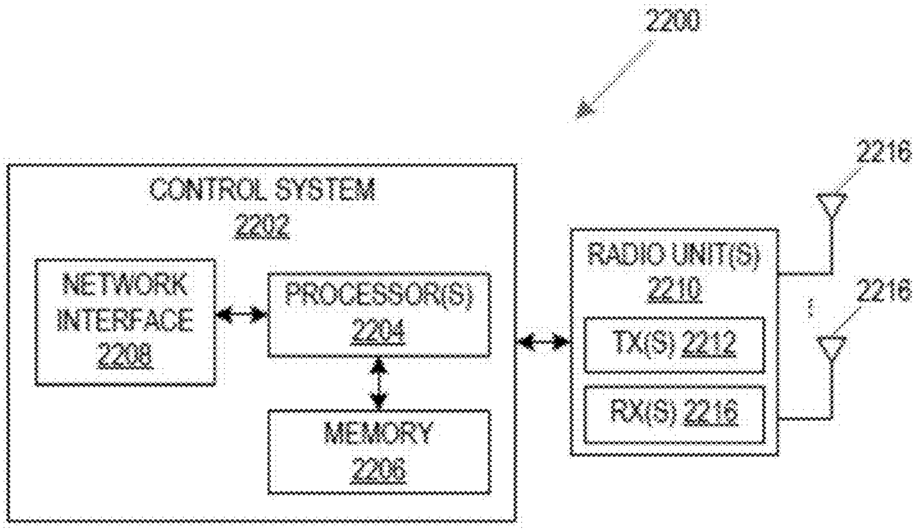
Figure 122:
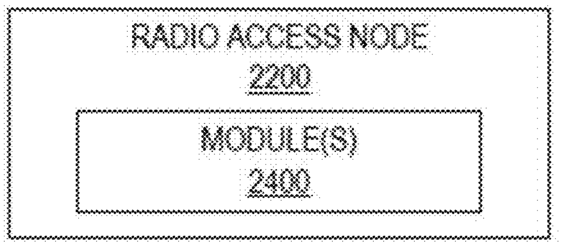
Figure 123:
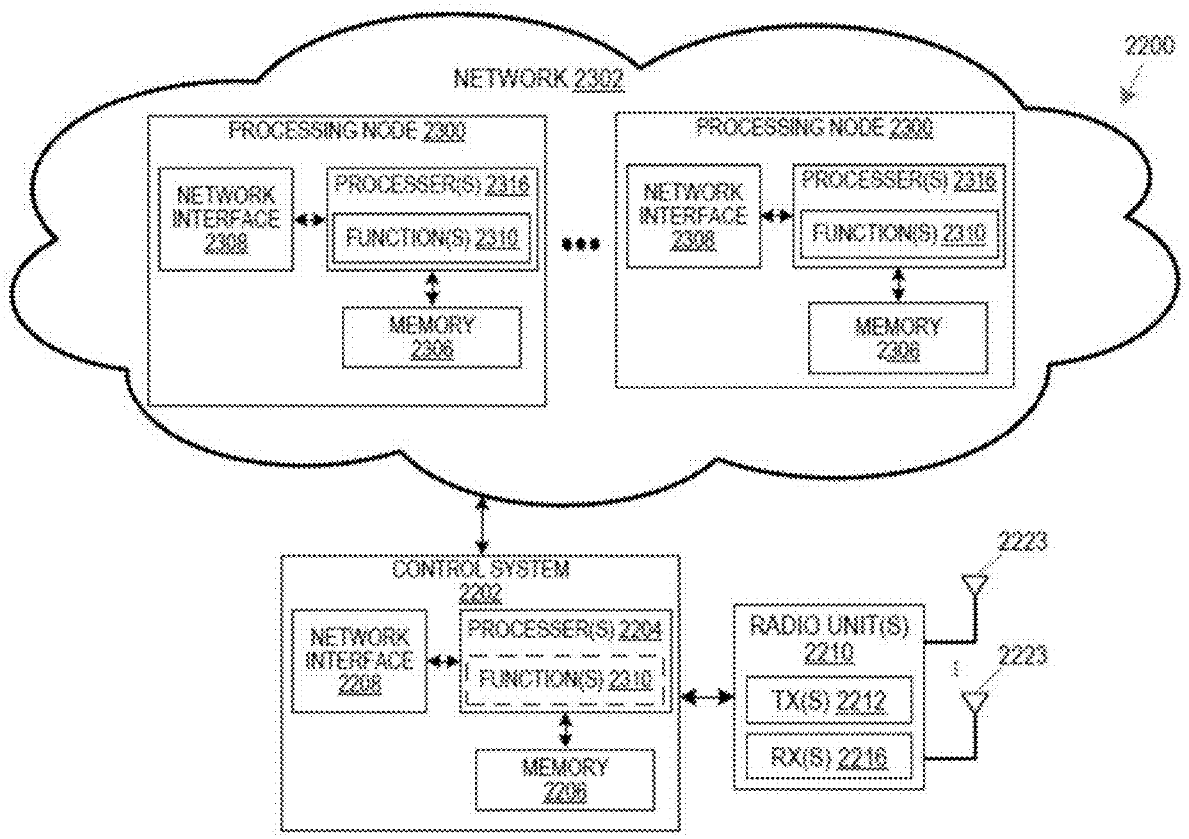

FIGS. 121, 122, and 123 are block diagrams of exemplary radio access nodes configured in various ways according to various exemplary embodiments of the present disclosure.

Figure 124:
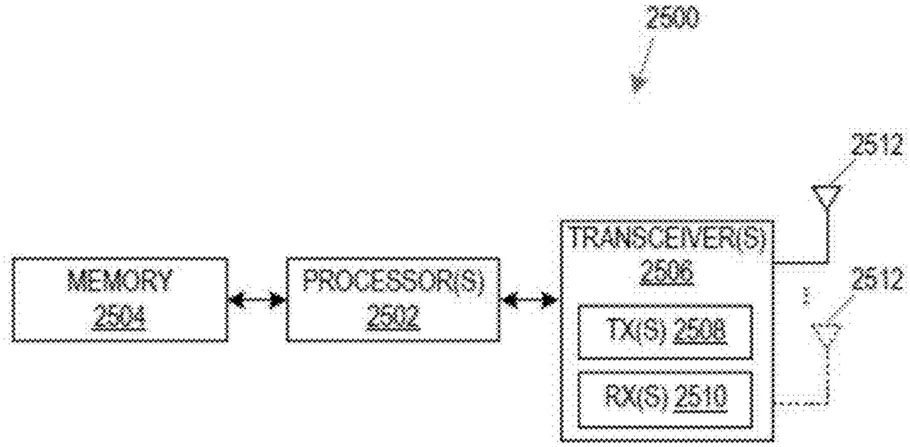
Figure 125:
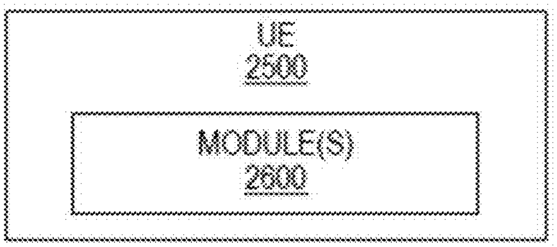

FIGS. 124 and 125 are block diagrams of exemplary wireless devices or UEs configured in various ways, according to various exemplary embodiments of the present disclosure.

Figure 126:
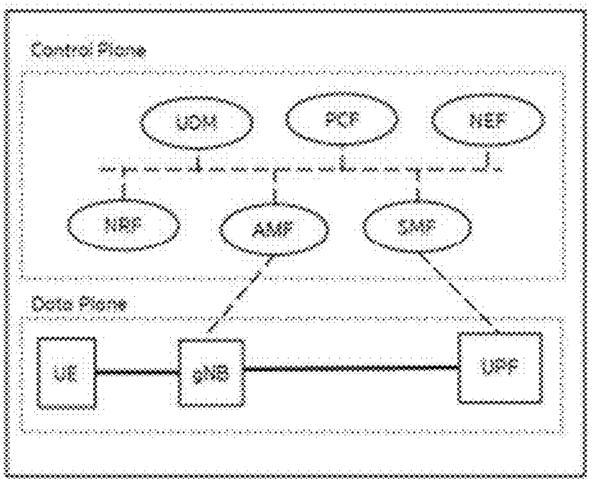

FIG. 126 illustrates 5G Core Network (SGCN) functions and Radio Access Network (RAN).

Figure 127:
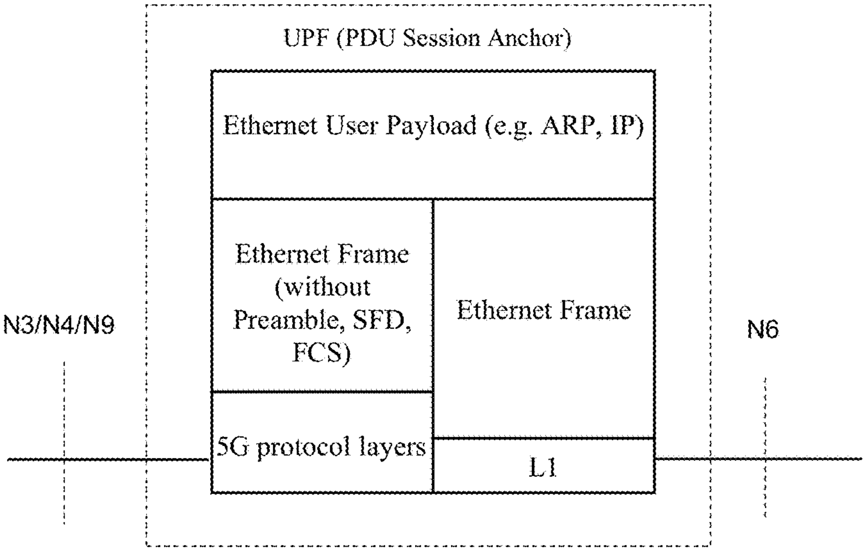

FIG. 127 shows protocol stacks for Ethernet PDU type data.1

Figure 128:
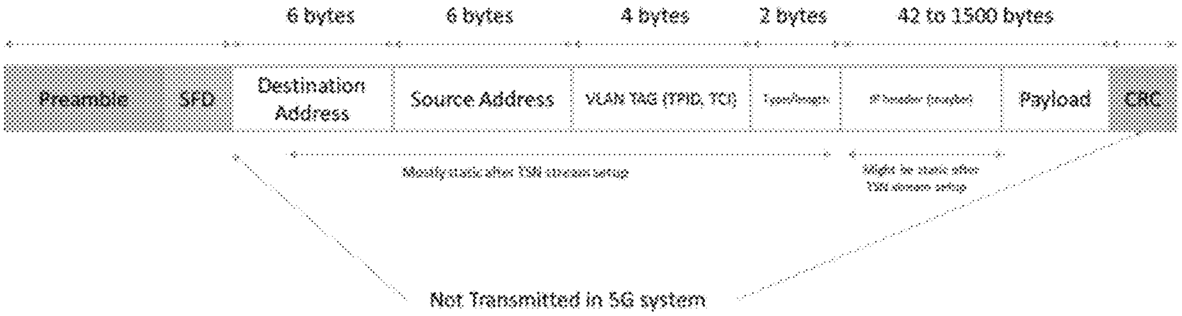

FIG. 128 illustrates the TSN Frame Structure.

Figure 129:
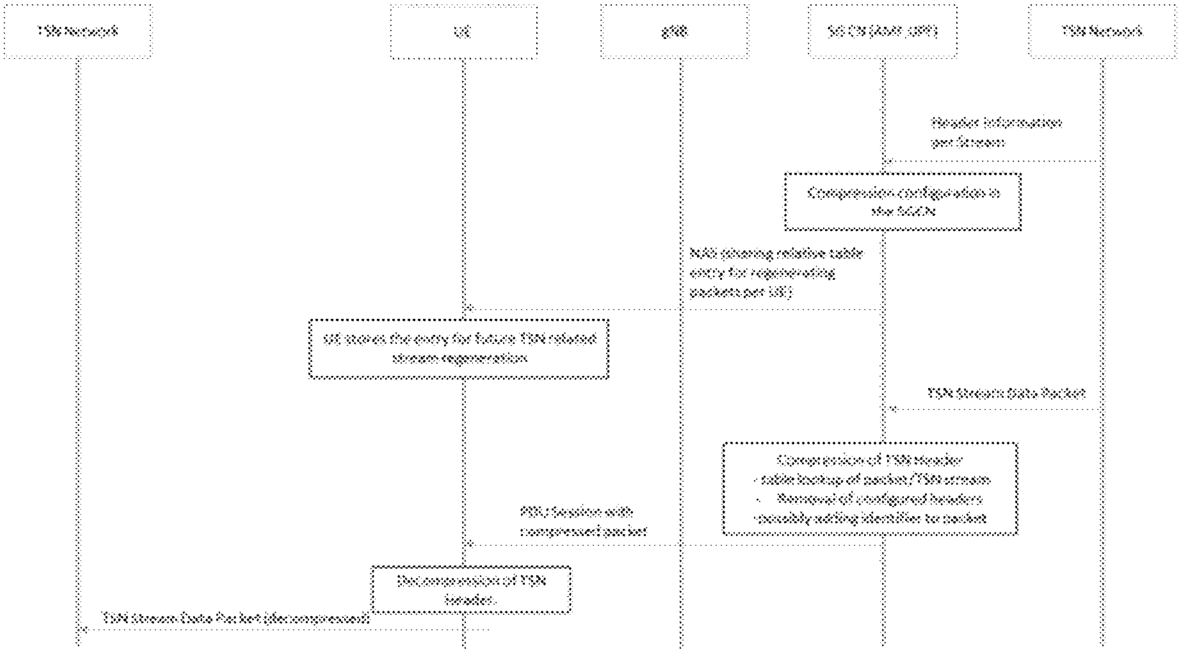

FIG. 129 is a signaling diagram for downlink signaling according to embodiments of the disclosure.

Figure 130:
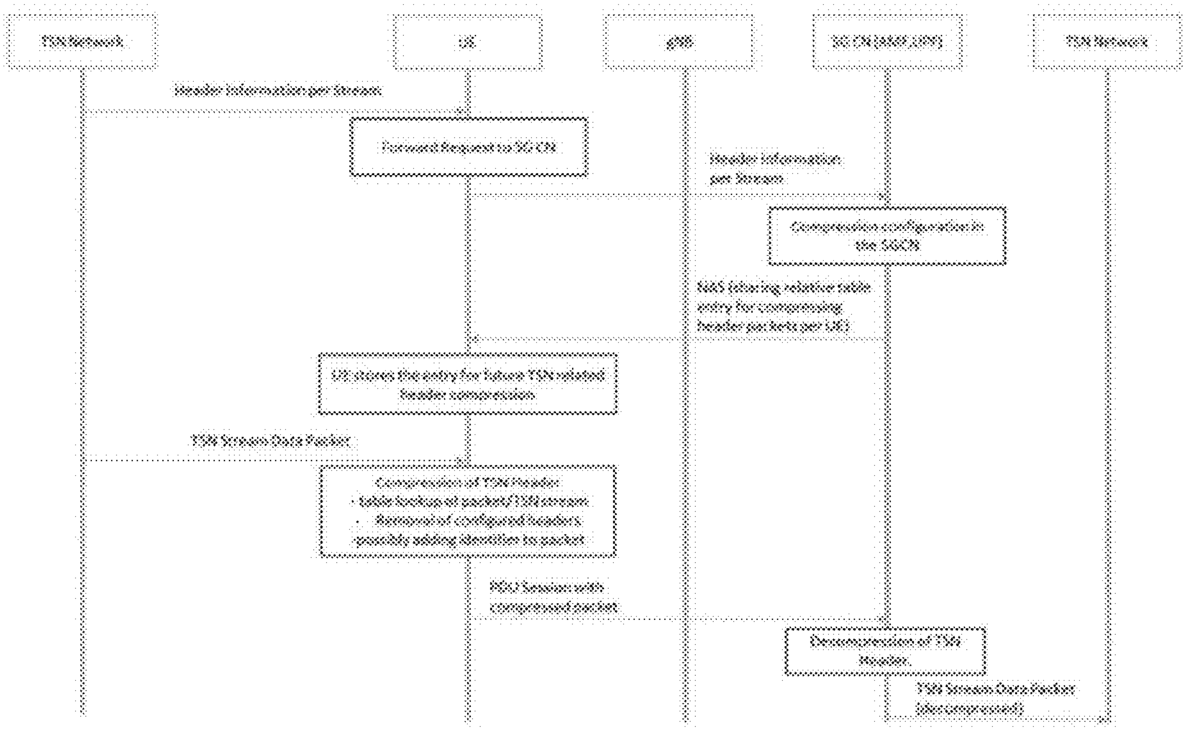

FIG. 130 is a signaling diagram for uplink signaling according to embodiments of the disclosure.

Figure 131:
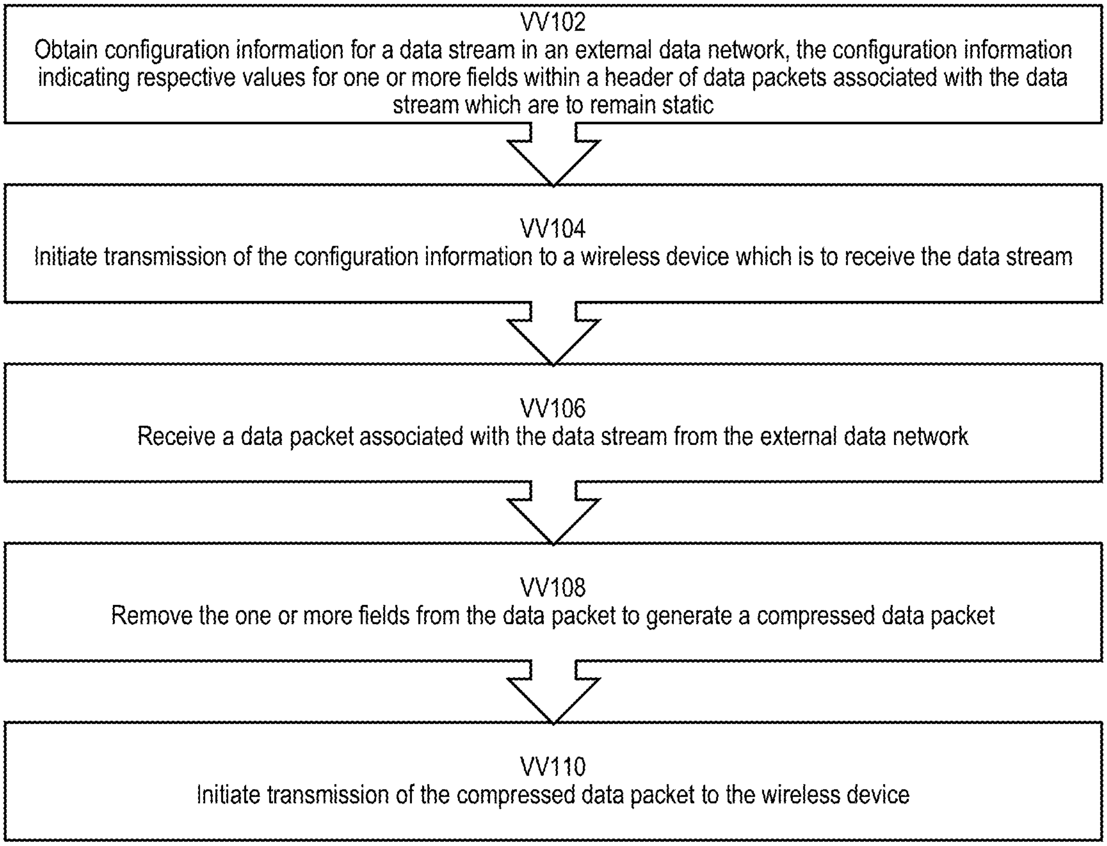

FIG. 131 illustrates a method in accordance with some embodiments.

Figure 132:
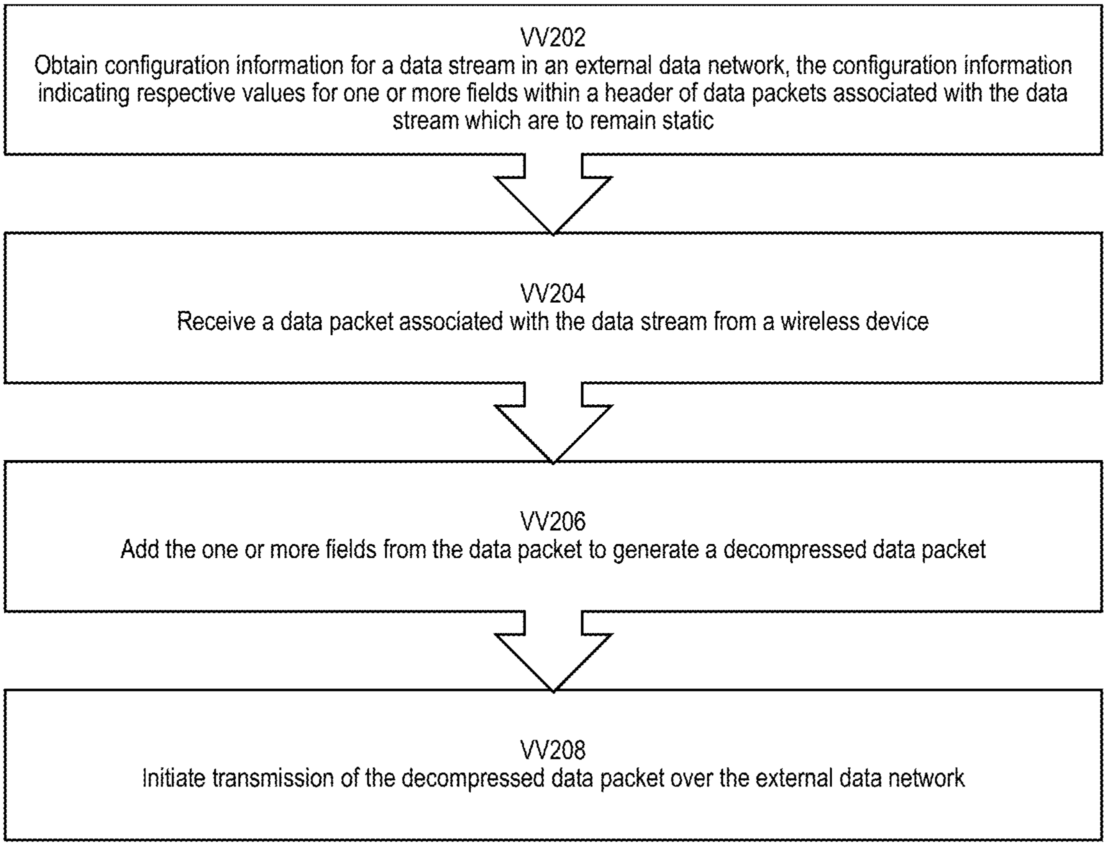

FIG. 132 illustrates another method in accordance with some embodiments.

Figure 133:
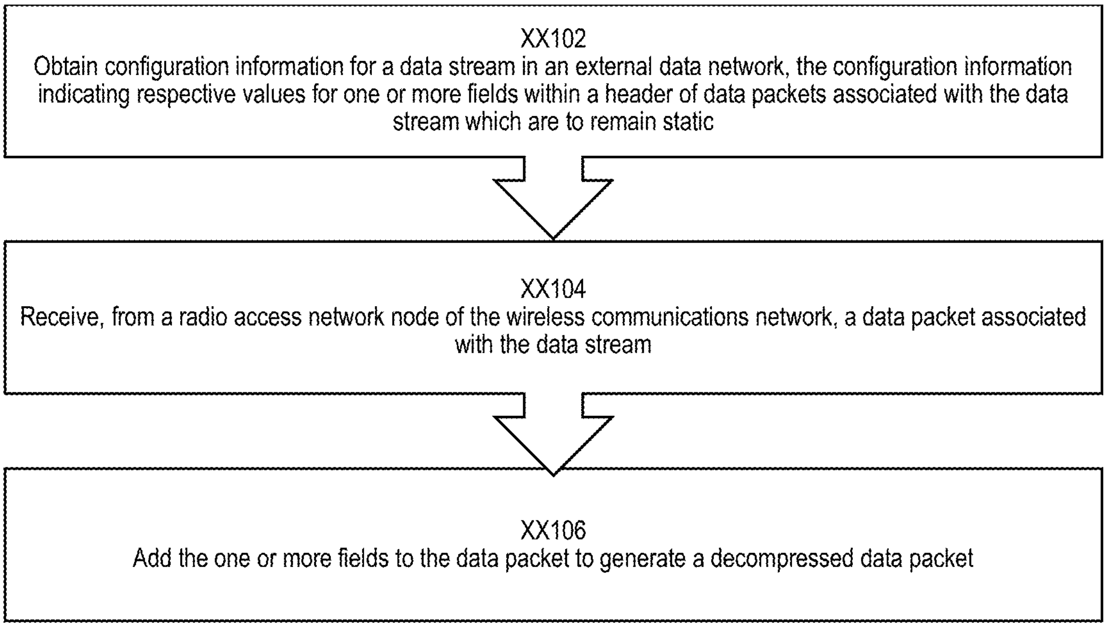

FIG. 133 illustrates another method in accordance with some embodiments.

Figure 134:
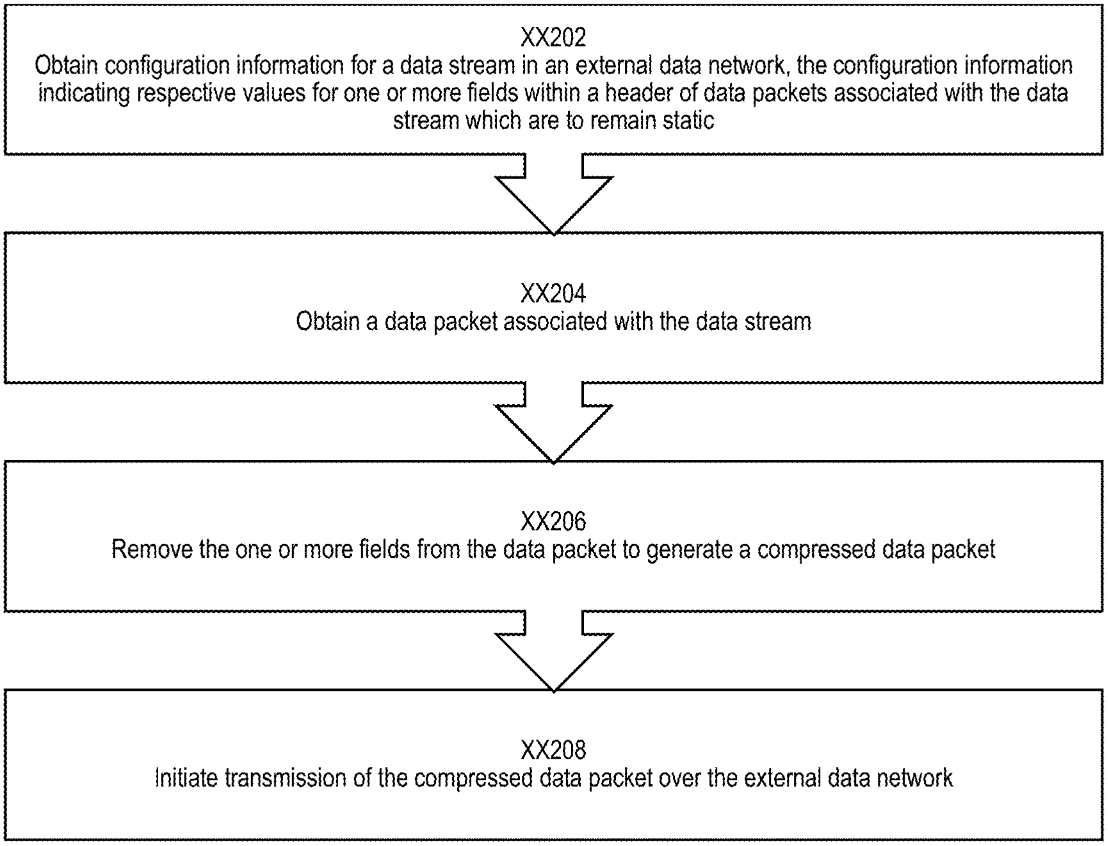

FIG. 134 illustrates another method in accordance with some embodiments.

Figure 135:
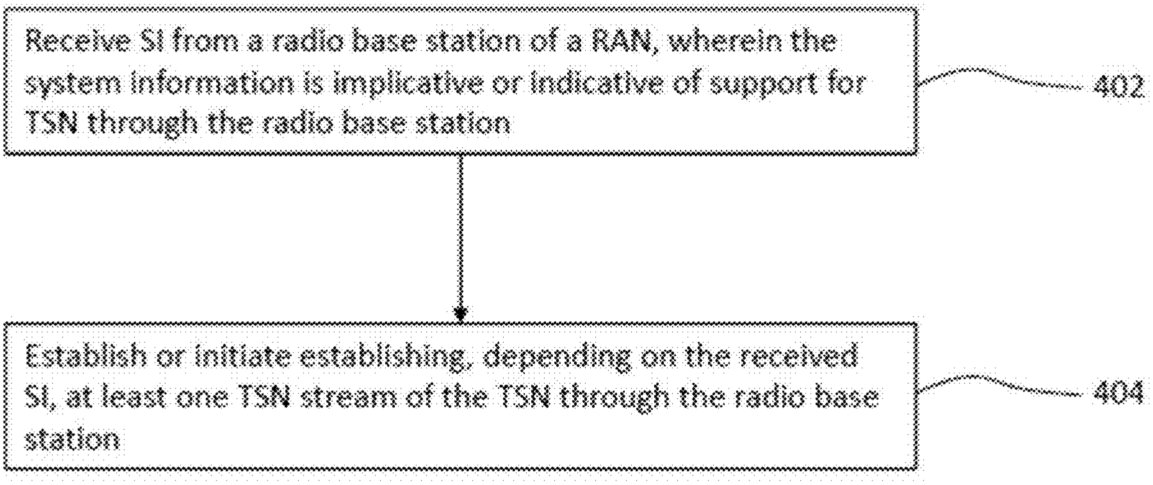

FIG. 135 shows a flowchart for implementing a method of handling Time-Sensitive Networking over a radio access network.

Figure 136:
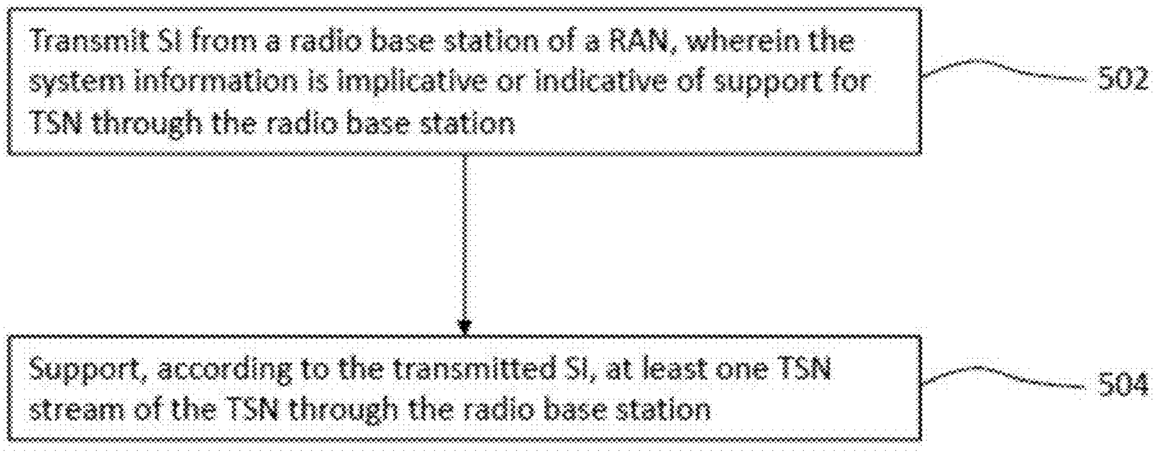

FIG. 136 shows a flowchart for implementing a method of announcing Time-Sensitive Networking over a radio access network.

Figure 137:
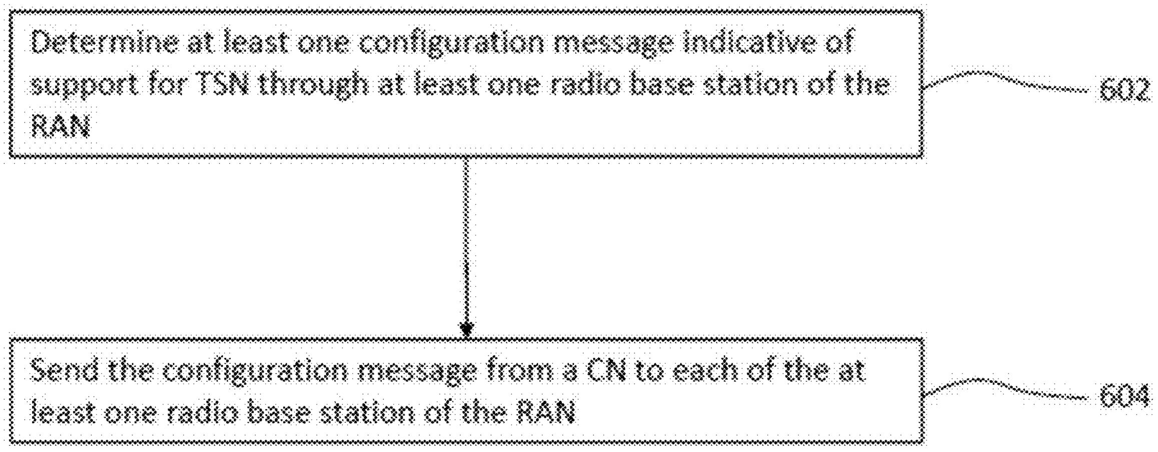

FIG. 137 shows a flowchart for implementing a method of distributing a configuration message for Time-Sensitive Networking over a radio access network.

Figure 138:
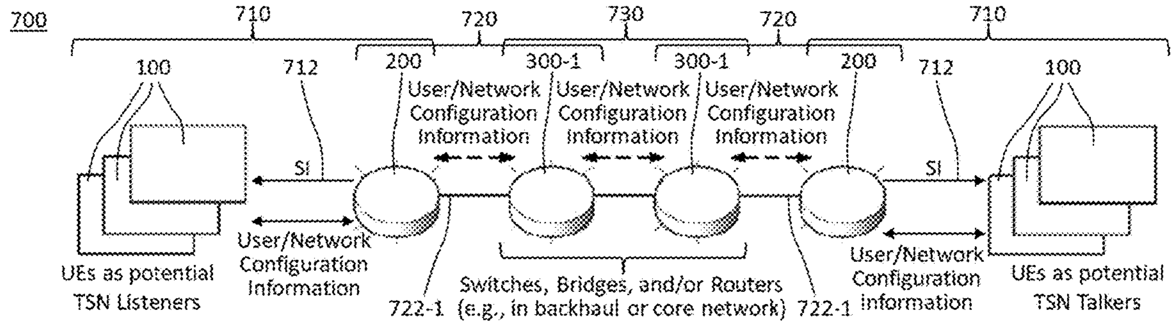

FIG. 138 shows a schematic block diagram of a first example of a communication system.

Figure 139:
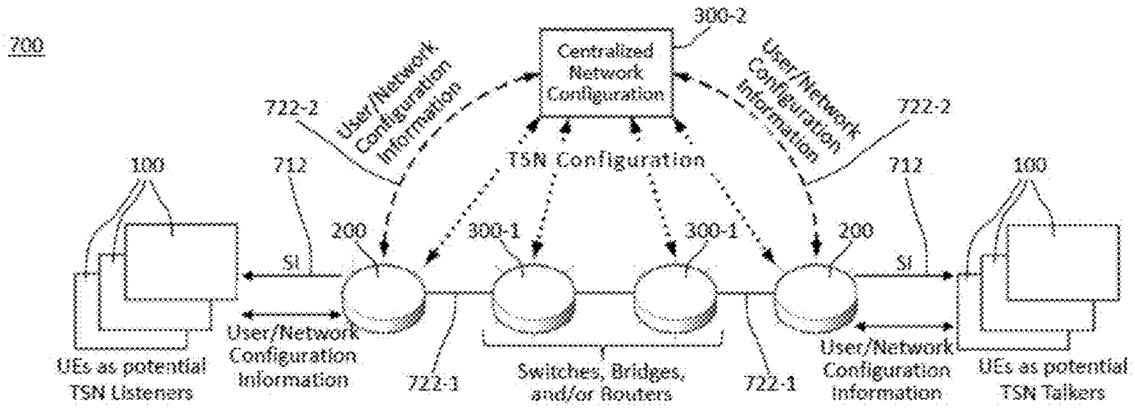

FIG. 139 is a schematic block diagram of a second example of a communication system.

Figure 140:
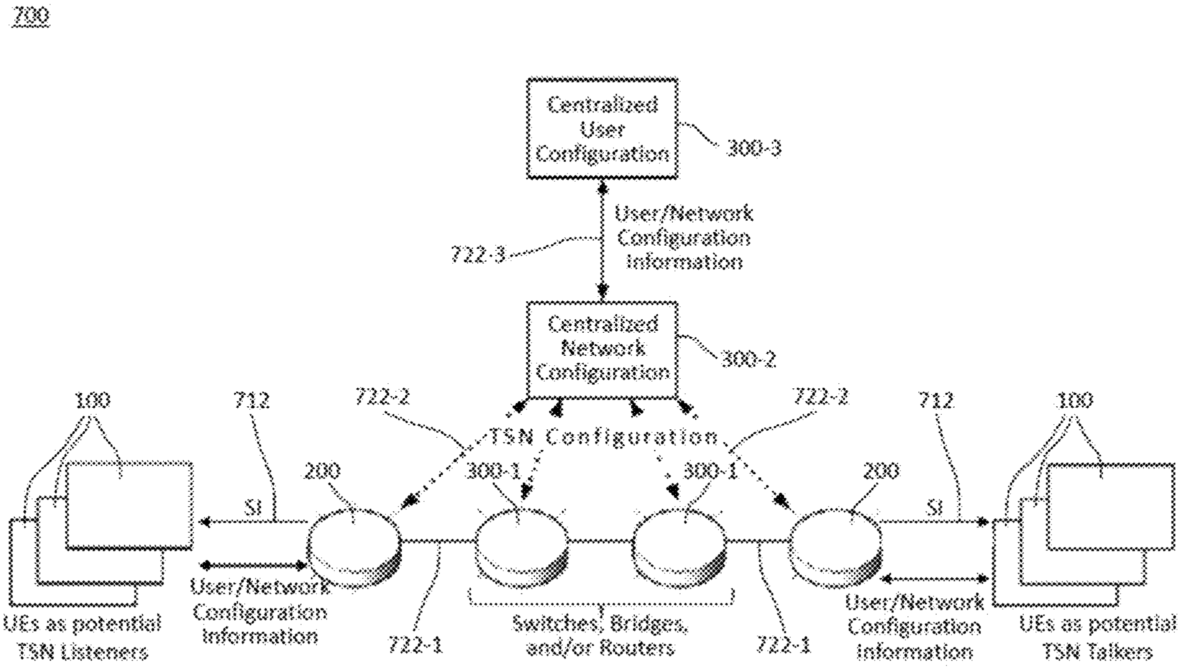

FIG. 140 is a schematic block diagram of a third example of a communication system.

Figure 141:
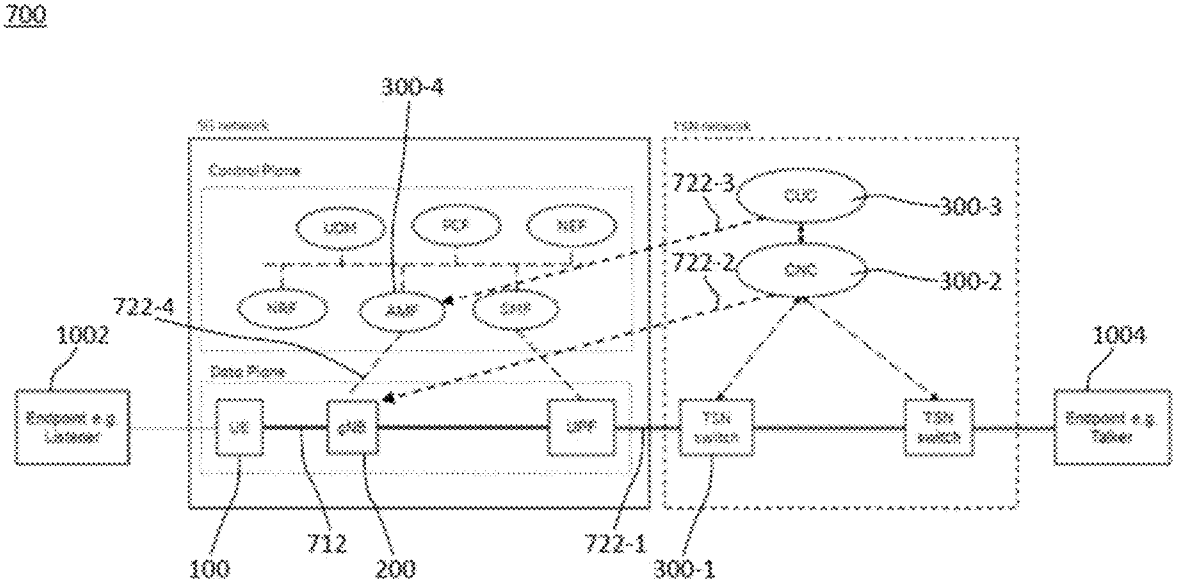

FIG. 141 is a functional block diagram of a fourth example of a communication system.

Figure 142:
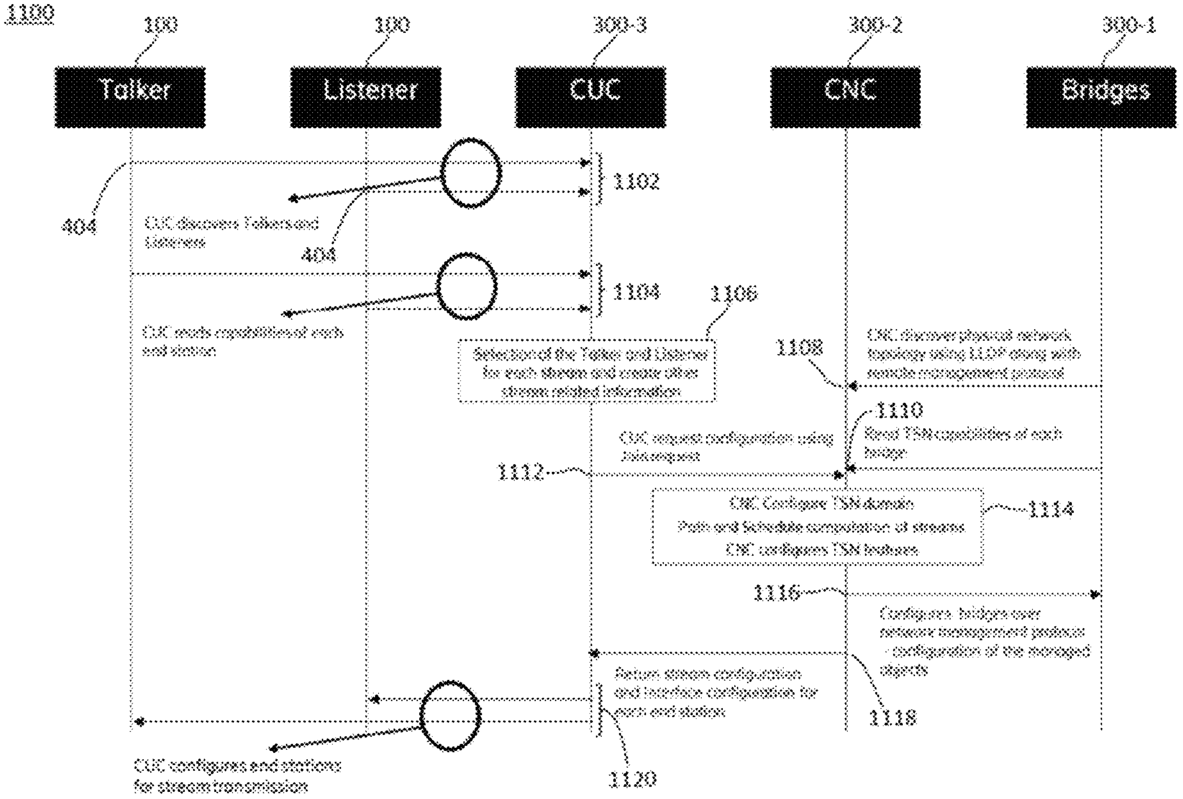

FIG. 142 shows a first schematic signaling diagram for a communication system.

Figure 143:
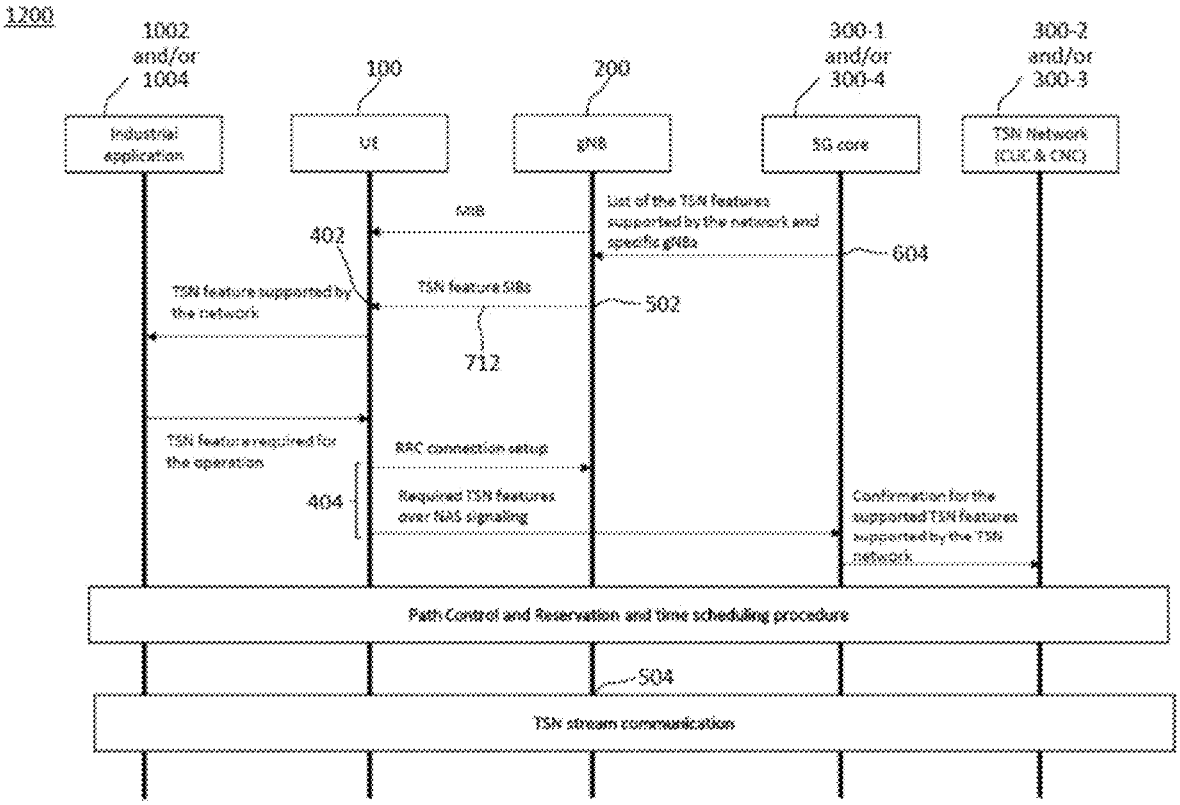

FIG. 143 is a second schematic signaling diagram for a communication system.

Figure 144:
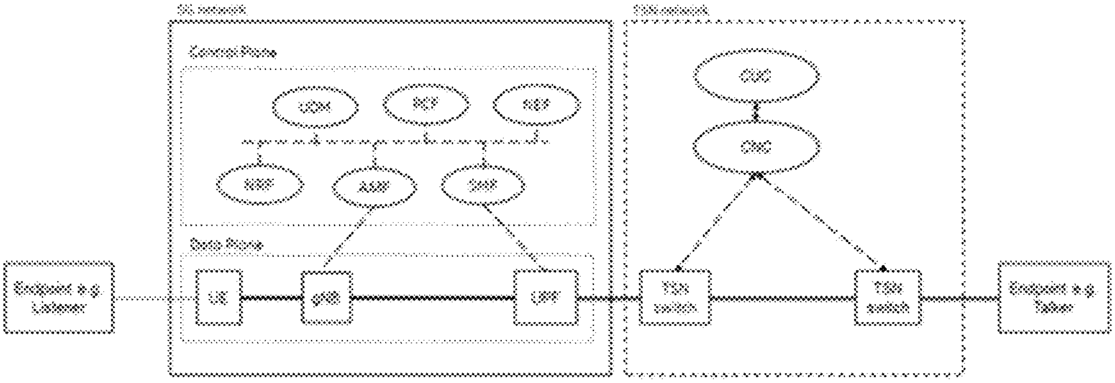

FIG. 144 illustrates the inter-working of 5G and TSN.

Figure 145:
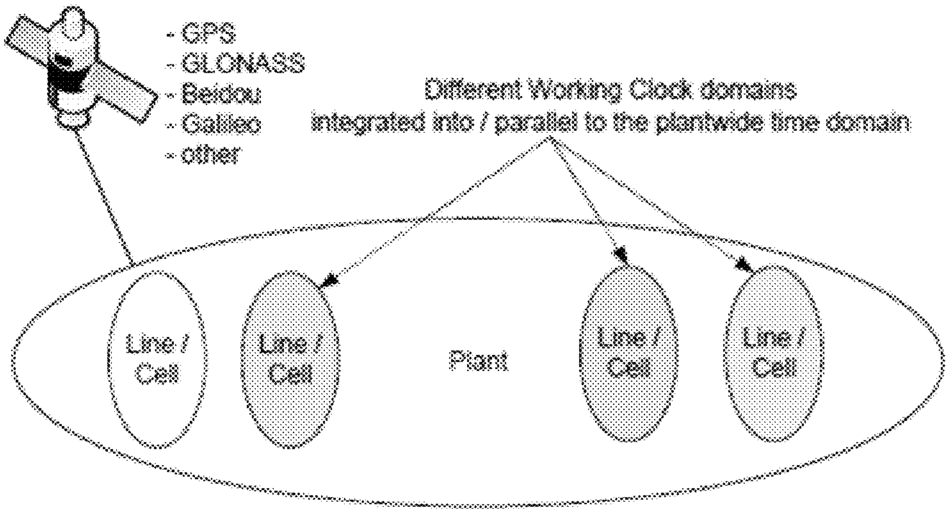

FIG. 145 shows multiple TSN gPTP time domains in a factory.

Figure 146:
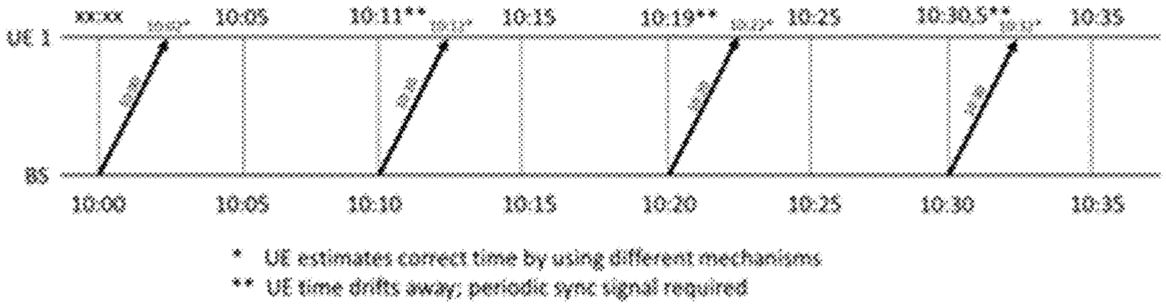

FIG. 146 illustrates how a BS can synchronize a UE to a cellular reference time.

Figure 147:
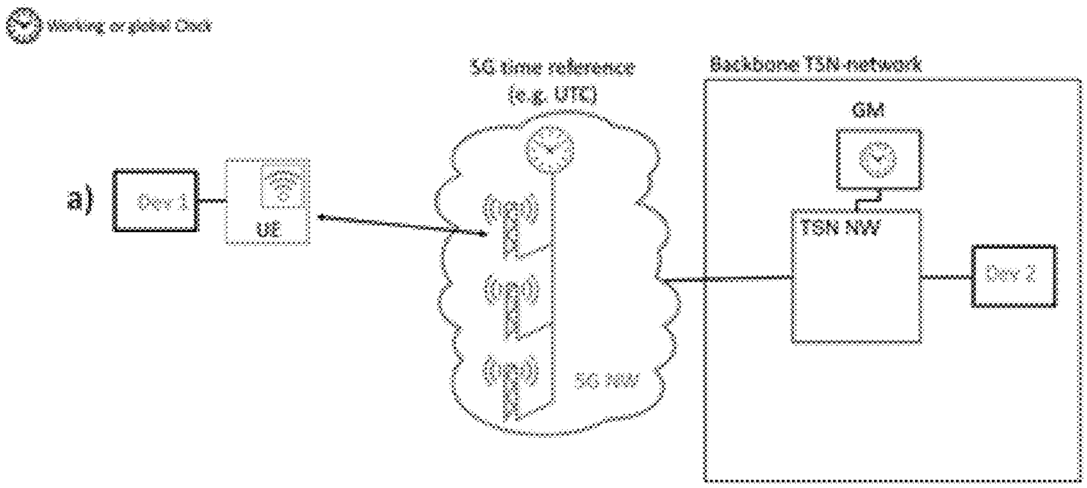

FIG. 147 illustrates a scenario where a device is assumed to be connected over a cellular link to a TSN domain.

Figure 148:
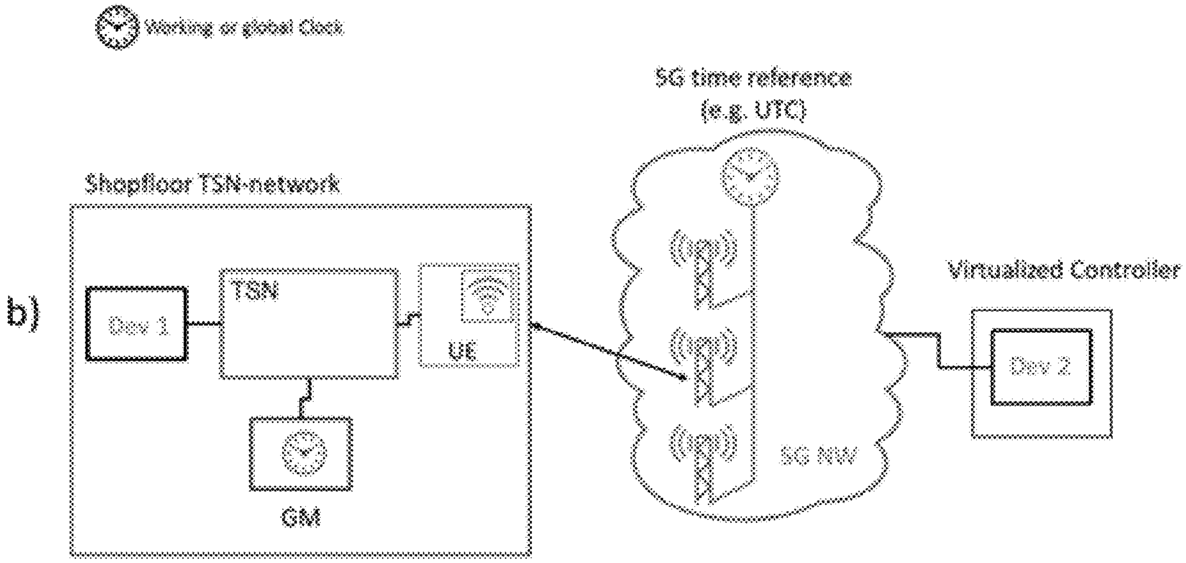

FIG. 148 illustrates a shop floor scenario assuming a TSN domain connected to a virtual controller over a cellular link.

Figure 149:
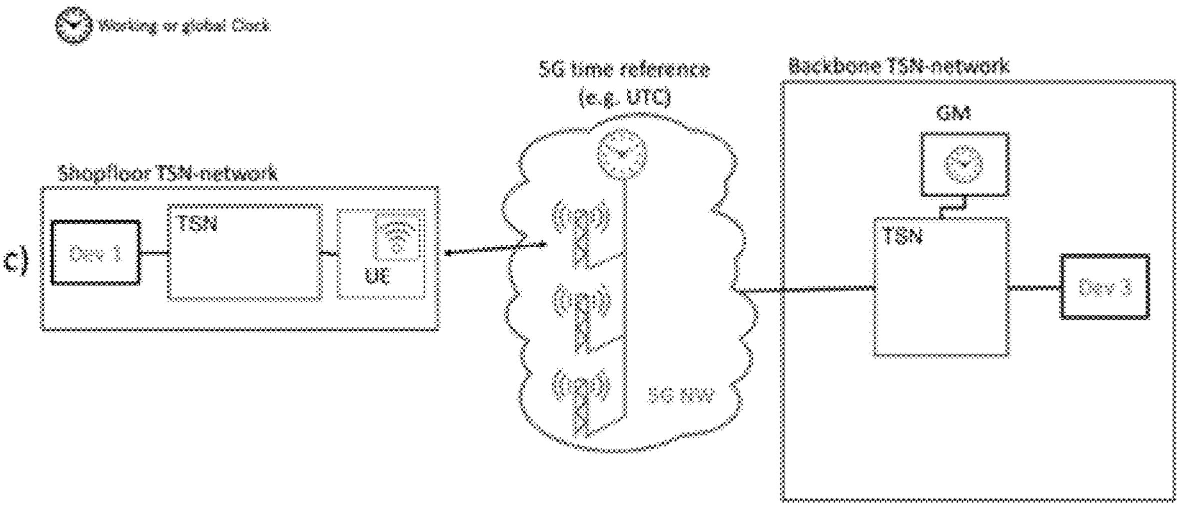

FIG. 149 illustrates a scenario where two TSN networks are connected over a cellular link.

Figure 150:
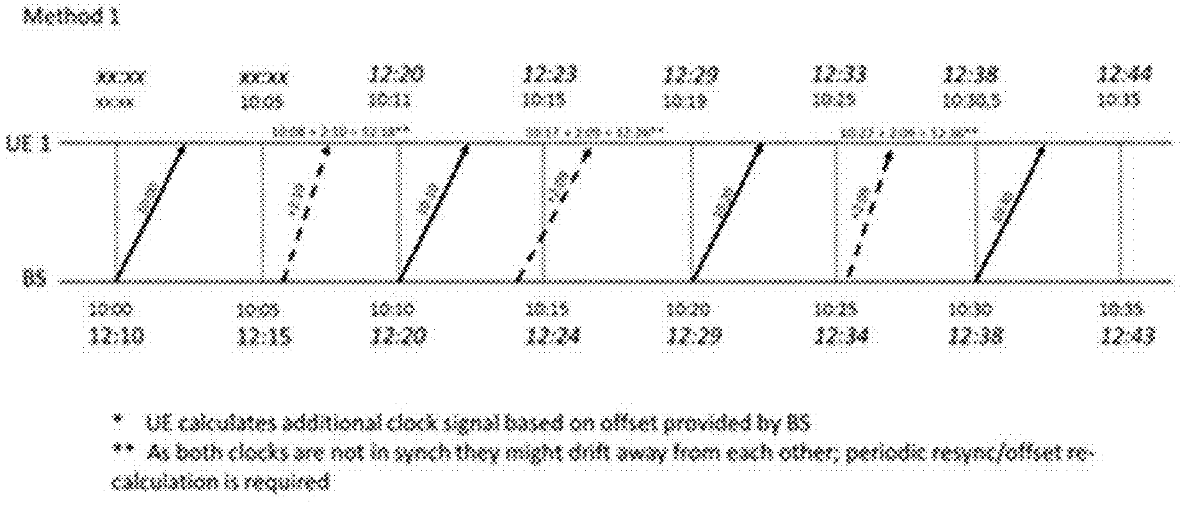

FIG. 150 illustrates an example synchronization procedure.

Figure 151:
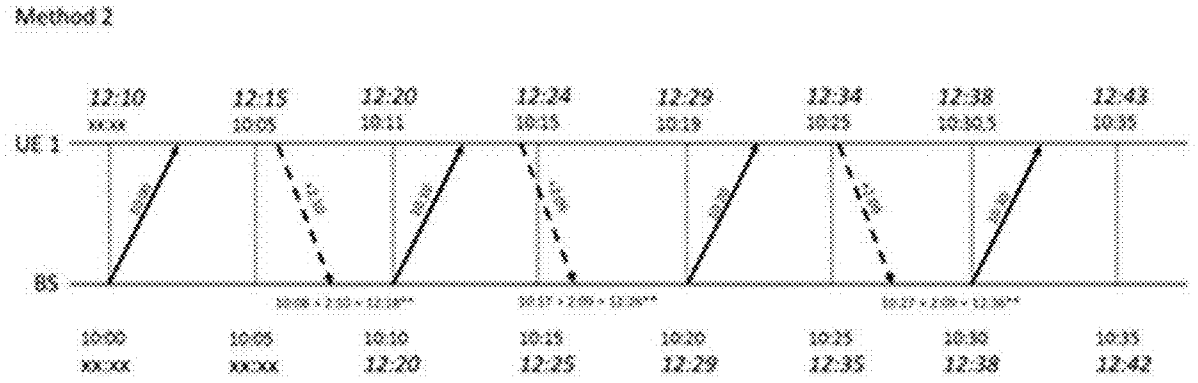

FIG. 151 illustrates another example synchronization procedure.

Figure 152:
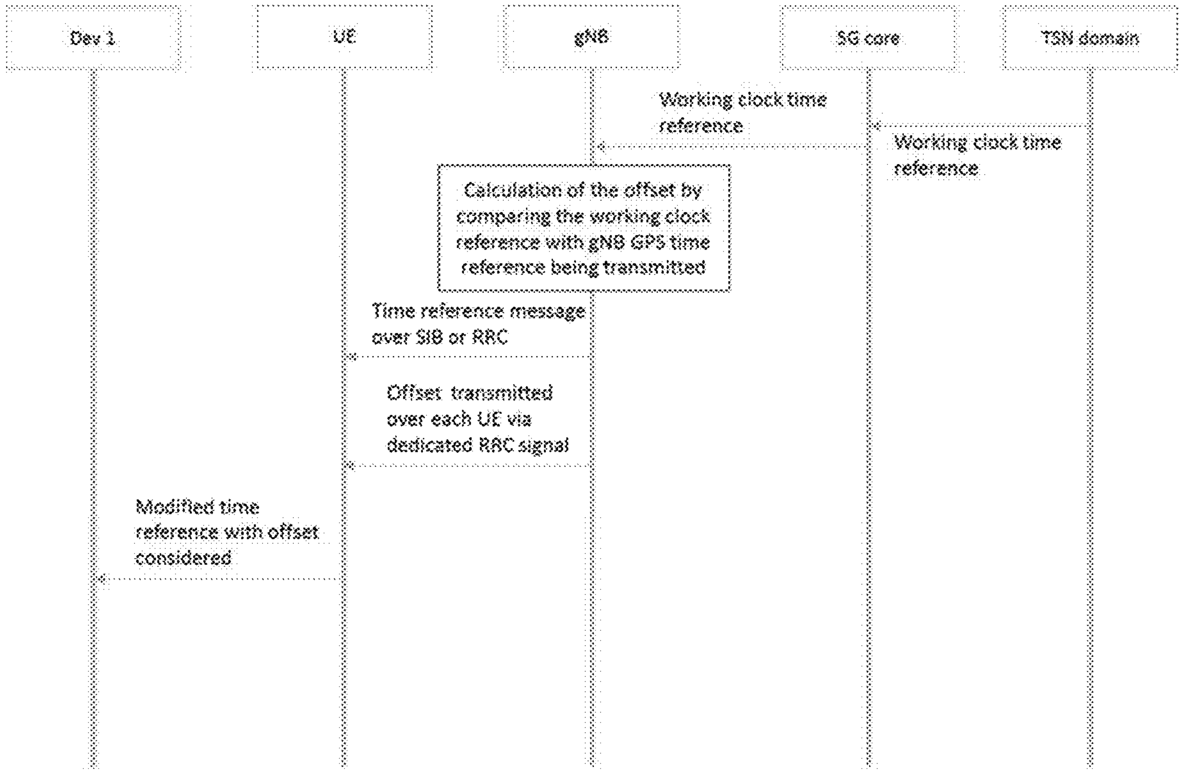

FIG. 152 is a sequence flow for an example synchronization procedure.

Figure 153:
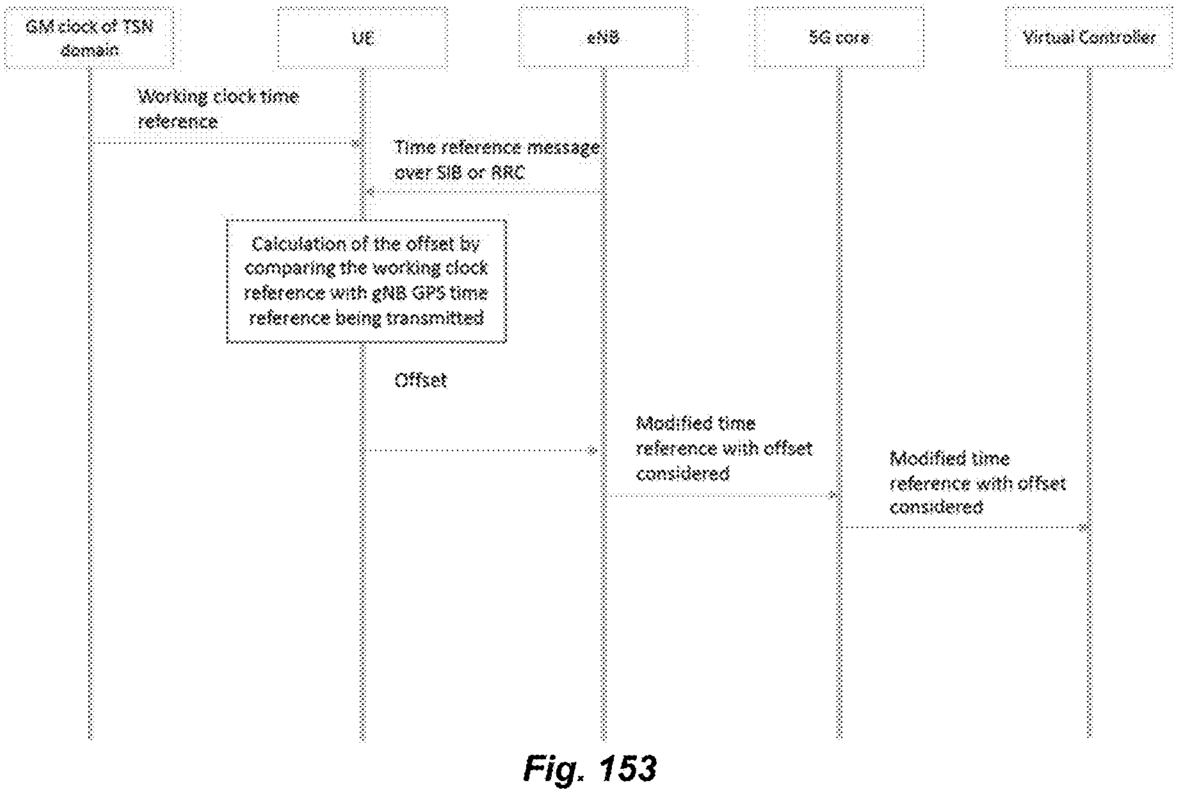

FIG. 153 is a sequence flow for another example synchronization procedure.

Figure 154:
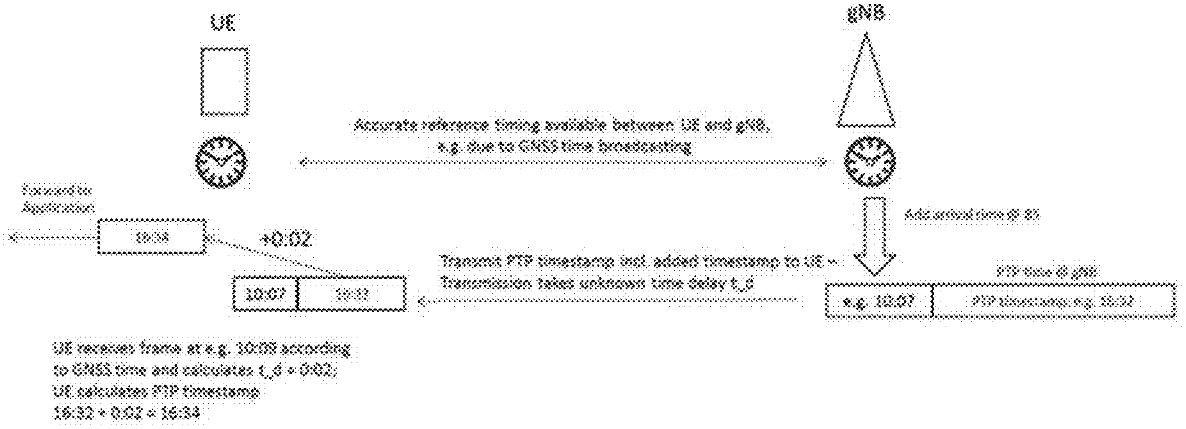

FIG. 154 illustrates PTP time transmission using methods disclosed herein.

Figure 155:
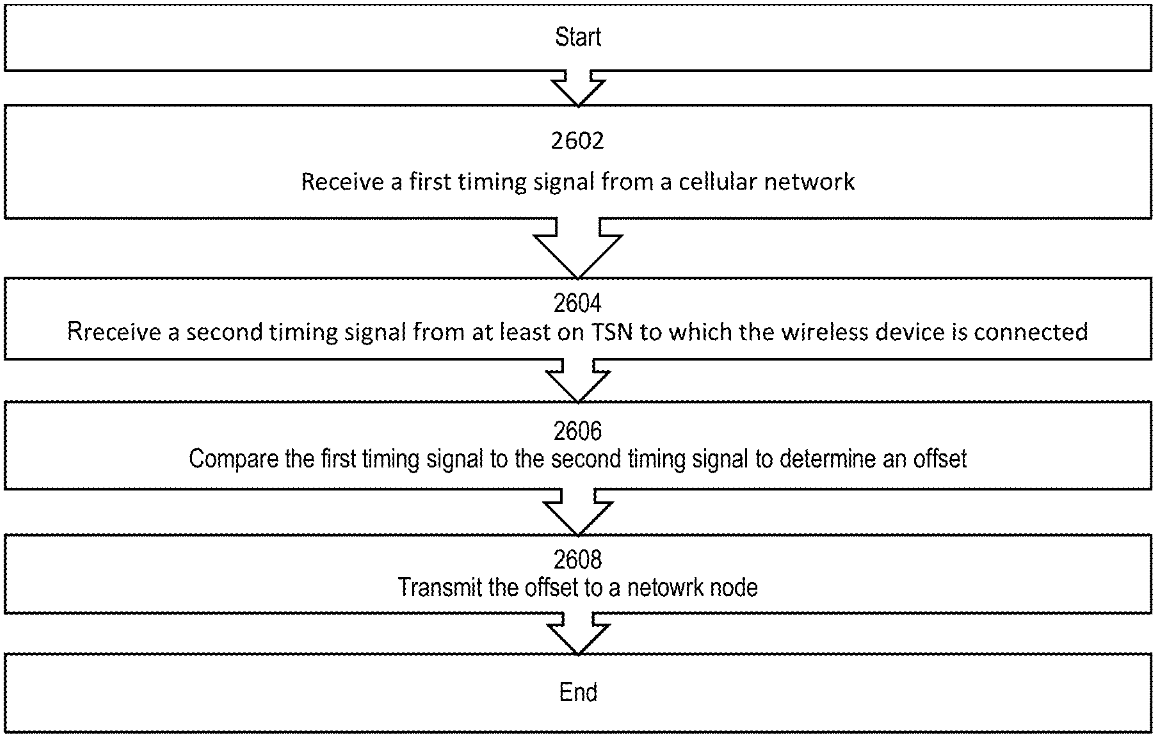

FIG. 155 illustrates an example method performed by a wireless device.

Figure 156:
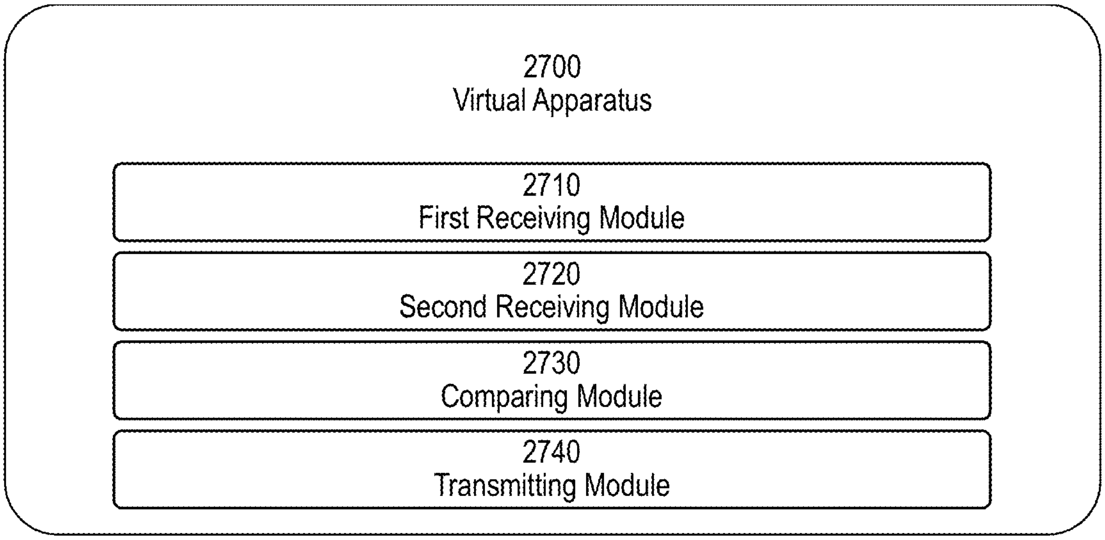

FIG. 156 is a schematic block diagram of a virtual apparatus in a wireless network.

Figure 157:
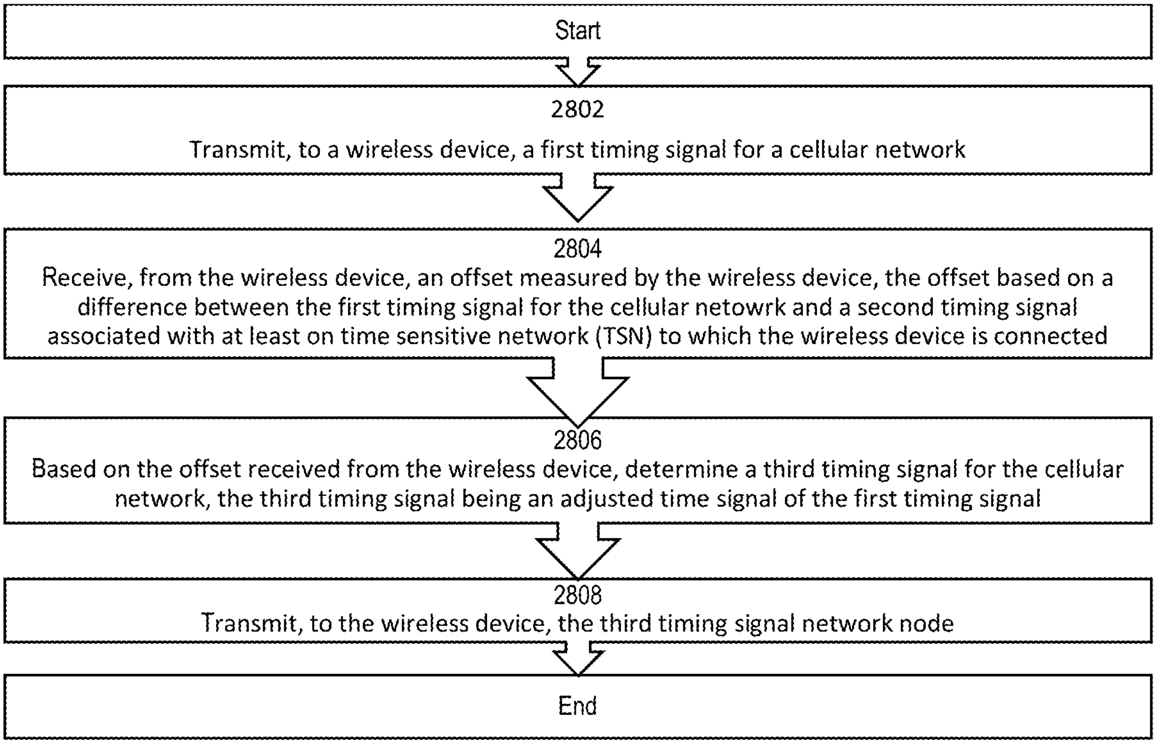

FIG. 157 illustrates an example method performed by a network node, such as a base station.

Figure 158:
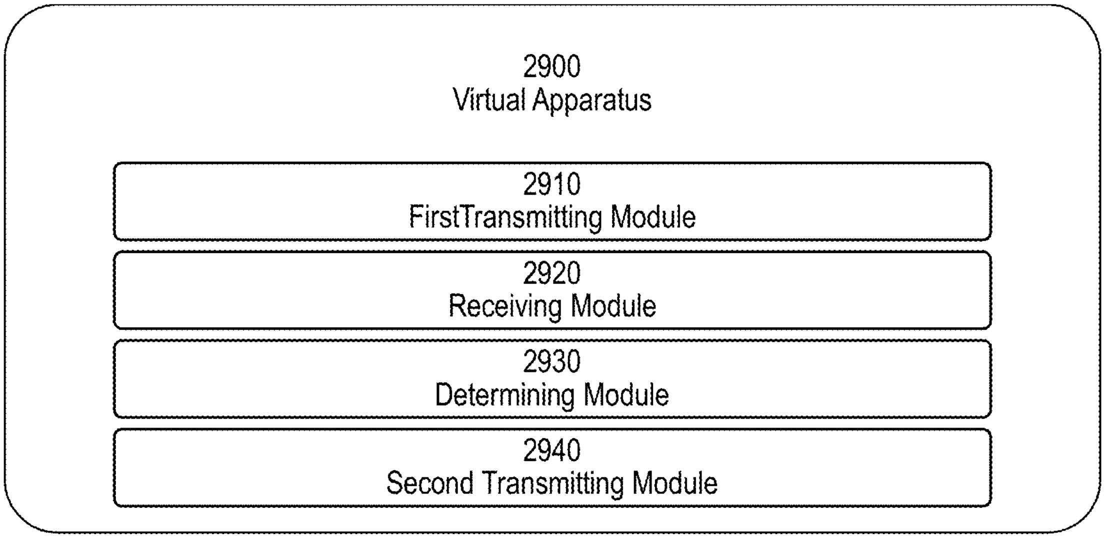

FIG. 158 is a schematic block diagram of a virtual apparatus in a wireless network.

Figure 159:
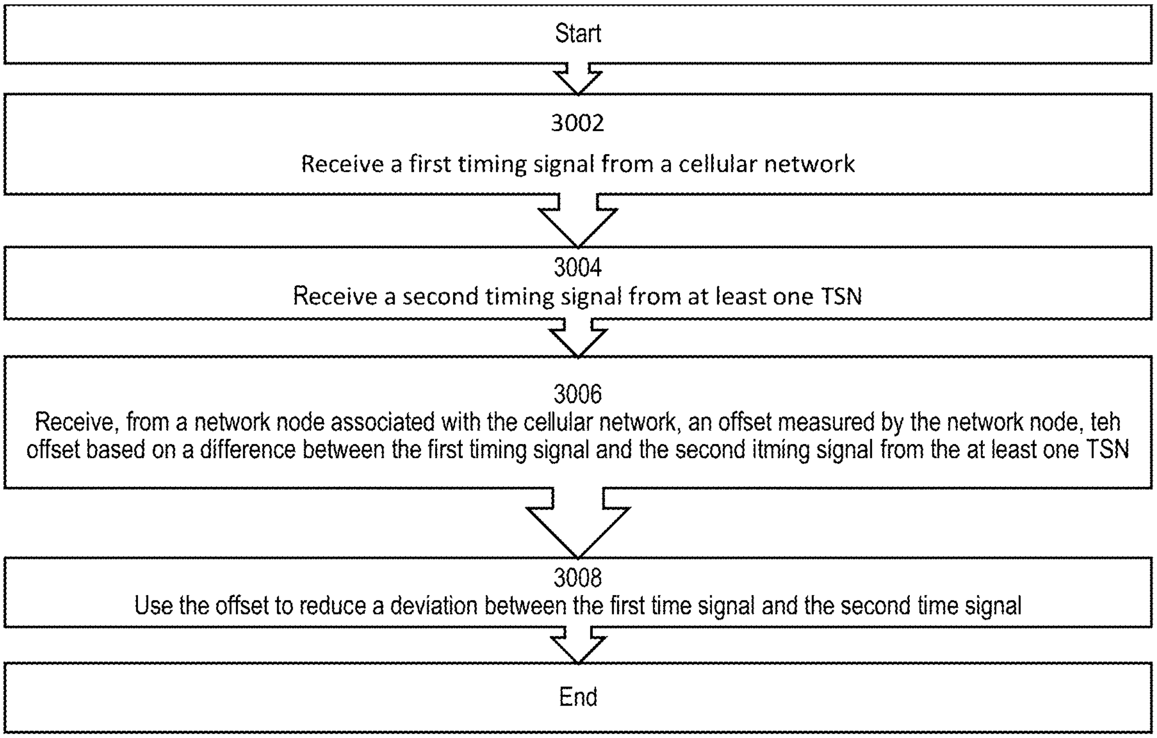

FIG. 159 illustrates an example method performed by a wireless device.

Figure 160:
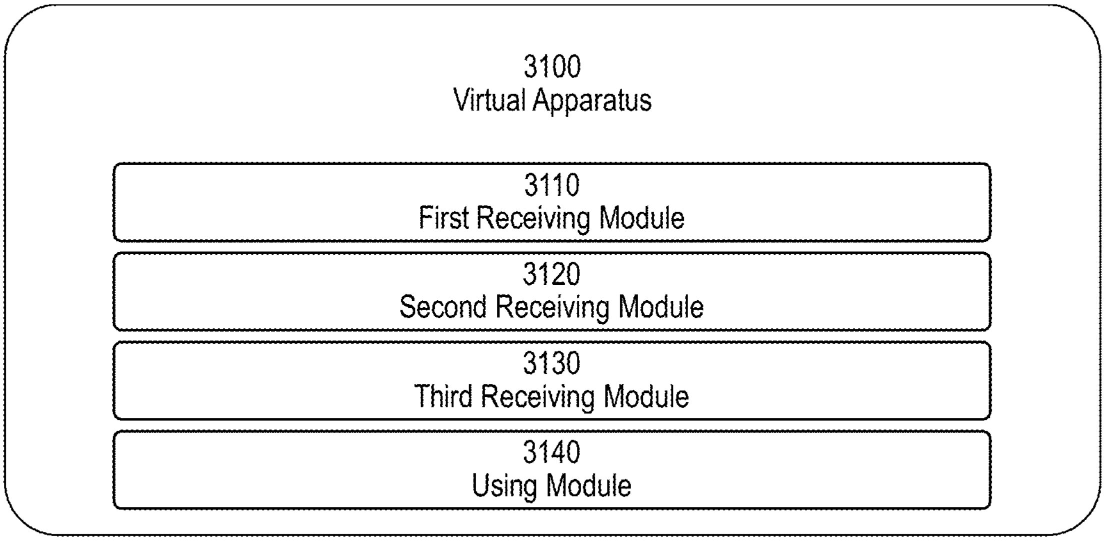

FIG. 160 is a schematic block diagram of a virtual apparatus in a wireless network.

Figure 161:
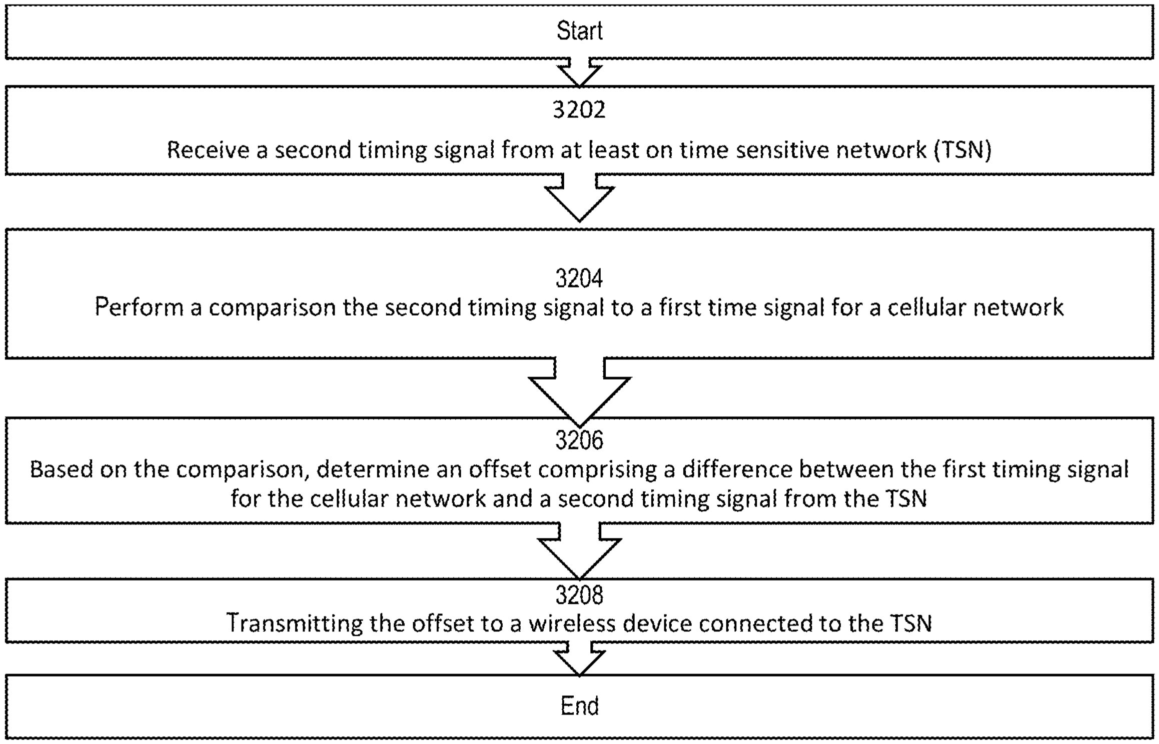

FIG. 161 illustrates an example method performed by a network node, such as a base station.

Figure 162:
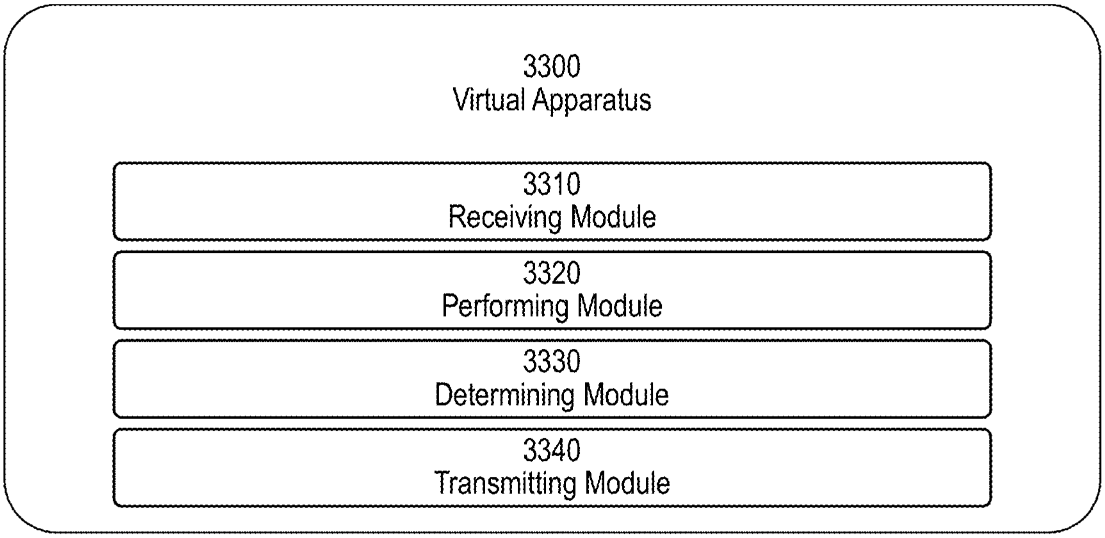

FIG. 162 is a schematic block diagram of a virtual apparatus in a wireless network.

Figure 163:
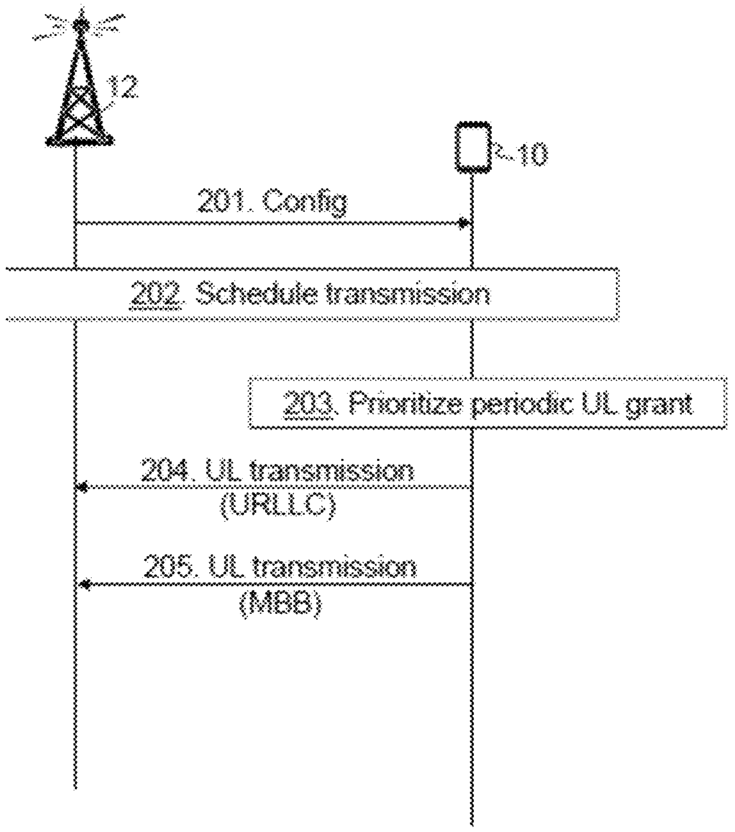

FIG. 163 is a combined flowchart and signaling scheme according to embodiments herein.

Figure 164:
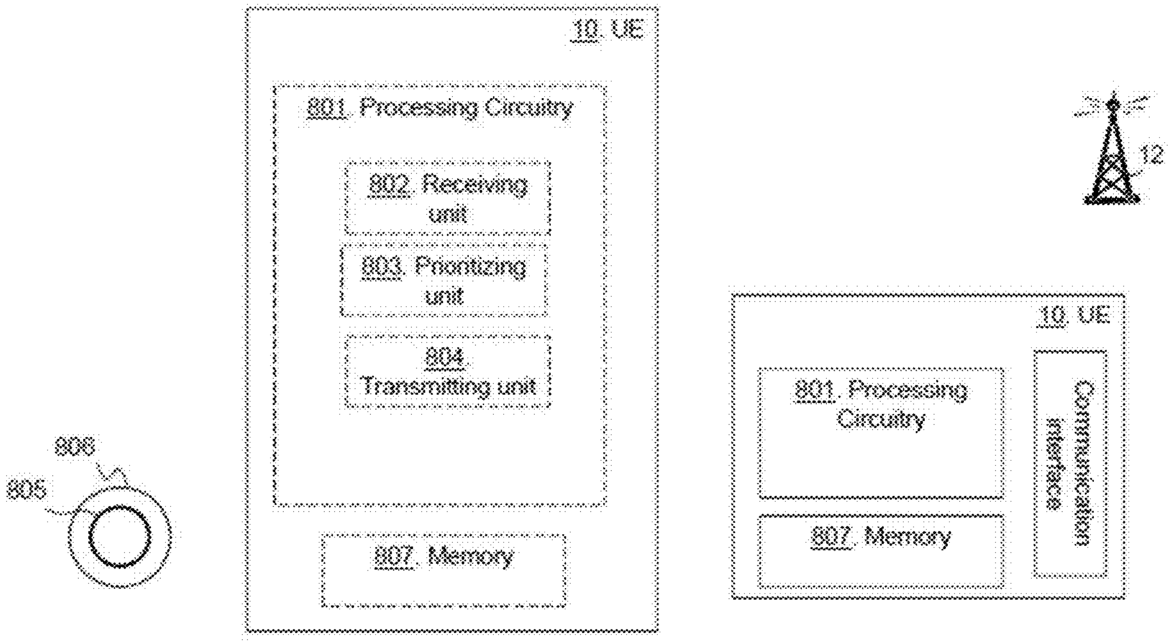

FIG. 164 is a block diagram depicting a UE for handling configuration according to embodiments herein.

Figure 165:
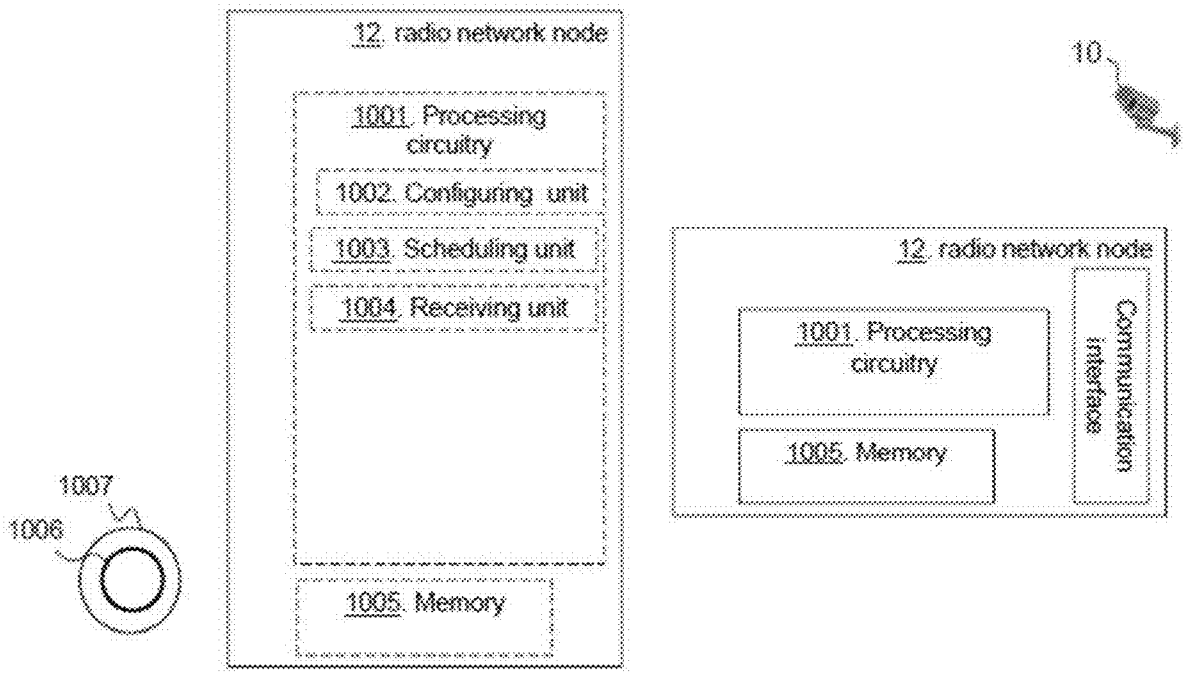

FIG. 165 is a block diagram depicting a radio network node for handling configuration in a wireless communication network according to embodiments herein.

Figure 166:
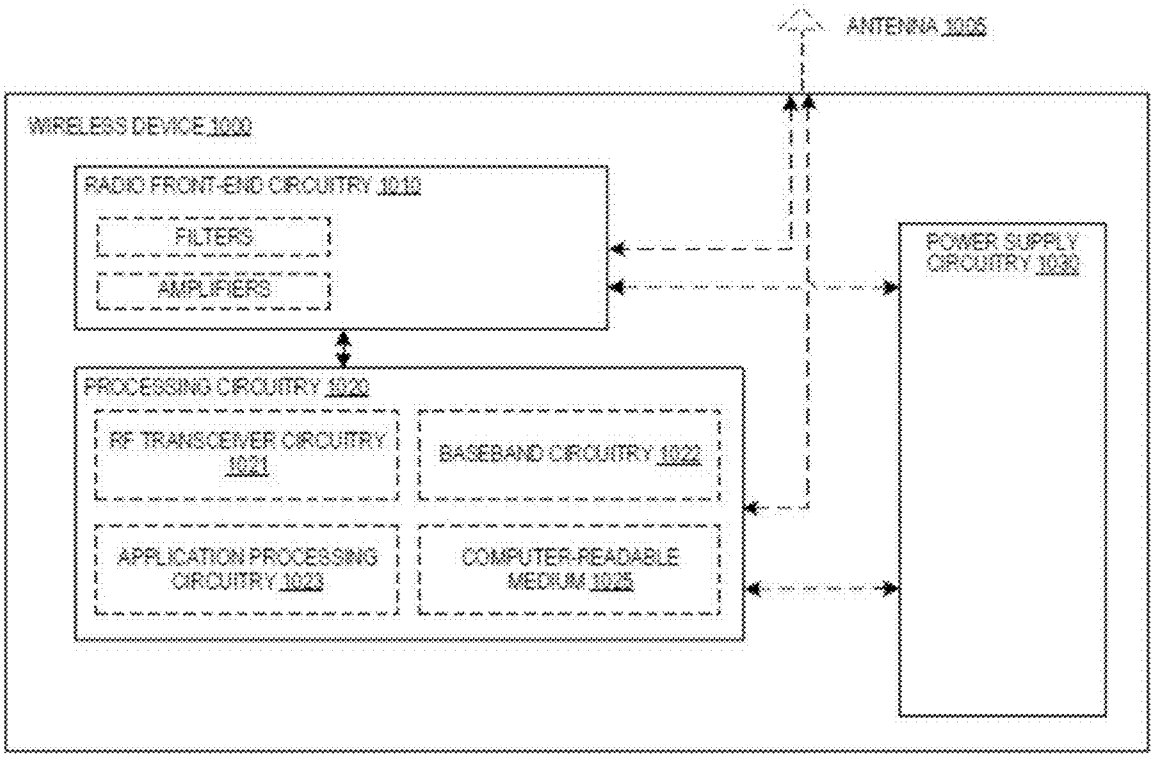

FIG. 166 is a block diagram of an example wireless device, according to embodiments herein.

Figure 167:
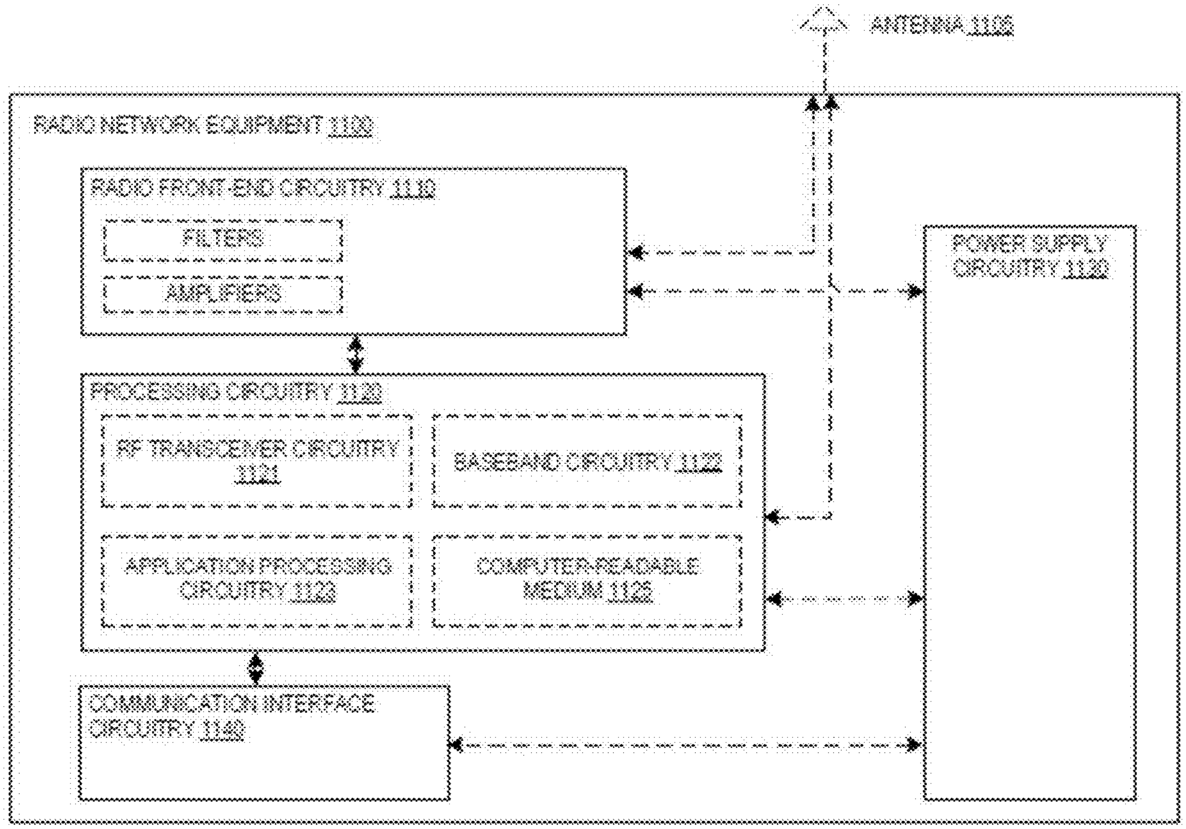

FIG. 167 is a block diagram of an example radio network node, according to embodiments herein.

Figure 168:
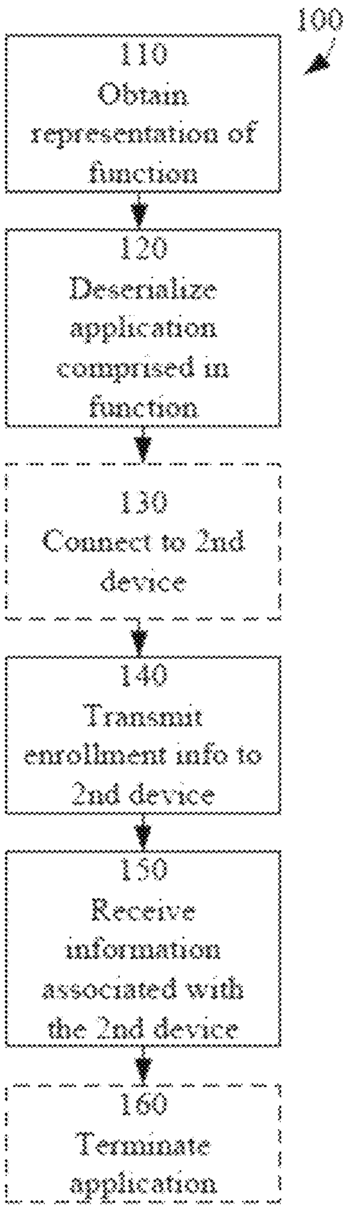

FIG. 168 illustrates a method for assisting enrollment of a device in an Internet of Things (IoT) environment, according to some embodiments.

Figure 169:
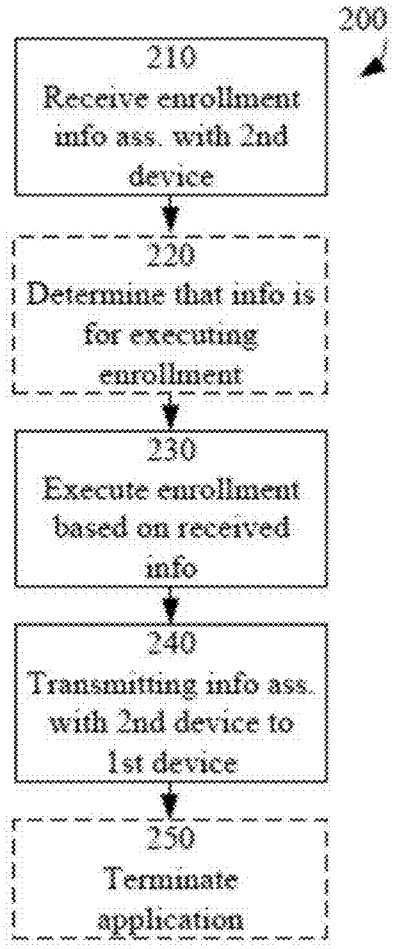

FIG. 169 illustrates a method for enrolling in an Internet of Things (IoT) environment, according to some embodiments.

Figure 170:
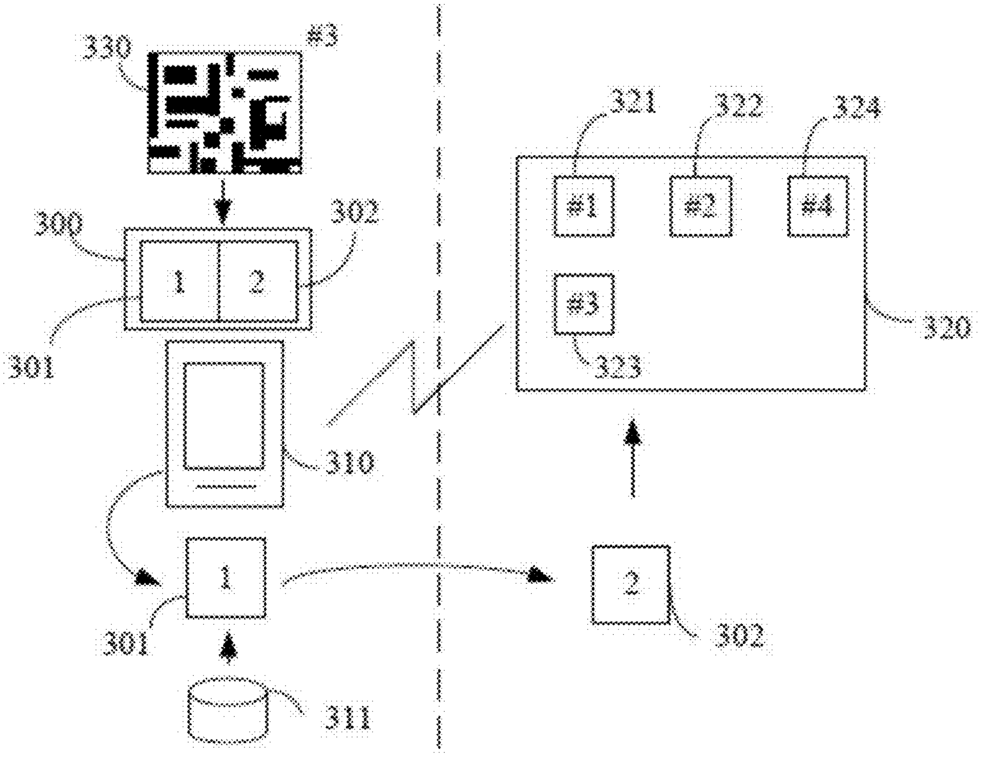

FIG. 170 is a schematic drawing illustrating an enrollment process according to some embodiments.

Figure 171:
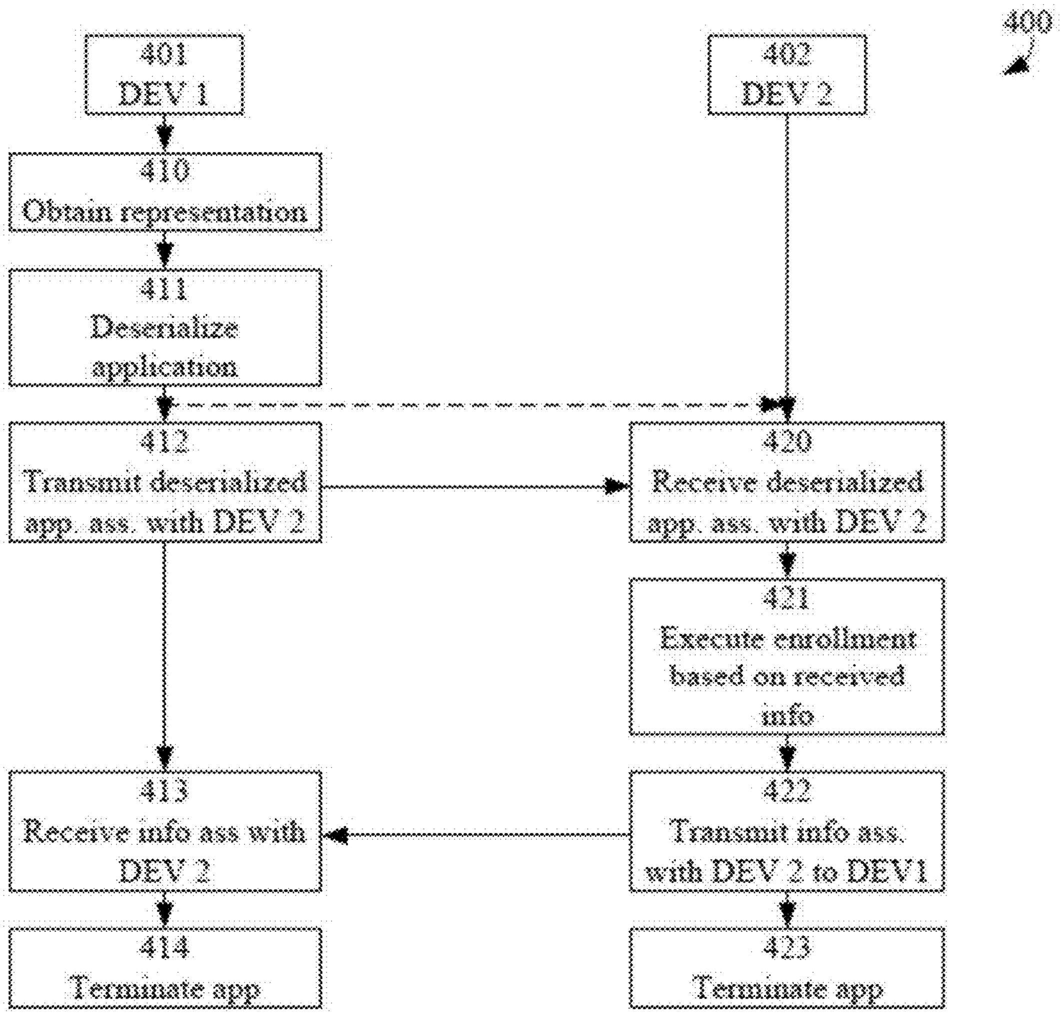

FIG. 171 is a flowchart illustrating example method steps according to some embodiments.

Figure 172:
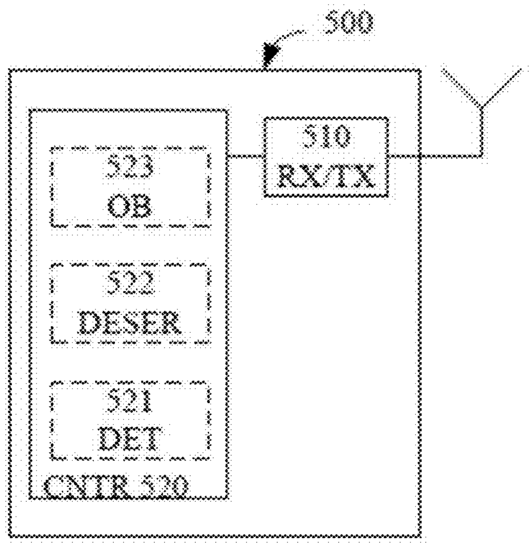

FIG. 172 is a block diagram illustrating an example arrangement according to some embodiments.

Figure 173:
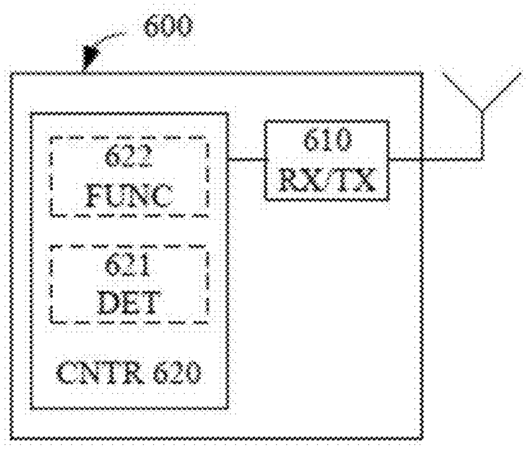

FIG. 173 is a block diagram illustrating an example arrangement according to some embodiments.

Figure 174:
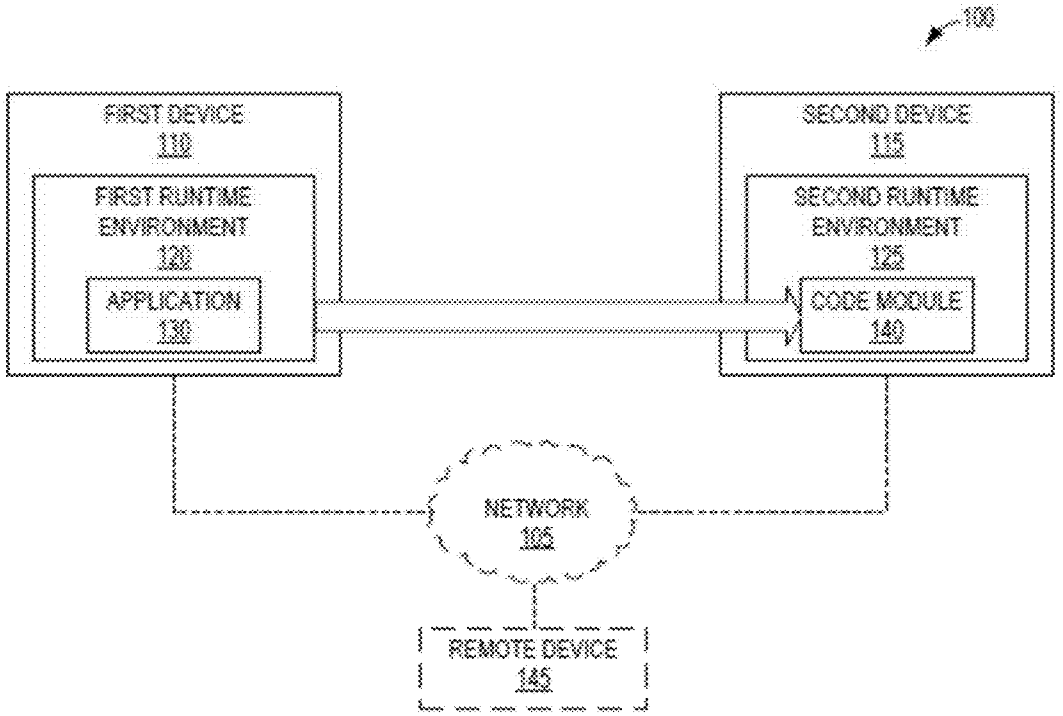

FIG. 174 is a block diagram illustrating an example network environment according to one or more embodiments.

Figure 175:
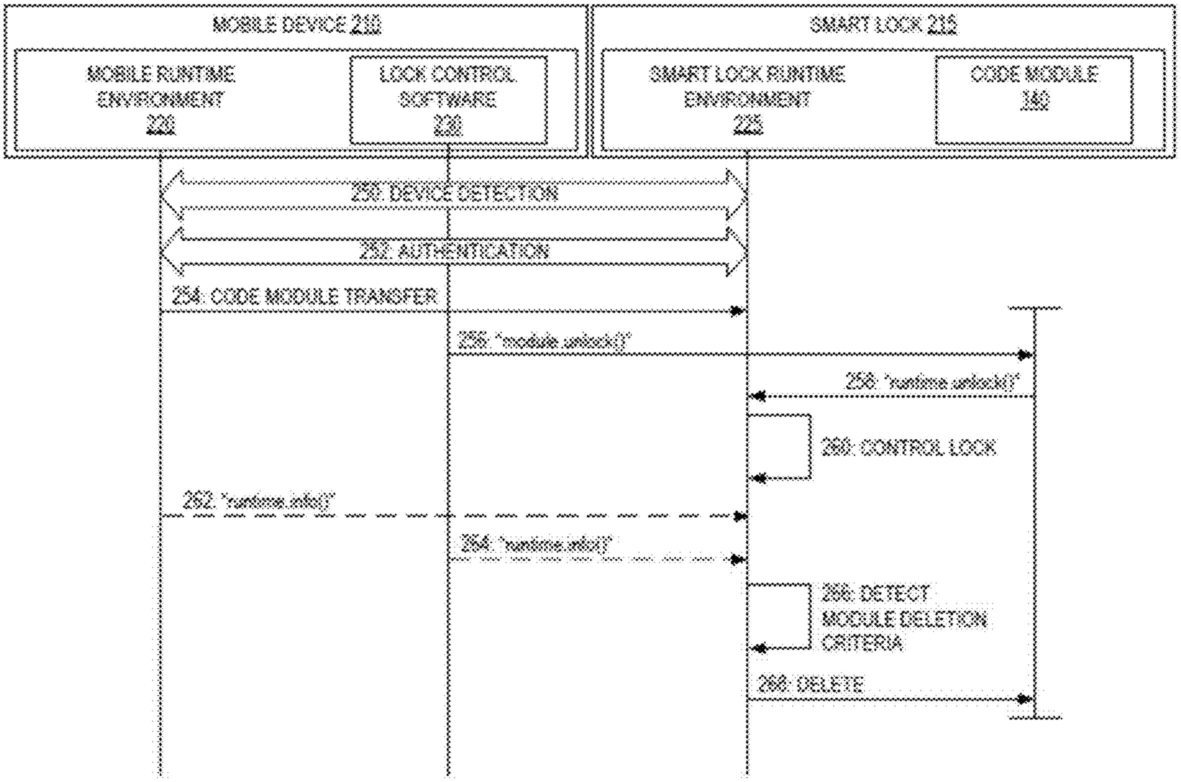

FIG. 175 is a call flow diagram illustrating example signaling between entities according to one or more embodiments.

Figure 176:
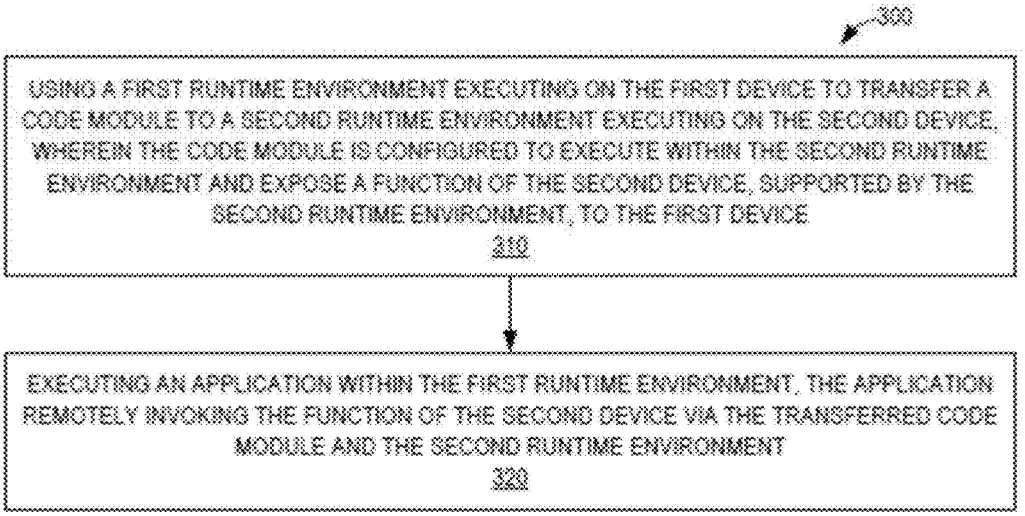

FIG. 176 is a flow diagram illustrating an example method implemented by a first device according to one or more embodiments.

Figure 177:
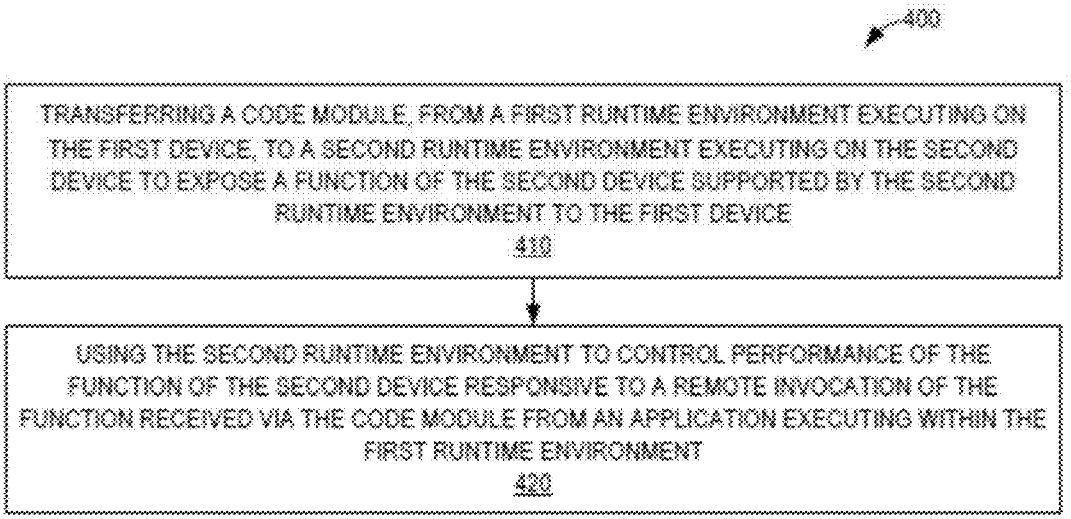

FIG. 177 is a flow diagram illustrating an example method implemented by a second device according to one or more embodiments.

Figure 178:
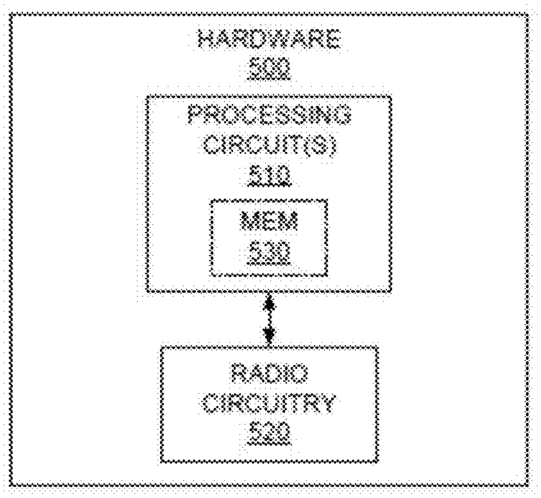

FIG. 178 is a block diagram illustrating example hardware according to one or more embodiments.

Figure 179:
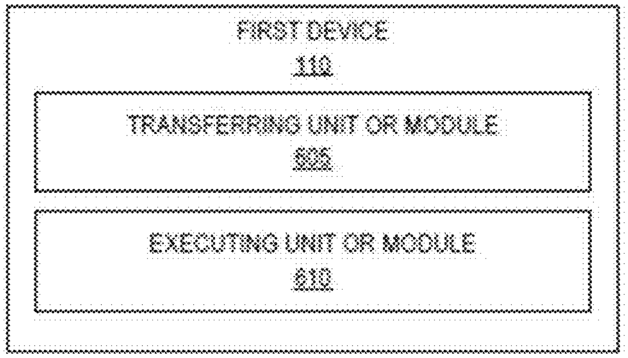

FIG. 179 is a block diagram illustrating an example first device according to one or more embodiments.

Figure 180:
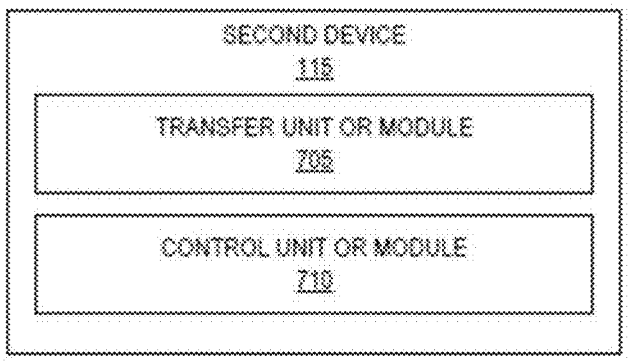

FIG. 180 is a block diagram illustrating an example second device according to one or more embodiments.

Figure 181:
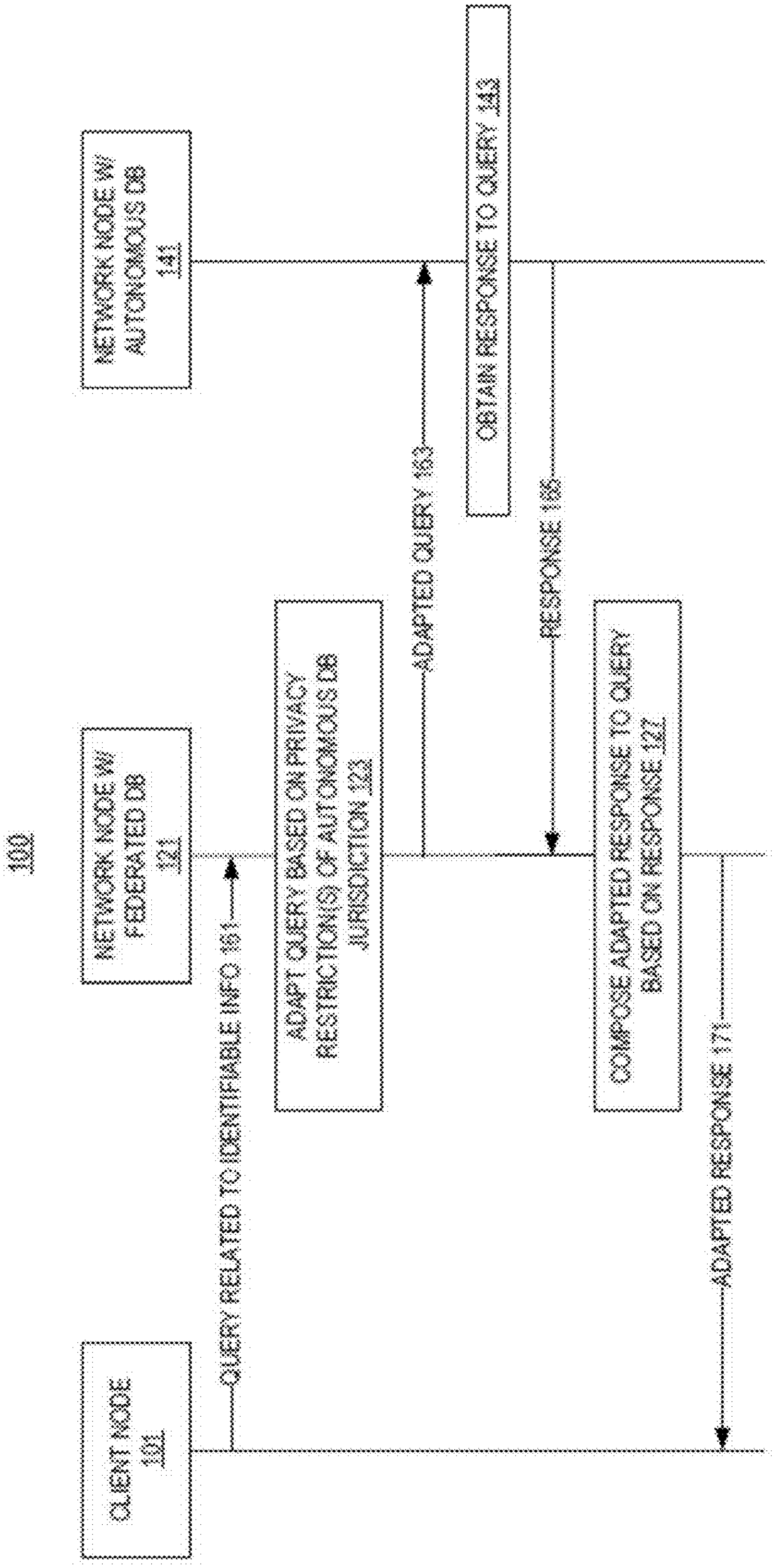

FIG. 181 illustrates a flow diagram of one embodiment of a system for querying a federated database in accordance with various aspects as described herein.

Figure 182:
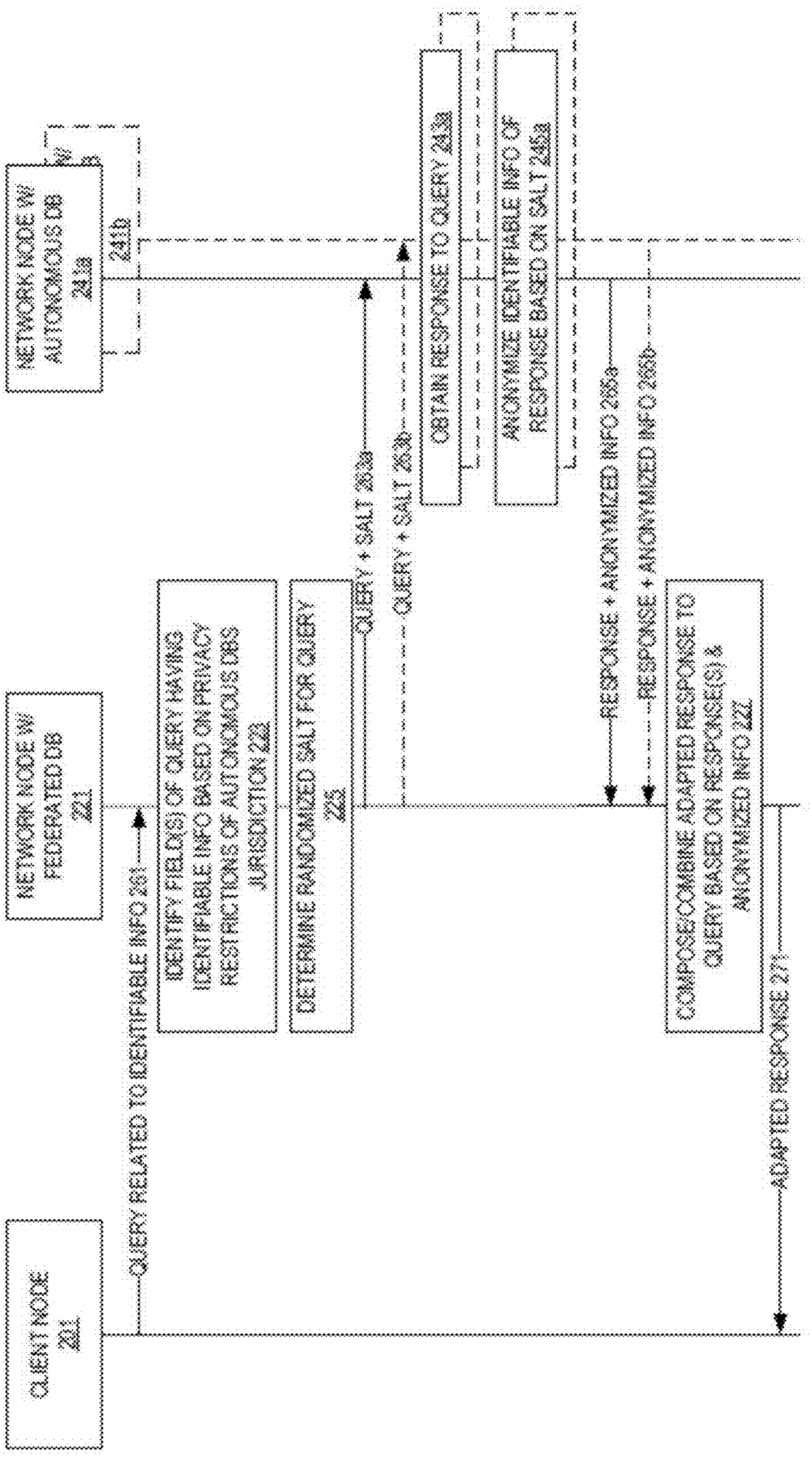

FIG. 182 illustrates a flow diagram of another embodiment of a system for querying a federated database in accordance with various aspects as described herein.

Figure 183:
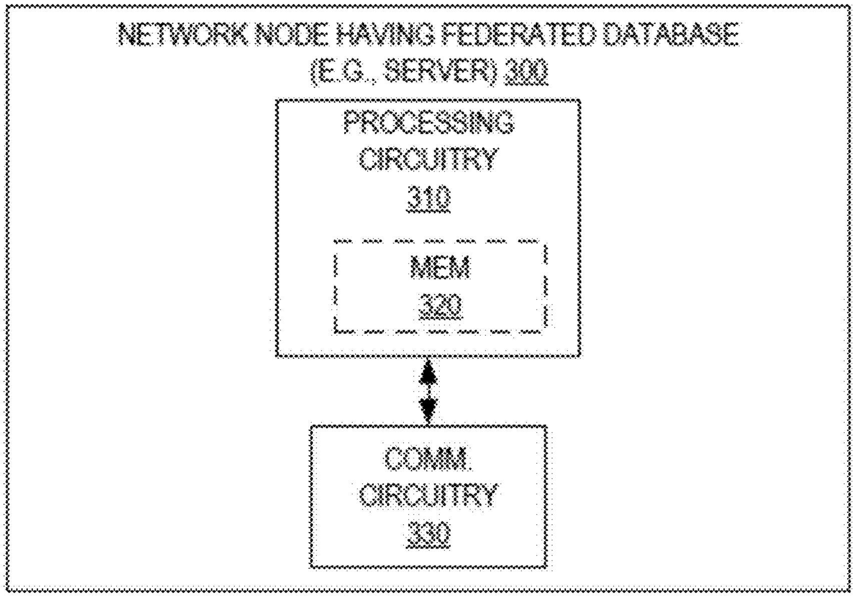

FIG. 183 illustrates one embodiment of a network node having a federated database in accordance with various aspects as described herein.

Figure 184:
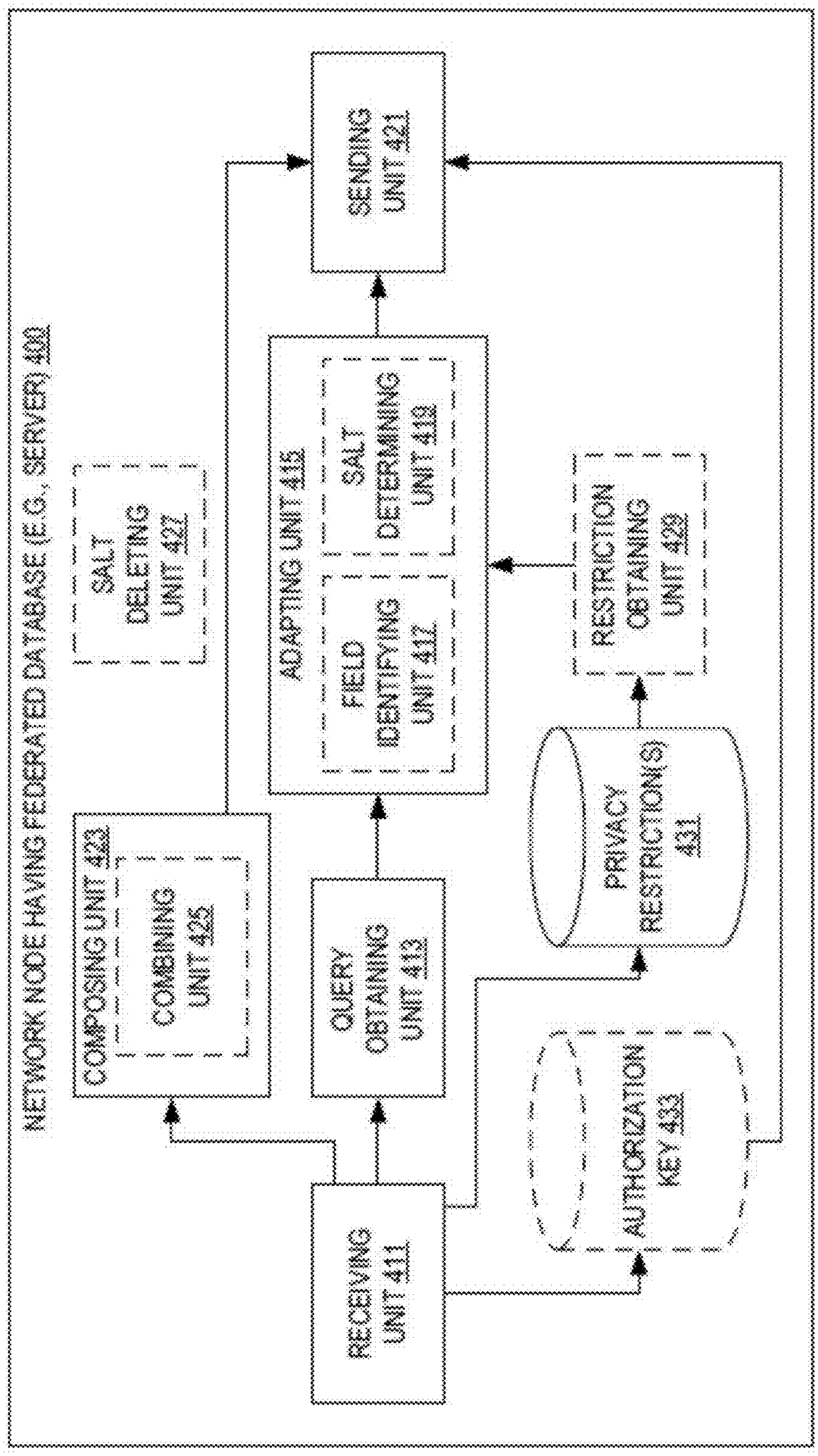

FIG. 184 illustrates another embodiment of a network node having a federated database in accordance with various aspects as described herein.

Figure 185:
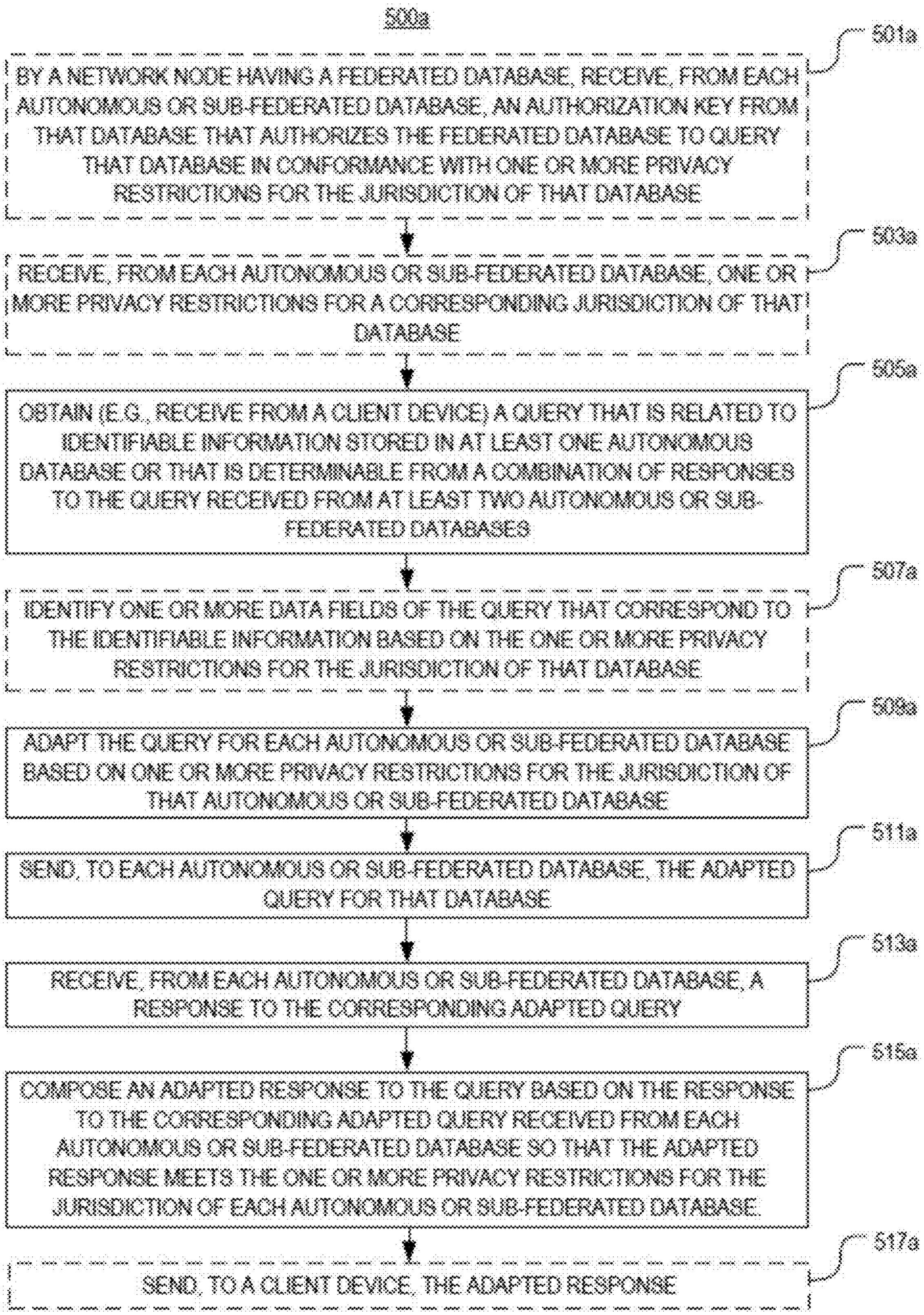
Figure 186:
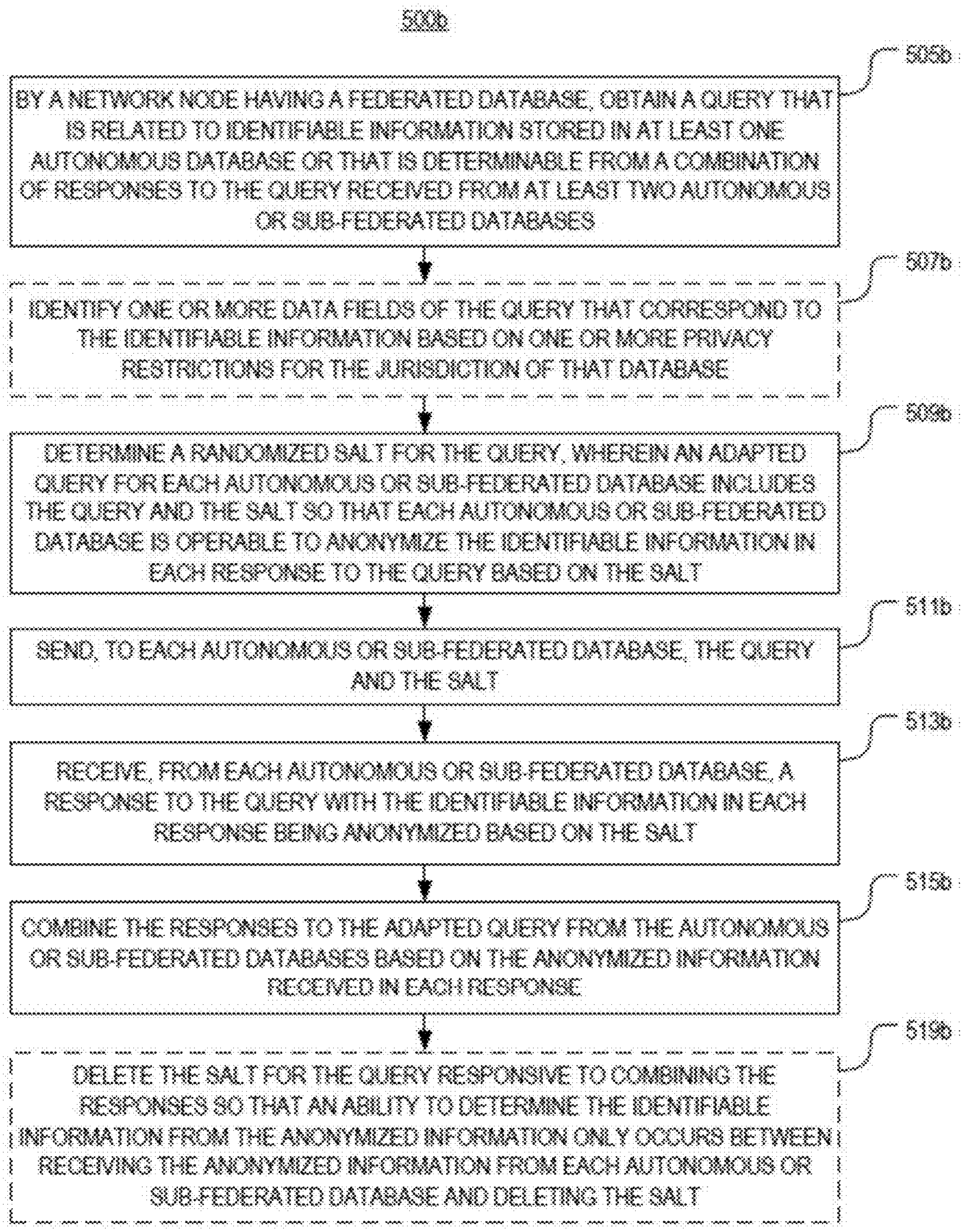

FIG. 185 and FIG. 186 illustrate one embodiment of a method performed by a network node having a federated database representing one or more autonomous or sub-federated databases that are located in a same or different jurisdiction in accordance with various aspects as described herein.

Figure 187:
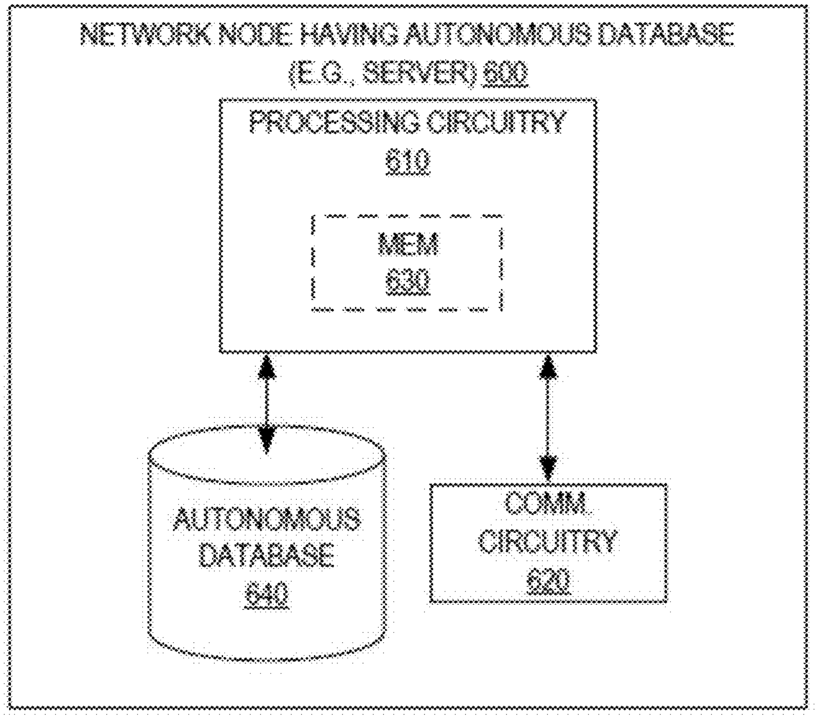

FIG. 187 illustrates one embodiment of a network node having an autonomous database in accordance with various aspects as described herein.

Figure 188:
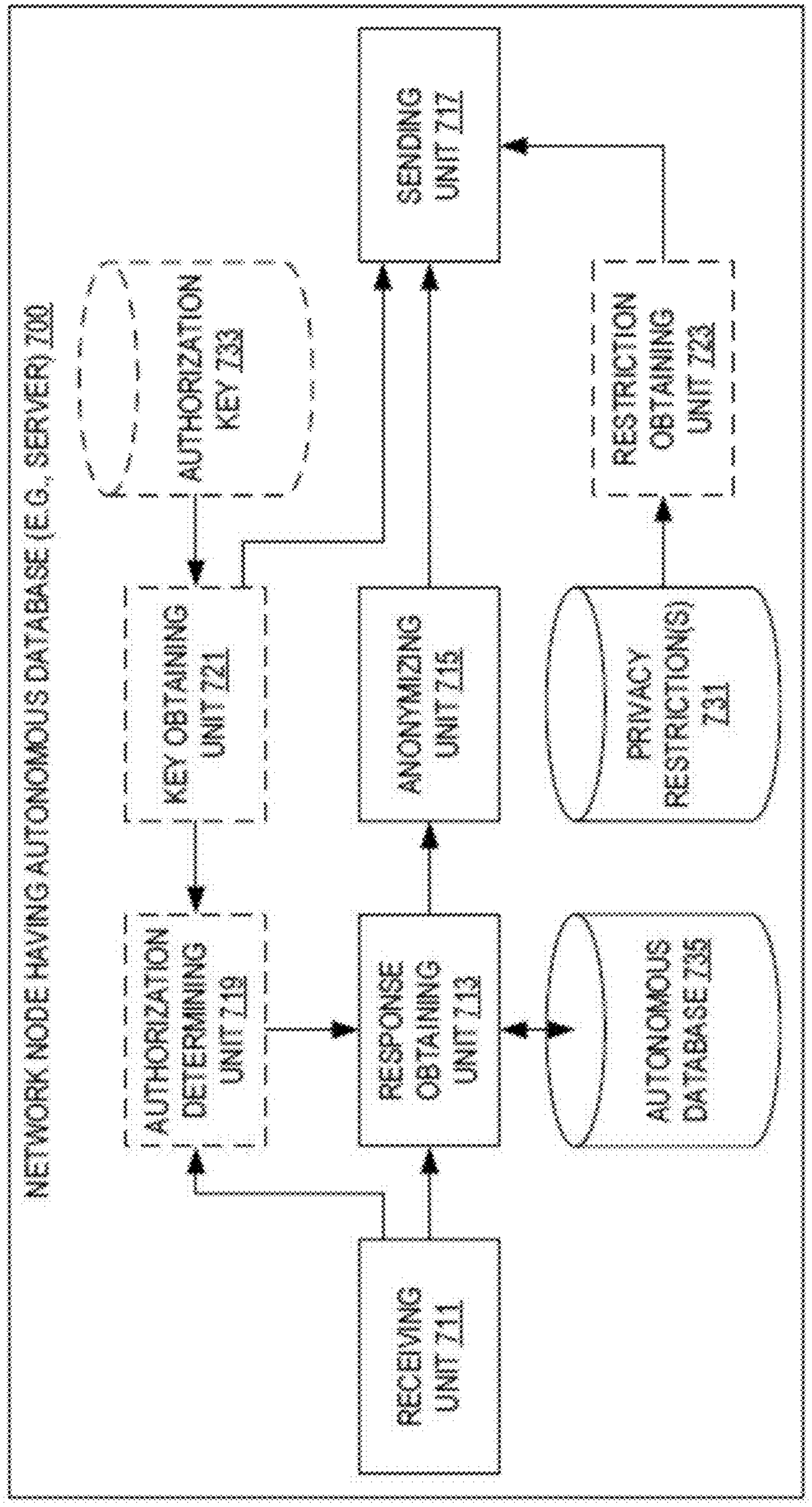

FIG. 188 illustrates another embodiment of a network node having an autonomous database in accordance with various aspects as described herein.

Figure 189:
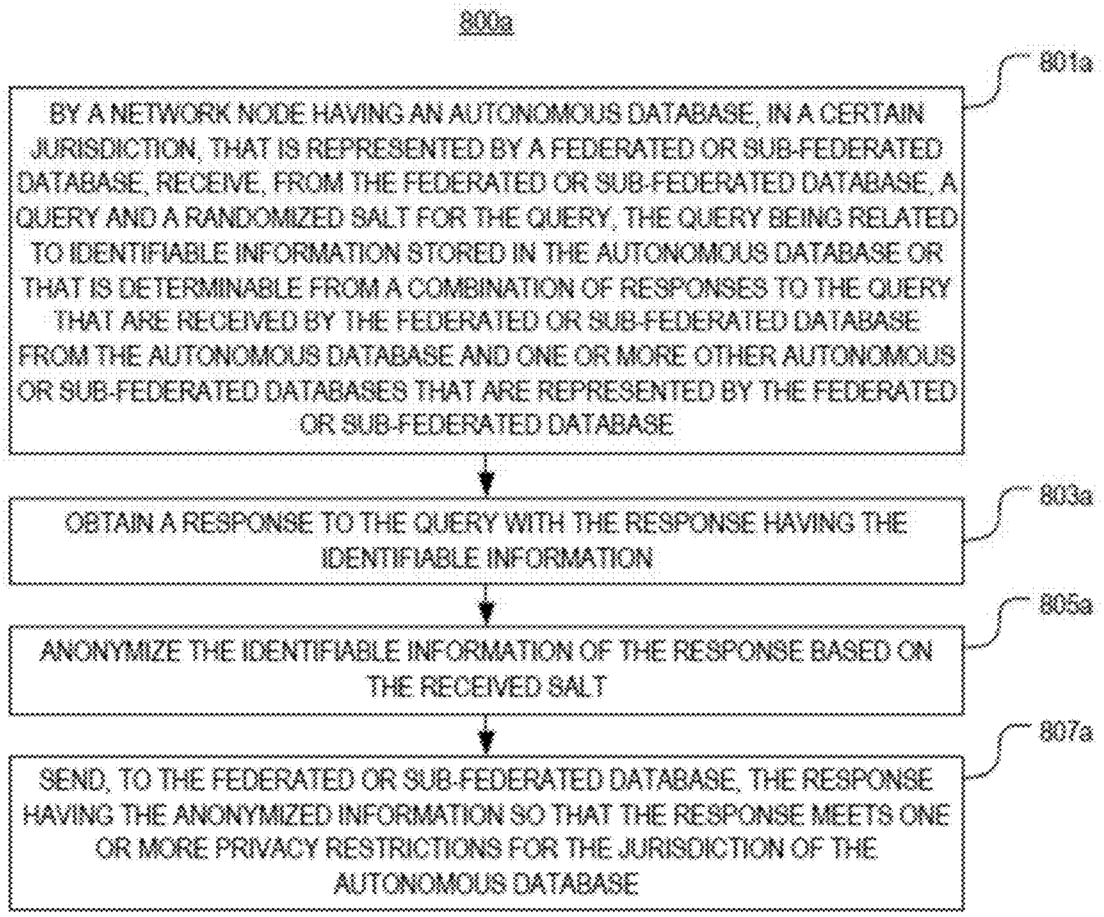
Figure 190:
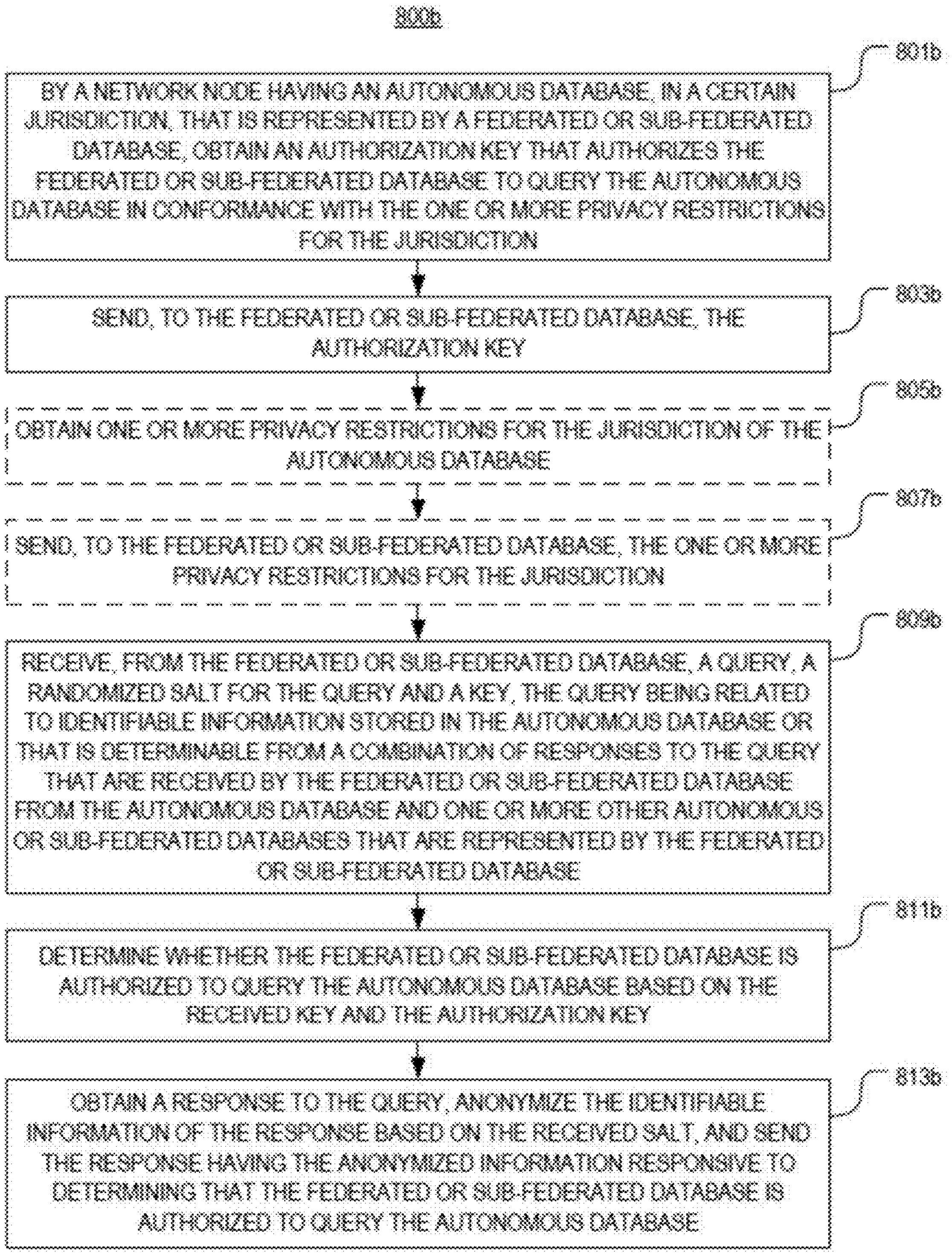

FIGS. 189 and 190 illustrate embodiments of a method performed by a network node having an autonomous database, in a certain jurisdiction, that is represented by a federated or sub-federated database in accordance with various aspects as described herein.

Figure 191:
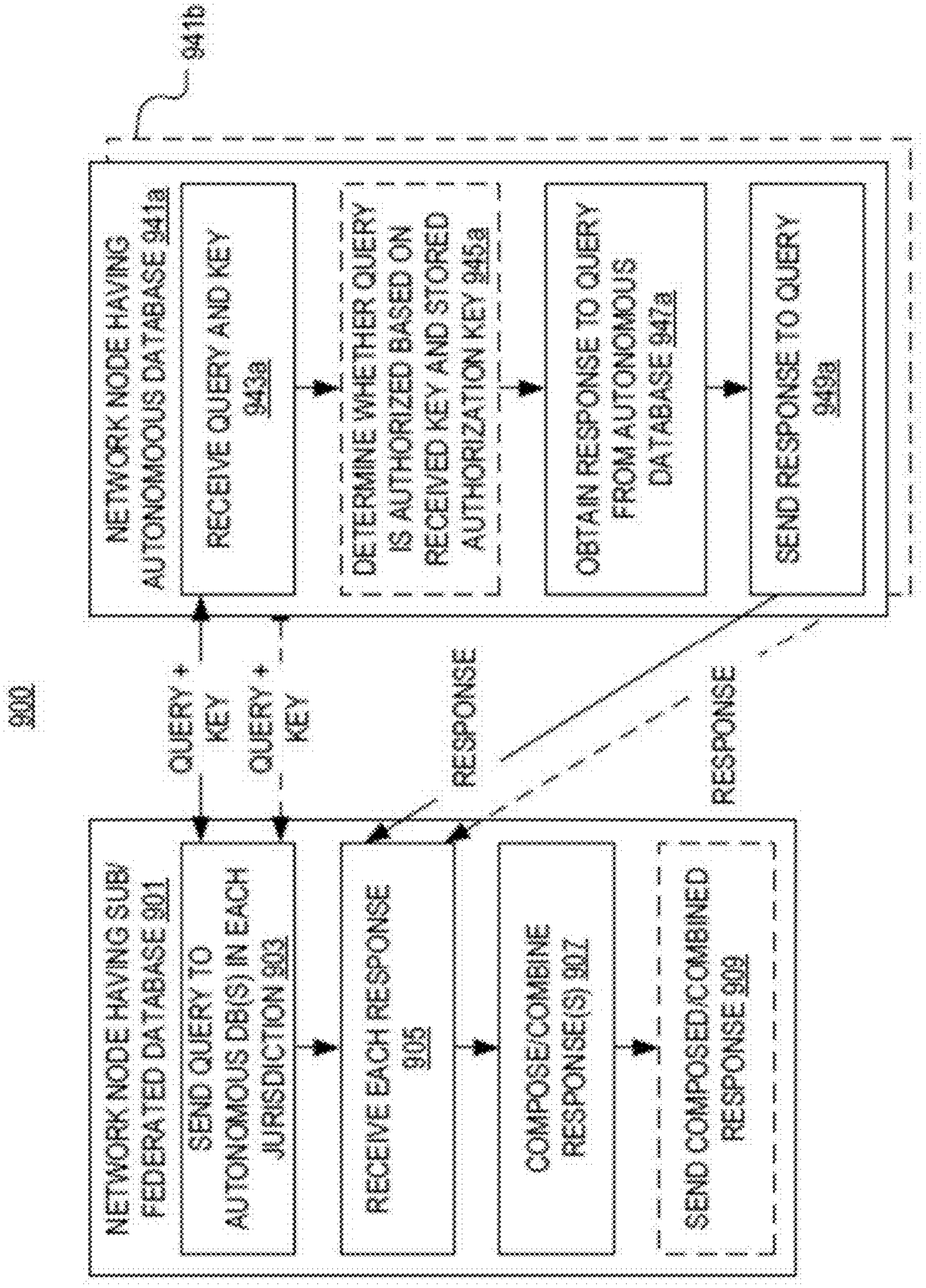

FIG. 191 illustrates another embodiment of a system for querying a federated database in accordance with various aspects as described herein.

Figure 192:
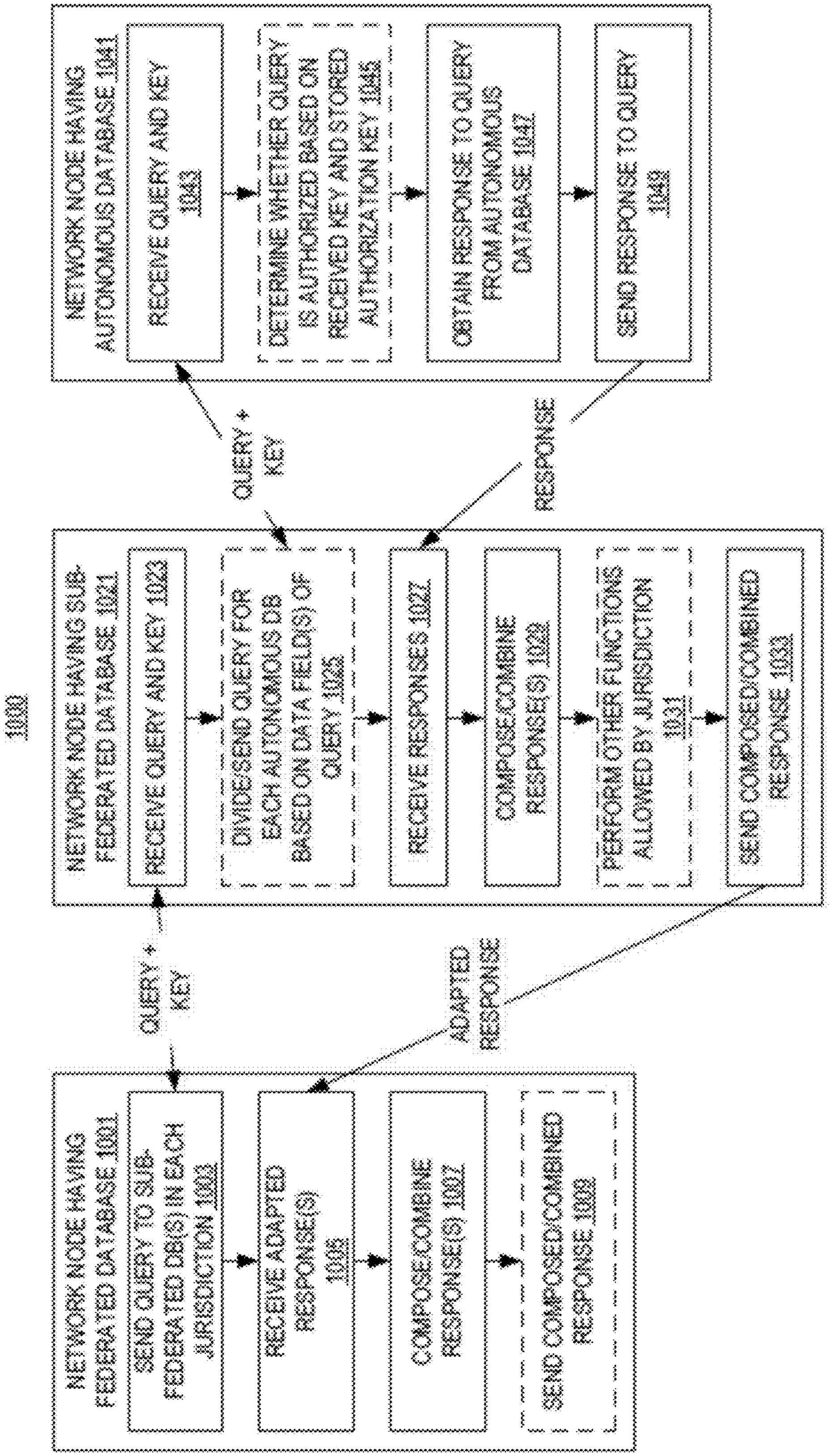

FIG. 192 illustrates another embodiment of a system for querying a federated database in accordance with various aspects as described herein.

Figure 193:
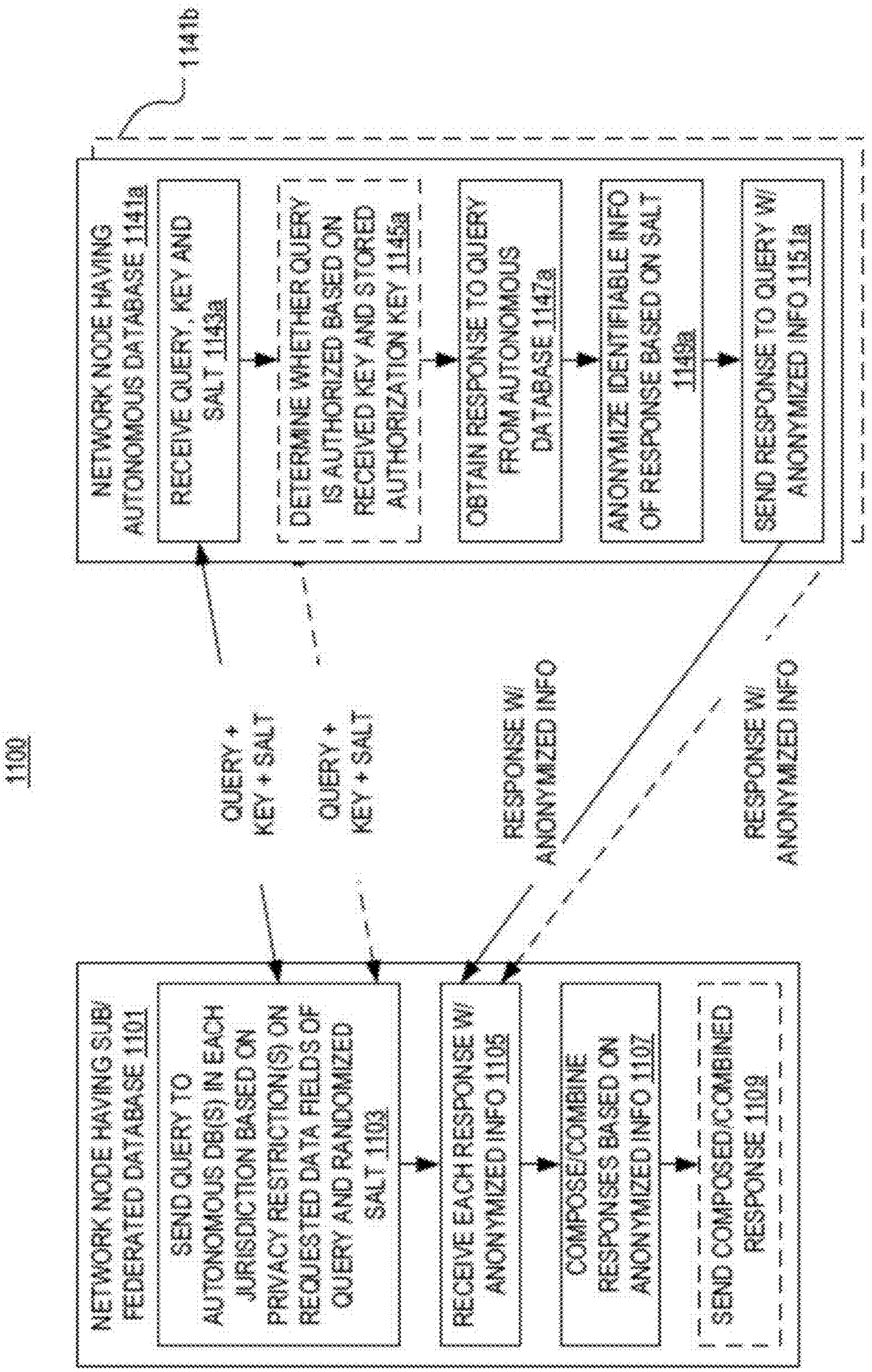

FIG. 193 illustrates another embodiment of a system for querying a federated database in accordance with various aspects as described herein.

Figure 194:
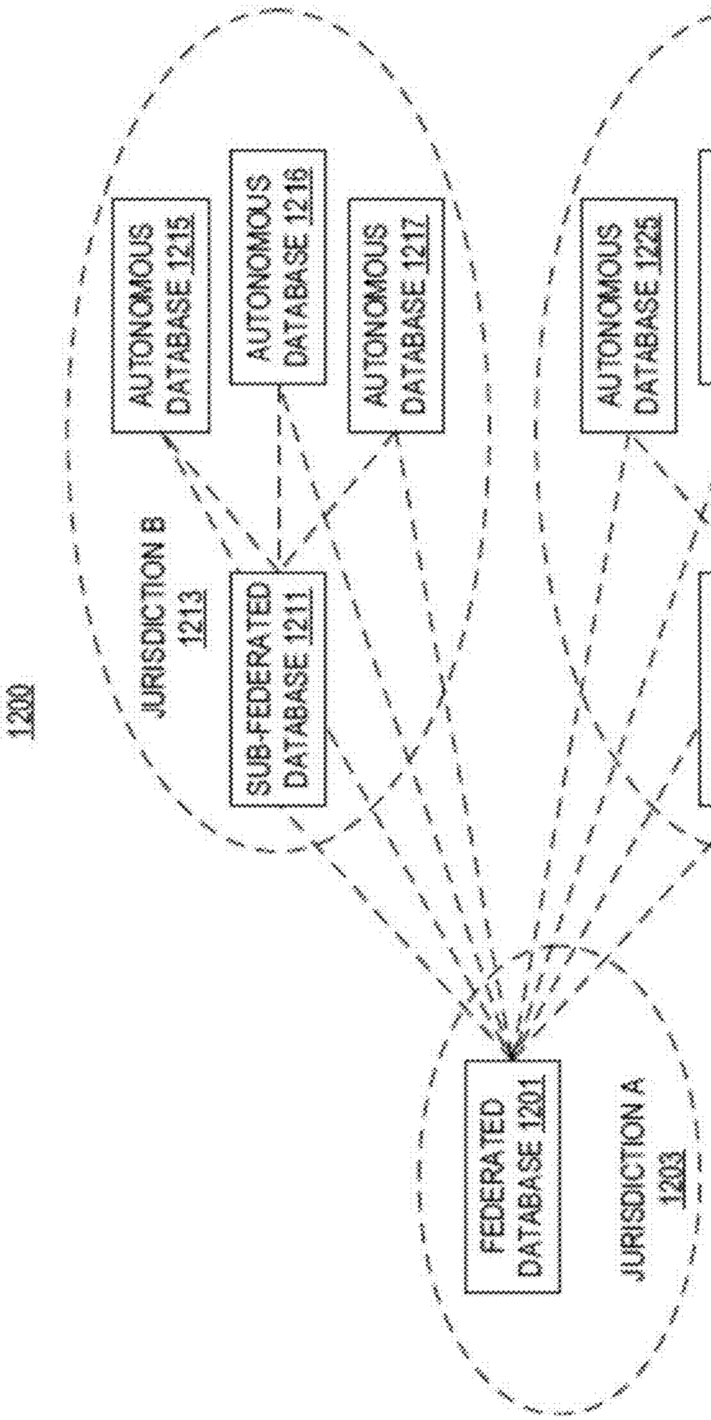

FIG. 194 illustrates another embodiment of a system for querying a federated database in accordance with various aspects as described herein.

Figure 195:
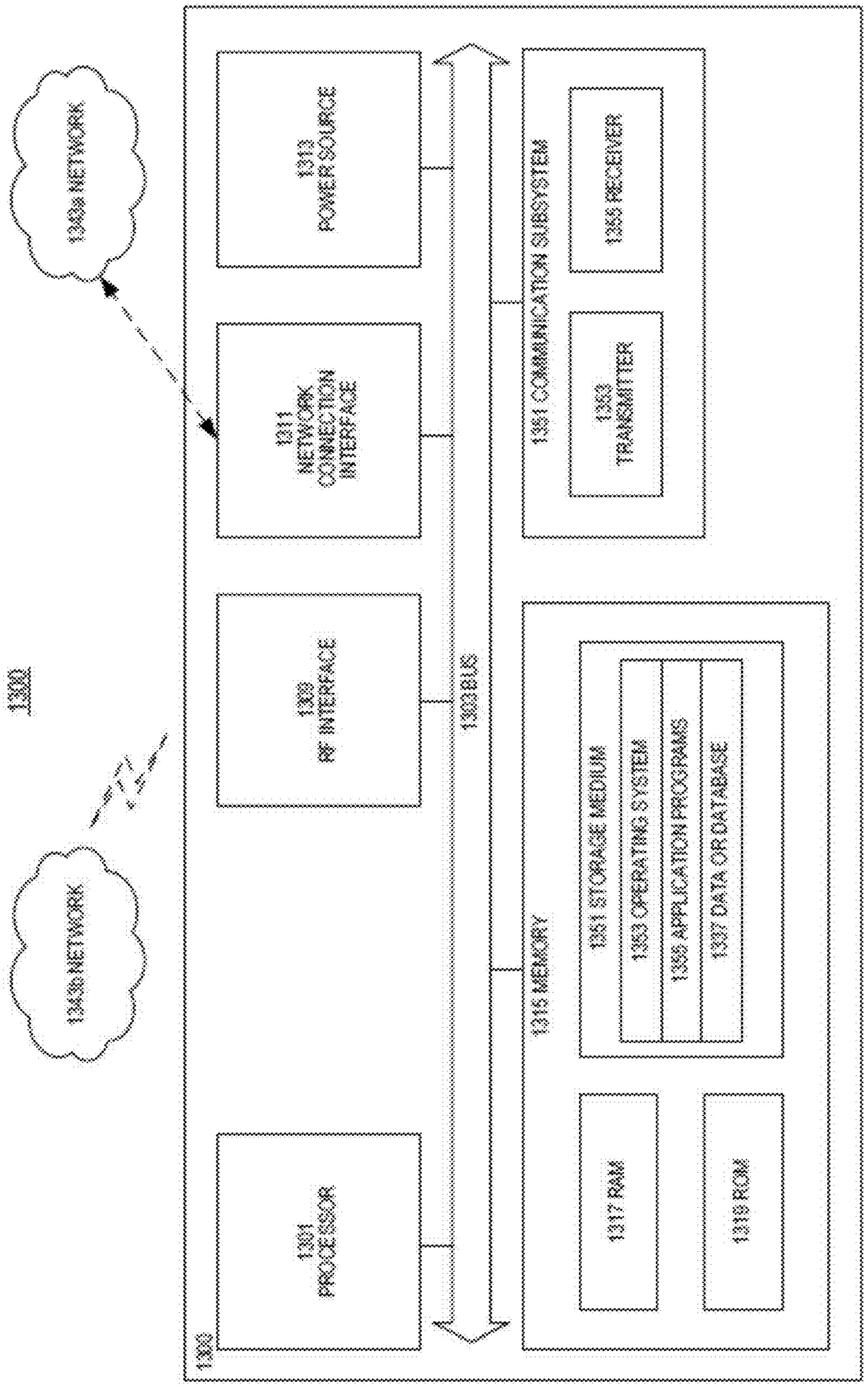

FIG. 195 illustrates one embodiment of a network node in accordance with various aspects as described herein.

Figure 196:
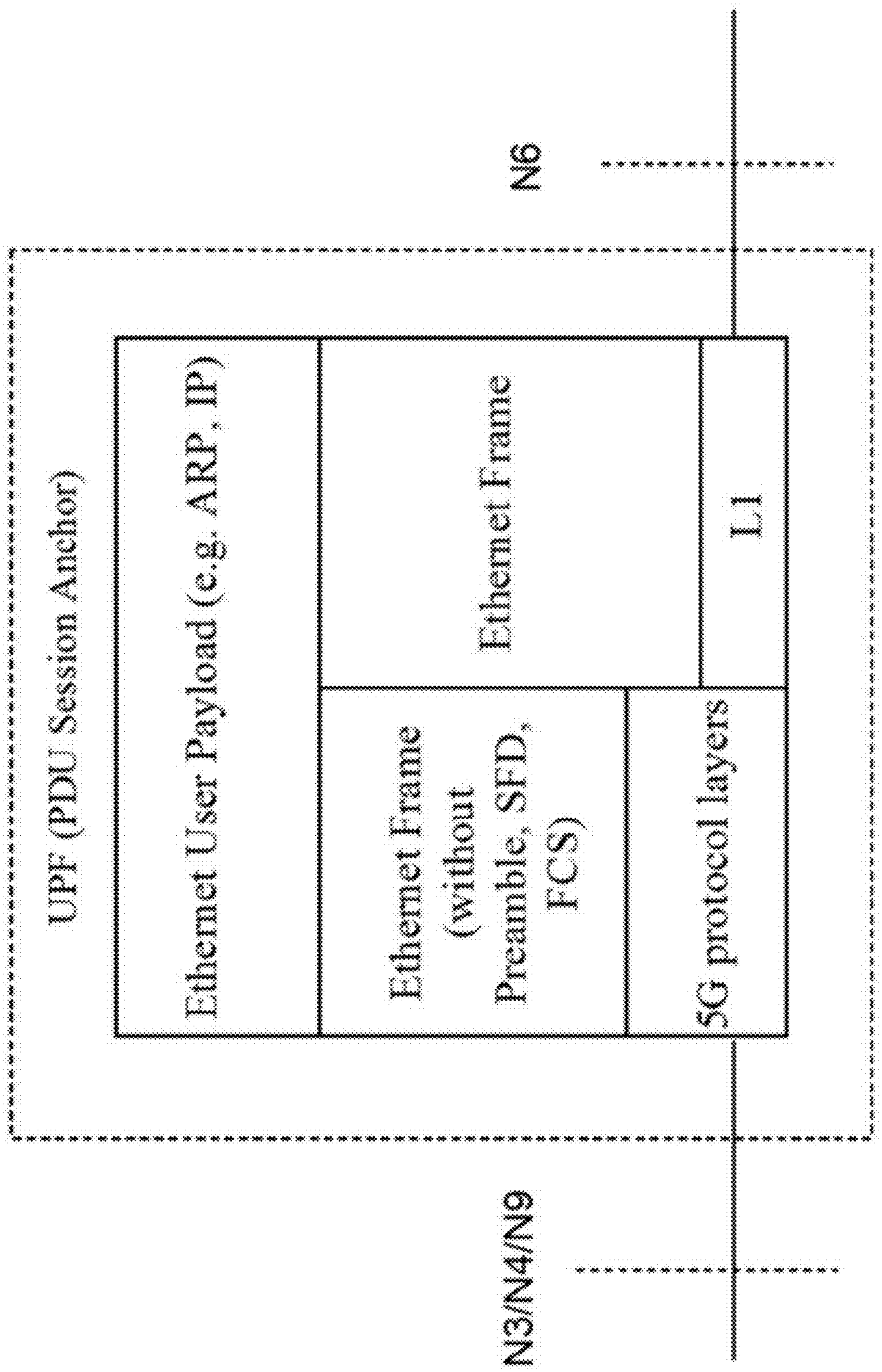

FIG. 196 is a schematic block diagram illustrating Ethernet frame handling at UPF from 3GPP TS 29.561.

Figure 197:
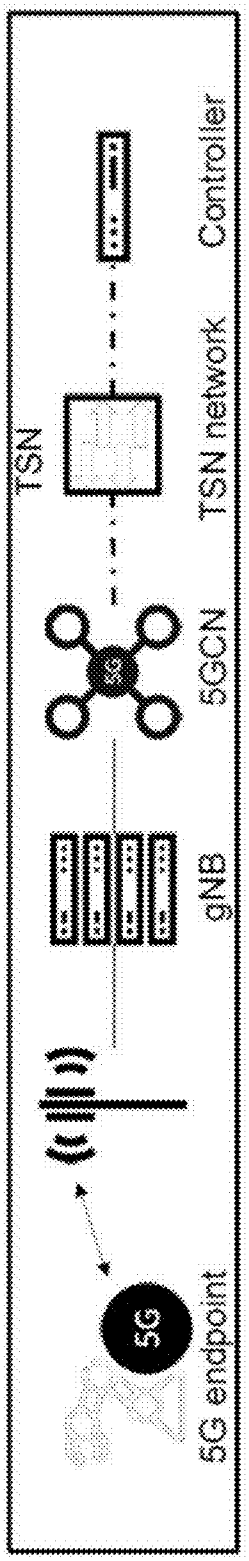

FIG. 197 is a schematic block diagram illustrating 5G-TSN interworking in an industrial setup.

Figure 198:
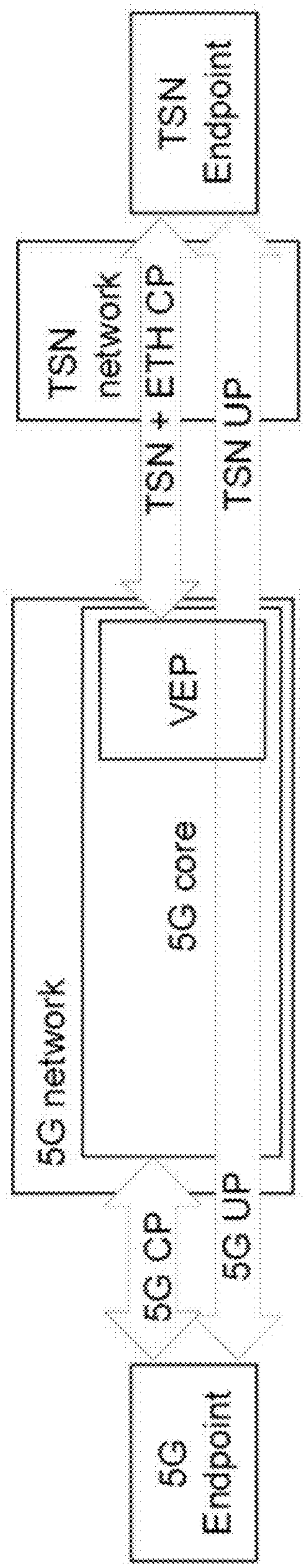

FIG. 198 is a schematic block diagram illustrating TSN control and data plane with virtual endpoint.

Figure 199:
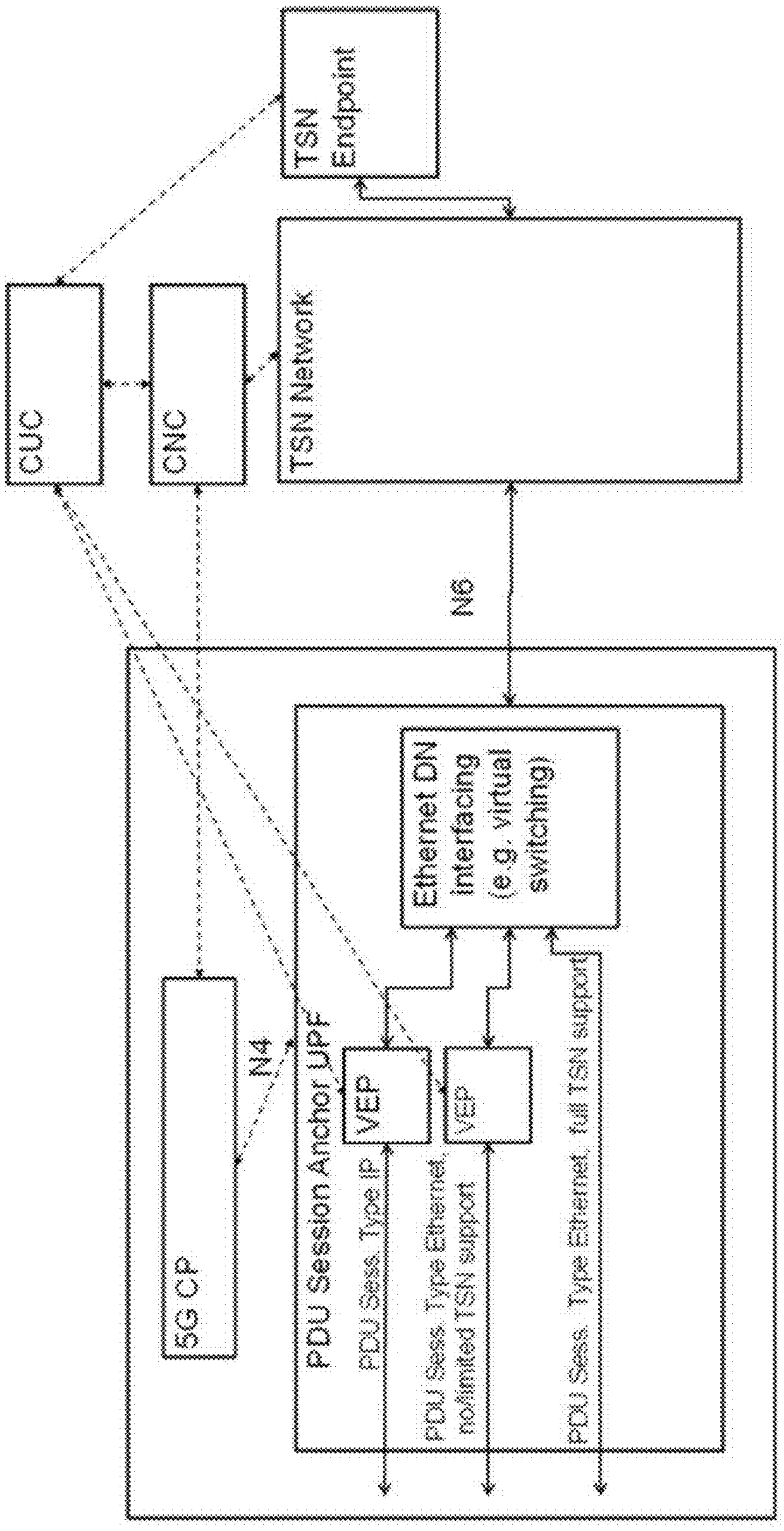

FIG. 199 is a schematic block diagram illustrating VEP deployments as part of the UPF for different PDU session types.

Figure 200:
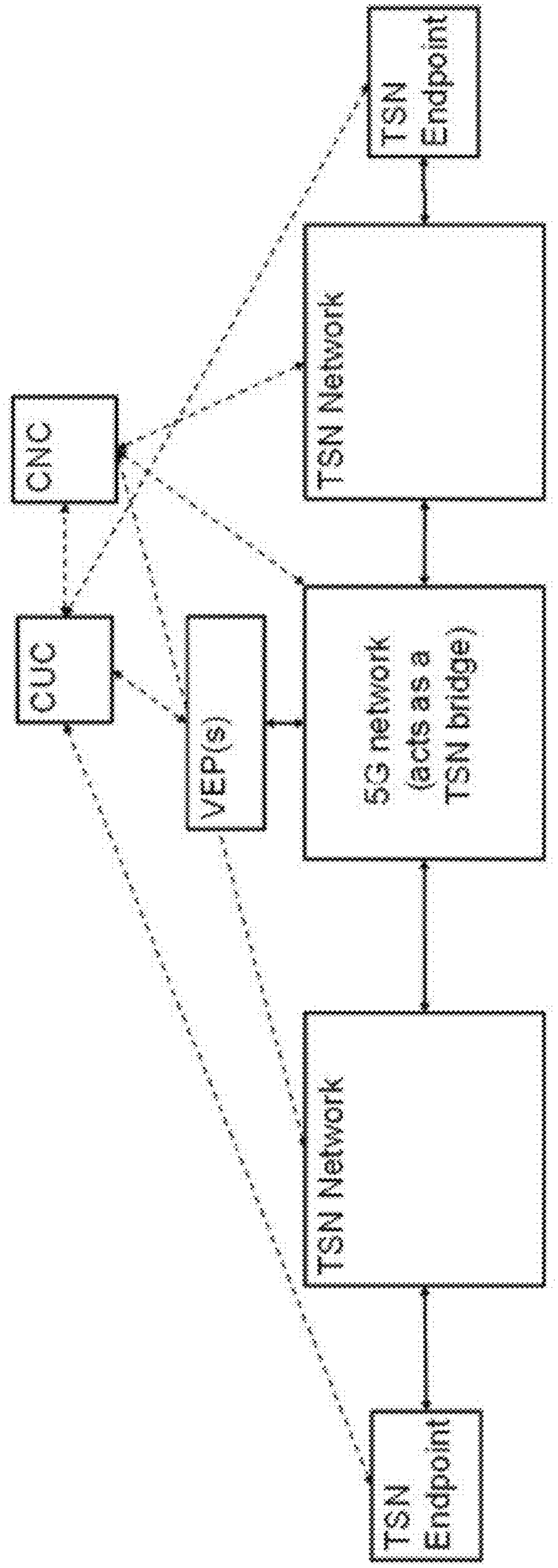

FIG. 200 is a schematic block diagram illustrating VEP(s) as seen by the external TSN network configuration.

Figure 201:
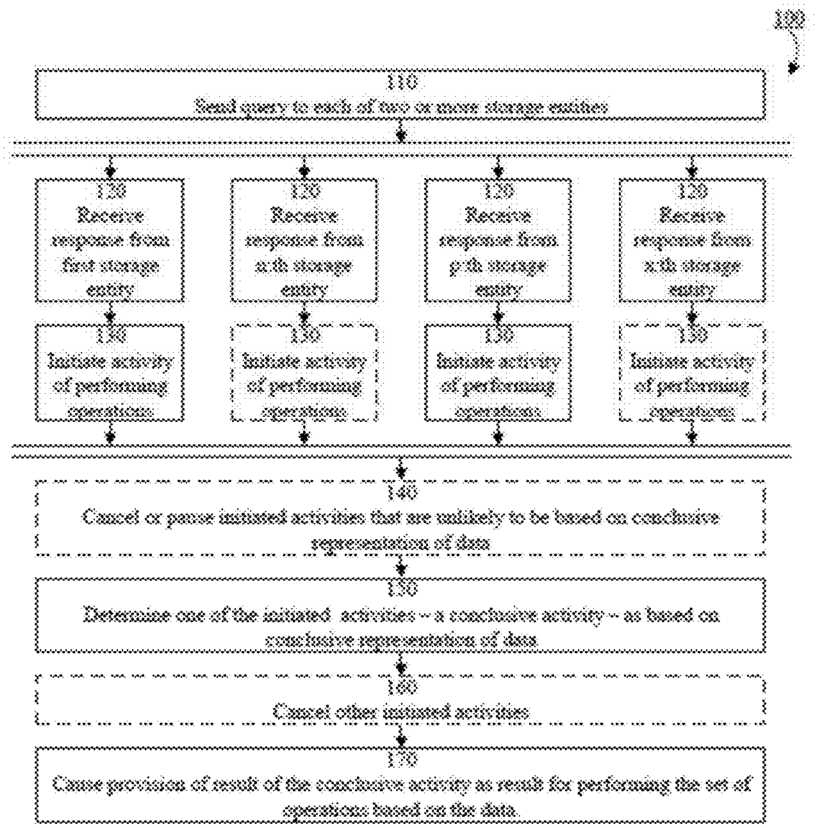

FIG. 201 is a flowchart illustrating example method steps according to some embodiments.

Figure 202:
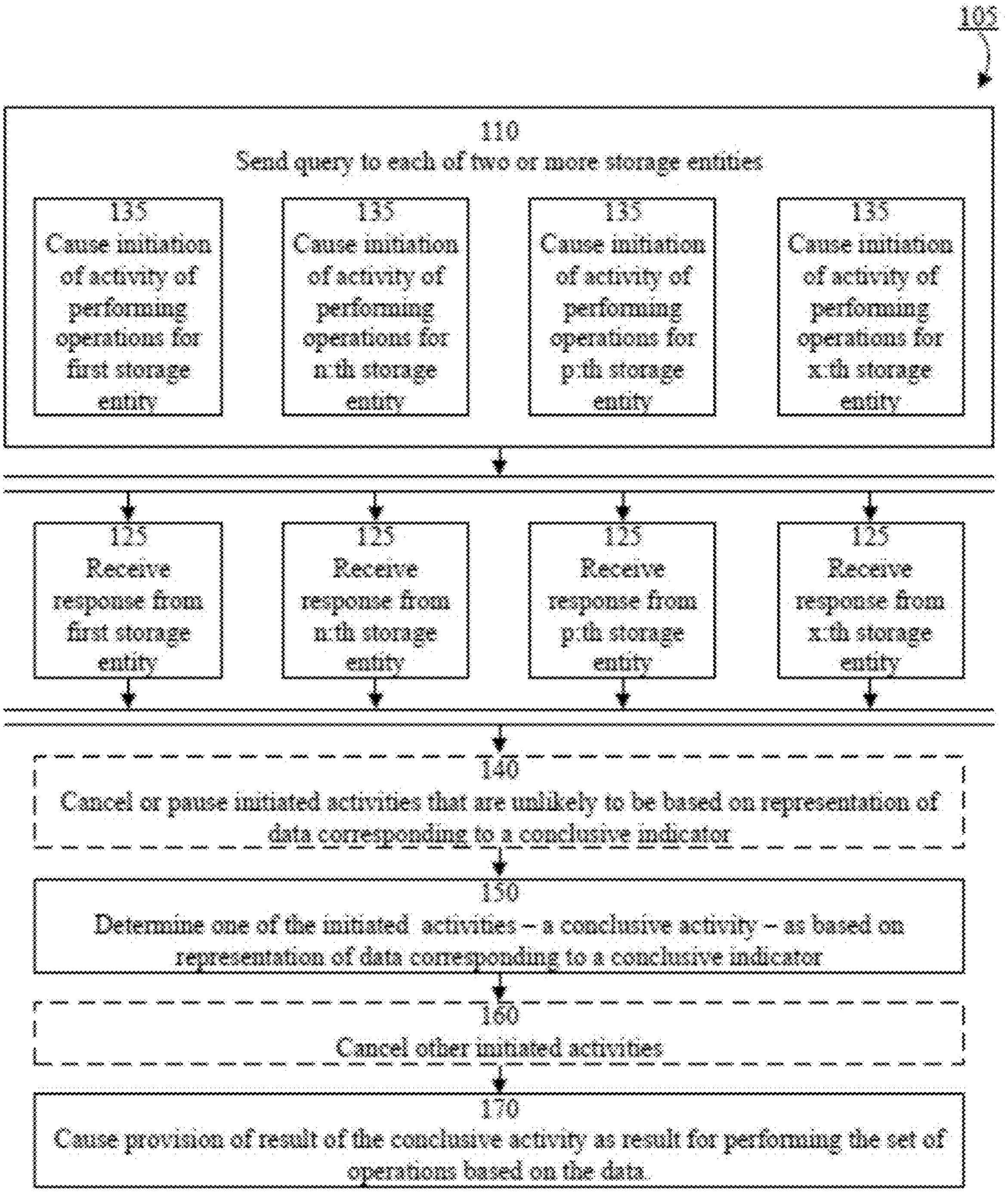

FIG. 202 is a flowchart illustrating example method steps according to some embodiments.

Figure 203:
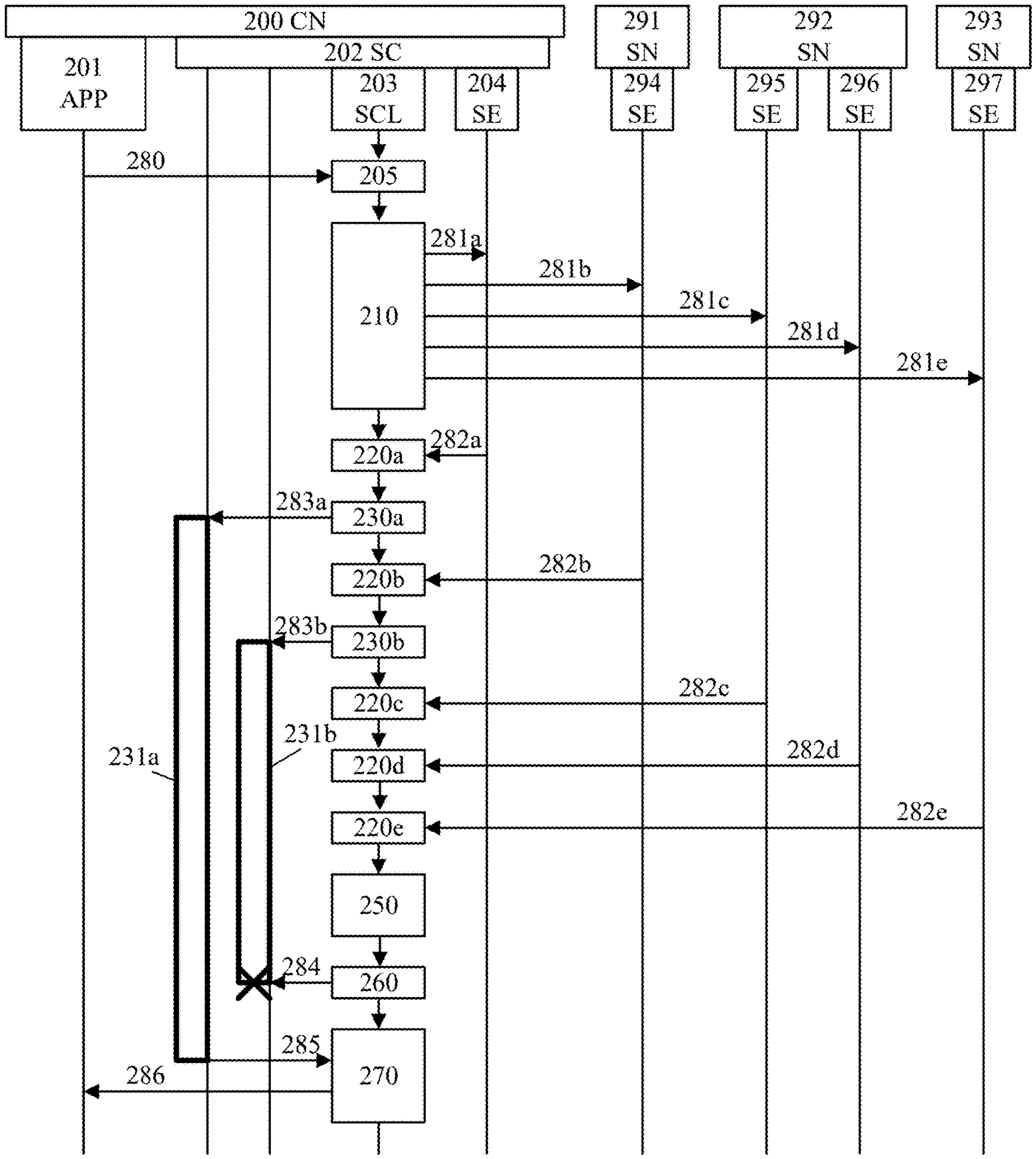

FIG. 203 is a combined flowchart and signaling diagram illustrating example method steps and signaling according to some embodiments.

Figure 204:
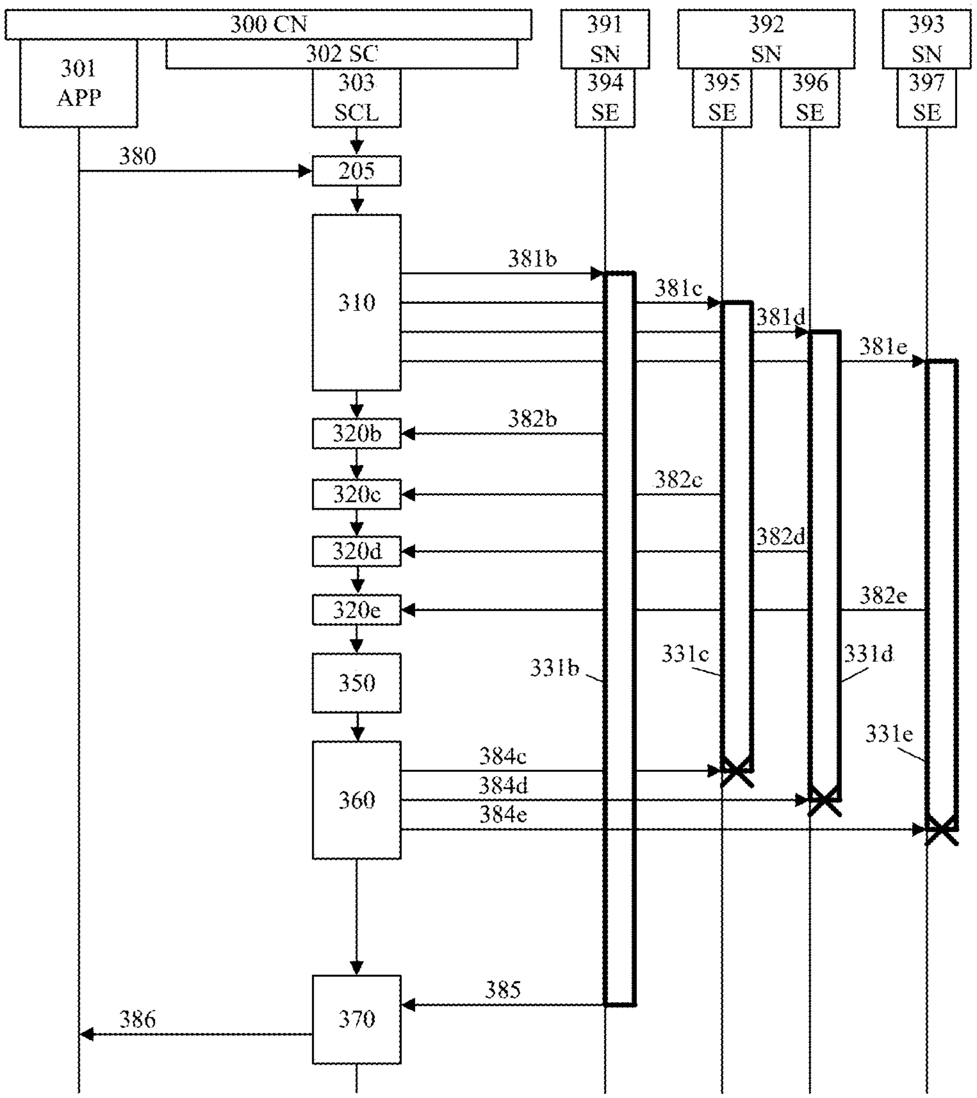

FIG. 204 is a combined flowchart and signaling diagram illustrating example method steps and signaling according to some embodiments.

Figure 205:
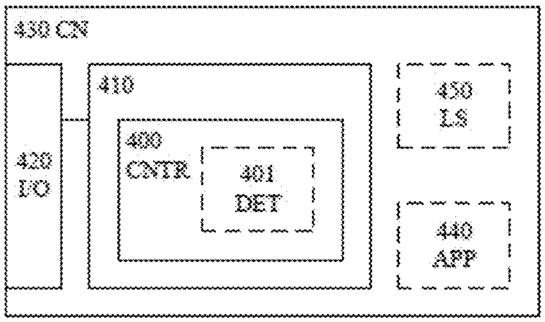

FIG. 205 is a schematic block diagram illustrating an example apparatus according to some embodiments.

Figure 206:
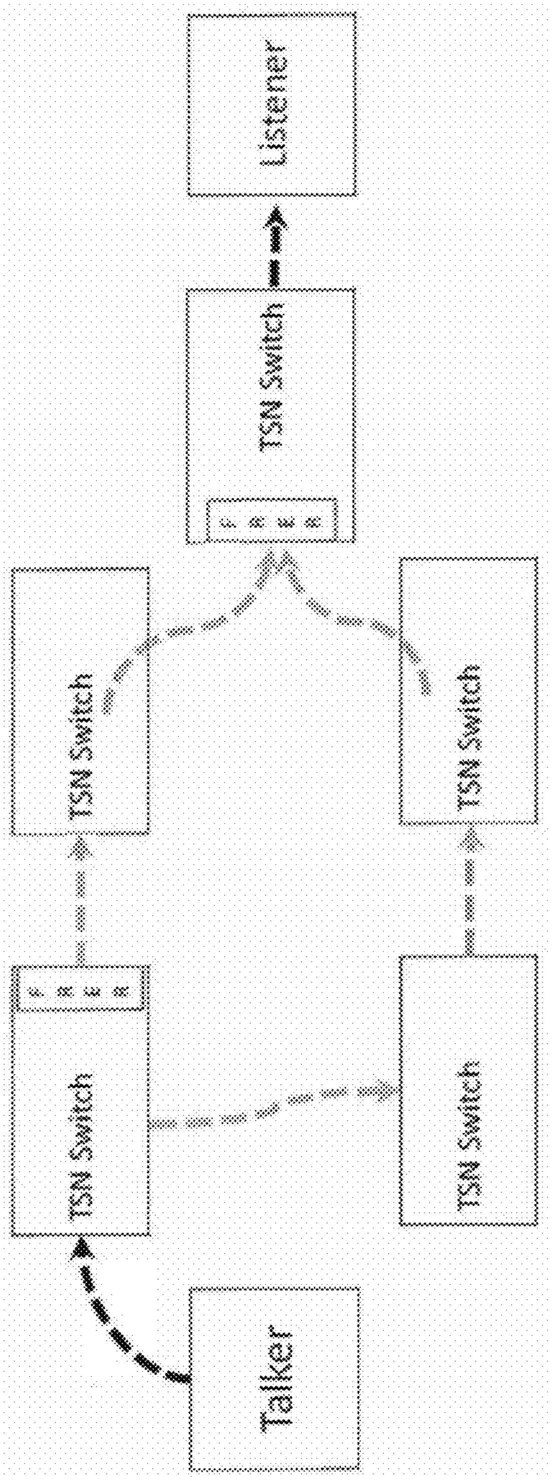

FIG. 206 shows transmission of TSN data streams using redundant paths.

Figure 207:
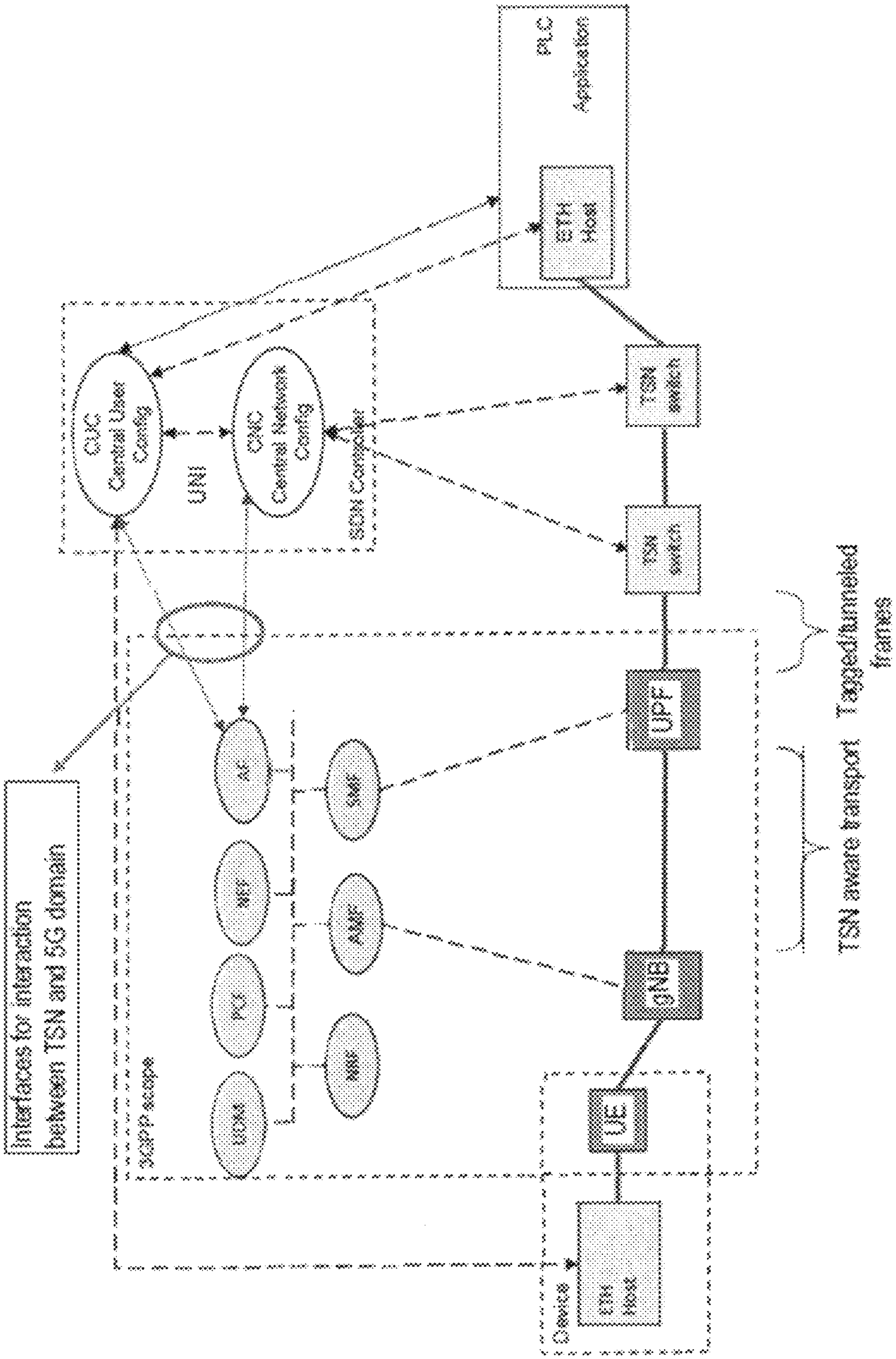

FIG. 207 shows a communication system according to embodiments of the disclosure.

Figure 208:
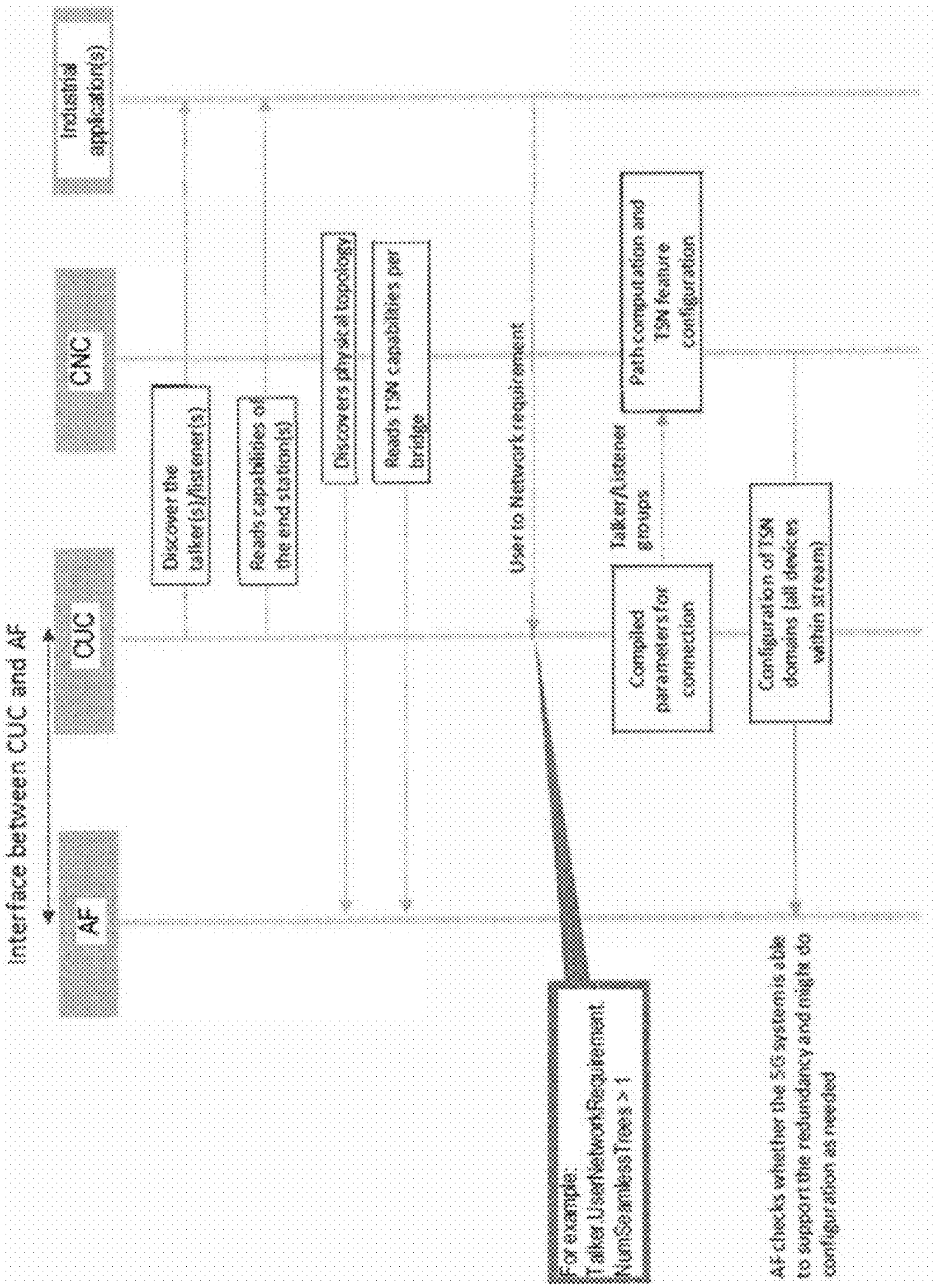

FIG. 208 is a signaling diagram according to embodiments of the disclosure.

Figure 209:
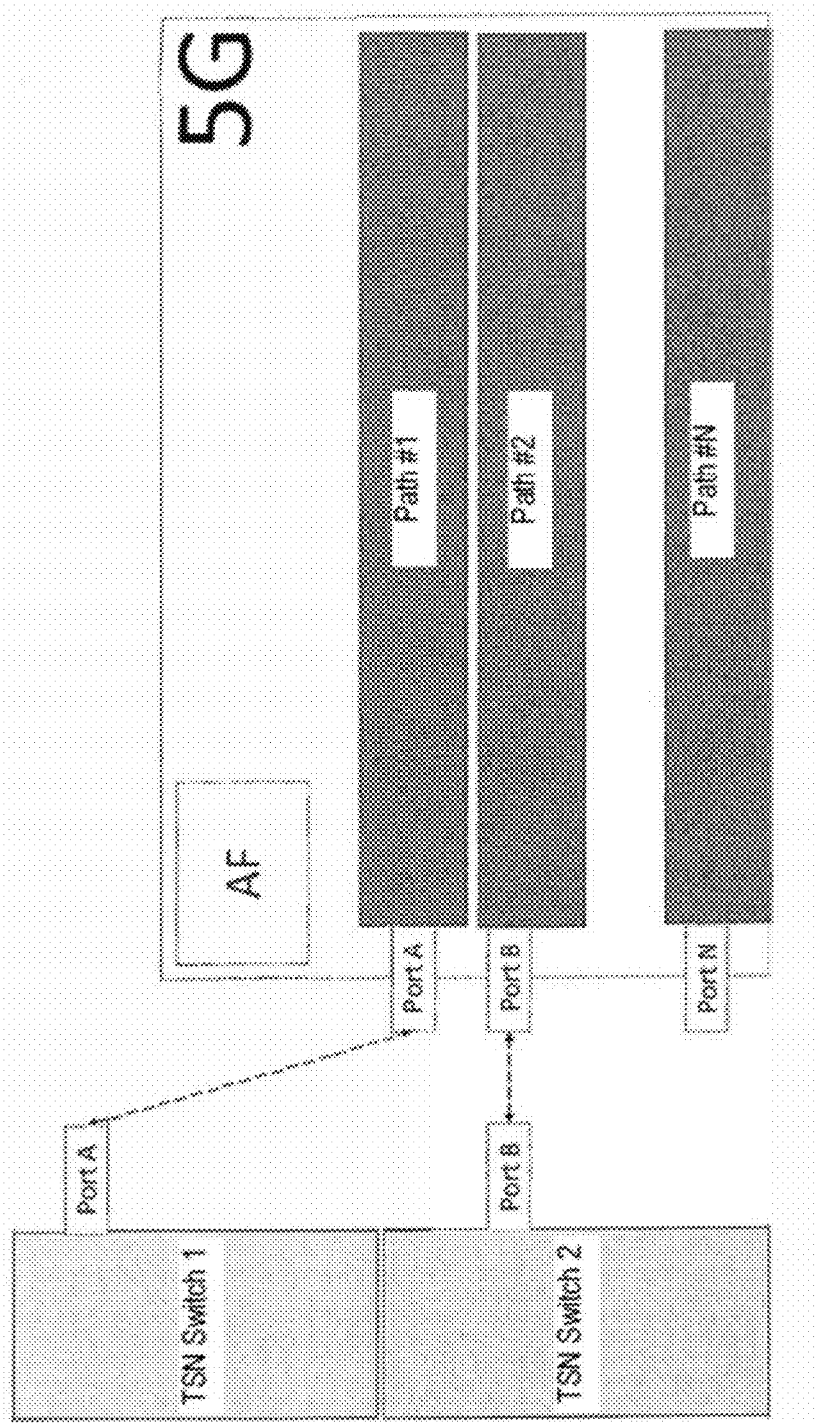

FIG. 209 is a schematic diagram showing redundant paths in a wireless network according to embodiments of the disclosure.

Figure 210:
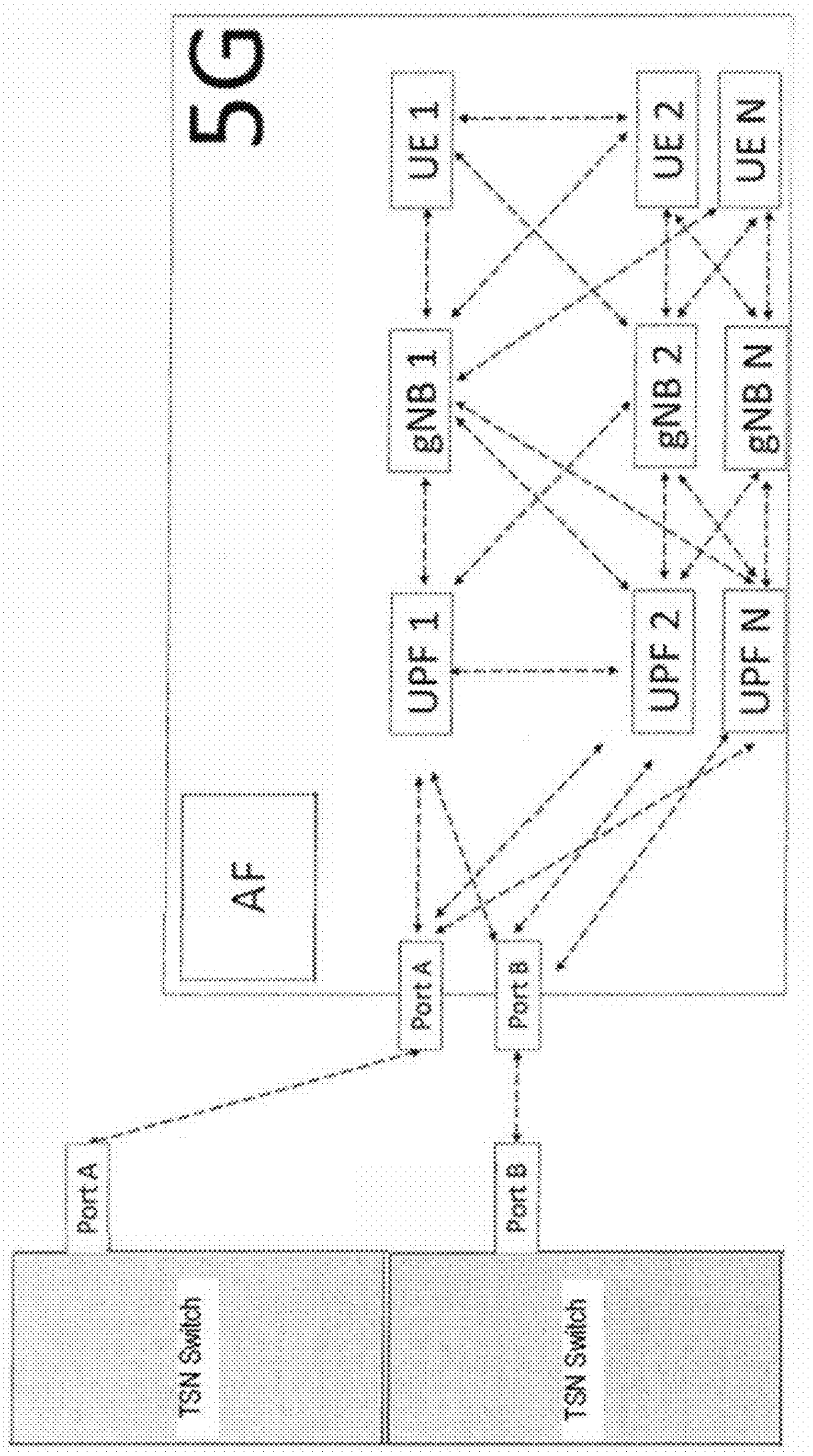

FIG. 210 is a schematic diagram showing redundant paths in a wireless network according to further embodiments of the disclosure.

Figure 211:
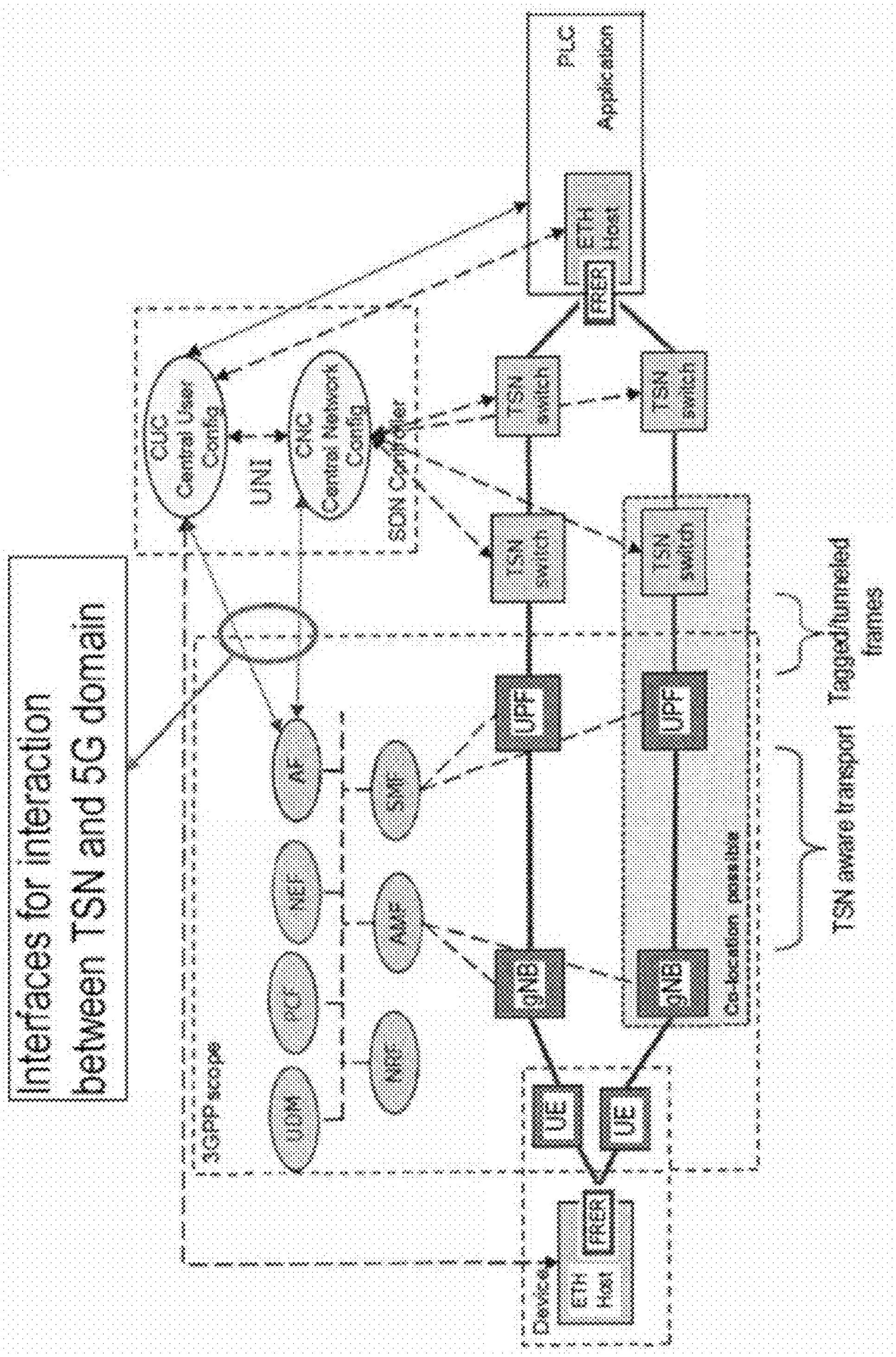

FIG. 211 is a schematic diagram showing redundant paths in a wireless network according to further embodiments of the disclosure.

Figure 212:
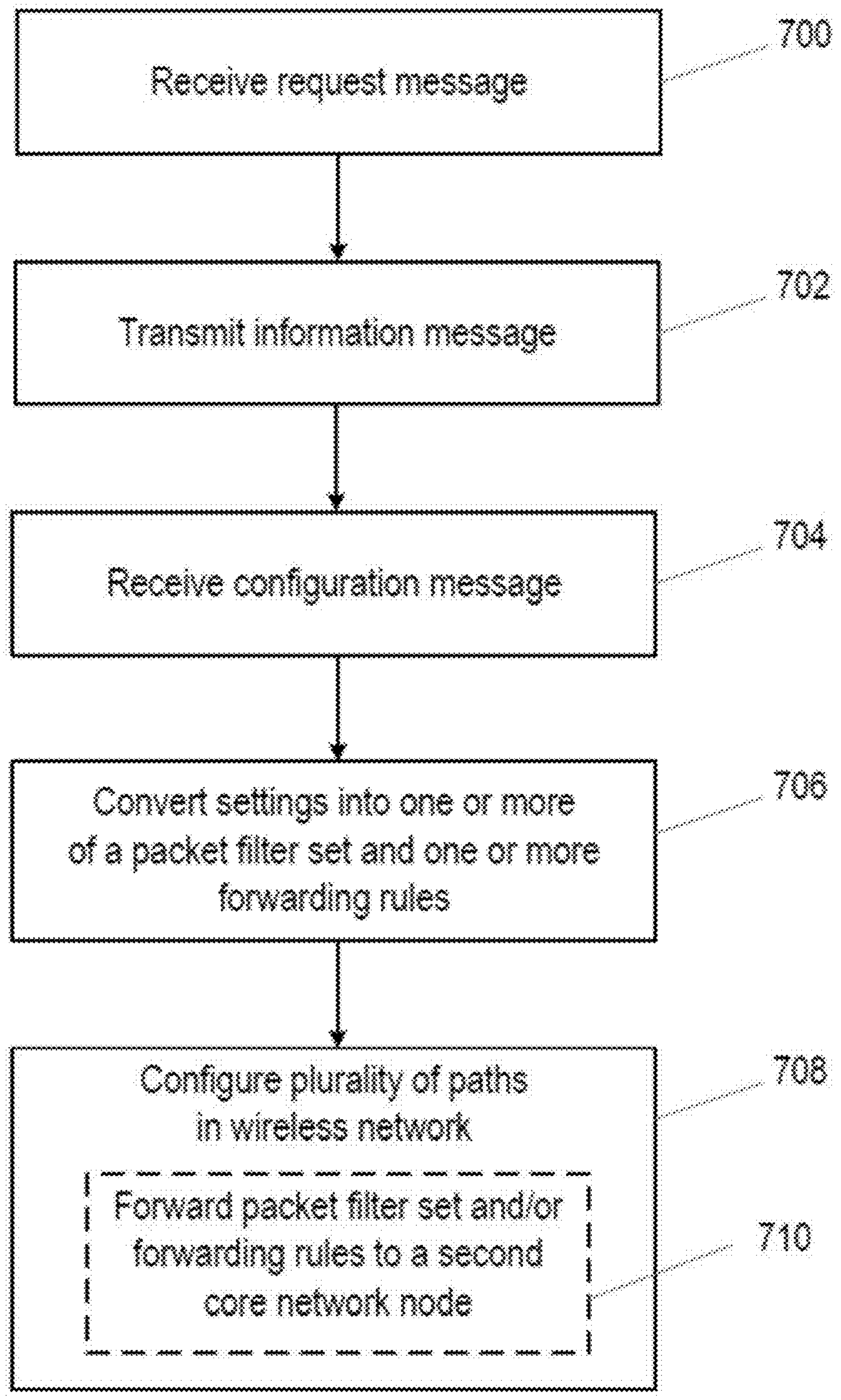

FIG. 212 is a flow chart of a method in a core network node according to embodiments of the disclosure.

Figure 213:
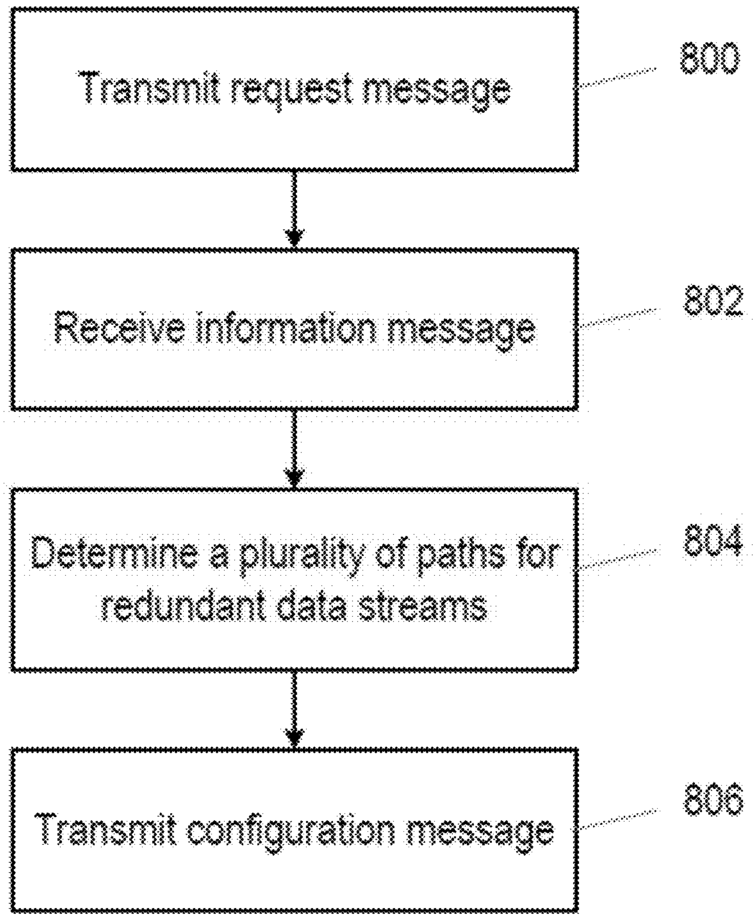

FIG. 213 is a flow chart of a method in a configuring node according to embodiments of the disclosure.

FIG. 214 is a table illustrating a PTP header format.

Figure 215:
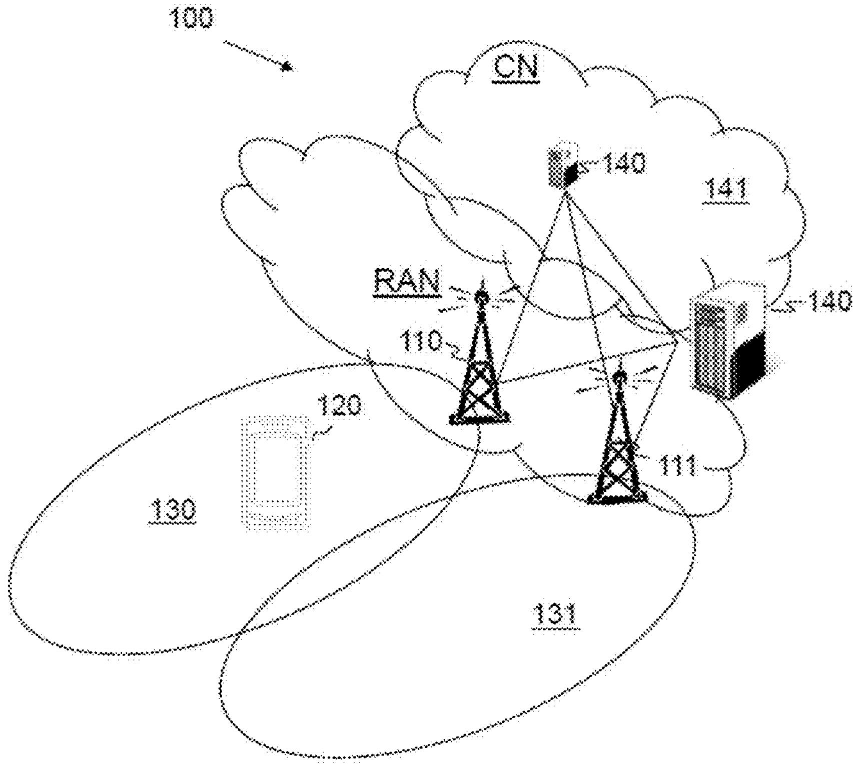

FIG. 215 is a schematic block diagram illustrating embodiments of a wireless communications network.

Figure 216:
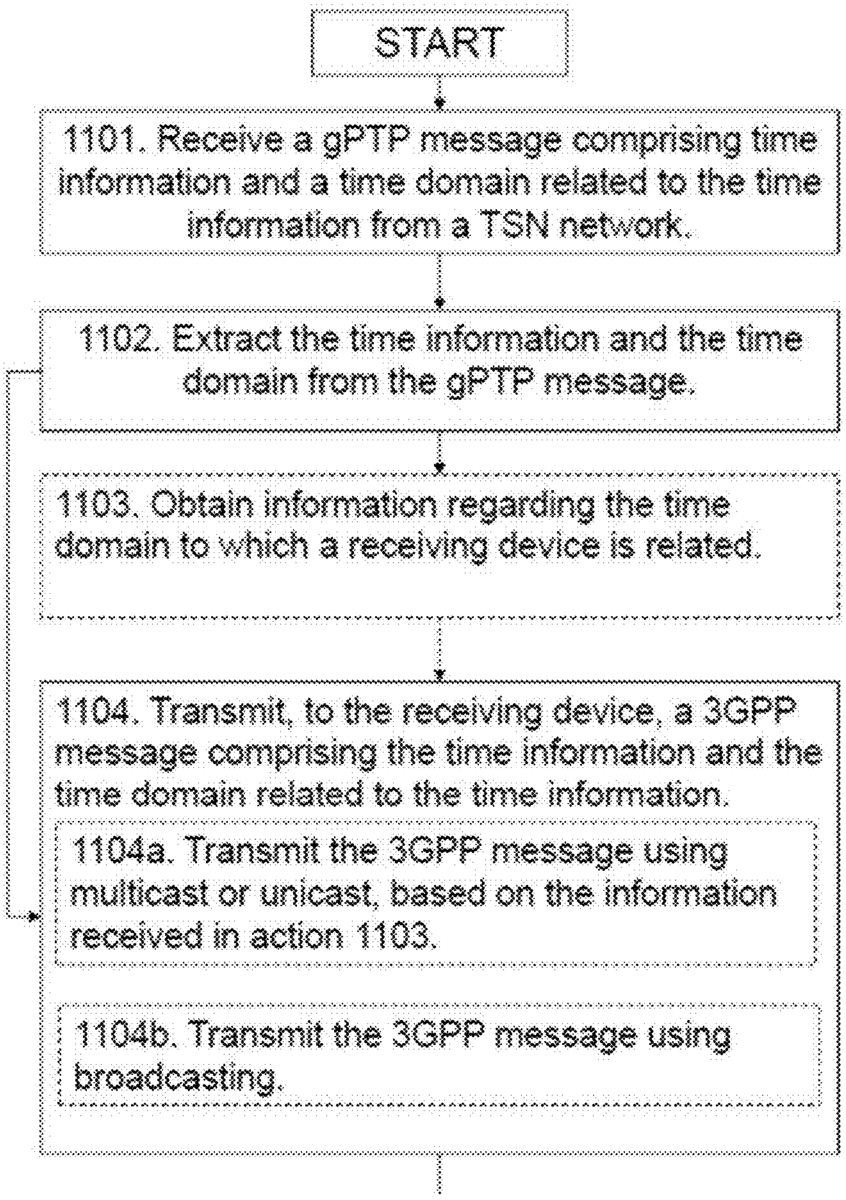

FIG. 216 is a flowchart depicting a method performed by a transmitting device according to embodiments herein.

Figure 217:
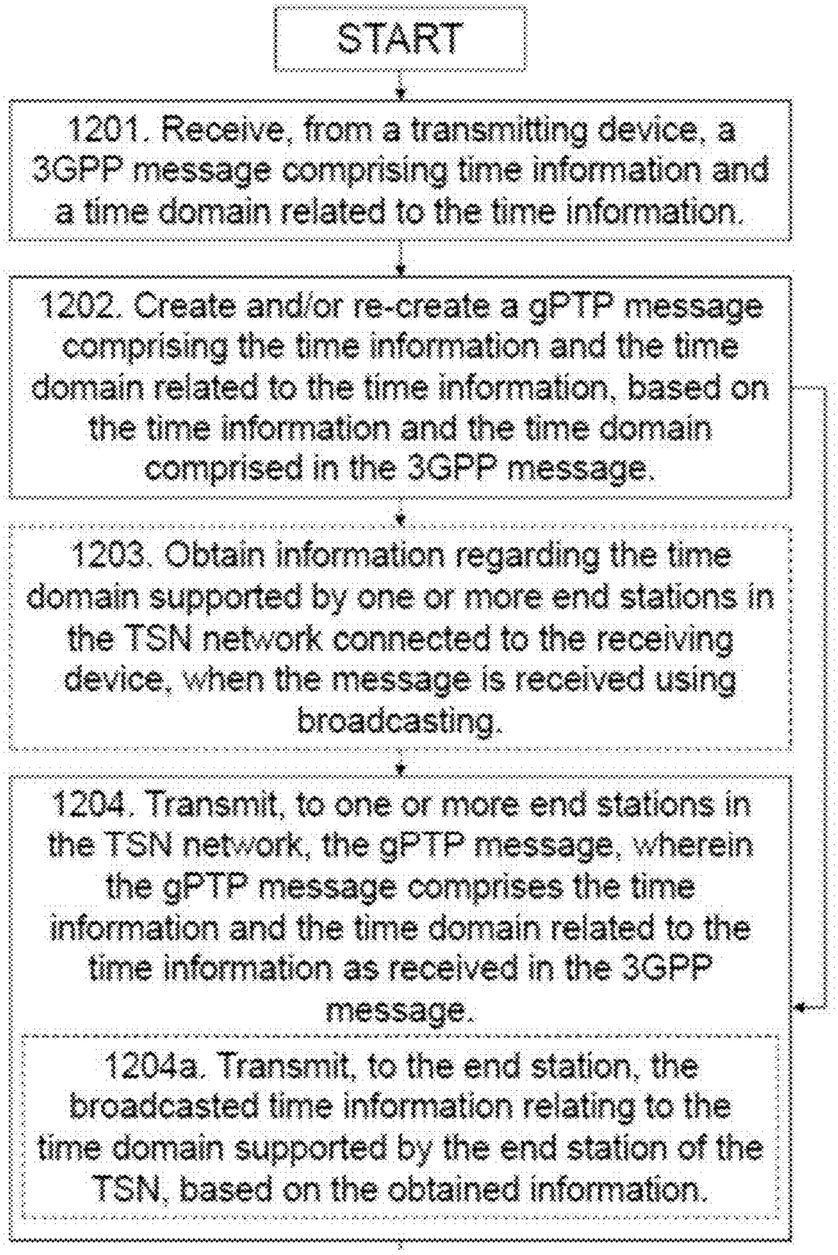

FIG. 217 is a flowchart depicting a method performed by a receiving device according to embodiments herein.

Figure 218:
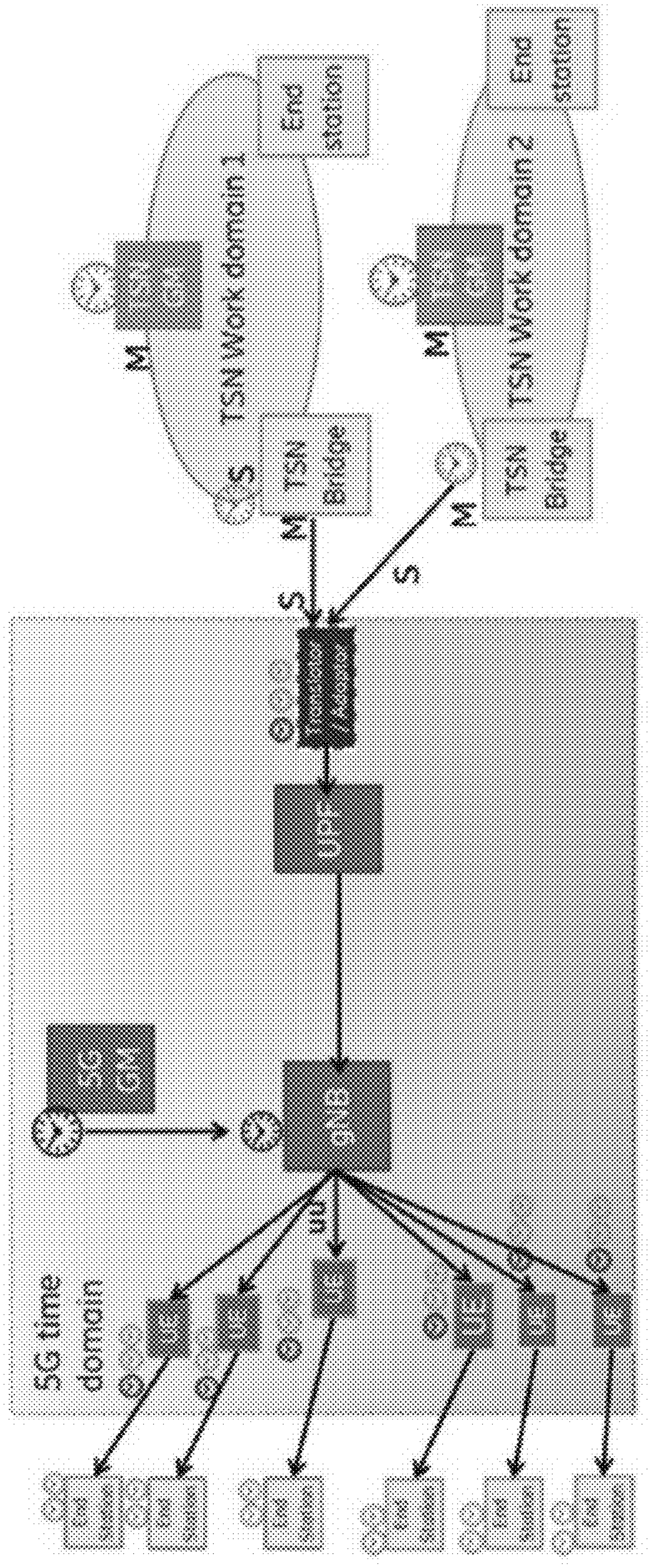

FIG. 218 is a schematic block diagram illustrating embodiments of a multiple time domain support in the 5GS using broadcast according to some embodiments herein.

Figure 219:
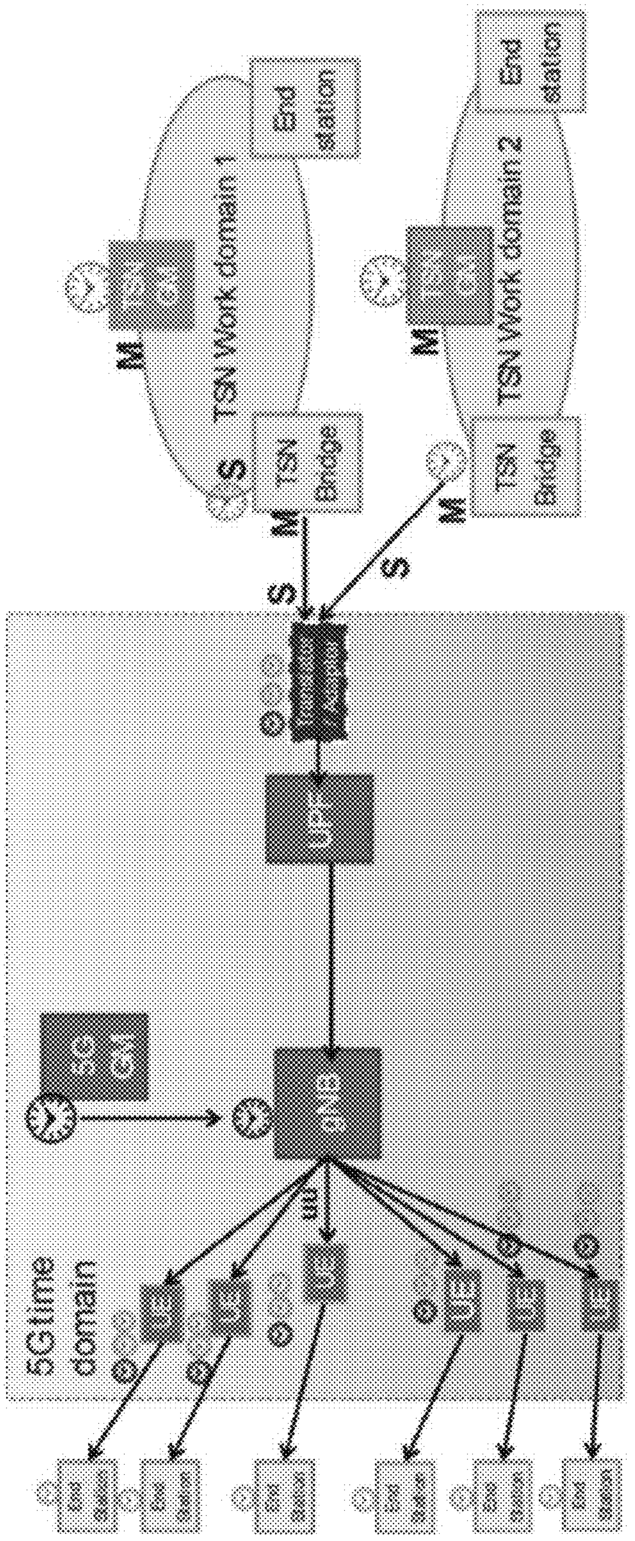

FIG. 219 is a schematic block diagram illustrating embodiments of a multiple time domain support in the 5GS where only relevant gPTP frames according to some embodiments herein.

Figure 220:
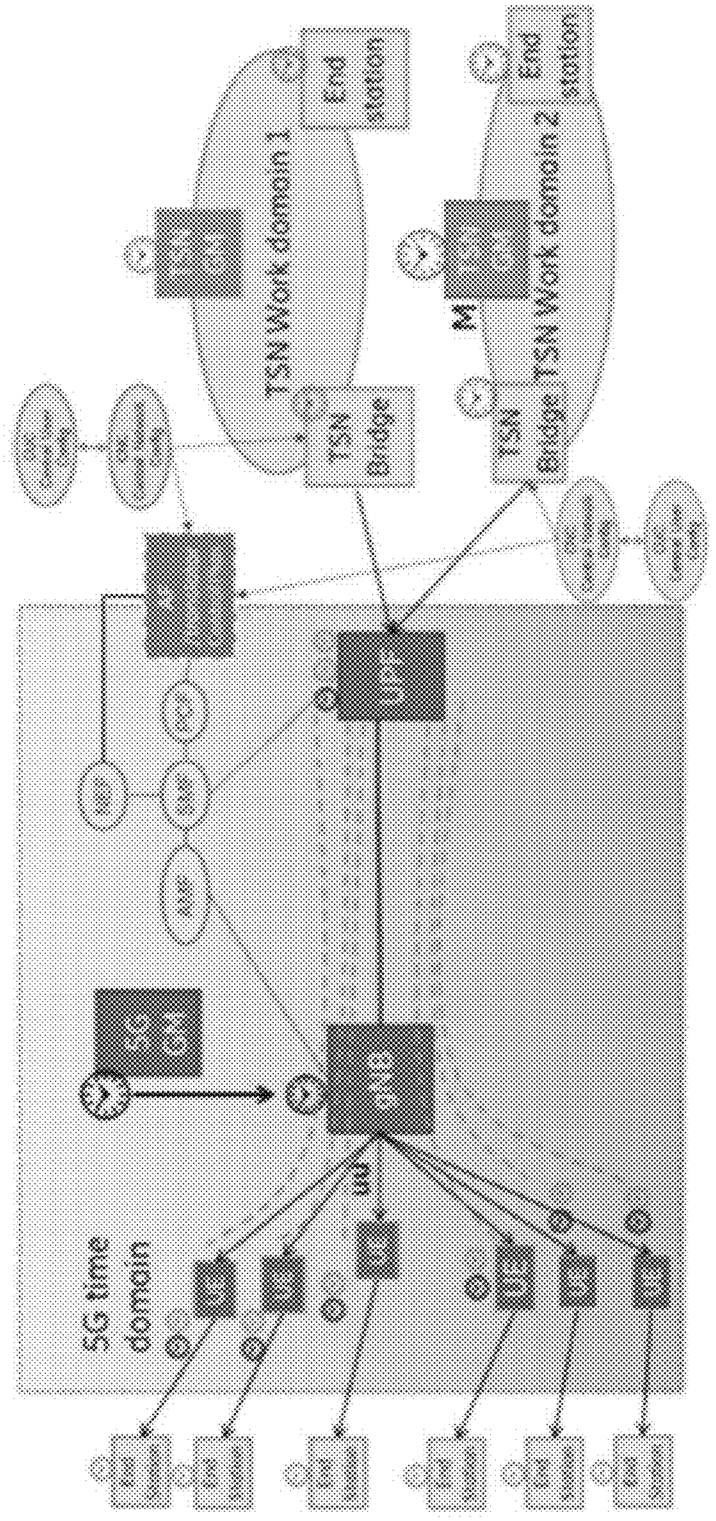

FIG. 220 is a schematic block diagram illustrating embodiments of a multiple time domain support in the 5GS according to some embodiments herein.

Figure 221:
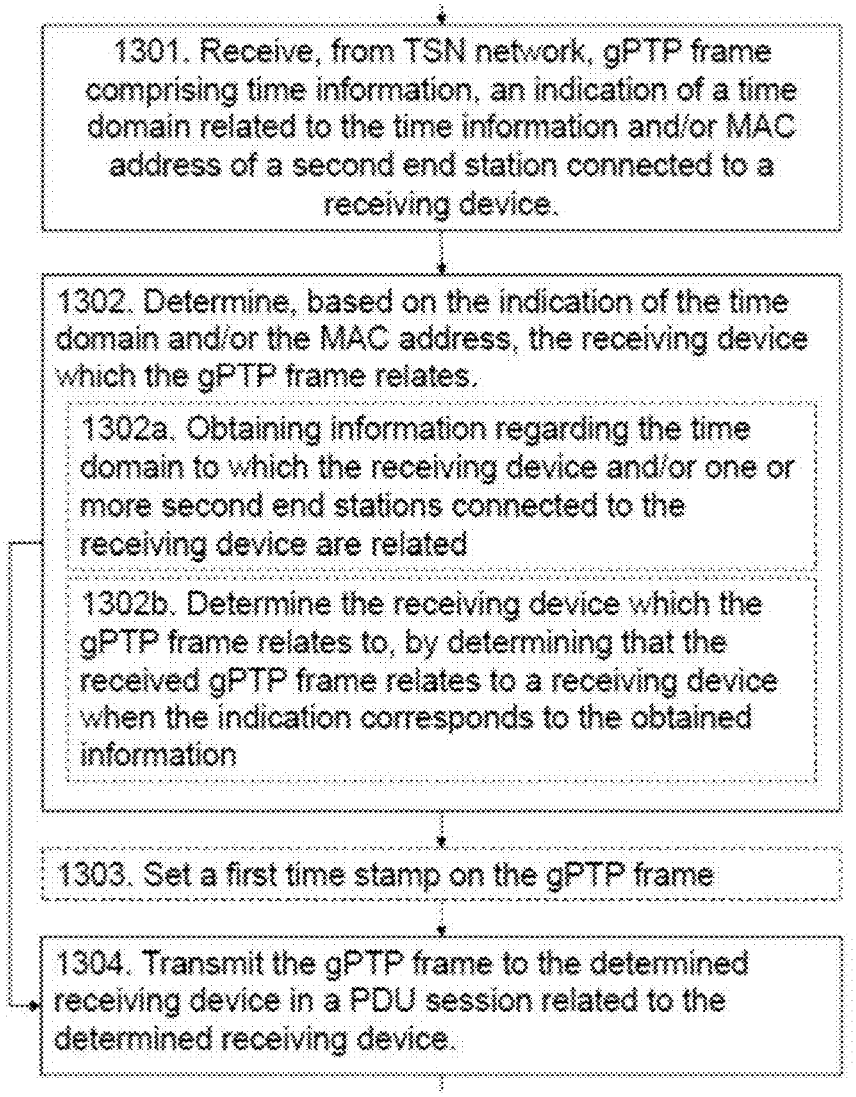

FIG. 221 is a flowchart depicting a method performed by a transmitting device according to embodiments herein.

Figure 222:
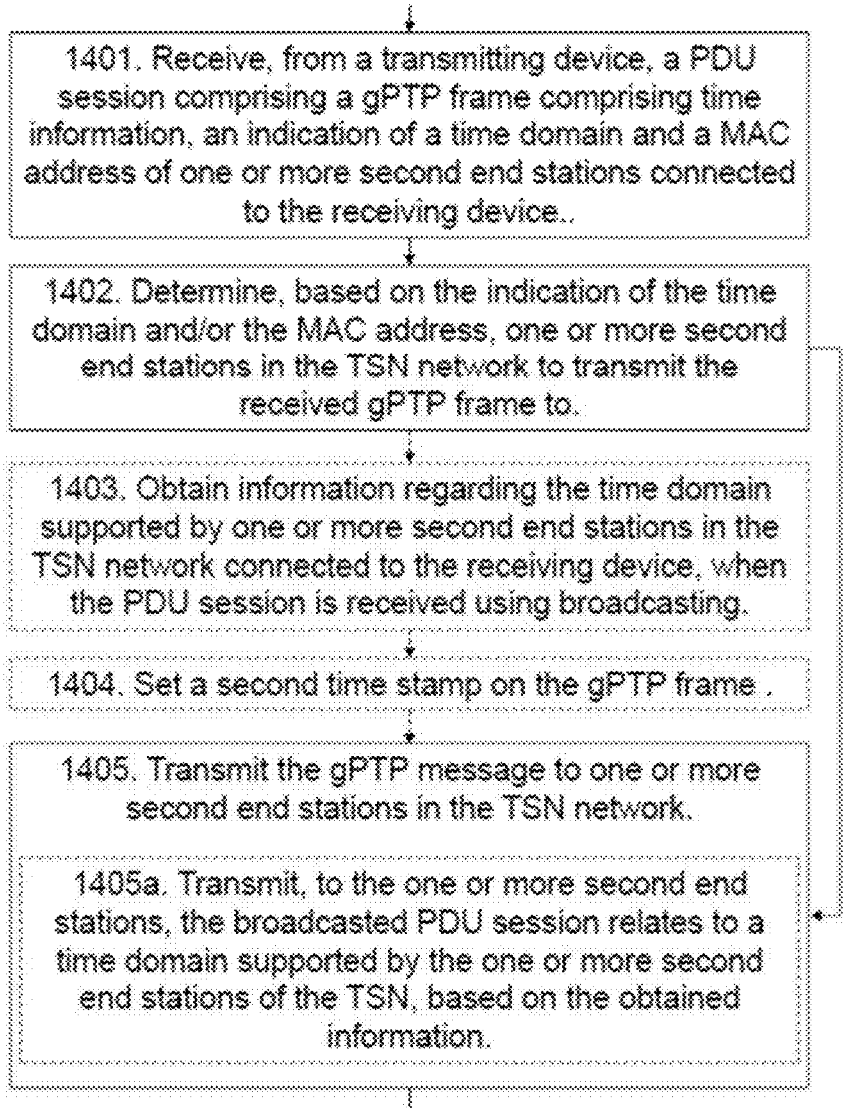

FIG. 222 is a flowchart depicting a method performed by a receiving device according to embodiments herein.

Figure 223:
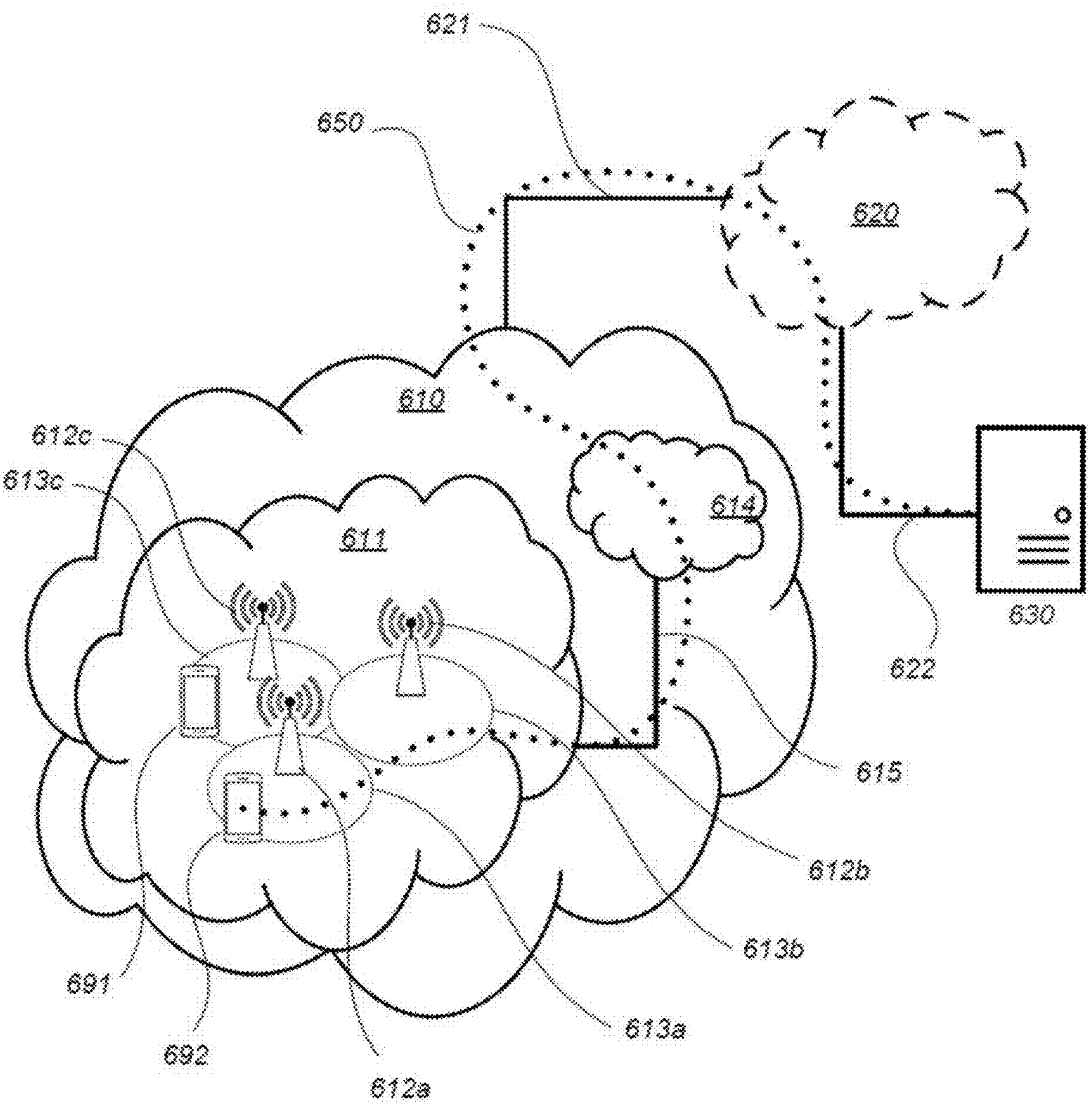

FIG. 223 schematically illustrates a telecommunication network connected via an intermediate network to a host computer, according to some embodiments.

Figure 224:
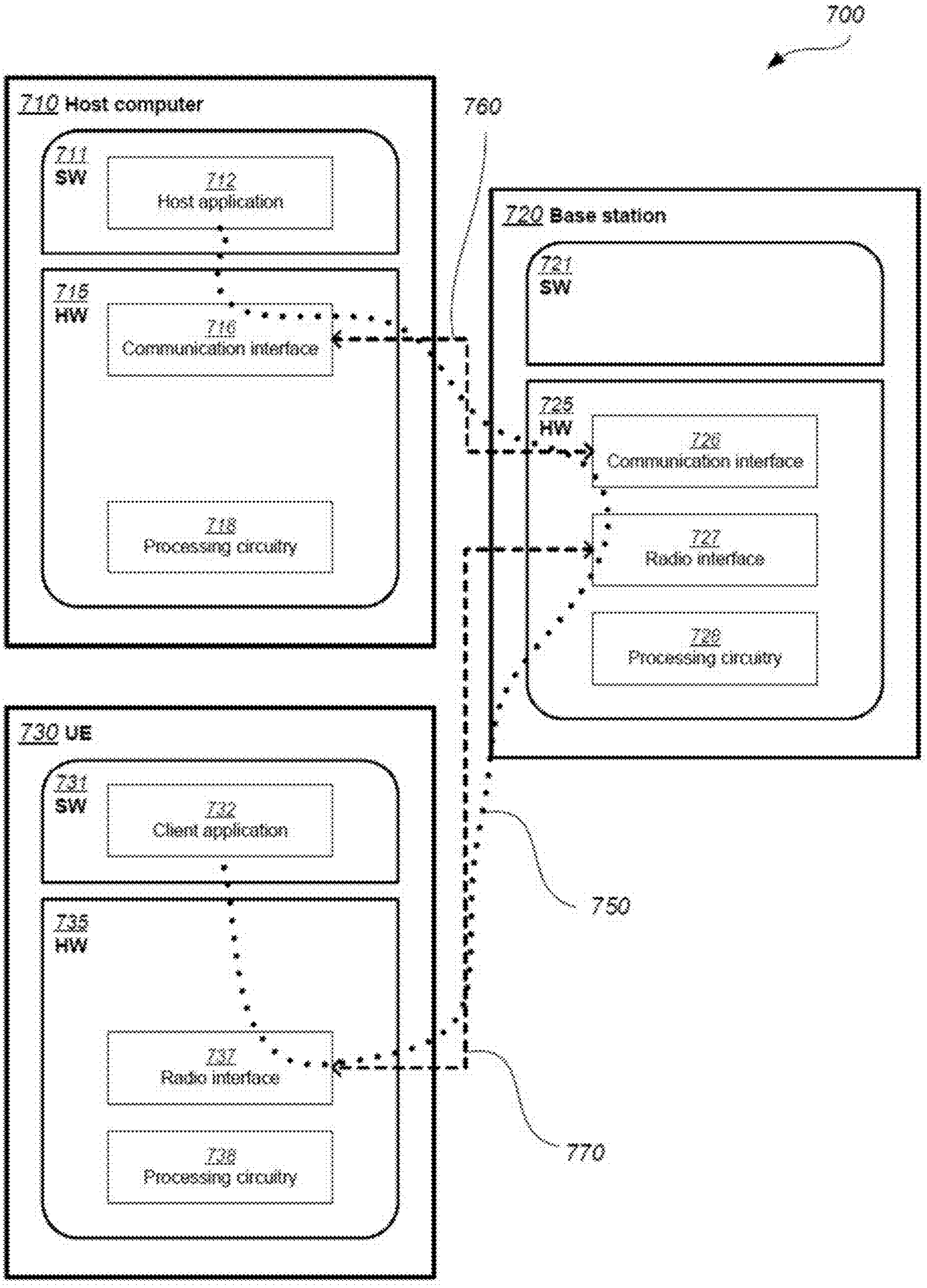

FIG. 224 is a generalized block diagram of a host computer communicating via a base station with a user equipment over a partially wireless connection, according to some embodiments.

FIG. 225, FIG. 226, FIG. 227, and FIG. 228 are flowcharts illustrating example methods implemented in a communication system including a host computer, a base station and a user equipment.

DETAILED DESCRIPTION

Following are detailed descriptions of concepts, system/network architectures, and detailed designs for many aspects of a wireless communications network targeted to address the requirements and use cases for 5G. The terms "requirement," "need," or similar language are to be understood as describing a desirable feature or functionality of the system in the sense of an advantageous design of certain embodiments, and not as indicating a necessary or essential element of all embodiments. As such, in the following each requirement and each capability described as required, important, needed, or described with similar language, is to be understood as optional.

Operation Technology Communication System and 5G

Figure 2:
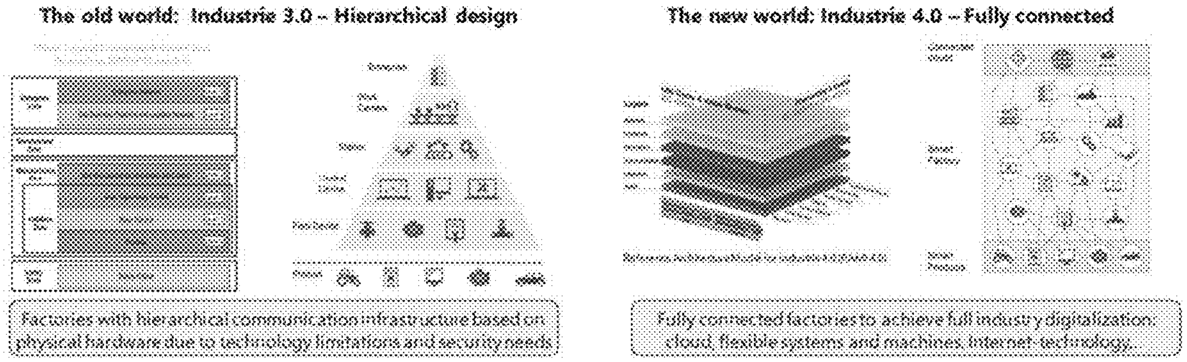
FIG. 2 illustrates the concept of Industry 4.0.

A variety of technologies are today used in industrial communication systems. For manufacturing systems in factories, a hierarchical communication structure is used (often referred to as the automation pyramid), as depicted on the left side of FIG. 2. This design is based on the ISA95/99 model. Industrial equipment is connected in small subsystems which cover, for example, a production cell. These subsystems are separated by gateways and may use different communication technologies; each subsystem is closely managed to be able to guarantee critical communication performance. On the next higher levels these subsystems are interconnected e.g. for coordination among production cells and supervisory control of the production system. This part related to manufacturing operations is called the operations technology (OT) domain containing the critical communication, where the requirements become typically more demanding on the lower levels. Critical communication is today predominantly based on wired communication technologies like fieldbus or industrial Ethernet. The OT part of the network is securely separated from the IT part of the network containing the enterprise applications and services.

A broader digitalization of the manufacturing system is foreseen to provide increased flexibility and efficiency, by transforming manufacturing to a cyber-physical production system. Such a transition is also referred to as the fourth industrial revolution, or Industry 4.0. It is envisioned that the entire production system can be modeled, monitored, evaluated and steered with a digital twin. To that end, a full connectivity throughout the factory is desired, avoiding isolated connectivity islands on the shop floor level, as shown on the right side of FIG. 2. The separation of different domains of the network is thereby moved from physical separation (via gateways) to a logical separation. In this transition, IEEE 802.1 Time-Sensitive Networking (TSN) plays a central role, as it allows to provide guaranteed high-performance connectivity services for certain traffic flows on a common Ethernet infrastructure which is shared between critical and non-critical communication. As a fully standardized solution, it allows also convergence of the plurality of proprietary fieldbus technologies existing today to a global standard.

Wireless connectivity can bring great value to a manufacturing system. It can provide cost savings by avoiding extensive cabling, it can support new use cases that cannot be realized with wires (e.g. connecting mobile components). But in particular, it provides significant flexibility in redesigning the shop floor—which is a major trend towards Industry 4.0. Today the use of wireless technology on the shop floor is very limited and focused on non-critical communication provided via various different technologies. For critical communication services there is today no wireless technology that can provide reliable and deterministic low latency.

5G promises to provide reliable deterministic low latency services, while at the same time supporting eMBB and mMTC. (Note that 5G mMTC is based on LTE-M and NB-IoT, which can be embedded into an NR carrier. Eventually an NR-based mMTC mode is expected.) To this end it may play a similar role on the wireless side to what TSN does for wired connectivity. It provides a universal, globally standardized technology that converges all service types and can spread wireless connectivity into much larger fields of the shop floor communication.

TSN has an additional role to play for 5G. Industrial networks are long-living installations and the large majority of factories are already deployed. Introduction of new technology is slow and cumbersome into existing brownfield installations. TSN is expected to trigger a redesign of building practices, which is expected to enter even industrial brownfield networks when feasible. By linking 5G to TSN as the wireless equivalent, TSN provides an opening market opportunity to help in transforming the brownfield market. This motivates a need for the 5G architecture solution to be largely aligned with TSN.

The integration of 5G has to address a number of requirements:

- Local content: Production related data may not leave the industry/factory premises i.e. all such data needs to be kept locally for e.g. security and trust reasons.
- Full control of critical connectivity: critical communication has to be in control of the industrial end user and linked to the operation system where interruption-less operation is managed.
- Local management: The management solution needs to be easy to integrate with the industry's business and operational processes and include network observability.
- Local survivability: The connectivity solution is not to be dependent on any external failures, i.e., it shall be self-contained when it comes to survivability.
- Life Cycle Management (LCM): Several industries require LCM in the range of tens of years. This means that long-term availability of industrial devices and network infrastructure is needed, including ways for device configuration, firmware updates, application software updates, provisioning of identity credentials, installation, provisioning and maintenance in field.
- Security: The connectivity network shall assure that only authorized traffic is allowed, and with the required level of confidentiality protection (e.g., encryption and/or integrity protection) applied. Functionalities like protection against intrusion (hackers) from the Internet, malware reaching devices and servers, tampering of data etc. shall also be supported. The support of different security zones should be enabled. And the network infrastructure itself needs to be secure and protected from external attacks.
- Integration with existing solutions: The connectivity solution needs to be integrated into existing wired OT system as well as to other wireless connected devices. One example is transport of Industrial Ethernet frames.

System Architecture

Figure 3:
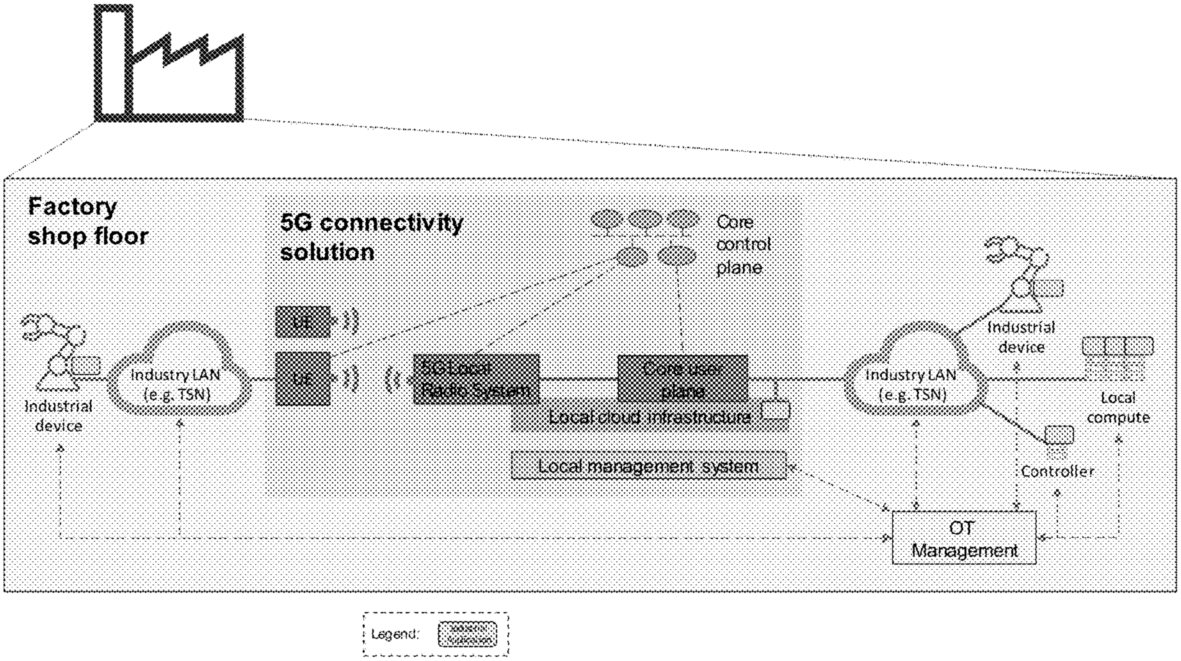
FIG. 3 shows a standalone 5G non-public network integrated into an Operations Technology (OT) system.

A 5G network integrated into an industrial system, as shown in FIG. 3, needs the following functions:

- 5G radio access and core network for 5G connectivity, including radio connectivity, mobility support, service management and QoS including all service categories URLLC, eMBB and mMTC with deterministic performance
- High availability and redundancy
- Network identities that enable private network services (i.e. restricting network access and network services to a defined group of devices)
- Security solutions based on secure credentials
- Support for positioning and time synchronization
- Network monitoring and QoS assurance mechanisms
- A lightweight network management solution
- A cloud computing infrastructure with deterministic performance and high availability for industrial applications
- Capability to integrate with existing industrials systems (i.e. connectivity, cloud computing infrastructure, management system)
- Capability to interwork with external public networks for cases, where service continuity in and out of the factory is required A 5G system can be deployed in different variants. In cases where local access to dedicated spectrum can be obtained by an industrial user, a standalone local 5G system can be deployed, as depicted in FIG. 3. Such a standalone 5G network may allow interworking with a public network, e.g. via roaming. Alternatively, federated network slicing can be applied, by creating a logical network slice, which is based on the physical infrastructure of two (or more) networks.

Figure 4:
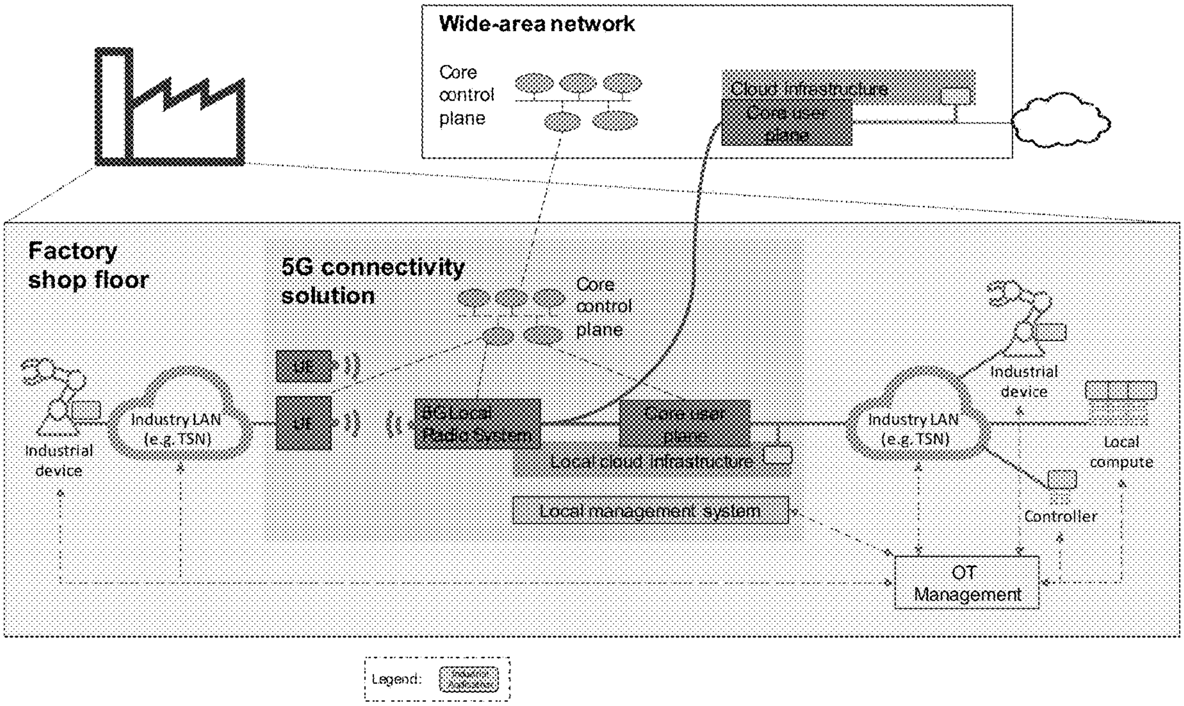
FIG. 4 shows a 5G non-public network interworking with a public wide-area network.

A local 5G system can also be realized as a non-public network service, that is provided by public mobile network operator at the industrial location, as depicted in FIG. 4. An on-site local deployment of at least parts of the network infrastructure is typically needed. On-site data breakout ensures low latency and allows data privacy policies for information not leaving the site. The core control functionality can be provided from the outside MNO sites, or it can be fully or partially on-site, to support, for example, local survivability. While critical communication services are kept on-site via local breakout, some other functions may also use outside termination of data sessions.

A combination of a standalone local network and a public MNO network can also be used as basis for providing a non-public network service across the two network domains. An industrial user might deploy a local network on-site, which together with the public network infrastructure provides the non-public network service via federated network slicing. For example, the local deployment may be deployed to "harden" the public network, in terms of local coverage, availability, capacity and computing resources.

A local network can also provide neutral-host capabilities, by extending a public network on site in addition to providing a local standalone network. For this purpose, network sharing solutions such as multi-operator core network (MOON) or multi-operator radio access network (MORAN) can be applied. In shared network approaches, a resource management solution is needed that can provide guaranteed resources and performance for the different supported networks (or network slices). A network sharing solution may be well motivated for both local and public network providers. The local provider can provide a free local site for the MNO, while the MNO may provide its spectrum resources for the network. Since the same base stations can support public and private services, some improved coexistence between the local and the public network should be possible. Further, a shared solution may be motivated by different services. For example, a public MNO may provide conventional enterprise services on the industrial site, e.g., telephony, mobile broadband and IT connectivity, while the private standalone local network is used for local industrial OT connectivity.

Network Slicing for Industrial Internet-of-Things (IoT)

Network slicing is considered as one approach to enable or realize Industrial IoT network solutions. Network slicing can provide separate and isolated logical networks on a common shared infrastructure. It can e.g. be used, to Separate different security zones in a factory, Separate different service categories, e.g., to isolate critical communication from non-critical communication, Provide a non-public IIoT network on a public network infrastructure that is also used for public mobile communication.

Network slicing is a conceptual way of viewing and realizing the provider network. Instead of the prevailing notion of a single and monolithic network serving multiple purposes, technology advancements such as Virtualization and SDN allows us to build logical networks on top of a common and shared infrastructure layer.

These "logical networks", which may be called "network slices" are established for a particular business purpose or even a particular customer (of the provider). They are end-to-end and complete in the context of the intended business purpose. They are and behave like a network of its own, including all the required capabilities and resources. This extends all the way from the share of the infrastructure resources, through configured network functions to network management or even OSS/BSS capabilities. It encompasses both mobile and fixed network components. One expectation is that different slices are independent and isolated, even if they share common physical resources, and thus provide a separation of concerns. Network slices may be defined to span across multiple physical network infrastructures, which is sometimes referred to a federated network slicing. This can provide even enable an alternative network realization to roaming.

Just as existing networks are built to realize services, so are network slices. They are not services in themselves, but they are built to realize one or several services. As a special case, a service (or instance thereof) maps one-to-one with a network slice, allowing, for example, wholesale type of services. Resources (physical or logical) can be dedicated to a slice, i.e. separate instances, or they could be shared across multiple slices. These resources are not necessarily all produced within the provider, some may in fact be services consumed from other providers, facilitating e.g. aggregation, roaming etc.

Figure 5:
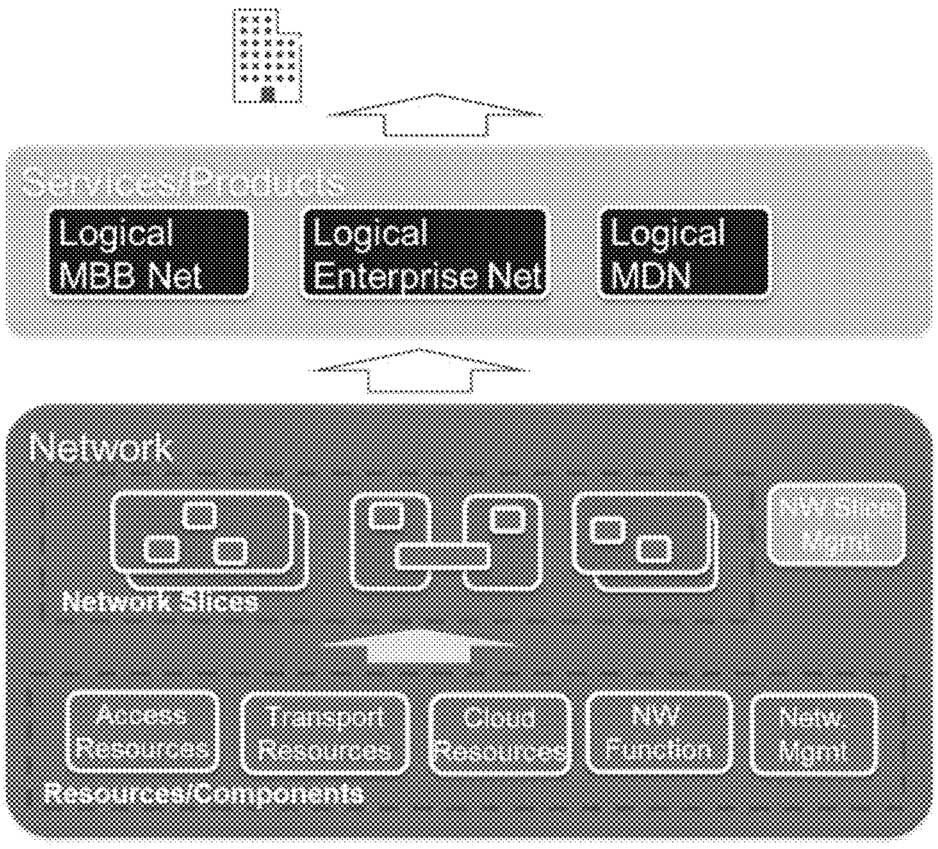
FIG. 5 illustrates the concept of network slices.

Network slices may be defined as comprising a set of resources, as shown in FIG. 5. This could be physical resources, either a share or profile allocated to a slice or even dedicated physical resources if motivated. Slices may also be defined as comprising logical entities such as configured network functions, management functions, VPNs etc. Resources (physical or logical) can be dedicated to a slice, i.e. separate instances, or they could be shared across multiple slices. These resources are not necessarily all produced within the provider, some may in fact be services consumed from other providers, facilitating e.g. aggregation, roaming etc. Network slicing allows leasing of network capacity with associated service-level agreements (SLAs), for example.

Figure 6:
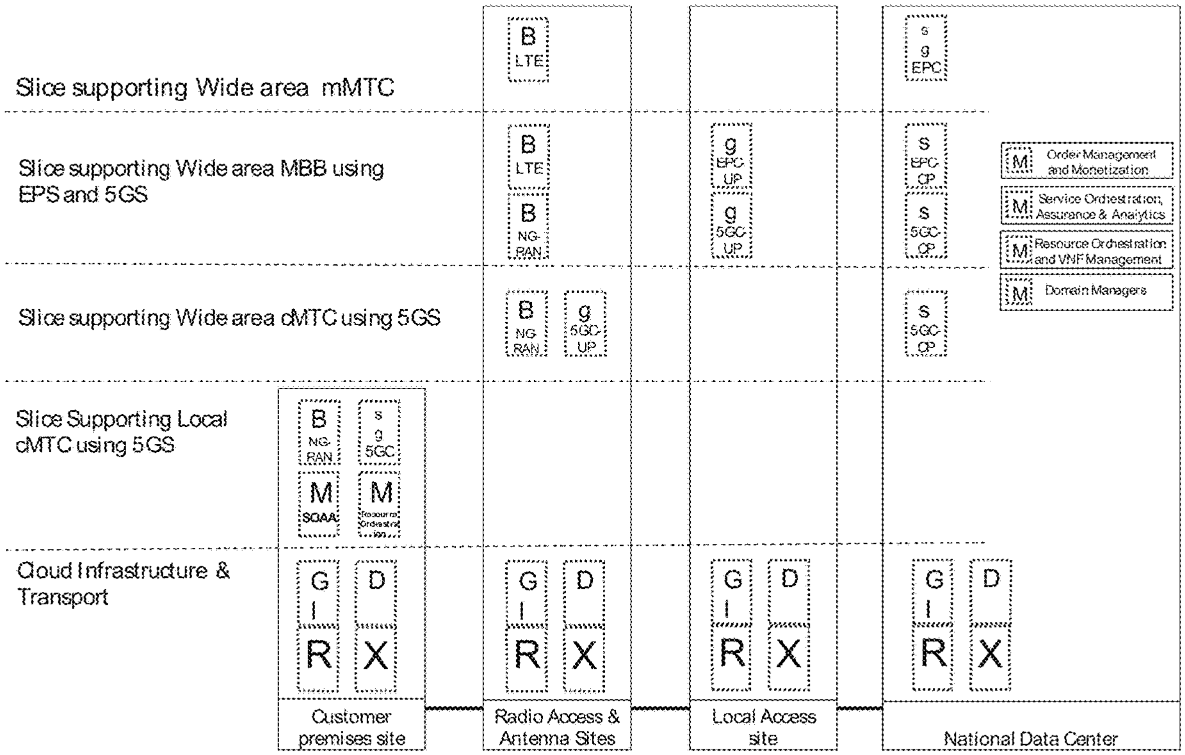
FIG. 6 shows an example of four different slices throughout the network.

As slices can be created to address a new business requirement or customer and may need to adapt to changes, they require a new type of life cycle management functions, which has the role of creating, changing (e.g., upgrading) or removing them. Network slicing allows for different network architectures which are optimized for the specific use case that the slice is being used for. This optimization for different network slices may include both optimizations in the functional domain and in the geographical deployment of different functionality in the network. This can be seen in FIG. 6, which illustrates an example of four different slices through the network. They also expect the service provider to support them with inclusion of industry specific services and or applications from other third parties or service providers in a cost efficient and timely manner.

The definition for network slicing is twofold. For the general definition the one from GSMA is used: "From a mobile operator's point of view, a network slice is an independent end-to-end logical network that runs on a shared physical infrastructure, capable of providing a negotiated service quality". Besides this general definition, several implementations realizing the above exist and are often meant when "network slicing" is mentioned. The most prominent one comes from the 5G Core specification, "System Architecture for the 5G System (5GS), Stage 2," 3GPP TS 23.501, v. 15.4.0 (December 2108): "Network Slice: A logical network that provides specific network capabilities and network characteristics [ . . . ] A Network Slice is defined within a PLMN and shall include: the Core Network Control Plane and User Plane Network Functions [ . . . ]". Methods at least partly realizing above definition are not limited to 5G but also available in 4G networks.

Figure 7:
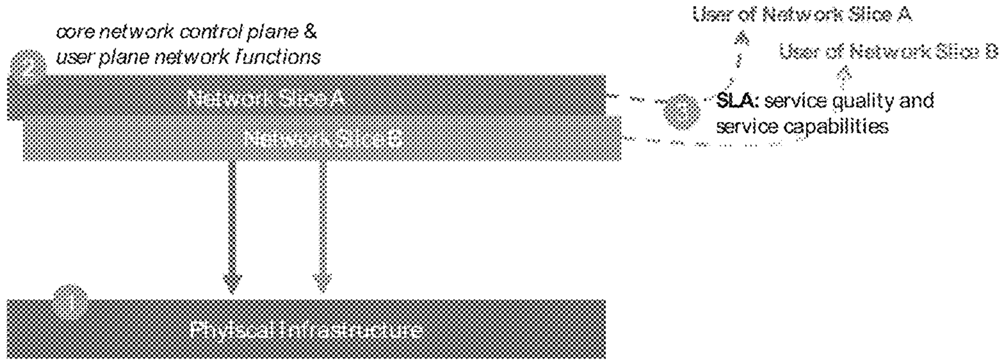
FIG. 7 illustrates features of network slices.

With these definitions the basic network slice can be explained according to FIG. 7:

There is a shared physical infrastructure (see (1) in FIG. 7).

One or more independent end-to-end logical networks (see (2) in FIG. 7) are defined, which comprise:

a. A core network control plane, b. User plane network functions,

These logical networks can support negotiated service quality or specified service capabilities, or, in other words, a service level agreement (SLA) about the network slice capabilities (see (3) in FIG. 7).

Once network slices have been defined, a first question is how a data traffic flow is assigned to or routed through the corresponding network slice. In many cases, a single device is making only use of a single slice, so the allocation can be made by assigning each UE to a specific network slice. However, in some cases a device may serve traffic for multiple slices.

A baseline in mobile networks for service treatments to provide specific service performance and QoS are dedicated bearers; they are often a solution to fulfill the requirements of specific use cases or service. In the radio access network (RAN), the dedicated bearers map to radio bearers that can be used by the scheduler to deliver bearer-specific QoS. Specific resources may be reserved for certain dedicated bearers. At the network edges, bearers can be identified and treated individually based on filter on the packet headers, like the 5-tuple source IP address, destination IP address, source port number, destination port number, and protocol (UDP or TCP).

Figure 8:
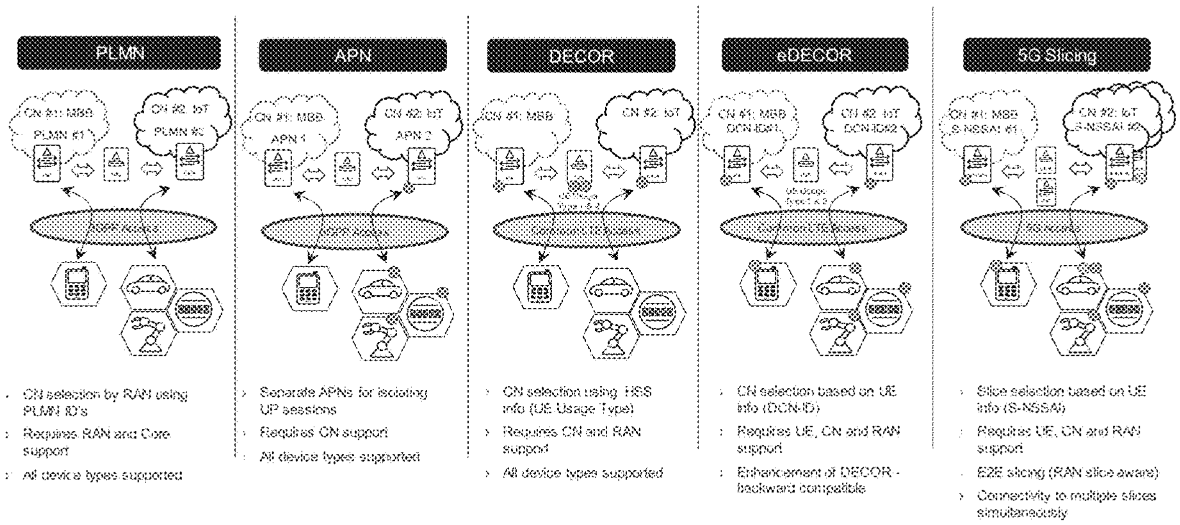
FIG. 8 shows mechanisms for slicing the network.

FIG. 8 shows four available 4G methods to slice a network. For the first one, RAN sharing is applied, allowing eNBs to announce multiple PLMN IDs. To utilize this approach, the RAN and Core need to support that feature, to assure the PLMN IDs are announced and traffic is appropriately routed to/from the right Core network. The UE selects the PLMN based on usual procedures of network selection, including having preferred (home) networks. A UE can only be served by one PLMN (except for the case of multi-SIM UEs). Currently, this solution is supported by every UE and by at least some network-side systems.

The second solution relies on Access Point Names (APNs) configured in the UE. In this case, one PLMN ID is announced by the RAN but user plane traffic is routed to the right Core network based on the APN. A UE can even have multiple APNs configured resulting in multiple IP addresses (multi-homing) when PDN sessions are established. Assuring the right source IP address is used when transmitting in the uplink is not straight forward. Setting more than one APN in the same UE for internet applications might not be supported by every device. This solution requires no changes to RAN but must be supported in the Core networks.

3GPP had a study item named DECOR, now described in standards document as dedicated core network (DCN), which allows for the selection of a slice based on configuration in the network, rather than a preferred PLMN ID or APN settings, as done for the previous solutions. The feature must be supported in RAN and Core, and information from the home subscriber server (HSS) is used to determine the "UE usage type" and, by this, attaching it to the right slice. There is no UE impact in this solution.

A concept known as eDECOR further enhances this by allowing the UE to submit a DCN-ID to select the slice. To utilize this approach, the RAN, Core, and UE need to support the feature.

Both DECOR and eDECOR, only allow one slice per UE but assure that UEs of different types are served by different slices. Within each dedicated core, multiple dedicated bearers and APNs can be used.

For Release 15 and beyond, 5G Slicing extends this feature to a theoretically unlimited number of slices, but implementation and resource dependent constraints in UE, RAN and Core will likely apply. As for 4G, several sub-options to realize slicing in 5G exist, but they will not be further distinguished in this document.

Figure 9:
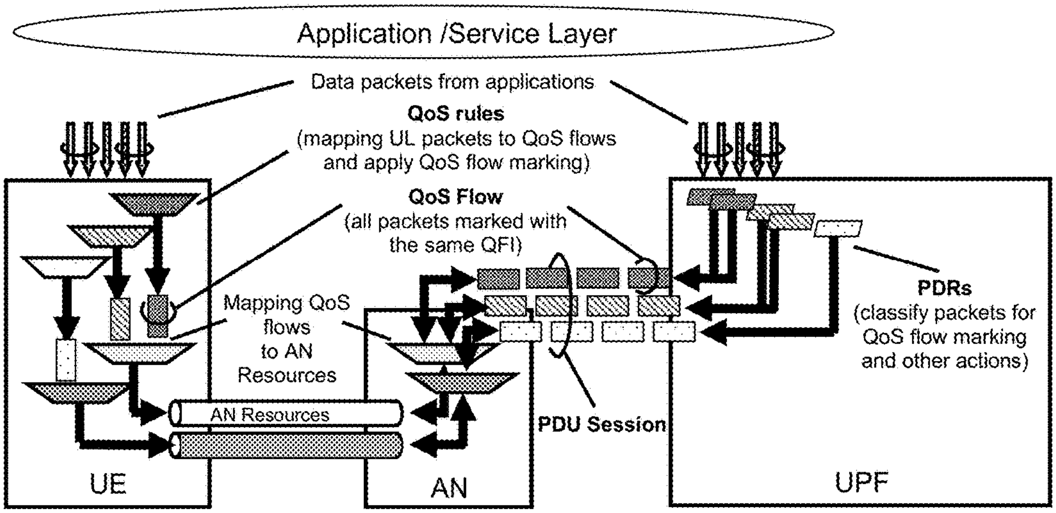
FIG. 9 illustrates QoS in the 5G system.

Once traffic has been assigned to the corresponding slice, the next question is on how service performance can be provided. In many Industrial IoT use cases, guaranteed service performance for prioritized traffic is required. In a normal (i.e., unsliced) 5G network, or within a single network slice, different traffic flows can be separated according to traffic flow separation, as shown in FIG. 9, which shows how QoS is applied in the 5G system. Dedicated resource allocations can be provided for critical traffic. Admission control is used to ensure that the number of admitted prioritized traffic flows with guaranteed transmission resources (i.e., guaranteed bitrate) do not exceed the available resources, with sufficient margin for resource variations.

Figure 10:
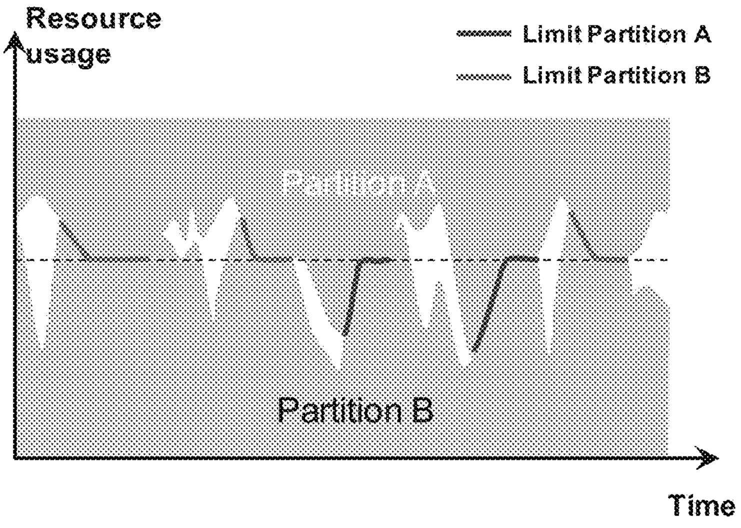
FIG. 10 shows resource partitioning between network slices.

For resource partitioning between slices, the reservation of resources in the physical infrastructure is not per individual traffic flow, but instead based on the sum of critical traffic flows within a slice. This total requirement needs to be defined in the network slice SLA. The resource partitioning does not need to be static. Better efficiency can be achieved if unused resources of one slice can be used by another slice. This can be seen in FIG. 10, which illustrates resource partitioning between example slices A and B. What is required is that each network slice can get access to the guaranteed service flows at any point in time (or at least to the availability level defined in the SLA).

Industrial Applications

Following is a discussion of several applications and activities that connect to industry technologies. This discussion includes a discussion of cloud robotics, which is a new technology that provides many additional benefits, compared to previous technologies.

In Chapter 5.3.2 of "Study on Communication for Automation in Vertical Domains," 3GPP TR 22.804, v. 16.2.0 (December 2018), motion control is introduced as a use case for factories of the future. Motion control is essential for any automation application and, for example, is also fundamental for industrial robots. A robot's motion or a printing machine's functionality is basically just a coordinated motion control of multiple actuators.

Motion control refers to the task of driving an actuator (or a group of actuators) in a way (and ensure that it is doing so) an application requires. Electronic motors are the most common actuators in industries. There are diverse ways to classify electrical motors (e.g. AC-DC (brushed/brush-less), stepper-servo-hybrid stepper). Nevertheless, the motion control principles are similar for each motor class. Communication technologies are used to coordinate and synchronize multiple actuators and for higher layer control. Motion control applications with requirements on accuracy or precision are always implemented as a closed-loop control.

There is a common logical split in motion control systems:

- Physical actuator (aka motor) & encoder (i.e. one or more sensors for speed, position etc.)
- Driver (also called inverter)
- Motion controller
- Programmable Logic Controller (PLC)

Figure 11:
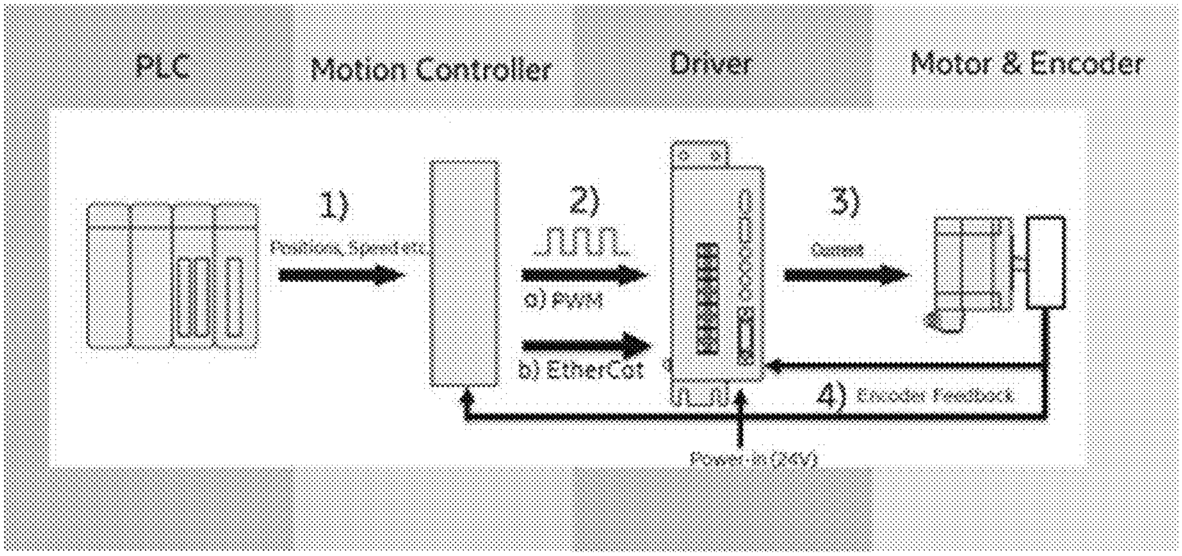
FIG. 11 shows an example logical function split in motion control applications.

This logical split of motion control functions is illustrated in FIG. 11.

Typical communication patterns in the motion control architecture (numbers as in FIG. 11):

1) A PLC communicates higher level commands to the motion controller—this imposes less stringent communication requirements
2) The motion controller generates so called set points (might be speed, torque etc.) for the driver, by using, e.g.:
    a. Pulse-width modulation, which is no communication technology
    b. Protocols like EtherCat or Profinet IRT or similar, with support of very low cycle times, usually below 1 ms.
3) Currents fed from the driver to the motor—energy supply to the motors based on the set points, no communication technology.
4) Encoder (sensor) feedback to driver and/or the motion controller; feedback depends on type of motor and encoder. Feedback can be analogue or based on for example EtherCat or Profinet IRT as in 2) with same requirements (cyclic closed loop set point transmission and feedback).

A single motion controller might control multiple actuators, if for example several motors are used in the same machine. In the technical report mentioned above, the requirements for motion control applications (there the closed-loop is addressed: motion controller-driver-encoder) are listed—these requirements are reproduced in Table 1, below.

TABLE 1

| Motion Control Requirements | | | | |
|---|---|---|---|---|
| Application | # of sensors/ actuators | Typical message size | Cycle time $T_{cycle}$ | Service area |
| Printing Machine | >100 | 20 byte | <2 ms | 100 m × 100 m × 30 m |
| Machine Tool | ~20 | 50 byte | <0.5 ms | 15 m × 15 m × 3 m |
| Packaging Machine | ~50 | 40 byte | <1 ms | 10 m × 5 m × 3 m |

In 3GPP TR 22.804, it is further mentioned that two consecutive packet losses are not acceptable and a very high synchronicity between all devices involved (with a jitter below 1 usec) is required. The latter is mandatory to be able to take samples from distributed encoders and also apply new set points from the motion controller to drivers at common sampling points. This is referred to as isochronous communication, which means that applications (so the motion control program as well an all actuators and encoders) are in sync to the communication cycle timings given by the communication technology (for example, of Profinet). This also ensures minimal and deterministic latencies using timed channel access.

Several vendors of motion control equipment, such as motion control manufacturer Lenze, also combine functionalities into single physical entities. On an upper "control level," they use a combined PLC+motion controller (Logic & Motion), next to a human-machine interface. This controller takes input from IO-devices (3) and feeds its set points to e.g. the servo-inverter (2) over EtherCat ("Field Level").

Another trend is to integrate encoder and/or driver and/or motion controller into the motor. This is also sometimes referred to as an integrated motor or a smart motor.

Furthermore, it is possible that multiple motion controllers are used for the same application; each motion controller controls a subset of drivers. Coordinated motor movement requires communication between separated motion controllers. In 3GPP TR 22.804, this is referred to as 'Controller-to-Controller' (C2C) communication. Cycle times between 4 to 10 ms are assumed. The requirements for synchronization are equally strict, with a jitter below 1 usec also on the C2C level. Payload sizes may be up to 1 kB.

For safety reasons there may be an additional functional safety control deployed in wireless motion control applications. Functional safety is implemented as an additional closed-loop, next to the one used for motion control itself. This is done through additional hardware or integrated safety functions in the motion control components. Communication protocols like ProfiSafe are used. One safety restriction is, for example Safe Torque Off (STO) (from IEC 61800). STO defines, that in case any error/safety issue is detected by the PLC or an additional safety PLC, power delivery to the motor need to be stopped. An STO can for example be triggered by pressing an emergency button. In 3GPP TR 22.804, it is explained that for functional safety, a strictly cyclic data communication service is required between both ends. If connectivity is disturbed, an emergency stop is triggered, even if no real safety event has occurred. There are different requirements (4 ms to 12 ms cycle time, packet size 40-250 byte, tolerable jitter in transmission according to 3GPP TR 22.804) for different use cases. Safety functions might be implemented in different components of the motion control architecture.

To sum up, there are four different types of communication for motion control:

1) Lowest level closed-loop motion control (motion controller-driver-encoder)
2) Controller-to-controller communication
3) Functional safety communication
4) PLC to motion controller communication The requirements for the communication system regarding latency are decreasing from 1 to 4. Whether it makes sense to establish links 1.-4. over a wireless communication technology is application dependent. In most cases it might be most relevant to establish wireless links for 2), 3) and 4), but perhaps not for 1).

Cloud Robotics

In industrial robotics research and robotics in general, cloud robotics is a major topic. It describes how different cloud technologies can be used to provide additional benefits for various robotics tasks and thereby improving the flexibility and the capabilities of the whole system. Several studies have already shown the benefits of connecting robots to a cloud:

- Usage of more powerful computing resources in the cloud (e.g., for artificial intelligence, AI, tasks).
- Use of almost unlimited data for analytics, decision making and learning (including digital shadows and real-time simulations).
- New types of use-cases are enabled (e.g., cooperative control in cloud).
- Lower cost per robot, as functionalities are offloaded to a central cloud.
- A possibility to perform a failover in case one robot physically breaks from an up-to-date backup in the cloud.
- Reliability of functions can be improved by running multiple instances as hot standby in the cloud and the operation can immediately be taken over from faulty primary function without interruption.
- Makes the operation and maintenance easier (software updates, configuration change, monitoring, etc.).
- Saving energy, particularly for mobile, battery driven, robots, by offloading CPU energy consumption to the cloud.

High flexibility is indeed a key requirement for Industry 4.0. It is needed to realize cost effective and customized production by supporting fast reconfiguration of production lines, as well as, easy application development. Typical industrial applications are time-sensitive and require highly reliable communication end-to-end. Therefore, 5G URLLC and edge cloud are necessary technologies to address the requirements. Although some cloud robotics applications don't require real-time communication, still some do heavily, especially if the cloud's processing is relevant for the immediate motion of the robot. In the following, some of the major challenges with industrial applications that can be addressed with cloud robotics are listed:

- Fast closed loop control (1-10 ms) between controller and device.
- Wireless link between controller and device.
- Real-time industrial application in cloud execution environment (e.g., servo controller).

Industry-grade reliability (e.g., the same as with cable based ProfiNet).

Flexible production lines (easy rearrangement and reprogramming, low delay software updates, reconfiguration, i.e., FaaS capability).

Cooperative control and modular architecture.

Adaptive algorithms (e.g., for human-robot collaboration the control has to be adaptive to changing dynamic environments and need learning and cognitive capabilities).

Shared data for different control applications.

In the following, briefly described are some cloud robotics scenarios that involve (real or emulated) 4G/5G connections and cloud technologies for industrial robotics applications.

One application of cloud robotics is to replace the hardware Programmable Logic Controller (PLC) in a robot with a software version (soft-PLC) and run that in a virtualized environment/cloud on commodity HW components. A concept study of this involved a real robot cell with two large robot arms, a conveyor belt and some other industry devices. For the communication, ProfiNet was used.

Figure 12:
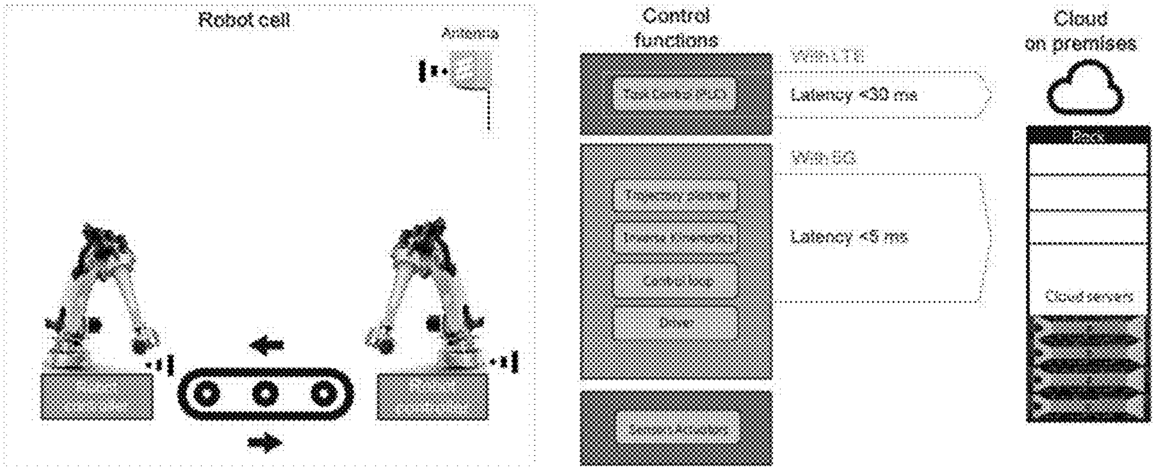
FIG. 12 shows control functions in a cloud.

One issue is what level of robot control can be shifted to the cloud over LTE. This is illustrated in FIG. 12. The high-level control that is typically done by the PLC is not very delay critical, i.e., it has a latency requirement of several tens of milliseconds (e.g., –30 ms), depending on the configuration. However, the whole communication is very sensitive to delay variations (jitter) and packet losses. For instance, in the case of periodic traffic with 8 ms frequency, three consecutive packet losses or 3*8 (24) ms jitter can make the whole robot cell stop. Those requirements are straightforward to fulfill when using dedicated hardware components over a cable-based solution but can be challenging using virtualized execution over wireless technologies.

From the cloud platform perspective, one of the main challenges that virtualized control brings in is the execution of real-time applications. An application might use a soft-PLC that uses Windows 7 as a base OS, next to a real-time OS that is responsible for executing the PLC code. Both run in parallel and communicate via inter-process communication (IPC). The control logic implementation is always executed by the RTOS and Windows is often used as a user interface. The RTOS typically has some specific requirements to ensure the necessary performance such as precise timers and specific network interface cards. A virtualized environment that can host the software PLC platform and execute the same control logic as the one that was running on the hardware PLC can be created.

In a real factory environment, placing the PLC-level of control logic from dedicated HW into an edge-cloud platform is feasible, and works adequately even over LTE. However, if we investigate applications such as trajectory planning, inverse kinematics and control loops that accurately steer the speeds, accelerations or positions of the actuators, significantly lower latency in the range of 1-5 ms is required. To support those applications, the ultra-reliable and low-latency service of 5G is essential, as shown in FIG. 12.

Figure 13:
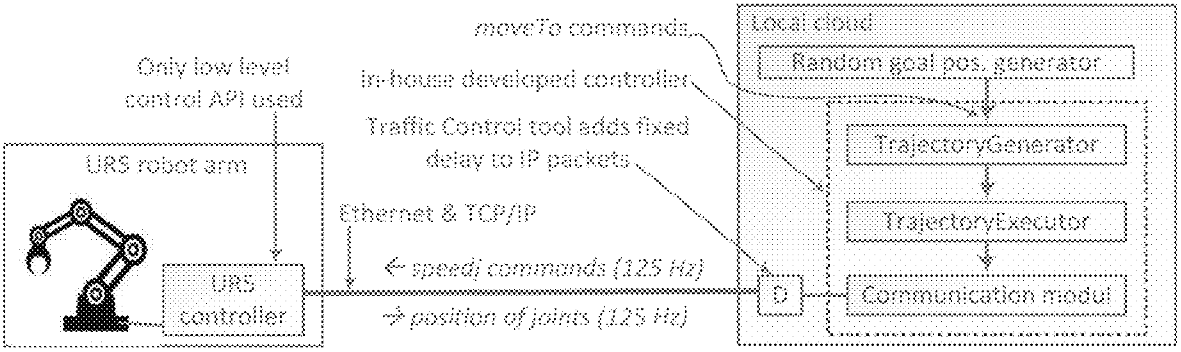
FIG. 13 illustrates an architecture for remote robot control over a modelled wireless link.

One motivation behind moving motion control of robots to the cloud is again to increase flexibility. For instance, much easier to rearrange production lines with cloud-controlled devices, since only the devices need to be moved (no controller boxes), easier to manage, reprogram, do failover, or software updates in such an environment. However, some functionalities should remain inside/close to the robot (using cables), for instance, some safety mechanisms in case of connectivity problems. The requirements on the network are lowered if the robot could also perform its task without connectivity. In case of temporarily connectivity loss or reduced performance (due to for example extended robot mobility on the shop floor) the robot could reduce its working speed or activate other mechanisms to ensure safety or process targets while being independent from the network. The robot controller as an additional entity next to the robot itself should be removed from the shop-floor. An architecture for this type of deployment is shown in FIG. 13.

Another approach could be that the motion control is done inside the robot autonomously and the connectivity is used only to enable new use-cases such as cooperative robot control. For cooperative control, one control entity may still need quick access to the actual state of the other control processes. This option is valid in some scenarios when, for example, the motion control has 5 ms control loop inside the robot, but it needs to coordinate with another instance only in every ~100 ms.

A robot controller including trajectory planning and execution, has been implemented, with the performance of a robot arm control application from a local cloud over a modelled wireless channel being evaluated. The application under evaluation included the closed-loop control of a industrial robot arm, where control was connected to the robot arm through a modelled 5G link.

The effect of the link delay on the performance of the robot arm movement quality can be measured by specific key performance indicators (KPIs). The industrial robot arm has an externally accessible velocity control interface that accepts velocity commands for each joint (servo) and publishes joint state information with 8 ms update time. KPIs may be response time and precision of trajectory execution, i.e., spatial and temporal deviations from the planed trajectory. Measurements have shown that network delays below 4 ms have no significant performance impact in this application. This is because (1) the internal operation of the robot ends in about 2 ms standard deviation in response time due to the internal sampling used in the robot, and (2) the ticks of the robot and the controller are unsynchronized. The impact of network delays below 4 ms is masked by the background “noise” of the measurement setup.

Several other conclusions can be reached:

Reaction on external events: low network delay is desired, because the network delay between robot and controller directly increases the reaction time.

Realtime trajectory refinement (i.e., accurate positioning of the end of the robot arm): Deadline on trajectory execution time leads to requirement on maximum tolerable network delay. In general, higher network delay makes the refinement time longer and, in this way, increases the total trajectory execution time.

Trajectory Accuracy: Some tasks require accurate movement along the path such as welding, and not only at the final position. Another example is the collaboration of more robot arms where the precise and synchronized movements are crucial. For these tasks, low network delay is desired if external information shall be respected in the trajectory planning.

The internal mechanisms of a robot arm can also put requirements on the network delay. In general, a system with low update time requires lower network delay. For instance, the control of a robot arm with 20 ms update time, tolerates higher network delay than a more precise and faster robot arm with 1 ms update time. In addition to this, providing ultra-low latency connection for a system with relatively high update time has limited performance advantage.

Performance requirements of trajectory execution can also put requirements on the network delay. Faster robot movements require lower network delay for accurate movement. On the other hand, if only a higher latency connection is available then using lower robot speed can compensate increased network delay to some extent. Performance optimization can also give guidelines for the required network delay. Choosing a proper required accuracy can improve the execution time. For example, if less accurate movement is enough, then relaxed accuracy can shorten the refinement time.

New robotic concepts and applications include massively collaborative robot control, as well as the use of digital twins in cyber-physical production systems. These are briefly discussed in the below sections.

Hexapod

Figure 14:
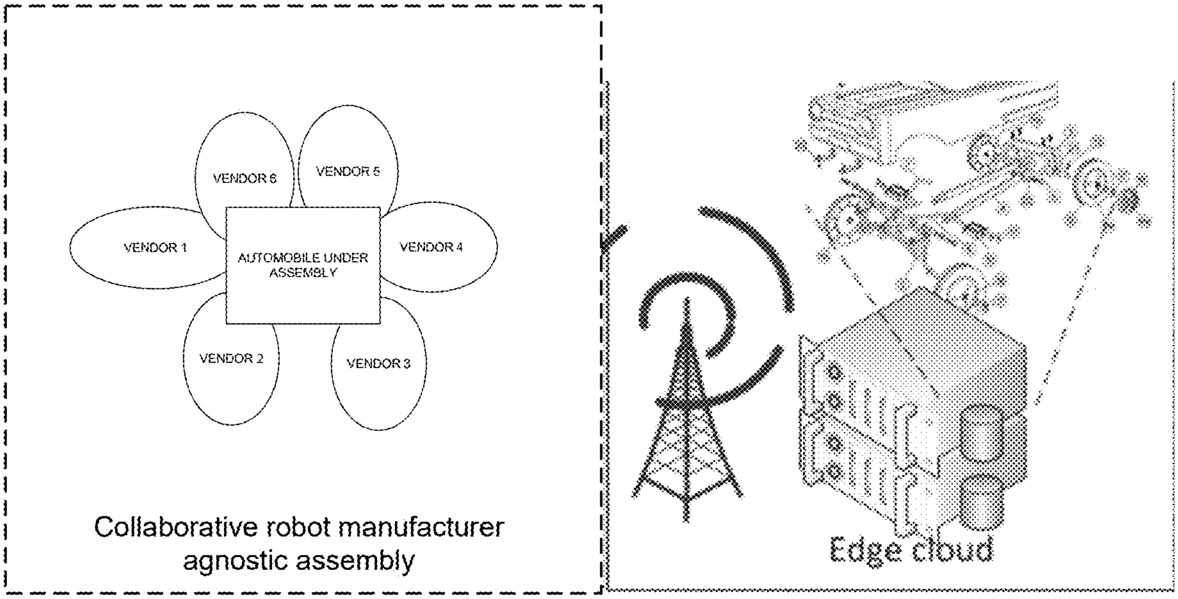
FIG. 14 illustrates an example of a collaborative manufacturer-agnostic robot assembly.

When introducing higher collaboration and adaptation capabilities into industrial applications such as robot arms and robot cell control, collaboration of a massive number of servos may be required, making the use case even more challenging. The hexapod robot is a useful application for evaluating a wide spectrum of challenges arising in an Industry 4.0 robot cell, e.g., servo control, collaboration, etc. FIG. 14 illustrates a hexapod robot, which may be viewed as a collaborative, robot-vendor-agnostic system, coupled with a 5G slice for cloud-based control.

The hexapod can be considered as six 3-degree of freedom robotic arms connected via a base link. For evaluating 5G requirements, the servos at the 18 joints may be controlled separately from a computer residing a wireless network hop away from the hexapod. This way the hexapod proves to be an appropriate choice for visualizing the effect of synchronized collaboration. Well-synchronized collaboration should result in a stable center position, while any glitch in the system results in jiggling of the platform. Results of an evaluation of wireless control of the hexapod have been reported in Geza Szabo, Sandor Racz, Norbert Reider, Jozsef Peto, "QoC-aware Remote Control of a Hexapod Platform," ACM Sigcomm, Budapest, 2018.

Digital Twin

The Digital Twin (DT) concept is useful for analyzing the effects of network on the control of a real robot, where its DT runs in a complex robot cell executing agile robot tasks. A realizable DT may be implemented in the Gazebo simulation environment and evaluated against a fully simulated scenario solving the Agile Robotics for Industrial Automation Competition (ARIAC). This evaluation deals with issues of the different command frequencies, control loops and handling of dynamics of the real and simulated robot. An evaluation of the architecture in a hardware agnostic Gazebo plugin shows that the simulation of the network controlling a simulated robot can be used in low-delay scenarios. In high-delay scenarios the simulated latency provides approximately ~10% more room regarding the delay size till the complete failure occurs in the robot cell. These results are reported in Ben Kehoe, Sachin Patil, Pieter Abbeel, Ken Goldberg, "Survey of Research on Cloud Robotics and Automation," IEEE Transactions on Automation Science and Engineering (T-ASE): Special Issue on Cloud Robotics and Automation. Vol. 12, no. 2. April 2015.

Positioning

Positioning is recognized as an important functionality in industry and manufacturing scenarios, with use cases such as personnel tracking (e.g., in mines), safety (e.g., when working close to forklifts), locating tools in manufacturing/assembly floors, supply chain optimization, operation of automatic guided vehicles, etc. Most use-cases require only relative positioning, e.g., where all positions are defined relative to a common reference point in a factory hall.

The required positioning accuracy, as well as the environment and radio conditions where positioning is to be performed, vary significantly between different use cases. However, most manufacturing use cases are indoor, like for example a factory hall or the tunnels in a mine. This implies that global navigation satellite system (GNSS) based solutions are difficult to use because of the very low signal strength levels received indoors from satellite transmissions, resulting in no or bad coverage.

The limitations of GNSS systems indoors have opened for cellular based positioning solutions. Commonly used positioning solutions in industries and factory floors today are based on Wi-Fi, radio-frequency identification (RFID), Bluetooth low energy (BLE), ultra-wide band (UWB) and LTE. Narrowband (NB)-IoT and CAT-M are 3GPP LTE technologies to address low complexity, low power, low cost devices, and are therefore the only realistic 3GPP positioning solution for use cases where the asset to be positioned doesn't already contain a 3GPP modem for communication needs. Radio solutions, such as RADAR, and non-radio solutions, like LIDAR and computer vision systems, are also important especially when positioning with high (sub-meter) accuracy is required.

Multipath propagation is often a critical error source for positioning. In industry halls, the delay spread of the paths is typically relatively short, but these are still critical given the requirements for accurate positioning in such environments. Most positioning algorithms work under the assumption of availability of line-of-sight measurements and there are no straightforward ways to distinguish between line-of-sight (LoS) and non-line-of-sight (nLoS). If an nLoS path is mistakenly used instead of a LoS path for positioning, both the time-of-flight and the angle of arrival might be misleading. The time-of-flight of the nLoS path will be an upper bound of the time-of-flight of the LoS path, while the angle of arrival can be completely wrong. Therefore, nLoS paths may greatly degrade the performance of positioning algorithms. Future industrial positioning schemes need to tackle this issue satisfactorily.

Another obstacle to precise positioning is network synchronization errors. Practical network synchronization algorithms can imply network synchronization errors of up to 360 ns, which corresponds to ±110 m of positioning error. A promising alternative to improve the positioning accuracy is radio-interface-based-monitoring (RIBM). This solution is based on base station timing measurements of positioning reference signals from neighboring base stations and estimates the synchronization offset between base stations so that "virtual synchronization" with much better accuracy can be provided. Alternatively, positioning techniques that don't require network synchronization, e.g. techniques based on round-trip time and/or angle of arrival measurements, can be considered. Note that any estimates of positioning accuracy stated herein assume that good network synchronization has been achieved, e.g. using RIBM.

Positioning accuracy, especially between time instants where measurements are performed, can be significantly improved by considering the trajectory of movement. Furthermore, inertial measurement units (IMUs) are becoming increasingly widely adopted in terminals as a means of updating position estimates. They use accelerometers and gyroscopes (and sometimes also magnetometers) to track movement of the terminal.

Deployment Aspects

To reduce cost and simplify deployment, solutions where one system is used both for communication and positioning are preferred. This is especially important in environments where deployment of a separate positioning system is difficult and costly, for example in mines where the installation cost of each node is often high. However, if the communication deployment, which may comprise one or a few micro base stations, for example, doesn't provide sufficiently good positioning accuracy, a separate or complimentary positioning system added on top of the communication system may be the best solution, since high-precision positioning typically requires a much denser deployment than communication.

The positioning accuracy that can be achieved depends to great extent on how dense the deployment is and the characteristics of the radio environment. Densification of the communication network may thus be a means to achieve improved positioning accuracy. A dense deployment is especially important in environments with severe multipath propagation, especially if the multipath propagation is dynamically changing, since there may otherwise not be sufficiently many LoS paths available to estimate the position. A dense deployment may also be necessary to ensure that hidden objects with high signal attenuation can be localized.

The density of the network is a key aspect for providing good enough positioning accuracy in manufacturing scenarios. Another deployment aspect to consider is how simple it is to install the anchor nodes. Installation may for example include manually providing the exact position of the anchor, which may be difficult, time consuming and error prone. To avoid this, a simultaneous localization and mapping (SLAM) algorithm may be used to estimate the position of each anchor in the initialization phase.

To make dense deployments cost effective, the cost of each anchor must be kept low. However, the cost of each anchor/base station for technologies providing both communication and positioning is naturally higher than for technologies only providing positioning, e.g. RFID and UWB. One way to reduce the cost involved in densification of the communication network to achieve high-precision positioning may be to develop simple anchors, using the same technology as the costlier base stations, with reduced capability that only provides positioning. For example, only one or a few highly capable NR base stations mounted in the ceiling of a factory hall may be sufficient to provide communication coverage. Less capable NR positioning nodes/anchors can then be used for densification to achieve positioning with high accuracy.

Another way to reduce the need for a very dense deployment may be to combine the advanced beamforming capability of NR with reflectors. In this way, every pair of transmit beam and reflector may act as a virtual anchor, thereby achieving the benefits of a very dense deployment with only a few NR base stations. One challenge with such a solution is stability, since the reflectors should be stationary or at least only slowly changing to ensure a stable positioning accuracy.

Spectrum Aspects

It is well-known that positioning accuracy improves with increased bandwidth. Furthermore, higher signal bandwidth enables greater resolution of the LoS leading edge from the nLoS dominant received signal and it is therefore easier to accurately detect the LoS paths. On the other hand, using higher carrier frequency may reduce the detectability of the LoS path due to increased signal attenuation.

Frequency bands for local usage are currently being defined, e.g., the 3.7-3.8 GHz band in Germany and Sweden. Nation-wide spectrum and/or unlicensed spectrum may be used for industries as well. 100 MHz bandwidth should be sufficient to achieve sub-meter positioning accuracy. To improve performance further, different spectrum chunks may be combined.

Accuracy Requirements

Positioning accuracy requirements range from millimeter to several tenths-of-meters level. For example, drilling and blasting in mines as well as automated manufacturing (alignment, assembly) may benefit from millimeter-to-centimeter accuracy. Other examples where centimeter-to-decimeter accuracy is desired include locating tools in manufacturing/assembly floors and tracking of automated guided vehicles. Decimeter-to-meter accuracy is required for some safety solutions, for example tracking of personnel and real-time warnings for personnel working close to a forklift, but also when considering for example supply chain optimization and asset tracking (e.g. tools, machines).

3GPP have documented positioning requirements for 5G positioning services in TS22.104, Section 5.7, "Positioning performance requirements." Table 2 excerpts some of these requirements. According to 3GPP, depending on the use case, the 5G system should support the use of 3GPP and non-3GPP technologies to achieve higher-accuracy positioning.

TABLE 2

Summary of Positioning Requirements from 3GPP TS 22.104

| Scenario | Horizontal accuracy | Availability | Heading | Latency for position estimation of UE | UE Speed |
|---|---|---|---|---|---|
| Mobile control panels with safety functions (non-danger zones) | <5 m | 90% | N/A | <5 s | N/A |
| Process automation-plant asset management | <1 m | 90% | N/A | <2 s | <30 km/h |
| Flexible, modular assembly area in smart factories (for tracking of tools at the work-place location) | <1 m (relative positioning) | 99% | N/A | 1 s | <30 km/h |

TABLE 2-continued

| Summary of Positioning Requirements from 3GPP TS 22.104 | | | | | |
|---|---|---|---|---|---|
| Scenario | Horizontal accuracy | Availability | Heading | Latency for position estimation of UE | UE Speed |
| Augmented reality in smart factories | <1 m | 99% | <0.17 rad | <15 ms | <10 km/h |
| Mobile control panels with safety functions in smart factories (within factory danger zones) | <1 m | 99.9% | <0.54 rad | <1 s | N/A |
| Flexible, modular assembly area in smart factories (for autonomous vehicles, only for monitoring proposes) | <50 cm | 99% | N/A | 1 s | <30 km/h |
| Inbound logistics for manufacturing (for driving trajectories (if supported by further sensors like camera, GNSS, IMU) of autonomous driving systems)) | <30 cm (if supported by further sensors like camera, GNSS, IMU) | 99.9% | N/A | 10 ms | <30 km/h |
| Inbound logistics for manufacturing (for storage of goods) | <20 cm | 99% | N/A | <1 s | <30 km/h |

Overview of Positioning Technologies

Below, an overview of positioning technologies that may be useful for manufacturing is given, with some focus on how they can be applied in a manufacturing scenario. The focus lies on 3GPP techniques, but a number of other techniques are considered here as well. Positioning using RFID and BLE beacons has not been included in this overview, but it will be appreciated that many of the same principles apply there, and that the various technologies described herein may be combined with these and other positioning technologies.

LTE OTDOA

Since Release 9, LTE supports observed time-difference of arrival (OTDOA) positioning, which is based on reference-signal time difference (RSTD) measurements that are described in 3GPP TS 36.305. The UE receives positioning reference signals (PRSs) from neighboring cells, estimates time of arrival (TOA) for each cell using RSTD measurements, and reports back the TOA with respect to a reference cell. Afterwards, the evolved serving mobile location centre (E-SMLC) estimates the position of the UE based on known eNB positions. The time difference of arrival (TDOA) is used with respect to a reference cell instead of TOA, because this removes requirement that the UE be time-synchronized, although the network needs to be synchronized. In principle, a minimum of 3 cells are needed for 2D positioning and a minimum of 4 cells are needed for 3D positioning.

Figure 15:
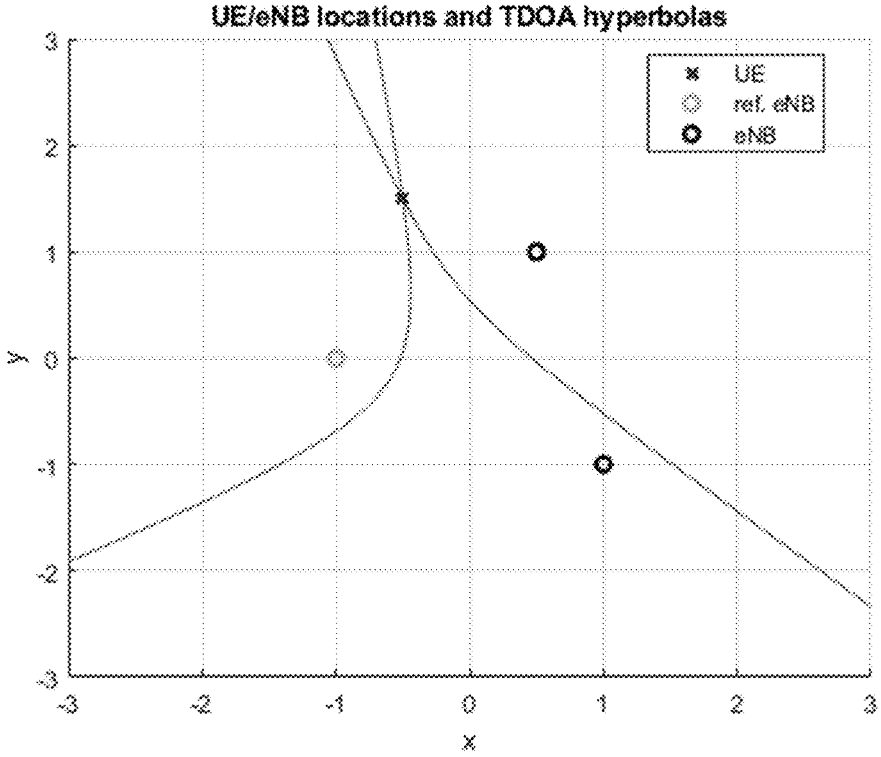
FIG. 15 shows principles of TDOA geolocation.

FIG. 15 illustrates how the UE position can be estimated from 3 eNBs, in accordance with the principles of OTDOA, and is a conceptual plot of 2D TDOA-based positioning, assuming perfect TDOA measurements. Each TDOA (TOA of reference eNB minus TOA of eNB) translates into a difference in distance (e.g., in meters) when multiplied by the speed of light. Each TDOA returns a hyperbola on the 2D plane of possible UE positions. The intersection of such hyperbolas is then the UE position. In practice, the position is estimated by the E-SMLC using Gauss-Newton search or similar numerical algorithms.

In LTE, RSTD can be estimated based on cell-specific signals or based on optionally defined PRSs. However, the TDOA estimation procedure typically uses PRSs because other cell-specific reference signals cannot guarantee high enough probability of detection of neighbouring cells at low (sub −6 dB) signal to interference and noise ratio (SINR). The PRSs are defined from Gold sequences initialized by time variables (slot number within a frame and OFDM symbol number within a slot) and PRS ID, and allocated in a diagonal pattern that is shifted in subcarrier. Essentially, three main factors contribute to high PRS detectability:

- The Gold sequences guarantee low cross-correlation properties.
- There are 2 PRS resource elements per resource block and OFDM symbol with a distance (reuse factor) of 6 subcarriers. The specific location of each PRS diagonal is determined by PRS ID mod 6. The subcarriers not used for PRS are empty in order to create LIS (low interference subframes).
- The PRS can be muted on some transmission occasions to increase the SINR when receiving PRS from distant cells.

The RSTD is drawn from the power delay profile (PDP) generated by cross-correlating the received downlink baseband signal with the PRS. The challenge here is to detect the earliest peak in the PDP which is not a noise peak and then take the peak delays in terms of multiples of samples. A major source of TOA error is nLoS conditions where the LoS path is not detected due to blocking or shadowing.

The positioning accuracy that can be achieved with LTE OTDOA in practical deployments is in the order of 50-100 m for Release 9. In LTE Release 14, the report resolution to the E-SMLC was changed from Ts to Ts/2, where Ts is the basic time unit in LTE (32.55 ns), to improve the relative distance resolution from 9.8 m to 4.9 m. It is however still unclear what accuracy can be achieved in practice. In addition, OTDOA requires network synchronization and any synchronization error reduces the positioning accuracy that can be achieved. For LTE, there are mobile broad band (MBB) UE chipsets available that cover most of the positioning methods standardized up to Release 14.

Figure 16:
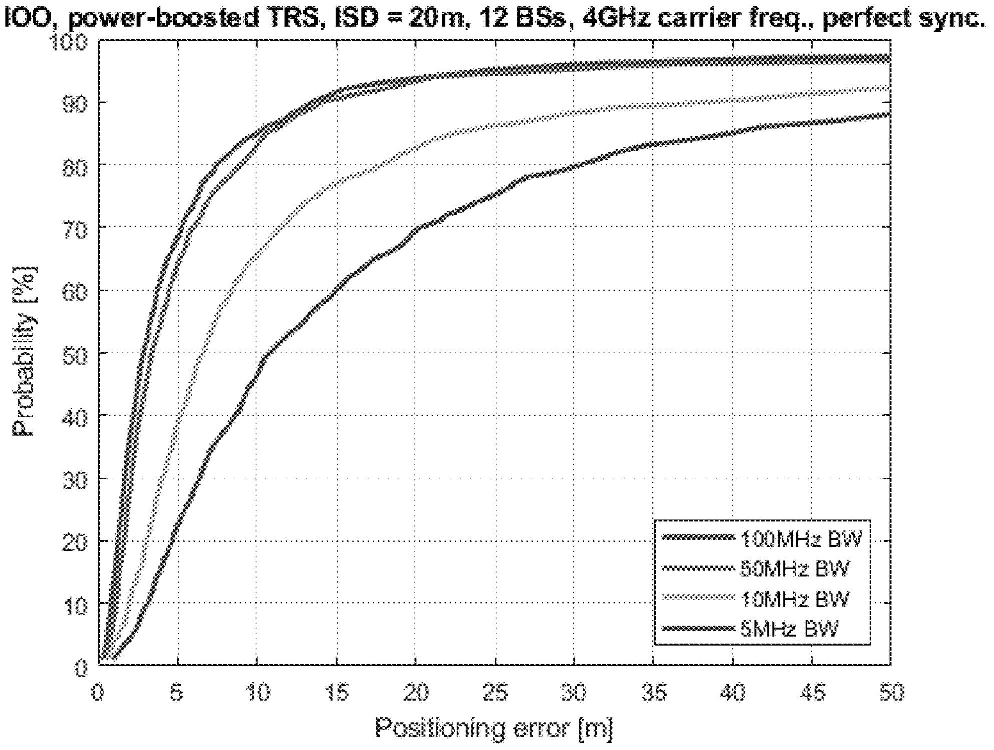
FIG. 16 shows cumulative distributions for positioning in the 3GPP Indoor Open Office (IOO) scenario, using different bandwidths.

FIG. 16 shows OTDOA positioning results for the 3GPP Indoor Open Office (IOO) scenario, using different bandwidths of 100 MHz (30 kHz SCS, 275 PRBs), 50 MHz (15 kHz SCS, 275 PRBs), 10 MHz (15 kHz SCS, 50 PRBs), 5 MHz (15 kHz, 25 PRBs). The plot is based on the use of the already existing tracking reference signal (TRS) for positioning as baseline in NR.

The scenario assumes 6 gNBs (a total of 12 gNBs) separated by 20 meters. ("gNB" is the 3GPP terminology for an NR base station.) The results show that the positioning accuracy is improved significantly when increasing the bandwidth from 5 MHz to 10 MHz and as much when further increasing the bandwidth to 50 MHz. However, it can also be seen that the 100 MHz and 50 MHz results do not differ much, with around 8 meters accuracy at the 80% percentile. The 100 MHz case can be further improved by using a more advanced peak search algorithm for time-of-arrival (TOA) estimation. In the current simulations, the earliest peak in the PDP that is at least half as high as the highest peak is taken as the LOS peak. If the signal-to-noise ratio (SNR) is increased, the probability of detecting a peak above the noise floor can be improved. Furthermore, errors larger than the inter-site distance (ISD) of 20 m can in practice be compensated by combining with a simple cell-ID (CID) estimate if the OTDOA becomes unreasonable, which is not done here.

Narrowband (NB)-IoT and CAT-M are 3GPP LTE technologies to address low complexity, low power and low-cost devices. The availability of such low-cost devices makes this the only realistic 3GPP solution for use cases where the asset to be positioned doesn't already contain a 3GPP modem for communication needs. However, the positioning accuracy is significantly worse when using IoT devices, mainly because of the narrow bandwidth used. A simulation study demonstrated 100 m positioning error at the 70% percentile for NB-IoT in an indoor deployment, while LTE using 50 PRBs for positioning gave ~23 m at the 70% percentile in the same scenario.

The narrow bandwidth of NB-IoT devices is compensated partly by enabling longer PRS occasions in time. However, the correlation properties are poor since the PRS is repeated every frame (10 ms). NB-IoT devices also have lower sampling rates to reduce power consumption, which reduces the accuracy of RSTD measurements.

Chipsets for LTE IoT-devices are not as readily available as for LTE MBB. However, development is ongoing, and the availability is slowly improving.

IoT positioning for NR is not defined as of December 2018, but one enabler for better IoT positioning accuracy is to improve the time-correlation properties of the PRS, e.g. by increasing the PRS repetition interval. Carrier-aggregation for NB-IoT has also been discussed and the increased bandwidth may in this case be another enabler for improved IoT positioning. Another alternative may be to modify the phase of the eNB PRS, thereby ensuring that the NB-IoT devices can sample at low rates and still detect the phases of the PRSs.

LTE Enhanced Cell-ID Positioning

Enhanced Cell ID, or E-CID, was introduced in LTE Release 9. The UE reports to the network the serving cell ID, the timing advance and the IDs, estimated timing and power of the detected neighbor cells. The eNB may report extra information to the positioning server, like the angle of arrival, cell portion, round-trip time, etc. The positioning server estimates the UE position based on this information and its knowledge of the cell's locations.

The accuracy of E-CID depends mainly on the deployment density. For outdoor deployments, the accuracy of E-CID may be in the order of 100 m, for urban environments with ISD of less than a few hundred meters, or in the order of 3000 m, for rural environments with ISD up to several kilometers. The accuracy of E-CID for manufacturing-like environments has not been studied, but the accuracy is expected to be in the order of the ISD, since the environment contains many multipaths and for example angle-of-arrival data may be misleading, due to reflections. On the other hand, even in such a challenging scenario, RF fingerprinting should be able to give an accuracy of a few meters if the radio propagation is stable and a calibration/training phase is feasible.

NR Positioning Features

As of December 2018, there is no defined concept for NR positioning. One can envision NR features which enable improved positioning accuracy over LTE OTDOA. Some of these features come with new challenges as well:

- Better ranging and angle-of-arrival/departure (AoA/AoD) estimates in beam-based systems.
- Higher carrier frequencies are supported in NR, meaning that signals are more susceptible to blocking/shadowing. This may in part be handled by beamforming. Furthermore, higher carrier frequencies typically come with wider bandwidths, enabling better RSTD resolution.
- Denser deployments in terms of smaller inter-site distance and cell radius. This, combined with beamforming using beam IDs for specific beams, require more sophisticated Gold sequence initializations to preserve code orthogonality for all possible beam/cell-ID combinations.
- Better time alignments are expected in NR, thereby reducing the time synchronization error.
- The basic time unit is reduced in NR compared to LTE. The maximum number of PRBs is 275 (compared to 110 in LTE), requiring an FFT length of 4096 which is double to that of LTE. Furthermore, the sub-carrier spacing ranges from 15 kHz to 240 kHz. Essentially, this implies shorter sampling intervals than in LTE, improving the TOA positioning resolution.

Expectations are that the solutions standardized for NR Rel-16 will provide the tools needed to achieve sub-meter accuracy. Link-level simulations showing the technology potential of NR indicate that sub-decimeter accuracy could be possible in theory. The Release 16 NR positioning 3GPP study item started in October 2018.

Positioning Using the Radio Dot System

Ericsson's Radio Dot System (RDS) is well suited for communication in indoor industry and manufacturing scenarios. However, with RDS products available as of December 2018, only cell-ID based positioning is available, since it is not possible to distinguish DOTs connected to the same IRU from each other. Furthermore, an RDS is often deployed with large cells since up to 8 DOTs can be connected to the same IRU. With the digital 5G DOT, up to 16 DOTs can be connected to the same IRU.

Improvement of the positioning accuracy, making per DOT positioning possible, has been proposed. UE position is calculated using an uplink time difference of arrival (UTDOA) algorithm combined with DOT level power. Simulations have shown that positioning errors of less than 1 meter can be achieved with good SNR and good DOT geometry layout. However, positioning errors in the order of 1-5 meters are likely, when taking various error sources, like the accuracy of DOT positions and DOT cable length delays, into account.

For typical manufacturing scenarios with severe multipaths, it appears that the radio dot system (RDS) is the most suitable solution for providing combined communication and positioning, due to dense deployment and low cost of the nodes.

Wi-Fi Positioning

Wi-Fi is already commonly deployed in industries and is therefore often used for positioning as well. One commonly deployed Wi-Fi solution is the ARUBA solution, which can achieve, with access point received signal strength indicator (RSSI) alone, around 5-10 m accuracy, depending on shadowing and antenna patterns. To achieve better positioning accuracy, the ARUBA solution can be combined with Bluetooth low energy (BLE) battery powered ARUMBA beacons. With this specialized positioning solution, very good accuracy of <3 m is likely to be achieved, and even accuracy of <1 m can be possible when the device to be positioned is located close to a beacon.

The leading industrial Wi-Fi positioning solution achieves 1 m to 3 m average accuracy in office environments. This positioning solution includes an additional WiFi radio, with a specialized antenna array, that is included in the same unit as the WiFi radio used for communication. The positions are estimated using a combination of RSSI and angle-of-arrival (AoA) measurements.

A difference between Wi-Fi positioning and 3GPP based OTDOA positioning is that Wi-Fi positioning (IEEE 802.11mc) may be based on round-trip time (RTT). In contrast to the OTDOA algorithm described above, the advantage of using RTT is that there is no need for network time synchronization.

UWB

Ultra-wide-band (UWB) techniques have become increasingly popular in positioning solutions, since the inherent high time resolution in UWB signals enable precise positioning. There are several UWB-based positioning products available. Many of them are based on DecaWave UWB technology, but there are also proprietary solutions (e.g., Zebra).

UWB can be used in multiple algorithms. It can support downlink or uplink TDOA, angle of arrival using multiple antennas, as well as direct range measurements, where network time synchronization is not needed at all.

Due to the nature of the very short transmission pulses used in UWB techniques, UWB can detect and eliminate problems due to multipath propagation, since reflections are individually detected and can be filtered. This is a clear advantage compared to narrow band systems, where such discrimination is not possible. The precision of time of flight is in the range of 2-5 cm. When applied in a real environment, the positioning accuracy with UWB is on the scale of 10 cm.

One advantage of UWB is the potential for cheap devices, compared to 3GPP modules. Commercial UWB transceivers are available for approximately 3-4 USD. This enables increased installation density, flexible choice of algorithms to support various use-cases and cloud platform to support a global ecosystem that can serve various segments globally.

Lidar

Some positioning techniques estimate the distance by measuring the round-trip delay of an ultrasonic or electromagnetic wave to the object. Ultrasonic waves suffer large losses in air and cannot reach distances beyond a few meters. Radars and lidars use electromagnetic waves in radio and optical spectra, respectively. The shorter wavelengths of the optical waves compared to the radio frequency waves translates into better resolution and lidar solutions are therefore a favorable choice for high accuracy positioning. As in radar solutions, the main components of a typical lidar include a transmitter and a receiver and the distance is measured based on the round-trip delay of light to the target. This is achieved by modulating the intensity, phase, and/or frequency of the waveform of the transmitted light and measuring the time required for that modulation pattern to appear back at the receiver.

Popular lidar architectures include pulsed and frequency-modulated continuous-wave (FMCW) schemes. Pulsed lidars rely on the particle properties of light and can provide moderate precision over a wide window of ranges, while FMCW lidars rely on the wave properties of the light. In these lidars, the modulation is applied to the frequency of the light field and the large frequency bandwidth in the optical domain becomes accessible and can be exploited to achieve very high precision localization with accuracy in the nanometer range.

Summary of Positioning Techniques

Important properties of the positioning techniques discussed in this section are summarized in Table 3. Note that the accuracy numbers stated are only for indicative purpose. The actual positioning accuracy depends on various factors, including but not limited to the network deployment, cell planning, radio environment, etc.

TABLE 3

Summary of Positioning Techniques

| | Method | Accuracy | Devices and anchors | Integration with comm. system | Network synchronization required | Deployment aspects |
|---|---|---|---|---|---|---|
| LTE | OTDOA | Rel-9: ~50-100 m Rel-14: Standard support for ~5 m | Expensive devices and anchors Can be used with NB-IoT if cheap devices are required | Yes | Yes | A few eNBs in the ceiling are often sufficient for communication coverage in a factory hall |
| NR | OTDOA AoA | Sub-meter accuracy is expected | Expensive devices and anchors expected, at least in the near future | Yes | OTDOA: Yes AoA: No | A few gNBs in the ceiling are often sufficient for communication coverage in a factory hall |

TABLE 3-continued

Summary of Positioning Techniques

| | Method | Accuracy | Devices and anchors | Integration with comm. system | Network synchronization required | Deployment aspects |
|---|---|---|---|---|---|---|
| Radio Dot | CID UTDOA | Today: Cell-ID only, ~30-200 m H2 2020: Per-dot localization support, ~3-5 m | Medium cost per anchor | Yes | CID: No UTODA: Yes | Typically deployed with 20 m ISD |
| NB-IoT | OTDOA | LTE OTDOA: 100 m at 70%-percentile indoor RDS: In future, <5 m may be possible | Cheap devices | Yes, for limited throughput and relaxed latency requirements | Yes | One eNB can be sufficient for communication coverage, but denser deployment is needed to perform positioning |
| Wi-Fi | RSSI AoA RTT | Standard solution: 5-10 m Specialized solution: 1-3 m | Relatively expensive anchors when specialized for positioning | Yes | No | Typical coverage range is around 50 m, but Aps are often deployed more densely |
| UWB | OTDOA UTDOA AoA RSSI | Products on the market claim 0.1 m accuracy | Cheap devices and anchors Complexity and power consumption in anchor rather than in device | No | OTDOA:Yes UTDOA: Yes AoA: No RSSI: No | Often deployed very densely, e.g. with 10 m ISD Solutions for simple configuration are available |

Hybrid Positioning

Figure 17:
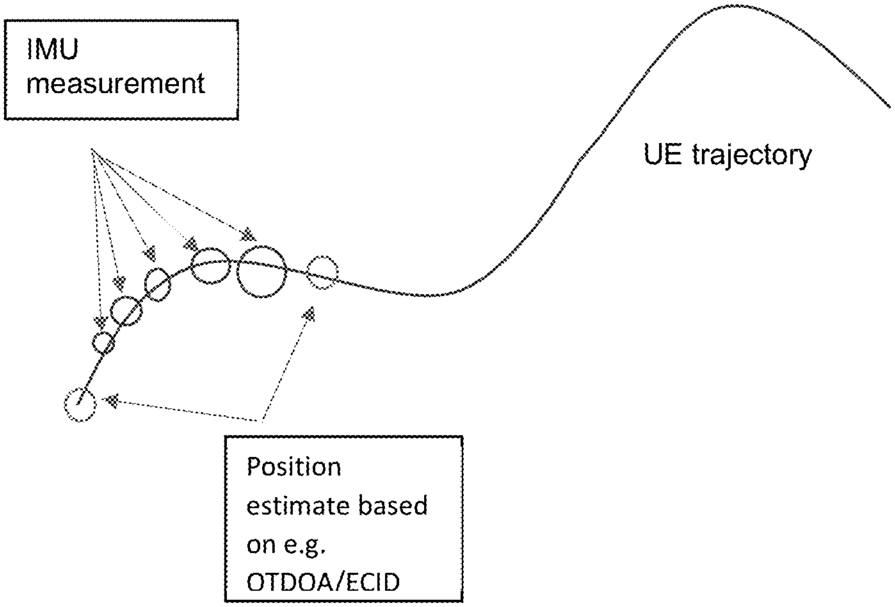
FIG. 17 illustrates principles of hybrid positioning.

Many devices in the market today are equipped with sensors such as an inertial measurement unit (IMU). The IMU may contain a 3-axis gyroscope and a 3-axis accelerometer, for example. Data provided by the IMU can enable the location server to estimate the UE trajectory between, after, or during an OTDOA/E-CID positioning session, and can reduce the need for frequent OTDOA/E-CID measurements. A hybrid positioning solution using IMU may also be beneficial in scenarios where the device may move out of positioning coverage part of the time, thereby increasing the positioning reliability. An example use of IMU data together with position estimates is illustrated in FIG. 17. The same method may be applied even if IMU measurements are not available, by estimating the speed and direction from old position estimates and predicting the UE trajectory.

Note that a positioning system solely based on IMU is a relative positioning system, i.e., it can estimate the position of a UE relative to a known coordinate. For example, the pressure difference over a period translates to an altitude change, and an acceleration during a period indicates a change of speed.

In order to fuse the radio measurements with IMU data, it is required that the data reported from the IMU equipped UE is aligned with a standardized earth bounded coordinate system. Or, that the UE reported IMU measurements can enable the location server to translate the measurements into an earth-bounded coordinate system. To get the UE position in earth-coordinates, the orientation of the device is needed. A common method to determine the orientation is to use gyroscope, magnetometer and accelerometer. After the orientation is estimated, one can use the orientation and accelerometer to estimate the acceleration relative the coordinate system (accelerometer minus gravity). By having the relative acceleration, it is possible to estimate the relative displacement of the device by, for example, double integration.

LTE Rel-15 includes support for IMU positioning and specification of the signaling and procedure to support IMU positioning over the Location Positioning Protocol (LPP), as well as hybrid positioning that includes IMU related estimates.

Network Synchronization Accuracy

For OTDOA as well as uplink time-difference of arrival (UTDOA), which is the positioning method supported in LTE, network synchronization errors leading to errors in the TDOA estimates may dominate the overall positioning error. It is therefore important to understand what network synchronization accuracy that can be achieved. The synchronization errors can in principle be directly translated to positioning errors by considering the distance light travels during the timing error caused by the synchronization error, that is, a synchronization error of 1 ns corresponds to a positioning error of 0.3 m.

The synchronization error mainly consists of four additive parts:

1) Error in external synchronization reference delivered to the anchor (baseband unit for macro base station and DOT).
2) Synchronization error between anchor (baseband unit) and external synchronization reference.
3) Synchronization error within the radio base station (RBS).
4) Synchronization error between the RBS antenna and the UE.

When considering manufacturing scenarios, we have the following situation for each of the four parts:

1) The external synchronization reference typically comes from a GNSS receiver. A GNSS receiver might have an accuracy of <50 ns when it has LoS to a large portion of the sky, but when there is multi-path, the accuracy decreases rapidly and the assumed accuracy from an indoor GNSS receiver is <200 ns. The external synchronization can be improved by using a more expensive GNSS receiver with better multipath filtering and better internal accuracy.

2) The baseband unit can synchronize to a GNSS receiver with an accuracy of around 150 ns. This number can only be improved by using better hardware, that is, a new baseband unit.

3) The budget for internal distribution is 130 ns. What it will be in practice depends a lot of the hardware configuration of the RBS. The simplest is a single baseband unit connected directly with one hop to an antenna integrated radio (AIR) unit.

4) How large the synchronization error between the RBS antenna and the UE will be unclear. However, this error will not impact the OTDOA positioning error since OTDOA builds on the phase of the PRS observed by the UE in the position it is, and synchronization between network and UE is not required.

The discussion above assumes the RBS is time locked to the reference. When the RBS goes to time holdover, the accuracy may decrease.

The numbers above can be significantly improved by radio-interface based monitoring (RIBM), where the phase difference between an RBS antenna and a reference is measured and reported. The reported phase difference can then be accounted for when calculating the position of an object. The synchronization error remains, but the part of the error which is accounted for will not affect the OTDOA positioning accuracy. This is a promising method, since RIBM may achieve a virtual synchronization accuracy of about 20 ns between RBSs. Thereby, the external synchronization reference error 1) does not affect the OTDOA positioning and can be ignored.

For RDS, the synchronization between the DOTs connected to the same indoor radio unit (IRU) is in the order of 6 ns, under the assumption that the IRU contains common DOT hardware. This holds for both the legacy DOT available today and the digital 5G DOT that will be available in 2019. RIBM may be a solution to achieve synchronization between DOTs connected to different IRUs but may require a specialized feature to operate, since the standard RIBM algorithm require the node to be synchronized to receive when not transmitting, which DOTs do not.

In summary, practical network synchronization algorithms can imply network synchronization errors of up to 360 ns, when locked to the GNSS reference, which corresponds to a positioning error of up to ±110 m (3 sigma). If the RBS is in time holdover, the accuracy can be even worse. In the future, RIBM may provide virtual synchronization accuracy of about 20 ns, which corresponds to a positioning error of 6 m. For RDS, positioning using DOTs connected to the same IRU is affected by synchronization errors of about 6 ns, which corresponds to a positioning error of around 2 m. If DOTs connected to different IRUs are utilized to estimate the position, RIBM may in the future be applied to provide virtual synchronization accuracy of about 20 ns.

Improving Accuracy in Severe Multipath Scenarios

LTE OTDOA, as well as other positioning algorithms, suffer severe penalties in terms of positioning accuracy if there is no way to handle the problem of multipath. In essence, OTDOA assumes that the RSTD represents the LoS path, but it is in general hard to determine whether or not the LoS-path is blocked or very damped. At the very least, one can say that an nLoS path represents an upper bound on the distance between transmitter and receiver. The multipath problem is significant in typical industry environments, especially for high frequencies. Some approaches which address the multipath problem include:

Design the network to have good LoS conditions by placing nodes at favorable locations, for example by using a planning tool which can estimate the positioning accuracy of a number of reference locations. This may imply higher installation complexity and may not be feasible for industry environments with many moving objects.

Estimate nLoS using hypothesis testing, e.g., feasibility tests using positions from subsets of TOA/TDOA estimates. If the estimate is incoherent, categorize it as nLoS. This method may have high computational complexity for dense networks.

Another alternative is to consider position updates based on IMU measurements and dead-reckoning as a reference and categorize paths as nLoS if the measured TDOA doesn't match the reference position well enough.

Use an environment model for ray tracking and associate distance estimates with rays. In this way, nLoS estimates may contribute in a better way to the positioning estimation. Such environmental models are often not available but may be used if a digital twin is developed.

Estimation of nLoS using polarization. The polarization changes at the bounce events, so nLoS is detected if a reference polarization is erroneous.

Compare individual distance estimations with a communication-independent velocity/position measurement (gyro/accelerometer) to determine which estimations are feasibly LoS. Of course, not all UEs are equipped with such location sensors.

Rel-14 introduced an important enhancement to LTE OTDOA called multipath reference-signal time difference (RSTD). The main idea was to include several possible peak candidates from the power delay profile (PDP) and estimate the position using maximum likelihood. In this way, positioning accuracy was improved significantly, since the algorithm made no hard decisions on the LoS paths.

In summary, we can conclude that selection of the most suitable positioning system for manufacturing must take several different aspects into account, including:

Required accuracy

Required latency

Deployment aspects

Devices

When it comes to accuracy, there are industry use cases with positioning requirements ranging from mm-level accuracy to several tenths of meters. In an environment with a high probability of LoS and few blocking obstacles, it may be possible to estimate position within ten meters to a few tenths of meters accuracy in deployments with only one or a few micro base stations mounted, for example, in the ceiling of a factory hall. However, in many manufacturing scenarios, the reality is an environment with multipaths, reflections and many blocking obstacles. In such scenarios, it seems like the radio dot system (RDS) is the most suitable solution for providing combined communication and positioning, due to dense deployment and low cost of the nodes.

The accuracy numbers stated for different positioning techniques often assume that network synchronization is sufficiently good. However, in many cases network synchronization errors in the order of 10-20 ns, corresponding to 3-6 m positioning error, is very difficult to achieve. For positioning needs, virtual network synchronization achieved through RIBM is the most promising solution.

UWB solutions are becoming increasingly popular in industry and manufacturing use-cases due to the high accuracy and relatively cheap devices. However, one drawback is that the UWB solutions are not integrated with a communication system, which is the case for the 3GPP-based solutions, for example. In the future, NR may replace UWB, since NR will also use very wide bandwidth.

Positioning latency requirements in manufacturing are relaxed for most use cases. For example, keeping track of tools and assets don't require very frequent positioning updates. The most demanding manufacturing use cases in terms of positioning latency may be safety related. One example is a real-time alarm to warn workers when a forklift is close. The trade-offs between high accuracy and positioning latency for such a use-case have not been thoroughly studied yet.

The relation between device and anchor is also important to consider. For LTE and NR, both devices and anchors are complex and costly, and solutions built on these techniques are therefore not suitable for use cases where many small objects should be tracked, since each object must have their own LTE or NR device. In this case, UWB or RFID may be more suitable since most of the complexity lies in the anchor node and the device/tag is therefore cheap. 3GPP-based technology with cheap devices, such as NB-IoT or CAT-M, can be also be considered for this type of use cases, but since these techniques are narrowband, the positioning accuracy that can be achieved is low.

Spectrum

For industrial applications, some particular issues relating to spectrum include:

- Spectrum suitable for local usage,
- Regulatory means to enable local spectrum usage, e.g. leasing and local licensing,
- Technical means to enable local spectrum usage, e.g., evolved Licensed Shared Access (eLSA) and Citizens Broadband Radio Service (CBRS).
- 5G NR will be used as an access technology over a variety of frequency bands, including many that are currently used for LTE. A few frequency ranges are likely to be more globally harmonized, such as 3400-3800 MHz and the upper part of the range 24-29 GHz, although variations in band plans will likely exist. The study process for WRC-19 (World Radio Conference for 2019) leading up to the identification of bands for IMT2020 may yield additional millimeter-wave (mmW) spectrum bands where a good potential for harmonization exists, e.g. 37-43 GHz.

Recent regulation has designated bands for "local or regional use" (e.g., 3700-3800 MHz in Germany and Sweden, 3300 MHz in China). Such actions are not a global radio solution for Industrial IoT. Still, the introduction of these bands is a good first step for private use licenses of spectrum. It is not anticipated that these regulatory actions will spread across all markets immediately. Therefore, it is clear that additional access to globally harmonized spectrum will require opportunities derived from spectrum licensed to mobile network operators (MNOs), essentially through business arrangements that allow leasing of spectrum, or of capacity under well-defined Service Level Agreements (SLA).

The availability of mmW spectrum does pose challenges for Industrial IoT, mainly due to the time needed to establish products in the market, and the complexity of semiconductor manufacturing at such high frequencies. Building practices for equipment are not established, with significant challenges remaining on cost effective solutions for devices. Millimeter wave equipment may also offer some advantages: the propagation characteristics of narrow-beam transmitters can enable better reuse with transmit power control and beamforming, and coexistence can likewise be easier. The frequency bands are also suitable for wider bandwidth signals, although uncertainties remain in the amount of spectrum that may be made available for industrial wireless.

The fourth Industrial Revolution, known in literature as Industry 4.0, is an opportunity for 5G wireless technologies in manufacturing, exploration and process control situations within factories, mines, process industries etc. The exploitation of these opportunities will require access to spectrum, either unlicensed, shared or exclusively licensed. Indeed, there are clear indications from industry that lack of access to high-quality licensed spectrum is a key roadblock that has to be overcome. Access to licensed spectrum for Industrial IoT can be provided in one of three ways.

1. Service Level Agreements (SLA): Agreements with an MNOs can fulfill these requirements, with MNO-provided or provisioned service; e.g.,
   - On-premise MNO deployments on a turn-key basis or MNO permitting end-user deployment of approved equipment that is optionally connected to public networks. This case is not dealt with further in this discussion.
   - An alternative is to establish a private virtual network that guarantees capacity on an MNO network through the use of network slicing.
2. Spectrum Leasing: MNO acting as a Lessor towards verticals.
3. Local Licensing: The regulator license spectrum directly to verticals over a limited geographical deployment, typically associated with property rights for the covered area.

The regulatory situation for spectrum leasing is summarized below. The regulation for spectrum leasing is of interest for possible business models for 5G use-cases

- The US is most mature regarding spectrum leasing; regulations for leasing date back to 2003-2004. Spectrum leasing is used commercially. The public database Universal Licensing System (ULS) records all leasing agreements
- In South America, a few countries allow leasing between MNOs
- In EU, leasing of major mobile/cellular bands is allowed in regulation since 2012. It is not necessarily implemented in regulation in member states. No commercial leasing examples for MNO-owned frequencies to non-MNOs found so far
- In Asia, beauty contests generally prevent spectrum leasing in several important countries, and is thus not part of regulation
- In Africa spectrum leasing is generally not allowed.

Regarding local licenses, such licenses are presently non-existing for private/public use. Some 5G use cases, especially when associated with addressing industrial automation, would benefit from local licensing; 5G introduction offers an opportunity in this regard. Planned auctions of the first 5G band in Europe (3.4-3.8 GHz) have triggered regulatory activity in two countries (Germany and Sweden) by defining a particular realization of local licensing. In China, industry has shown interest in dedicated spectrum.

In order to give a complete view of possible solutions, unlicensed bands suitable for industrial applications are also mentioned. The unlicensed bands are generally unsuitable for URLLC due to the possibility of interference due to contention-based operation; the variation in access performance creates uncertainty in throughput and delay performance.

Evolved LSA (eLSA) is a solution, currently being specified, to support leasing and local licensing within regulations by the means of a database/controller architecture. The eLSA is supposed to support any band and be technology neutral. Similarly, the Citizens Broadband Radio Service (CBRS) in US, to be first used in 3550 to 3700 MHz band, will use a Spectrum Access System (SAS) to handle the regulatory requirements for that band. This is also a database/controller architecture that provides leasing opportunities for local area use while the actual licensing is covering larger areas as per FCC regulations. The SAS can be used for other bands as well given appropriate regulatory requirements. The eLSA and the CBRS would cater for co-existence between different deployments according to the required regulatory requirements in a country or region. However, the way in which coexistence is ensured differs between eLSA and CBRS.

Many different spectrum bands are identified for 5G. Here, only bands that are likely to use NR technology are discussed. For example, the 700 MHz band is identified as a 5G band within the European Conference on Postal and Telecommunications Administrations (CEPT), but will likely implement 4G. The same applies for APAC regarding the 700 MHz band. Also, the 2.3 GHz band has been discussed, for example in Sweden, but presently mainly in the context of 4G.

There are currently no 5G 3GPP harmonized bands valid and allocated in all countries of the world, but harmonized spectrum ranges, like 3400-3800 MHz, 24.25-29.5 GHz, do exist. Several 3GPP bands will be defined within each range. Many mmW bands pending allocation are dependent of the outcome from WRC-19.

Europe

The 3400-3800 MHz band is identified as a "pioneer band" for 5G in CEPT. The plans for different countries vary a lot, depending on incumbents with very different license expire dates. There are countries that plan to auction the full band and then usually 100 MHz blocks are proposed, like in Sweden. Others only have the upper or lower e.g. 200 MHz available presently, due to incumbent usage. This results in more narrow band licenses like in the UK. When the remaining spectrum becomes available new auctions will take place. This will result in non-consecutive spectrum holdings for the operators, if nothing is done, such as a re-allocation of the band. Re-allocation might not happen, since "carrier aggregation exists".

Most countries promote national licenses, except Germany and Sweden who propose to set aside 100 MHz (3700-3800 MHz) for local services according to existing plans. The block is generally available in Sweden 2023.

In the "5G action plan" from EC (European Commission) it is defined that all countries shall have:

A 5G network in service in at least 1 city in each country during 2020.

Full build out ready 2025.

This will probably mean that most countries will focus on mid-band (3-8 GHz), since various national coverage requirements will exist, in order to fulfill the EC ambitions.

The 26 GHz band (24.25-27.5 GHz) is also identified for 5G. The exact definition is to large extent depending on the outcome of WRC-19. In most countries, the range 26.5-27.5 GHz is empty and can be auctioned now. In some countries auctions have already started.

United States

In the United States, there are several bands targeting 5G on mmW (24/28/37/39 GHz), and it is only recently that the Federal Communications Commission (FCC) has started to consider mid-band spectrum (e.g., the 3.7-4.2 band). Operators have identified portions of the existing bands for deploying NR, e.g., T-Mobile on 600 MHz and Sprint on 2600 MHz.

There are upcoming FCC auctions of mmW spectrum at 28/39 GHz which are not owned by existing licensees.

On mid band, 5G will be allowed in the CBRS band (3550-3700 MHz). The band has licensed (PAL) and general authorized (GAA) blocks, based upon 10 MHz blocks. On 37-37.6 GHz it is proposed that licenses for local use is defined.

Asia-Pacific

Several of the major countries in the Asia-Pacific region are planning auctions during 2018/2019.

Korea auctioned 3.5 GHz (3420-3700 MHz) and 28 GHz (26.5-28.9 GHz) in June 2018 to operators.

China are planning to allocate additional frequencies on 2.6 GHz (160 MHz in total) and 4.9 GHz (100 MHz) to CMCC during 2018. Auctions for 3.5 GHz (3300-3600 MHz) is planned for 2019, where 3300-3400 MHz is planned for indoor usage. Presently 2300 MHz is mainly 4G indoor, but so far, no indication of allowing 5G.

Japan is planning a contest for band 3.6-4.1 GHz, 4.5-4.8 GHz (200 MHz for private operation) and 27-29.5 GHz (900 MHz for private operation) during 2019. Note that parts of 3400-3600 MHz are already allocated to LTE and will eventually be converted to 5G, but in Japan the band allocation is defined by law and can take long time to change.

Australia is planning the 5G auction on 3400-3700 MHz during late 2018.

Other countries that are in the process to plan 5G auctions are India, Indonesia, Pakistan, Thailand and Vietnam.

Middle East

Countries like UAE, Saudi Arabia and Qatar have concrete auction plans 2019-2021 for 3.5 GHz and 26 GHz. Other countries have also indicated upcoming auctions, but no detailed are known yet.

Summary of Spectrum

A summary of 4G/5G spectrum bands in different countries is shown in Table 4. The items that are shaded can be used can be used for local service and for industrial automation.

TABLE 4

4G/5G Spectrum Bands in Several Different Countries

| Spectrum band | Region/ Country | Local usage |
|---|---|---|
| 600 MHz (FDD) | US | |
| 2300 MHz (TDD) | China | Presently mainly indoor using 4G. Potentially also will allow 5G. |
| 2600 MHz (TDD) | US, China | |
| 3300-3400 MHz (TDD) | China, Africa | Indoor in China. Likely assigned for 5G. |
| 3400-3600 MHz (TDD) | CEPT, China, Korea, | |
| 3550-3700 MHz (TDD) | US (CBRS) | PALs are based on regional licenses. GAA does not qualify for interference protection by the regulation. Only deployed systems can be protected around coverage area. |
| 3600-3800 MHz (TDD) | CEPT, Korea | 3.7-3.8 GHz in Germany and Sweden |
| 3600-4100 MHz (TDD) | Japan | |
| 3700-4200 | US | Mid-band Notice of Proposed Rulemaking (NPRM) |

TABLE 4-continued

4G/5G Spectrum Bands in Several Different Countries

| Spectrum band | Region/ Country | Local usage |
|---|---|---|
| 4500-4800 MHz (TDD) | Japan | 200 MHz for private operations |
| 4900-5000 MHz (TDD) | China | Suggested for local services |
| 5925-6425 MHz | US | Unlicensed, possibly shared with FS |
| 6425-7125 | US | Could be unlicensed or licensed, shared with FS |
| 24.25-27.5 GHz (TDD) | WRC-19 dependent[1] (US plan auction FDD in the 24 GHz band | |
| 27-29.5 GHz (TDD) | Japan | 900 MHz for private operations |
| 27.5-29.5 GHz (TDD) | US, Korea | |
| 37-38.6 GHz (TDD) | US | Local usage a possibility in 37-37.6 GHz; FCC has proposed license by rule |
| 37-43.5 GHz (TDD) | WRC-19 dependent | 37-40.5 GHz 40.5-42.5 GHz 42.5-43.5 GHz |
| 38.6-40 GHz (TDD) | US | |
| 42-42.5 GHz | US | Part of Federal Notice of Proposed Rulemaking (FNPRM) |
| 47.2-48.2 GHz | US | Part of FNPRM |

[1]WRC-19 (World Radio Conference 2019), Agenda Point 1.13: Additional allocations to the mobile services between 24.25 and 86 GHz for IMT-2020 and beyond Regulatory Methods to Control Access to Local Spectrum There are two other regulatory methods to get access to local spectrum:

- Spectrum lease,
- Local licensing.

These methods are applicable if the operator accedes to customer control over spectrum, or if regulators establish local licensing as a viable policy.

Figure 18:
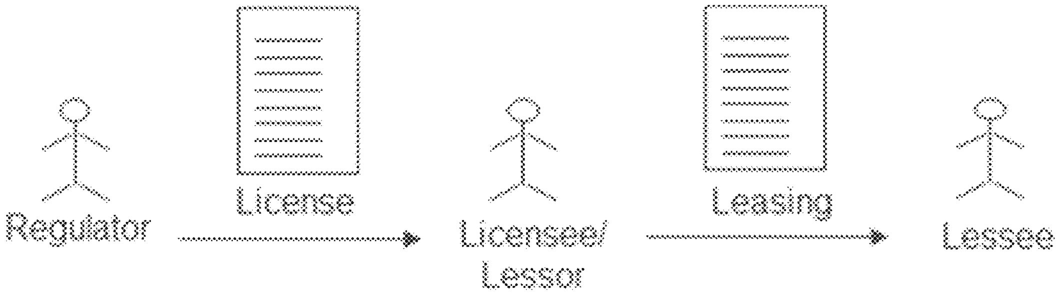
FIG. 18 provides a regulatory view of spectrum leasing.

Under the spectrum lease approach, a Licensee/Lessor lease parts of his license to a Lessee, with or without a fee. The Lessee can lease parts of the frequency band, a portion of the spectrum to a particular geographical area, or both. A sublease is when the Lessee leases out spectrum to a secondary lessee. A regulatory view of spectrum leasing is shown in FIG. 18.

Regulations for leasing of spectrum differ from country to country. Numerous aspects can be regulated:

- The terminology
- Differing or not differing between de jure (legal) and de facto (in principle the radio network owner) control over the spectrum
- The process for application, for example the stipulated time to approval
- Which bands are available for leasing, considering for example competitive implications
- The term of the lease, while not exceeding the term of the license authorization
- The possibility of subleasing
- The area defined for the lease
- And more . . . .

Also, the regulators can choose to make more or less of the leasing agreement public.

The following is an overview of the regulatory situation regarding spectrum leasing:

- The US is most mature regarding spectrum leasing; regulations exist since 2003-2004. Spectrum leasing is implemented commercially. There are examples of spectrum leasing, spectrum aggregators, spectrum brokers. There is a public searchable database (ULS), which contains all leasing agreements
- In South America, a few countries allow leasing between MNOs.
- In EU, leasing of major mobile/cellular bands is allowed in regulation since 2012. It is not necessarily implemented in regulation in member states. It does not appear that there any commercial leasing examples for MNO-owned frequencies in Sweden, Finland, UK, Ireland, Germany, France or Italy.
- In the UK, leasing is not allowed by Ofcom in the major cellular bands, due to competition implications.
- In Ireland, leasing is allowed in the major cellular bands, after ComReg review of competition implications.
- In Sweden, spectrum lease is permitted. The regulator has so far only allowed short-term leasing due to their auction planning (lack of stable long-term plans). Operators have so far not allowed long-term leasing with protection guaranteed, due to uncertainties in their network planning/build-out.
- In Finland, spectrum lease is permitted, but leasing has never been addressed in relation to MNO licenses and thus this case has never been implemented by the regulator.
- For Germany, spectrum leasing was for the first time addressed in a consultation on 3.7-3.8 GHz autumn 2018. The regulator defined property owners and users (tenants) as licensees.
- In Italy, spectrum lease is permitted, and used commercially.
- In Asia, contests generally prevent spectrum leasing in several important countries, and thus spectrum leasing is not part of regulation, e.g., not allowed in China, India, Japan, but there is growing interest in spectrum trading. Spectrum leasing is allowed but not used in Korea.
- In Africa, spectrum leasing does not generally appear to be allowed. However, Nigeria recently published Spectrum Trading Guidelines including spectrum leasing.
- The commercial leasing of MNO spectrum in the US concerns several cases.
- Nationwide operators lease spectrum among themselves to address markets where capacity/coverage/growth is needed.
- Nationwide operators lease spectrum to non-nationwide operators, for example Verizon's LTE in Rural America (LRA) program. Verizon has signed up 21 rural and smaller carriers to the program, and 19 have launched LTE networks via the program. The program allows Verizon to quickly build out rural areas.
- In
- The MNO interest in leasing out spectrum for 5G verticals, for example in a factory automation use case, is yet to be seen.

Spectrum leasing of mobile bands from operators has primarily been done towards other operators in order to fulfill coverage and other requirements from the regulator. Volume-wise, this is almost exclusively in the US.

In higher bands (>10 GHz), fixed services are a use-case which involves leasing from operators by service providers. This is established in both US and Europe.

With the arrival of 5G, verticals provide use-cases in need of dedicated (mobile) spectrum. One question is which actor is going to be Lessee.

The operators' reactions long term on the possibility of leasing out mobile spectrum to verticals are not known.

There are opportunities and issues for both the Lessor and Lessee for such a leasing agreement to take place, for example:

Interesting for MNOs for spectrum that is not fully exploited

MNO may hesitate to lease out spectrum in areas with heavy demand, or where demand is anticipated within 5-10 years The needed lease time of 30+ years, due to investments in processes and buildings, is far longer than the MNO's license duration The introduction of 5G will cause a widespread change in the ability of operators to provide SLAs through network slicing. While network slicing is supported to various extents with all 3GPP based networks, the 5G CN will provide operators with a framework that enables programming network slices to effect separation between use cases, QoS classes as well as service providers. It would then be possible to have a deployment case where slicing can enable the leasing of network capacity. This would allow the local user to be in control of end-to-end SLAs and even control the behavior of the RAN, including, for example, QoS, within limits. The MNO would deploy and integrate the RAN with the CN according to the SLA of the leasing without losing overall control over planning and administration Bands possible for spectrum leasing must comply with certain requirements. Leasing of the band must be allowed in the regulation in the specific country/region. Removing China, Africa and Japan from Table 4 above results in the following table:

TABLE 5

4G/5G Spectrum Bands for Leasing

| Spectrum band | Region/Country | Comment |
|---|---|---|
| 600 MHz (FDD) | US | |
| 2600 MHz (TDD) | US | |
| 3400-3600 MHz (TDD) | CEPT except UK | Korea unknown. |
| 3550-3700 MHz (TDD) | US (CBRS) | |
| 3600-3800 MHz (TDD) | CEPT except UK | Korea unknown. |
| 24.25-27.5 GHz (TDD) | WRC-19 dependent (US plan auction FDD in the 24 GHz band | |
| 27.5-29.5 GHz (TDD) | US | Korea unknown. |
| 37-38.6 GHz (TDD) | US | |
| 38.6-40 GHz (TDD) | US | |
| 42-42.5 GHz | US | |

Local Licensing

The majority of licenses use pre-defined administrative boundaries for defining the area for a license, such as:

National borders

Regional borders, or other larger administrative structures

Communities/Municipals

The next level of granularity could be property. With this approach, property and land usage rights can be used the administrative definition to be used for local licenses. If local spectrum is needed from a larger area spectrum license, one solution to increase the granularity would be to use leasing of sub-areas. This solution can define areas bigger than property, if needed.

Presently when a regulator defines a local license for an area that is smaller than a region/municipal, the definition has been a coordinate and a radius, an event name, an address, coordinates defining an area, etc. This has not been a problem since the number of such licenses has been low. However, with the arrival of 5G use-cases, this will change. It is work in progress for regulators.

If the number of local licenses grows with the 5G use-cases, the coordination needs also grow:

Geographical data bases are needed to show the licensed areas, for example for new applicants.

Interference between the implementations needs coordination through regulative requirements.

While national and regional licenses for commercial services exist, local licenses exist for non-commercial purposes, such as test labs and test plants. Possibly licenses for some program-making and special events (PMSE) services could be seen as local. The arrival of 5G, with new types of use-cases, will require local licenses for factories, for example, and puts new requirements on the regulation.

The primary band for 5G services in Europe is 3.4-3.8 GHz, and the auctions of this band triggers regulative activity regarding local licenses. Higher bands, for example 24.25-27.5 GHz (pioneer band for early implementation in Europe), are suitable for local use in the sense that their propagation characteristics are less likely to cause coexistence problems, especially when being used indoor. Presently, regulatory discussions regarding local licenses for these bands are largely out of scope or may just be entering the realm of possibility, but this is expected to change with industry interest.

Certain indoor environments are amenable to reuse of spectrum across multiple uses, especially if the networks are separated by floors in modern buildings. It is well known that the loss across multiple stories of a building can be many tens of dB, even at mid-band frequencies like 3.5 GHz.

Industry in China has shown interest in local licenses in standards fora, pointing to the proposal for 3.7-3.8 GHz in Germany.

An example of a license assigned to industry is the allocation from 1800-1830 MHz that was provided to the Canadian hydroelectric power industry in the 1990s.

Europe: 3.7-3.8 GHz (Part of 3.4-3.8 GHz, Primary Band for 5G Services)

Several countries have auctioned the spectrum and more to follow. Two countries have had consultations including local licenses and are following each other.

Germany promulgated auction rules in the third quarter of 2018 with an auction scheduled for 2019Q1-Q2. The rules distinguish between indoor and outdoor usage for "local property-related uses", implying property as a definition of local. Note that there is property which is not private property, for example streets, parks, etc.

Sweden, auction latest Q1 2020. Recent consultations define "local block allocations." Local here is defined as referring to "small geographical areas," e.g. mines, indoor facilities, and hot spots. It should be noted that also regional licenses, usually corresponding to a municipality, are mentioned in the consultations.

USA: 3.4-3.55 GHz (Possible Extension to CBRS)

In the US, the National Telecommunications and Information Administration (NTIA) is evaluating spectrum sharing between military radar and mobile broadband in this band. The incumbent systems differ here in comparison to the existing CBRS range. If CBRS rules apply, licensed operation would be across counties, and the third tier would be comprised by General Authorized Access. The large area sizes in the CBRS band make it unsuitable for industrial use as verticals are unlikely to participate in the auction market.

Bands for Local Licensing

Bands possible for local licensing must comply with certain requirements. Local licensing must be allowed by the regulator Keeping the local initiatives in Table 4 above results in the following table:

TABLE 6

4G/5G Spectrum for Local Licenses

| Spectrum band | Region/ Country | Comment |
|---|---|---|
| 3300-3400 MHz (TDD) | China | Indoor in China. Likely assigned for 5G. |
| 3550-3700 MHz (TDD) | US (CBRS) | PALs are based on regional licenses. GAA does not qualify for interference protection by the regulation. Only deployed systems can be protected around coverage area. |
| 3600-3800 MHz (TDD) | 3.7-3.8 GHz in Germany and Sweden | Indoor and outdoor |
| 4500-4800 MHz (TDD) | Japan | 200 MHz for private operations |
| 27-29.5 GHz (TDD) | Japan | 900 MHz for private operations |
| 37-38.6 GHz (TDD) | 37-37.6 GHz is a possibility in US | FCC has instead suggested license by rule and shared with Federal use. |

Technological Support for Leasing and Local Licensing

Figure 19:
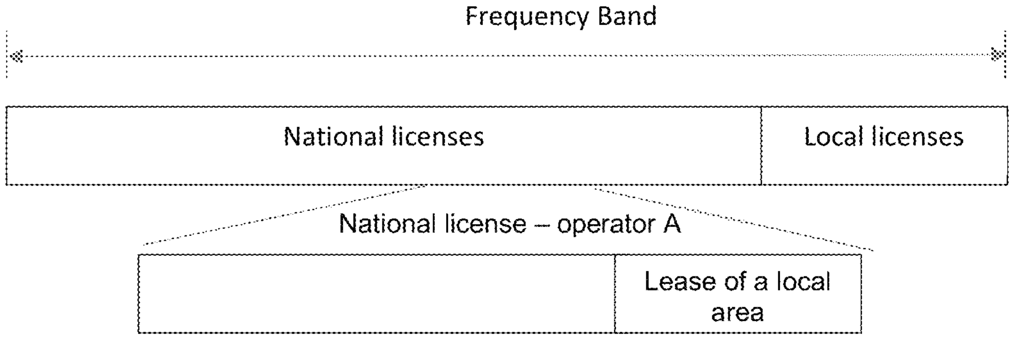
FIG. 19 shows spectrum allocation possibilities for a frequency band allocated to mobile services.

In Europe, eLSA is a continuation of the ETSI specified system Licensed Shared Access that manages access to spectrum in IMT bands where the incumbents cannot be evacuated within a reasonable foreseeable time. The access can be managed in time and geographical area. The system creates geographical protection and exclusion zones which incumbents does not allow others to use. In eLSA, allowance zones are introduced to enable also local licensee handling where the process of granting and managing the many local access licenses can be automated. It would also include the handling of leasing of frequencies to local area users from established licenses such as MNOs. FIG. 19 shows the assumed spectrum allocation possibilities for a frequency band allocated to mobile services such as IMT.

The specification work on the eLSA system has started in ETSI (Europe) and is based on the ETSI Technical Report "Feasibility study on temporary spectrum access for local high-quality wireless networks". The technical specification on System Requirements is assumed to be ready end of 2018 and to be followed by specifications on Architecture & Procedural Flows, and then followed by a protocol specification. In Asia-Pacific information related to "local area" services have been shared and starting work on a technical report has been approved.

The eLSA system is based on a Database/Controller concept. It supports licensing and leasing but not unlicensed/license-exempt operation with e.g. granted access such as white space or licensed-by-rule access, as this will not provide the necessary interference protection requirements.

The database is named eLSA Repository and assumed to be in the Regulatory domain. The controller is named eLSA controller and ensures that the eLSA licensee's system would have the needed configurations to operate according to the licensing conditions, thereby readily supporting high quality needs to support the URLLC use cases. The controller will get the required regulatory sharing and coexistence requirements from the eLSA repository.

Figure 20:
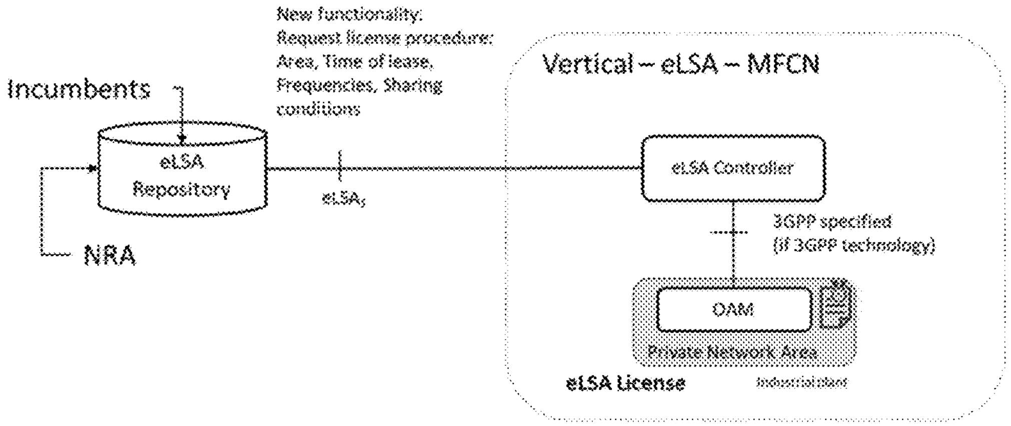
FIG. 20 illustrates a local network using licensed spectrum.
Figure 21:
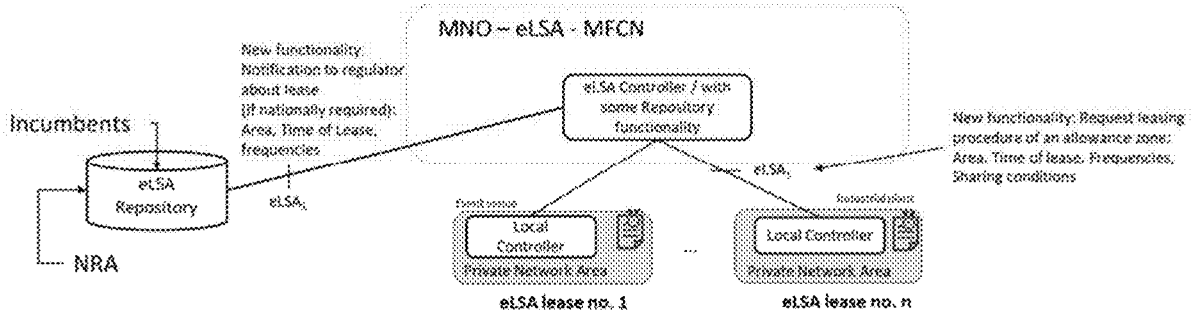
FIG. 21 illustrates a local network using leasing from a license holder, such as a mobile network operator (MNO).

FIG. 20 shows a possible architecture sketch for local licenses, while FIG. 21 shows the possible architecture for leasing. In the latter case, the eLSA controller box also contains some of the eLSA Repository functionality because the MNO is the one leasing out frequencies.

Figure 22:
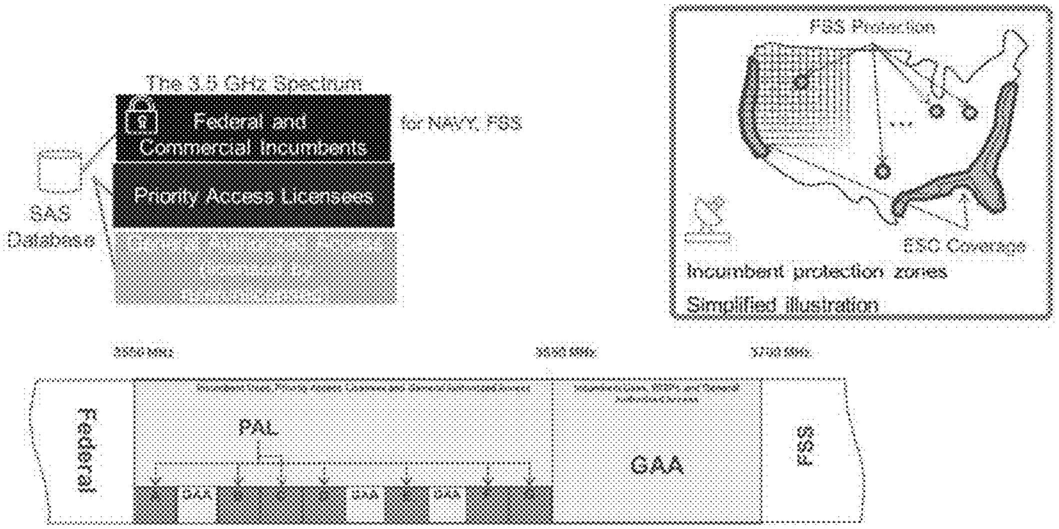
FIG. 22 shows features of CBRS.

In the US, the Federal Communications Commission (FCC) has defined the Citizens Broadband Radio Service (CBRS) in the 3550-3700 MHz band, in regulations codified in the FCC rules. FIG. 22 illustrates aspects of the CBRS.

The CBRS band is in use by naval radar and by the Fixed Satellite System (FSS) service, both services constituting Tier 1 incumbent primary use. Grandfathered Wireless Broadband Service Users, such as Wireless Internet Service Providers (WISP), operating under the rules of 47 CFR Part 90, Subpart Z, are also protected from interference from the CBRS until April 2020. The two remaining tiers respectively allow the issue of Priority Access Licenses (PAL) and General Authorized Access (GAA) in the band for wireless broadband use. PAL users benefit from licenses to spectrum based on the acquired licensed area and bandwidth. GAA users are allowed access any spectrum not utilized by higher tiers based on authorized access.

Radio devices are registered as Citizens Broadband Radio Service Devices (CBSD) based on their location and their operating parameters. Any eligible radio device may request access to Priority Access License (PAL) and GAA spectrum. Since the FCC does not confer any regulatory protection for GAA spectrum users, it is left to industry agreements to create solutions for GAA coexistence. While the Wireless Innovation Forum (WInnForum) is specifying technology agnostic protocols that are mostly geared towards regulatory compliance, the CBRS Alliance is seeking to improve the performance of LTE networks operating in the CBRS.

The CBRS Alliance was chartered as an industry trade organization seeking to promote and improve the operation of LTE in the band, for a variety of use cases, including operator-deployed small cell networks associated with public service, fixed wireless service for last mile replacement and Industrial Wireless. The Alliance is specifying changes to network architecture to allow both the traditional operator deployed operation and private network operation including neutral hosts and has provided a platform to establish the impetus for contributions in 3GPP for defining Bands 48 and 49 for LTE-TDD and LTE-eLAA operation in the band. The CBRS Alliance will also introduce 5G NR into the band in 2019. The focus of 5G on Industrial wireless applications fits with the mission of the CBRS Alliance.

Figure 23:
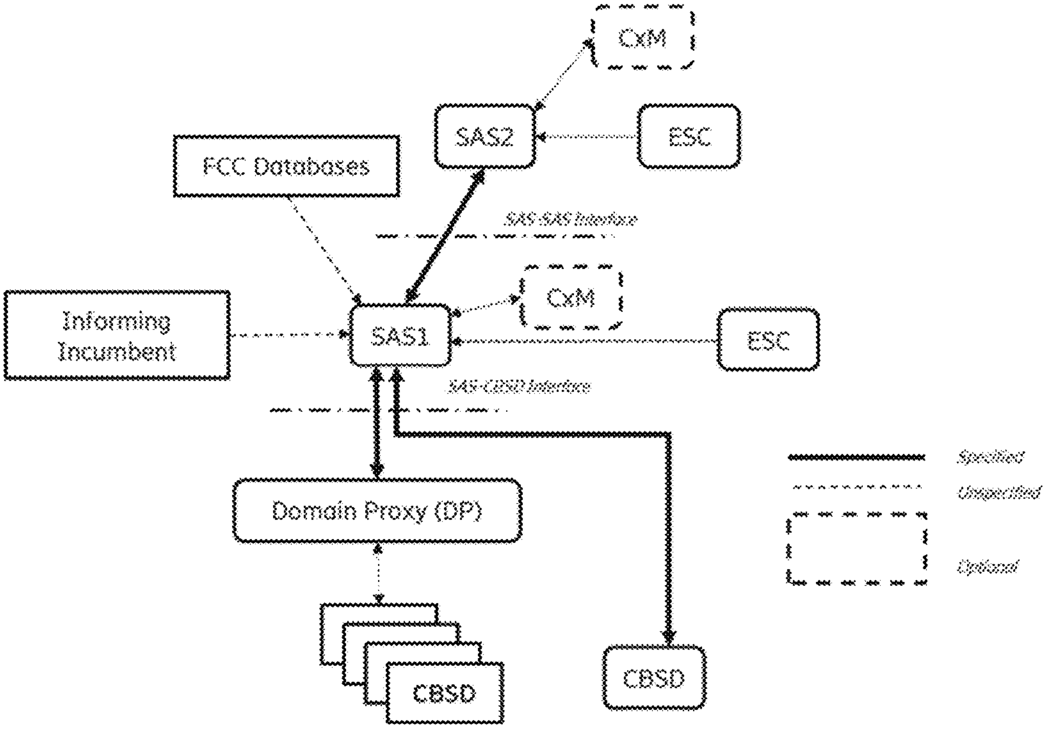
FIG. 23 shows a high-level SAS architecture.

The Spectrum Access System (SAS), a geolocation database and policy manager, authorizes access to CBRS spectrum by CBSDs. The SAS primarily protects higher tier users from lower tier operation in accordance with the FCC regulations. The logical relationships in the CBRS are described by the SAS-CBSD and the SAS-SAS interface, as shown in FIG. 23, which illustrates the high-level SAS architecture, including coexistence manager (CxM) functionality for the GAA spectrum. Federal radar systems are protected by the implementation of a network of sensors forming the Environmental Sensing Component (ESC) that informs the SAS about coastal radar activity. PAL users are awarded regional licenses over large geographical areas over 10 MHz blocks.

Each PAL is 10 MHz and is limited to a maximum of seven licenses confined within the first 100 MHz of the CBRS band, i.e., 3550-3650 MHz. New rules have based license areas on counties, which number 3142 in the United States. There are seven PALs in each license area, the license terms are ten years with a guarantee of renewal, and licenses can be partitioned and disaggregated. Single operators are capped at a maximum of four PAL licenses. The ability to lease spectrum under geographical constraints and the ability to disaggregate licenses will support a secondary market in spectrum use for industries. In this way, PAL licenses can likely support URLLC without significant encumbrance.

The WInnForum is defining technology-neutral mechanisms for administering the band, including protection of incumbents, and PALs. Additional requirements for coexistence between GAA users is being developed, with much debate about whether coexistence should be engineered by the central authority of the SAS, or by local action by CBSDs arising from knowledge of the radio environment.

Figure 24:
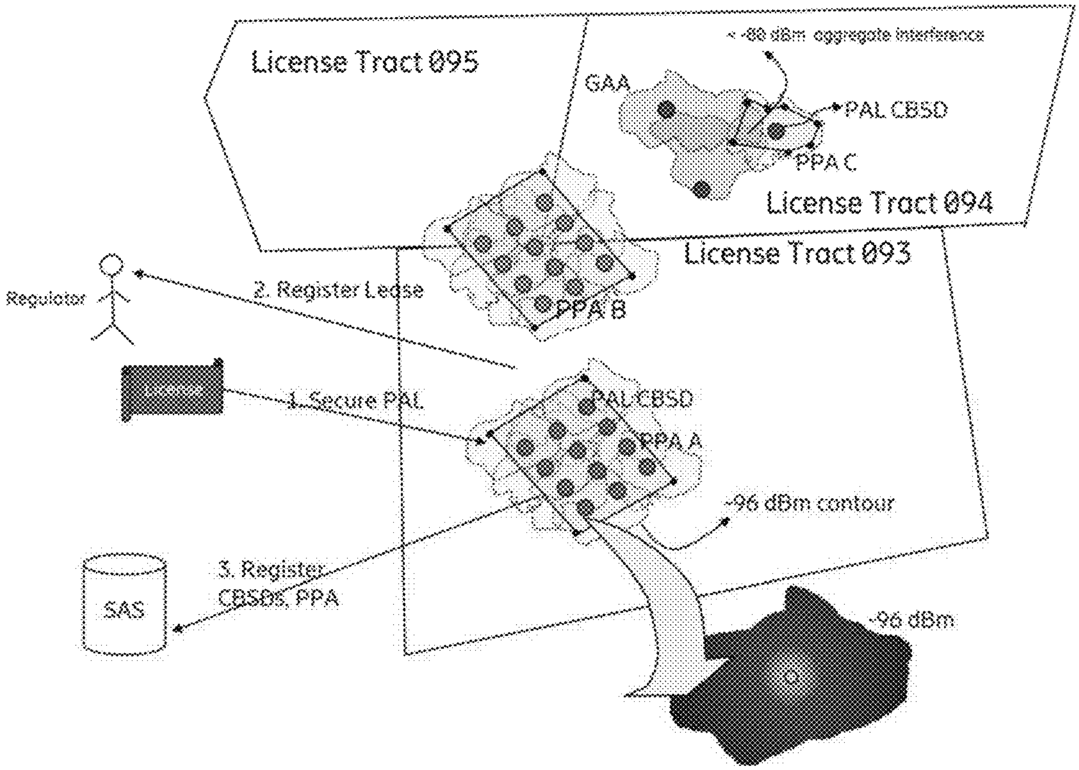
FIG. 24 illustrates PAL protection areas.

FIG. 24 is an illustration of PAL spectrum management. PAL users are protected only within a coverage area with a contour drawn around an actual deployment of one or more CBSDs. These coverage areas are known as PAL protection areas (PPA) and are bounded by a signal level of −96 dBm from the transmitting station. PAL Protection Areas (PPA) represent deployed clusters of CBSDs with overlapping coverage areas that may be fused to register a polygonal region qualifying for interference protection from other unassociated use of PAL or GAA. The figure shows several license tracts, each of which corresponds to a county. PAL users that span across multiple license tracts, i.e., having licenses in more than one tract, can combine their licenses to create a common channel assignment.

GAA users may use PAL spectrum so long as actual PAL deployments in PPAs are protected from aggregate interference that exceeds −80 dBm within the PPA. This is illustrated for PPA C in the figure, where two GAA CBSDs are allowed to operate on the same channel as the PAL user so long as the aggregate interference from their transmissions does not exceed −80 dBm over most of the PPA boundary. PPAs from different operators that overlap or are in close enough proximity will obviously use exclusive spectrum allocations. Thus, GAA users are guaranteed access to all of the 150 MHz of spectrum if the band is unencumbered by higher tiers.

While GAA users are not protected from mutual interference or interference from higher tiers, the WInnForum, and the CBRS Alliance have been engaged in attempting to specify methods of creating higher quality of experience for GAA users. The CBRS Alliance procedure reallocates the spectrum assigned by the SAS to the CBRS Alliance Coexistence group, creates local interference graphs based on environmental modelling, and optimizes spectrum allocation from a Coexistence Manager (CxM) that advises networks of CBSDs. In addition, the CxM manages Uplink-Downlink coordination for the TDD signal. LTE-TDD networks are all expected to be cell-phase synchronized and the CBRS Alliance coexistence specification details how this is to be achieved, independent of the SAS or CxM. The WInnForum and CBRS Alliance will try to guarantee at least 10 MHz of spectrum per CBSD. This is likely to be inconsiderate of eMBB service in congested areas.

Both PAL and GAA spectrum can address URLLC requirements, but URLLC quality cannot be guaranteed in all GAA situations. An operator would therefore not be able to enter into SLAs that would promise a customer that capacity or latency performance would not degrade, unless the facility being covered were physically isolated from other interferers.

The CBRS has several disadvantages:

The three-tier nature of the licensing regime, and especially the rules allowing GAA, create much uncertainty in the utility of the band. Some of this uncertainty arises out of a lack of understanding on whether GAA spectrum is like unlicensed spectrum or is akin to white space: it is not. Indeed, a strict interpretation of the FCC rules around GAA use would lead one to wrongly believe the white space analogy.

The WINNF specifications have created an impression among some operators that they might solely use GAA spectrum in a manner that assures interference protection. Such an impression would perhaps require division of spectrum among users to the extent where bandwidth is traded off for quality. This is not suitable for eMBB use.

The WINNF and CBRS Alliance Coexistence specifications are prone to devalue outdoor deployments. High power base stations are counted towards incumbent protection to a greater extent than low power ones. Indoor deployments may be favored when assigning spectrum, and large networks of indoor nodes could grab more than their fair share of spectrum unless the SAS introduces fairness measures. We expect there to be pragmatic approaches based on business guarantees.

The interesting use cases for the CBRS are in urban small cells and micros for coverage and offloading. The reason for this is mainly the large license areas, and operators are more likely to bid for licenses in lucrative markets. For the industrial automation use of the CBRS, operators must acquire licenses with an intention to either disaggregate or lease their spectrum.

The CBRS has been defined in a band that is of prime interest for 5G. The terms under which the spectrum is being offered, especially PAL, makes the band questionable for eMBB service and has mixed utility for industrial purposes, including URLLC modes of operation.

On the other hand, there are things to like about the CBRS:

The use-it-or-lose-it approach used by the CBRS is a well thought out exercise in improving spectrum utility. The rules motivate operators to use their license with real deployments, and operators have an incentive to either deploy their own radios or to lease out PPAs to realize revenue out of their spectrum.

If most users in the CBRS are indoor small cell users, the success of the band would be guaranteed. A large number of industrial use cases qualify.

The FCC cannot skew auction procedures to favor industry and enterprise use of spectrum. Industrial users are moreover not really interested in competing in the license market. Indeed, Ericsson's local license concept depends on the licenses being assigned by rule to real-estate owners, possibly for a small registration fee. By allowing disaggregation of licenses, the FCC has provided industrial users with choices—leasing, buying, or operation with GAA rules.

The CBRS is due to go into commercial deployment and will be proven in the field. The establishment of industry organizations developing the standards, including those for LTE use in the band assure actual deployment and success of the band in some form. The same cannot be said about LSA in 2.3 GHz. Indeed, there is noticeable interest around the CBRS among other regulators, e.g., Ofcom. The experiences in deploying the CBRS may encourage the telecom industry to accept the CBRS as a tolerable way of implementing spectrum sharing.

Coexistence

In general, coexistence problems will exist when industrial networks using cellular or RLAN technologies share spectrum with other services, e.g., satellite. It is possible for industries to gain access to spectrum that is globally designated for use by radio navigation, satellite services, or fixed services, provided there is sufficient isolation in geography or through path loss between such services. For example, indoor factory use of spectrum can easily occur in satellite bands. It is desirable that such bands be close to bands allocated for RLAN use or IMT so that there is an incentive for manufacturers to include such bands within radio equipment. The CBRS band is one such band having close association with bands already designated for mobile use in most markets around the world.

Another aspect of industrial use of spectrum is the problem of spectrum utility. While cellular technologies have the advantage of high spectral efficiency, it is also necessary that regulation enable a high degree of reuse of spectrum. In many cases, this will involve understanding the extent to which spectrum can be reused in license areas that are in close proximity.

There are cases when co-existence in reality is not problematic. Indoor spectrum for use-cases for industry can benefit from unusable spectrum (including not mobile allocation) for others, for example satellites, FS, FFS, radar (not indoor only). However, use-cases for outdoor spectrum for industry must also be considered While it is true that indoor industrial use cases can benefit from secondary use spectrum that may be designated for other services, e.g., satellites, FS, FSS, radar etc., it is just as important to designate local spectrum for outdoor use by industries.

Shared Spectrum—Market Considerations

The philosophy behind shared spectrum regulations differs between the USA and Europe. The FCC has been willing to define the CBRS in a manner that places high value on spectrum utility, while the EU has tended towards spectrum quality and stability.

In Europe, the support of industrial IoT is focused on licensed bands since the level of interference from others can be contained to a certain level. It is expected that there will be many licenses and leasing contracts in a country.

An evolved LSA system is being designed in ETSI to handle deployment and coexistence issues in an efficient manner. Depending on the country the co-existence scenarios with co-channel possibilities can be local indoor to local indoor, local indoor and overlapping regional coverage and local indoor to local outdoor. The regulatory sharing conditions needed to handle this in, for example, the frequency domain (and possible need of reuse pattern), guard distance (if needed), wall loss assumptions, and by setting a permissible maximum signal strength level at the border that would secure a predictability of interference to neighbors. This would facilitate the deployment of the network with known expected interference levels to secure the wanted network quality levels.

Unlicensed & licensed exempt bands which has unpredictable interference behavior can be used for services that does not require high QoS and can be simultaneously be used together with the licensed network.

In the US, it is most likely that leasing and private use of spectrum will happen within the CBRS. The PAL regulations are oriented towards protecting actual deployments. Areas within a license definition that are not covered by a licensee's radios are available to GAA users, provided established PPAs are not interfered with. The licensee is however free to monetize their license by allowing private PPAs to lease the license. This is likely to improve utility of the spectrum.

GAA use is open to private deployments and will have mixed quality of experience depending on a variety of factors: urbanization, population density, commercial interests, indoor vs outdoor deployments, outdoor deployments of small cells vs. large cells (low power vs. high power).

The WInnForum and the CBRS Alliance are engaged in defining coexistence principles for GAA that can reduce the interference impact to GAA users from cochannel use of allocated spectrum. The development of the procedures for coexistence are contentious and generally involve orthogonalizing spectrum allocations between neighboring CBSDs that are deemed to interfere with one another. This has the disadvantage of reducing the individual spectrum allocations to CBSDs under some circumstances. This is particularly worrisome for NR use in the band, especially in cases where eMBB coverage is anticipated.

Unlicensed Spectrum

Industrial use of wireless can overlap either cellular or radio local-area network (RLAN) technologies. Indeed, it is not necessary to classify all industrial use of spectrum as derivative of highly reliable or pertaining to critical communication. Certain characteristics of the industrial automation environment are a high level of importance to spectrum availability, ease of deployment and low regulation, and opportunities for developing trustworthy and secure networking. However, many use cases, and perhaps the majority of use cases for industrial use may also avail of license-exempt spectrum. The development of Multefire and LAA as technologies for license-exempt operation provide an avenue for the cellular industry to enter into the RLAN domain.

The key disadvantages of unlicensed spectrum include the necessity to operate in the presence of interference and the low reliability caused by shared use of spectrum based on distributed intelligence. This typically means that radio nodes use collision avoidance and listen-before-talk etiquette to access the channel instantaneously. This is not amenable for KPI guarantees. Therefore, unlicensed spectrum is usually not suitable for mission critical applications.

Unlicensed spectrum bands of interest for industrial applications span a wide variety of spectrum bands. The FCC in the United States has been the most aggressive in recent years in expanding the availability of unlicensed spectrum.

Table 7 lists unlicensed bands in various countries, where underlined text refers to bands that are under consideration. The bands in the table are those listed for broadband use and do not include several bands designated to be short range device communication bands. The unlicensed bands are generally unsuitable for URLLC due to the possibility of interference.

TABLE 7

| Unlicensed Bands | | |
|---|---|---|
| Spectrum band | Region/Country | Comment |
| 600 MHz | USA | TVWS rules allow unlicensed white space devices to operate in guard bands between wireless services and TV bands and in the duplex gap between wireless downlink and uplink bands. This includes unlicensed operation in UHF channel 37 which also hosts the Radio Astronomy Service (RAS). |
| 902-928 MHz | USA | Part 15 frequency hopping or digital modulation |
| 863-870 MHz | Europe | Short range device band for wireless microphones, LPWAN use viqa SigFox |
| 2400-2483.5 MHz | Worldwide | ISM band, Part 15 rules. |
| 5.150-5.250 GHz | USA, Europe, Japan | US: U-NII-1 band, indoor use only, integrated antenna Europe RLAN Band 1 |
| 5.250-5.350 GHz | USA, Europe, Japan | US: U-NII 2A, indoor and outdoor use Europe: RLAN Band 1 requires TPC |
| 5.350-5.470 GHz | Europe | Europe: Available for RLAN use |
| 5.470-5.725 GHz | USA, Worldwide | U-NII 2C/2E, DFS and radar detection, indoor and outdoor Europe: RLAN Band 2 |
| 5.725-5.850 GHz | USA, Worldwide | U-NII 3 band, overlaps with ISM band worldwide |
| 5.725-5.875 | Europe | BRAN |
| 5.925-6.425 GHz | USA | U-NII 5 band proposed, AFC required (database) |
| 6.425-6.525 GHz | USA | U-NII 6 proposed, indoor only |
| 6.525-6.875 GHz | USA | U-NII 7 proposed, AFC required |
| 6.875-7.125 GHz | USA | U-NII 8 proposed, indoor only |
| 57-64 GHz | USA, Canada, Korea | Unlicensed mmW |
| 59-66 GHz | Japan | Unlicensed mmW |
| 59.4-62.9 | Australia | Unlicensed mmW |
| 57-66 GHz | Europe | Unlicensed mmW |
| 66-71 GHz | USA | Proposed for unlicensed by the FCC |

Spectrum leasing in Europe and US is not a regulatory problem, but the interest and business for the operators is to be seen. In Asia and Africa, spectrum leasing discussions has just begun.

Indoor spectrum for use-cases for industry can benefit from unusable spectrum (including not mobile allocation) for others, for example satellites, FS, FFS, radar (not indoor only). However, use-cases for outdoor spectrum for industry must also be considered While it is true that indoor industrial use cases can benefit from secondary use spectrum that may be designated for other services, e.g., satellites, FS, FSS, radar etc., it is just as important to designate local spectrum for outdoor use by industries.

The eLSA is agnostic to bands and technology for spectrum leasing and local licensing. CBRS is going to be the best opportunity for industrial use of spectrum in the United States. CBRS is being specified in a spectrum range that is globally accessible by IMT, making economy of scale possible, and allows leasing as well as disaggregation of licenses. Allowing disaggregation does not mean that CBRS will enable local licensing.

Global harmonization of IMT and MBB spectrum has been a desire that has never been adequately realized. The consequence of diverse regulatory action on spectrum for mobile services over the years will make it difficult to achieve harmonization for industrial use cases. However, there is an interest in the telecommunications industry towards assigning portions of the spectrum ranges 3400-4200 MHz and 24.25-29.5 GHz for industrial use.

The 3400-4200 MHz will likely be the first frequency range, outside China and US, where buildout of 5G will start. The limited regulatory support for local licensing in this range will create delays for non-MNO dependent spectrum usage. For example, in Sweden, local licensing can at the earliest be available after 2023 for use by 5G, and in most other European countries regulatory action is not yet considered. Therefore, leasing will likely be the sole option for access to spectrum, except for an MNO-provided service, in that time frame. The mmW spectrum can be of interest to enable availability of local licensing in a timelier manner, but that will to some degree depend of the allocation of mobile bands in WRC-19.

Security

It is often said that security of a system is only as strong as the weakest link. However, depending on which part of the system that is, breaking (or neglecting) it can have very different consequences. When talking about a system involving more than one entity, the secure identities used, and the handling and protection of them, are building blocks that a big part of other security functionality relies on. The identities are used for authenticating the entities, for granting access and authorizing actions, and for establishing secure sessions between the entities. This means that a device needs to have a secure identity and to provide hardware (HW) and software (SW) based mechanisms that protect and isolate the identity and the credentials of the device. It is also not only the identities that need to be protected, but also the devices themselves should be secured, e.g. through proper control of what SW is being run on the device. All the aforementioned things are enabled by having a HW root of trust (RoT) in the device, basically a trust anchor to base security on.

Identity

An identity of a device is used to identify the device to a communicating party. The identity typically consists of an identifier and credentials such as a key, key pair, or password that is used for the authentication of the device. An authenticated identity enables the communicating party (such as network, service or peer device) to make well-founded security policy decisions for network/resource access control, service use, charging, quality of service settings, etc.

Identities based on a shared secret rely on the fact that all communicating endpoints, and only them, know a secret value. The randomness of the shared secret is one key characteristic. It is typically quite weak for a username-password pair, the most basic form of a shared-secret-based identity. In addition to randomness, the length of the secret and that the secret is handled securely, both at the device and the server side, are important.

With asymmetric keys, the identifier of an entity is the public key of the asymmetric key pair and the corresponding private key acts as the authentication credential. A signature generated using the private key can be verified by anyone having access to the corresponding public key. This is perhaps the main strength of asymmetric compared to symmetric (shared secret) keys.

To give additional value to the asymmetric key-based identity, it is possible to get the identity certified by a Certificate Authority (CA). The CA verifies the identity of the entity owning the key pair and issues a certificate certifying the link between owner and public key. The drawbacks with certificates include the size of the certificate (or certificate chain), which could be an issue in constrained environments, and the added cost of getting and maintaining (renewing) the certificate. To reduce costs, an enterprise can also set up its own CA.

Raw Public Key (RPK) mechanisms make a compromise between the simplicity of pre-shared keys and benefits of asymmetric cryptographic solutions. An RPK is a minimalistic certificate, significantly smaller than a typical certificate, containing only the public key in a specific format. An RPK is like self-signed certificates: there is no trusted entity that vouches for the provided identity, i.e., the peer receiving this identity needs to use an out-of-band mechanism to trust that it is the identity of the entity it wants to communicate with.

For all Public Key Infrastructures (PKI), it is recommended to have a way of revoking compromised keys. A Certificate Revocation List (CRL) that can be fetched from a Certificate Authority (CA) or checking the certificate status online using the Online Certificate Status Protocol (OCSP) are common ways.

3GPP cellular systems are a prime example of where shared-secret-based identities are used. A 3GPP identity consists of the IMSI, a 15-digit identifier, and its associated credential, a 128-bit shared secret. This information is stored in the subscriber database (e.g., HLR or HSS) in the 3GPP core network and on the UICC or SIM card installed in the User Equipment (UE). The UICC acts both as a secure storage and a TEE for the 3GPP credentials. For IoT devices, permanently integrated embedded UICCs (eUICC) can be used instead. eUICC has a smaller footprint and allows remote updates of the subscription data.

For 5G, 3GPP is also considering alternatives to traditional SIM credentials, namely so called "alternative credentials". TR 33.899 looks at different identity solutions, including certificates. In specifications, support for certificates is described e.g. in 33.501 where EAP-TLS is defined as an alternative to AKA. EAP-TLS implies certificates are being used for authentication. For identifying the network, the use of certificates is partly available through the definition of the concealed identifier (SUCI), which is the private identifier (SUPI) of the UE encrypted with the public key of its home network, i.e. the network already has an asymmetric key pair for which the public key is part of the subscriber profile. The SUPI is defined in 3GPP TS 23.501; there, network address identifier (NAI) is given as one possible format of the identifier, which would support the use of certificates as well.

End-to-End (E2E) Security

In most cases, protecting the communication of a device is important. Both to protect against the information leaking to some unauthorized third party and against having the third party modify the data on the path. This can be achieved by applying confidentiality (encryption) and integrity (signing of data) protection. The exact security need for the data is very much use case dependent and relates to the data, its use, sensitivity, value, and risk associated with misuse of the data. However, as a rule of thumb, integrity protection should always be applied, while the need for confidentiality protection should be evaluated case by case. In general, a single key should be used for only one purpose (encryption, authentication, etc.).

For protecting the data, there are many standardized protocols available, including "regular" Internet security solutions such as TLS, IPsec and SSH. IoT optimized solutions include DTLS as a TLS variant for IoT and the ongoing work to profile IoT friendly IPsec. Also, application layer security solutions, such as OSCORE defined in IETF, are available and especially useful for constrained devices. The benefits compared to TLS include that end-to-end security can be provided even through transport layer proxies, e.g. for store-and-forward type of communication used with sleepy devices. The protocol overhead is also optimized.

3GPP also provides tools for protecting traffic end-to-end to a service, even outside the 3GPP network. The Generic Bootstrapping Architecture (GBA), 3GPP TS 33.220, uses the SIM credentials for authenticating the UE/subscription to a network service, called Network Application Function (NAF) in GBA lingo. GBA requires that there is a trust relationship between the service/NAF and the operator. Using that trust, the NAF can request session keys from the network, which are based on the SIM credentials of the UE. Those session credentials can be used for authentication and secure session establishment between the UE and the service.

Hardware Root of Trust

The concept of a hardware root of trust (HW RoT) includes the following aspects:

- Secure storage
- Secure/measured boot
- HW-enforced Trusted Execution Environment (TEE)
- HW-protected crypto and key management (crypto acceleration, HW-based random number generator, generating/storing/accessing keys securely)

HW security is also extended to the environment where devices are manufactured such as protection of interfaces and mechanisms used during manufacturing and development, the use of secure key provisioning, key generation, secure configurations of devices, code signing, etc.

The base for securing that a device behaves as intended is to be able to ensure that only authorized firmware/software is running on the device. This requires a secure boot mechanism that originates from a hardware Root of Trust. The secure boot mechanism verifies during device boot-up that all loaded software is authorized to run. A HW RoT is an entity that is inherently trusted, meaning that its data, code and execution cannot be altered from the outside of its trust boundaries. It consists of functions that must operate as expected (according to its design), no matter what software is executing on the device.

A device must also have a secure storage mechanism to protect device sensitive data such as cryptographic keys while stored in (off-chip) non-volatile memory. Such a mechanism also relies on a HW RoT, e.g., a chip individual key stored in on-chip non-volatile memory or OTP memory.

In order to be able to recover from malware infections, and to minimize the risk of loss of sensitive data or changed behavior of the device, the security related parts of the firmware and software should be separated (and run in isolation) from other software. This is achieved using a Trusted Execution Environment (TEE) created using HW isolation mechanisms.

Device Hardening

A device typically contains interfaces and mechanisms for debugging and HW analysis with the goal to find issues of a given device discovered during ASIC production, device production, or in field. Joint Test Action Group (JTAG), IEEE standard 1149.1, is a common interface for debugging and various HW analyses. These mechanisms and interfaces must be protected such that they cannot be used by unauthorized persons for retrieving or modifying FW/SW and/or device data. This can be achieved by permanently disabling the interface, only allowing authorized entities to use the interface, or limiting what can be accessed with the interface. Also, for authorized access it must be guaranteed that sensitive data belonging to the owner/user of the device such as keys cannot be accessed by the person performing the debugging/fault analysis.

SW security is one of the most important building blocks of device security. Both HW and SW security complement each other. While it is not possible to build a secure device without HW security as a foundation, same also applies to SW security.

While IoT GWs with application processors commonly run Linux based OS, MCU based IoT devices mainly run light weight OSes such as mbed OS and Zephyr OS. There are also other highly security certified OSes being used on devices that have to meet high availability and security requirements. Choosing the right OS is important and security hardening of that OS is also equally important. Hardening entropy, user space components and network functionality can also be considered as a part of the OS security hardening process. Other aspects to consider relating to device hardening include

- Using SW being developed according to the best secure software development practices.
- Sandboxing and isolation—running SW in a sandboxed environment.
- Least privilege concept—processes only get required privileges.
- Crypto hardening—using secure crypto libraries with traceable and reviewed code.
- Use of cryptographically secure PRNG.
- Certification (when applicable).
- Secure SW update—signed updates applied in a timely manner.

Security for Safety

However, these security mechanism/tools (maybe excluding non-repudiation) should be implemented in any secure system, regardless of whether the aim is making a safe system or not. The safety requirement is maybe more of an indication of the level of security required and that the configuration of security needs to be double checked as any error might have larger consequences than in a system without the safety requirement. The security configuration is also about choosing the right level of security/algorithms/keys used in the system. In addition to security, an (at least) equally relevant part for safety is e.g. the availability/reliability of the system, relating to both communication channels and services making up the system, or the correct operation of the components (values that are reported are accurate, time synchronization etc.).

Jamming

Like safety, jamming is also a topic that has one foot in the security domain. Jamming is a form of Denial of Service (DoS) attack. Some DoS countermeasures apply also for jamming, e.g. load balancing and rerouting traffic, which on the air interface would mean load balancing and rate limiting, backup base stations, and additional frequencies.

Industrial Devices

Industrial devices range from small simple one purpose sensors to large complex sets of devices such as robot cells and paper mills. Thus, one very relevant question we address here is what is a device? IoT devices are often categorized in two main ways: sensing devices and actuating devices. Sensing devices are equipped with some sort of sensor that measures a specific aspect such as temperature, light level, humidity, switch, etc. Actuating devices are such that receive a command and change state accordingly, e.g., a light bulb that can be on or off or air conditioning fan speed. More complex devices have a set of sensors and actuators combined but still only one communication interface. Even more complex machines may consist of several smaller devices made up of several sensors and actuators. Typically, even for a small device, a microcontroller or small computer is in place to host the communication stack as well as processing capabilities, memory and so on. In essence, a very complex device is in fact a small network in itself comprising of several parts that may or may not need to interact with each other and that may or may not communicate through the same communication module.

The range of requirements put on the communication itself varies depending on the purpose and criticality of the task the device in question is aimed for. These requirements can include throughput, latency, reliability, battery life and extended coverage. For instance, a simple sensor reporting temperature changes can be seen having relaxed communication requirements, whereas controlling robots wirelessly from the cloud requires an URLLC service. Networks need to be able to support a mix of devices and services in the same deployment. In case the device in question is in fact a complex thing with different sets of sensors and actuators that communicate through the same interface, networks may also need to support a mix of services, i.e., different types of traffic, from the same device. This could be for instance, a robot with a video camera for monitoring purposes (mobile broadband traffic stream) and manipulation arm (URLLC traffic), or a harbour straddle crane with remote control functionality.

In order to enter vertical industrial markets, it is necessary to address different use cases described above and answer a few crucial research questions regarding devices. How to combine devices with different URLLC requirements, how to combine different URLLC streams within a device and how to combine non-URLLC streams with URLLC streams within a device. How to monitor QoS metrics within the device and timely send this information to the BS or to the network controller? How to ensure redundancy within the device (UEs, carriers, etc)?

Finally, the device is not an isolated part of the network, especially if it has high processing capabilities. Rather, the device is part of the system and may host system functions, e.g., part of the edge cloud, or application of federated machine learning algorithms, what may be beneficial both from computational and privacy points of view.

Distributed Cloud

The following discussion introduces the concept of a distributed cloud designed specifically to meet the requirements of industrial scenarios—the industrial cloud. Moreover, an information management system is described that is able to collect, store, and manage large amounts of data from the manufacturing site. Access to stored information is handled through a well-defined API that allows developers to focus entirely on what to do with the data rather than trying to figure out how to get hold of specific data of interest.

For traditional (IT) centralized computing in the cloud offers many benefits over local hosting. The technical merits include ubiquitous on-demand access to compute resources (CPU, storage, network, applications, services), elasticity (scaling in and out of resources), and metering (monitor and pay for actual use). The service provider's resources are pooled to service multiple consumers simultaneously. By utilizing remote hardware that is deployed, managed, and maintained by a service provider much work can be off-loaded from the local IT department. All these properties translate into a lower overall cost for the individual consumers.

A centralized cloud model has many advantages but does not solve all industrial requirements. There are two major problems to consider. First, signaling over large distances add to the overall latency. For (hard) real time processes with strict timing constraints, the round-trip delay to the cloud may be detrimental to the performance or even make certain use cases impossible to implement. Delay jitter may also become a big problem as the communication to and from the cloud can involve many external links over which little control is possible. Second, the computational tasks related to industrial production tend to put quite strict requirements on availability, robustness, and security. Even though cloud-native applications and services can and should be designed and set up in redundant and failsafe way, the communication is not easily guaranteed. For instance, fiber cables may break due to construction work, routing tables can become corrupted, and power outages happen. Regardless of the reason, any interruption of the network connectivity might become catastrophic for the production. In particular, anything relying on a closed-loop control algorithm that is executed in a central cloud must be made such that communication losses are handled with great care. Whether that means on-site replication of the control algorithm, a graceful degradation, or something else has to be decided case by case.

Figure 25:
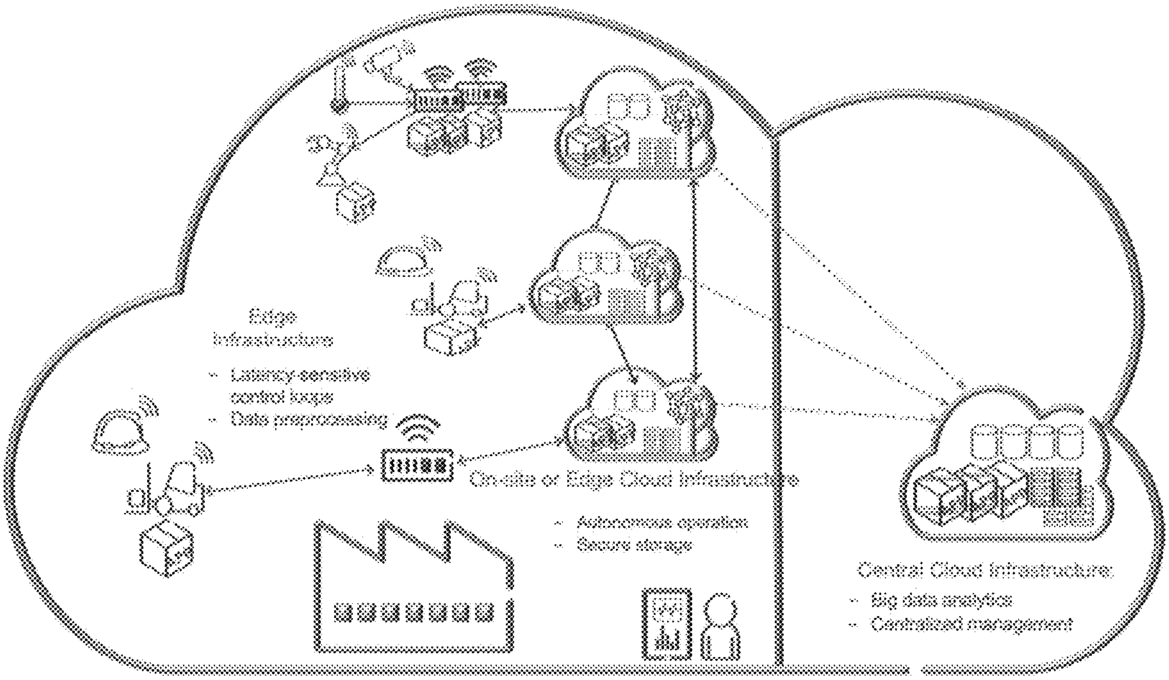
FIG. 25 shows an industrial cloud scenario.

To mitigate the problems described above while still retaining the benefits of cloud computing, a distributed approach is proposed. The principle is depicted in FIG. 25. Basically, a central cloud (also known as a data center) is connected to several other compute instances at physically different locations. These peripheral instances might have quite different capabilities with respect to processing power, memory, storage, and bandwidth available for communication. Typically, the applications are also distributed to run different parts of them on separate hardware. Used in connection with manufacturing, this system is called the industrial cloud. Another notion that is often used synonymously for distributed cloud is edge cloud. However, the term "edge cloud" may also be used to refer specifically to cloud resources located in base stations. Clearly, as shown in FIG. 25, an industrial cloud scenario is more general and also spans over locations other than base stations.

The functional requirements (i.e., the specified behaviors and what to do) and non-functional requirements (quality attributes relating to the system's operation) determines where to deploy certain tasks. Keeping data close to where it is used is advantageous for time constrained tasks. In other use cases bandwidth restrictions might necessitate temporary storage where the data is produced. Consequently, there is need for local (on-site) compute and storage resources. However, there are also plentiful of less time critical tasks that are better handled in the central cloud. For instance, predictive maintenance and anomaly detection often depend on long and complete time series of log and sensor data. Storing this information in the data center simplifies a posteriori analysis and training of deep learning algorithms.

Real-Time Manufacturing Software Platform

On-site edge cloud deployments are seen as enablers for new and improved applications that reduce cost of deployment and management, including the possibility of parts of equipment to be replaced by software-only solutions. A typical example is the robot controller, which in existing legacy deployments is a hardware box, essentially an industry-grade PC, installed next to each manufacturing robot. This equipment is responsible for real-time control of the robot, like motion control, requiring millisecond-scale control loops. The first step in cloudification of such brownfield technology is the movement of the software from the controller to the on-site cloud, thus simplifying the installation by removing the extra hardware element.

The next step towards a fully software-defined factory is decomposing the functionality of today's software controllers into more fine-grained functions to take advantage of per-function reliability, scaling, state data externalization, and ease of management like updating and version control that are the benefits of executing programs in the cloud. Each such function encapsulates a specific part of the overall domain-specific program that makes up the actual business logic controlling each manufacturing process, and ideally, they are reusable across different such programs. In the 5G manufacturing context, the programs are envisioned to be developed in and run on top of the Manufacturing Software Platform (MSP) which provides commonly used functionality, like object recognition, motion control, or real-time analytics in a function-as-a-service (FaaS) way, reusing the concepts, tool set, and experience of the web-scale IT industry. The provider of the MSP enables high flexibility and programmability of the physical devices via components that stack on top of each other and provide an increasing level of abstraction of reality. Such abstractions are both used on detection/sensing/input and when commanding/actuating/output.

Such high-level concepts are for example observations synthetized from low level sensory input, often combining information from several sources. For example, "unit #32 has reached its destination" is a trigger that can be calculated from indoor localization triangulation, a database of destinations and maybe camera verification. Each piece of raw input is likely to be processed first in an input device specific component, such as localization system or image recognition system. Using the result of these higher-level components may correlate the AGV location to end up with more precise coordinates. Finally, even higher-level of components may correlate it with the target database and the overall goal of the system. Processing the input is thus done by the stack of components each raising the level of abstraction by a little and adding more context.

Similarly, high-level commands are like ones that would be given to a human worker, such as "hand over this object to that robot," "paint it white," or "drill 2 holes there." The exact procedure to carry out such commands is then calculated by the stack of components going down, from task scheduling, trajectory planning, motor control all the way to raw commands to servos.

This approach eventually allows programming of manufacturing processes using high-level concepts humans easily understand, simplifying or hiding the complexity the distributed nature of cloudified applications altogether. It also supports re-use and saves on development time, as the low-level components are likely application agnostic and can be used in many contexts, whereas high-level components are easier to develop them working with high-level concepts.

Both the execution environment and the MSP platform can be added value provided by components in and connected to the 5G network, especially if they are bundled with connectivity solutions, both wired and wireless, to provide a strong concise industry control vision. For this to happen, an ecosystem of robotics vendors and manufacturing companies has to be on-board and use such components. Collaboration at an early stage is essential.

Data/Information Management

To take care of all data produced within an industrial plant, an information management system is needed. Important characteristics for such a system is that it is distributed (for robustness and accessing data where it is needed), scalable (doing this for one or one hundred machines should have the same degree of complexity), and reusable (adding data management of yet another manufacturing site to an existing instance should be simple), and secure (honor confidentiality and privacy, ensure data integrity, provide means for data ownership and access control). The task of this system is to collect, manage, store, filter, extract and find data of interest. Clearly, the system must cater for different types of data (e.g., time series, streaming data, events of interest, alarms, log files, et cetera) with quite different requirements on time to live, latency, storage and availability, bandwidth and so forth. Moreover, it must handle a mixture of both sensitive and open data. Storage requirements for data varies, but a solution based on the concept of a distributed cloud with "safe" storage is needed to cope with the wide range of different requirements that is anticipated. The safety aspect includes privacy concerns and implementation of access rights, both in-flight (i.e., while data being in transfer) and in storage.

A rich set of production data is the basis for all further processing and analysis. Collecting more data facilitates new use cases with respect to planning, flow control within the production, efficient logistics, predictive maintenance, information sharing, control and actuation of individual machines, anomaly detection, quick response to alarms, distribution of work orders, remote monitoring, daily operations, and much more. The more data being collected, the more challenging become the task of managing it. For a large industrial site, the total number of sensors and actuator that can be read, monitored and controlled can easily exceed 10 000. The sampling rate varies a lot, but over time the aggregated amount of collected data becomes substantial. Even finding the data of interest tend to become problematic.

Production is often less static than it appears to be. Clearly, changes in settings or a slightly different set of work stages might be needed for product variations concerning shape, material, size, surface polish, placement of drill holes, et cetera. Moreover, the same set of tools and machines can be used for entirely different products in different production batches. When a new product is to be manufactured it could even require a completely new production line to be set up. Variations in production will have an impact on what data to look at with respect to operation and analysis. As new sensors and actuators are utilized, the data management must be able to adapt to changed conditions.

Often the same data can be useful for multiple purposes (e.g., both for the monitoring of productions and for quality assurance after the product is finished), and, as discussed above, entirely new parameters become of interest when production changes. When sensor data is collected it is advantageous to annotate it with additional information (a.k.a. metadata) for future use. A simple example of this is adding a timestamp to every sensor reading, something that not always exist from start. Other useful metadata are information about location, product id, specifics about used tools, and/or batch number. In general, this kind of metadata simplifies searching and improves on traceability. Specifically, it can be used for filtering and extracting particular information that is needed for analytics and machine learning purposes.

Some sensor data that is collected may be used for other things than the industrial process that is being run in the factory. For instance, it might be readings that relate to monitoring the condition or status of certain equipment that is used in production but is owned by someone else. The owner is interested in monitoring the equipment to plan maintenance and service, but also to collect statistics for improving future generations of the equipment. This data can be sensitive and should not be visible to the factory owner. On the other hand, the factory owner may not want to reveal data that relates to the quality or quantity of the products leaving the production line. Consequently, there is a need to define ownership of and provide means to restrict access of data only to authorized parties. The information management system should cater for this while still handling all data in the same way regardless of its purpose or two whom it belongs.

Figure 26:
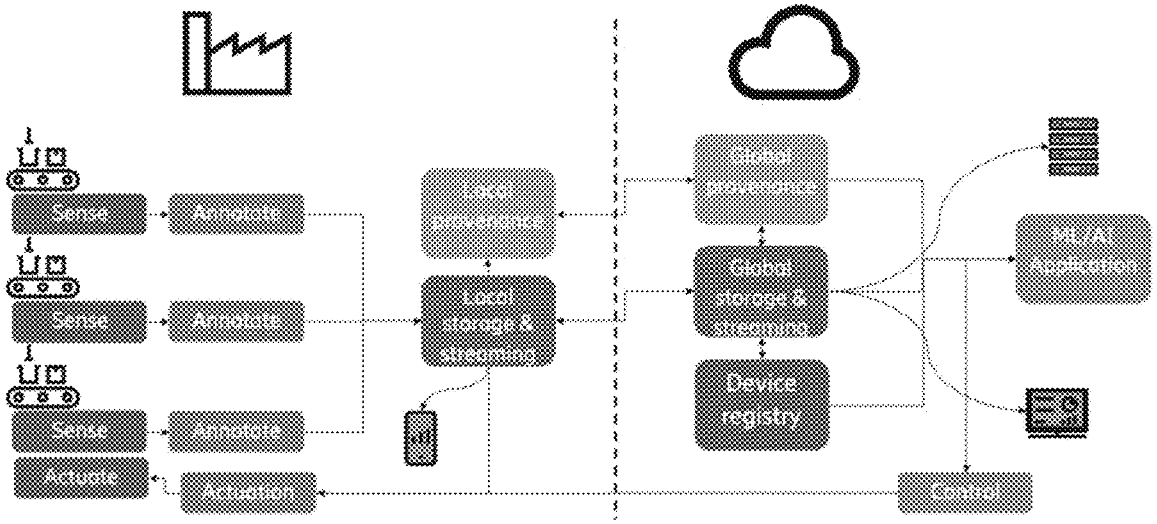
FIG. 26 illustrates information management in a simple factory situation.

FIG. 26 illustrates a typical manufacturing scenario. On the left hand side, the factory is depicted, while the right hand side represents the data center (i.e., the central cloud). Connected tools, machines, and sensors produces data that are annotated and forwarded for processing and storage. A "global" device registry keeps track of all available producers (sensors) and consumers (actuators). Applications obtain information on where to find needed data by asking the device registry. Storage is being taken care of both on-site and in the data center, as is provenance (more on that later). This design allows for both on-site (low-latency) and off-site based control applications. Clearly, this set-up can be replicated in case multiple production sites are to be included.

The set-up is an example of a distributed cloud where data is handled both in the factory and in the central cloud. With the obvious exception of available resource capacity, the local set-up and its functionality can be made very similar to the corresponding set-up and functionality of the data center. Doing so will greatly simplify deployment, operation, and life cycle management of the applications running at both locations.

In addition to annotating, storing, and processing data, an information management system must also handle data provenance. In short, this is the process of keeping track of data origin, where it moves over time, who uses it, for what purpose, and when it is used. Keeping records of these parameters facilitates auditing, forensic analysis, traceback off and recovery from use of erroneous data series. Provenance gives the administrator of the information management system a way to obtain a detailed view of data dependencies and derived results. For instance, a faulty or uncalibrated sensor might go unnoticed for some time if it does not cause immediate havoc in production. Then, if its sensor data is used for training purpose in a machine learning algorithm, the resulting model might become flawed which will negatively impact its usage. With proper provenance in place, it is possible to find out where and when the potentially flawed model has been used and take appropriate actions to mitigate problems caused by this.

In order to simplify for developers, it is important that the information management platform provides a well-defined API to find and access all data. This is true both for "raw" sensor data that is collected in real time, and for historical records of older data. In particular, it can be noted that the distributed cloud model implies that data of interest can be stored at geographically different locations and its placement can vary over time. This fact follows from different needs (e.g., tolerance for variations in latency), overall robustness (e.g., handling link failure to the data center), and requirements on long term availability. Applications that use the data should not need to keep track of the storage location themselves; the underlying information management platform does this allowing developers to focus on more important things.

A prototype of an information-management system is now being deployed at one of SKF's roller bearing factories in Gothenburg. This work is part of the SGEM II research project that is running June 2018-September 2019. The software is based on both open source projects (e.g., Calvin for handling data flow from factory to data center, and Apache Pulsar and VerneMQ for pub-sub messaging handling) as well as internal proprietary code. The information management platform is for data what Kubernetes is for containers. Clearly, not all functionality is in place yet, but we iterate and update frequently. The work is done using a modern continuous integration/continuous deployment development methodology. This means changes to the code will be automatically tested, and deployment to the distributed system can be made with a single command. The overall design is deliberately made such that most system updates can be done without interrupting the running applications. Thus, production does not have to be stopped for deploying software updates to the platform. This property is particularly important at the factory site as updates can then be made also outside of the scheduled maintenance windows for the production site. Usually a production stop is very expensive for the manufacturer which means planned maintenance windows are very few and separated with in time as much as possible.

A distributed cloud retains all properties of a central cloud such as elasticity, on-demand compute, resource pooling, measured services, and network access. In addition, the ability to place processing closer to where results are used facilitates more robust solutions, decentralization, and implementation of low-latency use cases.

With an adequate information management system in place, developers can build new applications and access data produced at the factory without physical access to the manufacturing site and without detailed knowledge of how data is collected or where it is stored. Different types of data are handled and stored both on-site and within the data centre. A well-defined API exposes services and allows for efficient searching and filtering based on any parameters and metadata that is available. Access rights to data can be defined based on user and/or role of said user. Advanced logging features facilitate audits and traceability of the usage of the collected data.

Operations and Management

The term operations and management (O&M) refers to the act of operating and managing the network and the devices in a factory deployment. Operations Support System (OSS) refers to the software used to accomplish this task.

The factory floor consists of machinery used to produce and manufacture goods. The machines are organized often into an assembly line through which the goods flow with or without human intervention and depending on the level of automation. The different tools and machines used for the production may or may not be connected. If connected, typically some kind of data is gathered from the machinery to either for predictive maintenance of the tools and machinery itself or to aid in the quality assurance process of the goods being manufactured. This is called the operational technology (OT) part of the factory floor.

Most enterprises, factories included, also have communication infrastructure in place for the work force comprising of wired and wireless communications (typically Ethernet and Wi-Fi), computers, mobile phones, etc. This equipment is used to access Intranet and internet, email, and other typical office applications. This is called the information technology (IT) part of the factory floor.

The merger of OT and IT has been identified as an emerging trend. In practice, this means a single interface to operate and manage both the devices, connectivity, the data generated by these devices, and the network infrastructure in a factory. Research questions related to the OT/IT merge in factories include:

- What kind of device management protocols are used for the OT and can those interface to the IT system?
- What kind of platform is needed to handle all the different aspects?

Digital twin concept is very popular in the industry setting. Here the idea is to bring the data gathered to a digital data model of the physical asset or the whole factory and then apply analytics on the data to predict, describe and prescribe the past, current and future behavior of the asset or process. Research questions around the digital twin concept include:

- How to model the physical assets?
- What data is relevant to capture and for how long?
- What kind of latency is required for real time interaction and how to provide that?
- What kind of models are needed to predict possible futures?
- Where to compute and what kind of compute capabilities are needed to perform meaningful prediction?

All of this should be achieved with an easy to use system that can bring increased reliability and availability, reduce risks, lower maintenance costs and improve production. Solutions where an operator exposes/delegates only a small portion of its O&M to its customer may be desirable. The customer should get a simple interface. Solutions should be possible to scale down to just a handful of devices, such that even households can use it.

Finally, augmented reality and virtual reality in conjunction with the digital twin ideas may have a large impact on future network management in the merge IT and OT space. Equipment management may be done remotely with the feel of being present in the same space. Also, technical documentation and guidance on equipment use or repair can be provided remotely to a person on site through smart glasses, tablets, etc.

Time-Sensitive Networking

Following a general idea and initial overview of Time-Sensitive Networking (TSN), where the material presented will help to get a good starting point in TSN. Also provided are certain details of 5G-TSN integration.

TSN is envisioned to improve wired IEEE 802.3 Ethernet communication, to enable support for the very demanding domain of industrial applications (and others). TSN stands for Time-Sensitive Networks (or Networking). It is an ongoing IEEE standardization initiative by the TSN task group. They define TSN as a set of individual features. Most TSN features are extensions to the IEEE 802.1Q standard. A TSN network comprises Ethernet end stations (sometimes also called end points), Ethernet cables and bridges (also called switches). An Ethernet bridge becomes a TSN bridge if it supports a certain (not-defined) set of TSN features.

The different features in the TSN standard in general aim at:

- zero packet loss due to buffer congestion (usual Ethernet bridges indeed drop packets if buffers are filled)
- extremely low packet loss due to failures (equipment, bit errors, control plane etc.)
- guaranteed upper bounds on end-to-end latency
- low packet delay variation (jitter)

Communication in TSN happens in TSN streams. One specific feature in TSN, to give an example, is that streams are subject to an agreement, as arranged between the transmitters (end stations called Talkers) and the network till the receivers (end stations called Listeners), that ensures low latency transmissions without unforeseen queueing.

In the following, TSN is introduced from a high-level perspective. Afterwards are technical details of what a TSN and 5G interworking will look like and how certain TSN features can be supported in 5G.

The TSN standardization arose from a standardization initiative that was found to define an Ethernet-based communication standard for Audio and Video communication called Audio-Video Bridging (AVB). TSN is based on AVB and is enhanced with features to make it suitable for industrial usage. Up to now, the TSN community focuses on the following industrial use cases:

- Industrial communication for factory automation (major use case #1)
  - Shopfloor TSN links (horizontal)
  - Shopfloor to cloud TSN links (vertical)
  - Intra-machine communication
  - TSN for the factory backbone
- Intra-vehicle communication (major use case #2)
- Electrical power generation and distribution (Smart Grid use cases)
- Building automation (no practical examples on this found so far)
- Fronthauling (according to IEEE P802.1CM)

In this document, the use in industrial communication for factory automation is addressed, although some of the detailed techniques and concepts may be applicable to other use cases.

Figure 27:
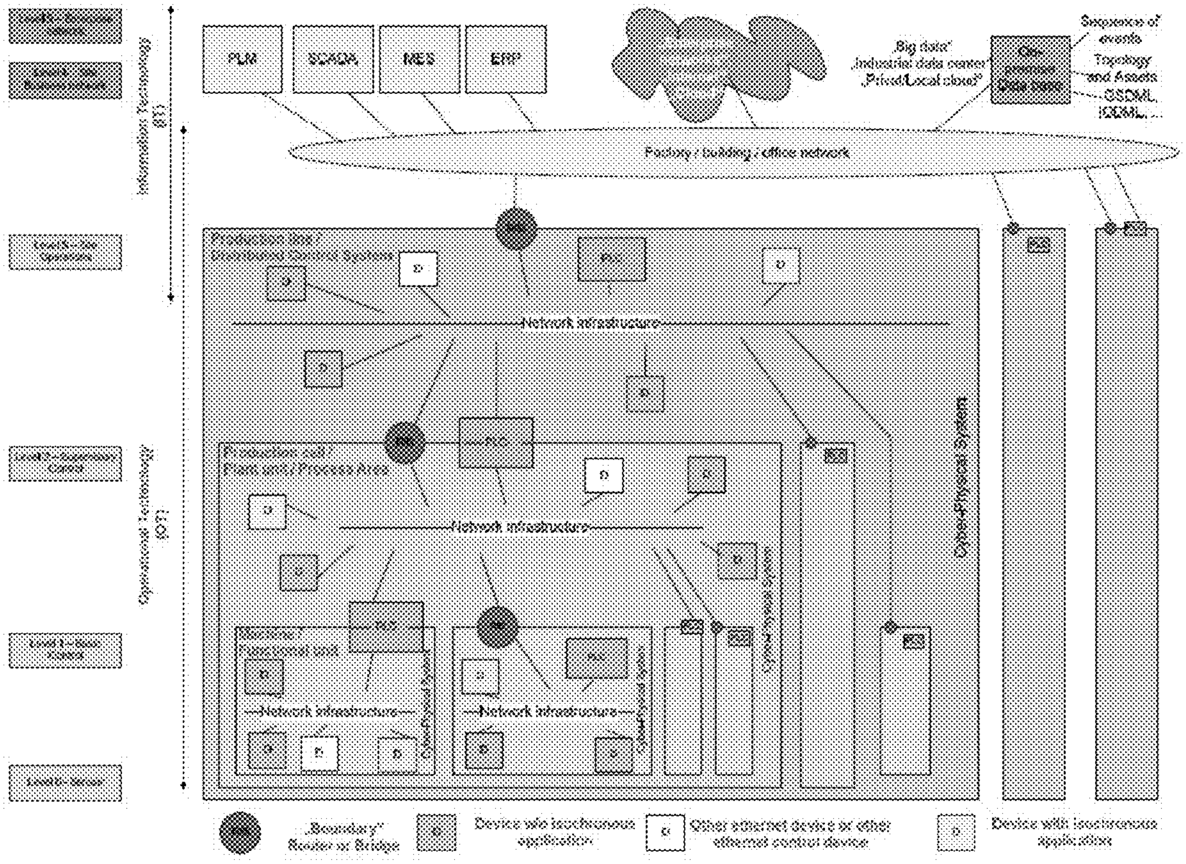
FIG. 27 illustrates a hierarchical network architecture in a factory.

FIG. 27 illustrates a hierarchical network architecture in a factory. Shop floor TSN links (horizontal) appear within production cells, connecting devices or machines and controllers. The production line areas enable the connection between the Operational Technology (OT) domain and the Information Technology (IT) domain, but are as well used to connect production cells on the shop floor, if necessary. In the TSN categorization we introduced above, the first one (OT-IT) is obviously based on shop floor to cloud TSN links (vertical) and the latter again on shop floor TSN links (horizontal). TSN used for intra-machine communication is in so far different from horizontal shop floor TSN link, as this is probably a TSN network deployed by a single machine vendor inside for example a printing machine or any other machine tool—from a 5G perspective it is less likely that these horizontal links need to be addressed. TSN for the factory backbone is used in the factory/building/office network (light-orange area). If deterministic communication from virtualized controllers is desired, for example, TSN is necessary end-to-end down to the shop floor.

TSN communication is another kind of packet service that is based on a best effort Ethernet packet network but enhanced though TSN features. An agreement is used between devices involved in communication, to achieve determinism. The agreement limits the transmitter of a TSN stream to a certain bandwidth and the network, in return, reserves the needed bandwidth, reserving buffering mechanisms and scheduling resources. The resources can be exclusively used by the specific stream. Compared to other packet services such as CBR (Constant Bit Rate) and best effort type of packet services, certain observations can be made.

Figure 28:
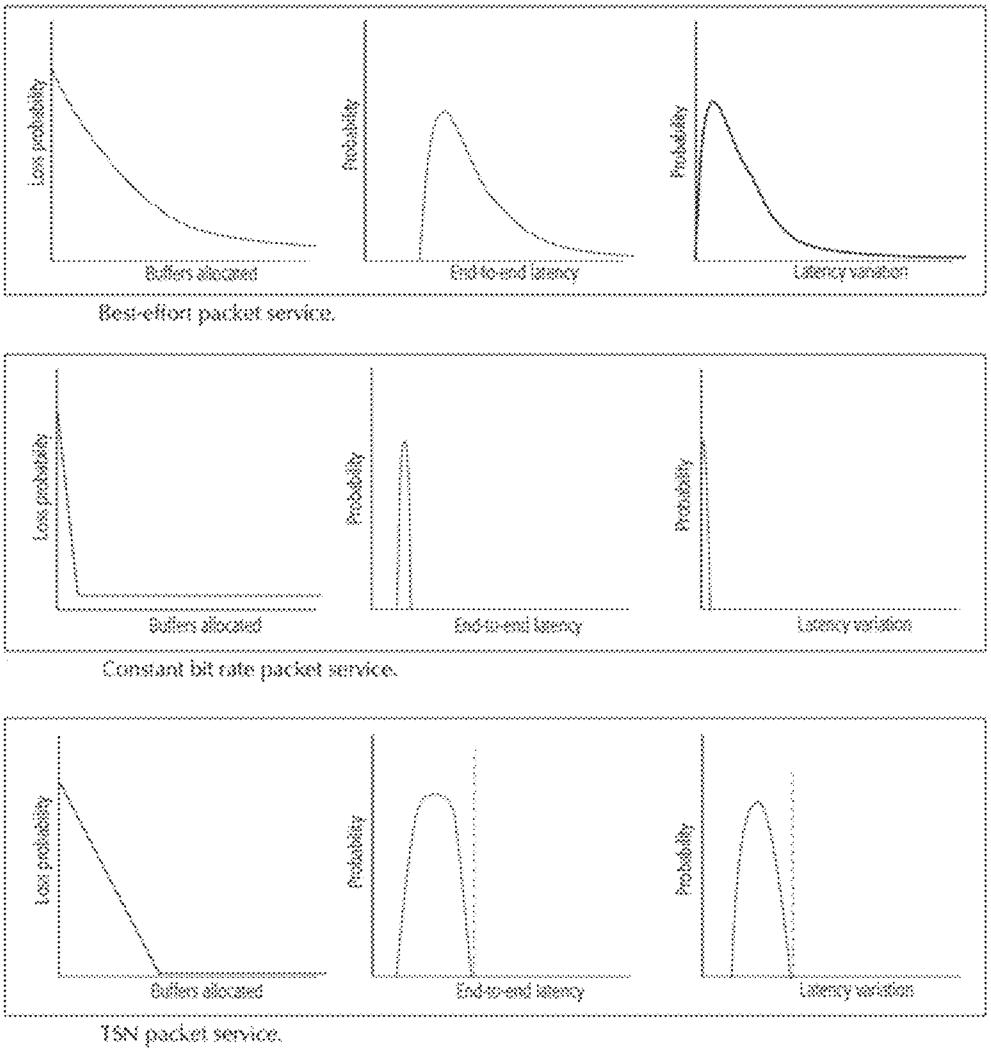
FIG. 28 shows different packet services and quality-of-service relations.

A best effort packet service is perhaps the most known one, where packets are being forwarded and delivered as soon as possible. There are no guarantees, however, on the timely delivery of the packets. The end-to-end latency and the variation of the latency is rather large, and thus a statistical language is preferred to express the overall performance (loss, end-end-latency and jitter). The top part of FIG. 28 shows the typical performance of a best effort packet service network. The typical tail in end-to-end latency causes a problem for most industrial use cases.

On the contrary, there is also the CBR packet service that offers fixed latencies and jitter (latency variation) close to zero as seen in the application layer. CBR is typically offered by multiplexing in the time domain with typical examples being SDH (synchronous digital hierarchy networks) or OTN (optical transport networks). Typical performance of CBR can be seen in the middle part of FIG. 28. A drawback of CBR is that it is very inflexible in the way network resources are shared. So, it is hard to adapt to different application needs, for example in terms of latency or bandwidth—but of course in industrial context the requirements are manifold, and a single network to server all is desired.

TSN aims at supporting all type of traffic classes (Quality of Service (QoS) and non-QoS) over the same infrastructure. Therefore, the TSN network sits somewhere between a CBR and a best effort type of packet service, where the latency is typically larger compared to a CBR network, but the latency variation and the jitter are bounded—no tails. In other words, TSN offers a guarantee that the network will not perform worse than a specific agreed end-to-end latency and jitter, as seen in the bottom part of FIG. 28. These guarantees can be flexibly adapted. This behavior is required by most industrial applications.

A core feature of TSN is the “stream concept,” where a stream comprises dedicated resources and API. A TSN stream can be seen as the unicast or multicast from one end station (talker) to another end station or multiple end stations (listener(s)) in a TSN capable network. Each stream has a unique StreamID. The Stream ID is created of talker source MAC address and a unique stream identifier. Bridges will use the StreamID plus the priority code (PCP) field and VLAN ID (VID) that is included inside an 802.1Q VLAN tag in the Ethernet header for internal frame handling. In that sense, TSN streams are standard 802.1Q Ethernet frames that are given more privileges than regular Ethernet non-TSN frames. Before a talker starts sending any packet in a TSN stream, the specific stream has to be registered in the network and certain TSN features to be configured. Next to TSN streams with guaranteed QoS, also best-effort traffic can be sent in a TSN network by peers—but of course without or just limited guarantees on QoS. TSN streams are sent in TSN domains. A TSN domain can be seen as a continuous domain, where all devices are in sync and continuously connected through TSN capable ports. a TSN domain is defined as a quantity of commonly managed devices; the grouping is an administrative decision.

Stream management is defined in IEEE 802.1Qcc, Qat, Qcp and CS. It defines the network discovery and the management of network resources and TSN features in a network as for example the creation of the required protected channels for TSN streams. Moreover, stream management offers users and network administrators functions to monitor, report and configure the network conditions. In TSN, there are three configuration models: a distributed, a centralized and a fully centralized one. In the latter two models a Central Network Controller (CNC) is used similar to a Software Defined Networking (SDN) controller to manage TSN switches. In the fully centralized model, a Central User Controller (CUC) is used in advance as a central interface for end stations and users. In the distributed model, there is no central control, so bridges and end stations need to negotiate on TSN requirements; in this model some TSN features that require a central instance for coordination are not applicable. A lot of TSN features also aim at a common protocol and language standard for interactions between CNC/CUC, end stations and bridges (i.e. YANG, Netconf, Restconf, LLDP, SNMP etc.).

Time synchronization is used to establish a common time reference that is shared by all TSN enabled network entities. The time synchronization is based on the exchange of packets containing time information as defined in IEEE 802.1AS-rev; it defines some amendments to the Precision Time Protocol PTP, widely used in industrial context, that is then called gPTP (generalized PTP). gPTP is an advanced version of PTP in a sense that it supports also redundant grandmaster deployments as well as also the establishment of multiple time domains in a single PTP network and some other enhancements and also restrictions to the broader PTP. The ambition of gPTP is to achieve a sub-microsecond accuracy in synchronization. The precise time synchronization is used for some TSN features (for example IEEE 802.1Qbv), as well as provided to applications relying on a common notion of time (like distributed motion control).

Stream control, which provides for bounded low latency, specifies how frames belonging to a prescribed TSN stream are handled within TSN enabled bridges. It enforces rules to efficiently forward and appropriately queue frames according to their associated traffic classes. All existing stream controls follow similar principles, namely, certain privileges are associated with TSN streams while frames not from prioritized TSN streams might be queued and delayed. Relevant features for industrial networking are IEEE 802.1Qbv (introduces "time-gated queueing," i.e. time-coordinated handling of frames) and IEEE 802.1Qbu plus IEEE 802.3br for frame pre-emption. 802.1Qbv relies on precise time synchronization and is only applicable if a CNC is used to schedule frame forwarding in bridges similar to a time-division multiplexing manner. Using Qbv, a CNC tells each bridge alongside a path in the network exactly when to forward frames. An alternative to Qbv is Credit-Based Shaping (802.1Qav) originating from AVB, likely not used for strict industrial use cases as it is not as deterministic. An additional feature called Asynchronous Traffic Shaping (802.1Qcr) is in an early stage of development. An argument against Qbv, which is maybe the best suited to achieve guaranteed latency bounds, is the complexity it requires in terms of scheduling and time synchronization. Qbv and frame preemption (Qbu and br) can might be used separately or also combined.

Stream integrity is important for providing ultra reliability. Apart from delivering packets with ultra-low latency and jitter, TSN streams need to deliver their frames regardless of the dynamic conditions of the network, including transmission errors, physical breakage and link failures. Stream integrity provides path redundancy, multipath selection, as well as queue filtering and policing. One main feature therefore is IEEE 802.1CB, including Frame Replication and Elimination Redundancy (FRER).

Figure 29:
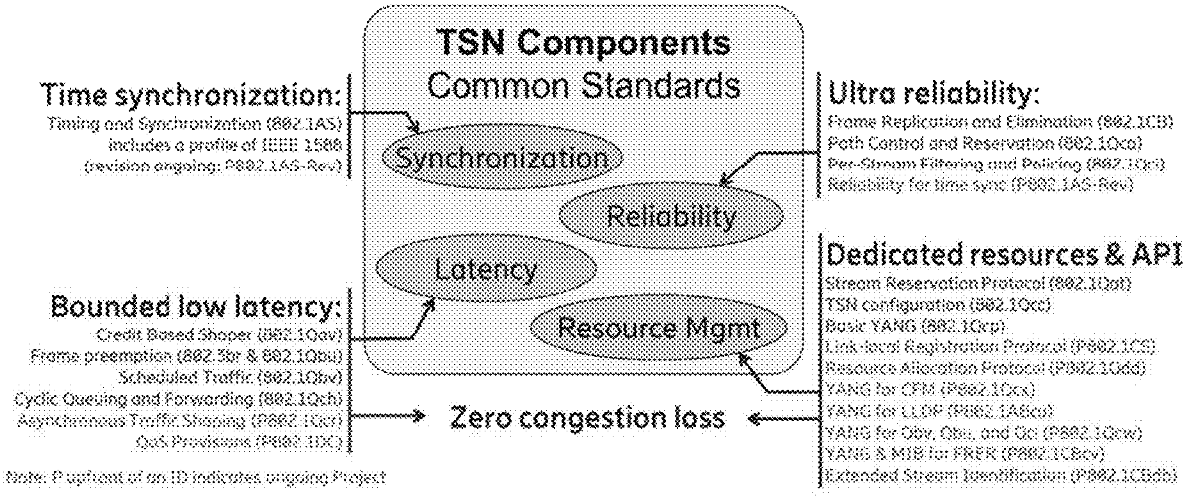
FIG. 29 introduces concepts of time-sensitive networking (TSN).

A visual summary of the TSN features described above is given in FIG. 29.

Interworking between 5G and TSN is discussed here. Since both systems provide diverse ways for ensuing QoS and for network management, new solutions are required. The basic idea according to some of the techniques described here is that the 5G-System (5GS) adapts to the network settings of the TSN network. It should be noted that ongoing TSN standardization defines a set of features. and not all features need to be supported for every use case. Announcements about which set of TSN features are relevant for which use cases have not been done yet. An ongoing initiative to address this issue is the joint project IEC/IEEE 60802: "TSN Profile for Industrial Automation". It is under development and updated frequently. Publication is planned for 2021.

Real-time Ethernet is one of the established wireline communication technologies for vertical applications. For wireless communication technologies, 3GPP TS 22.104 specifies 5G system requirements to support real-time Ethernet. When some sensors, actuators and motion controller are connected using a 5G system and others are connected using industrial (i.e. real-time) Ethernet, the interconnection between real-time Ethernet and 5G is realized using gateway UEs connected to Ethernet switches or a device is connected directly to a data network using an Ethernet adapter.

Potential baseline system requirements are:

- The 5G system shall support the basic Ethernet Layer-2 bridge functions as bridge learning and broadcast handling
- The 5G system shall support and be aware of VLANs (IEEE 802.1Q)
- The 5G system shall support clock synchronization defined by IEEE 802.1AS across 5G-based Ethernet links with PDU-session type Ethernet.
- The 5G system shall support for TSN as defined by IEEE 802.1Q, e.g. IEEE 802.1Qbv (time-aware scheduling)
- The 5G system shall support coexistence of critical real-time traffic following a time-aware schedule and non-TSN lower priority traffic.

A TSN network consists of four types of components: bridges, end stations, network controller(s) and cables (minor notice: it is common in industrial context that end stations are switches as well to enable daisy-chaining and ring topologies for example). A 5G network will in most cases need to act like one or more TSN bridges if a seamless integration into a TSN network is envisioned. Therefore, in many cases the 5G network will take part in the TSN network configuration as a usual TSN bridge.

Figure 30:
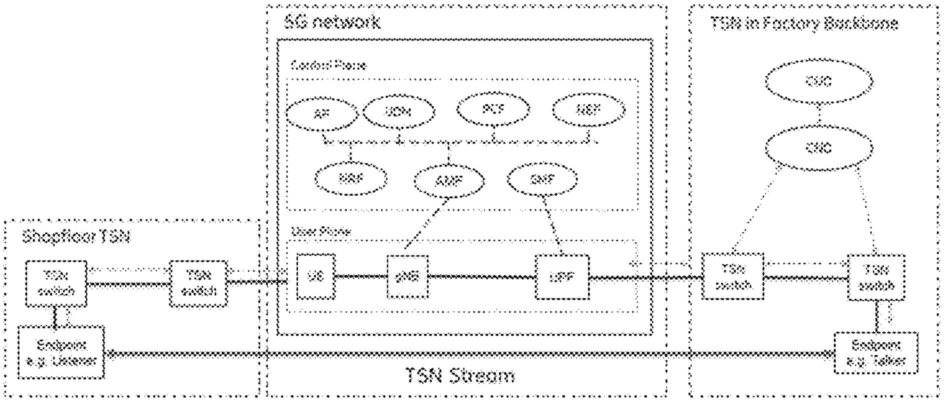
FIG. 30 illustrates an example TSN and 5G interworking architecture in an industrial scenario.

FIG. 30 illustrates a baseline architecture in a factory network, where TSN components are used on the shop floor, as well as in the factory backbone TSN. 5G is used to replace the shop floor to cloud (vertical) connection (5G for vertical TSN links). In general, a shop floor TSN as illustrated in FIG. 30 might be at least a single TSN-capable end station without any TSN switch. Talker and listener(s) might appear on both sides (UE and UPF) of the 5G network. The 5G network is used to connect or merge both TSN domains. Wireless Access Points or 5G Base Stations may be used to connect TSN domains. A CUC and CNC in FIG. 30 are deployed on the factory backbone-side, although they might well be implemented on the shop floor, for example as part of an intra-machine TSN network.

Connecting two TSN domains on the same shop floor (5G for horizontal TSN links) is one possible scenario. In this case, the 5GS replaces a single hop on the shopfloor. Because NR does not presently support a device-to-device (D2D) capability, this would be a two-hop (UE A-gNB/Core-UE B) connection in 5G.

For TSN used inside machines (intra-machine communication), an interworking with 5G is obviously of less relevance as introduced above. Two nodes inside a (possibly metallic) machine will likely not rely on a central connection to a 5G base station to communicate wirelessly. A typical example, is a printing machine where different motors must be controlled very precisely to achieve an accurate result.

Figure 31:
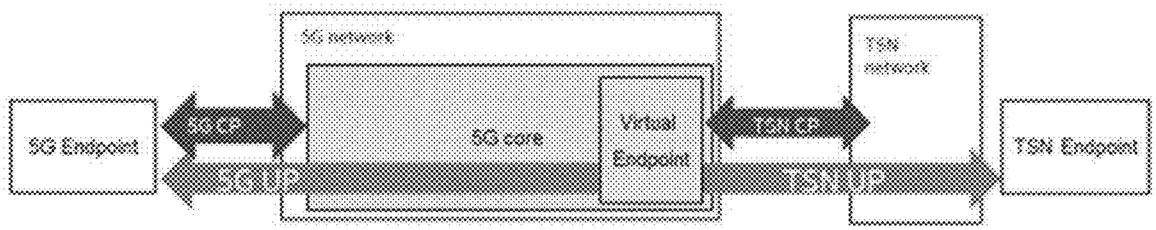
FIG. 31 shows the use of virtual endpoints to connect non-TSN devices to a TSN network using 5G.

A further option is that a legacy 5G device (i.e., a device without TSN feature support, or maybe not even an Ethernet device) is connected to a 5GS that is connected to a factory backbone TSN network. As the 5G device is not aware of any TSN features or capable to support them itself, the 5GS might act as a virtual endpoint that configures TSN features on behalf of the 5G device to be able to communicate to a TSN endpoint with seamless QoS end-to-end. A virtual endpoint function could be part of a UPF in the 5GS. From a TSN network point of view it looks like the virtual endpoint is the actual endpoint—the 5G endpoint is covert. FIG. 31 illustrates the conceptual way of working, showing how virtual endpoints may be used to connect non-TSN devices to a TSN network using 5G. In the figure, "UP" refers to "user plane," while "CP" refers to "control plane." This concept may be referred to as "Application Gateways".

Some TSN features introduce challenges to the 5GS. In the following, it is highlighted how some key TSN features might be supported by the 5GS, to enable a seamless 5G TSN interworking.

Network-Wide Reference Time (IEEE 802.1AS-Rev)

In TSN, reference time is provided by the IEEE 802.1AS-rev synchronization protocol that allows local clocks in the end stations and switches to synchronize to each other. More specifically, the so-called Generalized Precision Time Protocol (gPTP) described therein employs a hop-by-hop time transfer between the different TSN capable devices of the network. The protocol supports the establishment of multiple time domains in a TSN network and a redundant grandmaster setup as well as other features. A 5GS should be able to take part in the gPTP processes, allowing the same clock accuracy and synching capabilities as in TSN. The gPTP processes must always run periodically to compensate clock drifts. The clock information received by the 5GS over cable from a grandmaster in the TSN network need to be carried over the air from a basestation (BS) to a UE or maybe as well the other way around. Different options are currently discussed how that could be done and it is an ongoing topic in standardization. In the following and in general, a grandmaster is a device that carries a source clock used for gPTP.

Figure 32:
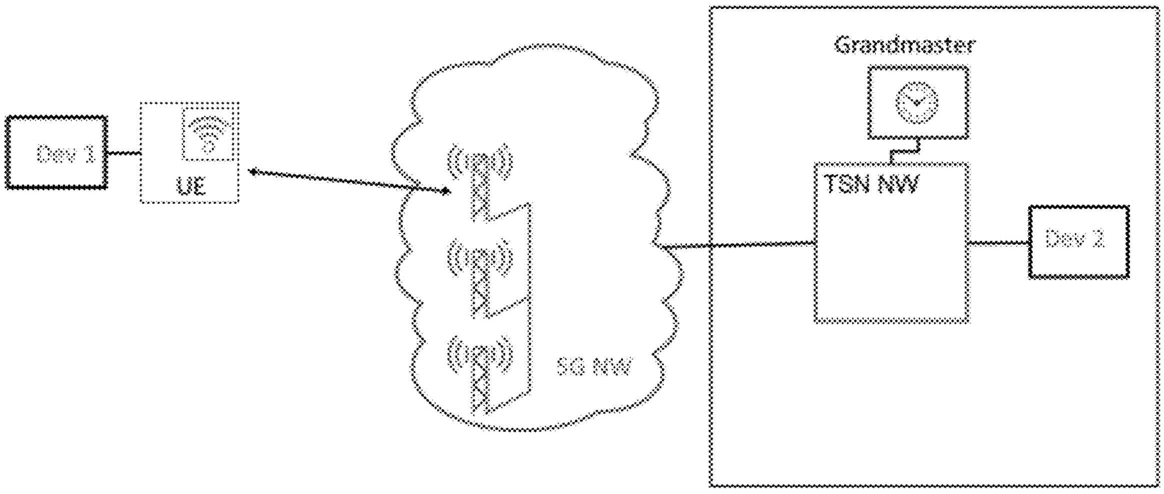
FIG. 32 illustrates TSN time synchronization across a 5G network.

A simple example of TSN time synchronization across a 5G network is illustrated in FIG. 32. A grandmaster's time signal is received in the 5GS at the side of the UPF and send over the air by a BS. The UE forwards the time signal it receives from the BS to Device 1 ("Dev 1," in the figure). Device 1 might need the time signal of the grandmaster to be able to communicate with Device 2 ("Dev 2, in the figure).

Internally, the 5GS might use any signaling not related to gPTP to carry the grandmasters time signal. In that case the ingress points in the 5GS (at UE and User Plane Function (UPF)) need to act as gPTP slaves. They get synched themselves to the grandmaster from the gPTP signals arriving and forward that notion of time on the RAN. Of course, the requirements on time synchronization accuracy are defined by the application and need to be satisfied. In LTE Release 15, a signaling mechanism for accurate time synchronization with sub-microsecond accuracy has been introduced and might been reused for NR.

Figure 33:
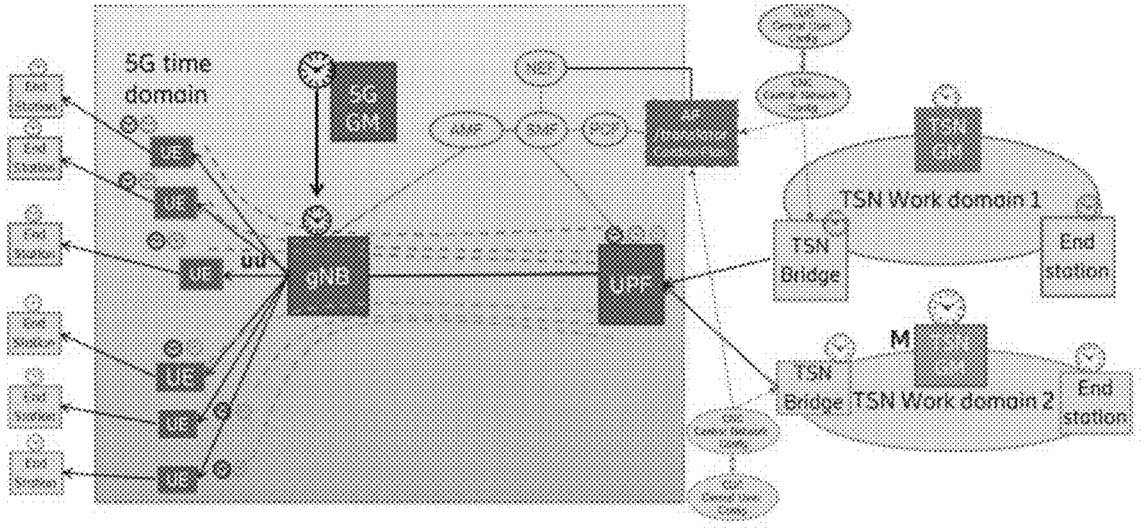
FIG. 33 shows support of multiple time domains in a 5G system.
Figure 34:
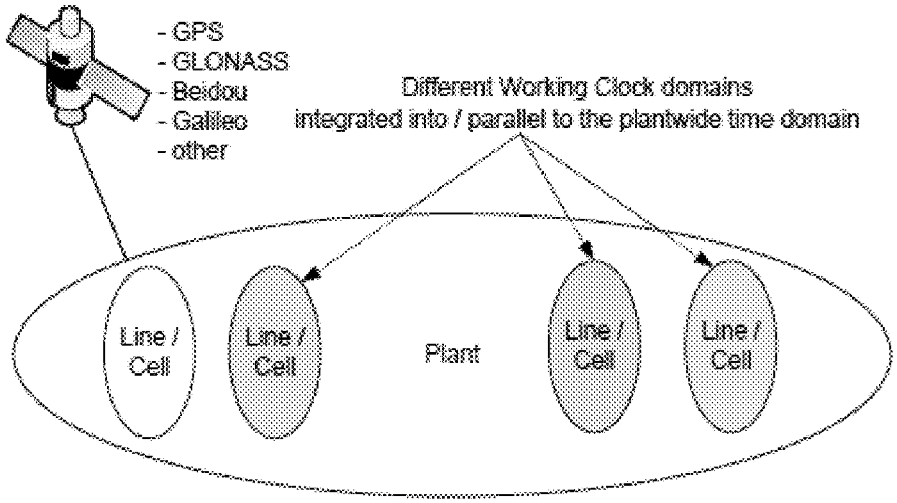
FIG. 34 shows multiple time domains in a factory network.

For industrial use cases the support of multiple time domains might be relevant, as depicted in FIG. 33 and FIG. 34. One time domain might be a global one, such as the Coordinated Universal Time (UTC). This time domain might be used by applications to log certain events on a global time base. Furthermore, additional time domains might be used based on local clocks, i.e., clocks that are based on an arbitrary timescale and don't have a certain defined start-point epoch (e.g., a clock at a grandmaster that started at the boot up of the device instead of referring to a global clock timescale). This local clock might have a much higher precision than the global clock. It is distributed from a grandmaster to a few other devices and used on the application layer to coordinate very accurately synchronized actions or for example for timed communication as defined in 802.1Qbv. To support multiple time domains in the 5GS, one possible way of implementation is to establish a common reference time between all gNBs and UEs, for example using the UTC timescale, and then based on that, transfer individual time domain signals in the 5GS only to end-stations requiring that specific time domain. For transmission of individual local time signals it is possible to use timestamping from the common reference time or transmit offsets periodically that are referenced to the common reference time. In addition, it might also be possible that a forwarding of gPTP frames is done transparently through the RAN by using a similar timestamping mechanism.

The concept to use a common reference time to support multiple other time domains in general is illustrated in FIG. 33. In this figure, the clock in the 5G time domain depicts the common reference time, while the clocks in the TSN work domains are local clocks that need to be forwarded to some UEs over the 5GS. Based on the timestamps done using the common reference time at UE and UPF, it would be possible to correct the times inside gPTP packets (belonging to a TSN work domain clock) to account for varying transmit times in the 5GS. Only a subset of all gPTP frames arriving at the ingress might need to be transported across the 5GS, like for example Announce (config) frames and Follow-Up (carry timestamps) frames. Other frames could be consumed at the 5GS ingress and not forwarded. At the egress the 5GS need to act like a gPTP master in any case. To detect and differentiate time domains, the domain Number field in the gPTP header of each frame can be used. There are some efforts necessary to identify which UE needs to be synched to which time domain. A recent research activity has addressed this issue.

In FIG. 33 the Application Function (AF) in the 5GS is used as an interface towards the CNC in the TSN network—in one possible way the CNC might provide information to the 5GS about how time domains need to be established, i.e., which UE needs which time domain signal.

Timed Transmission Gates (IEEE 802.1Qbv)

Figure 35:
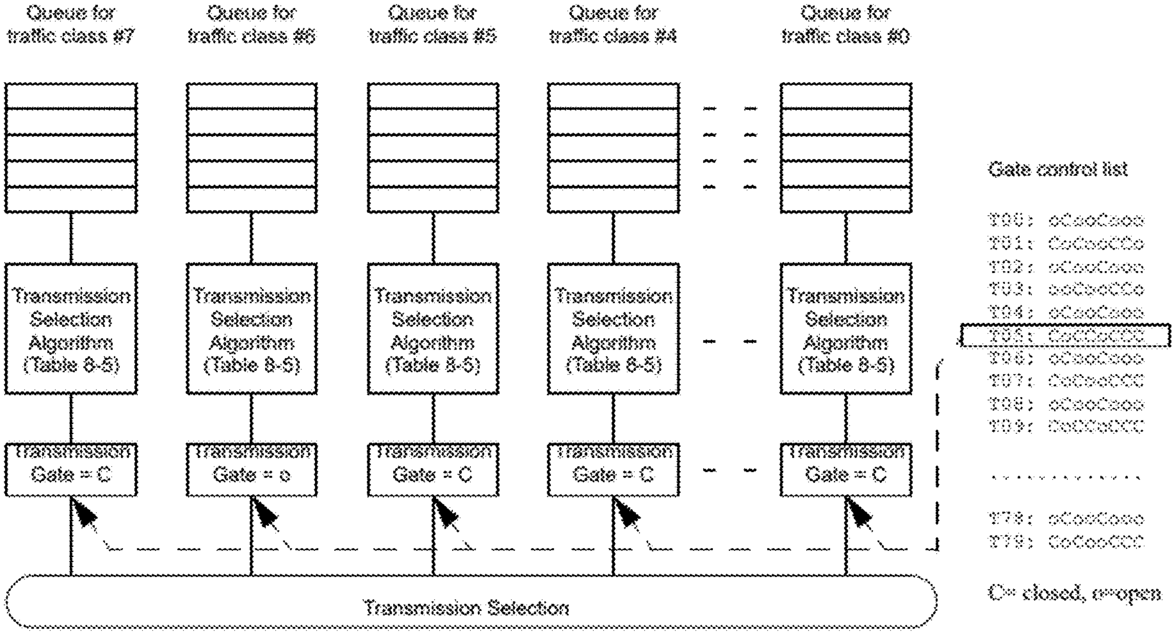
FIG. 35 illustrates time-gated queuing.

The TSN feature IEEE 802.1Qbv provides scheduled transmission of traffic controlled by transmission gates. Each egress port in an Ethernet bridge is equipped with up to eight queues and each queue with a separate gate. This is illustrated in FIG. 35.

Ingress traffic is forwarded to the queue at the egress port it is destined to; the egress queue is for example identified by the priority code point (PCP) in a frame's VLAN-header field. A regular cycle ("periodic window") is established for each port, and at any particular time in that window, only certain gates are open and thus only certain traffic classes can be transmitted. The queue coordination is done by the CNC. The CNC gathers information about the topology, streams and also individual delay information from all switches and creates a Gate Control List (GCL). The GCL controls the timing of the opening and closing of queues at each switch, but not the order of frames in the queue. If the order of frames in the queue, i.e. the queue state, is not deterministic, the timely behavior of the two streams may oscillate and lead to jitter for the overall end-to-end transmission. By opening and closing gates in a time-coordinated manner it is possible to achieve a deterministic latency across a TSN network, even if indeterministic best-effort type of traffic is present on the same infrastructure. Best effort traffic is simply held back by closing its queue and let priority traffic pass from another queue. It is important to mention that a timely delivery does not just mean to not sent a frame to late from one bridge to the next but also prohibits to send it too early as this might lead to a buffer congestion at the consecutive hop.

The 5GS should be able to transmit frames in a way that the 802.1Qbv standard expects, i.e., according to a GCL created by a CNC in case the 5GS acts as one or multiple TSN switches from a TSN network perspective. This means keeping specific time windows for ingress and egress TSN traffic at UE and UPF respectively. So, data transfer in the 5GS has to happen within a specific time budget, to make sure that the packets are forwarded at the configured point in time (not earlier or later) to the next TSN node in both uplink and downlink. As the biggest part of the latency in the 5GS is probably added in the RAN it seems reasonable to use the timing information from a CNC at gNBs to improve the scheduling of radio resources. It might be possible to exploit the information about transmission timings according the Qbv scheduling for an efficient scheduling of radio resources at a BS using mechanisms like configured grants and semi-persistent scheduling. As a BS anyhow needs to be time aware to be able to forward the time signal to UE(s) it just might need to get aware about the transmission schedules in advance. The Qbv mechanism ensures frames arrive at the 5GS from the TSN network with minimum jitter.

The Application Function (AF) in the 5GS might be an option to interface the CNC. There, a topology could be announced, as well as latency figures could be provided to the CNC as if the 5GS would be a regular TSN switch or any TSN switch topology. The AF then could also accept a time schedule from the CNC and translate it into meaningful parameters for the 5GS to support the time gated queuing happening in the external TSN network. It is important to understand that in the current way the CNC is specified it will accept only fixed numbers to define the delay that is added through a typical TSN switch. Therefore, some new methods are required to allow also the 5GS to be a more "flexible" TSN switch regarding the latency numbers that need to be reported to the CNC.

One way of achieving a timely delivery of packets might involve the use of playout-buffers at the egress points of the 5G network (i.e. at a UE and the UPF for downlink or uplink). Those playout buffers need to be time aware and also aware of the time schedule used for Qbv and specified by the TSN network's CNC. The use of playout buffers is a common way to reduce jitter. In principle for downlink for example the UE or any function following the UE will hold back packets until a certain defined point in time has come to forward it ("play it out"). Same would be possible in uplink, probably in the UPF or after the UPF as an additional function for TSN traffic.

Frame Preemption (IEEE802.1Qbu)

The IEEE 802.1Qbu amendment, "Frame Pre-emption", and its companion IEEE 802.3br, "Specification and Management parameters for Interspersing Express Traffic," add the capability of interrupting a frame transmission to transmit a frame of higher priority. Because they do not have to wait for the lower-priority transmission to fully finish, any express frames have shorter latency. The eight priority levels are split into two groups: express and preemptable. The queues assigned to priority levels belonging to the express group are referred to as express queues. The transmission of the pre-empted frame resumes after the express traffic is finished, and the receiver is able to reassemble the pre-empted frame from the fragments.

The 5G network already supports pre-emption techniques with the existing mechanisms. Whether there is additional effort needed to fully support frame pre-emption is not clear yet. It should be noted that there is an important difference between IEEE frame pre-emption and 5G pre-emption techniques. IEEE frame pre-emption is just interrupting transmission and after forwarding express frame(s) the pre-empted frame transmission is continued. There is no retransmission.

Frame Replication and Elimination for Reliability—FRER (IEEE 802.1CB)

The IEEE 802.1CB standard introduces procedures, managed objects and protocols for bridges and end systems that provide identification and replication of packets for redundant transmission. One of these procedures is Frame Replication and Elimination for Reliability (FRER), which is provided to increase the probability that a given packet will be delivered—in case one Ethernet plug is removed for any reason, or a cable is cut accidentally the communication should continue.

Figure 36:
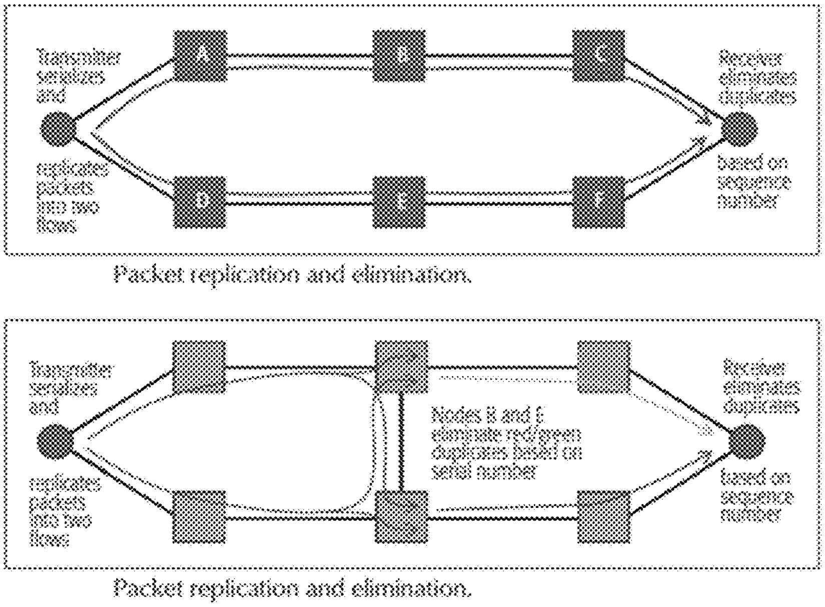
FIG. 36 shows frame replication and elimination for reliability.

FIG. 36 illustrates some of the basic features of FRER. Some of the important features of FRER are:

- Appending sequence numbers, to packets originating from a source, or from a particular stream.
- Based on the exact needs/configuration the packets are replicated. These creates two (or more) identical packet streams that will traverse the network
- At specific points in the network (typically close to or at the receiver) the duplicate packets are eliminated.
- Complex configurations are supported so the mechanism can support failures at multiple points in the network.

A 5GS might need to support end-to-end redundancy as defined in FRER for TSN as well, for example by using dual connectivity to a single UE or also two PDU sessions to two UEs deployed in the same industrial device (can be called "Twin UEs"). Anyway, redundancy in the 5GS might not base on exact the same principles as a TSN network (which means complete physical end-to-end redundancy using separate equipment). The latter ones rely on fixed wired links, while 5G relies on a dynamic radio environment. Nevertheless, redundancy as defined by FRER is rather pointing at failures in the equipment (such as an error in a gNB that leads to a connection loss, etc.), but obviously also helps to overcome influences of changing radio conditions and connection losses due to handovers.

If "Twin UEs" are used they should be connected to two BSs anytime to supports full redundancy and in case of a handover, not perform it both at a time and not to the same BS.

It is an open discussion whether a physical redundancy needs to be implemented in the 5GS or whether traffic can be carried over for example a single User Plane Function (UPF) or server hardware respectively. If for example some 5GS functions are so reliable that it is not required to be deployed in a redundant way, then it might be sufficient to just use physical redundancy for some parts of the 5GS.

Some inventions have been worked on describing how this FRER type of redundancy can be supported in the 5GS, both on the RAN and on the core. As a configuration point for redundancy we also suggest using the Application Function (AF). The 5GS could announce different redundant paths to the TSN network and internally in the 5GS could support the redundancy in a way it is sufficient with or without physical redundancy of certain components. So, the actual 5G interpretation of redundancy can be hidden from the CNC/TSN definition of redundancy this way.

5G and TSN—Network Configuration

In TSN, the IEEE 802.1Qcc extension supports the run-time configuration and reconfiguration of TSN. At first, it defines a user network interface (UNI). This interface enables the user to specify stream requirements without knowledge of the network, thereby making the network configuration transparent to the user. This of course as well relevant to achieve a plug-and-play behavior as it is common for home and office networking but especially not in today's industrial Ethernet networks.

Figure 37:
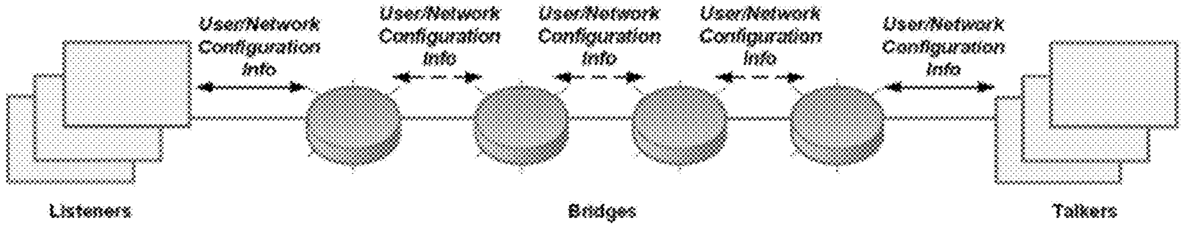
FIG. 37 shows a fully distributed model for TSN.

There are three models that enable this transparency. Specifically, the fully distributed model, where stream requirements propagate through the network originating from the talker till the listener. Therein the UNI is between an end station and its access switch. The fully distributed model is illustrated in FIG. 37, where the solid arrow represents UNI interfaces for exchange of user configuration information between talkers, listeners and bridges. The dashed arrow in the figure represents a protocol carrying TSN user/network configuration information, as well as additional network configuration information.

Figure 38:
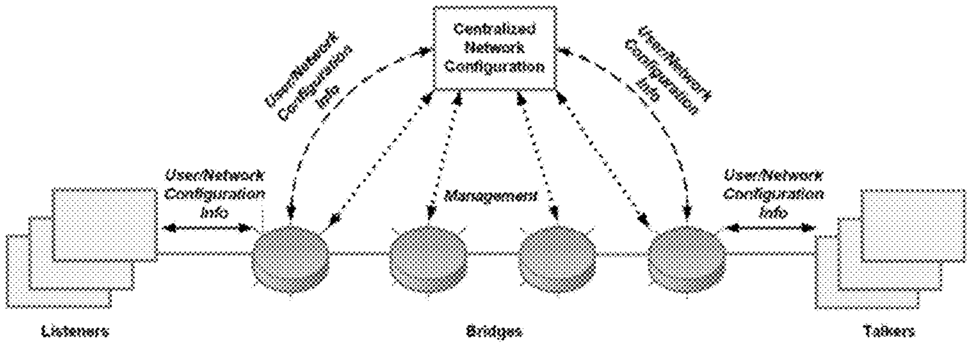
FIG. 38 illustrates a centralized network/distributed user model for TSN.

The centralized network/distributed user model introduces an entity, called the centralized network configurator (CNC), with complete knowledge of all streams in the network. All configuration messages originate in the CNC. The UNI is still between the end station and access switch, but in this architecture, the access switch communicates directly with the CNC. FIG. 38 depicts the centralized network/distributed user model.

Figure 39:
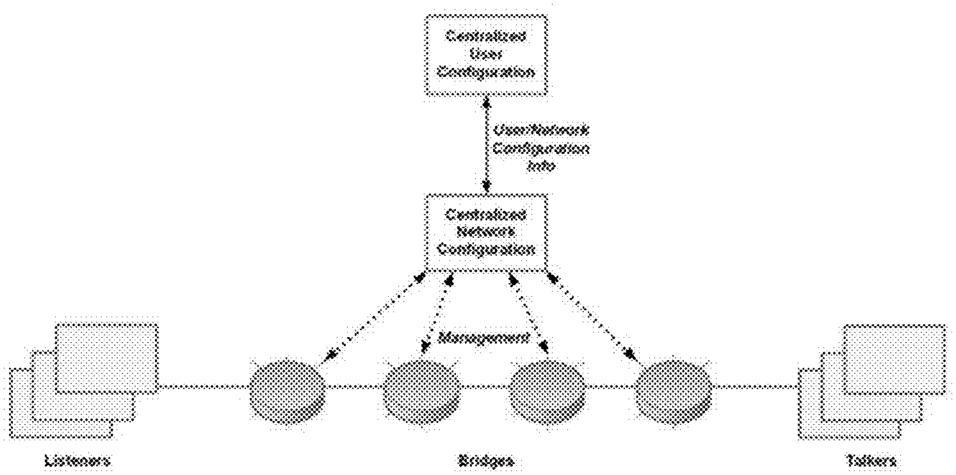
FIG. 39 illustrates a fully centralized configuration model for TSN.

Finally, the fully centralized model allows a central user configurator (CUC) entity to retrieve end station capabilities and configure TSN features in end stations. Here, the UNI is between the CUC and the CNC. This configuration model might be most suitable for the manufacturing use cases, where listener and talker require a significant number of parameters to be configured. The CUC interfaces and configures end stations, while the CNC still interfaces bridges. The fully centralized model is illustrated in FIG. 39. The following discussion provides more details for the fully centralized model, since it is likely the most suitable for the manufacturing use cases.

CUC and CNC

Figure 40:
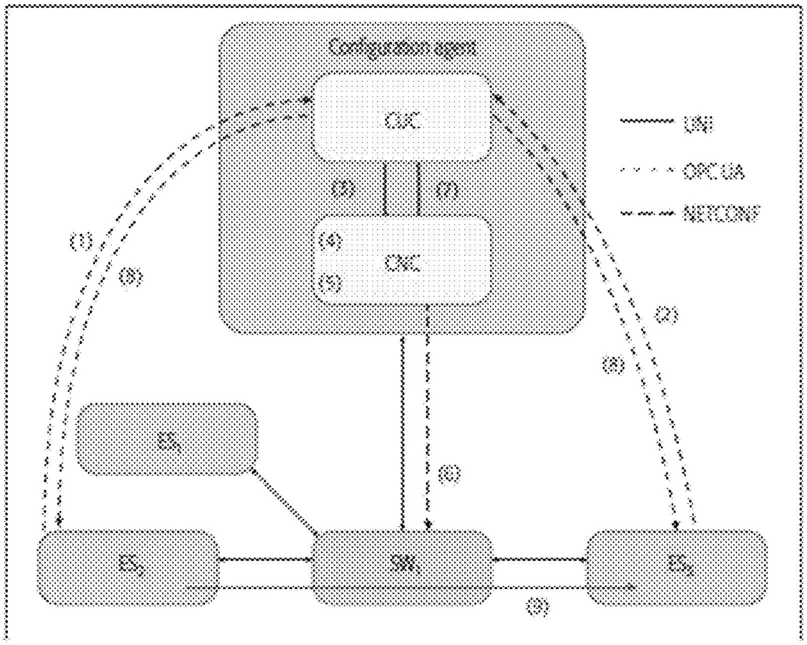
FIG. 40 shows a configuration agent consisting of CUC and CNC.
Figure 41:
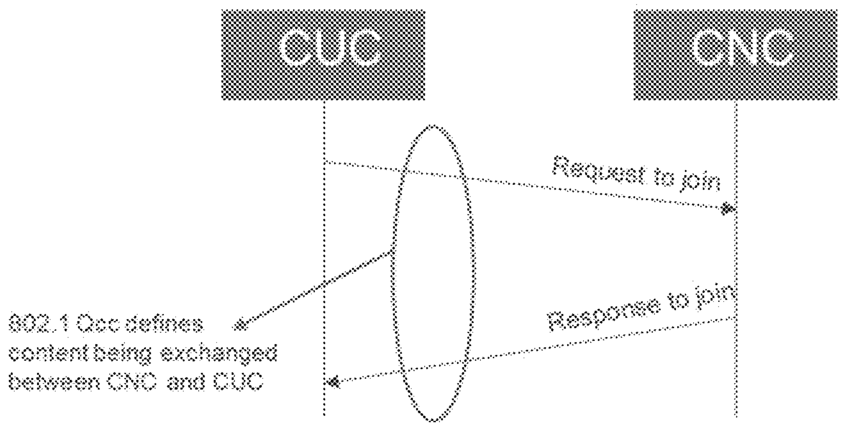
FIG. 41 shows interaction between CNC and CUC.

The CUC and CNC, at the fully centralized model, are part of a configuration agent (e.g., a PLC in a factory automation context) that executes both tasks, as shown in FIG. 40, which illustrates a configuration agent consisting of CUC and CNC. (In the figure, "SW" refers to a switch, "ES" refers to and end station, and "UNI" refers to a user network interface.) The standard IEEE 802.1Qcc does not specify protocols to be used between CUC and CNC as shown in FIG. 40. OPC UA (Open Platform Communications Unified Architecture) might be a possible selection for the interface between CUC and end stations, Netconf between bridges and CNC. For TSN stream establishment, a CUC will raise a join request to the CNC, as depicted in FIG. 41, which shows interaction between CNC and CUC.

Figure 42:
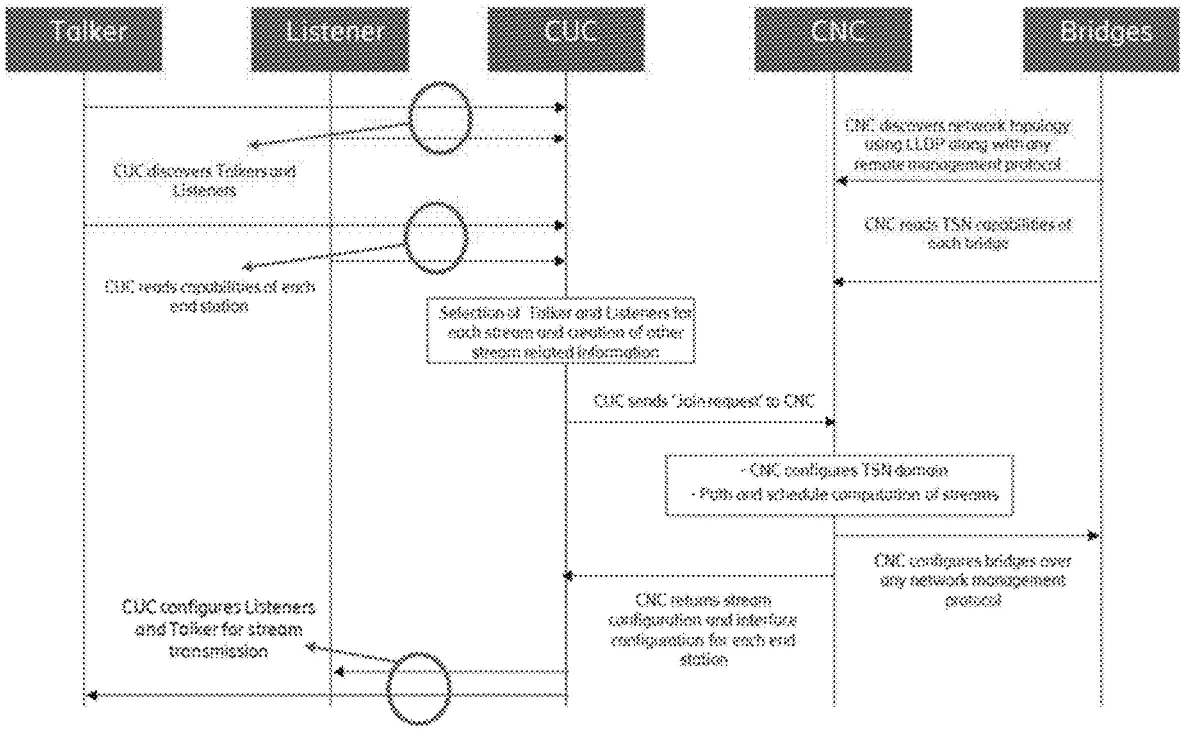
FIG. 42 is a signal flow diagram illustrating TSN stream setup in a TSN centralized configuration model.

The communication between talker and listener happens in streams as introduced above. A stream has certain requirements in terms of data rate and latency given by an application implemented at talker and listener. The TSN configuration and management features are used to setup the stream and guarantee the stream's requirements across the network. The CUC collects stream requirements and end station capabilities from the devices and communicates with the CNC directly. FIG. 42 shows the sequence diagram between different entities to conduct a TSN stream setup.

The steps to setup a TSN stream in the TSN network in the fully centralized model are as follows:

1) CUC may take input from e.g. an industrial application/engineering tool (e.g. a PLC) which specifies for example the devices which are supposed to exchange time-sensitive streams.
2) CUC reads the capabilities of end stations and applications in the TSN network which includes period/interval of user traffic and payload sizes.
3) CNC discovers the physical network topology using for example LLDP and any network management protocol.
4) CNC uses a network management protocol to read TSN capabilities of bridges (e.g. IEEE 802.1Q, 802.1AS, 802.1CB) in the TSN network.
5) CUC initiates a join requests towards the CNC to configure TSN streams. CNC will configure network resources at the bridges for a TSN stream from one talker to one or more listener(s).
6) CNC configures the TSN domain.
7) CNC checks physical topology and checks if required features are supported by bridges in the network.
8) CNC performs path and schedule (in case Qbv is applied) computation of streams.
9) CNC configures TSN features in bridges along the path in the TSN network.
10) CNC returns status (success or failure) for streams to CUC.
11) CUC further configures end stations (protocol used for this information exchange is not in the scope of the IEEE 802.1Qcc specification) to start the user plane traffic exchange as defined initially between listener(s) and talker.

Figure 43:
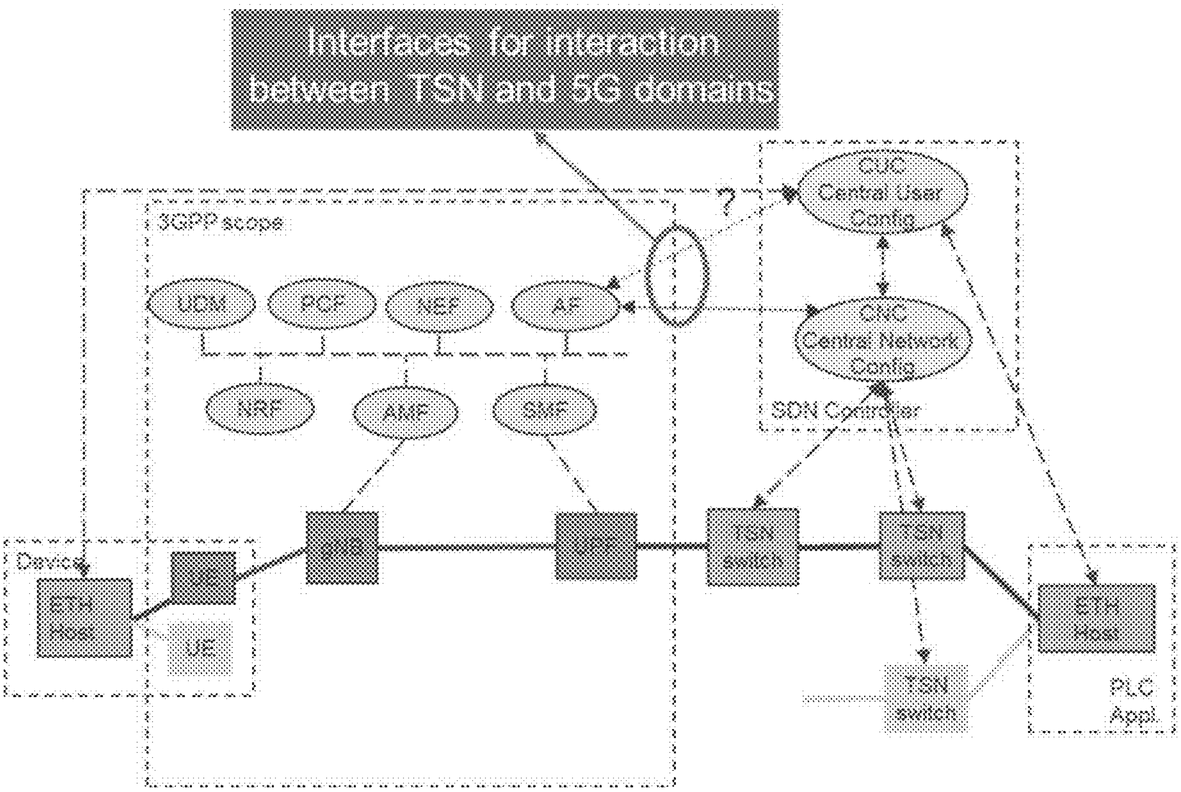
FIG. 43 shows a potential 5G-TSN integration architecture setup.

The 5GS Application Function (AF) is seen as the potential interface for the 5GS to interact with TSN control plane functions (i.e., CNC and CUC). The AF, according to 3GPP TS 33.501, can influence traffic routing, interact with the policy framework for policy control for 5G links and also further interact with 3GPP core functions to provide services, which can be utilized to setup and configure TSN streams in the 5G TSN interworking scenario. FIG. 43 illustrates the potential interfacing of the AF with the TSN control plane.

Figure 44:
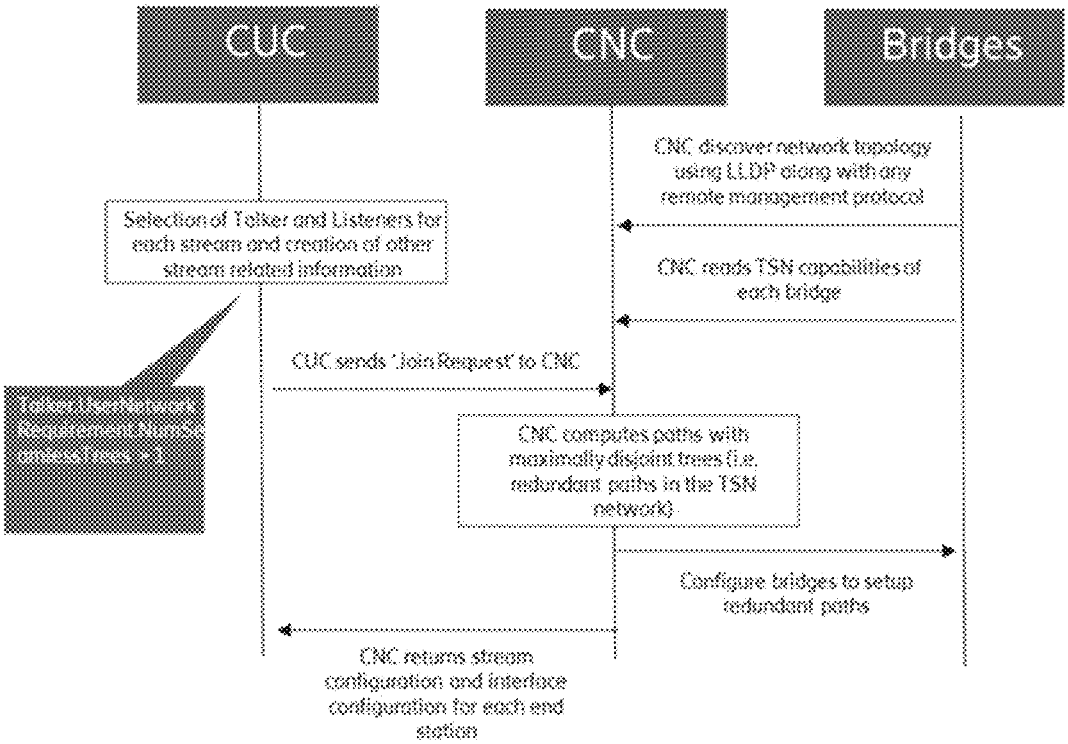
FIG. 44 illustrates TSN FRER setup.

The FRER setup sequence stream in a TSN network is shown in FIG. 44. A CUC sets the values of the parameters (NumSeamlessTrees greater than 1) in request to join message from CUC to CNC. A CNC then calculates disjoint trees based on this input in the path computation step. It uses management objects of IEEE 802.1CB (FRER) to configure redundant paths in the bridges.

Figure 45:
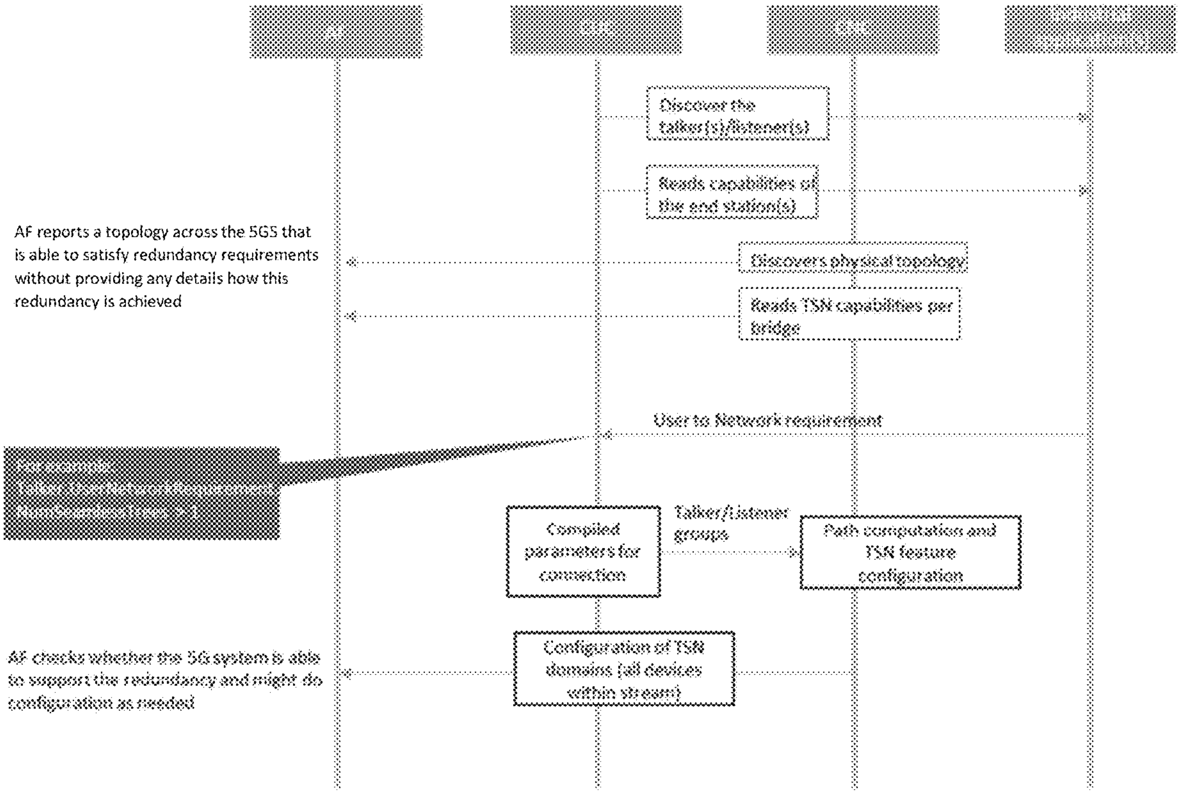
FIG. 45 shows interaction between AF, CUC, and CNC to setup FRER.

As introduced in the FRER part above, the AF could implement the interface that signals redundancy support towards the CNC and accepts redundant path computations from it. This is illustrated in FIG. 45, which illustrates interaction between AF, CUC, and CNC to setup FRER. Furthermore, the AF might also be used to interact with the CNC for other TSN features beyond FRER.

TSN is now in a research and development phase. Early products are available on the market that support only a subset of TSN features listed in here. Also, the TSN standardization is ongoing and some features are not yet finalized. Especially it is not clear which features will be relevant for industrial use cases and which not. IEC/IEEE 60802 is an ongoing effort to define a TSN profile for industrial usage. Nevertheless, it is a wide spread vision that TSN will be the major communication technology for wired industrial automation in the next years.

In the preceding paragraphs, the concept of the Time Sensitive Networks (TSN) was introduced and the vision of improving Ethernet communication for industrial applications was explained. Then the technical introduction provided some of the performance goals of a TSN that needs to handle not only best effort type of traffic but also critical priority streams. These critical streams require very low bounded latencies that TSN must support. This allows TSN to enable new use-cases in the area of industrial automation.

Then, more details on the TSN operating principles were provided, to explain how TSN can provide deterministic communication. The issue of integrating 5G with TSN core features, was also discussed. This integration requires the support of a specific set of TSN features from a 5G network. This feature set was explained and also some inventive techniques were described, for enabling a smooth interworking between the two networks.

Core Network

Figure 46:
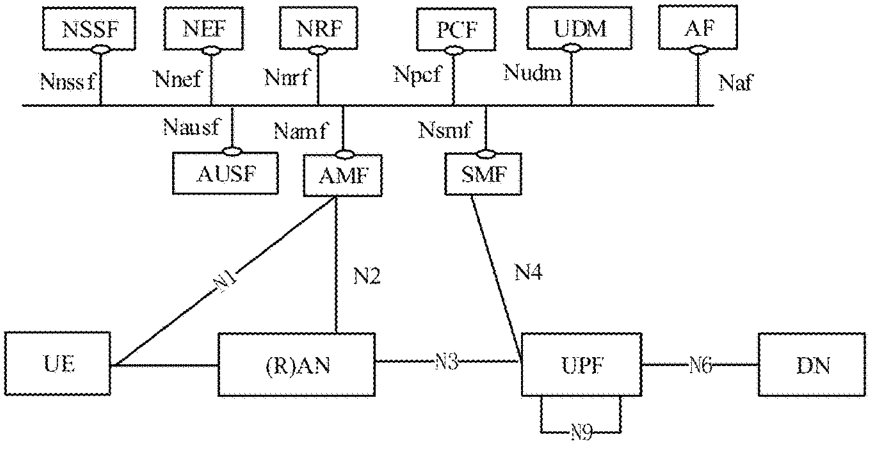
FIG. 46 shows a 5G network.

The core network is the part of the system that resides between the Radio Access Network (RAN) and one or more Data Networks (DN). A data network could be Internet or a closed corporate network. We assume the core network to be fully virtualized, running on top of a cloud platform. Tasks of the core network include: subscriber management; subscriber authentication, authorization and accounting; mobility management; session management including policy control and traffic shaping; lawful interception; network exposure functions. The 5G core network is described in the 3GPP document "System Architecture for the 5G System (5GS)," 3GPP TS 23.501, v. 15.4.0 (December 2018). FIG. 46 illustrates components of the 5G core network and its relationship to the radio access network (RAN) and the UE, as described in 3GPP TS 23.501.

In today's Mobile Broadband (MBB) deployments, core network functions are often deployed on large nodes serving millions of subscribers. The nodes are often placed in few centralized data centers, giving an economy of scale.

In 5G, many other use cases will arise besides MBB. These new use cases may require different deployments and different functionalities. For example, in manufacturing, lawful intercept and many charging and accounting function may not be needed. Mobility can be simplified or, in case of small factory sites, may not be needed at all. Instead new functions are needed including support for native Ethernet or Time-Sensitive Networking (TSN). Preferably, new functions can be added quickly without having to go through a lengthy standardization process.

For reasons of latency, data locality and survivability, a core network for manufacturing should not necessarily need to run in a large centralized data center. It should instead be possible to deploy a small-scale core network at the factory site. What is needed for 5G, and for manufacturing, is a core network that is flexible in terms of deployment and in terms of functionality.

Figure 47:
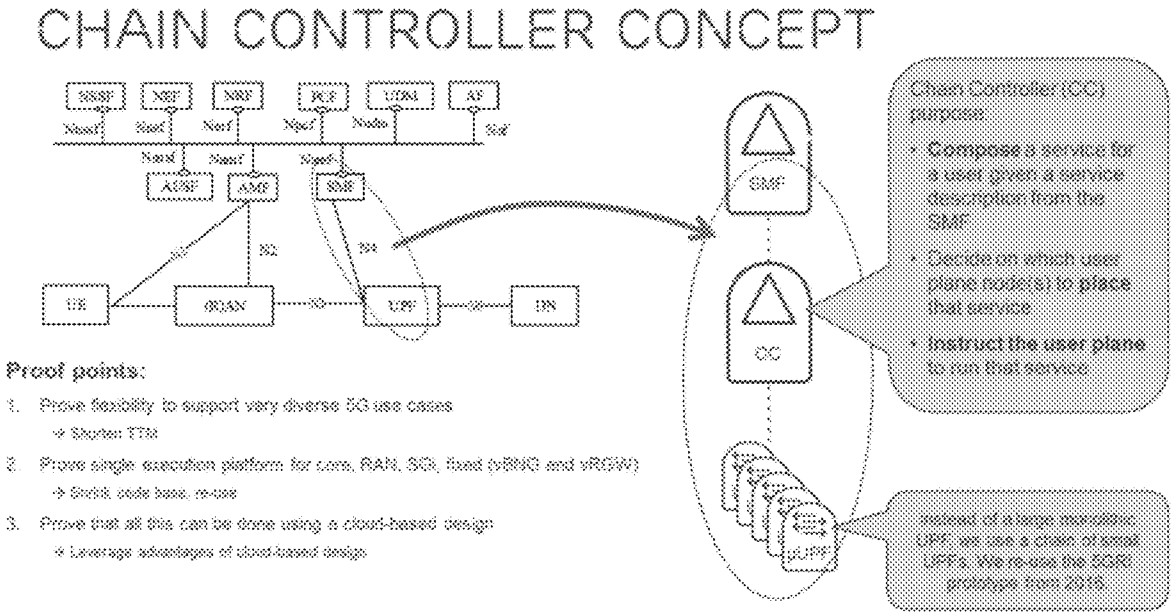
FIG. 47 illustrates the chain controller concept.

These issues can be addressed by decomposing the user plane of the core network into a small function called a micro user plane function (μUPFs). Depending on the use case, different sets of μUPFs are re-composed into a user plane service for a subscriber. The service may change over time, and the μUPFs are hosted on execution nodes, depending on service requirements like latency. The control plane of the core network requests a service by describing it on an abstract level. A chain controller translates this high-level service description into a set of μUPFs and instantiates those μUPFs on the correct execution nodes. FIG. 47 illustrates the chain controller concept.

This approach gives flexibility in terms of deployment and functionality and can be used as a basis for use cases like manufacturing. As an important aspect of flexibility, this approach allows implementations that can scale down to very small footprints.

One core network deployment alternative for the core network in manufacturing is a local, possibly stand-alone, deployment at the factory. Another deployment alternative is to run parts of the core network at a more centralized cloud. Such cloud could be at an operator site or at some corporate site. If the core network is provided by an operator, then such deployment could give an economy-of-scale advantage. Processes for this manufacturing customer could be hosted on nodes that are also used for other customers. The same management systems may be used to serve multiple customers.

In the latter deployment, special care needs to be taken for latency, data locality and local survivability. Parts of the user plane will always need to run on the local factory cloud for latency. But the control plane may very well run remotely, since this device control plane signaling is mainly for authentication (not frequent and not time-critical), session setup (typically only once for factory devices), and mobility across base stations (which may not happen at all for small deployments).

Figure 48:
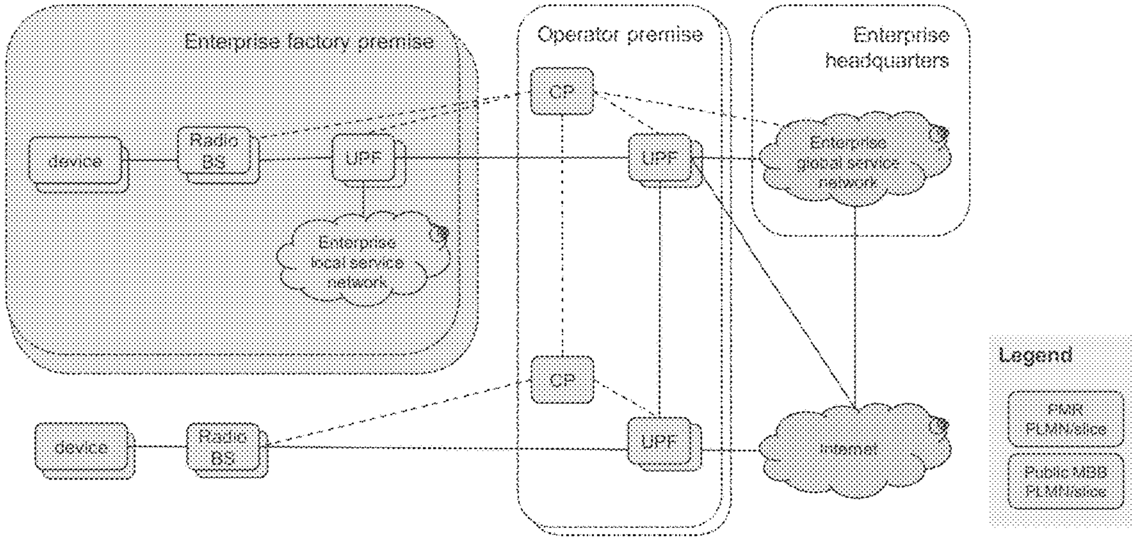
FIG. 48 shows a high-level functional view of a core network deployment at a factory site.

Signaling is mainly for authentication (not frequent and not time-critical), session setup (typically only once for factory devices), and mobility across base stations (which may not happen at all for small deployments). FIG. 48 shows a high-level functional view of this deployment.

Some core network functions used for MBB are not needed in manufacturing. This imposes a requirement on a core network for industrial applications to scale down to a very minimum of features. Some new features will be needed. New features that will be required are basic Ethernet support (native Ethernet PDU sessions), and more advanced Ethernet features (for example, TSN).

It must be possible to differentiate traffic within a factory. For example, production-critical devices require a different service then "office" devices. There are several techniques to achieve such differentiation; including PLMNs, slicing, APNs or μUPF chaining.

More features can be envisioned in the following areas:

Resilience.

Redundancy (multiple UEs).

Data locality.

Ability to access factory floor network from outside the factory.

New features for manufacturing will impact several interfaces to the core network. For example, running production-critical core network services requires a production-critical cloud to run on. Or, a network deployment with some parts running locally under the responsibility of the factory owner, and some parts running centrally under the responsibility of the operator will require changes in management systems. Furthermore, additional network exposure interfaces will be needed if the 5G (core) network system is modelled as a single logical TSN switch.

Radio Access Network

In recent years, the cellular radio access capabilities necessary for enabling support for Industrial IoT have been greatly improved, resulting in both LTE and NR becoming suitable technologies for providing this support. Several architecture options supporting reliable delivery as well as new MAC and PHY features to enable URLLC have been added to the specifications in LTE and NR Release 15. Additional URLLC enhancements are being studied for NR Release 16 with a goal to achieve 0.5-1 ms latency and reliability up to $1\text{-}10^{-6}$. Furthermore, improvements especially targeting support for Ethernet PDU transport and TSN by the NR RAN are envisaged for Release 16.

The following describes the specified LTE and NR URLLC features introduced in 3GPP Release 15 as well as our proposed RAN concept for NR Release 16. First, how 5G RAN architecture options may be used to support data duplication for achieving higher reliability is discussed. Then, layer-1 and layer-2 features for URLLC are described, including features that are currently being considered in Rel-16 work on NR-Industrial IoT and enhanced URLLC (eURLLC). The following continues to describe how LTE and NR deliver precise time references to UEs as well as how Ethernet compression works when Ethernet PDUs are delivered through the 5G RAN. For industrial IoT use cases such as factory automation, reliability needs to be ensured for both data and control planes. Further, a description of how reliable control plane and reliable mobility can be achieved. A technology roadmap is described, highlighting the feature sets specified in Release 15 LTE and Release 15 NR as well as planned for Release 16 NR, and is concluded with a summary.

5G RAN Architecture Options

This sub-section introduces the 5G RAN architecture on which the subsequent description of features to support Industrial IoT is based on.

The 5G standardization work in 3GPP concluded for Release 15 for NR, for LTE, and for Multi-Connectivity including both NR and LTE. Release 15 is the first release for the newly developed radio access technology 5G NR. In addition, several LTE features necessary to enable 5G use cases have been specified. These new Rel-15 NR and LTE standards support integration of both technologies in multiple variants i.e. LTE base stations (eNBs) interworking with NR base stations (gNBs) with E-UTRA core network (EPC) and 5G core network (5GC), respectively. In such integration solutions, the user-equipment (UE) connects via different carriers with two radio base stations, of LTE or NR type, simultaneously, which is generally denoted Dual Connectivity (DC) and in the case of LTE+NR denoted EN-DC/NE-DC. The network architectures allowing for LTE and NR interworking are illustrated in FIGS. 49, 50, and 51.

Figure 49:
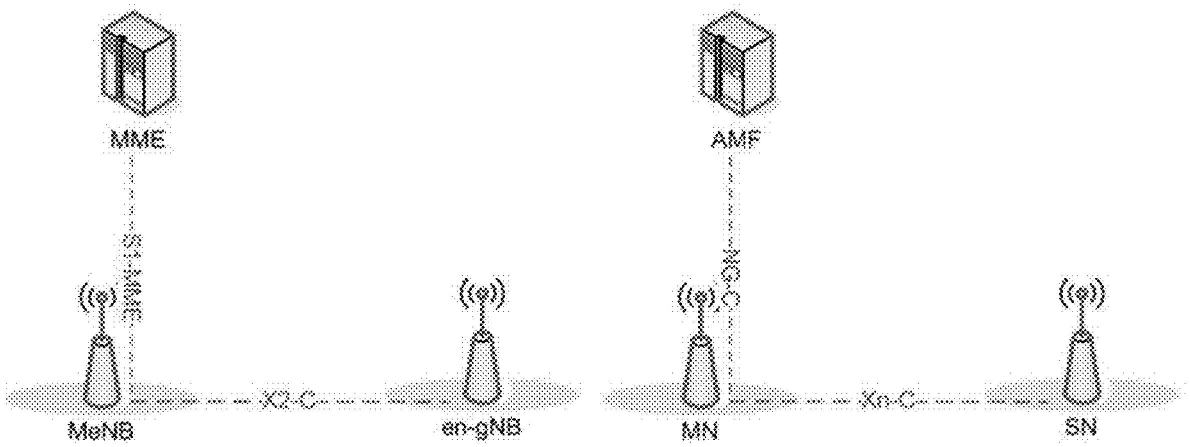
FIG. 49 illustrates the control plane of the RAN, for multi-connectivity.

FIG. 49 shows the control plane of the RAN in case of Multi-Connectivity. In the EN-DC case, shown on the left of the figure, the LTE master eNB (MeNB) is the anchor point towards the MME of the EPC. In this case the NR node, gNB, is integrated into the LTE network (therefore denoted en-gNB). In the NR-NR DC case, shown on the right, both master and secondary node (MN and SN) are of NR gNB type, where MN terminates the control plane interface to the 5GC, i.e. to the AMF.

Figure 50:
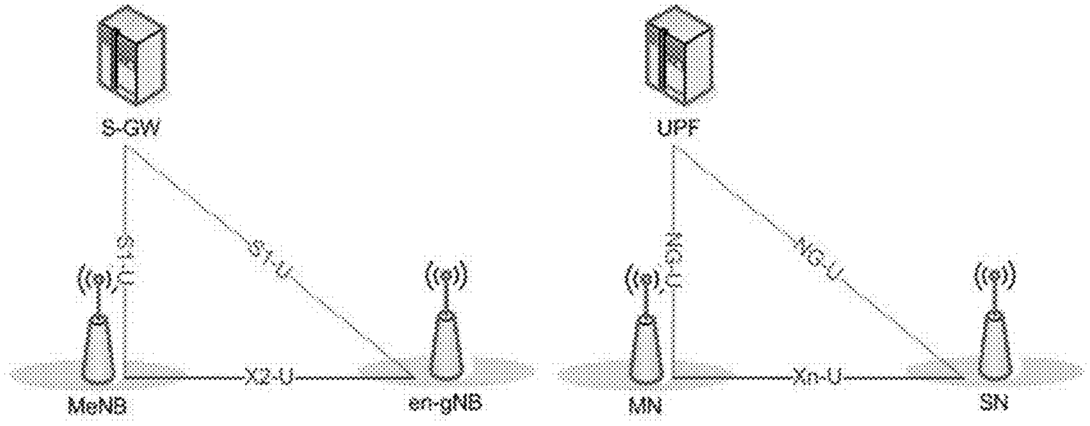
FIG. 50 illustrates the user plane architecture of the RAN, for multi-connectivity.
Figure 51:
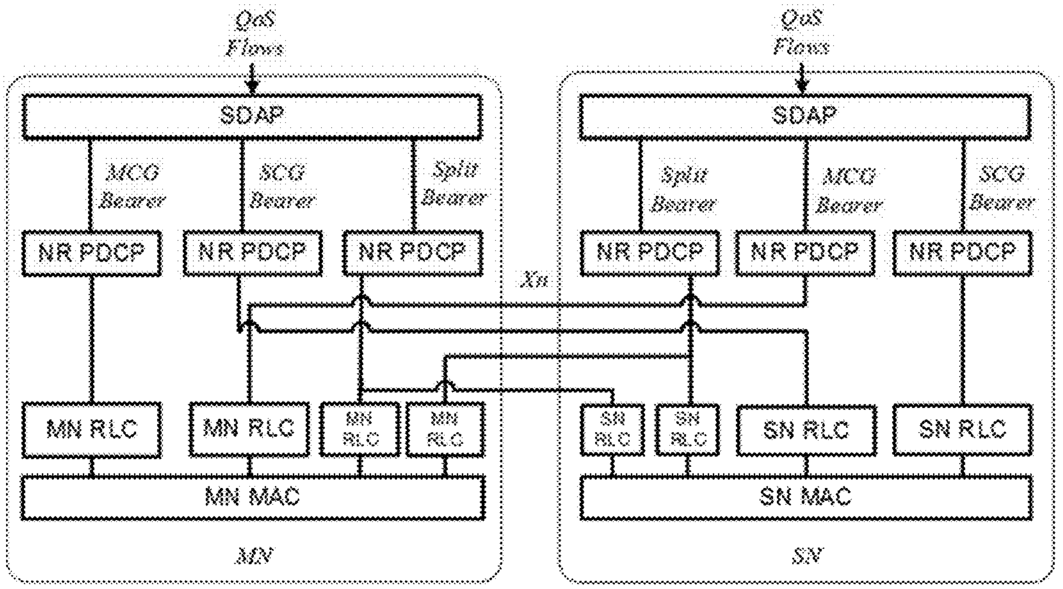
FIG. 51 illustrates different radio bearer types for NR.

FIG. 50 shows the user plane network architecture, again with the EN-DC case on the left and the NR-NR DC case shown on the right. In the user plane, data can be directly routed to the secondary node (en-gNB in EN-DC, and SN in NR-NR DC) from the core network or routed via the MeNB/MN towards the secondary node. Transmission/Reception to/from the UE may then happen from both nodes.

The protocol architecture for the radio access in LTE and NR is largely the same and consists of the physical layer (PHY), medium access control (MAC), radio link control (RLC), packet data convergence protocol (PDCP), as well as (for QoS flow handling from 5GC for the NR) the service data adaption protocol (SDAP). To provide low latency and high reliability for one transmission link, i.e. to transport data of one radio bearer via one carrier, several features have been introduced on the user plane protocols for PHY and MAC, as we will see further in the respective sections below. Furthermore, reliability can be improved by redundantly transmitting data over multiple transmission links. For this, multiple bearer type options exist.

In FIG. 51, the different radio bearer types for NR, which both user plane and control plane bearers (DRB or SRB) can assume, are illustrated. In the Master cell group (MCG) or secondary cell group (SCG) bearer type transmissions happen solely via the cell group of the MeNB/MN or en-gNB as secondary node/SN respectively. Note that MCG and SCG are defined from viewpoint of the UE. However, from the network point of view, those bearers may be terminated in MN or SN, independently of the used cell group.

In the split bearer type operation, data is split or duplicated in PDCP and transmitted via RLC entities associated with both MCG and SCG cell groups. Also, the split bearer may be terminated in MN or SN. Data can be conveyed to the UE via one more multiple of those bearers. Duplication of data is possible for MCG or SCG bearer when additionally employing CA within a cell group, or by employing the split bearer for duplication among cell groups; which is further described below. Furthermore, redundancy can also be introduced by transmitting the same data over multiple bearers, e.g. MCG terminated bearer and SCG terminated bearer, while handling of this duplication happens on higher layer, e.g. outside of RAN.

URLLC Enablers in User Plane

For the operation of URLLC services, i.e. provisioning of low latency and high-reliability communication, several features have been introduced for both LTE and NR in Rel-15. This set of features constitutes the foundation of URLLC support, e.g. to support 1 ms latency with a 1-10^-5 reliability.

In the RAN concept described, these URLLC features are taken as a baseline, with enhancements developed for both Layer 1 and Layer 2. These are on the one hand serving the purpose of fulfilling the more stringent latency and reliability target of 0.5 ms with 1-10^-6 reliability, but on the other hand also allowing more efficient URLLC operation, i.e., to improve the system capacity. These enhancements are also particularly relevant in a TSN scenario, i.e. where multiple services of different (mostly periodic) traffic characteristics must be served with a deterministic latency.

In this section, URLLC enablers for user plane data transport, i.e. the Layer 1 and Layer 2 features, are described. This is one part of the overall RAN concept only; to support the 5G TSN integration from RAN, further aspects are considered, such as reliability in the control plane and mobility, as well as accurate time reference provisioning.

Note that in most cases, the main descriptions herein are based on NR, although in certain cases LTE descriptions are provided as baseline while the features are conceptually also applicable to NR. Further below, a table is provided identifying whether the features are specified for LTE/NR. Whether a feature is required depends on the specific URLLC QoS demand in terms of latency and reliability. Furthermore, some of the features can be seen not as enablers for URLLC itself but enabling more efficient realization of URLLC requirements by the system, i.e., features that enhance capacity will result in an increased number of URLLC services that can be served. Therefore, these features can be roughly grouped as essential features for low latency, essential features for high reliability, and others, as follows.

Essential features for low latency:

Scalable and flexible numerology

Mini-slots and short TTIs

Low-latency optimized dynamic TDD

Fast processing time and fast HARQ

Pre-scheduling on uplink with configured grants (CG) (Layer 2);

Essential features for high reliability:

Lower MCS and CQI for lower BLER target

Furthermore, the following features have been considered as well:

Short PUCCH: e.g. for fast scheduling request (SR) and faster HARQ feedback

DL pre-emption: for fast transmission of critical traffic when other traffic is ongoing DL control enhancements: for more efficient and robust transmission of downlink control Multi-antenna techniques: improving the reliability Scheduling request and BSR enhancements: for handling of multiple traffic types PDCP duplication: for carrier-redundancy i.e. even more reliability The following discussion will review these features as specified in Release 15, a description of enhancements suitable for Release 16, as well as new feature descriptions suitable for Release 16, starting with Layer 1 and continuing with Layer 2.

URLLC Enablers in User Plane

In NR, a slot is defined to be 14 OFDM-symbols and a subframe is 1 ms. The length of a subframe is hence the same as in LTE but, depending on OFDM numerology, the number of slots per subframe varies. (The term "numerology" refers to the combination of carrier spacing, OFDM symbol duration, and slot duration.) On carrier frequencies below 6 GHz (FR1) the numerologies 15 kHz and 30 kHz SCS (Sub-Carrier Spacing) are supported while 60 kHz SCS is optional for the UE. 15 kHz SCS equals the LTE numerology for normal cyclic prefix. For frequency range 2 (FR2) the numerologies 60 and 120 kHz SCS are supported. This can be summarized in Table 8.

TABLE 8

Summary of supported numerologies for data transmission in NR Release 15

| μ | $\Delta f = 2^{\mu} \cdot 15$ [kHz] | Slot duration | Frequency range | Supported for synch |
|---|---|---|---|---|
| 0 | 15 | 1 ms | FR1 | Yes |
| 1 | 30 | 0.5 ms | FR1 | Yes |
| 2 | 60 | 0.25 ms | FR1 (optional) and FR2 | |
| 3 | 120 | 0.125 ms | FR2 | Yes |

The possibility of using different numerologies has the benefit of adapting NR to a wide range of different scenarios. The smallest 15 kHz subcarrier spacing simplifies co-existence with LTE and gives long symbol duration and also long cyclic prefix length, making it suitable for large cell sizes. Higher numerologies have the benefit of occupying a larger bandwidth, being more suitable for higher data rates and beamforming, having better frequency diversity, and, important for URLLC, having a low latency thanks to the short symbol duration.

The numerology itself can thus be considered as a feature for URLLC, since transmission time is shorter for high SCS. However, one needs to consider signalling limitations per slot, such as PDCCH monitoring, UE capabilities, and PUCCH transmission occasions, which can be a limiting factor, since UE is less capable per slot basis at high SCS.

NR provides support for mini-slots. There are two mapping types supported in NR, Type A and Type B, of PDSCH and PUSCH transmissions. Type A is usually referred to as slot-based while Type B transmissions may be referred to as non-slot-based or mini-slot-based. Mini-slot transmissions can be dynamically scheduled and for Release 15:

Can be of length 7, 4, or 2 symbols for DL, while it can be of any length for UL Can start and end in any symbol within a slot.

Note that the last bullet means that transmissions may not cross the slot-border which introduces complications for certain combinations of numerology and mini-slot length.

Figure 52:
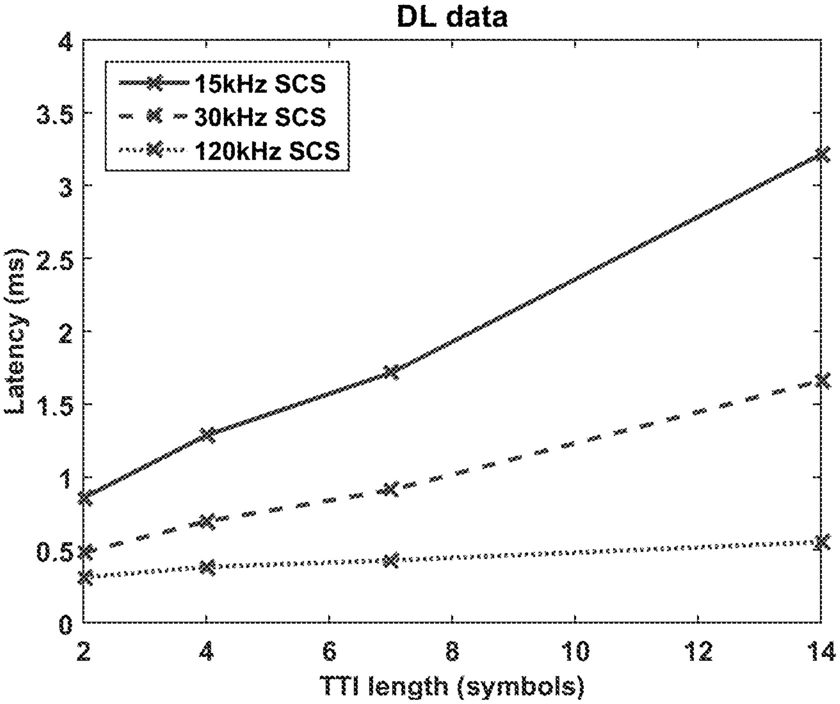
FIG. 52 shows latency performance when using mini-slots.

Mini-slots and short TTI both reduce the maximum alignment delay (waiting time for transmission opportunity) and transmission duration. Both the maximum alignment delay and the transmission duration decrease linearly with a decreased TTI and mini-slot length, as can be seen in FIG. 52, which shows latency from the use of mini-slots, compared to the "normal" 14 OFDM symbol slots. The results in FIG. 52 are based on downlink FDD one-shot, one-way latency, assuming capability-2 UE processing. In certain wide-area scenarios, higher numerology is not suitable (the CP length is shortened and may not be sufficient to cope with channel time dispersion) and use of mini-slots is the main method to reduce latency.

A drawback with mini-slot is that a more frequent PDCCH monitoring needs to be assigned. The frequent monitoring can be challenging for the UE, and also uses up resources that otherwise could be used for DL data. In NR Rel-15 the number of monitoring occasions that can be configured will be limited by the maximum number of blind decodes per slot and serving cell the UE can perform and the maximum number of non-overlapping control channel elements (CCEs) per slot and serving cell.

To maintain efficiency for data symbols we can expect higher L1 overhead with mini-slots due to the higher fraction of resources used for DMRS. Even if only a fraction of the OFDM symbols is used for DMRS, it could be one symbol out of e.g. 4 instead of 2 symbols out of 14 for a slot.

Based on formulated drawbacks, the following challenges related to mini-slots are being addressed in NR Release 16:

Mini-slot repetitions (including repetitions crossing slot border);

Reduction of DMRS overhead;

Enhanced UE monitoring capabilities;

Fast processing in UE and gNb.

Release 16 solutions for these challenges are described below.

Figure 53:
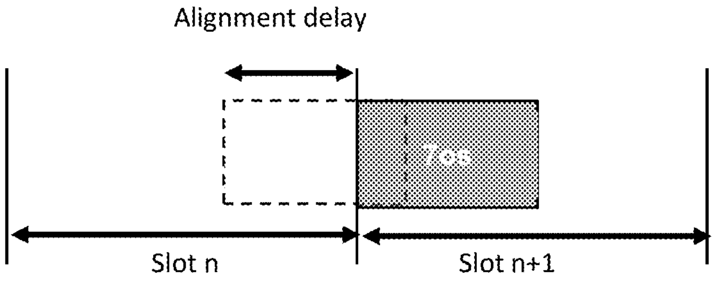
FIG. 53 illustrates long alignment delay due to transmission across slot border restriction.

With regards to min-slot repetitons, since URLLC traffic is very latency sensitive, the most relevant time allocation method is type B, where one can start transmission at any OFDM-symbol within a slot. At the same time the reliability requirements can lead to very conservative link adaptation settings, hence, lower MCSs may be selected which requires more RBs. Instead of having wider allocation in frequency, gNB can decide to allocate longer transmission in time which can help to schedule more UEs at the same time. Unfortunately, due to restrictions in Release-15 NR, the transmission must be delayed in time if it overlaps with the slot border. The illustration of this issue is presented in FIG. 53, which is an illustration of long alignment delay due to transmission across slot border restriction in NR Release 15. Here the alignment delay is a time between two events: when UE is ready for transmission and when transmission is taking place in the beginning of the next slot.

Figure 54:
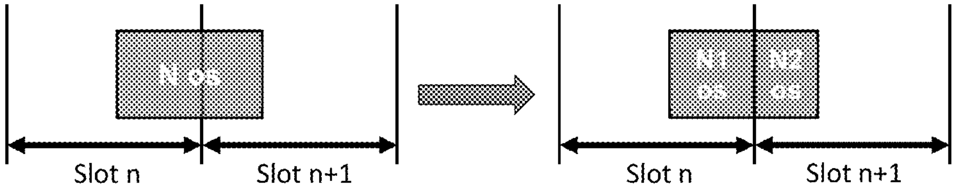
FIG. 54 shows the use of mini-slot repetitions across a slot border.

To illustrate the latency gains possible by allowing scheduling of a transmission to cross the slot border using mini-slot repetition we look at the average latency gains compared to scheduling transmissions that are constrained to fit in one slot. One way of using mini-slot repetitions to achieve this is illustrated in FIG. 54, but other ways give the same overall latency.

Given an assumption that data packets are equally likely to arrive at the UE at any symbol within a slot, Tables 9-11 show the worst case latency for different combinations of transmission durations and SCS for non-cross-border and cross-border scheduling respectively, considering UL configured grant with HARQ-based retransmissions. Since there are 14 symbols in a slot and we typically target very low block error probabilities, we need to ensure that the latency bound can be achieved when data arrives at the symbol that gives the worst-case latency. We evaluate the latency assuming capability 2 UE, and that the gNB processing time is the same as the processing time at the UE. We assume that the gNB uses half of the processing time for decoding, i.e., if the transport block is decoded correctly it can be delivered to higher layers after half the processing time. Since allowing HARQ retransmissions can lower the amount of resources used considerably by targeting a higher BLER in the first transmission we evaluate the latency after the initial transmission, 1st, 2nd, and 3rd HARQ retransmission, taking into account the time needed to transmit PDCCH scheduling the retransmission and the time needed to prepare the PUSCH retransmission. We assume that any retransmissions use the same length as the initial transmission.

In Tables 9-14 we show the worst case latency for HARQ-based retransmission achievable with Release 15 (transmission not crossing the slot border) and the worst case latency when using mini-slot repetition to allow crossing the slot border. We consider SCS=15, 30, or 120 kHz, and a total PUSCH length of 2 to 14 symbols, counting any repetitions, i.e., a 2-symbol mini-slot repeated 4 times shows up in the tables as a length 8 transmission. To make the tables easier to interpret, they focus on target latencies of 0.5, 1, 2, and 3 ms respectively. In the tables showing the worst-case latencies using mini-slot repetitions, the shaded cases show cases where one of these target latency bounds can be met using mini-slot repetitions but cannot be achieved using Release 15.

TABLE 9

Release 15 Worst-Case Latency for 15 kHz SCS

| Length | 2 | 3 | 4 | 5 | 6 | 7 | 8 | 9 | 10 | 11 | 12 | 13 | 14 |
|---|---|---|---|---|---|---|---|---|---|---|---|---|---|
| Init. tx | 0.68 | 0.89 | 0.96 | 1.18 | 1.25 | 1.46 | 1.54 | 1.75 | 1.82 | 2.04 | 2.11 | 2.32 | 2.39 |
| 1 retx | 1.68 | 1.89 | 1.96 | 2.18 | 2.54 | 2.68 | 2.82 | 2.96 | 3.82 | 4.04 | 4.11 | 4.32 | 4.39 |
| 2 retx | 2.68 | 2.89 | 2.96 | 3.18 | 3.75 | 3.82 | 4.04 | 4.75 | 5.82 | 6.04 | 6.11 | 6.32 | 6.39 |
| 3 retx | 3.68 | 3.89 | 3.96 | 4.18 | 4.75 | 5.46 | 5.54 | 5.96 | 7.82 | 8.04 | 8.11 | 8.32 | 8.39 |

TABLE 10

Latency for 15 kHz SCS with Mini-Slot Repetitions to Schedule Across Slot Border

| Length | 2 | 3 | 4 | 5 | 6 | 7 | 8 | 9 | 10 | 11 | 12 | 13 | 14 |
|---|---|---|---|---|---|---|---|---|---|---|---|---|---|
| Init. tx | 0.68 | 0.75 | 0.82 | 0.89 | 0.96 | 1.04 | 1.11 | 1.18 | 1.25 | 1.32 | 1.39 | 1.46 | 1.54 |
| 1 retx | 1.61 | 1.68 | 1.89 | 1.96 | 2.18 | 2.25 | 2.46 | 2.54 | 2.75 | 2.82 | 3.04 | 3.11 | 3.32 |
| 2 retx | 2.32 | 2.68 | 2.89 | 2.96 | 3.18 | 3.54 | 3.75 | 3.96 | 4.18 | 4.39 | 4.61 | 4.82 | 5.04 |
| 3 retx | 3.18 | 3.68 | 3.89 | 3.96 | 4.18 | 4.82 | 5.04 | 5.25 | 5.46 | 5.82 | 6.04 | 6.54 | 6.75 |

TABLE 11

| Release 15 Worst-Case Latency for 30 kHz SCS | | | | | | | | | | | | | |
|---|---|---|---|---|---|---|---|---|---|---|---|---|---|
| Length | 2 | 3 | 4 | 5 | 6 | 7 | 8 | 9 | 10 | 11 | 12 | 13 | 14 |
| Init. tx | 0.40 | 0.51 | 0.54 | 0.65 | 0.69 | 0.79 | 0.83 | 0.94 | 0.97 | 1.08 | 1.12 | 1.22 | 1.26 |
| 1 retx | 0.90 | 1.01 | 1.04 | 1.29 | 1.33 | 1.44 | 1.47 | 1.94 | 1.97 | 2.08 | 2.12 | 2.22 | 2.26 |
| 2 retx | 1.40 | 1.51 | 1.54 | 1.94 | 1.97 | 2.29 | 2.33 | 2.94 | 2.97 | 3.08 | 3.12 | 3.22 | 3.26 |
| 3 retx | 1.90 | 2.01 | 2.04 | 2.65 | 2.69 | 2.94 | 2.97 | 3.94 | 3.97 | 4.08 | 4.12 | 4.22 | 4.26 |

TABLE 12

| Latency for 30 kHz SCS with Mini-Slot Repetitions to Schedule Across Slot Border | | | | | | | | | | | | | |
|---|---|---|---|---|---|---|---|---|---|---|---|---|---|
| Length | 2 | 3 | 4 | 5 | 6 | 7 | 8 | 9 | 10 | 11 | 12 | 13 | 14 |
| Init. tx | 0.40 | 0.44 | 0.47 | 0.51 | 0.54 | 0.58 | 0.62 | 0.65 | 0.69 | 0.72 | 0.76 | 0.79 | 0.83 |
| 1 retx | 0.90 | 1.01 | 1.04 | 1.15 | 1.19 | 1.29 | 1.33 | 1.44 | 1.47 | 1.58 | 1.62 | 1.72 | 1.76 |
| 2 retx | 1.40 | 1.51 | 1.54 | 1.79 | 1.83 | 2.01 | 2.04 | 2.22 | 2.26 | 2.44 | 2.47 | 2.58 | 2.62 |
| 3 retx | 1.90 | 2.01 | 2.04 | 2.44 | 2.47 | 2.65 | 2.69 | 2.94 | 2.97 | 3.29 | 3.33 | 3.51 | 3.54 |

TABLE 13

| Release 15 Worst-Case Latency for 120 kHz SCS | | | | | | | | | | | | | |
|---|---|---|---|---|---|---|---|---|---|---|---|---|---|
| Length | 2 | 3 | 4 | 5 | 6 | 7 | 8 | 9 | 10 | 11 | 12 | 13 | 14 |
| Init. tx | 0.44 | 0.46 | 0.47 | 0.50 | 0.51 | 0.54 | 0.54 | 0.57 | 0.58 | 0.61 | 0.62 | 0.64 | 0.65 |
| 1 retx | 0.97 | 1.02 | 1.03 | 1.05 | 1.06 | 1.16 | 1.17 | 1.20 | 1.21 | 1.23 | 1.24 | 1.39 | 1.40 |
| 2 retx | 1.51 | 1.59 | 1.60 | 1.63 | 1.63 | 1.79 | 1.79 | 1.82 | 1.83 | 1.86 | 1.87 | 2.14 | 2.15 |
| 3 retx | 2.04 | 2.14 | 2.15 | 2.18 | 2.19 | 2.41 | 2.42 | 2.45 | 2.46 | 2.48 | 2.49 | 2.89 | 2.90 |

TABLE 14

| Latency for 120 kHz SCS with Mini-Slot Repetitions to Schedule Across Slot Border | | | | | | | | | | | | | |
|---|---|---|---|---|---|---|---|---|---|---|---|---|---|
| Length | 2 | 3 | 4 | 5 | 6 | 7 | 8 | 9 | 10 | 11 | 12 | 13 | 14 |
| Init. tx | 0.44 | 0.45 | 0.46 | 0.46 | 0.47 | 0.48 | 0.49 | 0.50 | 0.51 | 0.52 | 0.53 | 0.54 | 0.54 |
| 1 retx | 0.97 | 1.00 | 1.01 | 1.04 | 1.04 | 1.07 | 1.08 | 1.11 | 1.12 | 1.14 | 1.15 | 1.18 | 1.19 |
| 2 retx | 1.51 | 1.55 | 1.56 | 1.61 | 1.62 | 1.66 | 1.67 | 1.70 | 1.71 | 1.77 | 1.78 | 1.80 | 1.81 |
| 3 retx | 2.04 | 2.09 | 2.10 | 2.16 | 2.17 | 2.25 | 2.26 | 2.30 | 2.31 | 2.39 | 2.40 | 2.43 | 2.44 |

In comparison to Release 15 scheduling, the following gains can be reached:

- For a latency bound of 0.5 ms, using mini-slot repetitions allows an additional 5 cases. The gains occur for the initial transmission for 30 and 120 kHz SCS.
- For a latency bound of 1 ms, using mini-slot repetitions allows an additional 6 cases. The gains occur for the initial transmission for 15 and 30 kHz SCS.
- For a latency bound of 2 ms, using mini-slot repetitions allows an additional 11 cases. The gains occur for the initial transmission, the 1st, or 2nd retransmission for 15, 30, or 120 kHz SCS.
- For a latency bound of 3 ms, using mini-slot repetitions allows an additional 7 cases. The gains occur for the 2nd or 3rd retransmission for 15 or 30 kHz SCS.

The mini-slot repetition in UL can be used together with other features, enabling higher reliability, such as frequency hopping according to certain pattern or precoder cycling across repetitions.

PUCCH enhancements include the use of Short PUCCH. For DL data transmission, the UE sends HARQ feedback to acknowledge (ACK) the correct reception of the data. If the DL data packet is not received correctly, the UE sends a NACK and expects a retransmission. Due to strict latency constraint of URLLC, short PUCCH format with 1-2 symbols (e.g., PUCCH format 0) are expected to be of high relevance. Short PUCCH can be configured to start at any OFDM symbol in a slot and therefore enables fast ACK/NACK feedback suitable for URLLC. However, there exists a trade-off between low latency and high reliability of HARQ feedback. If more time resources are available, it is also beneficial to consider a long PUCCH format which can have a duration of 4 to 14 symbols. With the use of longer time resources, it is possible to enhance PUCCH reliability.

Another enhancement is UCI multiplexing with PUSCH. For a UE running mixed services with both eMBB and URLLC, the reliability requirements on UCI transmitted on PUSCH can differ significantly from the PUSCH data. The reliability requirement on the UCI can either be higher than the requirement on the PUSCH data, e.g., when transmitting HARQ-ACK for DL URLLC data at the same time as eMBB data, or lower, e.g., when transmitting CQI reports meant for eMBB at the same time as URLLC data. In the case where UCI has lower requirement than PUSCH data, it may be preferable to drop some or all of the UCI.

Figure 55:
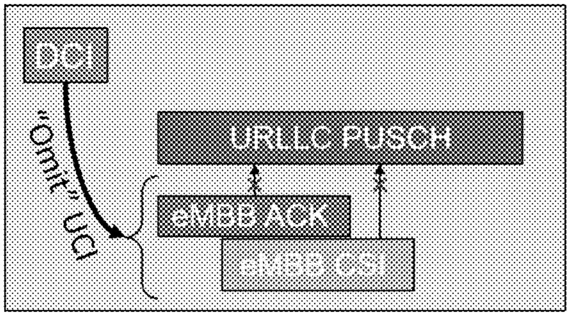
FIG. 55 shows the use of a beta-factor to allow omission of UCI on PUSCH.

The coding offset between UCI and PUSCH data is controlled through beta factors for different types (HARQ-ACK, CSI) of UCI. An offset larger than 1.0 means that corresponding UCI is coded more reliable than data. The beta factors defined in Release 15 have a lowest value of 1.0. This value might not be low enough when considering URLLC data together with eMBB UCI. The better solution would be an introduction of special beta-factor value allowing to omit UCI on PUSCH to ensure URLLC reliability. This approach is illustrated in FIG. 55, which shows the use of a beta-factor in DCI signals to "omit" UCI transmission. A related issue is when a scheduling request (SR) for URLLC mini-slot transmission comes during slot-based transmission. This issue is analyzed further below.

Other enhancements are in the area of power control. When UCI is transmitted on PUCCH the reliability requirement can differ significantly if UCI is related to eMBB or URLLC/eURLLC. For Format 0 and Format 1, the number of PRBs equals one and an attempt to increase reliability by using more PRBs makes PUCCH sensitive to time dispersion. Therefore, for Format 0 and Format 1, different reliability can be achieved by different number of symbols and/or power adjustment.

The number of symbols can be dynamically indicated in downlink DCI using the field "PUCCH resource indicator," wherein two PUCCH resources are defined with different number of symbols. Power adjustments are however limited to a single TPC table and/or possibly using the PUCCH spatial relation information wherein multiple power settings (such as $P_0$) and up to two closed-components can be defined. But, the different PUCCH power settings can only be selected using MAC CE signaling. This is clearly too slow in a mixed services scenario where the transmitted HARQ-ACK may be changed from related to eMBB to related to URLLC/eURLLC between two consecutive PUCCH transmission opportunities. As a solution for this issue, PUCCH power control enhancements can be introduced in NR Release 16 to enable larger power difference between PUCCH transmission related to eMBB and PUCCH transmission related to URLLC:

- New TPC table allowing larger power adjustment steps, and/or
- Dynamic indication of power setting (e.g., $P_0$, closed-loop index) using DCI indication Further enhancements regard HARQ-ACK transmission opportunities. For URLLC with tight latency requirements there is a need to have several transmission opportunities within a slot when using mini-slot based PDSCH transmissions and hence also a need for several opportunities for HARQ-ACK reporting on PUCCH within a slot. In Release 15, at most one PUCCH transmission including HARQ-ACK is supported per slot. This will increase the alignment time for sending the HARQ-ACK and therefore the DL data latency. To reduce the downlink data latency, it is necessary to increase the number of PUCCH opportunities for HARQ-ACK transmission in a slot, especially if multiplexing of eMBB and URLLC traffic is supported on the downlink. While a UE processing capability gives the minimum number of OFDM symbols from the end of a PDSCH transmission until the beginning of the corresponding HARQ-ACK transmission on a PUCCH, the actual transmission time of HARQ-ACK is further limited by the allowed number of PUCCHs within the slot.

In Release 15, a UE can be configured with maximum four PUCCH resource sets where each PUCCH resource set consisting of a number of PUCCH resources, can be used for a range of UCI sizes provided by configuration, including HARQ-ACK bits. The first set is only applicable for 1-2 UCI bits including HARQ-ACK information and can have maximum 32 PUCCH resources, while the other sets, if configured, are used for more than 2 UCI bits including HARQ-ACK and can have maximum 8 PUCCH resources. When a UE reports HARQ-ACK on PUCCH it determines a PUCCH resource set based on the number of HARQ-ACK information bits and the PUCCH resource indicator field in last DCI format 1_0 or DCI format 1_1 that have a value of PDSCH-to-HARQ feedback timing indicator indicating same slot for the PUCCH transmission. When the size of the PUCCH resource set is to at most 8, the PUCCH resource identity is explicitly indicated by the PUCCH resource indicator field in the DCI. If the size of PUCCH resource set is more than 8, the PUCCH resource identity is determined by the index of first CCE for the PDCCH reception in addition to the PUCCH resource indicator field in the DCI.

For URLLC with tight latency requirements, there is a need to have several transmission opportunities within a slot for PDSCH transmission and hence also a need for several opportunities for HARQ-ACK reporting on PUCCH within a slot as mentioned earlier.

Figure 56:
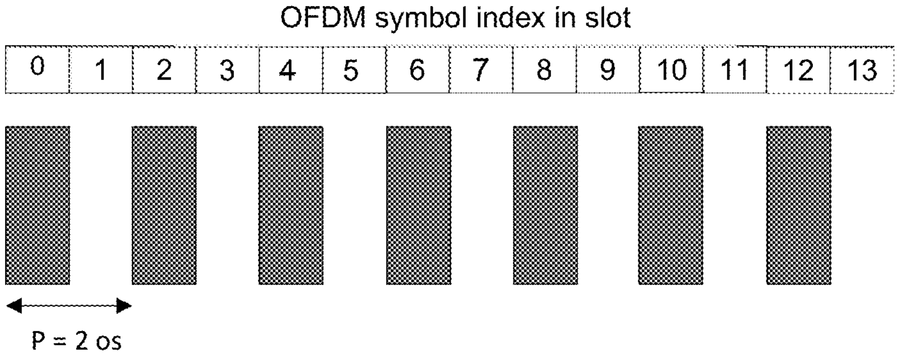
FIG. 56 illustrates a short PUCCH that occupies 1 OFDM symbol, with a periodicity of 2 symbols.

This means that a UE needs to be configured with several PUCCH resources to enable the possibility for multiple opportunities of HARQ-ACK transmissions within a slot although that only one of them may be used in each slot. For example, a UE running URLLC service may be configured with possibility of receiving PDCCH in every second OFDM symbol e.g. symbol 0,2, 4, . . . , 12 and PUCCH resources for HARQ-ACK transmission also in every second symbol, e.g. 1, 3, . . . , 13. This means that UE need to be configured with a set of 7 PUCCH resources just for HARQ-ACK reporting for URLLC for a given UCI size range. Since there may be a need to have other PUCCH resources for other needs the list of at most 8 PUCCH resources that can be explicitly indicated by PUCCH resource indicator in the DCI may likely be exceeded. If there are more than 8 PUCCH resources in the set in case of 1-2 HARQ-ACK bits the index of first CCE will control which PUCCH resource is indicated. Hence, the locations where the DCI can be transmitted may be limited to be able to reference an intended PUCCH resource. Consequently, this may impose scheduling restrictions where the DCI can be transmitted and may also cause "blocking" if the DCI cannot be sent on desired CCE (due to that it is already used for some other UE). Therefore, instead of configuring 7 PUCCH resources in the example above, one can assume one PUCCH resource with a periodicity for transmission opportunity of every 2 symbols within a lot. This approach is illustrated in FIG. 56, which shows a short PUCHH that occupies one OFDM symbol (i.e., Ns=1), with a period (P) of two OFDM symbols. Here, a total of 7 periodic PUCCH resources are defined in a slot.

The solution and problem described above apply for FDD as well as TDD. However, for fixed "mini-slot" TDD pattern 8 PUCCH resources that can be explicitly indicated may be enough since only the UL part of the slot can comprise PUCCH resources.

With regards to PDCCH enhancements, with high reliability requirement for URLLC, it is important that transmission of downlink control information (DCI) is sufficiently reliable. It can be achieved by several means including improved UE/gNB hardware capabilities, enhanced gNB/UE implementation, and good NR PDDCH design choices.

In terms of design choices, NR PDCCH includes several features which can enhance reliability. These include:

Being DMRS-based which allows the use of beamforming;

Support of distributed transmission scheme in frequency;

Aggregation level 16;

Increased CRC length (24 bits).

NR supports two main DCI formats, namely the normal-sized DCI formats 0-1 and 1-1 and the smaller-size fall-back DCI formats 0-0 and 1-0. Although scheduling flexibility can be limited, it may still be reasonable to consider fall-back DCI for data scheduling to obtain PDCCH robustness due to lower coding rate for a given aggregation level. Moreover, it can be noted that normal DCI contains several fields which are not relevant for URLLC such as bandwidth part indicator, CBG-related fields, and the second TB related fields.

One possible enhancement is a URLLC specific DCI format. Both aggregation level (AL) and DCI size can have impact on PDCCH performance. Aggregation levels have different channel coding rate and are used in link adaptation for PDCCH, while DCI payload size is rather fixed for configured connection. To make PDCCH transmission more robust, one can use high AL and/or small DCI payload size to lower PDCCH code rate. PDCCH performance comparison between different DCI sizes is summarized in Table 15. Here, DCI size 40 bits serves as a reference for the Release 15 fallback DCI size, while DCI sizes 30 and 24 may be referred to as compact DCI sizes. One can see that the gains of reducing DCI size from 40 to 24 bits are small especially at high AL, the gain is even smaller when reducing DCI size from 40 to 30 bits. The gain essentially depends on the level of code rate reduction.

TABLE 15

| SNR Improvement (dB) at BLER target for TDL-C 300 nS, 4 GHz, 4 Rx, 1 os | | | | | | | |
|---|---|---|---|---|---|---|---|
| BLER target | Payload size excluding CRC bits (A->2B) | Total number of bits reduction | Performance Benefit in SNR (dB) AL16 | AL8 | AL4 | AL2 | AL1 |
| 1e−5 | 40->30 | 10 | 0.31 | 0.38 | 0.41 | 0.55 | 1.13 |
| | 40->24 | 16 | 0.47 | 0.58 | 0.68 | 0.95 | 1.94 |

With high reliability requirement for URLLC, it is important that transmission of downlink control information (DCI) is sufficiently reliable. It can be achieved by several means including improved UE/gNB hardware capabilities, enhanced gNB/UE implementation, and good NR PDDCH design choices.

In terms of design choices, NR PDCCH includes several features which can enhance reliability. These include:

Being DMRS-based which allows the use of beamforming;

Support of distributed transmission scheme in frequency;

Aggregation level 16;

Increased CRC length (24 bits).

NR supports two main DCI formats namely the normal-sized DCI formats 0-1 and 1-1 and the smaller-size fall-back DCI formats 0-0 and 1-0. Although scheduling flexibility can be limited, it may still be reasonable to consider fall-back DCI for data scheduling to obtain PDCCH robustness due to lower coding rate for a given aggregation level. Moreover, it can be noted that normal DCI contains several fields which are not relevant for URLLC such as bandwidth part indicator, CBG-related fields, and the second TB related fields.

When a URLLC UE operates with good channel condition, it is reasonable to use low AL for PDCCH. It was argued that compact DCI can have positive impact on PDCCH multiplexing capacity as more UEs with good channel conditions can use low AL, and thus reducing blocking probability. To check this, the impact of using compact DCI on PDCCH blocking probability is studied as a function of DCI size, number of UEs, and CORESET resources. Number of URLLC UEs in a cell is considered from 4 to 10. CORESET resources are determined based on CORESET duration and bandwidth. CORESETs are assumed to occupy 1 or 2 OFDM symbols with 40 MHz BW.

Figure 57:
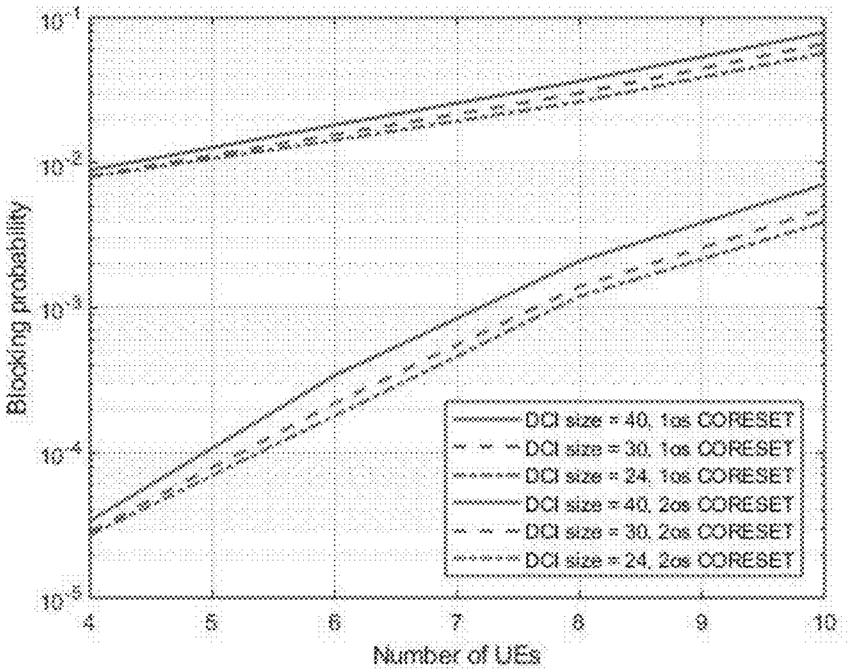
FIG. 57 shows examples of blocking probability per monitoring occasion as a function of DCI size, number of UEs, and CORESET sizes.

FIG. 57 shows the blocking probability per monitoring occasion as a function of DCI size, average number of UEs, and CORESET sizes. The simulation assumption is for Release 15 enabled use case. It can be seen from FIG. 57 that PDCCH blocking probability per monitoring occasion depends on several parameters such as DCI size, number of UEs, and CORESET sizes. In terms of blocking probability improvement for a given number of UEs, it is evident that using small DCI size provide much smaller gain compared to using larger control resources.

Additionally, due to demodulation and decoding complexity constraint at the UE, there exists a budget on the number of DCI sizes UE should monitor per slot, i.e., 3 different sizes for DCI scrambled by C-RNTI and 1 additional for other RNTI as agreed in Release 15. So, introducing another DCI format with smaller size will be even more challenging for satisfying the DCI size limitation.

An alternative to compact DCI for PDCCH enhancement in Release 16 may be considered. In NR Release 15, there are two main DCI formats for unicast data scheduling, namely the fall-back DCI formats 0-0/1-0, and the normal DCI formats 0-1/1-1. The fall-back DCI supports resource allocation type 1 where the DCI size depends on the size of bandwidth part. It is intended for a single TB transmission with limited flexibility, e.g., without any multi-antenna related parameters. On the other hand, normal DCI can provide flexible scheduling with multi-layer transmission.

Due to high reliability requirement of URLLC, we see that it is beneficial to use a small size fallback DCI for good PDCCH performance. At the same time, it can be beneficial to have parameters such as multi-antenna related ones to support high reliability transmission. This can motivate a new DCI format having the same size as the fallback DCI but improved from the fallback DCI to swap in some useful fields, e.g., some fields that exist in the normal DCI but are absent in fallback DCI. By having the new DCI formats with the same size as existing DCI formats, blind decoding complexity can be kept the same. It can be noted that its use may not be limited to URLLC. Any use cases which require high PDCCH reliability with reasonable scheduling flexibility should be able to leverage the new DCI format as well.

Another area for improved performance regards limits on the number of blind decodes and CCE. As discussed above, PDSCH/PUSCH mapping type B (mini-slot with flexible starting position) is a key enabler for URLLC use cases. To achieve the full latency benefits of type B scheduling, it is necessary to have multiple PDCCH monitoring occasions within a slot. For example, to get the full benefits of 2 OFDM symbol transmissions, it is preferable to have PDCCH monitoring every 2 OFDM symbols. The limits in Release 15 on the total number of blind decodes (BD) and non-overlapping CCEs for channel estimation in a slot strongly restricts the scheduling options for these kinds of configurations, even when limiting the number of candidates in a search space.

Current limits for 15 kHz SCS in NR coincide with limits for 1 ms TTI in LTE, while these limits were extended after introduction of short TTI in LTE. These Release 15 limits as shown in the first row of Table 9 and 10 can be expected to be revised in NR Release 16 in scope of URLLC framework. For example, with the current number of CCE limits, there are only at most 3 transmission opportunities per slot if AL16 is used.

Rather than specifying multiple new UE capability levels, it is proposed to specify one additional level of support for PDCCH blind decodes, for which the numbers are doubled compared to Release 15. For this additional level of support, instead of simply defining it per slot basis, it makes more sense to take into account how the BDs/CCEs are distributed in a slot for mini-slot operation. One possible choice is to define the BD/CCE limit for each half of the slot. For the first half of the slot, it is natural to assume the same number as the other cases. For the second half of the slot, assuming that UE has finished processing PDCCH in the first half of the slot, the UE should have the same PDCCH processing capability in the second half of the slot. Therefore, it is reasonable to assume the same number as in the first slot.

Considering all of the above, the corresponding increase in the BD limits can be summarized in Table 16

TABLE 16

Number of Blind Decodes for Release 15 and Proposed Values for Release 16

| Max no. of PDCCH BDs per slot | | Sub-carrier spacing 15 kHz | 30 kHz | 60 kHz | 120 kHz |
|---|---|---|---|---|---|
| NR Release 15 | | 44 | 36 | 22 | 20 |
| Proposed value for NR Release 16 | 1st half of the slot | 44 | 36 | 22 | 20 |
| | 2nd half of the slot | 44 | 36 | 22 | 20 |

Similarly, a corresponding increase in the CCE limits can be summarized in Table 17.

TABLE 17

CCE limit for Release 15 and proposed values for Release 16.

| Max no. of PDCCH CCEs per slot | | Sub-carrier spacing 15 kHz | 30 kHz | 60 kHz | 120 kHz |
|---|---|---|---|---|---|
| NR Release 15 | | 56 | 56 | 48 | 32 |
| Proposed value for NR Release 16 | 1st half of the slot | 56 | 56 | 48 | 32 |
| | 2nd half of the slot | 56 | 56 | 48 | 32 |

As an alternative solution to Tables 16 and 17, one can consider introducing a limitation per sliding window, where sliding window size and number of blind decodes or CCE per window can be further defined in specification.

A consequence of increases in numbers of blind decodes and CCE limits is more PDCCH occasions in a slot, and thus a UE has higher chance of eventually being scheduled. Table 18 shows the PDCCH blocking probability after certain number of PDCCH occasions for different number of UEs per cell. (DCI size=40 bits, CORESET duration=1 symbol.) It is evident that the PDCCH blocking probability within a slot can be reduced significantly with more PDCCH occasions.

TABLE 18

PDCCH Blocking Probability Within a Slot with 1, 2, or 3 PDCCH Occasions for Different Numbers of UEs per Cell

| Blocking prob. | #UE = 10 | #UE = 20 | #UE = 30 | #UE = 40 |
|---|---|---|---|---|
| After 1 PDCCH occasion | 7.91% | 39.03% | 58.01% | 68.46% |
| After 2 PDCCH occasions | 0 | 1.42% | 19.50% | 37.75% |
| After 3 PDCCH occasions | 0 | 0 | 0.17% | 4.15% |

While limits on PDCCH can improve alignment delay, the processing delay reduction can additionally contribute to total latency decrease. Thus, UE processing capabilities are addressed in the following.

Figure 58:
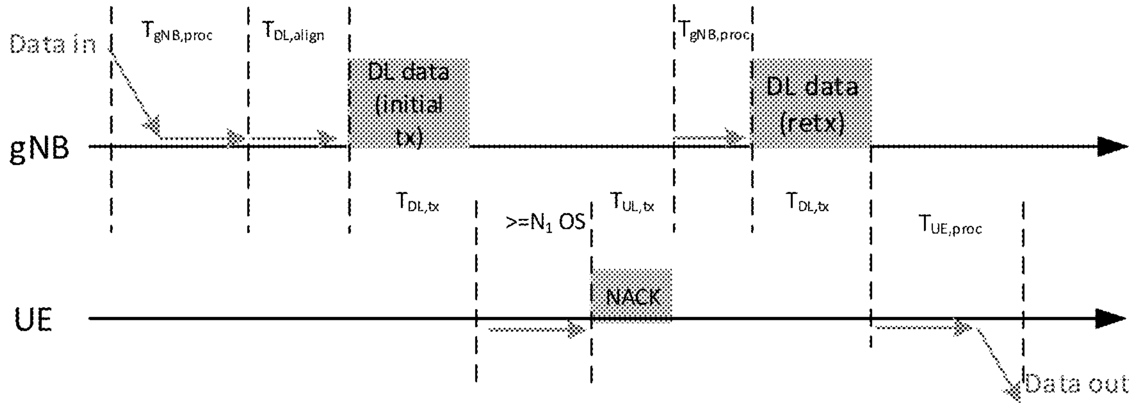
FIG. 58 shows downlink data latency with one retransmission.
Figure 59:
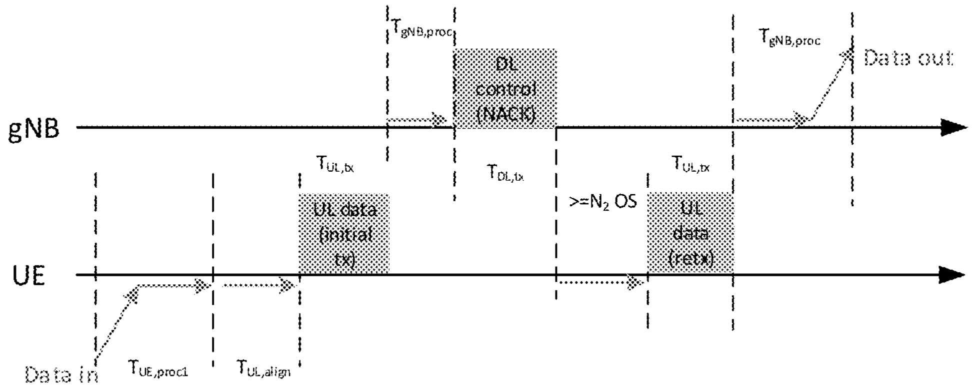
FIG. 59 shows uplink data latency with a configured grant and one retransmission.

The downlink data transmission timeline is illustrated in FIG. 58 with one retransmission. The UL data transmission timeline is illustrated in FIG. 59, for PUSCH via configured UL grant, with one retransmission. The delay components are:

- $T_{UE,proc}$: UE processing time for UL transmission. $T_{UE,proc}$ varies depending on DL data vs UL data, initial transmission vs retransmission, etc. In UE Capability #1 and Capability #2 discussion, variables $N_1$ and $N_2$ are used:
  - $N_1$ is the number of OFDM symbols required for UE processing from the end of PDSCH to the earliest possible start of the corresponding ACK/NACK transmission on PUSCH or PUCCH from UE perspective.
  - N2 is the number of OFDM symbols required for UE processing from the end of PDCCH containing the UL grant reception to the earliest possible start of the corresponding the same PUSCH transmission from UE perspective.
- $T_{UL,tx}$: transmission time of UL data. This is roughly equal to PUSCH duration.
- $T_{UL,align}$: time alignment to wait for the next UL transmission opportunity.
- $T_{gNB,proc}$: gNB processing time for DL transmission. $T_{gNB,proc}$ varies depending on DL data vs UL data, initial transmission vs retransmission, etc. For example, for PDSCH retransmission, this includes processing time of HARQ-ACK sent on UL. For PUSCH, this includes reception time of PUSCH.
- $T_{DL,tx}$: transmission time of DL data. This is roughly equal to PDSCH duration.
- $T_{DL,align}$: time alignment to wait for the next DL transmission opportunity.

Figure 60:
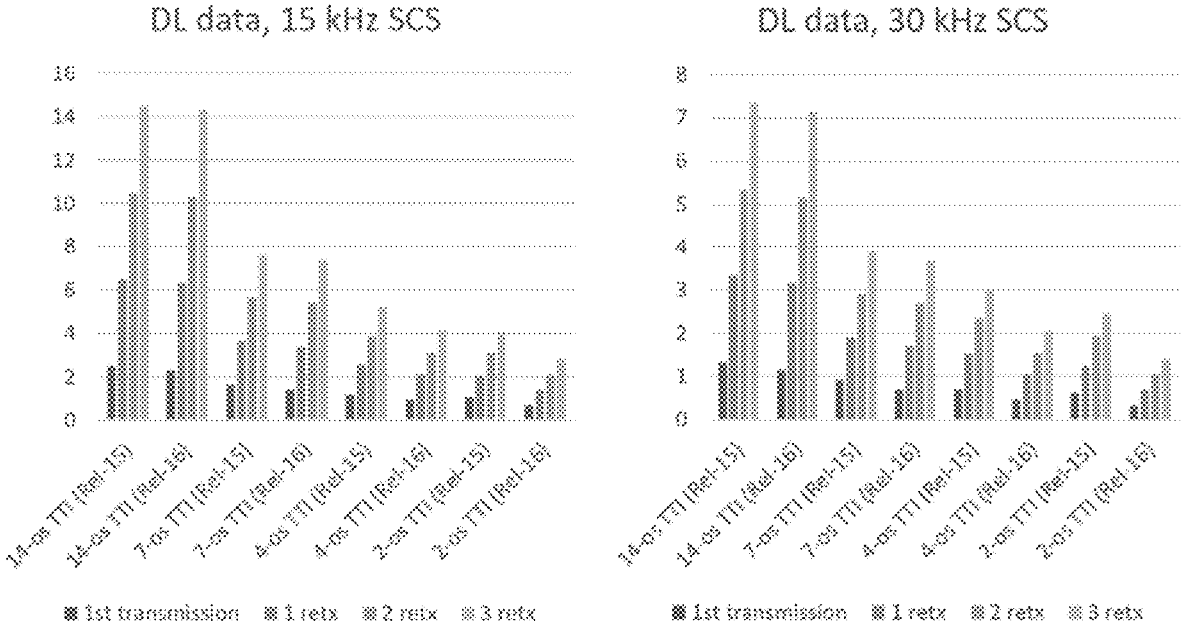
FIG. 60 illustrates a comparison of downlink data latency.
Figure 61:
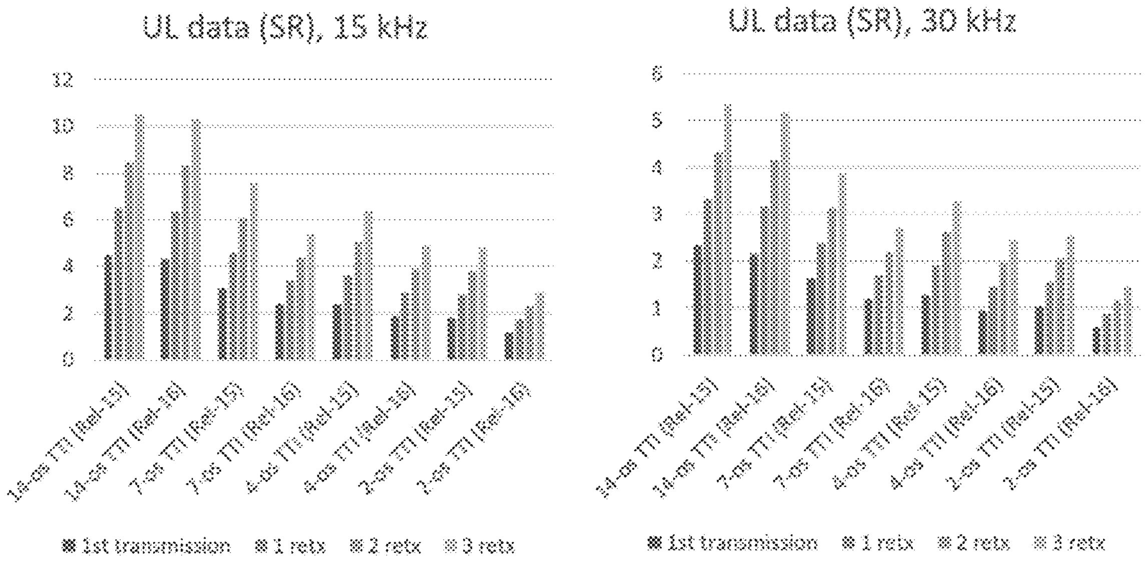
FIG. 61 illustrates a comparison of grant-based uplink data latency.
Figure 62:
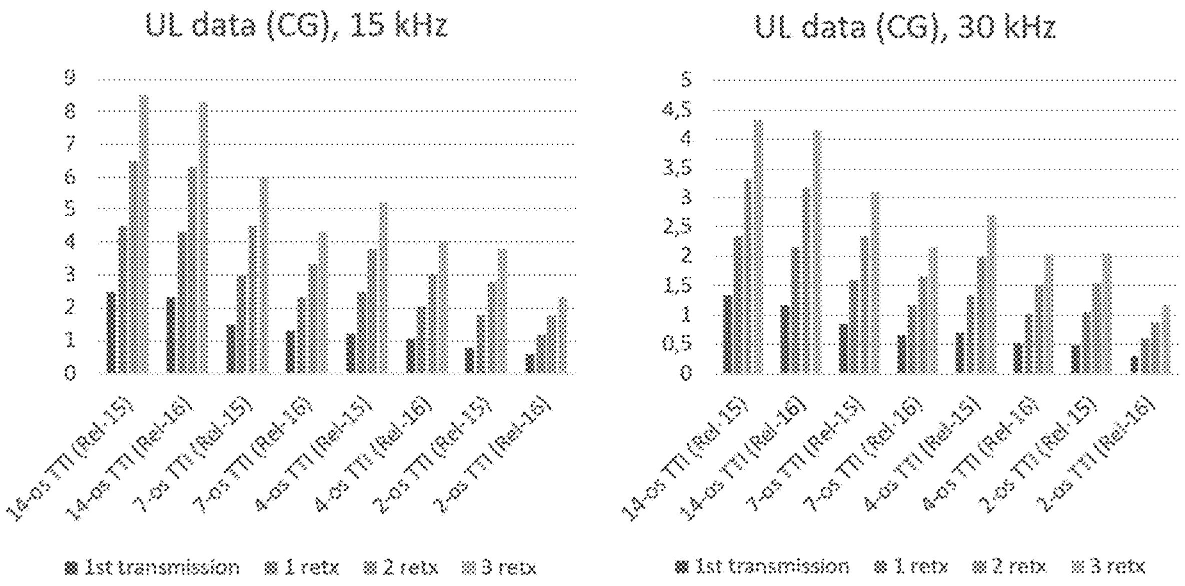
FIG. 62 shows a comparison of configured grant uplink data latency.

$T_{UE,proc}$ is an important latency component to improve. In Release 15, UE processing time capability #1 and #2 have been defined, where capability #1 is defined for SCS of 15/30/60/120 kHz, and capability #2 defined for SCS of 15/30/60 kHz. The more aggressive capability #2 is still inadequate for the 1 ms latency constraint. Since the latency requirements for eURLLC are in order of 1 ms (e.g., 0.5 ms), a new UE capability #3 can be defined in Release 16 NR to fulfil the latency requirements. The proposed UE capability #3 is summarized in Table 19. The impact of the proposed capability can be seen in FIG. 60, FIG. 61, and FIG. 62. FIG. 60 shows downlink data latency comparison between Release 15 and the new UE capability #3 shown in Table 19. FIG. 61 shows a comparison of grant-based uplink data latency for Release 15 versus the new UE capability #3. FIG. 62 shows a comparison of configured grant uplink latency, between Release 15 and the new UE capability #3.

TABLE 19

| UE Processing Time Capability # 3 | | | | | |
|---|---|---|---|---|---|
| Configuration | HARQ Timing | 15 kHz SCS | 30 kHz SCS | 60 kHz SCS | 120 kHz SCS |
| Front-loaded DMRS only | N1 | 2.5 os | 2.5 os | 5 os | 10 os |
| Frequency-first RE-mapping | N2 | 2.5 os | 2.5 os | 5 os | 10 os |

Another delay component $T_{DL,align}$ is significantly influenced by PDCCH periodicity. The worst case $T_{DL,align}$ is equal to the PDCCH periodicity. In Release 15, PDCCH periodicity is affected by several constraints, including: (a) blind decoding limits, (b) # CCE limits), (c) DCI sizes. To provide shorter PDCCH periodicity for eURLLC, it is necessary that the number of blind decoding limits and CCE limits be relaxed in Release 16.

Another important UE capability is related to time of CSI report generation. The faster UE can provide the CSI report the more accurate a scheduling decision will be from link adaptation perspective. In Release 15 specification there are two key values defined:

Z corresponds to the timing requirement from triggering PDCCH to the start of the PUSCH carrying the CSI report and it should thus encompass DCI decoding time, possible CSI-RS measurement time, CSI calculation time, UCI encoding time, and possible UCI multiplexing and UL-SCH multiplexing.

Z' on the other hand corresponds to the timing requirement from aperiodic CSI-RS (if used) to the start of the PUSCH carrying the report.

The difference between Z and Z' is thus only the DCI decoding time.

In Release 15, there exists no “advanced CSI processing capability”, that is, there is only a baseline CSI processing capability defined that all UEs must support. There was a discussion to include such an advanced CSI processing capability in Release 15, but it was not included due to lack of time.

Three “latency classes” for CSI content are defined in Release 15.

Beam reporting class: L1-RSRP reporting with CRI/SSBRI

Low latency CSI: Defined as a single wideband CSI report with at most 4 CSI-RS ports (without CRI reporting), using either the Type I single panel codebook or non-PMI reporting mode High Latency CSI: All other types of CSI content For each of these three classes, different requirements on (Z, Z') are defined (according to CSI computation delay requirement 2). There also exist a more stringent CSI requirement, CSI computation delay requirement 1, which is only applicable when the UE is triggered with a single Low Latency CSI report without UL-SCH or UCI multiplexing and when the UE have all its CSI Processing Units unoccupied (i.e., it is not already calculating some other CSI report).

In NR Release 15, the mandatory UE CSI processing capability requires a UE to support calculation of 5 simultaneous CSI reports (which may be across different carriers, in the same carrier or as a single report with multiple CSI-RS resources). The values of (Z,Z') is CSI processing requirement 2 where thus determined so that all UEs should be able to calculate 5 CSI reports within this timeframe. As some UE implementations calculate multiple CSI reports in a serial fashion, this implies that, roughly speaking, the CSI requirement 2 is about 5× longer than what it would be if the requirement were that only a single CSI report would need to be computed.

In a typical URLLC scenario, and indeed, in many typical deployments and scenarios, the gNB is only interested in triggering a single CSI report at the time. It is thus a bit unfortunate that the timing requirement is 5× longer than it has to be for that case. This excessively long CSI calculation time puts additional implementation constraints for the scheduler, as the N2 requirement for data triggering and data to HARQ-ACK delay (K1) requirement is much lower than the CSI processing requirement.

Further improvements are possible. For CSI processing timeline enhancements for eURLLC, the introduction of a new CSI timing requirement (“CSI computation delay requirement 3”) is beneficial for sporadic traffic for the purpose to quickly get channel state at gNb. It may be sued when the UE is triggered with a single CSI report. A starting position could be to take the values defined for CSI timing requirement 2 and divide by a factor 5.

Another possible CSI processing timeline enhancement is to introduce an advanced CSI processing capability. That is, to introduce a new set of tables for the two existing CSI timing requirements (as well as for the third one just proposed). A UE could then similarly to the advanced processing capabilities for PDSCH/PUSCH indicate in its capability that is supports the more aggressive CSI timeline.

Fast HARQ is another improvement. The faster processing and UE capabilities discussed in the previous sections enable faster HARQ re-transmissions. We assume that gNB can operate with similar processing speed as the UE. To operate with HARQ re-transmissions and keep latency low there need to be frequent PDCCH monitoring occasions but also PUCCH occasions where the HARQ-ACK can be transmitted. For simplicity reasons we will be assuming zero timing advance although that cannot be assumed in reality. With non-zero timing advance the latency values may change.

Here one can focus on comparison between Release 15 and Release 16. The evaluation results are shown below. For Release 15 capability #2 we assume a PDCCH periodicity of 5 OFDM symbols (os). Note that with the CCE limit per slot of 56, it is allowed up to 3 PDCCH monitoring occasions per slot where each occasion contains at least one AL16 candidate. For Release 16 we assume improved values of $N_1$ and $N_2$ (capability #3 which was discussed in previous sections) and PDCCH periodicity of 2 symbols as a consequence of potential improvement on the limits of number of blind decodes and CCEs.

Inter-UE pre-emption is another improvement. Dynamic multiplexing of different services is highly desirable for efficient use of system resources and to maximize its capacity. In the downlink, the assignment of resources can be instantaneous and is only limited by the scheduler implementation, while in the uplink, standard specific solutions are required. Below, the existing solutions in Release 15 and additional solutions for Release 16 are discussed.

Dynamic multiplexing of different services is highly desirable for efficient use of system resources and to maximize its capacity. In the downlink, the assignment of resources can be instantaneous and is only limited by the scheduler implementation. Once low-latency data appears in a buffer, a base station should choose the soonest moment of time when resources could be normally allocated (i.e. without colliding with the resources allocated for an already ongoing downlink transmission for that UE). This may be either beginning of the slot or a mini-slot where the mini-slot can start at any OFDM symbol. Hence, downlink pre-emption may happen when long term allocation(s) (e.g. slot based) occupy resources (particularly wideband resources) and there is no room for critical data transmission which can by typically mini-slot. In this case a scheduler can send DCI to critical data UE and override ongoing transmission in downlink. When slot eMBB transmission is pre-empted, the pre-empted part of the original message pollutes the soft buffer and should be flushed to give good performance in retransmissions, which will likely happen. NR Release 15 specification allows to indicate about the pre-emption by explicit signalling, which is carried either:

Option 1. By special DCI format 2_1 over group common PDCCH or;

Option 2. By special flag in multi-CBG retransmission DCI "CBG flushing out information".

Option 1 gives an indication as a 14-bits bitmap, which addresses to reference downlink resource domains in between two pre-emption indication messages. Highest resolution of this signaling in time is 1 OFDM symbol and in frequency ½ of BWP (BandWidth Part), but not at the same time. The longer periodicity of messages, the coarser resolution. Since this is a group common signaling, all UEs within the BWP may read it.

Option 2 is a user specific way of signaling. The HARQ retransmission DCI, which contains a set of CB/CBGs, may have a special bit to indicate that the UE must first flush related parts of the soft-buffer and then store retransmitted CB/CBGs in the soft buffer.

During 3GPP discussions of Release 15 URLLC, the uplink pre-emption feature was down-scoped due to lack of time in 3GPP URLLC working item. However, the feature is under discussion of Release 16. UL pre-emption may happen where a longer eMBB UL transmission is interrupted with urgent URLLC UL transmission. Further, it can have two flavors:

Intra-UE pre-emption, where both transmissions belong the same UE. The intra-UE pre-emption is similar to DL pre-emption case where instead of gNB, UE prioritizes the transmission in the UL direction. For this some sort of indication is necessary to the gNB of incoming URLLC transmission instead of eMBB transmission.

Inter-UE multiplexing, where based on the request from some UEs for urgent transmission of high priority UL traffic (URLLC traffic), the gNB needs to provide resources to accommodate transmissions as soon as possible to meet the delay requirements. It can happen that the gNB has already assigned the suitable UL resources to one or multiple other UEs for UL transmissions with less stringent requirements in terms of delay (eMBB traffic). Hence, the gNB needs to reschedule those resources for the prioritized URLLC transmissions.

The Intra-UE pre-emption is discussed further, below, since it more implies MAC mechanisms, while the second option has clear physical layer scope.

Figure 63:
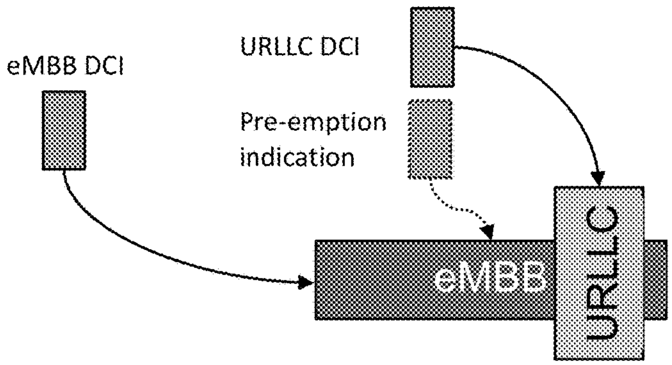
FIG. 63 shows uplink inter-UE pre-emption.

Given two enabling mechanism based on power control and muting, the pre-emption would be achieved at the cost of 1) additional signalling and complexity both at UE and gNB due to changing ongoing or planned UL transmissions and 2) impact to the performance of eMBB traffic. For the cost to be worth investing, it is important to adopt a mechanism that ensures best the required quality of the URLLC transmissions. Both approaches can be illustrated by FIG. 63.

A drawback with power control-based schemes is that the URLLC transmissions would suffer from the interference originating from transmissions controlled by the serving gNB where in fact those transmissions could have been de-prioritized. Moreover, power boosting of URLLC transmissions would not only increase the interference for neighbouring cells, but also impact the performance of eMBB traffic. Hence, with pre-emption-based schemes, by cancelling the on-going or pre-scheduled eMBB UL transmissions on the suitable resources that the gNB intends to use for URLLC transmissions, the gNB at least avoids possible degradation of the URLLC traffic performance due to its self-inflicted interference. It should be noted that the discussion here relates to PUSCH transmissions where other options are more suitable for controlling reliability. For PUCCH the options are more limited.

Figure 64:
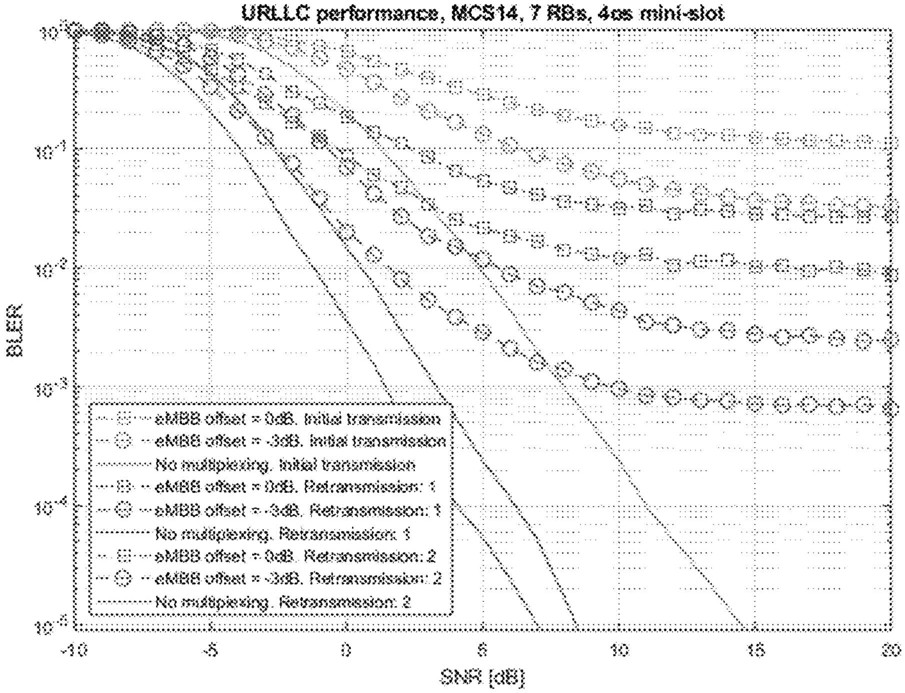
FIG. 64 shows the performance of MCS14 in a power-controlled multiplexing scheme.

The performance of power control-based scheme is shown in FIG. 64 for 4 GHz, TDL-C with DS 100 ns, 4×2 antenna configuration and MMSE-MRC receiver when slot based eMBB transmission interferes with mini-slot URLLC. Low SE MCS table is in use.

Based on above discussion, the indication-based scheme can ensure URLLC reliability, while power control-based scheme can be considered as backward compatible solution in Release 15/16 interworking scenario. However, the former comes with an extensive signalling cost.

This implies that although the UL pre-emption indication is in fact effective in a UE-specific manner, it is a better design choice to consider a group common UL pre-emption indication with the flexibility to adjust the group size depending on the scenario, from a single UE to multiple UEs, as needed. This approach preserves the properties for the single UE case while reducing signalling overhead and blocking probability in case multiple UEs need to be pre-empted.

Aiming to reuse the already existing mechanism, when possible, the two following options are mainly considered for group common signalling of UL pre-emption:

Option 1: UL pre-emption indication based on DCI format 2_0 (dynamic SFI)

Option 2: UL pre-emption indication design similar to DCI format 2_1 (DL pre-emption indication)

In option 1, it is proposed to use the existing dynamic SFI and define a new (or extended) UE behaviour as follows. When a UE detects an assignment flexible (or DL) for the symbols that have already scheduled by UE specific signalling for UL transmissions, the UE completely cancels the UL transmissions. This design choice is based on two assumptions, i.e., for the purpose of UL pre-emption, 1) dynamic SFI overrides UE specific signalling and 2) the pre-empted UL transmission is not delayed and resumed but simply cancelled. This approach is simple and requires less processing time at the UE due to the need for only cancelling UL transmissions. However, it requires the defining of a new behavior, which is based on the assumption that a later SFI over-riding a prior UE-specific DCI which by itself is contradictory with the design philosophy used in Release 15. Moreover, relying on the existing SFI regime for the simplicity reasons implies that the specified SFI table for Release 15 should be used. With careful examining the entries of this table, one can observe limitations on where the UL transmission cancellation can occur as compared to a bit map pattern that provide full flexibility.

In option 2, the DL pre-emption mechanism can be adopted for the UL pre-emption indication. This approach enables a gNB to indicate to a UE with finer granularity which resources are needed to be pre-empted by using a bit map pattern. This mechanism is flexible in the sense that depending on how the UE behaviour is defined or its capability, the bit map pattern can be used to indicate when the UL transmission should be stopped without resuming transmission afterwards. Or alternatively, it can be used to indicate to the UE when to stop and then resume the UL transmission if the UE is capable of such operation in reasonable time.

Lower MCS and CQI for lower BLER target are additional issues. Based on the evaluation presented above, it can be observed that depending on a latency requirement for URLLC there could be time only for one radio transmission. In this example an air interface must be able to guarantee very low BLER required for URLLC service. For this purpose, there were several enhancements in Release 15:

- New 64QAM CQI table has been introduced for reporting at target BLER 10^-5. The new table contains lower spectral efficiency (SE) values.
- Low spectral efficiency 64QAM MCS table has been introduced to use without transform precoding.
- Low spectral efficiency 64QAM MCS table for DFT-spread OFDM waveform table has been introduced.

Figure 65:
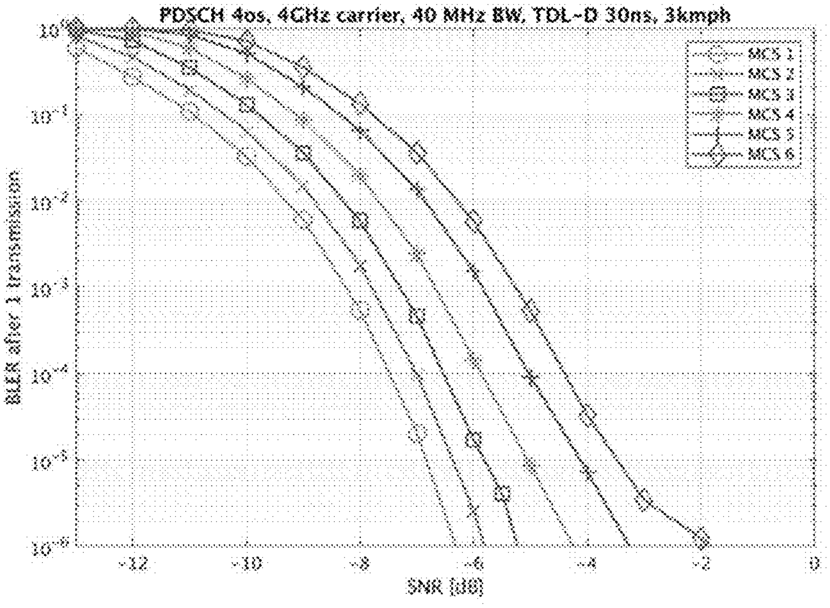
FIG. 65 shows PDSCH BLER after one transmission, for several different modulation coding schemes.

As an example, we consider TBS=256 bits (=32 bytes), transmission duration of 4 OFDM symbols with 1 DMRS symbol overhead. PDSCH BLER for different MCSs supported within 40 MHz BW are given in FIG. 65. Here, the coding rate of MCS 6 corresponds to coding rate of MCS 0 in legacy 64QAM table.

The network can configure highlighted MCS tables semi-statically by RRC. Moreover, dynamic signalling for MCS table is also supported by configuring UE with MCS-C-RNTI in addition to regular C-RNTI where MCS-C-RNTI is always associated with Low SE MCS table. UE always applies Low SE MCS table when it detects MCS-C-RNTI scrambled with PDCCH CRC and it applies semi-statically configured MCS table (64QAM or 256QAM) otherwise. As an alternative, the MCS table can be configured semi-statically when UE has only URLLC traffic, while the dynamic way is preferable in case when UE is eMBB and URLLC capable at the same time. A drawback of dynamic MCS-table signalling is higher PDCCH CRC false alarm rate due to new MCS-C-RNTI introduction.

It must be noted that CQI and MCS tables can be configured independently, e.g., legacy 64QAM MCS table can be used with new 64QAM CQI table 10^-5 BLER reporting.

Figure 66:
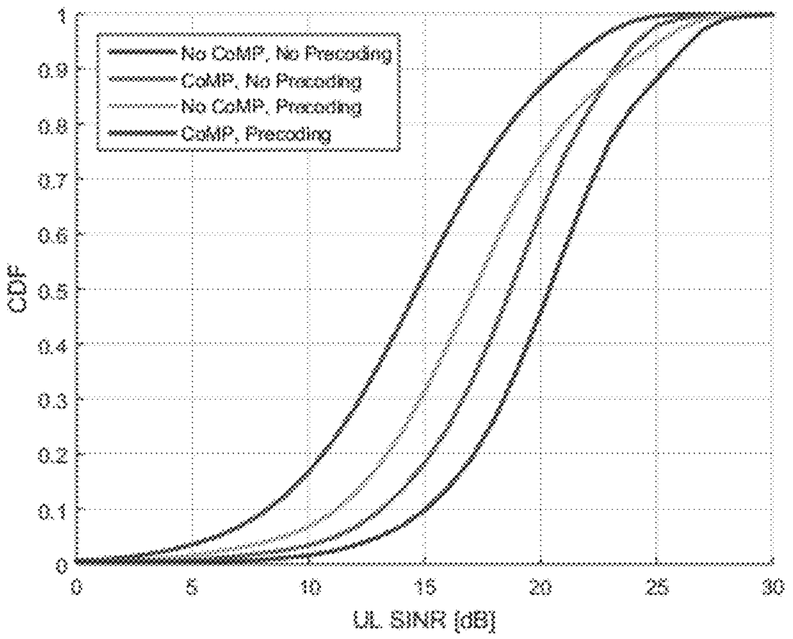
FIG. 66 shows uplink SINR for different multi-antenna techniques, with and without coordinated multipoint and uplink precoding.

Multi-antenna techniques are another issue. There is a well-known trade-off between increased data rates (multiplexing) and increased reliability (diversity). This means that increases in one necessarily come at the cost of some degradation of the other. In mobile broadband, MIMO techniques are typically used to increase the data rates and the spectrum efficiency of the network. On the other hand, for URLLC, it may be better to spend the degrees of freedom afforded by MIMO to increase reliability. Thus, instead of using the throughput as a metric to be optimized, the network can optimize reliability metrics such as the outage probability. For example, UL performance can be improved by both UL pre-coding and intra-site UL CoMP (joint reception) as shown in FIG. 66, which shows UL SINR for different multi-antenna techniques with and without UL CoMP (3-sector intra-site joint reception) and UL precoding (Rel-10 rank 1 4-port precoders). For "No precoding", single-antenna transmission is used, while for "Precoding" 4 antenna elements are used (1×2 X-pol, separation=0.5 lambda).

Cyclic-delay diversity (CDD) or space-time codes can also be considered to provide additional frequency diversity in a spec-transparent manner. Multiple receive antennas provide receive diversity and provide means to maximize the received signal-to-interference-noise-ratio (SINR) after reception combining at the receiver. Diversity schemes has the benefit that they require less channel knowledge than precoding does.

Multiple antenna elements can also be used to create directional antenna beams at the transmitter and/or receiver side to increase the received SINR and thus reliability. Clearly, improved SINR is provided that the beam is pointing in correct direction and hence beamforming requires at least some channel knowledge to determine the correct direction of the beam.

L2 Features

In this section, Layer 2 features in the RAN are described to support the provisioning of URLLC. While multiple features for LTE and NR have been introduced for Release 15, providing the fundamental URLLC support, current studies for Release 16 standardization seek for enhancements to improve the system's efficiency when providing URLLC and also in particular targeting the support of TSN integration i.e. support of multiple traffic flows of different QoS requirements. Assumed here is that not only should non-critical traffic be efficiently transmitted, other critical traffic flows should be served with a deterministic latency. In a TSN scenario, these traffic flows are typically periodical but not necessarily. In general, we address scenario where full knowledge of when, which size and with which pattern/period traffic arrives at the gNB or UE is not available a-priori. We investigate the Release 15 baseline and enhancements in the following sections on SR and BSR, Pre-scheduling for cyclic traffic, UE multiplexing, as well as PDCP duplication.

It shall be noted that the L2 features are generally independent of whether FDD or TDD is used.

Figure 67:
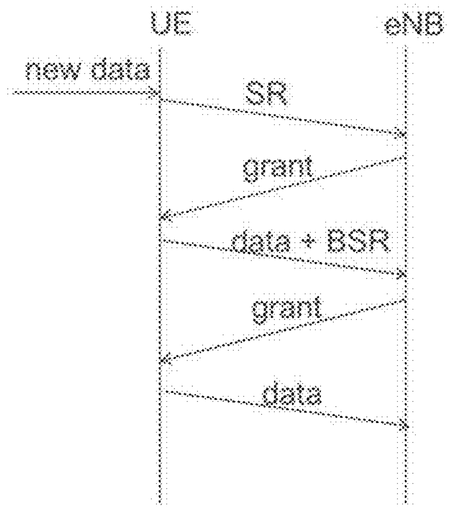
FIG. 67 shows an example of scheduling request (SR) and buffer status report (BSR) operation.

Buffer Status Reports (BSR) and Scheduling Requests (SR) are the two methods which the UE can use to indicate that data is available in the transmission buffer. These indications may result in that the network provides a grant, i.e., UL-SCH resources to the UE to allow data transmissions. This is commonly known as dynamic scheduling. An example of SR and BSR operation is shown in FIG. 67.

In a nutshell, one of the major differences between SR and BSR is that the SR is a one-bit indication in PUCCH which signals that the UE has data for transmission, while the BSR explicitly provides an approximate value of the amount of data that the UE has in its buffer on a per logical channel group basis. The BSR is transmitted in a MAC Control Element (CE) which is transmitted in the PUSCH.

In NR Release 15, one SR configuration can be configured per each logical channel, and several logical channels may be configured with the same SR configuration. The SR is transmitted in the PUCCH. In one bandwidth part (BWP), an SR may be configured with, at most, one PUCCH resource. This means that, in NR, the network may configure multiple SR configurations which could, potentially, be used for different types of traffic.

The procedure can be summarized as follows:

Data from a certain logical channel arrives.

A Regular BSR is triggered due to the arrival, given the triggering specified criteria are met.

No PUSCH resources are available to transmit the BSR.

An SR is triggered and transmitted in the SR resource associated to the logical channel which triggered the BSR.

Dynamic scheduling introduces a delay to the data transmissions, as shown in FIG. 67. This delay depends on the periodicity/offset of the SR configuration and the time the network takes to allocate resources and transmit a grant.

Figure 68:
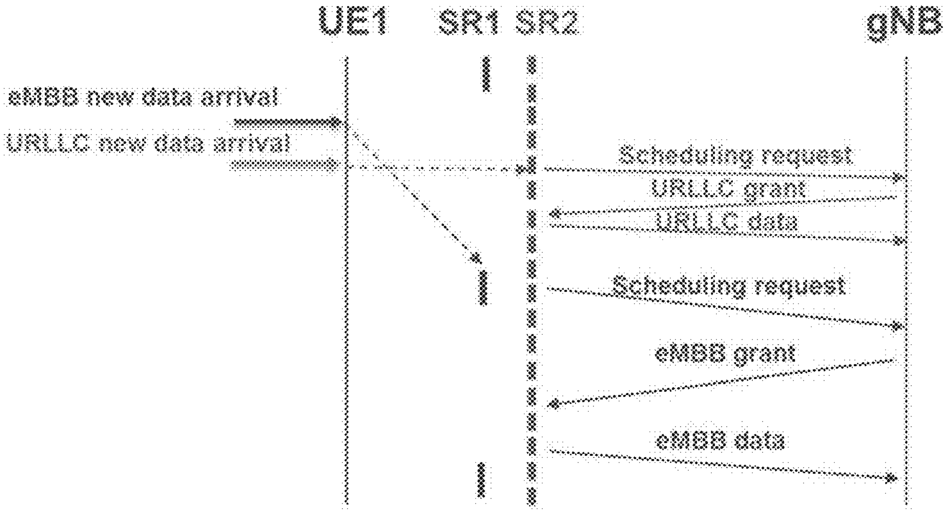
FIG. 68 illustrates multiple SR configurations mapped to different traffic.

Some Industrial IoT services and traffic may need to meet tight delay requirements. "Multiple SR configurations" as specified in Release 15, is thus a feature which can play a key role to ensure traffic differentiation and to ensure that delay requirements are met. An example is depicted in FIG. 68, which shows multiple SR configurations mapped to different traffic.

Buffer Status Report (BSR), as specified, is transmitted by the UE in the PUSCH. The BSR is transmitted as a MAC Control Element in the MAC PDU. The purpose of the BSR is to indicate the approximate amount of data in the buffers. This report is indicated per Logical Channel Group (LCG). Each logical channel will be associated to a LCG. There are 8 LCG. In scenarios in which there is a need to differentiate among a limited set of traffic profiles (DRBs), the number of LCG may be sufficient to provide a 1-to-1 mapping between logical channels and LCG.

There are 4 different BSR formats and depending on the selected format, the UE may be able to indicate the buffer status of one or more logical channels groups.

The BSR can be triggered by one of the following mechanisms:

Regular BSR: A regular BSR is triggered when a logical channel which belongs to a certain LCG receives new UL data for transmission. In addition, this new data must fulfill one of the following two conditions: the new data belong to a logical channel with higher priority than any of the other logical channels which have data; or, there is no other data available for transmission in the LCG in any of the logical channels.

A regular BSR will never be triggered if more data is received in another certain logical channel and that logical channel has already data in the buffer.

A regular BSR can only use the Short and Long BSR formats.

Periodic BSR: A periodic BSR is triggered periodically following the configuration provided by the network.

A periodic BSR can only use the Short and Long BSR formats.

Padding BSR: When the UE receives a larger grant than what it needs to transmit the data, the UE may be able to transmit a BSR instead of padding bits. Depending on the number of padding bits, the UE will transmit a different BSR format.

Padding BSR can use all the BSR formats.

SR and BSR will play an important role to assist Industrial IoT traffic to meet the different requirements of each traffic, especially when the traffic periodicity and size is unpredictable.

"Multiple SR configuration" may be a key feature to differentiate traffic which has strict delay requirements and dynamic scheduling as the preferred method to allocate UL network resources. A specific SR configuration could be mapped to a specific Logical Channel (which could carry traffic with specific requirements e.g. very low latency requirement). When the network receives this specific SR (which can be identified by the specific resources allocated to it), the network can identify that there is traffic with low latency requirements waiting for transmission. Then, the network may prioritize the allocation of resources to this traffic.

One possibility is that predictable Industrial IoT traffic (known periodicity/packet sizes) is mapped to a specific SR configuration. The SR configuration would then identify the traffic which would allow the network to allocate the appropriate resources for that specific traffic. On the other hand, LCHs with non-predictable traffic (packet sizes are unknown) would then be mapped to a generic SR configuration, a generic SR shared by a number of other LCH. In this case, the SR configuration cannot assist the network to identify the traffic and, therefore, the LCH needs to rely on the BSR indications to provide relevant information to the network which could assist to the scheduling decisions. Thus, Buffer Status Reporting will also be a key feature especially in scenarios in which non-predictable traffic is expected.

Figure 69:
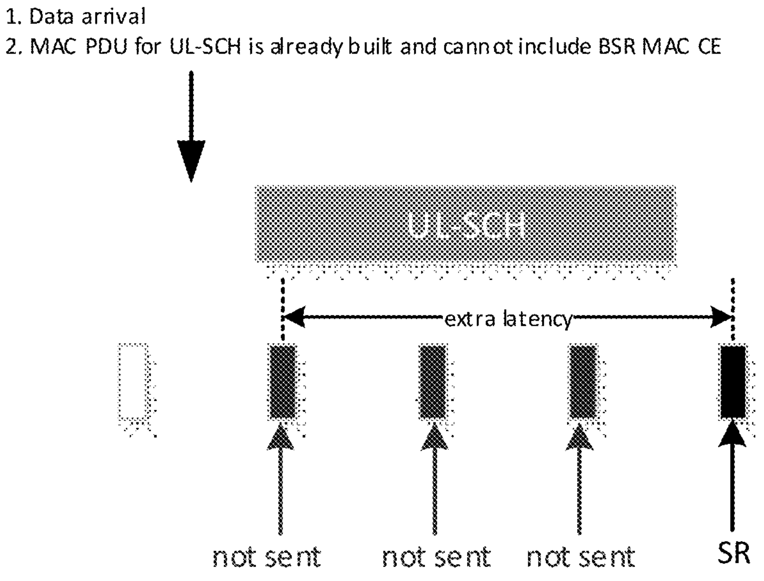
FIG. 69 shows delayed SR due to ongoing long UL-SCH transmission.

It is expected that Industrial IoT is based on the SR procedure designed in Release 15, but minor enhancements might be introduced in Release 16. For example, it is up to the UE to decide which SR configuration is used when there are several pending SRs. This UE behavior could be changed so that the SR configuration linked to the highest priority logical channel is selected by the UE. However, this was discussed during Release 15 without reaching any possible agreement. Furthermore, currently even though a frequent PUCCH resource is allocated for allowing quick SR transmissions when critical data arrives, when a long PUSCH transmission is ongoing, the SR can only be sent at the PUCCH resource after this long PUSCH duration, as PUCCH and PUSCH cannot overlap according to current specification. BSR might be transmitted in this case instead via PUSCH, but given the PUSCH is long (slot length, low OFDM numerology), it may also be associated with a long decoding/processing delay. This is shown in FIG. 69, which shows delayed SR due to ongoing long UL-SCH. Therefore, it is envisaged in Release 16 to allow parallel PUCCH transmission for SR on overlapping PUSCH resources, reducing the latency for the SR.

BSR for Industrial IoT will also be based on Release 15 and minor enhancements might be also introduced. During the development of Release 15, it was proposed that new data would always trigger a BSR. This behavior was not accepted and the LTE behavior was adopted. That means that new data coming to a logical channel does not trigger a regular BSR if the logical channel group already had buffered data, or the new data belongs to a lower priority logical channel. Nevertheless, for Industrial IoT Release 16, it has been discussed again whether new data would always trigger a BSR, which would have the advantage that otherwise required frequent periodical BSR transmissions can be avoided.

Another aspect not discussed in these SR/BSR sections is the priority of the MAC CE for BSR in the logical channel prioritization procedure. MAC CE for BSR, with exception of padding BSR, has a higher priority than data from any DRB. In other words, MAC CE for BSR is transmitted before any user data per current operation. However, some optimizations targeted for NR Industrial IoT are possible:

The priority of the MAC CE for BSR is configurable, i.e., it can be modified (reduced) by the network.

In this manner, certain DRBs e.g. DRBs carrying data with very low delay requirements can have a higher priority than MAC CE BSR.

In the following, we address pre-scheduling grants which is used in both Release 15 and 16. Such grants removes the delay introduced by waiting for SR transmission occasions and the corresponding response (i.e. grant).

Figure 70:
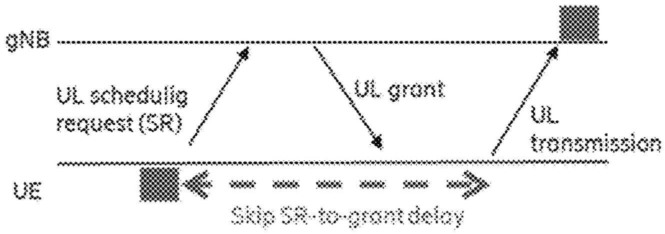
FIG. 70 shows a delay in obtaining a dynamic grant via SR procedures.

In Release 15, when a UE does not have UL resources allocated and data becomes available, the UE needs to undergo the scheduling request procedure, i.e., request UL resources from the gNB, which are then granted. This comes with an additional UL access delay, unwanted for transmission of critical traffic, such as TSN stream data. Pre-scheduling of grants is a technique to avoid the extra latency resulting from SR-to-grant procedures when using dynamic scheduling, as illustrated in FIG. 70.

Pre-scheduling can be done by implementation by the gNB pro-actively sending out multiple UL grants for potential UL transmissions. The standard in LTE and NR Release 15 supports this concept by allowing pre-scheduling of multiple, periodically recurring UL grants. It builds on the semi-persistent scheduling concept (SPS) originally introduced for LTE VOIP. In NR, such pre-scheduling scheme is called semi-persistent scheduling in the downlink (DL), whereas it is called configured grant (Type 1 and Type 2) in the uplink (UL).

The NR DL SPS assignment is the same as in LTE, which is a configured assignment provided by PDCCH/L1 signal (can also be deactivated/activated).

The NR UL configured grant (CG) has been specified in two variants, configured grant type 1 and type 2. In both variants gNB pre-allocates the resources of the grants (via different signaling) including:

Time-frequency resources (via RRC for Type 1 and DCI for Type 2)

Period (via RRC), offset (via RRC for Type 1 and implicitly at DCI reception for Type 2)

MCS, Power parameters (via RRC for Type 1 and DCI for Type 2)

DMRS, repetitions (via RRC for Type 1 and DCI for Type 2)

HARQ configuration; (via RRC)

Activate/Deactivate message (via DCI for Type 2).

Both configured grants type 1 and type 2 share several commonalities, such as:

"Configured Scheduling" CS RNTI used on PDCCH for activation/deactivation and retransmissions.

Retransmission for both Type 1 and Type 2 are based only on dynamic grant to CS RNTI (i.e. retransmissions are not sent using the periodically recurring UL grants).

The dynamic grant with C-RNTI overrides a configured grant for initial transmission in case of overlap in time domain.

Figure 71:
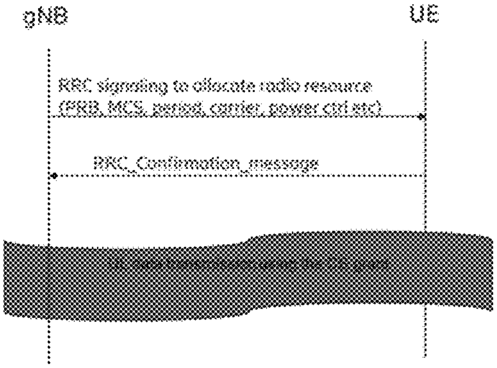
FIG. 71 illustrates configured grant Type 1 procedures.
Figure 72:
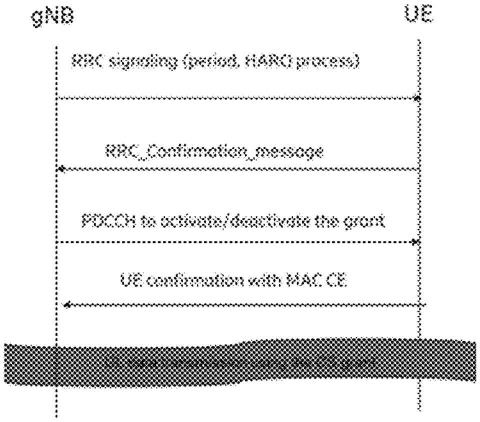
FIG. 72 illustrates configured grant Type 1 procedures.

There is at most one active Type 1 or Type 2 configuration per serving cell and BWP One difference between Type 1 and Type 2 is the setting up procedures. The procedures of Type 1 CG are illustrated in FIG. 71, whereas, the procedures of Type 2 CG are illustrated in FIG. 72. It can be argued that since Type 1 CG is activated via RRC, it is best suited for traffic with deterministic arrival periodicity (on of TSN characteristics). On the other hand, Type 2 CG are suited to support streams with uncertain mis-alignment, where the grant can be reconfigured quickly with DCI (PHY signal).

A disadvantage of configured grant is the low utilization of granted resources when used to serve unpredictable yet critical traffic, because gNB will allocate resources without knowing if the traffic will arrive or not.

Figure 73:
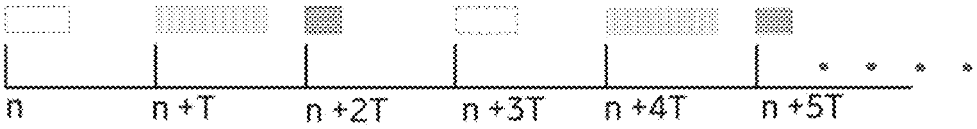
FIG. 73 shows industrial deterministic streams with different arrivals and payload sizes.
Figure 74:
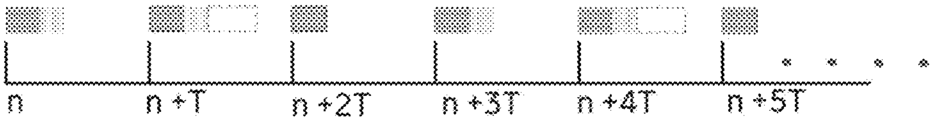
FIG. 74 shows industrial deterministic streams with different patterns, periodicities, latency, and reliability requirements.

TSN traffic handling will be an important issue in Release 16. Several approaches to support multiple traffic flows, i.e., TSN streams are discussed here, where each stream has specific characteristics, i.e., periodicity, time offset, target reliability, latency, etc., as illustrated in FIG. 73 and FIG. 74. FIG. 73 illustrates industrial deterministic streams with different arrival and payload sizes. FIG. 74 illustrates industrial deterministic streams with different patterns and periodicity, and differing latency and reliability requirements.

Each of the TSN stream characteristics plays a major role in scheduling the users. For instance, a TSN stream with periodical data yet ultra-low latency requirement can be best accommodated (with minimum possible network resources) if the network knows exactly the periodicity and arrival of such TSN stream data. However, if the network does not know such characteristics it will over dimension the grant to avoid violating the tight latency requirement, thereby potentially resulting in inefficient radio resource management. Furthermore, it is assumed a target reliability of the UE's TSN data stream can be reached with specific MCS index and number of repetitions. Only if the radio network accurately knows such requirements it will not over or under allocate the resources. It is assumed in the following that these traffic characteristics are not necessarily known, especially when it comes to multiple overlapping TSN streams and other non-critical traffic. Therefore, features are investigated in the following, giving the gNB the possibility to still efficiently as well as robustly schedule the traffic mix.

In Release 15, a single CG configuration within a cell/BWP can support industrial streams/flows with similar periods and other requirements (such as, latency, reliability, jitter, etc.). However, in industrial networks, as targeted in Release 16, multiple streams (data flows) generated at a node is a very common use-case, e.g., robot arm with several actuators, sensors and monitoring devices.

As a result, such multiple streams differ in its characteristics, e.g., arrival time, and payload size as shown in FIG. 73. One of the streams has a medium size payload (in comparison to the others. Also, the packet from this stream arrives at offset zero, followed by the packets from the other two streams, which arrive at T and 2T offsets, respectively.

Furthermore, multiple streams can be characterized by different periodicity, latency and reliability requirements, as shown in FIG. 74. Suppose the stream with the dashed outline requires not so critical reliability and latency, whereas both of the other streams require demanding reliability and latency performance. The grant's configuration parameters, such as MCS and repetition, will differ for the former, compared to the latter. Also, some streams differ in their arrival pattern and periodicity than others. Because of their different stream characteristics, all of these streams cannot be supported with a single configuration (CG), even if the CG is supported using very short periodicity, because the CG will have a single set of configuration parameters, e.g., MCS index, latency, slot period, K-repetition.

Since gNB is responsible to allocate the CG's configurations, any overlap among the configurations occurs with the knowledge of the radio network. gNB might allocate overlapping configurations to address several scenarios: 1) overcoming the mis-alignment of critical data arrival 2) accommodating multiple TSN streams with different characteristics. Depending on the characteristics of the configurations, the overlaps can be divided into several cases:

Case a) similar characteristics (e.g., MCS, period, K-Rep) except the starting symbol (offset).

Case b) similar starting time and same periodicity (completely overlapping configurations) but different (MCS and K-Rep).

Case c) different offsets and/or different priority and MCS/K-Rep.

Figure 75:
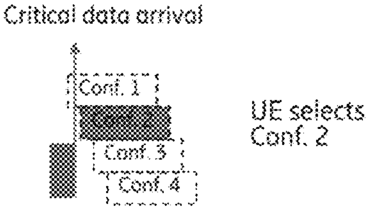
FIG. 75 illustrates overlapping configurations.

A problem in overlapping configurations is the undefined UE decision basis for selecting which of the overlapping configurations. Assume a gNB allocates similar overlapping configuration with different offset in time to overcome the mis-alignment in critical data arrival, as shown in FIG. 75. In such case, the UE selects the closest (in time) configuration, upon arrival of critical traffic.

Industrial applications raise additional considerations related to logical channel prioritization (LCP) restrictions and multiplexing. Following, the baseline LCP procedures are described. Then, techniques to enhance multiplexing for industrial mixed services scenarios are described.

Mixed services communication systems should address both Inter-UE and Intra-UE scenarios, however, in this section we focus on the Intra-UE one. In such systems a UE is assumed to have several traffic types that are categorized as critical and non-critical traffic. It is assumed that critical traffic is served better with configured grants, because this traffic requires very low latency high reliability in the uplink. It is further anticipated that gNB would overprovision configured grant resources to serve such traffic, because of uncertainty about traffic pattern. On the other hand, non-critical traffic has loose latency and reliability requirement and does not benefit from too robust transmissions; on the contrary: system resources might be wasted transmitting large volumes of non-critical traffic with robust grants in a capacity limited scenario. A common use-case that represents and motivates such mixed services case is an industrial robot arm that has actuators, sensors, and cameras integrated and connected to the same communication device/UE. Several RAN1/2 issues surface when such critical traffic overlaps with non-critical one.

The LCP procedures are applied whenever a new transmission is to be performed, and it is mainly used to specify how and what LCHs are going to fill the MAC PDU which is going to be sent over the PUSCH via PHY. There are mainly two parts in LCP procedures, one focuses on selecting the LCHs to be included in the MAC PDU, the other one focuses on the prioritization and the amount of each LCH's data (among the selected ones) to fill the MAC PDU.

The selection of LCHs is called LCP restriction procedures. Such procedure is controlled by several restrictions configured via RRC. Each of these restrictions allow/forbid the LCH to be included in the constructed MAC PDU. The following are the existing LCP restrictions in Release 15:

allowedSCS-List which sets the allowed Subcarrier Spacing(s) for transmission;

maxPUSCH-Duration which sets the maximum PUSCH duration allowed for transmission;

configuredGrantType1Allowed which sets whether a configured grant Type 1 can be used for transmission;

allowedServingCells which sets the allowed cell(s) for transmission.

Logical channel priority is configured per MAC entity per logical channel. RRC configures the LCP parameters to control the multiplexing of the uplink LCH's data within the MAC. Such LCP parameters are expressed as, priority where an increasing priority value indicates a lower priority level;

prioritisedBitRate which sets the Prioritized Bit Rate (PBR);

bucketSizeDuration which sets the Bucket Size Duration (BSD).

Figure 76:
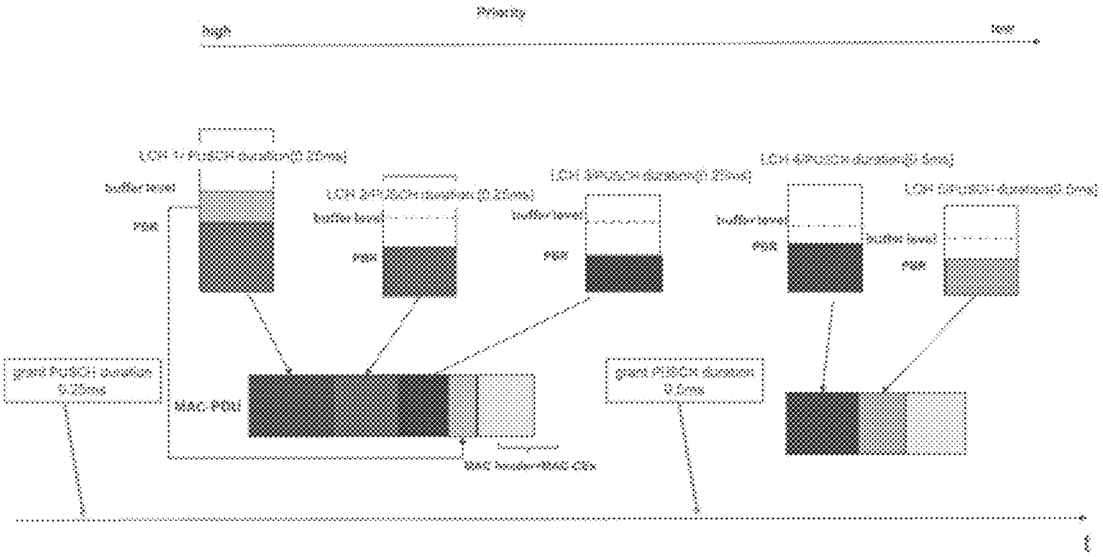
FIG. 76 shows an example of logical channel prioritization (LCP) procedures.

An example of how LCP multiplexing occurs is illustrated in FIG. 76. In this example, only the "maxPUSCHDuration" restriction is considered. Higher to lower priority logical channels are located from left to right in the figure. Higher priority LCHs are placed first in the MAC PDU, followed by lower priority ones. Also, Priority bit rate (PBR) control the number of bits to be included in the MAC PDU per LCH.

Below, several scenarios that result from intra-UE mixed-services assumption are addressed. In such scenario, we assume that a single UE has to serve both critical and non-critical traffic. The critical traffic may be a-periodic or periodic and require more robust coding with relatively small size grant, compared to the non-critical traffic grant requirement. A requirement of the critical data is that it be scheduled using a periodic, robustly coded configured grant to avoid the latency induced from SR and its response procedure.

We further assume that no perfect knowledge of critical data arrival is present at the scheduler. This means that the critical traffic is a-periodic or not entirely periodic, i.e., the periodic arrival of the traffic may be affected by some jitter, or some periodic transmission opportunities may simply be skipped (due to unavailable data). In such cases, the network/scheduler cannot ideally align scheduling of periodic configured grants to the packet arrival occurrences, which results in the problems described in the next sub-sections.

Furthermore, if short periodicities of the configured grant are required to cater for very low latency-requirements of critical traffic, the short periodicity configured grant will result in imposing scheduling limitations on other non-critical traffic in the UE. Examples of such imposed scheduling limitations are 1) only short dynamic grant duration can be allocated in-between the configured grants, 2) dynamic grant has to be overlapping with the configured grant.

Problem 1: Non-Critical Traffic Sent on Robust Configured Grant

Figure 77:
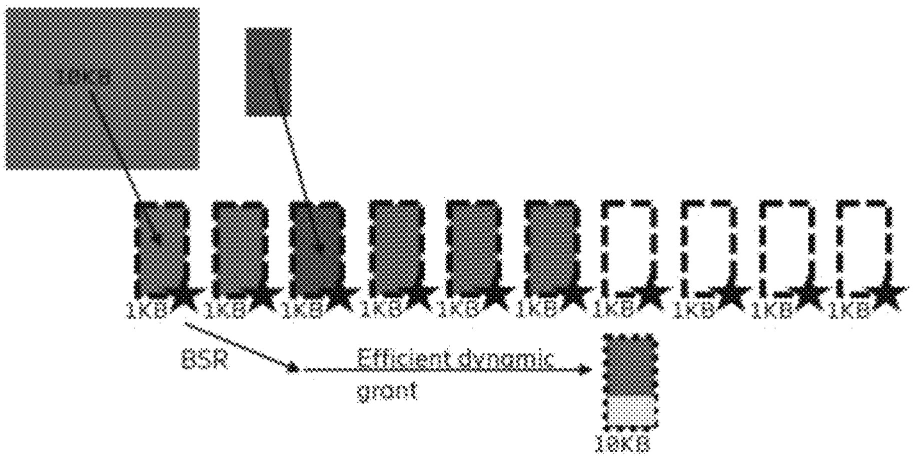
FIG. 77 shows a problem with sending non-critical traffic over a robust grant.

In this sub-section, we address the problem that arises when non-critical traffic is accommodated using a robust configured grant (i.e. intended for critical traffic). We assume the existence of non-critical traffic with sporadic available. Such traffic would be scheduled on robust configured grant resources that needed to be provided for sporadic critical traffic with short periodicity. As illustrated in FIG. 77, if eMBB traffic (labeled 10 KB) is accommodated in such configured grant (1 KB per transmission occasion), the eMBB transmission takes too long (e.g. up to factor 10, or until BSR is received by network) and leads to unnecessary UL interference, which is in particular harmful if the configured grant resources were shared among users.

Figure 78:
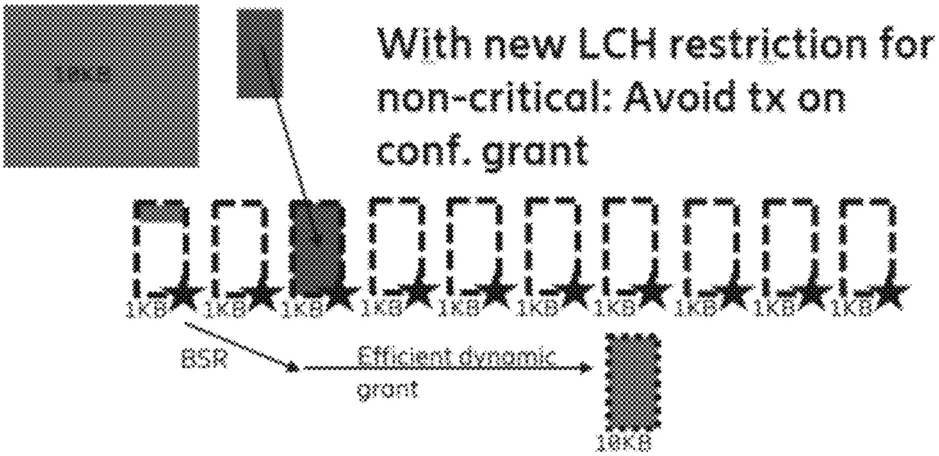
FIG. 78 illustrates a restriction to avoid the problem of FIG. 77.

New LCH restrictions on the logical channel (LCH) holding non-critical traffic, as shown in FIG. 78, can be introduced to mitigate this issue. For example, applying restrictions like "ConfiguredGrantType2Allowed" or "max ReliabilityAllowed" to a LCH supporting critical traffic enable the UE to avoid data from a non-critical LCH being sent using too robust resources.

Problem 2: Critical Traffic on Non-Robust Dynamic Grants

Figure 79:
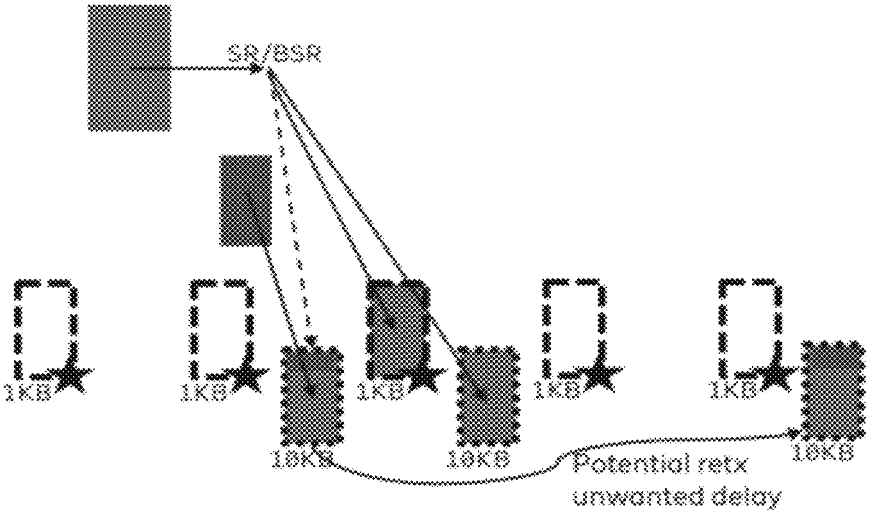
FIG. 79 shows the extra latency arising from sending critical traffic over non-robust short grant.

Another arises when a gNB needs to schedule a spectrally efficient dynamic grant for non-critical traffic in addition to robust configured grants intended for sporadic critical traffic. This is shown in FIG. 79, which shows the extra latency when critical traffic is sent over a non-robust short grant. Assuming the same PUSCH duration of configured and dynamic grant, the existing "maxPUSCHDuration" restriction is not effective/sufficient. The critical traffic will be prioritized to be sent on a non-robust dynamic grant and hence the transmission might fail, leading to retransmission delays.

Figure 80:
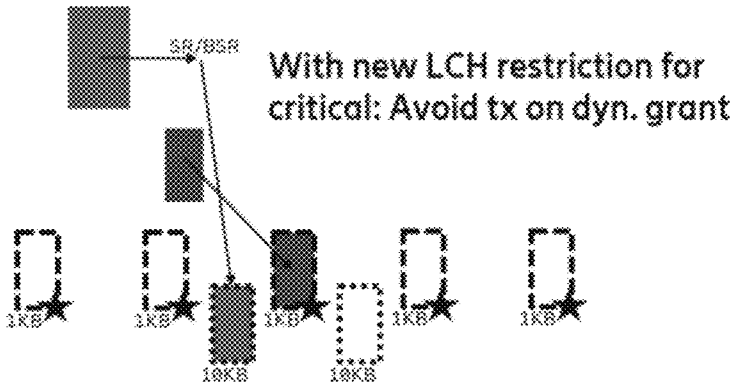
FIG. 80 illustrates a restriction to avoid the problem of FIG. 79.

To overcome such issue, a new LCH restriction, i.e., "DynamicGrantAllowed"* or "minimumReliabilityRequired" can be introduced. Such restriction will block the critical LCH from being sent on non-robust dynamic grant, as illustrated in FIG. 80.

Problem 3: Issues on Dynamic Grant Overriding Configured Grant

Figure 81:
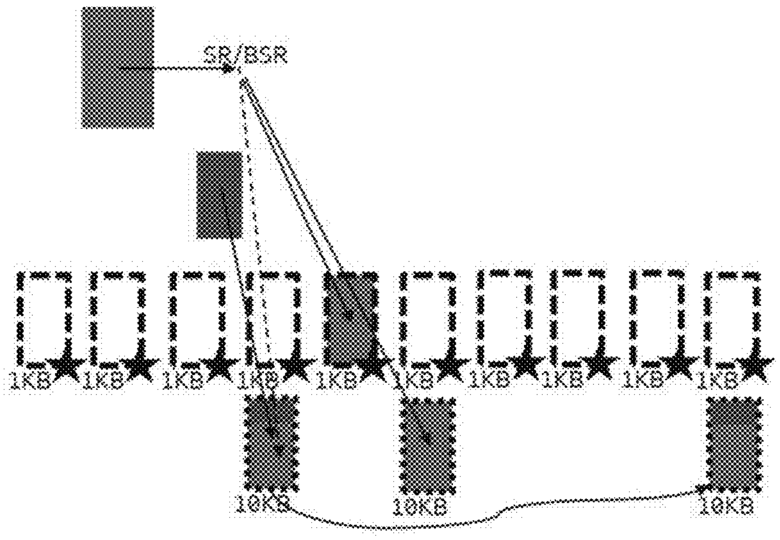
FIG. 81 illustrates a problem with a dynamic grant overriding a configured grant.

According to the current specification a configured grant is always overridden if an overlapping dynamic grant was allocated. In some scenarios a non-robust dynamic grant might overlap with a robust configured grant, as illustrated in FIG. 81. A reason for such scenario is that gNB has to allocate a short periodicity configured grant to accommodate sporadic low-latency critical traffic.

Figure 82:
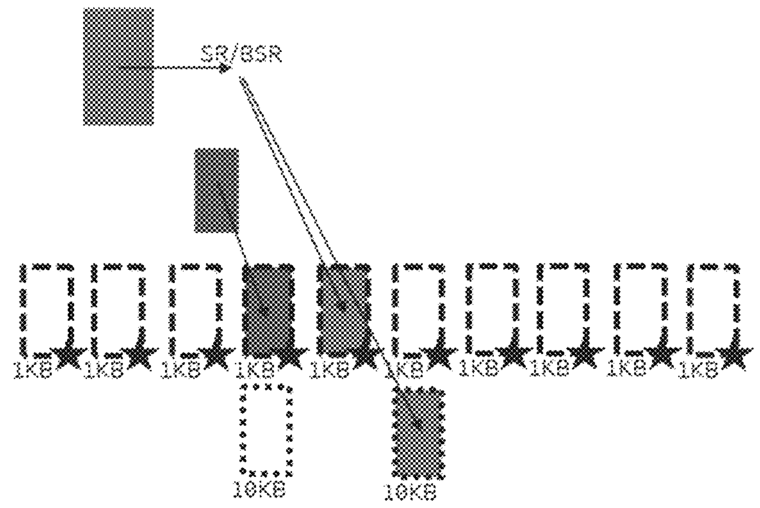
FIG. 82 shows the benefit of enabling configured grant to override dynamic grant conditionally.

To solve this problem, a configured grant may be conditionally prioritized, i.e. if critical data is available for transmission over the robust configured grant when there is an overlapping dynamic grant, then critical data is always prioritized as illustrated in FIG. 82, which shows the benefit of enabling configured grant to override dynamic grant conditionally on arrival of critical data. Otherwise, the dynamic grant may be prioritized. This way, overlapping large spectrally efficient resources can be scheduled for non-critical data without risking that critical data may be transmitted on them. However, to employ this methodology, a gNB needs to decode two potential transmissions: dynamic grant and configured grant. It is noteworthy that this issue could also be solved with the solution of problem 2, i.e. providing the critical traffic LCH with restriction to not transmit on dynamic grant. Without this solution there can be cases where frequent dynamic grants are scheduled and result in unavoidable delays for the critical traffic.

Problem 4: Intra-UE UL Pre-Emption Between Grants of Different PUSCH Durations

Figure 83:
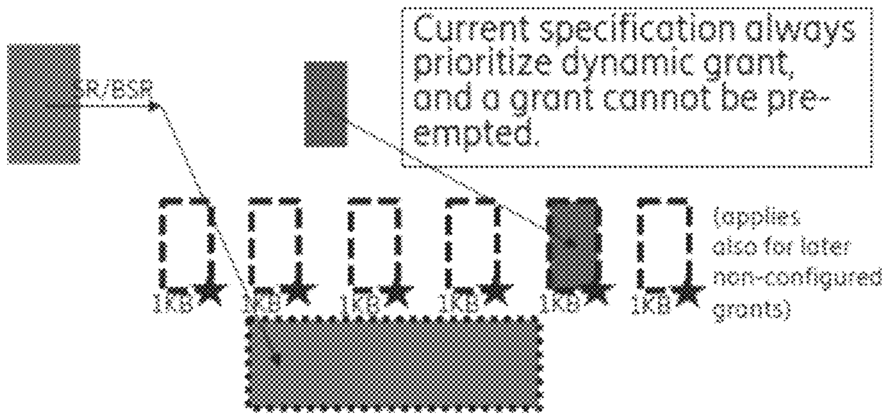
FIG. 83 shows overlapping grant with different PUSCH durations.
Figure 84:
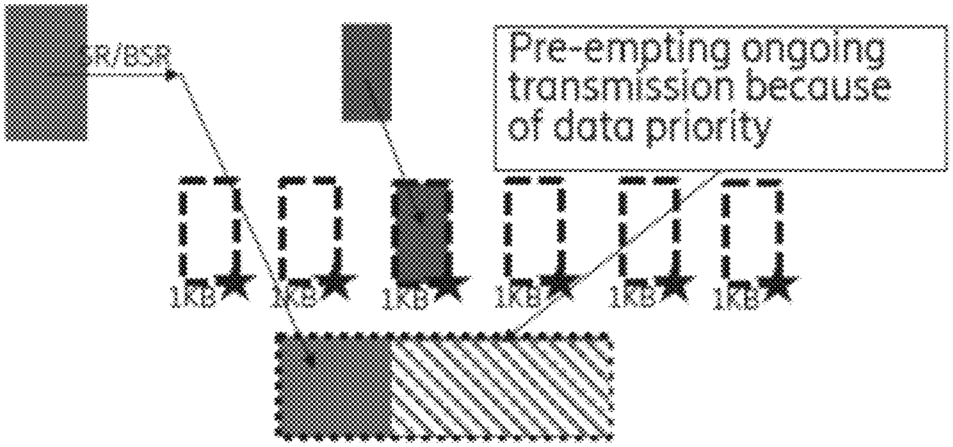
FIG. 84 illustrates the enabling of intra-UE preemption to enhance network efficiency.

In the industrial mixed traffic scenario, in order to enable high spectral efficiency, gNB may want to allocate longer grants to accommodate non-critical traffic. This will increase the delay of sending any sporadic critical data, as illustrated in FIG. 83, which shows an example of overlapping grants with different PUSCH durations, since in Release 15 the current transmission cannot be interrupted by another transmission. To solve this, the physical layer (PHY) should allow stopping an ongoing (long) PUSCH and transmit new (short with higher priority) PUSCH according to overlapping short grant, as illustrated in FIG. 84, which shows how enabling intra-UE pre-emption enhances network efficiency, depending on the scenario.

PDCP duplication is another issue to be discussed. As a method to improve reliability in LTE, NR and EN-DC, multi-connectivity within the RAN is considered. While these features previously focused on improving the user throughput, by aggregating resources of the different carriers, the focus in 3GPP has shifted recently and new features are developed for LTE (and likewise for NR) to improve the transmission reliability.

3GPP introduced carrier aggregation (CA) in Release 10, as a method for the UE to connect via multiple carriers to a single base station. In CA, the aggregation point is the medium access control (MAC) entity, allowing a centralized scheduler to distribute packets and allocate resources e.g. according to the channel knowledge among all carriers, but also requiring a tight integration of the radio protocols involved. With DC or Multi-Connectivity resource aggregation happens at PDCP. This way, two MAC protocols with their separate scheduling entities can be executed in two distinct nodes, without strict requirements on their interconnection while still allowing for realizing increased user throughput.

Figure 85:
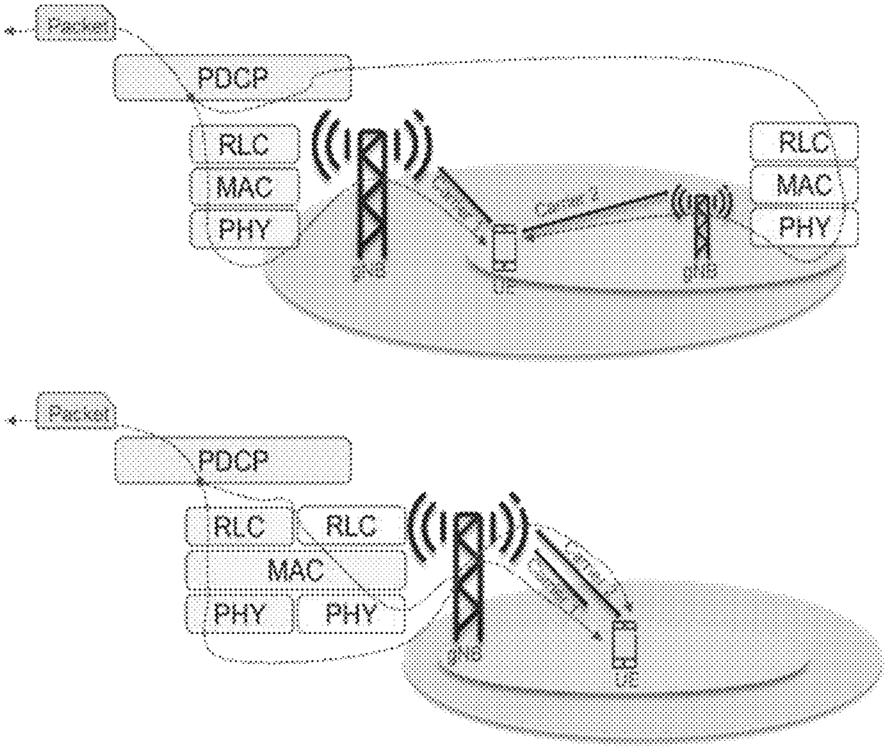
FIG. 85 shows packet duplication in dual-carrier (DC) and carrier aggregation (CA) scenarios.

In 3GPP Release 15 LTE and NR, both architecture concepts of CA and DC are reused to help improve reliability as a complement to the reliability enhancements provided by PHY features. This is achieved by packet duplication, which has been decided to be employed on PDCP layer. An incoming data packet, e.g. of an URLLC service, is thereby duplicated on PDCP and each duplicate undergoes procedures on the lower layer protocols RLC, MAC, PHY, and hence individually benefits from e.g. their retransmission reliability schemes. Eventually the data packet will thus be transmitted via different frequency carriers to the UE, which ensures un-correlated transmission paths due to frequency diversity, and in case of DC transmissions from different sites thereby providing macro diversity. The method is illustrated in FIG. 85 for both CA and DC.

Frequency diversity among carriers goes beyond diversity schemes offered by the physical layer on the same carrier. Compared to time-diversity, e.g. repetition schemes, it has the advantage of mitigating potential time-correlations of the repetitions, which could e.g. occur on a carrier by temporary blocking situations. Furthermore, carrier-diversity allows, as shown in FIG. 85 for DC, the placement of transmission points in different locations, thus further reducing potential correlations of the transmission by the introduced spatial diversity.

Figure 86:
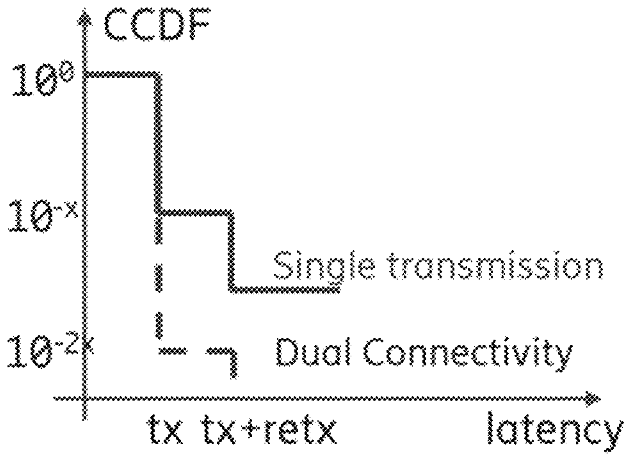
FIG. 86 shows residual errors with and without duplication.

Multi-connectivity with packet duplication on PDCP has the advantage of relying less on utilizing lower layer retransmission schemes (hybrid automated repeat request (HARQ), and RLC-retransmission) to achieve the target reliability metric, and by this lowering the latency to be guaranteed with a certain reliability. For example, let us assume the PHY achieves for each HARQ transmission a residual error probability of 0.1%. In 0.1% of the cases a retransmission is required, increasing the transmission latency by an extra HARQ round trip time (RTT). With packet duplication, the probability that both un-correlated HARQ transmissions fail is 0.1%*0.1%. That means that in 1-10^-6 of the cases the low latency without the extra HARQ RTT is achieved, since simply the first decodable packet duplicate is accepted and delivered, while the second is discarded (at PDCP). An illustration of this relation can be found in FIG. 86, which shows residual errors with and without duplication.

Packet duplication is considered to be applicable to both user plane and control plane, meaning that also RRC messages can be duplicated on PDCP layer. This way, latency/reliability of the RRC message transferal can be improved, which is e.g. important for handover-related signaling to avoid radio link failures.

Furthermore, multi-connectivity has the potential to enable reliable handovers without handover interruptions for user plane data. Thereby, the handover can be done in two steps, i.e. one carrier is moved at a time from source to target node, and hence the UE maintains always at least one connection. During the procedure, packet duplication may be employed, so that packets are available at both nodes for interruption-free transmission to the UE.

To support PDCP duplication in CA, a secondary RLC entity is configured for the (non-split) radio bearer used in support of duplication. See FIG. 85. To ensure the diversity gain, restrictions can be defined for the logical channels associated with these two RLC entities, so that transmission of each RLC entity are only allowed on a configured carrier (primary or secondary cells).

Furthermore, to allow using PDCP duplication as a "scheduling tool" i.e. allowing to activate and deactivate duplication only when necessary, i.e. dynamically be the scheduler, MAC control elements had been specified.

In Release 16, within NR-Industrial IoT, enhancements to PDCP duplication in NR are envisaged, which allow duplication over more than two links, i.e. DC-based and CA-based duplication may be used together, or CA-based duplication with more than two carriers are considered. Furthermore, enhancements regarding the duplication efficiency are investigated: instead of always duplicating, the transmitter may defer from sending the duplicate if the original had been in flight already for a certain time. The reasoning is that a duplicate serves its purpose of increasing the reliability of reaching a latency bound only if both original and duplicate are received within this latency bound. One could envisage also a scenario where duplicates are only transmitted together with a retransmission, i.e., NACK-based. I.e. retransmission reliability is improved, while initial transmission reliability remains the same.

Table 20 illustrates for which bearer options, UP, CP, etc., duplication is supported.

TABLE 20

| Support for Duplication | | | | | | |
|---|---|---|---|---|---|---|
| | MCG SRB | MCG DRB | SCG SRB | SCG DRB | Split SRB | Split DRB |
| | CA duplication | | | | DC duplication | |
| LTE/LTE | Yes | Yes | Yes | Yes | Yes (only with dupl) | Yes (with fallback) |
| NR/NR | Yes | Yes | Yes | Yes | Yes | Yes |
| EN-DC (with NR PDCP) | No (would be LTE CA) | No (would be LTE CA) | Yes | Yes | Yes (not from SN) | Yes |

Reference Time Provisioning

Figure 87:
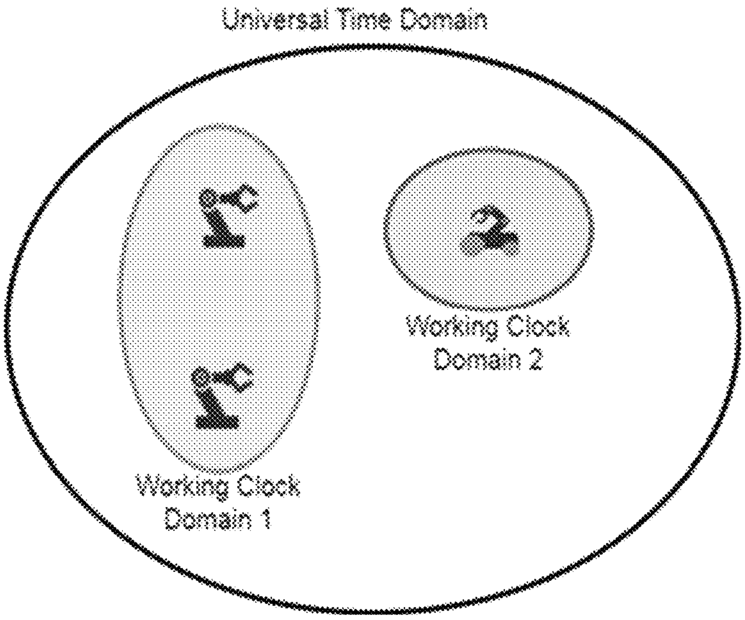
FIG. 87 shows universal time domain and working clock domains.

An NR-Industrial IoT feature of interest is that of providing UE based applications (e.g. residing in Industrial IoT devices connected to a UE via ethernet ports) with clock information derived from source clocks residing in networks external to the 5G network. The external source clocks can be provided in addition to the 5G system clock which is internal to the 5G system. The clocks derived from external sources can be viewed as working clocks corresponding to working domains that reside within the context of a "universal domain" as indicated by FIG. 87.

The "universal domain" is based on the 5G system clock and is used to align operations and events chronologically within a factory (the universal domain). The working clocks are used for supporting local working domains within the universal domain wherein each local working domain consists of a set of machines. Different working domains may have different timescales and synchronization accuracy thereby requiring support for more than one working clock within the universal domain.

Within the scope of Release 15 RAN2 has focused primarily on the method by which a single reference time value can be delivered over the radio interface from a gNB to a UE and has not been concerned about or aware of any use cases wherein multiple reference time vales would need to be conveyed to a UE. The ongoing discussion within SA2/RAN3 regarding the potential need for delivering multiple reference time/working clock values to a UE continues to drive further enhancements in this area.

A 5G system supports an internal 5G clock which can be based on a very accurate and stable clock source (e.g. a GPS time) and distributed throughout the 5G network as needed, including delivery to eNBs and UEs as reference time information. It is also possible for a 5G system to acquire reference time information from an external node (not further considered herein). LTE Release 15 supports a method for delivering a single instance of reference time information (assumed to be available at an eNB) to UEs using both RRC message and SIB based methods as follows and as illustrated in FIG. 88, which shows BS SFN transmissions:

An eNB first acquires a reference time value (e.g. from a GPS receiver internal to the 5G network)

Figure 88:
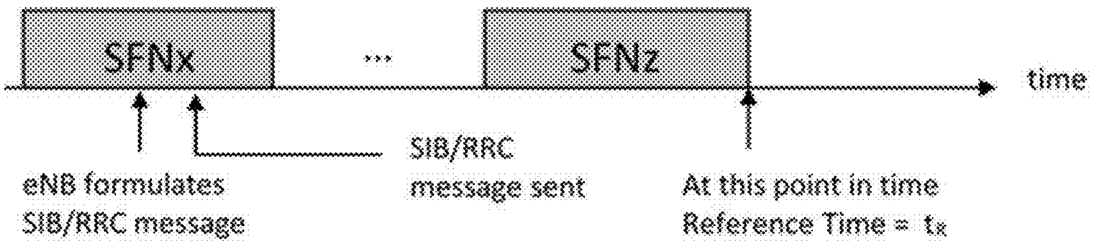
FIG. 88 illustrates SFN transmissions.

The eNB modifies the acquired reference time to the value it is projected to have when a specific reference point in the system frame structure (e.g. at the end of SFNz) occurs at the BS Antenna Reference Point (ARP) (see reference point tR in FIG. 88).

A SIB/RRC message containing the projected reference time value and the corresponding reference point (the value of SFNz) is then transmitted during SFNx and received by a UE in advance of tR.

The SIB/RRC message may indicate an uncertainty value regarding the value of reference time applicable to the reference point tR. The uncertainty value reflects (a) the accuracy with which an eNB implementation can ensure that the reference point tR (the end of SFNz) will actually occur at the ARP at the indicated reference time and (b) the accuracy with which the reference time can be acquired by the eNB.

The uncertainty introduced by (a) is implementation specific but is expected to be negligible and is therefore not further considered.

When a TSN node is the source of reference time information (i.e. the TSN node serves as a GrandMaster node) the use of hardware timestamping at the GrandMaster node and eNB is assumed to be used for (b) in which case a corresponding uncertainty is expected to be introduced when conveying the GrandMaster clock to an eNB.

Figure 89:
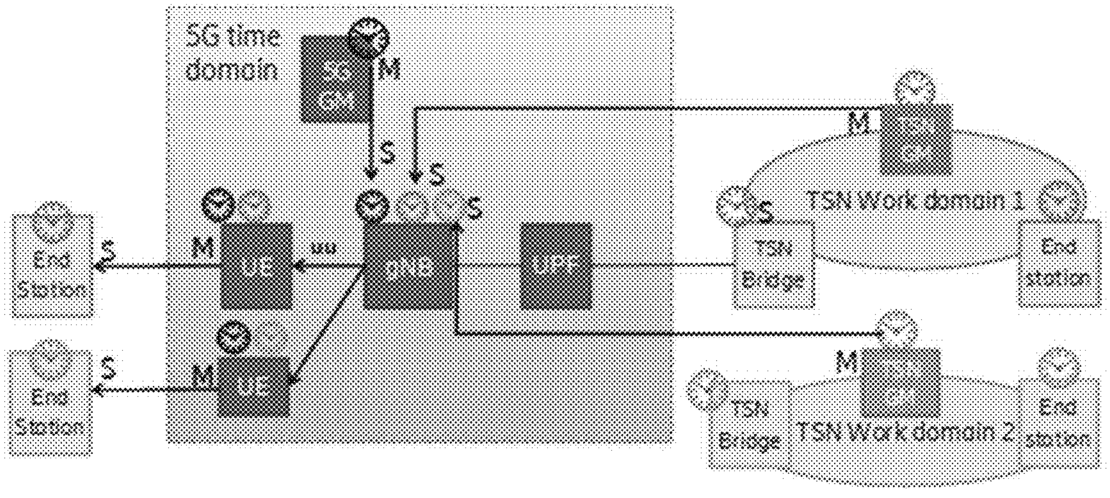
FIG. 89 illustrates an industrial use case with three time domains.

For NR Release 16 a method similar to LTE Release 15, as described above, is expected to be used for sourcing and delivering reference time information from a gNB to one or more UEs. However, NR Release 16 is also expected to introduce support for one or more working clocks (sourced by external nodes in the TSN network) as supplemental clock information (i.e. supplemental to the reference time provided for the universal time domain). FIG. 89 shows an industrial use case with three time domains, where an internal 5G clock serves as the reference time applicable to the universal time domain (in the 5G time domain) as well as two supplemental working clocks applicable to TSN working domain 1 and TSN working domain 2.

The internal 5G clock (shown as a 5G Grand Master) is used for serving radio related functions and is therefore delivered to both the gNB and UE (but not made available to the UPF). Once the gNB acquires the internal 5G clock (implementation specific) it can convey it to the UEs using either broadcasting (e.g. SIB) or RRC unicasting methods. The SFNs sent over the Uu interface will be synchronized to 5G internal clock and in this sense the UE will always be synchronized to the 5G internal clock even if it is not explicitly conveyed to the UEs.

The gNB receives working clock information from different external TSN nodes (i.e. directly from the TSN nodes controlling the TSN work domain clocks), thereby requiring the gNB to support PTP signalling and multiple PTP domains (multiple PTP clock instances) for communicating with TSN network. The gNB then conveys the working clocks (as standalone clocks or as offsets relative to the main internal 5G clock) to the corresponding UEs using one of two methods as follows:

a) Method 1: SFN Based Synchronization
- This method of delivery is supported within the context of FIG. 89 and is the same one used for delivery of the internal 5G clock (black clock) to UEs wherein clock information is synchronized to a specific point in the SFN frame structure.
- The gNB may not need to refresh the working clocks in the UEs every time it receives PTP based signalling providing it with updated values for these working clocks. This is because UEs may be able to manage the drift of these clocks with enhanced accuracy (using the internal 5G clock) compared to the rate of clock drift that may be ongoing at the source TSN Node. The net result is that the radio interface bandwidth consumed for working clock maintenance can be lower as the gNB will not need to send working clock updates to the UEs every time such updates occur within the TSN network.
- In this method the gNB directly adjusts the value of the working clock information it has received according to the location within the SFN structure the working clock is mapped and then sends the adjusted value within a SIB16 or RRC message.

b) Method 2: Timestamping
- In this method (also supported within the context of FIG. 80) the gNB supports a boundary clock function per 802.1AS and therefore obtains a working clock from the TSN network (using PTP sync message exchange) whenever the working clock source node decides to send it.
- The gNB then relays the PTP message containing working clock information (or a subset of the information therein) to the UEs as higher layer payload.
- The relayed PTP message also includes a time stamp providing the value of the internal 5G clock at the point where the PTP message was received by the gNB.
- Upon receiving the relayed PTP message the UE adjusts the value of the working clock contained therein according to the difference between the current value of the internal 5G clock and the time stamped value also included in the relayed PTP message, thereby obtaining the current value of the working clock.
- As per method 1, the gNB may not need to relay the PTP message containing the working clock to the UEs every time it receives it from the TSN network (because UEs may be able to manage the drift of these clocks with enhanced accuracy).
- In this method the gNB does not adjust the value of the working clock information it has received but supplements it with time stamp information inserted directly into the same PTP message used for sending working clock information. It can then send the modified PTP message within a SIB or RRC message or, to reduce the payload size in the interest of bandwidth efficiency, the gNB can instead only map the unmodified working clock information and the corresponding time stamp into a SIB16 or RRC message.

For methods 1 and 2 above, the frequency with which a UE distributes working clocks to End Stations can be seen as implementation specific. When performed it makes use of PTP sync message exchange as performed in the TSN network. In other words, the UE acts as master clock to the TSN end stations using the (g)PTP protocol and decides when working clock values need to be refreshed in the End Stations. The UE forwards all working clocks it receives to all end stations it manages (i.e., the end stations determine which working clocks they are interested in).

Figure 90:
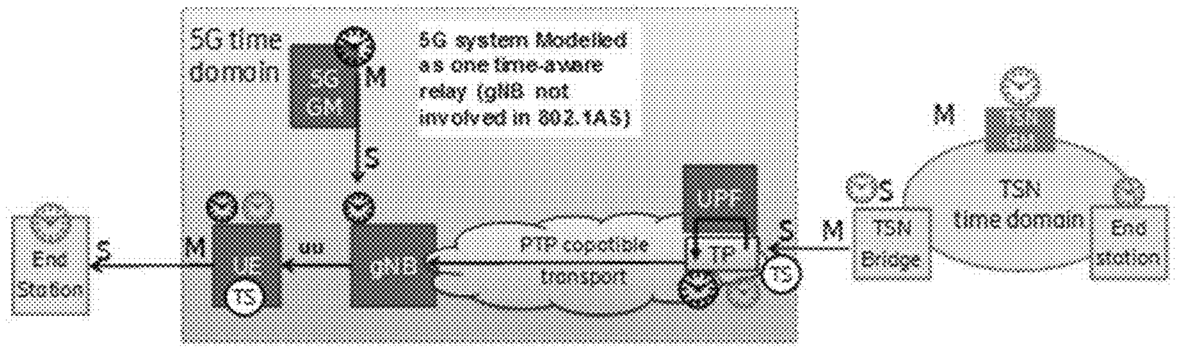
FIG. 90 shows a continuous PTP chain method.

For NR Release, a UPF Continuous PTP Chain Method may be used. For this method, which is illustrated in FIG. 90, the TSN network interfaces with the UPF for the purpose of delivering working clock information wherein the UPF to UE path emulates a PTP link so that there is a virtual continuous PTP chain between the TSN Working domains on the right of the 5G network and the End Stations on the left of the 5G network (i.e. PTP sync message exchange is performed between the UE and the TSN Node supporting the working clock).

The UPF transparently relays the working clocks (e.g. green clock on the right hand side of FIG. 90) to each UE wherein the UPF time stamps these working clocks with the value of the internal 5G clock applicable to the point where the PTP message is relayed.
- The 5G network will need some awareness of when it is relaying PTP messages containing working clock information since it will need to provide supplemental time stamp information to these PTP messages.
- The transport layer PDUs used to relay PTP messages from the UPF to a gNB can potentially be enhanced to support an indication of when PTP messages comprise the upper layer payload carried by these PDUs. This opens up the possibility of a gNB using SIB based transmission of the PTP message payload in the interest of radio interface bandwidth efficiency (i.e. in addition to using a RRC based option for delivering PTP messages).
- Upon receiving the relayed PTP message the UE adjusts the value of the working clock contained therein according to the difference between the current value of the internal 5G clock and the time stamped value included in the relayed PTP message, thereby obtaining the current value of the working clock.
- The UE acts as a master clock to the TSN end stations using the (g)PTP protocol and decides when working clock values need to be refreshed in the End Stations. The UE forwards all working clocks it receives to all end stations it manages (i.e. the end stations determine which working clocks they are interested in).
- This method does not require the use of equalized uplink and downlink delays which is an advantage (since symmetrical uplink and downlink delays impose additional complexity).
- However, one potential disadvantage is that the frequency with which the working clocks are refreshed by their corresponding source node within the TSN network will determine how often they are relayed through the 5G network to the UEs (e.g. this could have a significant impact on the radio interface bandwidth if each UE is individually sent user plane payload containing clock refresh information whenever any working clock is refreshed in the TSN network).

Ethernet Header Compression

For traditional IP transport over 3GPP systems header compression has been specified, i.e. robust header compression (RoHC) to reduce the volume of data sent over the radio interface, thereby RoHC is applied to the UDP/TCP/IP layers, and RoHC compression/decompression is performed by PDCP layer at UE and gNB.

In the TSN, where Ethernet transport is envisaged, header compression could potentially also be applied. This would be the case for the Ethernet PDU session type, where Ethernet frames should be conveyed between gNB and UE.

Generally, given that robust transmissions with a very low residual error rate are required for URLLC, used code rates are naturally very low, meaning that URLLC transport is resource-costly over the radio interface. Therefore, removal of unnecessary redundancy such as potentially Ethernet headers, is important to be studied as part of the Release 16 NR-Industrial IoT 3GPP study. In the following, an analysis of the Ethernet/TSN header structure and gains from compressing them is done.

Forwarding in Layer 2 (L2) networks is usually based on information available in L2 frame headers. Each Ethernet frame starts with an Ethernet header, which contains destination and source MAC addresses as its first two fields. Further header fields of an Ethernet frame are constructed quite simply using tagging. Some of the header fields are mandatory some are optional, and they depend on network scenario.

Figure 91:
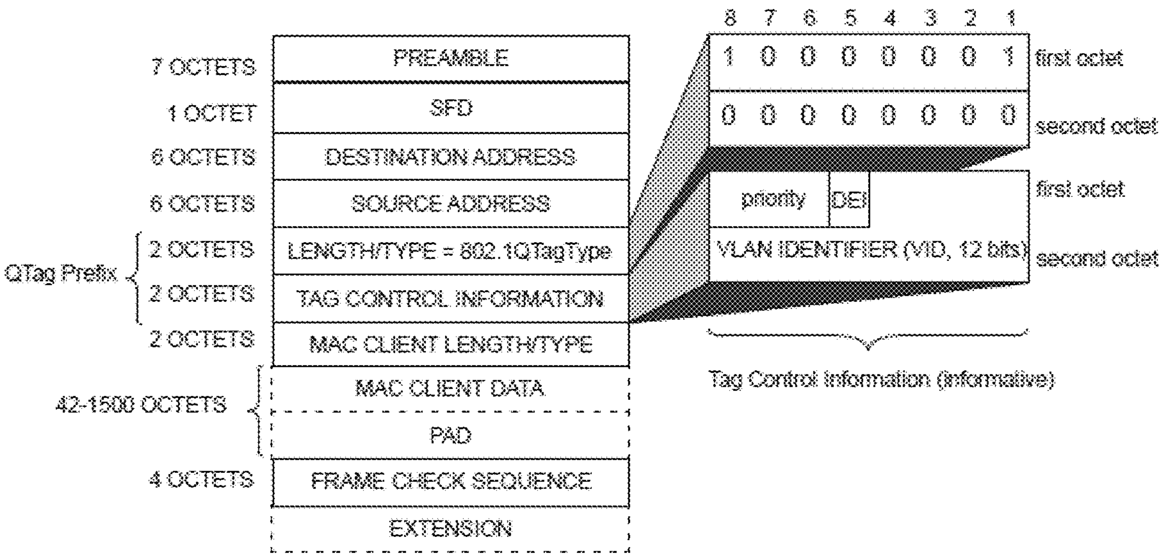
FIG. 91 shows an example of the IEEE 802.3 MAC frame format.

There are multiple formats of Ethernet frames (e.g., 802.3, 802.2 LLC, 802.2 SNAP). They are identified based on the value of the EtherType vs. Length field. FIG. 91 shows an example of the frame format.

Regarding Ethernet frame transmission over 3GPP networks, some parts of the Ethernet frame do not need transmission (e.g., Preamble, SFD (Start of Frame Delimiter), FCS (Frame Check Sum), see also existing specification for PDU session type, TS 23.501). Fields of the Ethernet header can be compressed but the gain achieved by compression are dependent on the network scenario. The Ethernet link can be either an access link or a trunk link. For a trunk link, the number of sessions is significantly larger and can be affected by Ethernet topology change that results in temporary flooding. On the other hand, an access link is more stable from L2 session perspective. Ethernet header compression must be L2 link specific, i.e., covering a single L2 hop (a.k.a. link-by-link basis), as illustrated above.

We consider the following fields for Ethernet header compression: MAC source and destination address (6 bytes each), tag control information (6 bytes), holding information such as VLAN-tag and Ethertype. Ethernet frame transmission over 3GPP networks does not need forwarding of some parts of the Ethernet frame (i.e., Preamble, SFD, FCS). So, in total 18 bytes can be compressed.

Figures 92, 93:
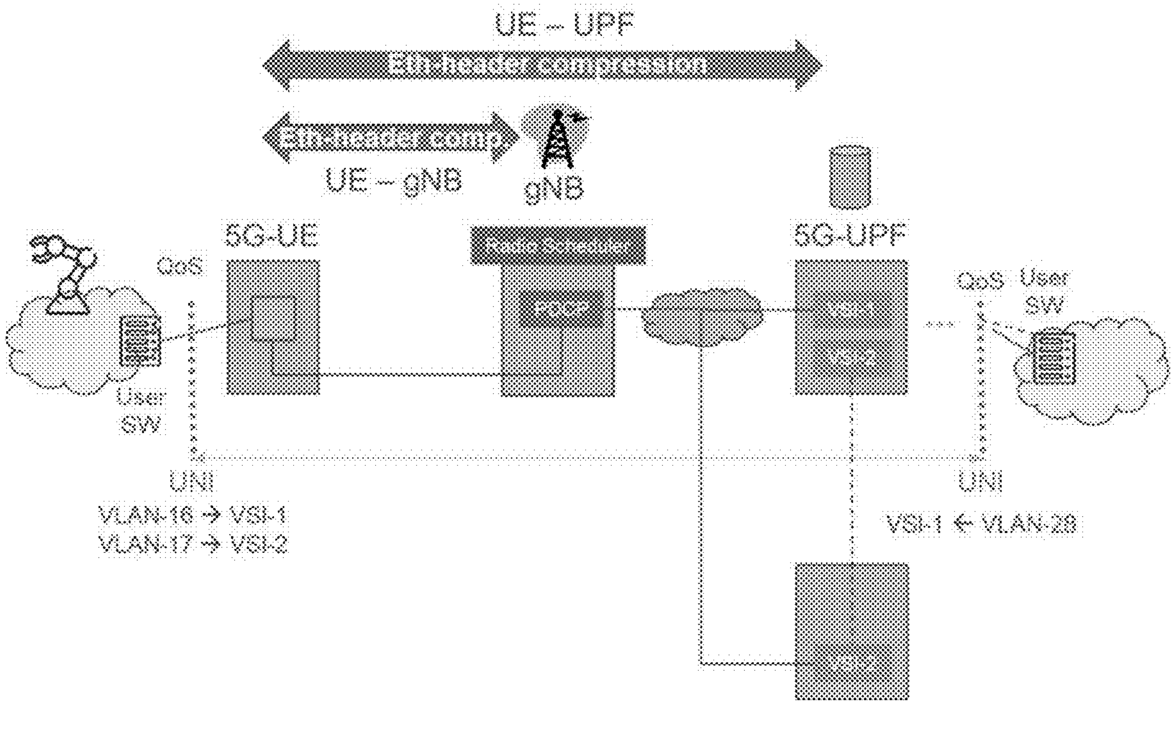
FIG. 92 shows gains from Ethernet header compression.
FIG. 93 shows possible Ethernet header compression anchor points.

Assuming the 5G system is used as an Ethernet access link, only a limited number of L2 sessions would exist, and compression down to 3-5 bytes (conservative assumption) is possible, which leads to significant gains for small packet sizes (as typical in URLLC) as shown in FIG. 92.

Regarding how and where header compression for Ethernet can be supported, the following questions may be raised.

- Which protocol and standardization body: In 3GPP, RoHC as defined by IETF is used for IP header compression. There is no profile considering Ethernet. Furthermore, the standardization group dissolved. Static Context Header Compression (SCHC), also IETF is still active and considers Ethernet header compression, for the use case of low-power WAN. Also a 3GPP-based solution can be thought of.
- Anchor point: Current RoHC network anchor point is the gNB with PDCP. Another possibility would be the UPF, where the Ethernet PDU session is setup. FIG. 93 illustrates possible Ethernet header compression anchor points.
- With and without IP: Whether Ethernet header compression should be considered integrated or separate with IP header compression.

Reliable Control Plane

In this section, methods for reliable control plane provisioning i.e. for robustly maintaining the radio resource control (RRC) connection between UE and gNB, are described.

First of all, control plane, i.e. RRC signalling (SRB) transmission is handled the radio protocols as user plane data transmission, i.e. RRC signalling robustness can be established with the same features as describe for Layer 1 and Layer 2 above. Furthermore, also PDCP duplication, in the case of the split bearer in DC, as well as for CA, is also applicable to RRC signalling (SRB).

As we will see in the following, beside SRB signalling robustness, also resilience against node failures and handling of radio link failure (RRC) can be addressed: In case of a failure of the network node terminating RRC, the UE would lose its connection. Furthermore, in current Release 15 LTE and NR the radio link failure handling is not symmetrically handled, i.e. in case of failure related to the primary cell, radio link failure (RLF) is triggered, leading to a connection interruption, where the UE disconnects and searches for a new node to connect to. In case of failure related to the primary cell of the secondary cell group (SCG), however, only a failure indication is sent to RRC, while the connection continues. A similar procedure is also implemented for a secondary cell failure in case of CA duplication.

Figure 94:
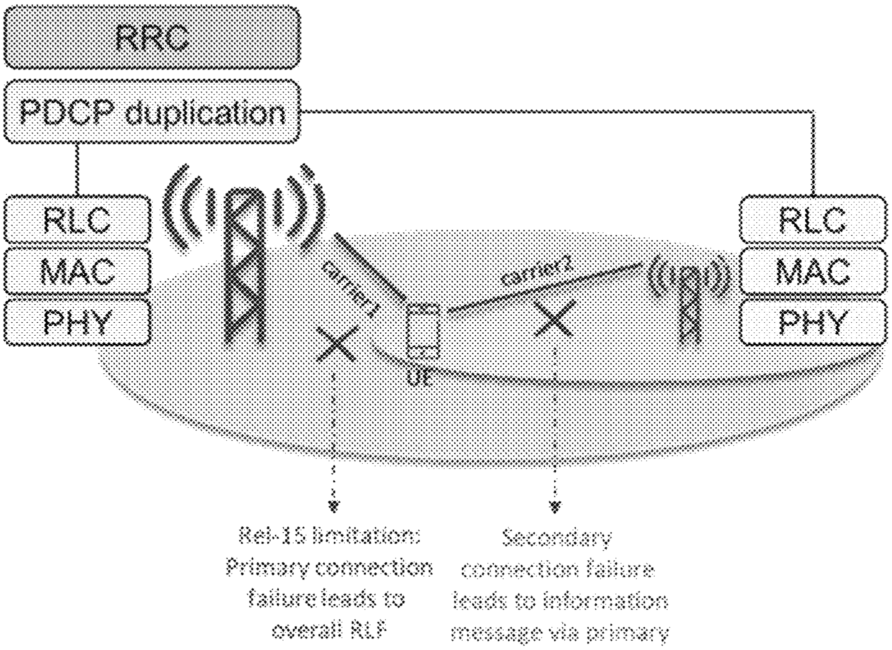
FIG. 94 shows radio link failure (RLF) in the case of PDCP duplication.

There are two failure cases that can be handled with RRC diversity today (Release 15). Specifically, for a DC architecture with PDCP duplication, both in case of secondary radio link failure, as well as in case of entire SgNB outage, the connectivity with the UE can be maintained. In case of primary cell failure or MgNB failure, this would however not be the case. These failure cases in Release 15 are illustrated in FIG. 94.

To enable "True RRC diversity", therefore, further enhancements need to be considered, i.e. either a fast/proactive handover or failover of the RRC context to another node, in case of node failure, and generally symmetrical handling of radio link failures independent of in which cell the failure happened. This symmetrical handling of RLF is considered within NR WI DC in Release 16. The approach contemplated here is that instead of triggering a failure and UE interrupting data and control signaling when a failure associated with a primary cell occurs, the UE informs the network via a secondary cell, and continues its communication of data and control via this secondary cell, until reconfigured by the network.

An alternative, however costly, method would be an approach where multiple companion UEs are used for the same industrial device. Duplication and duplicate elimination would in this case happen on higher layers of the UEs. On the network side, the UEs would (as a configuration option) be connected to different eNBs/gNBs so that in case of link failure, UE failure or also node failure, the connection could be maintained via the independent companion UE.

Handover and Mobility Enhancements

Figure 95:
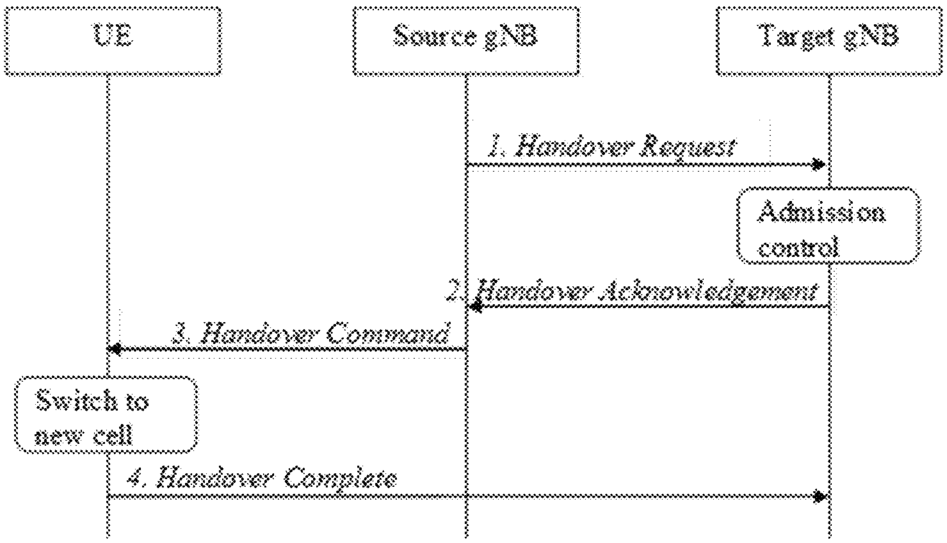
FIG. 95 illustrates an example mobility procedure.

For a UE in RRC-connected mode, the NR mobility mechanisms in Release 15 follow its LTE baseline, which is illustrated in FIG. 95. The Source gNB decides (e.g. based on UE measurement reports) to handover the UE to the Target gNB. If the Target gNB admits the UE, a handover acknowledgement indication is sent to the Source gNB, which thereupon sends the handover command to the UE. The UE then switches to the new cell, indicated in the handover command and sends a handover complete indication to the Target gNB. During the switch, the UE resets MAC, re-establishes RLC and if needed re-establishes PDCP and changes security keys. The involved RACH procedure can be configured to be contention free, i.e. the RACH pre-amble to be used provided to the UE during the procedure.

For the handover to be interruption-free, i.e., in order to achieve 0 ms handover interruption time, the switching time by the UE must be minimized. For this, in LTE Release 15 (not NR), it was agreed that a dual Tx-Rx UE shall be capable of performing an enhanced make-before-break solution to ensure 0 ms handover interruption time. In this solution the UE maintains the connection to the source gNB until the UE starts to transmit/receive data from the target eNB. The details of how the dual protocol stacks are handled at the UE were left to UE implementation.

For Release 16, both in LTE and NR, some further mobility enhancements are envisaged. For reducing the handover interruption time in NR, there are several solutions under discussion for dual Tx-Rx UEs. One of which is the LTE-like enhanced make-before-break approach (described above). Other approaches, relying on the DC architecture consider a role switch operation between MN and SN and thus enabling 0 ms 'handover', i.e. maintaining always a connection to one of the nodes while undergoing handover. For scenarios where UEs do not have dual Tx-Rx functionalities, other approaches are envisaged such as improved i.e. faster RACH-less handover based on an improved TA calculation approach, or also faster fall-back possibilities to the source node. To improve the general handover robustness (applicable to various scenarios from URLLC or aerials domain), a solution is foreseen based on a conditional handover command (performing handover execution when a certain network configured condition is met) which reduces the handover failure/ping-pong possibility traded for higher network resource usage overhead.

One way to provide mobility without increasing latency due to handover and without requiring any capability enhancements at the UE is to deploy so-called combined cells. Combined cell is a feature that is commercially available in Ericsson's LTE networks. In a combined cell, multiple remote radios are connected to the same baseband digital unit, and serve the same cell. It allows multiple sector carriers to belong to the same cell. Combined cell can be used to extend the coverage of a cell, and provides the following additional advantages:

- Reduces or eliminates coverage holes, by enabling overlapping coverage areas from different antenna sites.
- Increases received signal strength at UE.
- Provides uplink macro-diversity.
- Eliminates the need for inter-cell handover within the combined cell.

URLLC benefits from all of the advantages listed above. Shadowing can be a problem in factory floors, due e.g. to the presence of large metal surfaces. Combined cell can help decrease or eliminate this problem, by careful selection of the antenna sites. Increasing the signal strength at the UE is clearly beneficial for increased reliability, as is macro diversity. Avoiding or reducing the need of handovers, is also greatly beneficial for moving UEs, as handovers typically result in significant latency increase. Furthermore, combined cell provides seamless coverage in transition areas between indoor-outdoor, or indoor-indoor (e.g. multi-story halls), which would otherwise require (more) handovers. It provides a robust mechanism to grow the coverage area of the network, desirable e.g. when the factory floor is expanded.

Finally, combined cell can be used together with carrier aggregation, which provides its own benefits.

URLLC feature introduction in 3GPP Release 15 and 16 is summarized in Table 21 Table. The shading indicates features that are needed for supporting industrial IoT use cases that have stringent URLLC requirements, and the ones without shading are considered as features for efficiency optimization or scheduling flexibility.

Release 15 establishes core URLLC features enabling LTE FDD and NR, both FDD and TDD, to fulfill the IMT-2020 URLLC requirements of 99.999% reliability with 1 ms latency. For LTE, essential features for industrial IoT consist of short TTI, automatic repetitions without HARQ feedback, UL semi-persistent scheduling (SPS), reliable PDCCH, RRC diversity for achieving control-plane reliability, as well as high-precision time synchronization for allowing isochronous operation between multiple devices in the network. Although LTE FDD achieves the IMT-2020 URLLC requirements, LTE TDD however does not due to the limitation of TDD configuration. The lowest one-way user-plane latency for data transmission is limited to 4 ms in LTE TDD.

Release 15 NR meets IMT-2020 URLLC requirements with higher efficiency than LTE. One key enhancement is the scalable OFDM numerology used in NR, which combined with short TTI substantially shortens the transmission time. Another key enhancement in NR is dynamic TDD and faster DL and UL switching. NR TDD can achieve one-way user-plane latency as short as 0.51 ms.

The evolution of industrial IoT support continues in NR Release 16. One major enhancement is TSN integration, which enables NR to work with established industrial Ethernet protocols. NR Release 16 will also introduce URLLC enhancements to enable NR to meet even more stringent requirements, e.g. 99.9999% reliability with 0.5 ms latency.

TABLE 21

URLLC feature introduction in 3GPP Release 15 and 16.

| Features | Release 15 LTE | Release 15 NR | Release 16 NR (concept) |
|---|---|---|---|
| Scalable OFDM numerology | Only 15 kHz SCS 14 OS = 1 ms | SCS = {15, 30, 60, 120, 240} kHz 14 OS = {1, 0.5, 0.25, 0.125, 0.0625} ms | Same as Release 15 |
| Short TTI | Short TTI = {2, 3, 7} OS | DL Short TTI = {2, 4, 7} OS UL Short TTI = {1, 2, 3, . . . , 13} | Consider improvements such as mini-slot repetitions, DMRS overhead reduction |

TABLE 21-continued

URLLC feature introduction in 3GPP Release 15 and 16.

| Features | Release 15 LTE | Release 15 NR | Release 16 NR (concept) |
|---|---|---|---|
| Low-latency optimized dynamic TDD | Not included | Included | Same as Release 15 |
| Automatic repetition | Up to 6 repetitions | K repetitions (without slot-boundary crossing) | Propose K repetitions allowing slot-boundary crossing |
| UL configured grant | Included (UL SPS) | Included | Propose enhanced scheduling flexibility |
| Robust MCS table & CQI for low BLER reporting | Not included | Included | Same as Release 15 |
| Reliable PDCCH | AL 8; SPDCCH repetitions included | Beamforming, AL 16, 24-bit CRC; frequency diversity | Release 15 + small enhancement (new DCI format proposed) |
| Number of PDCCH blind decodes | 44 for 1 ms TTI 68 for 0.5 ms TTI 80 for {2 or 3} OS | {44, 36, 22, 20} for {15, 30, 60, 120} kHz SCS per slot | Propose {44, 36, 22, 20} for {15, 30, 60, 120} kHz SCS per half-slot |
| Number of PDCCH CCE | | {56, 56, 48, 32} for {15, 30, 60, 120} kHz SCS per slot | Propose {56, 56, 48, 32} for {15, 30, 60, 120} kHz SCS per half-slot |
| Short PUCCH | Included | Included | Same as Release 15 |
| Faster UE processing capability | Not included | Included (UE Capability 2) | Propose UE capability 3 |
| Scheduling flexibility | | across slot not borders allowed | Propose across slot borders allowed |
| Multiplexing (LCH) restrictions | E.g. link LCH to cell or to PUSCH duration | E.g. link LCH to cell or to PUSCH duration | Planned further restrictions regarding dynamic and configured grant; possibly reliability |
| SR and BSR for URLLC | Not included | Multiple SR configurations | Planned certain minor enhancements |
| PDCP duplication | Both DC and CA | Both DC and CA | Efficiency enhancements; Extension towards more than 2 copies. |
| Control plane reliability | RRC diversity | RRC diversity | Symmetrical RLF handling. |
| DL preemption | Not included | Included | Same as Release 15 |
| UL intra-UE multiplexing | Not included | Not included | Planned |
| UE inter-UE preemption | Not included | Not included | Planned |
| Ethernet transport & header compression | Not included | Ethernet PDU session for transport | Header compression |
| High-precision time synchronization | Time reference with 0.25 μs granularity | Not included | Planned time reference with 0.25 μs granularity and multi-time domain support. |
| Mobility make-before-break handover, dual Tx/Rx UE | Included | Not included | Proposed |
| Mobility conditional handover | Not included | Not included | Proposed |

In summary, NR has been designed with clear objectives of achieving low latency and ensuring high reliability from the outset. An array of layer-1 and layer-2 features in Release 15 enables URLLC:

Scalable numerology and short TTI. With scalable numerology, OFDM symbol and slot duration can be reduced by employing a larger subcarrier spacing. The transmission time interval can be further reduced by using mini-slot scheduling, which allows a packet to be transmitted in a time unit as small as 2 OFDM symbols.

Scheduling design. NR supports frequent PDCCH monitoring, which increases scheduling opportunities for both DL and UL data. This helps reduce latency. For the UL, configured grant can be used to eliminate the delay incurred by UE having to first send a scheduling request and waiting for an uplink grant. In a mixed traffic scenario, NR allows URLLC traffic to be prioritized; and in events when the scheduler does not have sufficient radio resources to serve a URLLC UE, NR has a mechanism to pre-empt already allocated eMBB type resources for the use of serving DL URLLC traffic.

Fast HARQ. A DL data transmission is completed by a HARQ acknowledgement, and thus a fast HARQ turn-around time is needed for achieving low latency. In NR, this is facilitated by defining a more stringent UE receiver processing time requirement (i.e. UE capability 2) and also making it possible for the UE to complete HARQ transmission in a short time interval through the use of short PUCCH. Not only does fast HARQ turn-around time contribute to low latency, it can also be used to improve the reliability or spectral efficiency of data transmissions by allowing more HARQ retransmissions within a given latency budget. Furthermore, HARQ-less repetition (sender transmits K repetitions before expecting HARQ feedback) is also adopted in NR to improve reliability without delays introduced by HARQ turn-around time.

- Low-latency optimized dynamic TDD. NR supports very flexible TDD configuration allowing DL and UL assignment switching at a symbol level.
- Robust MCS. Reliability is enhanced by including lower MCS and CQI options for lower BLER targets.

In addition, RAN architecture options are available to enhance reliability beyond the beforementioned features, i.e. by duplicating data through multiple gNBs and/or through multiple carriers.

Release 15 NR thus lays a solid foundation for supporting URLLC services. It has been also verified in the work of 3GPP IMT-2020 self-evaluation that Release 15 NR fully fulfils the IMT-2020 URLLC requirements, 99.999% reliability with 1 ms latency.

Building on the solid URLLC foundation in Release 15, Industrial IoT is in focus now in Release 16. The prioritized use cases include factory automation, electrical power distribution, and transport. Although the requirements of these prioritized use cases vary, the most demanding use cases call for 99.9999% reliability with latency as small as 0.5 ms. Furthermore, a key aspect of NR Industrial IoT is to enable NR to work with established industrial Ethernet protocols. As TSN emerges as the foundation of the industrial Ethernet protocols, a flagship Release 16 feature is "NR and TSN integration".

- NR in Release 16 will support accurate time reference provisioning to the UE, in order to synchronize TSN devices on the UE side wirelessly with the TSN working time domain on the network side.
- Configured grant scheduling and UE multiplexing and pre-emption are proposed to be enhanced to more efficiently cope with the mixed TSN traffic scenario.
- PDCP duplication is designed to handle reliability provisioning more efficiently.
- Ethernet header compression is being studied for overhead reduction in RAN.
- Layer-1 URLLC enhancements are also being considered in Release 16 to further reduce latency, improve reliability and spectral efficiency, and improve handling of multiplexing uplink control and data from different services types (e.g. control for URLLC multiplexed with data from eMBB, or vice versa).

With TSN integration and further URLLC enhancements, NR Release 16 will make great strides toward enabling smart wireless manufacturing and ushering in a new era in industry digitalization and transformation.

Industrial Communication Technologies and Protocols Alongside TSN and 5G

It is a widely accepted thinking that TSN and 5G will be the fundamental connectivity technologies for future factories and other industrial use cases. Nevertheless, most industrial players do not start their industrial IoT story from scratch in a greenfield deployment. Rather, many industrial processes already involve connected devices using their own industry defined connectivity mechanisms. These deployments are commonly referred to as brownfield. While most brownfield deployments (94%) are wired, also many wireless solutions exist, especially for data collection. Industry is conservative and already made investments are guarded. Thus, many times a new technology needs to be introduced as a complementary solution to the already existing infrastructure at the industrial site unless significant added value can be shown.

Figure 96:
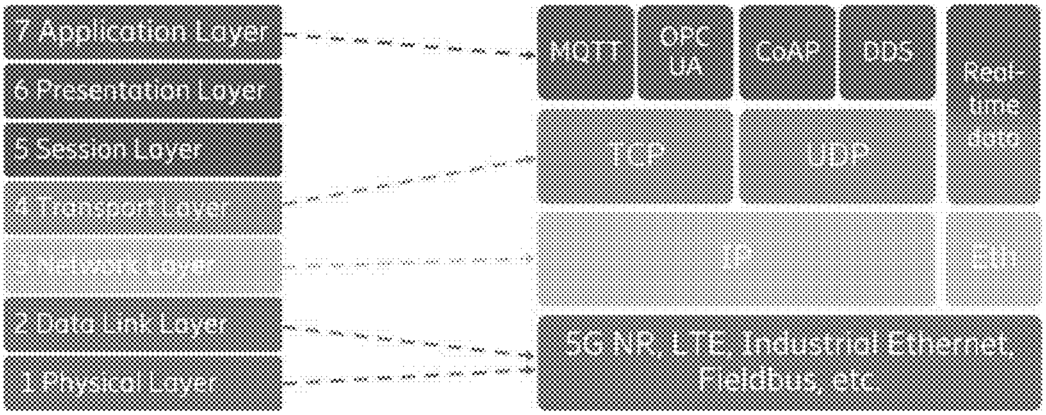
FIG. 96 shows possible realizations of the Industrial IoT protocol stack mapped to the OSI model.

The protocol stack for industrial IoT can look very different depending on choices on different protocol layers. FIG. 96 depicts some possible protocol alternatives on the different layers mapped to the Open Systems Interconnect (OSI) protocol stack layers.

To get a complete picture, this chapter introduces both wired and wireless communication technologies that are used today. Regarding the use of 4G and 5G for brownfield deployments, two aspects are important and covered:

- Interworking with legacy wired technologies (like e.g. Profinet)
- Competing with other wireless technologies (like any IEEE 802.11 technology)

Furthermore, OPC-UA and SECS/GEM are introduced as two communication protocols being used in factory automation today and assumed to play a major role in the future.

With regards to the physical and medium access layers, many wired communication technologies dedicated to industrial usage have been developed in the past. Initially so-called Fieldbus technologies have been used as e.g. standardized in IEC 61158. Nowadays a shift towards industrial Ethernet solutions has happened and Profinet is one example of such. A main trait of these technologies is that they are designed to deliver data under tight time constraints, 1 ms or less. A disadvantage of Fieldbuses and some industrial Ethernet variants is a general incompatibility with each other and the need for special hardware to run these technologies beyond standard office-Ethernet equipment. Time-sensitive networking (TSN) is a set of IEEE standards, which add reliability and deterministic low latency capabilities on top of standardized Ethernet (IEEE 802.3). It is the ambition to establish a common standard into the splintered wired communication technology market for industries. A lot of industrial equipment vendors right now have started or at least indicated to move to TSN for their portfolio.

Industrial Ethernet has become quite popular and gains market share over legacy fieldbus technologies as Ethernet has also become a major communication standard in other domains. One reason might be the cheap and common parts and cables etc. It was already mentioned that different industrial Ethernet technologies are incompatible and don't allow an interworking without the use of special gateways or similar additional equipment. This is because they use different concepts to satisfy the requirements for industrial use cases. Nevertheless, there are some common facts for industrial Ethernet:

- Industrial Ethernet is almost always 'switched Ethernet' 100 Mbit/s and full-duplex links
- Different topologies possible (line, star, ring etc.) but might be strictly defined by the technology
- Redundancy methods (e.g. Parallel Redundancy Protocol (PRP))
- Master/controller-slave architecture
- Functions to detect communication errors (like timers and counters for packet losses)

Figure 97:
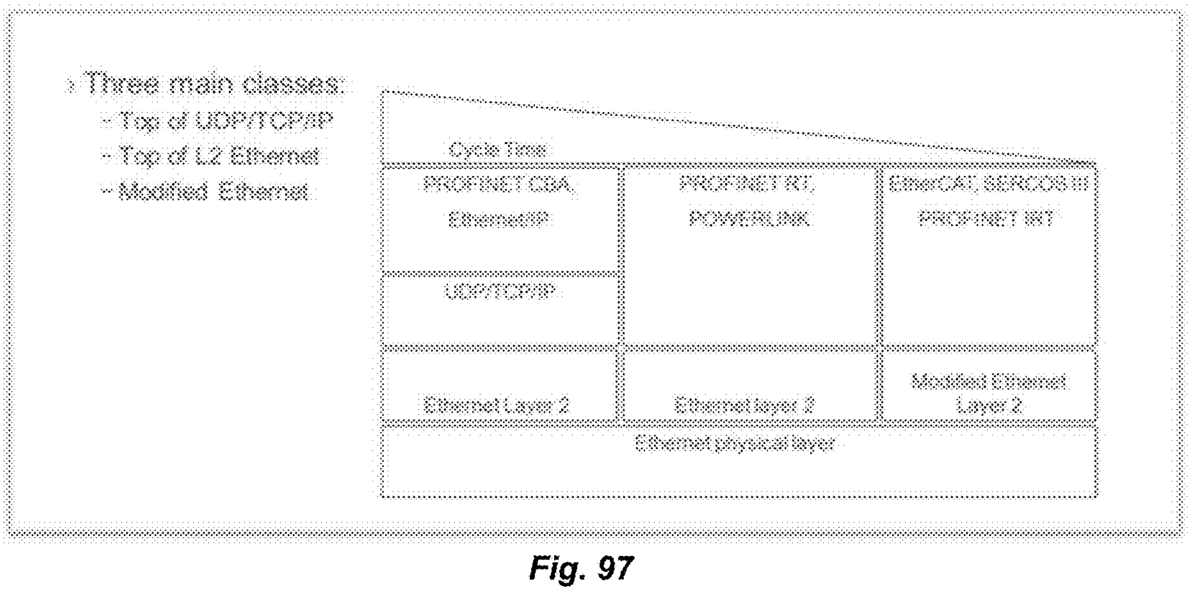
FIG. 97 shows industrial Ethernet categorization.

FIG. 97 shows the concept of industrial Ethernet and how it is built-up on standard Ethernet. On layer 2, some industrial Ethernet technologies are based on time scheduled transmissions (like Profinet RT) to achieve deterministic latencies in the network. The network cycle time is a metric that is widely used to promote and compare technologies—the lower the network cycle time that is supported, the better. Usually the network cycle time is the minimum application cycle time that is supported (i.e. the application transmits a certain message in every network cycle). Very challenging use cases require incredible small application cycle times below 50 microseconds, to achieve a sufficient accuracy for e.g. motion control. EtherCat for example defines a new Ethernet layer 2 to achieve very low network cycle times.

As can be seen in FIG. 97, Profinet has different flavors:

Profinet CBA (component based automation)—only for process automation with less stringent transmission characteristics and requirements Profinet-IO RT (realtime)

Profinet-IO IRT (isochronous realtime)—this variant supports application cycle times down to 31.25 microseconds (by using network cycle times of 31.25 microseconds)

Figures 98, 99:
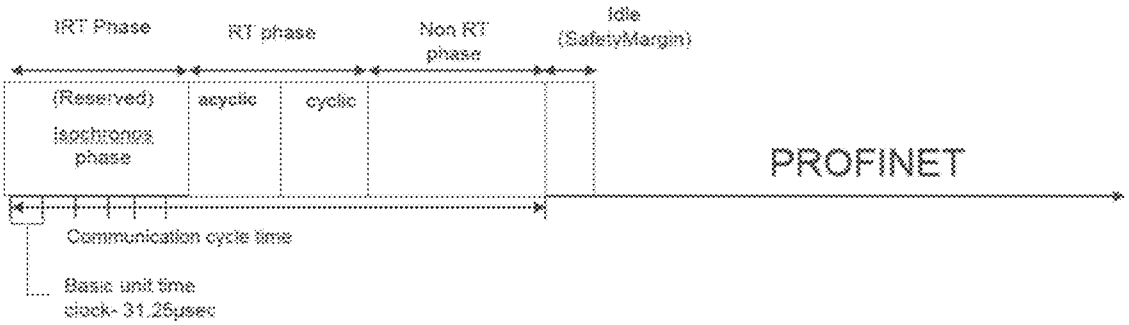
FIG. 98 illustrated time-scheduled transmissions as used in Profinet.
FIG. 99 shows a frame structure for Profinet IRT.

FIG. 98 shows an example of time scheduled transmissions in Profinet—the figure depicts one network cycle that is repeated periodically. Therein the network access time is shared between a cyclic IRT phase and a cyclic RT phase both to provide strict QoS and a Non-RT phase, which is equivalent to a best effort phase without guarantees on QoS. Profinet uses a time synchronization protocol like IEEE1588 to establish a common notion of time between all nodes. For very strict applications there might be no RT or Non-RT phase involved. IRT communication is always pure layer 2 communication, not using UDP/TCP/IP. A Profinet IRT frame is illustrated in FIG. 99.

The network management in case of Profinet (as well as for other technologies) is manually pre-configured and usually no devices can be added on-the-fly—so plug-and-play is mostly not possible, but instead there is some expertise needed to set up these networks which is definitely a pain-point for industries.

Industrial Ethernet equipment differs from standard Ethernet as well:

Specific switches—rugged, QoS optimized, highly available implementation

Most technologies require specific ASICs, some are based on software, some vendors sell also multi-technology ASICs (e.g. HMS, Hilscher, AD)

Usually PLCs offer different communication modules to support multiple technologies Devices (from sensors to robots) usually offer only a limited set of technology interfaces Some of the industrial Ethernet technologies will probably disappear and being replaced sooner or later by TSN products. Nevertheless, the product life cycles are very long in industries. TSN adopts many features also used in existing industrial Ethernet technologies. Furthermore, organizations behind Profinet and EtherCat already published whitepapers explaining how an operation alongside TSN will work. They might see TSN as a common infrastructure where Profinet and other technologies might coexist on.

The way industrial Ethernet is nowadays deployed is similar to islands. High QoS can only be guaranteed within such an island. One island is deployed using one communication technology, e.g. Profinet. Usually a Programmable Logic Controller (PLC) is used as a master of an island (e.g. a Profinet master). An island usually consists of a few devices on the same shopfloor only. The interworking of e.g. Profinet and cellular is especially relevant if one of these devices (e.g. the PLC) is virtualized (central link) or if one device (device-to-island) or a group of devices using a gateway (inter-island link) is separated from the island on the shopfloor. The interworking of Profinet and for example LTE has been showed already in some research proof-of-concept studies—it is possible if the applications cycle time is above a certain limit (e.g. 32 ms as an example), depending upon the configuration of the LTE network.

Requirements for the cellular network in terms of latency and packet error rate (PER) are not set by the communication technology like e.g. Profinet but the applications using them, or the application cycle times used respectively. Usually the lowest supported network cycle time is a KPI for industrial communication technologies. Although Profinet IRT supports network cycle times down to 31.25 usec it is also being used for applications with much lower requirements (i.e. application cycle times much higher that this). Profinet IRT can be used for application cycle times up to 4 ms. In case of Profinet, the RT version that supports only higher network cycle times seems anyway more relevant, at least was always used in any trials with industrial partners.

Other wireless solutions are trying to enter the field at the same time with 5G. One interesting technology is MulteFire, which is marketed heavily for industrial connectivity. MulteFire as a technology is very similar to LTE but only runs on unlicensed spectrum, so the benefits of scheduling and mobility within the system are there. Device availability is a challenge for MulteFire at current time. WiMAX has partly been used as wireless technology in industrial but is challenged due to the low economy of scale.

Industrial grade Wi-Fi has a small footprint in connecting industrial devices. Reliability and latency issues are addressed through implementation. No global certification exists, but rather the solutions are vendor specific and do not interoperate. More commonly, regular Wi-Fi is deployed in industrial spaces to allow employee Internet access from laptops, tablets and mobile phones. This connectivity is valuable and important for shop floor personnel.

Figure 100:
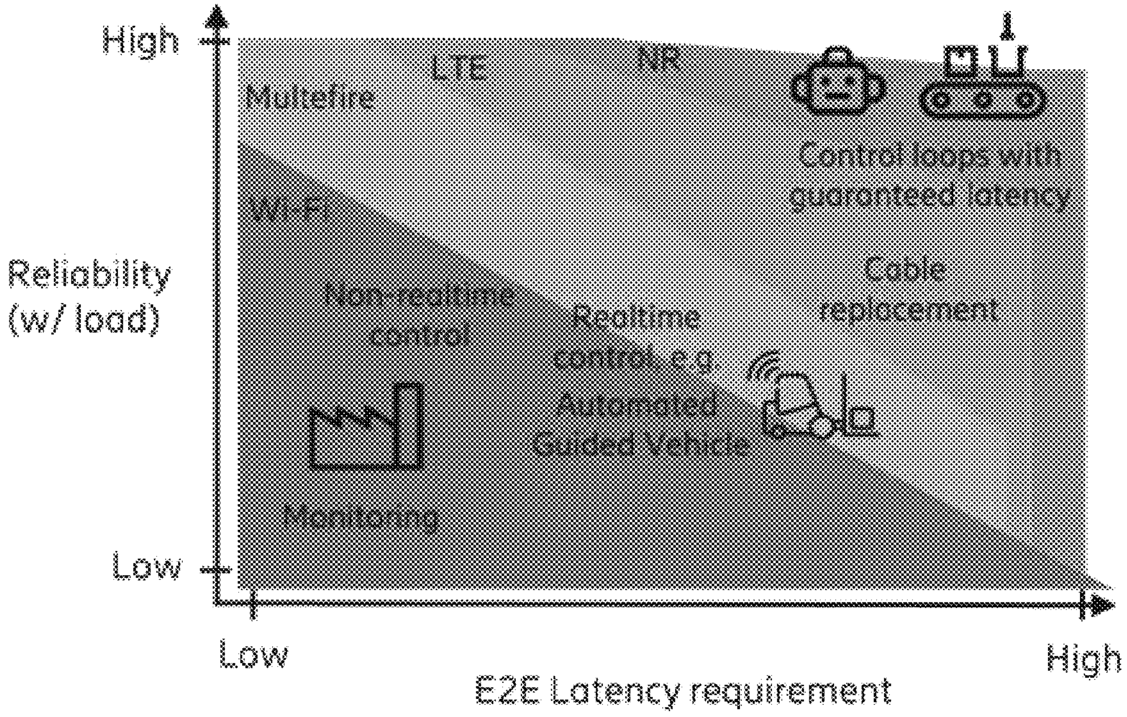
FIG. 100 illustrates estimated performance of different wireless technologies with respect to reliability with increasing load and increasing E2E latency requirements.

FIG. 100 depicts an estimated difference between Wi-Fi, MulteFire, LTE and 5G NR with regards to increasing reliability demands and increasing end to end (E2E) latency demands. Example use cases are placed on the figure to show what kind of requirements roughly need to be fulfilled for each.

Wireless sensor networks are used to collect sensor data and monitor machinery. Industrial Bluetooth implementations exist as vendor specific solutions. Typically, Bluetooth is used as a connectivity for personnel to acquire reading from machinery when at close distance. There is increasing interest in deploying gateways for continuous connectivity. Also, many different variants of the IEEE802.15.4 protocol exist for industrial use. Most well-known are WirelessHART and ISA100.11a, which are defined and certified by industry players. 6TiSCH is being standardized by the IETF to bring determinism and reliability into the IEEE802.15.4 radio interface.

10-Link Wireless standard might be interesting as well, as it is said to achieve a PER of 10^-9 and can support down to 5 ms cycle time. It has a limited scalability, however, and is limited in communication range.

MulteFire is LTE based technology which fully operates in the unlicensed spectrum. The main goal of MulteFire is to provide LTE-like performance with Wi-Fi-like ease of deployment in unlicensed spectrum. Compared to eLAA, the MulteFire RAN was designed to have independent operation. In particular, MulteFire performs all the control signaling and data signaling in unlicensed spectrum. Today MulteFire also includes eMTC-U and NB-IoT-U as Radio Access Technology (RAT) to support a wide range of applications from mobile broadband to machine type communication.

MulteFire (MF) uses principles of carrier selection, discontinuous transmission and listen before talk (LBT) that are based on 3GPP release 13 and 14 LAA. MulteFire targets 5.0 GHZ global spectrum and utilizes the Release-13 LBT procedure with some additions. Compared to LTE protocol stack, MF is unique in UL, DL physical layer, DRS transmission, SIB-MF broadcasts and its content, RACH procedures and has additional S1, X2 information signaling.

MulteFire 1.0 was further extended with additional features such as Grant Uplink Access, Wideband Coverage Extension (WCE), Autonomous Mobility (AUM), sXGP 1.9 GHZ support, eMTC-U and NB-IoT functionality. These features target more industrial deployments and support for machine type communications.

Grant Uplink Access further reduces UL control signaling overhead, which works very well in low load scenarios. This feature is based on the 3GPP feature Autonomous UL as defined in 3GPP Release 15. The WCE feature aims to increase coverage with up to 8 dB compared to legacy MF MBB operations. Compared to licensed spectrum, LBT and few measurements for RRM and RLF makes mobility very challenging. To address this, MF has specified AUM to deal with fast changing channel quality and handover, in which UE and potential eNBs can be pre-configured with handover related parameters. In particular, UEs may be configured with AUM related mobility assistance information for up to 8 AUM cells. These cells are basically potential candidate target cells, which have been prepared with potential UE context. Parameters which are shared to the UE includes frequency and physical Cell ID (PCI) of the candidate target cells.

To support massive IoT use cases, MF adapted the 3GPP Rel-13 eMTC technology based on 1.4 MHZ carrier bandwidth applied to the 2.4 GHZ frequency band. However, in the 2.4 GHZ frequency band, regulations are unique to USA, Europe, Japan and China. Among this, ETSI in Europe has strict rules and to adhere the regulations, frequency hopping mechanism was adopted. To enable eMTC-like performance, a new time-frequency frame structure is defined which has two fixed time-periods, first time-period being anchor channel and second being a data channel dwell. The data channel usually contains UL/DL transmission which are preceded by LBT and it always starts with a DL transmission. The anchor channel always remains on the same channel, several anchor channels are defined out of which eNB can select one of them to transmit. Data channel dwells transmission using frequency hopping, it is done by splitting 82.5 MHZ into 56 channels, with spacing of 1.4 GHZ between hoping channels. Specifications are currently being finalized to further extend Rel-13 NB-IoT support in unlicensed bands.

The IEEE 802.11 technology family, commonly referred to as Wi-Fi, is a popular technology to provide wireless Internet access in our homes. The industrial grade Wi-Fi solutions listed in the previous section are typically modifications to the IEEE 802.11 Wi-Fi. Industrial grade Wi-Fi is usually based on IEEE 802.11 Wi-Fi certified chipsets, with primarily stripped-down MAC layer. In particular, the LBT mechanism in Wi-Fi, albeit necessary for spectrum regulations, is often removed. The problem with the industrial grade Wi-Fi is interoperability as each industrial grade Wi-Fi is developed independently of the others. In contrast, IEEE 802.11 is a well-known standard, and you can expect products from different vendors to operate well between each other. We will in this section briefly consider a few mechanisms: channel access (largely impacts latency), quality of service (impacts priorities), and link adaptation (spectrum efficiency).

Figure 101:
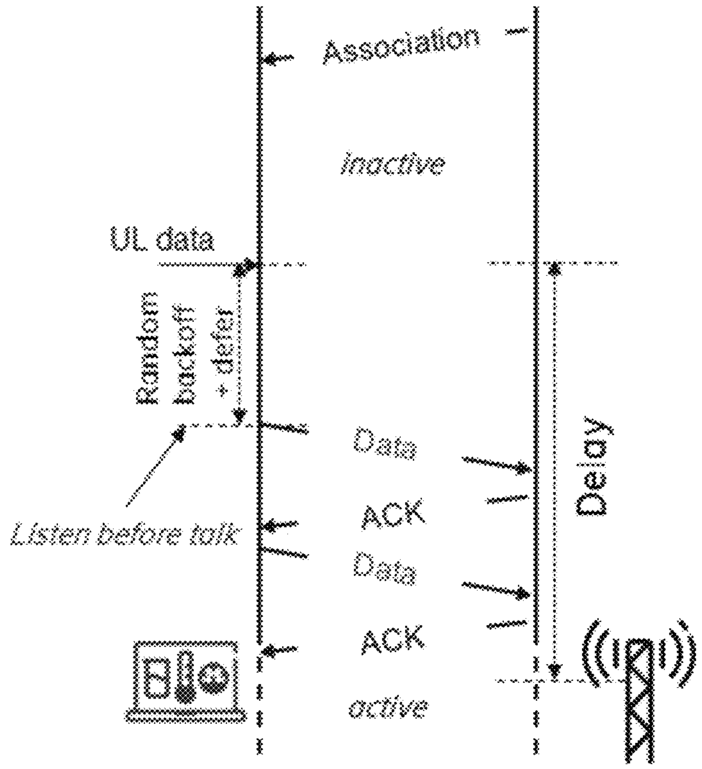
FIG. 101 shows typical channel access and data exchange in Wi-Fi.

To understand the channel access of Wi-Fi, we must understand the background to some of the design principles in unlicensed bands. In unlicensed bands, as opposed to licensed bands, there is typically no physical controlling entity. There are a set of spectrum rules, but anyone adhering to these rules have the same right and priority to access the wireless medium. Therefore, a major design principle in unlicensed bands is the uncoordinated, competition-based channel access. This is called CSMA/CA—Carrier Sense Multiple Access with Collision Avoidance. The fundamental idea is that there is a random number associated with each channel access, the random number deciding a backoff time. For each failed channel access, this random number becomes larger. The result of this channel access is that round-trip latencies contain a random factor. When the wireless medium is to a large extent unused, the latency is very low, but when the wireless medium is very occupied, the latency can become very large. In industrial scenarios this uncertainty in latency is a concern. We show a typical channel access and data transmission in FIG. 101. The channel access in Wi-Fi is the main reason why guaranteed latency is not possible, and this is a feature necessary to comply with the regulations. The strength of cellular technologies is that they are designed for exclusive use of the spectrum, meaning that guaranteed latency can be obtained.

In addition to the random backoff, there is in Wi-Fi an interframe spacing time (IFS). There are 3 main interframe spacing times: short IFS (SIFS), PCF (Point Coordination Function) IFS (PIFS), DCF (Distributed Coordination Function) IFS (DIFS). In summary, IFS<PCF<DIFS, where IFS are used for special response frames, i.e. ACK. PCF is used for certain priority frames, and DIFS for standard frames.

Figure 102:
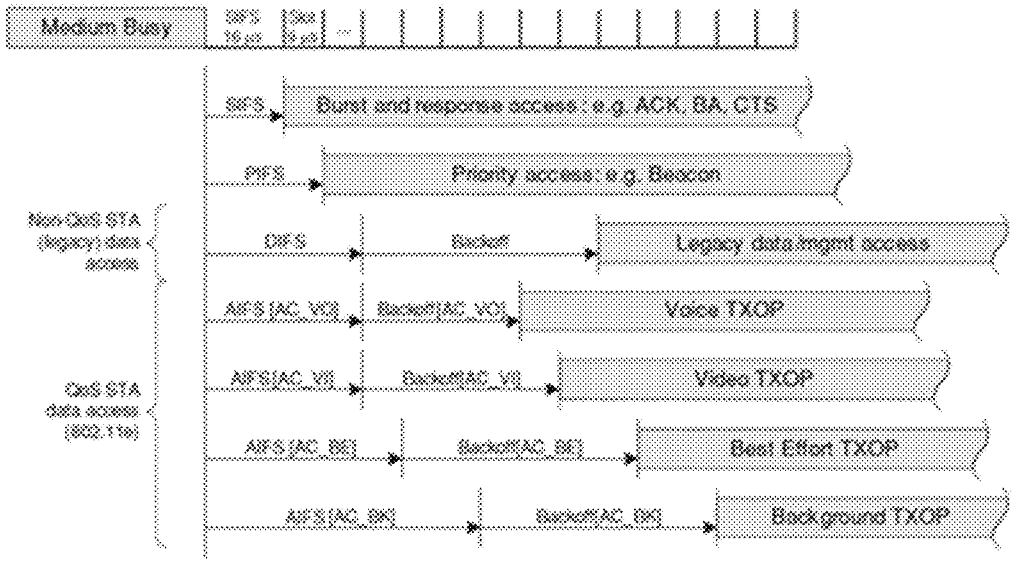
FIG. 102 shows channel access in Wi-Fi.

Wi-Fi has a quality of service (QoS) mechanism called Enhanced Distributed Channel Access (EDCA). EDCA is mainly based on adjusting the random backoff time when performing channel access, but it also introduces a new IFS, called arbitration IFS (AIFS). A higher priority will in average get priority access due to reduced backoff times. However, note that there is still randomness in each channel access, and no guarantees can be provided. There are 4 priority classes introduced in EDCA: voice, video, best effort, and background. An illustration of how the different priority classes may obtain channel access is shown in FIG. 102. Note that each priority class has an individual IFS and that the random backoff is different.

The link adaptation in Wi-Fi is based on full data retransmissions. If a packet fails to be decoded, the packet is sent again (possibly with another coding and modulation). Note that the data packets in Wi-Fi are self-contained, and if a packet fails all information is typically trashed. This is a main disadvantage compared to LTE or NR, where the soft information received during the initial transmission is combined with the soft information received during the retransmission. The gain by soft combining is in the order of 3-6 dB, depending on if the retransmission is a repetition of the previous coded bits (called Chase combining) or if additional parity bits are transmitted (called incremental redundancy).

Figure 103:
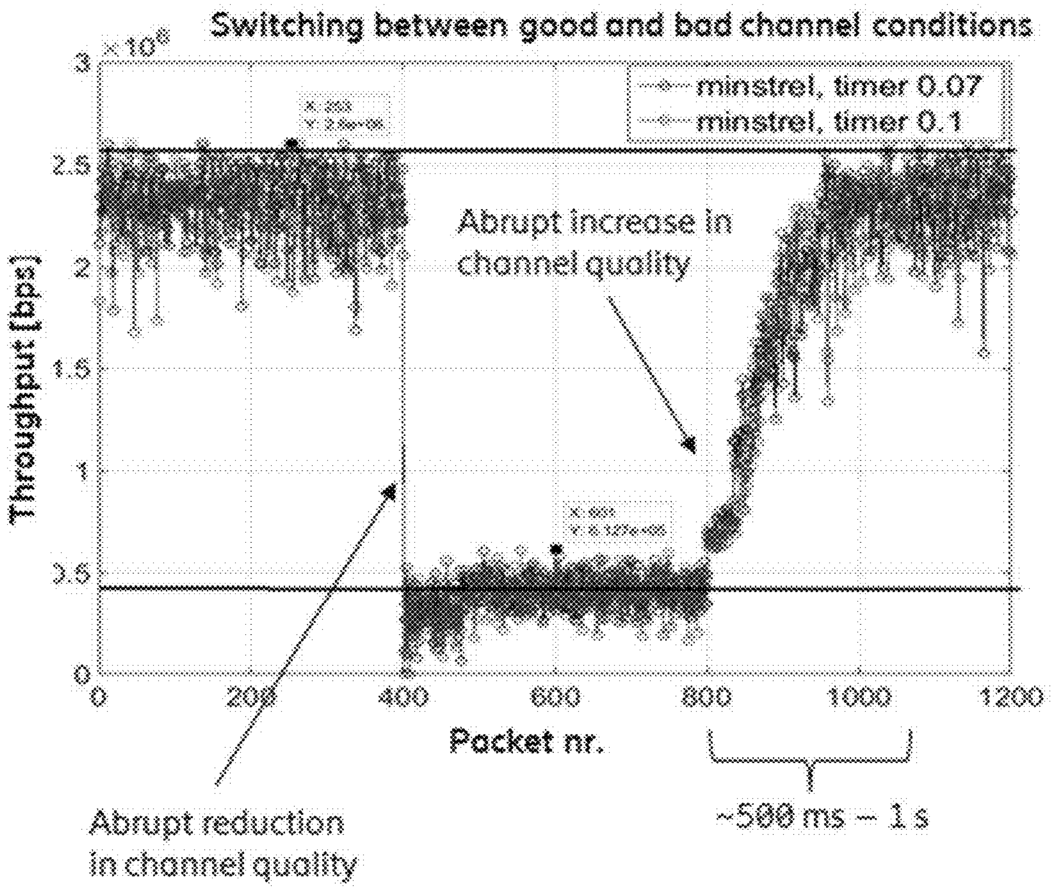
FIG. 103 illustrates a simulation of the Minstrel algorithm.

The coding and modulation chosen is typically selected by the Minstrel algorithm. The Minstrel algorithm works by keeping trial and error statistics over packets sent with different coding and modulations and attempts to maximize the throughput. The algorithm works well in static environments with little to no interference but suffers when channel characteristics change fast. This results in that Minstrel is typically slow to adopt to an improved channel, as shown in FIG. 103, which illustrates a simulation of the Minstrel algorithm in a single-link radio simulator.

Industrial services above the IP/Ethernet layer use a variety of protocols to accomplish the tasks at hand. The reference introduces protocols such as Constraint Application Protocol (CoAP), Hypertext Transfer Protocol (HTTP)

and HTTP/2, Message Queue Telemetry Transport (MQTT), Open Connectivity Foundation (OCF), Data Distribution Service (DDS) for real-time systems, etc. In the following we give a short introduction to one of the main protocols in the industrial area that is OPC UA. Finally, we take a brief look at SECS/GEM used in the semiconductor industry.

Figure 104:
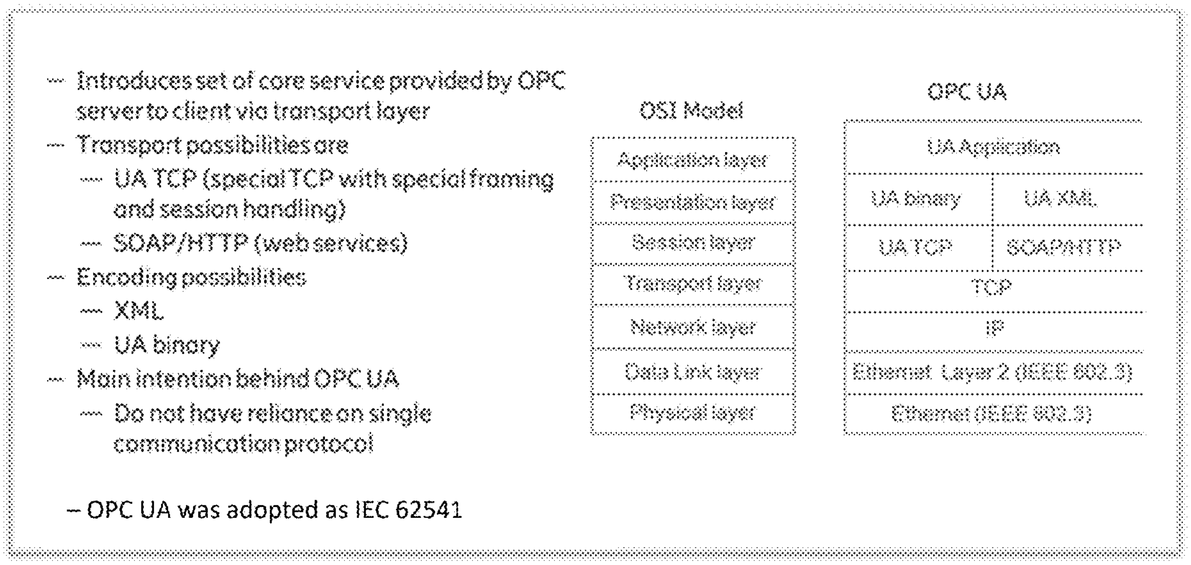
FIG. 104 shows possible protocol stacks of OPC-UA.

As introduced above, usually an interworking between legacy industrial communication technologies is not possible. As a result, end customers and device manufacturers are faced with a multitude of technologies that need to be produced, run, diagnosed, maintained and kept in stock. While the availability of products and services is largely satisfactory, dealing with multiple solutions generates prohibitive costs and limits IoT capability. The OPC-UA (Open Platform Communication-Unified Architecture) tries to address these problems. OPC-UA is the next generation of OPC technology. It should provide better security and a more complete information model than the original OPC, "OPC Classic." OPC Classic is a well-established protocol for automation from (primarily) Microsoft. OPC-UA is said to be a very flexible and adaptable mechanism for moving data between enterprise-type systems and the kinds of controls, monitoring devices and sensors that interact with real-world data. OPC-UA is platform independent and ensures the seamless flow of information among devices from multiple vendors. The OPC Foundation is responsible for the development and maintenance of this standard. FIG. 104 illustrates the OPC-UA protocol stack.

Figure 105:
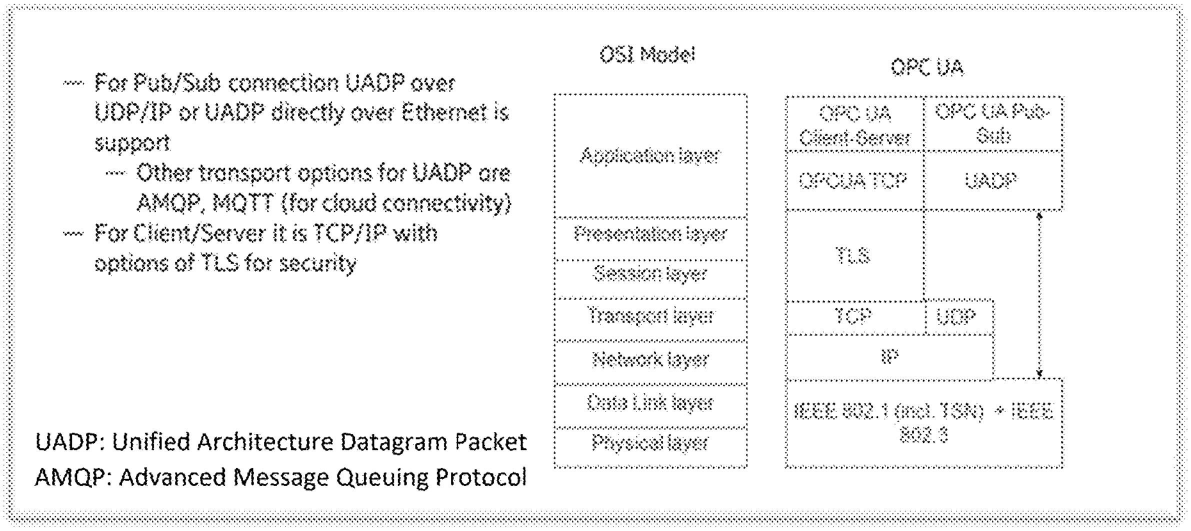
FIG. 105 illustrates OPC-UA over TSN.

For the use in TSN, the OPC-UA standard is adapted to be more deterministic and support certain TSN features. FIG. 105 illustrates the use of OPC-UA over TSN. In general, a TSN network infrastructure is simultaneously able to carry all types of industrial traffic, from hard real-time to best effort, while maintaining the individual properties of each type. The OPC-UA TSN initiative uses a publisher-subscriber communication model and the use of OPC-UA without TCP/UDP/IP.

OPC-UA is also assumed to be used as a configuration-protocol in TSN.

Regarding the time line of OPC-UA and TSN: in Q4 2018 there was an announcement that most industrial automation suppliers (incl. Siemens, Bosch, Cisco, ABB, Rockwell, B&R, TTTEch etc.) are supporting the 'OPC UA including TSN down to field level' initiative. It is said that the work will be closely aligned to the work in IEC/IEEE 60802, which defines a common profile for TSN for industrial automation. It is currently planned to conclude the work in 60802 during 2021 which might be probably the same date to publish some final documents describing OPC-UA and TSN.

SEMI (previously known as Semiconductor Equipment and Materials International) standards define the SEMI Equipment Communications Standard/Generic Equipment Model (SECS/GEM) that in turn provides a protocol interface for equipment to host data communications. SEMIs purpose is to serve the manufacturing supply chain for electronics production in semiconductor fabrication plants, aka, fabs.

SECS/GEM is an alternative to OPC UA used in the semiconductor industry. The specification defined how equipment communicates with host in the factory.

Specific Applications to Industrial IoT

Following are detailed discussions of several applications of the technology and techniques described above in the Industrial IoT context. It will be appreciated, of course, that these applications are not limited to this context. Several different applications are described, including techniques for scheduling resources, handling time-sensitive data streams in a 5G network, detecting system support for TSN, handling different timings from different, and data compression and decompression. Further, a few combinations of these techniques are described. It should be appreciated, however, that any of these techniques may be combined with any of the other techniques, as well, as with any one or more of the other techniques and technologies described above, to address the special needs of a factor or other industrial setting.

Scheduling Resources in the RAN

As discussed above, while 5G is based on wireless communications using Long-Term Evolution (LTE) and/or New Radio (NR) technologies, TSN is based on the IEEE 802.3 Ethernet standard, a wired communication standard that is designed for "best effort" quality of service (QoS). TSN describes a collection of features intended to make legacy Ethernet performance more deterministic, including time synchronization, guaranteed low-latency transmissions, and improved reliability. The TSN features available today can be grouped into the following categories (shown below with associated IEEE specifications):

Time Synchronization (e.g., IEEE 802.1AS);

Bounded Low Latency (e.g., IEEE 802.1Qav, IEEE 802.1Qbu, IEEE 802.1Qbv, IEEE 802.1Qch, IEEE 802.1Qcr);

Ultra-Reliability (e.g., IEEE 802.1CB, IEEE 802.1Qca, IEEE 802.1Qci);

Network Configuration and Management (e.g., IEEE 802.1Qat, IEEE 802.1Qcc, IEEE 802.1Qcp, IEEE 802.1CS).

Figure 106:
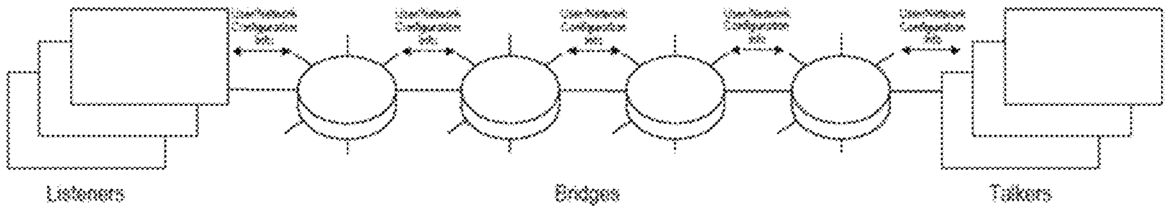
FIG. 106 is a block diagram illustrating a Distributed Time-Sensitive Networking (TSN) configuration model, as specified in IEEE Std. 802.1Qbv-2015.
Figure 107:
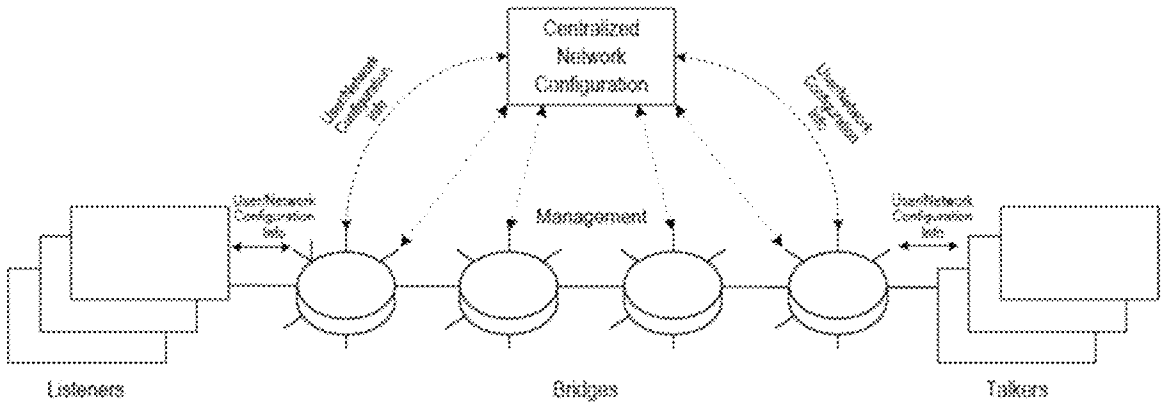
FIG. 107 is a block diagram illustrating a Centralized TSN configuration model, as specified in IEEE Std. 802.1Qbv-2015.
Figure 108:
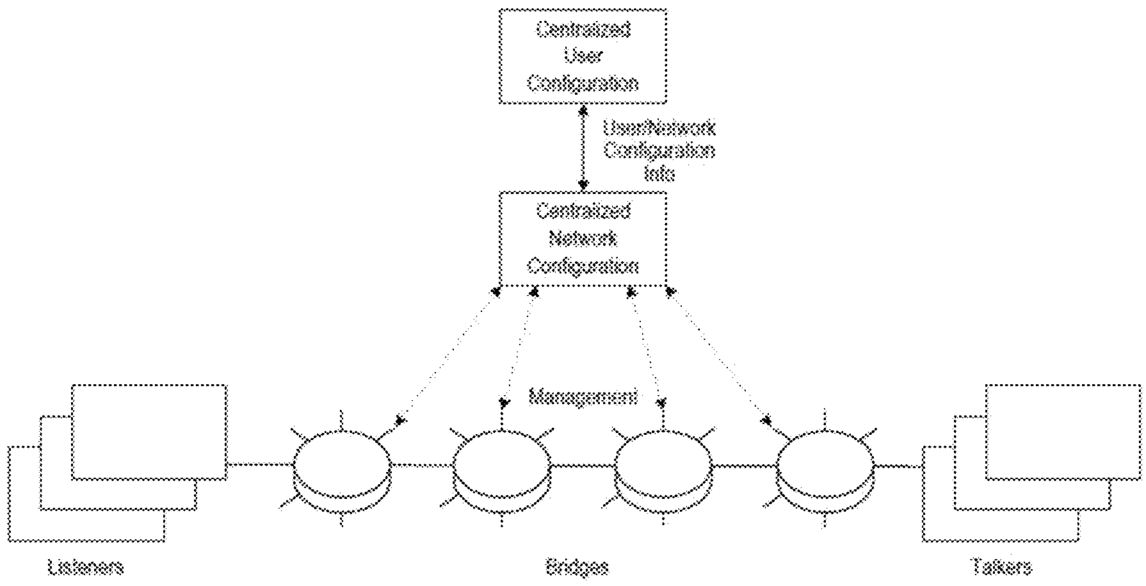
FIG. 108 is a block diagram illustrating a Fully Centralized TSN configuration model, as specified in IEEE Std. 802.1Qbv-2015.

The configuration and management of a TSN network can be implemented in different ways, as illustrated in FIGS. 106, 107, and 108. More specifically, FIGS. 106-108 are block diagrams that respectively illustrate Distributed, Centralized, and Fully Centralized Time-Sensitive Networking (TSN) configuration models, as specified in IEEE Std. 802.1Qbv-2015. Within a TSN network, the communication endpoints are called "Talker" and "Listener." All the switches and/or bridges between a Talker and a Listener can support certain TSN features, such as IEEE 802.1AS time synchronization. A "TSN domain" includes all nodes that are synchronized in the network, and TSN communication is only possible within such a TSN domain.

The communication between Talker and Listener is in streams. Each stream is based on data rate and latency requirements of an application implemented at both Talker and Listener. The TSN configuration and management features are used to set up the stream and to guarantee the stream's requirements across the network. In the distributed model from FIG. 106, the Talker and Listener can, for example, use the Stream Reservation Protocol (SRP) to setup and configure a TSN stream in every switch along the path from Talker to Listener in the TSN network.

Nevertheless, some TSN features may require a central management entity called Centralized Network Configuration (CNC), as shown in FIG. 107. The CNC can use, for example, Netconf and YANG models to configure the switches in the network for each TSN stream. This also facilitates the use of time-gated queueing (defined in IEEE 802.1Qbv) that enables data transport in a TSN network with deterministic latency. With time-gated queueing on each switch, queues are opened or closed according to a precise schedule thereby allowing high-priority packets to pass through with minimum latency and jitter. Of course, packets may arrive at a switch ingress port before the gate is scheduled to be open. The fully centralized model shown in FIG. 108 also includes a Centralized User Configuration (CUC) entity used as a point of contact for Listener and Talker. The CUC collects stream requirements and endpoint capabilities from the devices and communicates with the CNC directly. Further details about TSN configuration are given in IEEE 802.1Qcc.

Figure 109:
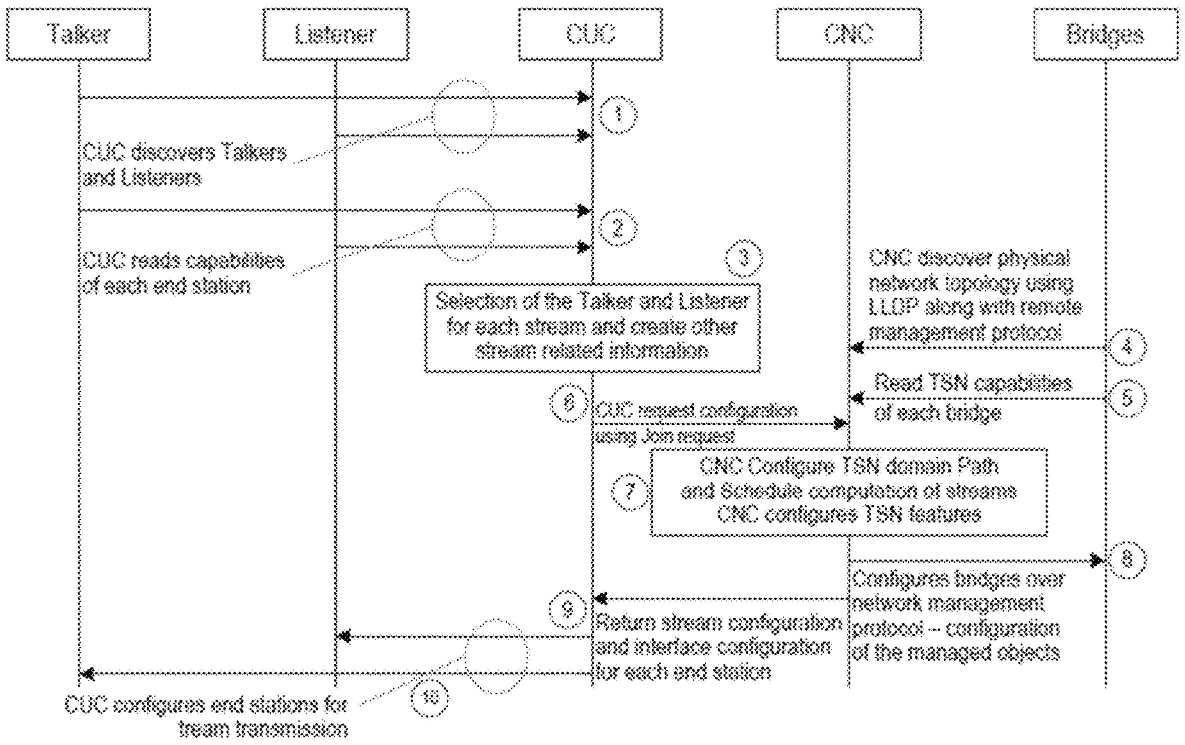
FIG. 109 shows a sequence diagram of an exemplary TSN stream configuration procedure using the fully centralized configuration model shown in FIG. 108.

FIG. 109 shows a sequence diagram of an exemplary TSN stream configuration procedure based on the fully centralized configuration model shown in FIG. 108. The numbered operations shown in FIG. 109 correspond to the description below. Even so, the numerical labels are used for illustration rather than to specify an order for the operations. In other words, the operations shown in FIG. 109 can be performed in different orders and can be combined and/or divided into other operations than shown in the figure.

1 CUC can receive input from, e.g., an industrial application and/or engineering tool (e.g., a programmable logic control, PLC) that specifies devices and/or end stations to exchange time-sensitive streams.
2 CUC reads the capabilities of end stations and applications in the TSN network, including a period/interval of user traffic and payload sizes.
3 Based on this above information CUC creates StreamID as an identifier for each TSN stream, a StreamRank, and UsertoNetwork Requirements. In the TSN network, the stream ID is used to uniquely identify stream configurations and to assign TSN resources to a user's stream. The streamID consists of the two tuples: 1) MacAddress associated with the TSN Talker; and 2) UniqueID to distinguish between multiple streams within end stations identified by MacAddress.
4 CNC discovers the physical network topology using for example Link Layer Discovery Protocol (LLDP) and any network management protocol.
5 CNC uses a network management protocol to read TSN capabilities of bridges (e.g., IEEE 802.1Q, 802.1AS, 802.1CB) in the TSN network.
6 CUC initiates join requests to configure network resources at the bridges for a TSN stream from one Talker to one Listener.
7 Talker and Listener groups (group of elements specifying a TSN stream) are created by CUC, as specified in IEEE 802.1Qcc, 46.2.2). CNC configures the TSN domain, and checks physical topology and if the time sensitive streams are supported by bridges in the network. CNC also performs path and schedule computation of streams.
8 CNC configures TSN features in bridges along the computed path in the (e.g., configuration of the transmission schedule, as explained further below).
9 CNC returns status (success or failure) for resulting resource assignment for streams to CUC.
10 CUC further configures end stations to start the user plane (UP) traffic exchange as defined initially between Listener and Talker.

In the distributed configuration model as illustrated in FIG. 106, there is no CUC and no CNC. The Talker is therefore responsible for initiation of a TSN stream. Since no CNC is present, the bridges configure themselves, which does not allow use of time-gated queuing mentioned above. In contrast, in the centralized model shown in FIG. 107, the Talker is responsible for stream initialization but the bridges are configured by CNC.

3GPP-standardized 5G networks are one solution for connecting wireless devices and/or end stations to an 802.1 TSN network. In general, the 5G network architecture consists of a Next Generation radio access network (NG-RAN) and a 5G core network (5GC). The NG-RAN can comprise a set of gNodeB's (gNBs, also referred to as base stations) connected to the 5GC via one or more NG interfaces, whereas the gNBs can be connected to each other via one or more Xn interfaces. Each of the gNBs can support frequency division duplexing (FDD), time division duplexing (TDD), or a combination thereof. Devices—also referred to as user equipment (UE)—communicate wirelessly with the 5G network via the gNBs.

Figure 110:
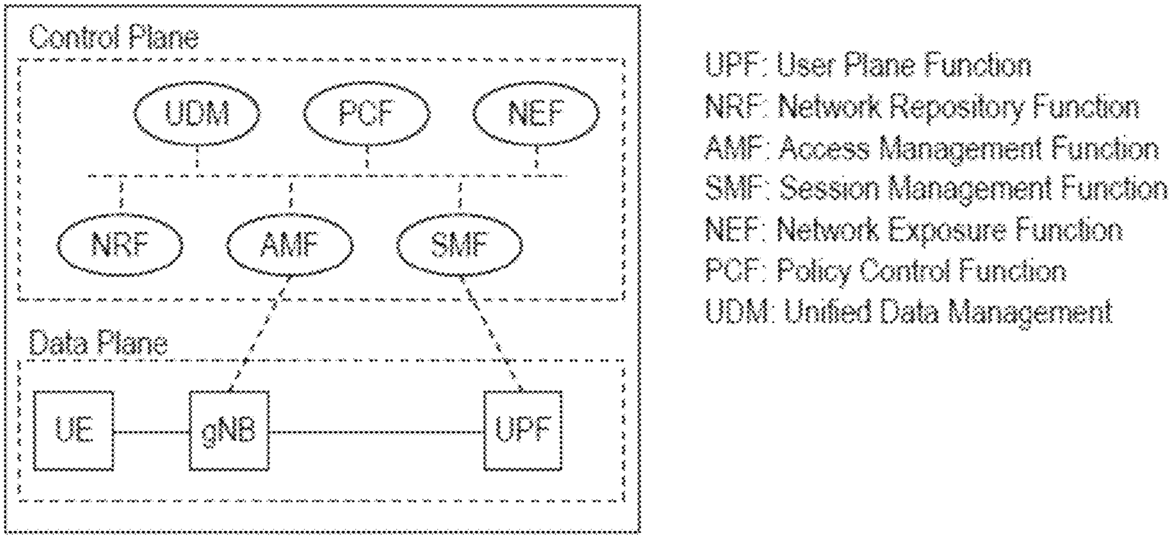
FIG. 110 is a block diagram illustrating a control plane (CP) and a data or user plane (UP) architecture of an exemplary 5G wireless network.

FIG. 110 is a block diagram illustrating an exemplary division of the 5G network architecture into control plane (CP) and data or user plane (UP) functionality. For example, a UE can communicate data packets to a device and/or application on an external network (e.g., the Internet) by sending them via a serving gNB to a user plane function (UPF), which provides an interface from the 5G network to other external networks. CP functionality can operate cooperatively with the UP functionality and can include various functions shown in FIG. 110, including an access management function (AMF) and a session management function (SMF).

Even so, there are several challenges and/or issues needing to be solved for the proper interworking of 5G and TSN networks. In particular, there are several challenges related to configuring a 5G network to handle data communications to/from an external network (e.g., a TSN network) that are subject to a time-critical schedule determined by the external network rather than the 5G network.

Figure 111:
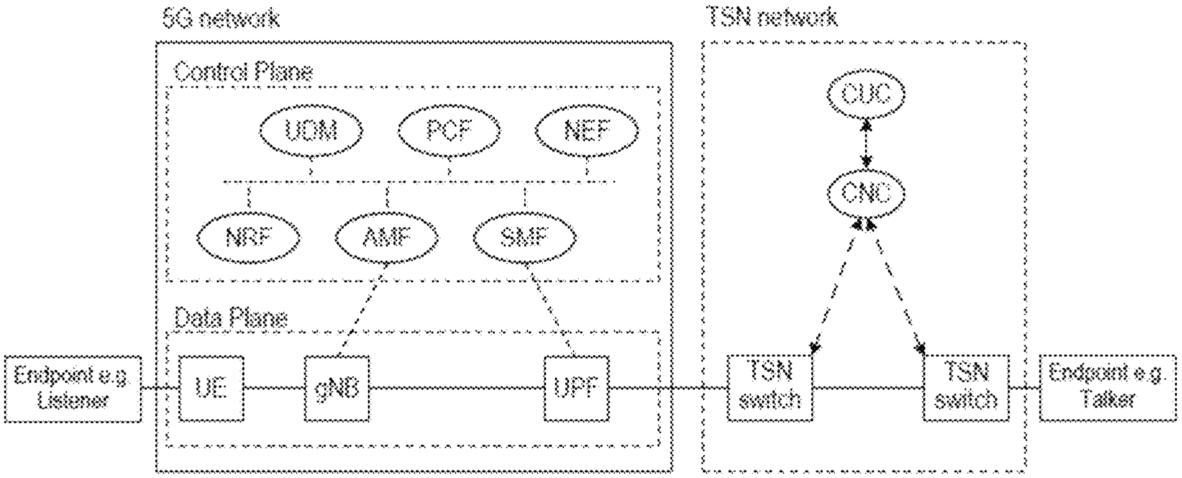
FIG. 111 is a block diagram illustrating an exemplary arrangement for interworking between the 5G network architecture shown in FIG. 110 and an exemplary fully centralized TSN network architecture.

FIG. 111 is a block diagram illustrating an exemplary arrangement for interworking between the 5G network architecture shown in FIG. 110 and an exemplary fully centralized TSN network architecture. In the following discussion, a device connected to the 5G network is referred to as 5G endpoint, and a device connected to the TSN domain is referred to as TSN endpoint. The arrangement shown in FIG. 111 includes a Talker TSN endpoint and a Listener 5G endpoint connected to a UE. In other arrangements, a UE can instead be connected to a TSN network comprising at least one TSN bridge and at least one TSN endpoint. In this configuration, the UE can be part of a TSN-5G gateway.

Both 5G and TSN networks utilize specific procedures for network management and configuration, and specific mechanisms to achieve deterministic performance. To facilitate end-to-end deterministic networking for industrial networks, these different procedures and mechanisms must work together cooperatively.

Figure 112:
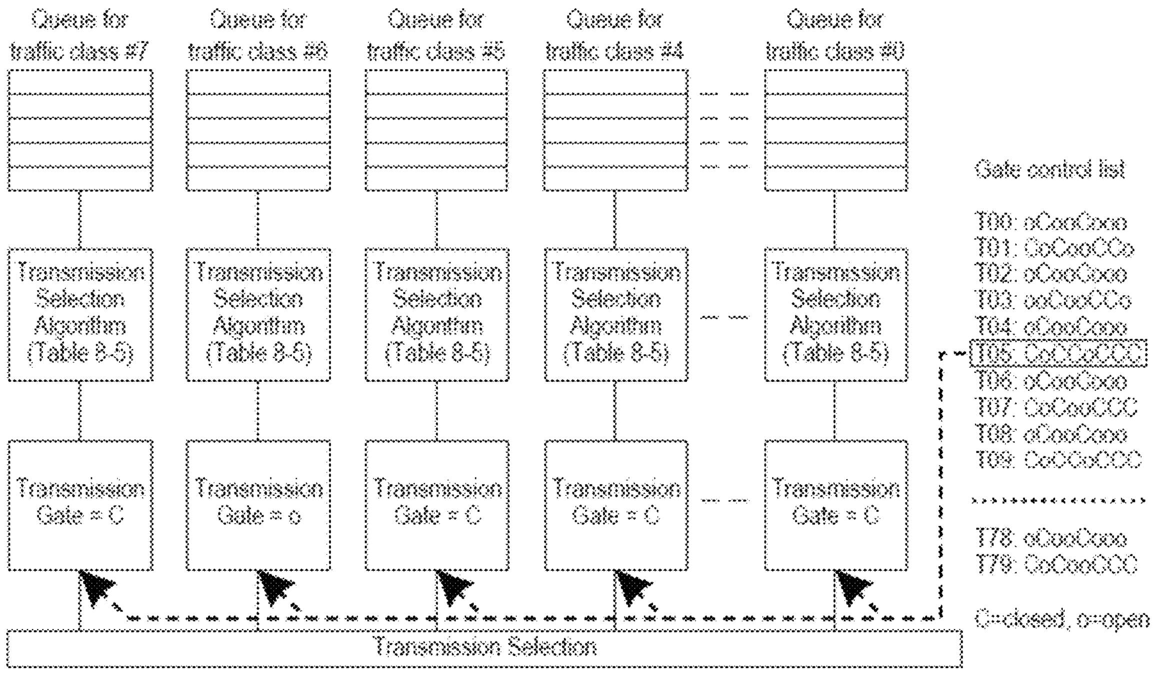
FIG. 112 is a block diagram illustrating transmission selection among traffic queues based on gates, as specified in IEEE Std. 802.1Qbv-2015.

As described in IEEE 802.1Qbv-2015, TSN provides specific time-aware traffic scheduling to facilitate deterministic low latency for industrial application, where cycle time is known in advance. This traffic scheduling is based on time-aware gates that enable transmissions from each queue according to a predefined time scale. FIG. 112 is a block diagram illustrating gate-based transmission selection among traffic queues based on gates, as specified in IEEE Std. 802.1Qbv-2015. For a given queue, the transmission gates can be in two states: open or closed.

Furthermore, each transmission gate relates to a traffic class associated with a specific queue, with potentially multiple queues associated with a given port. At any instance of time, a gate can be either turned on or off. This mechanism is time-aware and can be based on, e.g., a PTP application within a TSN bridge or a TSN end station. This mechanism allows execution of a gate control list to be precisely coordinated across the network, facilitating tightly-scheduled transmissions for a given class of traffic. Herein, a transmission schedule can be defined as a schedule that indicates when transmissions are to occur in time. Also, a time-critical transmission schedule can be defined as a schedule that indicates when transmissions of a Time-Sensitive Network (TSN) are to occur in time.

As described above in relation to FIG. 109, the information about TSN stream schedules are is calculated by a CNC entity in the fully-centralized TSN model, based on the user to network requirements (e.g., IEEE 802.1Qcc § 46.2.3.6 of) provided by Talker and/or Listener (and/or via the CUC entity). In addition, standard management objects (e.g., defined in IEEE 802.1Qvc) and a remote network management protocol are used by the CNC to configure transmission schedules on TSN bridges (operation 8 in FIG. 109).

Nevertheless, these features are specific to TSN networks and do not take into account interworking 5G network architecture, such as illustrated in FIG. 111. For example, 5G networks do not provide any mechanism for elements (e.g., UEs, gNBs, etc.) to take into account time-critical transmission schedules established by external networks (e.g., TSN networks) when scheduling transmissions over the wireless interface between UE and gNB. For example, even if such a time-critical transmission schedule is known to a UE (e.g., connected to a TSN endpoint), there is no mechanism for the UE to inform the gNB of such a schedule. Furthermore, there is no mechanism that enables the gNB or UE to understand and process scheduling requests, coming from the 5G network.

Exemplary embodiments of the present disclosure address these and other problems and/or shortcomings of prior solutions by providing novel techniques for predefined time scheduling for specific users and/or QoS flows based on time-aware transmission schedules (e.g., from external networks) to meet specific bounded latency requirements. For example, these techniques can provide mechanisms for a UE (or network node, e.g., gNB) to be informed of such a transmission time schedule and to inform the network node (or UE) of the schedule. In this manner, such novel techniques can provide various benefits including cooperative interworking between cellular (e.g., 5G) and TSN networks that utilize different schedulers and/or scheduling mechanisms, thereby facilitating bounded latency of time-critical transmissions between Talker/Listener endpoints via 5G networks.

Figure 113:
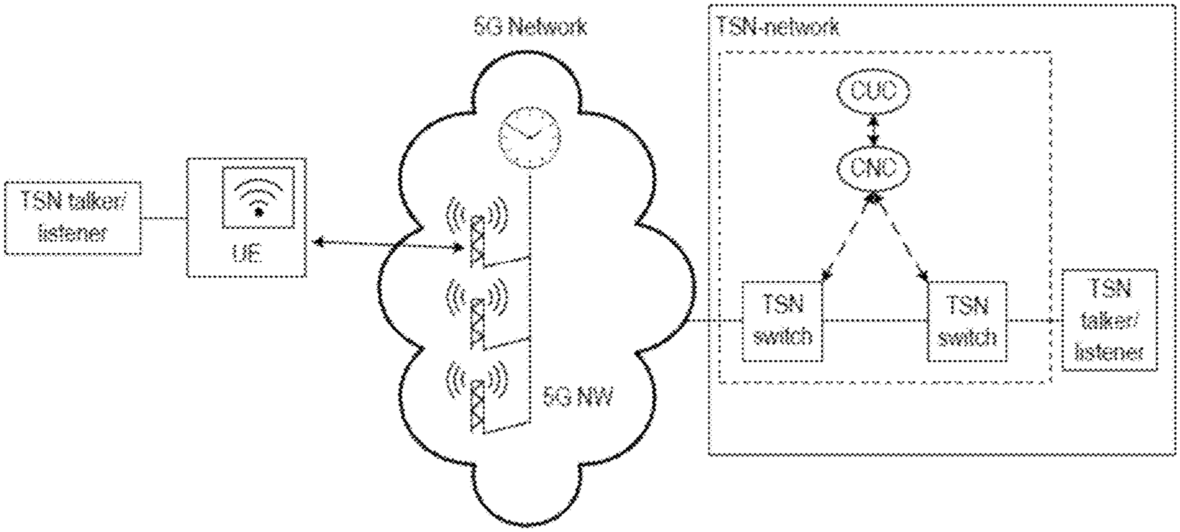
FIG. 113 is a block diagram illustrating an exemplary communication scenario between two TSN talker/listener units via 5G and TSN networks, according to various exemplary embodiments of the present disclosure.

FIG. 113 is a block diagram illustrating an exemplary communication scenario between two TSN talker/listener units via 5G and TSN networks, according to some exemplary embodiments of the present disclosure. In this scenario, a UE is connected to a TSN talker/listener, which in turn can be connected to plant equipment (e.g., a robot control) that is required to run an application according to a predefined cycle time. One challenge in this scenario is to facilitate timely transmission of the TSN stream packets from the gNB to the UE, according to the bounded latencies required by the equipment and/or application.

Figure 114:
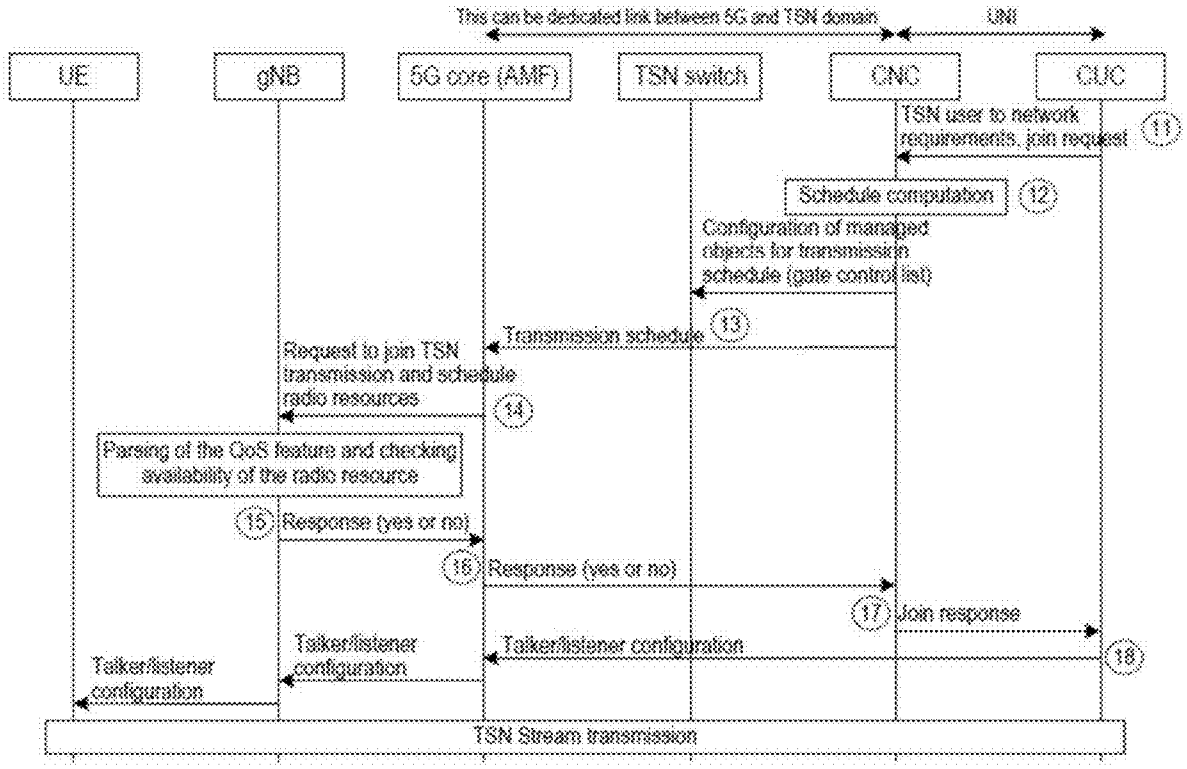
FIG. 114 shows a sequence diagram of an exemplary method and/or procedure for configuring timely delivery of TSN stream packets via the network configuration shown in FIG. 113, according to various exemplary embodiments of the present disclosure.

FIG. 114 shows a sequence diagram of an exemplary method and/or procedure for configuring timely transmission of TSN stream packets via the network configuration shown in FIG. 113, according to these exemplary embodiments. The numbered operations shown in FIG. 114 correspond to the description below. Even so, the numerical labels are used for illustration rather than to specify an order for the operations. In other words, the operations shown in FIG. 114 can be performed in different orders and can be combined and/or divided into other operations than shown in the figure.

In operation 11, the CUC sends to the CNC a join request for a user to join the TSN network. For example, this request can be based on and/or in response to a programmable logic control (PLC) application requesting to schedule a TSN stream between a sensor (Talker) and a PLC controller (Listener). In operation 12, the CNC computes a transmission schedule based on the specific requirements of the TSN stream identified in operation 11.

In operation 13, the CNC configures managed objects of TSN switches that are in the path between the sensor and PLC controller. Exemplary managed object to be configured for enhanced time-aware scheduling are described in IEEE 802.1Qbv-2015 § 12. In exemplary embodiments, the CNC treats the 5G network as a TSN switch in the path, and therefore requests the 5G core network (5GC) to configure resources for this TSN stream. For example, this can be done by the CNC sending to an access management function (AMF, see FIGS. 110-111) the cycle times and gate control lists for traffic classes within the TSN stream.

In operation 14, the receiving entity (e.g., AMF) in the 5GC can translate the requested TSN stream requirements (e.g., cycle time, gate control list, etc.) to QoS requirements for the UE that is connected to the TSN Talker/Listener (e.g., sensor). In addition, the AMF can translate the requested TSN stream requirements into a time window and periodicity for the gNB(s) to which the UE will transmit and/or receive this TSN stream.

In some embodiments, operation 14 can involve various sub-operations. For example, the UE and a PDU session corresponding to the TSN stream can be identified, and a mapping between traffic classes within this TSN stream and QoS flows of the UE can be identified. For each QoS flow (which can correspond to one or multiple traffic classes), a certain QoS requirement can be indicated to the gNB. In some embodiments, this indication to the gNB can include an indicator of a time-window during which a packet of the QoS flow should be guaranteed to be transmitted. This time window can be indicated, e.g., by providing an absolute time reference for the time window start together with a length of the window (e.g., as a latency bound). For example, the absolute time reference can be indicated as an offset to a certain absolute reference time such gNB subframe (SFN) timing or a universal time coordinate (UTC), such as provided by a global navigation satellite system (GNSS, e.g., GPS). In some embodiments, the indication to the gNB can also include a periodicity (or period) of the time window. This can be included, e.g., if the TSN stream comprises multiple transmission events that occur according to a periodic schedule.

By indicating this time-window information per QoS flow of the UE, multiple traffic classes of a TSN stream or multiple TSN streams can be independently served. In other words, this information facilitates the affected gNB(s) to reserve radio resources for each of the QoS flows during the respective time windows associated with those QoS flows. For example, this can facilitate the gNB(s) to map the various QoS flows to different radio bearers and to apply the resource allocation/reservation per radio bearer. Herein, a radio bearer takes the usual definition from the 3rd Generation Partnership Project (3GPP).

In operation 14, after determining the information as discussed above, the AMF sends an indication and/or request the gNB(s) to confirm that the QoS, time window, and/or periodicity requirements can be met. In operation 15, after receiving the request/indication sent in operation 14, the gNB (or gNBs, as the case may be) determines whether it can serve this additional QoS flow with the indicated time-window requirement. For example, in making this determination, the gNB can consider resources used for current and estimated traffic load, capabilities of the UE (e.g., spectral efficiency, supported transmission/reception modes, etc.), channel quality between the RAN and the UE, and whether (and/or how many) additional guaranteed resources need to be allocated for the UE. After making this determination, the gNB responds to the 5GC function (e.g., AMF) by accepting the request ("yes") or declining the request ("no"). In some embodiments, when declining the request, the gNB can indicate an alternative time window (e.g., by an offset to the requested time window) during which the gNB could accept a corresponding request. In situations where the gNB accepts the request, the gNB can also reserve any additional resources identified as required to meet the requested transmission schedule.

In operation 16, after receiving the response from the gNB(s), the 5GC function may then translate this response—which is based on per QoS flow mapping—to a traffic flow/TSN stream level of granularity, and provides a response to the TSN CNC. The response may be in a format that can be decoded by the TSN CNC. In operation 17, after receiving this response, the CNC provides to the CUC a corresponding response to the join request received in operation 11. In operation 18, after receiving the join response from the CNC, the CUC further configures all Talker and Listener end station associated with the original request. In some embodiments, the CUC can also request the 5GC to initiate a connection to the UE, whereas in other embodiments, the 5GC or it might use a default and/or already-existing PDU session.

Figure 115:
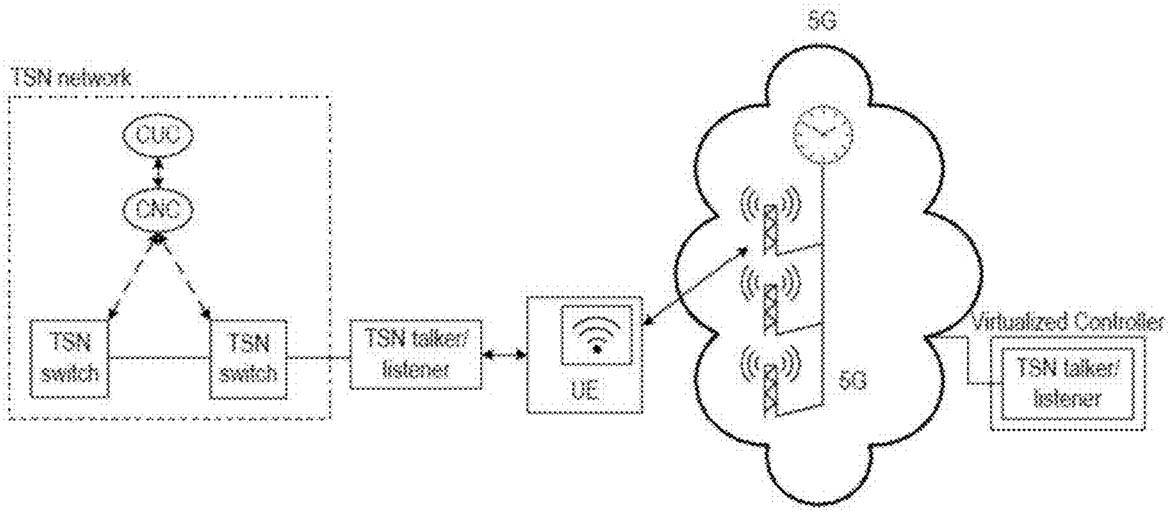
FIG. 115 is a block diagram illustrating an exemplary communication scenario between a TSN talker/listener unit and a virtualized controller via a 5G network, according to various exemplary embodiments of the present disclosure.

FIG. 115 is a block diagram illustrating another exemplary communication scenario between a TSN talker/listener unit and a virtualized controller via a 5G network, according to other exemplary embodiments of the present disclosure. In this scenario, a TSN network is connected to UE, which acts a gateway to connect a Talker/Listener end station over a wireless link to the 5G network. One challenge in this scenario is to facilitate timely transmission of the TSN stream packets from the UE to the gNB, according to the bounded latencies required by the schedule computed by a CNC in the TSN network.

Figure 116:
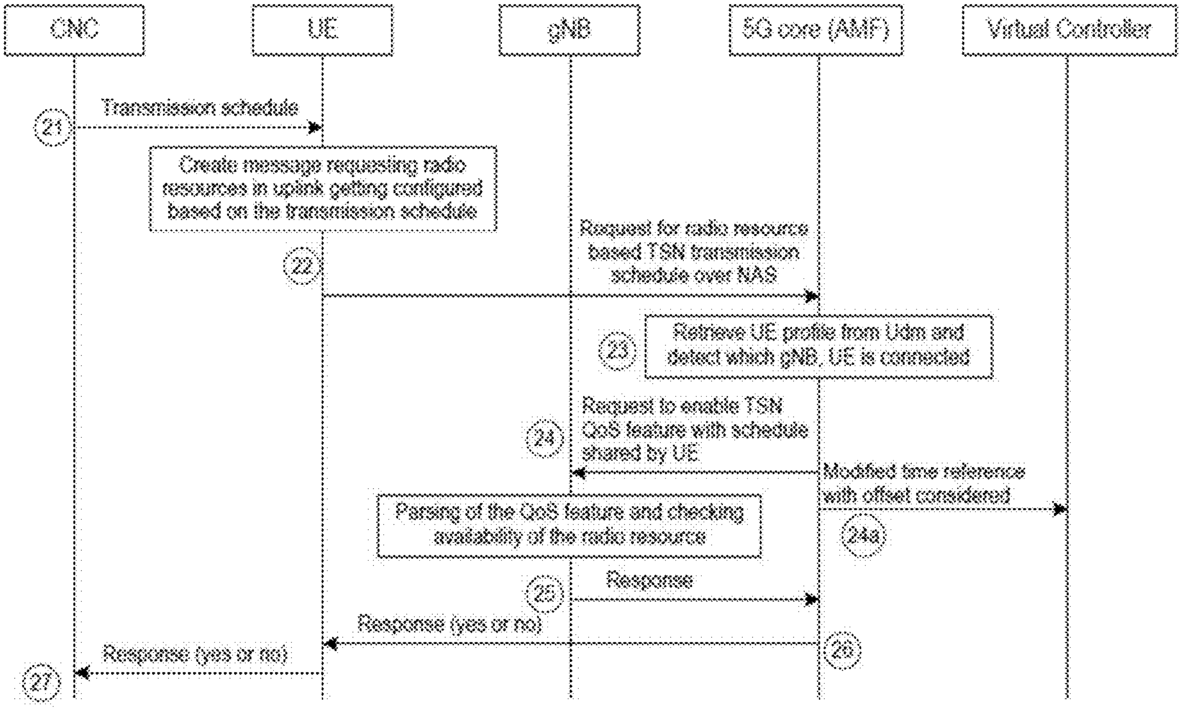
FIG. 116 shows a sequence diagram of an exemplary method and/or procedure for configuring timely delivery of TSN stream packets via the network configuration shown in FIG. 115, according to various exemplary embodiments of the present disclosure.

FIG. 116 shows a sequence diagram of an exemplary method and/or procedure for configuring timely delivery of TSN stream packets via the network configuration shown in FIG. 115, according to these exemplary embodiments. The numbered operations shown in FIG. 116 correspond to the description below. Even so, the numerical labels are used for illustration rather than to specify an order for the operations. In other words, the operations shown in FIG. 116 can be performed in different orders and can be combined and/or divided into other operations than shown in the figure.

In operation 21, the CNC calculates the transmission schedule based on the requirements provided by CUC and sends it to the TSN interface of the 5G network, which is in this case the UE. In operation 22, the UE creates and sends a message requesting uplink (UL) radio resources according to the transmission schedule provided by the CNC, which can be included in the message. For example, the UE can send the message to the AMF in the 5GC. In operation 23, after receiving this message, the AMF retrieves the UE profile from a user data management (UDM) function in the 5GC and, based on this information, determines to which gNB(s) the UE is connected. In operation 24, the AMF sends a request to the gNB(s) to enable the TSN QoS feature towards the UE based on the transmission schedule, which can be included in the request. In some embodiments, the AMF can also send a modified time reference to the other Talker/Listener (e.g., a virtualized controller) connected to the 5G network (operation 24*a*).

In operation 25, the receiving gNB(s) can perform operations substantially similar to those described above with reference to operation 15 of FIG. 114, but with respect to the uplink rather than the downlink. After receiving the response from the gNB(s) sent in operation 25, the AMF can respond (operation 26) to the request for resources received from the UE in operation 22. Similar to operation 16 shown in FIG. 114, the AMF can translate the gNB response—which is based on per QoS flow mapping—to a traffic flow/TSN stream level of granularity and provides a response in this format to the UE. In operation 27, the UE can forward this information to the CNC, in response to the requested transmission schedule received in operation 21. As discussed above in relation to certain embodiments illustrated by FIG. 114, if gNB declines the requested transmission schedule but offers an alternate time window that it can accept, the responses sent in operations 15-17 of FIG. 114 and operations 25-27 of FIG. 116 can include such an alternate time window, formatted and/or translated according to the protocols and/or requirements of the respective recipients.

As can be understood from the above description, these and other exemplary embodiments facilitate time-aware scheduling of transmissions in a cellular network (e.g., a 5G network) according to the time-sensitive (e.g., bounded latency) requirements of an external network, such as a TSN network. The exemplary embodiments facilitate such features through novel techniques for collecting (either via the UE or a network function such as an AMF) information about timing and periodicity associated with traffic provided an external network and forwarding such information to one or more base stations (e.g., gNBs) in the cellular network. In such case, the base station(s) can determine whether the external time-sensitive requirements of the requested traffic can be supported and, if so, utilize such information for scheduling uplink or downlink transmissions between the UE and the base station(s).

Figure 117:
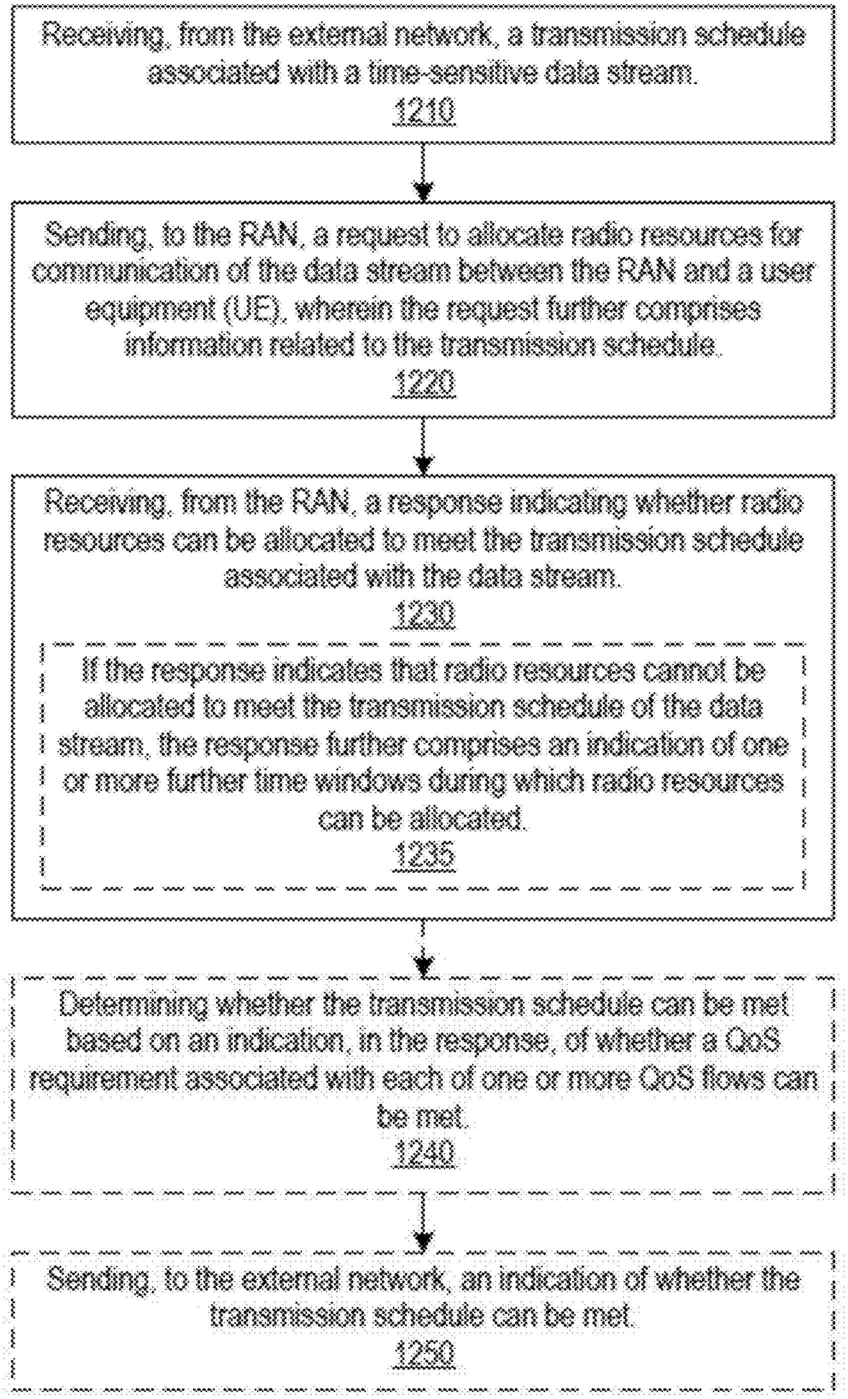
FIG. 117 is a flow diagram illustrating an exemplary method and/or procedure performed by a network node in a core network (e.g., a 5G core network), according to various exemplary embodiments of the present disclosure.

FIG. 117 is a flow diagram illustrating an exemplary method and/or procedure for scheduling resources in a radio access network (RAN) according to a transmission schedule associated with an external network, according to various exemplary embodiments of the present disclosure. The exemplary method and/or procedure shown in FIG. 117 can be implemented in a core network (e.g., 5GC) associated with the RAN (e.g., NG-RAN), such as by a core network node (e.g., AMF) shown in, or described in relation to, other figures herein. Furthermore, as explained below, the exemplary method and/or procedure shown in FIG. 117 can be utilized cooperatively with the exemplary method and/or procedures shown in FIGS. 118 and/or 119 (described below), to provide various exemplary benefits described herein. Although FIG. 117 shows blocks in a particular order, this order is merely exemplary, and the operations of the exemplary method and/or procedure can be performed in a different order than shown in FIG. 117 and can be combined and/or divided into blocks having different functionality. Optional operations are represented by dashed lines.

The exemplary method and/or procedure illustrated in FIG. 117 can include the operations of block 1210, in which the network node can receive, from the external network, a transmission schedule associated with a time-sensitive data stream. Herein, a time-sensitive data stream can be a data stream of a Time-Sensitive Network (TSN). Thus, in some embodiments, the external network comprises a Time-Sensitive Network (TSN) such as described in the IEEE standards discussed herein. In such embodiments, the data stream can comprise a TSN stream, e.g., associated with a Talker and/or Listener end station in the TSN. In such embodiments, the transmission schedule can comprise cycle times and gate control lists for one or more traffic classes comprising the TSN stream.

The exemplary method and/or procedure can also include the operations of block 1220, in which the network node can send, to the RAN, a request to allocate radio resources for communication of the data stream between the RAN and a user equipment (UE), wherein the request further comprises information related to the transmission schedule. In some embodiments, the information related to the transmission schedule includes one or more of the following: an identifier of the UE; identifiers of one or more quality-of-service (QoS) flows associated with the data stream; and a QoS requirement associated with each of the QoS flows. In some embodiments, each QoS requirement can comprise one or more time windows during which the data stream is required to be transmitted. In some embodiments, each QoS requirement comprises an initial time window and a periodicity that identifies subsequent time windows.

The exemplary method and/or procedure can also include the operations of block 1230, in which the network node can receive, from the RAN, a response indicating whether radio resources can be allocated to meet the transmission schedule associated with the data stream. In some embodiments, according to sub-block 1235, if the response indicates that radio resources cannot be allocated to meet the transmission schedule of the data stream, the response further comprises an indication of one or more further time windows during which radio resources can be allocated.

In some embodiments, the response can indicate whether the QoS requirement associated with each of the QoS flows can be met. In such embodiments, the exemplary method and/or procedure can also include the operations of block 1240, in which the network node can determine whether the transmission schedule can be met based on the indication of whether the QoS requirement associated with each of the QoS flows can be met. In some embodiments, the exemplary method and/or procedure can also include the operations of block 1250, in which the network node can send, to the external network, an indication of whether the transmission schedule can be met.

In some embodiments, the method can be performed by an access management function (AMF) in a 5G core network (5GC). In some embodiments, the transmission schedule can be received from the external network; and the radio resources are for downlink communication from the RAN to the UE. In some embodiments, the transmission schedule is received from the UE; and the radio resources are for uplink communication from the UE to the RAN.

Figure 118:
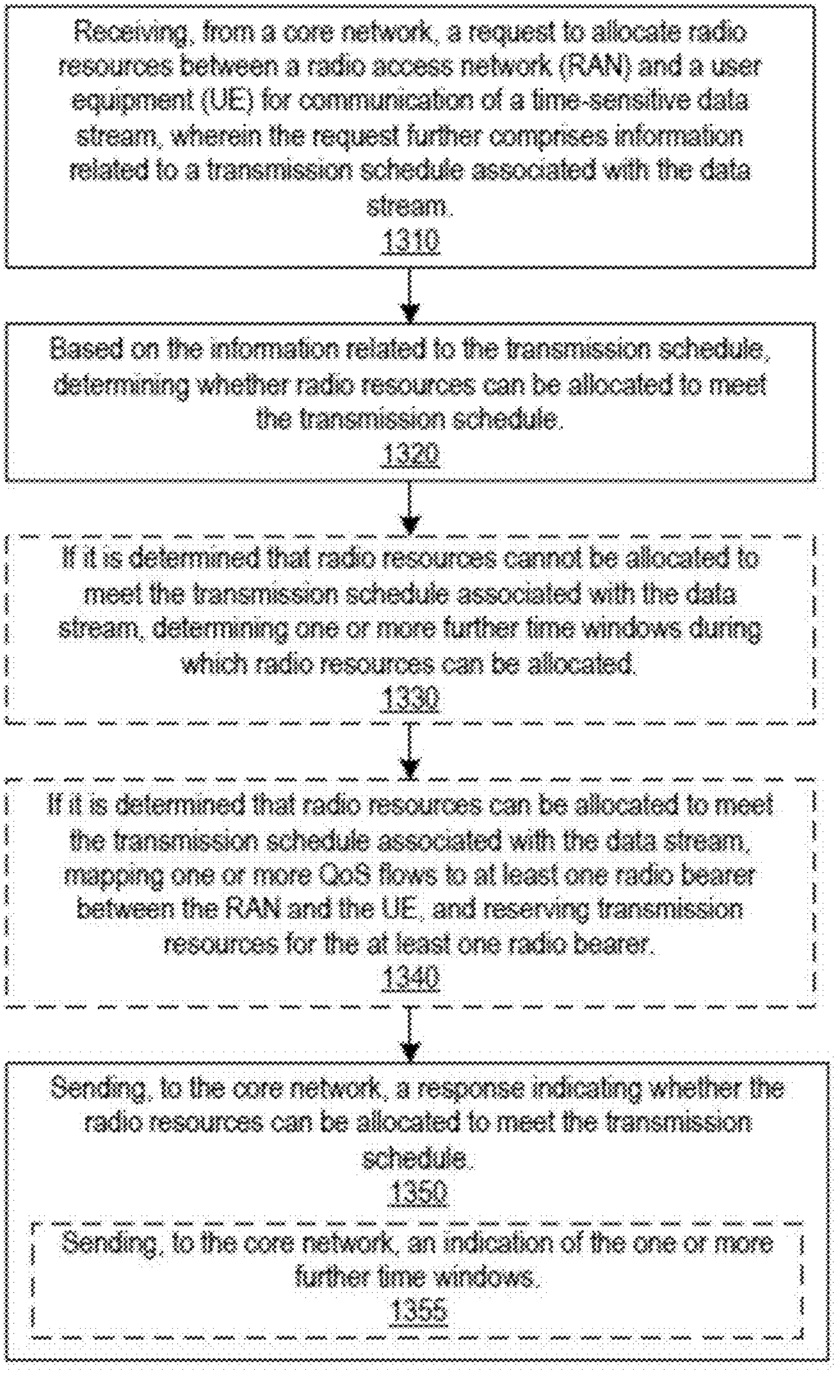
FIG. 118 is a flow diagram illustrating an exemplary method and/or procedure performed by a network node in a radio access network (e.g., NG-RAN), according to various exemplary embodiments of the present disclosure.

FIG. 118 is a flow diagram illustrating an exemplary method and/or procedure for scheduling resources in a radio access network (RAN) according to a transmission schedule associated with an external network, according to various exemplary embodiments of the present disclosure. The exemplary method and/or procedure shown in FIG. 118 can be implemented in a RAN (e.g., NG-RAN) associated with a core network (e.g., 5GC), such as by a RAN node (e.g., gNB) shown in, or described in relation to, other figures herein. Furthermore, as explained below, the exemplary method and/or procedure shown in FIG. 118 can be utilized cooperatively with the exemplary method and/or procedures shown in FIGS. 117 and/or 119 (described above and below), to provide various exemplary benefits described herein. Although FIG. 118 shows blocks in a particular order, this order is merely exemplary, and the operations of the exemplary method and/or procedure can be performed in a different order than shown in FIG. 118 and can be combined and/or divided into blocks having different functionality. Optional operations are represented by dashed lines.

The exemplary method and/or procedure illustrated in FIG. 118 can include the operations of block 1310, in which the network node can receive, from the core network, a request to allocate radio resources between the RAN and a user equipment (UE) for communication of a time-sensitive data stream, wherein the request further comprises information related to a transmission schedule associated with the data stream. In some embodiments, the external network comprises a Time-Sensitive Network (TSN); and the data stream comprises a TSN stream.

In some embodiments, the information related to the transmission schedule includes one or more of the following: an identifier of the UE; identifiers of one or more quality-of-service (QoS) flows associated with the data stream; and a QoS requirement associated with each of the QoS flows. In some embodiments, each QoS requirement can comprise one or more time windows during which the data stream is required to be transmitted. In some embodiments, each QoS requirement comprises an initial time window and a periodicity that identifies subsequent time windows.

The exemplary method and/or procedure illustrated in FIG. 118 can also include the operations of block 1320, in which the network node can, based on the information related to the transmission schedule, determine whether radio resources can be allocated to meet the transmission schedule. In some embodiments, determining whether radio resources can be allocated to meet the transmission schedule can be further based on one or more of the following: resources needed for current or estimated traffic load, capabilities of the UE, channel quality between the RAN and the UE, and need for additional guaranteed resources to be allocated for the UE.

In some embodiments, if it is determined in block 1320 that radio resources cannot be allocated to meet the transmission schedule associated with the data stream, the exemplary method and/or procedure includes the operations of block 1330, where the network node can determine one or more further time windows during which radio resources can be allocated. In some embodiments, if it is determined in block 1320 that radio resources can be allocated to meet the transmission schedule associated with the data stream, the exemplary method and/or procedure includes the operations of block 1340, where the network node can map the one or more QoS flows to at least one radio bearer between the RAN and the UE, and reserve transmission resources for the at least one radio bearer.

The exemplary method and/or procedure also includes the operations of block 1350, in which the network node can send, to the core network, a response indicating whether the radio resources can be allocated to meet the transmission schedule. In some embodiments, if it is determined in block 1320 that radio resources cannot be allocated to meet the transmission schedule, the response sent in block 1350 can also include an indication of the one or more further time windows determined in optional subblock 1330. This is illustrated by optional subblock 1355.

Figure 119:
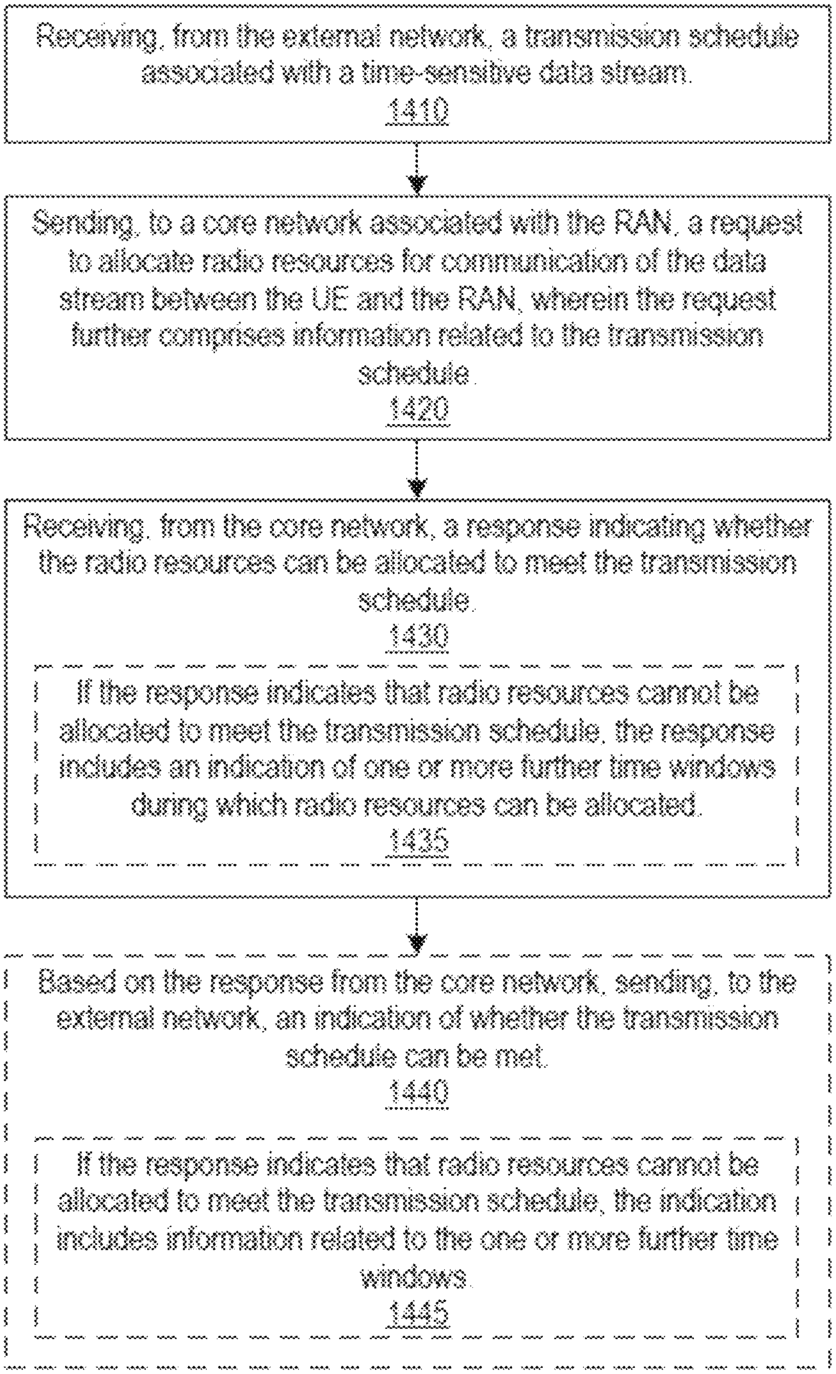
FIG. 119 is a flow diagram illustrating an exemplary method and/or procedure performed by user equipment (UE), according to various exemplary embodiments of the present disclosure.

FIG. 119 is a flow diagram illustrating an exemplary method and/or procedure for scheduling resources in a radio access network (RAN) according to a transmission schedule associated with an external network, according to various exemplary embodiments of the present disclosure. The exemplary method and/or procedure shown in FIG. 119 can be implemented, for example, by a user equipment (UE, e.g., wireless device, IoT device, M2M device, etc.) in communication with a RAN (e.g., NG-RAN) that is associated with a core network (e.g., 5GC), such as shown in, or described in relation to, other figures herein. Furthermore, as explained below, the exemplary method and/or procedure shown in FIG. 119 can be utilized cooperatively with the exemplary method and/or procedures shown in FIGS. 117 and/or 118 (described above), to provide various exemplary benefits described herein. Although FIG. 119 shows blocks in a particular order, this order is merely exemplary, and the operations of the exemplary method and/or procedure can be performed in a different order than shown in FIG. 119 and can be combined and/or divided into blocks having different functionality. Optional operations are represented by dashed lines.

The exemplary method and/or procedure illustrated in FIG. 119 can include the operations of block 1410, in which the UE can receive, from the external network, a transmission schedule associated with a time-sensitive data stream. In some embodiments, the external network comprises a Time-Sensitive Network (TSN) such as described in the IEEE standards discussed herein. In such embodiments, the data stream can comprise a TSN stream, e.g., associated with a Talker and/or Listener end station in the TSN. In such embodiments, the transmission schedule can comprise cycle times and gate control lists for one or more traffic classes comprising the TSN stream.

The exemplary method and/or procedure can also include the operations of block 1420, in which the UE can send, to a core network associated with the RAN, a request to allocate radio resources for communication of the data stream between the UE and the RAN, wherein the request further comprises information related to the transmission schedule. In some embodiments, the information related to the transmission schedule comprises the transmission schedule.

The exemplary method and/or procedure can also include the operations of block 1430, in which the UE can receive, from the core network, a response indicating whether radio resources can be allocated to meet the transmission schedule associated with the data stream. In some embodiments, if the response from the core network indicates that radio resources cannot be allocated to meet the transmission schedule of the data stream, the response further comprises an indication of one or more further time windows during which radio resources can be allocated. This is illustrated by optional subblock 1435. In some embodiments, the request (block 1420) can be sent to, and the response (block 1430) can be received from, an access management function (AMF) in a 5GC.

In some embodiments, the exemplary method and/or procedure can also include the operations of block 1440, in which the UE can send, to the external network, an indication of whether the transmission schedule can be met. In some embodiments, if the response received in block 1430 comprises an indication of one or more further time windows during which radio resources can be allocated (subblock 1435), the indication sent to the external network further includes information related to the one or more further time windows. This is illustrated by optional subblock 1445.

Figure 120:
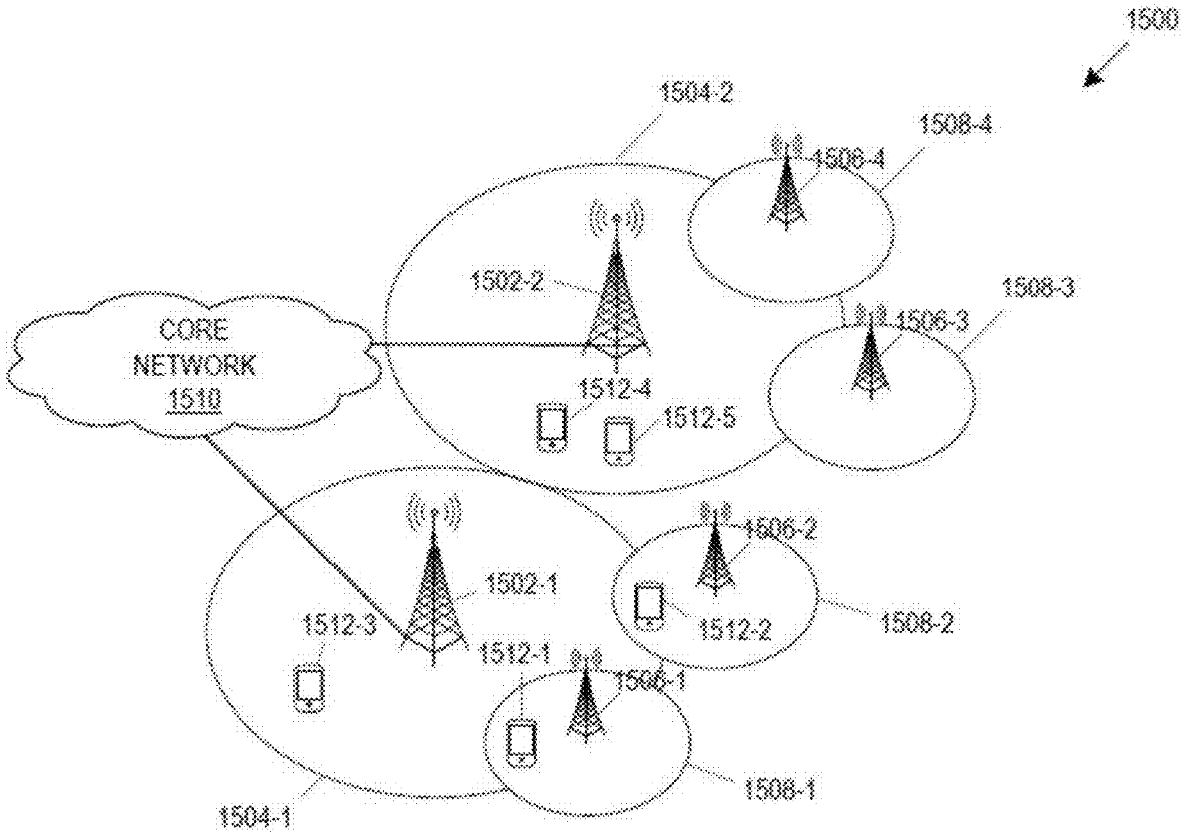

FIG. 120 illustrates one example of a cellular communications system and/or network, comprising various devices and/or systems usable to implement any of the exemplary methods described herein. In the embodiments described herein, the cellular communications network 1500 is a 5G NR network. In this example, the cellular communications network 1500 includes base stations 1502-1 and 1502-2, which in LTE are referred to as eNBs and in 5G NR are referred to as gNBs, controlling corresponding macro cells 1504-1 and 1504-2. The base stations 1502-1 and 1502-2 are generally referred to herein collectively as base stations 1502 and individually as base station 1502. Likewise, the macro cells 1504-1 and 1504-2 are generally referred to herein collectively as macro cells 1504 and individually as macro cell 1504.

The cellular communications network 1500 can also include some number of low power nodes 1506-1 through 1506-4 that control corresponding small cells 1508-1 through 1508-4. The low power nodes 1506-1 through 1506-4 can be small base stations (such as pico or femto base stations), Remote Radio Heads (RRHs), or the like. Notably, while not illustrated, one or more of the small cells 1508-1 through 1508-4 may alternatively be provided by the base stations 1502. The low power nodes 1506-1 through 1506-4 are generally referred to herein collectively as low power nodes 1506 and individually as low power node 1506. Likewise, the small cells 1508-1 through 1508-4 are generally referred to herein collectively as small cells 1508 and individually as small cell 1508. The base stations 1502 (and optionally the low power nodes 1506) are connected to a core network 6150.

The base stations 1502 and the low power nodes 1506 provide service to wireless devices 1512-1 through 1512-5 in the corresponding cells 1504 and 1508. The wireless devices 1512-1 through 1512-5 are generally referred to herein collectively as wireless devices 1512 and individually as wireless device 1512. The wireless devices 1512 are also sometimes referred to herein as UEs. Wireless devices 1512 can take on various forms, including those compatible with MTC and/or NB-IoT.

FIG. 121 is a schematic block diagram of a radio access node 2200 according to some embodiments of the present disclosure. The radio access node 2200 may be, for example, a base station (e.g., gNB or eNB) described herein in relation to one or more other figures. As illustrated, the radio access node 2200 includes a control system 2202 that further includes one or more processors 2204 (e.g., Central Processing Units (CPUs), Application Specific Integrated Circuits (ASICs), Field Programmable Gate Arrays (FPGAs), and/or the like), memory 2206, and a network interface 2208. In addition, the radio access node 2200 includes one or more radio units 2210 that each includes one or more transmitters 2212 and one or more receivers 2214 coupled to one or more antennas 2216. In some embodiments, the radio unit(s) 2210 is external to the control system 2202 and connected to the control system 2202 via, e.g., a wired connection (e.g., an optical cable). However, in some other embodiments, the radio unit(s) 2210 and potentially the antenna(s) 2216 are integrated together with the control system 2202. The one or more processors 2204 operate to provide one or more functions of a radio access node 2200 as described herein. In some embodiments, the function(s) are implemented in software that is stored, e.g., in the memory 2206 and executed by the one or more processors 2204.

FIG. 122 is a schematic block diagram that illustrates a virtualized embodiment of the radio access node 2200 according to some embodiments of the present disclosure. This discussion is equally applicable to other types of network nodes. Further, other types of network nodes may have similar virtualized architectures.

As used herein, a "virtualized" radio access node is an implementation of the radio access node 2200 in which at least a portion of the functionality of node 2200 is implemented as a virtual component(s) (e.g., via a virtual machine(s) executing on a physical processing node(s) in a network(s)). As illustrated, in this example, the radio access node 2200 includes the control system 2202 that includes the one or more processors 2204 (e.g., CPUs, ASICs, FPGAs, and/or the like), the memory 2206, and the network interface 2208 and the one or more radio units 2210 that each includes the one or more transmitters 2212 and the one or more receivers 2214 coupled to the one or more antennas 2223, as described above. The control system 2202 is connected to the radio unit(s) 2210 via, for example, an optical cable or the like. The control system 2202 can be connected to one or more processing nodes 2300 coupled to or included as part of a network(s) 2302 via the network interface 2308. Each processing node 2300 can include one or more processors 2310 (e.g., CPUs, ASICs, FPGAs, and/or the like), memory 2306, and a network interface 2308.

In this example, functions 2310 of the radio access node 2200 described herein are implemented at the one or more processing nodes 2300 or distributed across the control system 2202 and the one or more processing nodes 2300 in any desired manner. In some particular embodiments, some or all of the functions 2310 of the radio access node 2200 described herein are implemented as virtual components executed by one or more virtual machines implemented in a virtual environment(s) hosted by the processing node(s) 2300. As will be appreciated by one of ordinary skill in the art, additional signaling or communication between the processing node(s) 2300 and the control system 2202 is used in order to carry out at least some of the desired functions 2310. Notably, in some embodiments, the control system 2202 may not be included, in which case the radio unit(s) 2210 communicate directly with the processing node(s) 2300 via an appropriate network interface(s).

In some embodiments, a computer program including instructions which, when executed by at least one processor, causes the at least one processor to carry out the functionality of radio access node 2200 or a node (e.g., a processing node 2300) implementing one or more of the functions 2310 of the radio access node 2200 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

FIG. 122 is a schematic block diagram of the radio access node 2200 according to some other embodiments of the present disclosure. The radio access node 2200 includes one or more modules 2400, each of which is implemented in software. The module(s) 2400 provide the functionality of the radio access node 2200 described herein. This discussion is equally applicable to the processing node 2300 of FIG. 123, where the modules 2400 may be implemented and/or distributed across one or more processing nodes 2300 and/or control system 2202.

FIG. 124 is a schematic block diagram of a UE 2500 according to some embodiments of the present disclosure. As illustrated, the UE 2500 includes one or more processors 2502 (e.g., CPUs, ASICs, FPGAs, and/or the like), memory 2504, and one or more transceivers 2506 each including one or more transmitters 2508 and one or more receivers 2510 coupled to one or more antennas 2512. In some embodiments, the functionality of the UE 2500 described above may be fully or partially implemented in software that is, e.g., stored in the memory 2504 and executed by the processor(s) 2502.

In some embodiments, a computer program including instructions which, when executed by at least one processor, causes the at least one processor to carry out the functionality of the UE 2500 according to any of the embodiments described herein is provided. In some embodiments, a carrier comprising the aforementioned computer program product can be provided. The carrier can be one of an electronic signal, an optical signal, a radio signal, or a computer readable storage medium (e.g., a non-transitory computer readable medium such as a physical memory).

FIG. 125 is a schematic block diagram of the UE 2500 according to some other embodiments of the present disclosure. In these embodiments, UE 2500 can include one or more modules 2600, each of which is implemented in software. Module(s) 2600 can provide at least a portion of the functionality of UE 2500 described hereinabove.

Transport of Data Flows Over Cellular Networks

FIG. 126 illustrates the architecture of a 5G network and introduces relevant core network functions like the User Plane Function (UPF).

In NR PDCP, header compression is used. The protocol is based on the Robust Header Compression (ROHC) framework defined in IETF RFC 5795: "The Robust Header Compression (RoHC) Framework." The basic idea is to utilize the redundancy in protocol headers of new packets, i.e., use the fact that they are similar or the same as previously received packets. Therefore, subsequent packets do not need to include the full protocol header information since it is already known from previously received packets. A compression/decompression context is maintained to keep track of that information. Several different RoHC profiles with different header compression algorithms/variants exist and are defined/referred to in the NR PDCP specification.

The UE undergoes a handover procedure when it changes its primary cell. The source and target cell may be belonging to different gNBs. Focusing on the user plane protocol stack involved in this procedure: the UE resets MAC with HARQ processes, as well as re-establishes (flushes) the RLC entities. The PDCP protocol serves as the handover anchor, meaning that PDCP will in acknowledged mode do retransmissions of not yet acknowledged data, that might have been lost due to MAC/HARQ and RLC flushing at handover.

In dual connectivity, beside handover, a radio bearer might be changed from MCG type to/from SCG type or to/from Split type. This can be realized with the handover procedure including PDCP re-establishment, or alternatively with the PDCP data recovery procedure.

Support for Ethernet PDU sessions over 5G networks was introduced in 3GPP TS 23.501 and TS 23.502 (see, for example, versions 15.2.0 of both those specifications).

FIG. 127 shows the protocol stack for Ethernet PDU type data (user plane) as defined in release 15 of 3GPP TS 29.561, "Interworking between 5G Network and External Data Networks; Stage 3". External data networks may include, for example, Ethernet LANs. Key characteristics for such interworking with external Data Networks (DNs) include:

- UPF shall store MAC addresses received from the DN or the UE; the 5G network does not assign MAC addresses to UEs
- Ethernet preamble, Start Frame Delimiter (SFD) and Frame Check Sequence (FCS) are not sent over 5GS

- The SMF provides Ethernet filter set and forwarding rules to the UPF based on the Ethernet Frame Structure and UE MAC addresses
- During PDU session establishment a DN-AAA (Data Network—Authentication, Authorization and Accounting) server can provide a list of MAC addresses allowed for this particular PDU session (see release 15 of 3GPP TS 29.561).
- IP layer is considered as an application layer which is not part of the Ethernet PDU Session (see release 15 of 3GPP TS 29.561)

Time Sensitive Networking (TSN) is a set of features that allow deterministic networking in Ethernet based wired communication networks. Within a TSN network the communication endpoints are called Talker and Listener. All the switches (e.g., bridges) in between Talker and Listener need to support certain TSN features, like e.g. IEEE 802.1AS time synchronization. All nodes that are synchronized in the network belong to a so-called TSN domain. TSN communication is only possible within such a TSN domain. To allow for deterministic communication, TSN communication happens in streams, that are setup across the TSN domain before the data communication takes place. In the TSN network, there are different possibilities as to how frames are identified and mapped to a TSN stream, as defined in IEEE 802.1CB. The identification might be based on MAC addresses and VLAN-headers and/or IP headers. But as the TSN standard is under development now, other aspects (e.g. the Ether-Type field) might also be introduced therein to identify frames. After a TSN stream has been established in the TSN network, frames are identified in the whole TSN network based on the specific stream identifiers.

There is currently no header compression defined for Ethernet frames for a 5G network. This would lead to transmission of uncompressed Ethernet frames, which entails a significant overhead given the typically small payload sizes for certain types of traffic, such as industrial IoT/URLLC traffic.

During handover re-establishment and data recovery, RoHC performance cannot be guaranteed, which is problematic for services relying on guaranteed transmission success. Counteracting this issue by provisioning more resources for the service (e.g. not using RoHC) is likely to lead to unacceptable resource wastage.

A protocol for Ethernet header compression aligned with RoHC may sometimes be able to lead to good compression ratios but not deterministically, e.g. in the above handover situation. This leads to the disadvantage of radio access nodes (e.g., gNB) also being unable to reserve minimum-needed resources deterministically, i.e. such nodes may need to reserve more resources for the case that header compression does not lead to full compression, coming with additional resource wastage.

A RoHC compression context loss (e.g., due to a handover) will lead to delays in packet forwarding at the receiver which may be unacceptable for URLLC traffic.

Certain aspects of the present disclosure and their embodiments may provide solutions to these or other challenges.

The present disclosure is described within the context of 3GPP NR radio technology (e.g., 3GPP TS 38.300 V1.3.0). However, it will be understood by those skilled in the art that embodiments of the disclosure also apply to other cellular communication networks. Embodiments of the disclosure enable the efficient transport of data flows (e.g., time-sensitive data flows, such as those for time-sensitive networking (TSN)) over a cellular (e.g., 5G) network by compressing redundant information. This is achieved by making one or more core network nodes TSN-aware, supporting the handling of the TSN flows while reducing unnecessary overhead.

Methods are outlined in this disclosure for header compression of Ethernet/TSN stream-based transmissions in a 5G network. Compared to known methods like RoHC for IP header compression, the methods outlined herein rely on specific properties of the Ethernet/TSN stream to enable a deterministic compression ratio.

There are, proposed herein, various embodiments which address one or more of the issues disclosed herein.

Certain embodiments may provide one or more of the following technical advantage(s). Ethernet header compression in cellular networks generally lowers resource usage, increasing capacity. Embodiments of the disclosure may lead to a deterministic compression ratio, i.e. enabling deterministic minimum-needed resource reservations for the flow/UE instead of needing to account for situations where this optimum compression ratio cannot be met. In this way, the capacity of the system is improved.

As described below, embodiments of the disclosure assume that values for one or more fields in a data packet header (e.g., an Ethernet header) are static for an established data stream such as a TSN stream. In this context, a value may be considered "static" if it remains the same for multiple data packets in sequence within the data stream. Thus, this does not preclude embodiments in which the values for the fields in the header are updated as necessary (i.e. semi-static). The values for the fields may or may not remain the same for the lifetime of the data stream.

TSN streams are established and a configuration is applied across all nodes involved in the TSN stream before any data packet is transmitted. This includes also, that TSN stream identifiers are announced.

FIG. 128 shows a frame structure for a TSN data packet. Within a TSN stream, header fields are used to identify a stream. These fields comprise of e.g. DST MAC address (6 byte), VLAN-header (4 bytes) and IP-Header fields (various fields). These fields are not usually altered after a TSN stream has been setup. Therefore, these fields offer the possibility of a static compression throughout the 5G network, e.g. UPF to UE, gNB to UE, etc.

According to one embodiment of the disclosure, one or more fields within a header for the data packet are configured for the UE and/or the gNB or UPF before data transmission takes place. For example, the one or more fields may comprise the Ethernet header and maybe also other header fields as for example parts of an IP-header in case they are used for TSN stream identification.

The values for the fields in the header for packets received or transmitted in a QoS flow may be configured per QoS flow. Additionally or alternatively, the values for the fields in the header for packets received or transmitted in a PDU session may be configured per PDU session.

The procedure for downlink is illustrated in FIG. 129.

For TSN streams in the Downlink the 5G CN (e.g., a core network node, such as the AMF or UPF, or a combination of both) may use information from a TSN network regarding TSN stream identification and which fields can be treated as static or not, or it might use a pre-configuration for this.

An identifier might be added to data packets inside of PDU sessions or QoS Flows to differentiate multiple TSN/Ethernet streams within the same session or flow (thus the identifier is for a particular TSN/Ethernet stream). For example, the identifier may be used instead of the Ethernet header fields removed statically for transmission; an 8-bit header might be sufficient to separate TSN streams inside sessions or flows.

For header compression between UPF and UE (initiated by 5G CN), NAS signaling is used. This comprises to signal the header content that is statically mapped to the UE and optionally also a stream identifier that is used within a PDU session or within a QoS Flow to differentiate between different TSN streams. The 5G CN configures the UPF for the static mapping.

For Downlink transmissions for header compression between gNB and UE, RRC signaling can be used, i.e. when a new QoS flow is established for the UE, the UE is instructed to utilize the configured header for packets received on this QoS flow. In an alternative embodiment, PDCP control signaling is employed to indicate updates to the otherwise static header context (i.e. providing the UE with a new header context), allowing a semi-static header configuration for the UE.

Furthermore, in all cases above, when an update of the static header is indicated, or the new static header is indicated, a sequence number may be indicated alongside, identifying the packet from which onwards the new header should be used for decompression.

In a further embodiment, in the receiving entity (e.g., UE in DL), reordering of received packets according to a sequence number should be applied prior to header decompression. This way, when indicating new configured headers alongside with a sequence number, the first packet for which a new configured header is valid is identified.

The procedure for uplink is illustrated in FIG. 130.

For TSN streams in the Uplink the UE might get information from a TSN network regarding TSN stream identification and which fields can be treated as static or not and inform the 5G CN accordingly (e.g., by forwarding the request from the TSN network to the 5G CN).

An identifier might be added to data packets inside of PDU sessions or QoS Flows to differentiate multiple TSN/Ethernet streams within the same session or flow (thus the identifier is for a particular TSN/Ethernet stream). For example, the identifier may be used instead of the Ethernet header fields removed statically for transmission; an 8-bit header might be sufficient to separate TSN streams inside sessions or flows.

For header compression between UE and UPF (initiated by UE), again NAS signaling is used. The UE might request a static header compression from the SGCN by signaling the request over NAS alongside any TSN configuration data it has received from a TSN network regarding the TSN stream packet headers. The SGCN may then configure the static mapping in the UPF and possibly also assign a stream identifier that is used within a PDU session or within a QoS Flow to differentiate between multiple TSN streams. The SGCN may use NAS signaling to inform the UE about the static mapping, as well as a potential identifier to use. The SGCN configures the UPF for the static mapping.

Furthermore, in all cases above, when an update of the static header is indicated, or the new static header is indicated, a sequence number may be indicated alongside, identifying the packet from which onwards the new header should be used for decompression.

For Uplink transmissions, the UE is configured to remove the Ethernet header fields before transmission. The configuration may be indicated via RRC signaling or NAS signaling. The header removal function may be implemented in an SDAP or PDCP transmission algorithm. A sequence number may be indicated identifying the first packet from which onwards the removal of Ethernet header fields applies.

For Uplink transmissions, the UE indicates the (removed) header to the 5G network prior to any data transmission, so that the 5G network can consider the header when receiving packets from the UE. Also, in this case the header can be configured per QoS flow or per PDU session. Furthermore, a sequence number may be indicated identifying the first packet for which the header had been removed and the configured header should be applied to.

In a further embodiment, in the receiving entity (gNB or UPF in UL), reordering of received packets according to a sequence number should be applied prior to header decompression. This way, when indicating new configured headers alongside with a sequence number, the first packet for which a new configured header is valid for is identified.

To handle TSN streams over radio, radio resources may be pre-allocated using e.g. semi-persistent scheduling (SPS) or instant-uplink access (IUA). Resource pre-allocation benefits from a known payload size for transmission. In the RoHC framework the worst-case payload size is still the whole packet including all headers; as it cannot be determined when it is necessary to transmit the full context, it would be necessary to reserve resources for the worst-case. This is not the case for the static header compression method outlined above.

TSN is based on timely delivery of packets. Packets that have to be retransmitted or buffered because of a context unawareness lead to packet latencies that are most likely unacceptable. It would be better to either discard the packet or reuse an old (or as introduced in this disclosure, statically configured) context instead.

FIG. 131 depicts a method in accordance with particular embodiments. The method may be performed by one or more core network nodes. For example, the method may be performed by an AMF and/or a UPF (such as the AMF and UPF described above with respect to FIG. 126. Further, the method may relate or correspond to the actions of the element "5G CN" in FIG. 129 described above. The method enables transport of data packets associated with a data stream (such as a TSN or other time-critical data stream) in an external data network (such as an Ethernet network or LAN).

The method begins at step VV102, in which the core network node(s) obtains configuration information for a data stream in an external data network. The configuration information indicates respective values for one or more fields within a header of data packets associated with the data stream which are to remain static. The core network node(s) may receive such configuration information from the external data network directly (e.g., in a request message to establish the data stream), or be pre-configured with the information. The one or more fields for which values may be static may comprise one or more Ethernet header fields, such as one or more (or all) of: destination address field; source address field; virtual LAN tag field; and type/length field. The one or more fields may additionally or alternatively comprise one or more fields in the IP header.

In step VV104, the core network node(s) initiates transmission of the configuration information to a wireless device which is to receive the data stream. For example, the configuration information may be transmitted via NAS signalling.

The core network node(s) may establish an identifier for the data stream to enable it to be distinguished from other data streams. In embodiments where data packets are transmitted to the wireless device as part of a PDU session or QoS flow, the identifier may be unique within the PDU session or QoS flow (and therefore in such embodiments an identifier value may be re-used for different data flows outside the PDU session or QoS flow). The configuration information may additionally include the identifier for the associated data stream.

In step VV106, the core network node(s) receives a data packet associated with the data stream from the external data network. The data packet may be identified as being associated with, or belonging to, the data stream via any suitable mechanism. The identification might be based on MAC addresses and VLAN-headers and/or IP headers. Alternatively or additionally, other aspects (e.g. the Ether-Type field) might also be introduced therein to identify data packets.

In step VV108, the core network node(s) removes the one or more fields from the data packet to generate a compressed data packet. That is, the core network node(s) removes the one or more fields which were identified in the configuration information obtained in step VV102. Optionally, the core network node(s) may add the identifier for the data stream to the compressed data packet. It will be understood that the identifier may be added to the data packet before or after the one or more fields have been removed.

In step VV110, the core network node(s) initiates transmission of the compressed data packet to the wireless device. For example, the core network node(s) may send the compressed data packet to a radio access node (such as a gNB or other base station) for onward transmission to the wireless device.

In further embodiments of the disclosure, the configuration information for the data stream may become updated after the configuration above has been established. In such embodiments, updated configuration information may be obtained for the data stream (e.g., from the external data network), comprising an indication of respective updated values for one or more fields within the header of data packets associated with the data stream which are to remain static. The one or more fields which have static values may be the same as or different to the one or more fields identified originally. The updated configuration information can then be transmitted to the wireless device (e.g., via NAS signalling) to enable the wireless device to decompress data packets which have had header information removed according to the updated configuration. The updated configuration information may comprise a sequence number, indicating the data packet in the sequence of data packets associated with the data stream from which the updated configuration is to apply.

FIG. 132 depicts a method in accordance with particular embodiments. The method may be performed by one or more core network nodes. For example, the method may be performed by an AMF and/or a UPF (such as the AMF and UPF described above with respect to FIG. 126. Further, the method may relate or correspond to the actions of the element "5G CN" in FIG. 130 described above. The method enables transport of data packets associated with a data stream (such as a TSN or other time-critical data stream) in an external data network (such as an Ethernet network or LAN).

The method begins at step VV202, in which the core network node(s) obtains configuration information for a data stream in an external data network. The configuration information indicates respective values for one or more fields within a header of data packets associated with the data stream which are to remain static. The core network node(s) may receive such configuration information from the external data network directly (e.g., in a request message to establish the data stream), from a wireless device which is to transmit data packets associated with or belonging to the data stream (e.g., in a request message from the external data network forwarded by the wireless device over signalling such as NAS signalling) or be pre-configured with the information. The one or more fields for which values may be static may comprise one or more Ethernet header fields, such as one or more (or all) of: destination address field; source address field; virtual LAN tag field; and type/length field. The one or more fields may additionally or alternatively comprise one or more fields in the IP header.

An identifier for the data stream may be established to enable it to be distinguished from other data streams. In embodiments where data packets are transmitted by the wireless device as part of a PDU session or QoS flow, the identifier may be unique within the PDU session or QoS flow (and therefore in such embodiments an identifier value may be re-used for different data flows outside the PDU session or QoS flow). The configuration information may additionally include the identifier for the associated data stream. Alternatively, where the core network node(s) establish the identifier for the data stream, the identifier may be transmitted by the core network node(s) to the wireless device.

Optionally, the method may further comprise a step (not illustrated) of sending the configuration information to the wireless device which is to transmit data packets associated with or belonging to the data stream. This step may particularly apply when the configuration information in step VV202 is not received from the wireless device, or when the wireless device is unable to process and obtain the configuration information itself (e.g., from a request message received from the external data network). The configuration information may be sent via NAS signalling, for example.

In step VV204, the core network node(s) receives a data packet associated with the data stream from the wireless device. The data packet is compressed by the removal of one or more fields in the header (e.g., by the wireless device following the method set out below in FIG. 133), according to the configuration information obtained in step VV202.

In step VV206, the core network node(s) adds the one or more fields from the data packet to generate a decompressed data packet. That is, the core network node(s) adds the one or more fields which were identified in the configuration information obtained in step VV202.

In step VV208, the core network node(s) initiates transmission of the decompressed data packet over the external data network.

In further embodiments of the disclosure, the configuration information for the data stream may become updated after the configuration above has been established. In such embodiments, updated configuration information may be obtained for the data stream (e.g., from the external data network or the wireless device), comprising an indication of respective updated values for one or more fields within the header of data packets associated with the data stream which are to remain static. The one or more fields which have static values may be the same as or different to the one or more fields identified originally. The updated configuration information transmitted to the wireless device (e.g., via NAS signalling), particularly if the updated configuration information is received from the external data network directly. Additionally or alternatively, the updated configuration information is utilized to decompress received data packets in future which have been compressed by the wireless device according to the updated configuration. The updated configuration information may comprise a sequence number, indicating the data packet in the sequence of data packets associated with the data stream from which the updated configuration is to apply. Thus the core network node(s) may add header fields according to the updated configuration for all data packets which follow the sequence number indicated in the updated configuration information. Optionally, the core network node(s) may re-order received data packets according to their respective sequence numbers to facilitate this processing.

FIG. 133 depicts a method in accordance with particular embodiments. The method may be performed by a wireless device (such as the UE described above with respect to FIG. 126). Further, the method may relate or correspond to the actions of the element "UE" in FIG. 129 described above. The method enables transport of data packets associated with a data stream (such as a TSN or other time-critical data stream) in an external data network (such as an Ethernet network or LAN).

The method begins at step XX102, in which the wireless device obtains configuration information for a data stream in an external data network. The configuration information indicates respective values for one or more fields within a header of data packets associated with the data stream which are to remain static. The wireless device may receive such configuration information from the external data network directly (e.g., in a request message to establish the data stream), or from one or more core network nodes (e.g., via a transmission from a radio access network node, such as a gNB or other base station, via NAS signalling). The one or more fields for which values may be static may comprise one or more Ethernet header fields, such as one or more (or all) of: destination address field; source address field; virtual LAN tag field; and type/length field. The one or more fields may additionally or alternatively comprise one or more fields in the IP header.

An identifier for the data stream may be established to enable it to be distinguished from other data streams. In embodiments where data packets are received by the wireless device as part of a PDU session or QoS flow, the identifier may be unique within the PDU session or QoS flow (and therefore in such embodiments an identifier value may be re-used for different data flows outside the PDU session or QoS flow). The configuration information may additionally include the identifier for the associated data stream.

In step XX104, the wireless device receives a data packet associated with the data stream from the radio access network node. The data packet is compressed by the removal of one or more fields in the header (e.g., by the core network node(s) or the radio access network node itself following the method set out above), according to the configuration information obtained in step XX102.

In step XX106, the wireless device adds the one or more fields from the data packet to generate a decompressed data packet. That is, the wireless device adds the one or more fields which were identified in the configuration information obtained in step XX102. Optionally, the decompressed data packet may be transmitted onwards over the external data network.

In further embodiments of the disclosure, the configuration information for the data stream may become updated after the configuration above has been established. In such embodiments, updated configuration information may be obtained for the data stream (e.g., from the core network node), comprising an indication of respective updated values for one or more fields within the header of data packets associated with the data stream which are to remain static. The one or more fields which have static values may be the same as or different to the one or more fields identified originally. The updated configuration information is then utilized to decompress received data packets in future which have been compressed by the core network node(s) or radio access network node according to the updated configuration. The updated configuration information may comprise a sequence number, indicating the data packet in the sequence of data packets associated with the data stream from which the updated configuration is to apply. Thus the wireless device may add header fields according to the updated configuration for all data packets which follow the sequence number indicated in the updated configuration information. Optionally, the wireless device may re-order received data packets according to their respective sequence numbers to facilitate this processing.

FIG. 134 depicts a method in accordance with particular embodiments. The method may be performed by a wireless device (such as the UE described above with respect to FIG. 126). Further, the method may relate or correspond to the actions of the element "UE" in FIG. 130 described above. The method enables transport of data packets associated with a data stream (such as a TSN or other time-critical data stream) in an external data network (such as an Ethernet network or LAN).

The method begins at step XX202, in which the wireless device obtains configuration information for a data stream in an external data network. The configuration information indicates respective values for one or more fields within a header of data packets associated with the data stream which are to remain static. The wireless device may receive such configuration information from the external data network directly (e.g., in a request message to establish the data stream), or from one or more core network nodes (e.g., via NAS or RRC signalling). The one or more fields for which values may be static may comprise one or more Ethernet header fields, such as one or more (or all) of: destination address field; source address field; virtual LAN tag field; and type/length field. The one or more fields may additionally or alternatively comprise one or more fields in the IP header.

An identifier for the data stream may be established (e.g., by the one or more core network nodes) to enable it to be distinguished from other data streams. In embodiments where data packets are received by the wireless device as part of a PDU session or QoS flow, the identifier may be unique within the PDU session or QoS flow (and therefore in such embodiments an identifier value may be re-used for different data flows outside the PDU session or QoS flow). The configuration information may additionally include the identifier for the associated data stream.

In step XX204, the wireless device obtains a data packet associated with or belonging to the data stream. For example, the data packet may be received from the external data network, or generated by the wireless device (e.g., in response to some user interaction or by execution of an application on the wireless device).

In step XX206, the wireless device removes the one or more fields from the data packet to generate a compressed data packet. That is, the wireless device removes the one or more fields which were identified in the configuration information obtained in step XX202. Optionally, the wireless device may add the identifier for the data stream to the compressed data packet. It will be understood that the identifier may be added to the data packet before or after the one or more fields have been removed. The header removal function may be implemented in an SDAP or PDCP transmission algorithm.

In step XX208, the wireless device initiates transmission of the compressed data packet over the external data network. For example, the wireless device may send the compressed data packet in a transmission to a radio access network node (such as a gNB or other base station) for onward transmission to one or more core network nodes and thereafter the external data network. The one or more core network nodes are enabled to decompress the compressed data packets prior to their transmission over the external data network, e.g., by following the methods set out above).

In further embodiments, the configuration information for the data stream may become updated after the configuration above has been established. In such embodiments, updated configuration information may be obtained for the data stream (e.g., from the external data network), comprising an indication of respective updated values for one or more fields within the header of data packets associated with the data stream which are to remain static. The one or more fields which have static values may be the same as or different to the one or more fields identified originally. The updated configuration information can then be transmitted by the wireless device (e.g., via NAS signalling) to one or more core network nodes to enable those core network nodes to decompress data packets which have had header information removed according to the updated configuration. The updated configuration information may comprise a sequence number, indicating the data packet in the sequence of data packets associated with the data stream from which the updated configuration is to apply.

It will be appreciated that the methods shown in FIGS. 131-134 may be implemented in one or more of the nodes shown in FIGS. 120-125, as appropriate.

Combination of Resource-Scheduling and Header-Compression Techniques

As indicated above, the various techniques described herein may be combined with each other, to provide advantages with respect to latency, reliability, etc. For example, one particular combination that is advantageous is the combination of the techniques described above for scheduling resources and the techniques described for compressing headers of TSN frames.

Thus, for example, the method illustrated in FIG. 117 can be combined with the method shown in FIG. 131, resulting in a method performed in one or more nodes of a core network associated with a radio access network (RAN) for handling a time-sensitive data stream associated with a user equipment (UE) and an external network. This method comprises, as shown at block 1210 of FIG. 117, the step of receiving, from the external network, a transmission schedule associated with a time-sensitive data stream, and further comprises, as shown at block 1220 of that same figure, the step of sending, to the RAN, a request to allocate radio resources for communication of the data stream between the RAN and a first UE, wherein the request further comprises information related to the transmission schedule. As shown at block 1230 of FIG. 117, the method further comprises receiving, from the RAN, a response indicating whether radio resources can be allocated to meet the transmission schedule associated with the data stream.

The method further comprises the step of obtaining configuration information for the data stream, the configuration information indicating respective values for one or more fields within a header of data packets associated with the data stream which are to remain static; this step is shown at block VV102 of FIG. 131. The method still further comprises the steps of initiating transmission of the configuration information to the first UE, receiving a data packet associated with the data stream from the external data network, removing the one or more fields from the data packet to generate a compressed data packet, and initiating transmission of the compressed data packet to the first UE, as shown at blocks VV104, VV106, VV108, and VV110 of FIG. 131.

It will be appreciated that any of the variations discussed above for these techniques may apply here, for the combined technique. Thus, for example, the external network comprises a Time-Sensitive Network (TSN), in some embodiments, and the data stream comprises a TSN stream. Here, the transmission schedule may comprise cycle times and gate control lists for one or more traffic classes comprising the TSN stream.

In some embodiments, the information related to the transmission schedule includes one or more of the following: an identifier of the first UE; identifiers of one or more quality-of-service, QoS, flows associated with the data stream; and a QoS requirement associated with each of the QoS flows. In some of these embodiments, each QoS requirement comprises one or more time windows during which the data stream is required to be transmitted and/or an initial time window and a periodicity that identifies subsequent time windows. In some of these latter embodiments, if the response indicates that radio resources cannot be allocated to meet the transmission schedule of the data stream, the response further comprises an indication of one or more further time windows during which radio resources can be allocated. In some embodiments, the response indicates whether the QoS requirement associated with each of the QoS flows can be met, and the method further comprises determining whether the transmission schedule can be met based on the indication of whether the QoS requirement associated with each of the QoS flows can be met.

In some embodiments, the method further comprises sending, to the external network, an indication of whether the transmission schedule can be met. In some of these and in other embodiments, the method is performed by an access management function (AMF) in a 5G core network (5GC). The transmission schedule may be received from the external network and the radio resources may be for downlink communication from the RAN to the first UE, in some embodiments, or the transmission schedule may be received from the first UE and the radio resources may be for uplink communication from the first UE to the RAN, in other embodiments or instances.

In some embodiments, the step of obtaining configuration information comprises receiving the configuration information from the external data network. In others, the configuration information is pre-configured in the one or more nodes of the core network.

In some embodiments, the compressed data packet comprises an identifier for the data stream. The identifier may be added by the one or more nodes of the core network node.

In some embodiments, the compressed data packet is transmitted to the first UE as part of a protocol data unit (PDU) session or a quality of service (QoS) flow. In some of these embodiments, the identifier mentioned above may be unique within the PDU session or QoS flow.

In some embodiments, the configuration information is transmitted to the first UE using non-access stratum (NAS) signaling. In some, the configuration information comprises an identifier for the data stream.

In some embodiments, the method further comprises obtaining updated configuration information for the data stream, the updated configuration information comprising an indication of respective updated values for one or more fields within the header of data packets associated with the data stream which are to remain static, and initiating transmission of the updated configuration information to the first UE. This updated configuration information further may comprise an indication of a sequence number identifying a data packet associated with the data stream from which the respective updated values apply.

In any of the preceding embodiments, the data packet may comprise user data, and the step of initiating transmission of the compressed data packet to the first UE may comprise forwarding the user data to the first UE via a transmission to a base station.

The decompression techniques described above may also be combined with these techniques. Thus, some methods carried out by one or more nodes of the core network may comprise receiving a data packet associated with the data stream from a second UE; adding the one or more fields to the data packet to generate a decompressed data packet; and initiating transmission of the decompressed data packet over the external data network, as shown at blocks VV204, VV206, and VV208 of FIG. 132.

In some embodiments, the method may further comprise initiating transmission, to the second UE, of an indication of the respective values for one or more fields within the header of data packets associated with the data stream which are to remain static. The data packet may comprise user data, and the step of initiating transmission of the decompressed data packet over the external data network may comprise forwarding the user data to a host computer over the external data network.

TSN Over a RAN

At least some units of factory automation, such as autonomous, multifunctional, and/or mobile machinery and robots, require networking by means of wireless radio communication. However, a factory unit acting as a mobile terminal of the RAN, e.g., a 3GPP user equipment (UE), would have to establish a radio connection with a radio base station of the RAN just to find out that this particular radio base station does not support TSN.

Accordingly, there is a need for a technique that enables TSN over wireless radio communication. An alternative or more specific object is to enable a mobile terminal to specifically select a radio base station that supports TSN, preferably prior to establishing a radio connection between the mobile terminal and the radio base station.

FIG. 135 shows a flowchart for a method 400 of handling TSN over a RAN. The method 400 comprises a step 402 of receiving SI from a RBS of the RAN. The SI is implicative or indicative as to support for TSN through the RBS. The SI may be RBS-specific. The method 400 further comprises a step 404 of establishing or initiating to establish, depending on the received SI, at least one TSN stream of the TSN through the RBS. The method 400 may be performed by a UE radio-connected or radio-connectable to the RAN.

FIG. 136 shows a flowchart for a method 500 of announcing TSN over a RAN.

The method 500 comprises a step 502 of transmitting SI from a RBS of the RAN. The SI is implicative or indicative as to support for TSN through the RBS. The SI may be RBS-specific. The method 500 further comprises a step 504 of supporting, according to the transmitted SI, at least one TSN stream of the TSN through the RBS. The method 500 may be performed by the RBS of the RAN, for example.

FIG. 137 shows a flowchart for a method 600 of distributing a configuration message for TSN over a RAN. The method 600 comprises a step 602 of determining at least one configuration message indicative or implicative as to support for the TSN through at least one RBS of the RAN. The method 600 further comprises a step 604 of sending the at least one configuration message from a CN to each of the at least one RBS of the RAN.

The method 600 may be performed by the CN and/or the using a network component of the CN, the AMF or MME, and/or using a TSN function. The TSN function may be a Centralized Network Configuration (CNC) or a Centralized User Configuration (CUC).

The step 404 of establishing or initiating to establish, depending on the received SI, the at least one TSN stream may comprise selectively (e.g., conditionally) establishing or selectively (e.g., conditionally) initiating to establish the at least one TSN stream. The selectivity (e.g., conditionality) may be dependent on the received SI. The UE may decide, based on the SI from the RBS, whether to attempt establishing the TSN stream, e.g., prior to accessing or connecting with the base station, or not.

The step 404 of establishing or initiating to establish the at least one TSN stream may comprise selectively performing or selectively initiating to perform at least one of a random access procedure with the RBS of the RAN; a radio resource control (RRC) connection setup with the RBS of the RAN; and a network attach procedure with a CN connected to the RAN. The selectivity may be dependent on the received SI.

The establishing step 404 may comprise performing or initiating to perform a TSN application that uses the at least one established TSN stream. The TSN application or a client of the TSN application may be performed at the UE. The selectivity (e.g., the conditionality) in the step 404 may be fulfilled if the received SI is indicative of TSN features required by the TSN application.

The step 402 of receiving the SI is performed with respect to each of a plurality of RBSs of the RAN. The step 404 of establishing or initiating to establish the at least one TSN stream may comprise selecting, among the plurality of RBSs, the RBS the SI of which is indicative of TSN features required by the TSN application.

The RBS which best fulfills the required TSN features according to the respective SI may be selected (e.g., if none of the plurality of RBSs fulfills the required TSN features). Alternatively or in addition, the RBS which SI is indicative of the most preferably TSN features may be selected (e.g., if more than one of the plurality of RBSs fulfills the required TSN features).

The method 400 may further comprise a step of sending a control message to the CN. The control message may be indicative of TSN features required by the TSN application. The control message may be a non-access stratum (NAS) message.

The control message may be indicative of a request for the TSN. The control message may be forwarded to the CUC.

The SI may be implicative or indicative of at least one TSN feature supported by or through the RBS. The SI may be RBS-specific. The selectivity (e.g., the conditionality) in the step 404 may be dependent on the at least one supported TSN feature. Alternatively or in addition, the TSN stream may be established over the RAN depending on the at least one supported TSN feature. For example, the establishing of the at least one TSN stream may comprise performing or initiating to perform the random access with the RBS depending on the at least one supported TSN feature.

Herein, the TSN feature may encompass any feature or functionality available at the RBS for the TSN. The at least one TSN feature supported through the RBS may also be referred to as TSN capability of the RBS.

The at least one TSN feature may comprise at least one of a time-synchronization, a latency bound for the at least one TSN stream, and a reliability measure for the at least one TSN stream. The time-synchronization may be a time-synchronization of RBSs and/or network components processing (e.g., transporting) the at least one TSN stream.

Alternatively or in addition, the SI may be indicative of a TSN configuration (also, TSN configuration scheme) for the TSN through the RBS. For example, the establishing 404 of the at least one TSN stream may comprise performing or initiating a TSN setup according to the TSN configuration. The TSN configuration may be indicative of an availability or unavailability of at least one of a CNC and a CUC.

The SI may be broadcasted from the RBS in the step 502. The SI may be a broadcast message. The SI may be comprised in one or more system information blocks (SIBs).

The method 500 may further comprise a step of receiving a configuration message indicative of the support for TSN from the CN at the RBS. The SI transmitted by the RBS may be derived from the received configuration message.

The SI may be implicative or indicative of at least one TSN feature supported by or through the RBS. The SI may be broadcasted in one or more SIBs. The method 500 may further comprise any feature and/or step disclosed in the context of the UE and the method 400, or any feature or step corresponding thereto.

The configuration message may be sent from the AMF of the CN. The configuration message may be implicative or indicative of at least one TSN feature supported or supposed to be supported by or through the RBS.

The method 600 may further comprise any feature or step of the methods 400 and 500, or any feature or step corresponding thereto.

Embodiments of the technique maintain compatibility with the 3GPP document TS 23.501, version 15.1.0, specifying "System Architecture for the 5G System" (Stage 2), or a successor thereof.

A network (e.g., a 5G network comprising the RAN providing NR access as defined by 3GPP) is configured to support TSN transmissions through at least some RBSs. For a UE to become attached to such a TSN network over the RAN (e.g., 5G radio or NR), there is no existing way to get information as to whether the network in general, and the RBS (e.g., a gNB) specifically, supports TSN transmissions or not. In embodiments of the technique, the SI enables the UE to determine if and/or how certain TSN features are supported, before getting into radio resource control (RRC) connected mode and further signaling with the 5G network. Thus, the technique enables the UE and, therefore, also a TSN application the UE is connected to, to be aware of whether, which and/or how TSN features are supported by the network, specifically the RAN and/or the RBS transmitting the SI.

The SI may be implicative or indicative as to the support of TSN features. The TSN features may comprise at least one of time synchronization, redundancy, reliability, and latency (e.g., an estimated end-to-end latency).

Embodiments of the technique enable the UE to receive necessary TSN-related information in the SI before getting attached to the 5G network. In this way, the UE is aware of which TSN features are supported by the 5G network. Furthermore, the 5G network may inform one or more UEs in the same way about configuration details of the TSN network and/or how to, for example, perform time synchronization and network management.

For example, not all RBSs (e.g., gNBs) covering an area (e.g., deployed in a factory hall) support TSN traffic. The technique may be implemented to block those UEs (also: TSN-UEs) that require TSN traffic from certain RBSs (e.g., gNBs), e.g., from those RBSs that do not support TSN or not the TSN features required by the UE.

The SI may be implemented by one or more System Information Blocks (SIBs).

An overall functionality and structure of a Master Information Block (MIB) and SIBs for NR may be essentially the same as for LTE. A difference between NR and LTE is that in NR provides two different types of SIBs. A first type of SIBs is transmitted periodically, e.g., equal or similar to SIB transmissions in LTE. A second type of SIBs is transmitted only when there is the request from the UE.

The SIBs are broadcasted by the RBS (e.g., a gNB) and include the main part of the system information the UE requires to access a cell served by the RBS and other information on cell reselection. SIBs are transmitted over a Downlink Shared Channel (DL-SCH). The presence of the system information on the DL-SCH in a subframe is indicated by the transmission of a corresponding Physical Downlink Control Channel (PDCCH) marked with a special system-information Radio Network Temporary Identifier (SI-RNTI).

A number of the different SIBs are defined by 3GPP for LTE and NR, e.g., characterized by the type of the information included in the SIBs. This system information informs the UE about the network capabilities. Not all SIBs are supposed to be present. SIBs are broadcasted repeatedly by the RBS (e.g., the gNB).

Within a TSN network, i.e., a network supporting TSN, the communication endpoints are called TSN talker and TSN listener. At least one of the TSN talker and the TSN listener is an UE. For the support of TSN, all RBSs and network components (e.g., switches, bridges, or routers) between the TSN talker and the TSN listener support certain TSN features, e.g. IEEE 802.1AS time synchronization. All nodes (e.g., RBSs and/or network components) that are synchronized in the network belong to a so-called TSN domain. TSN communication is only possible within such a TSN domain.

TSN for a RAN or a RAN configured for TSN may comprise features for deterministic networking, which are also referred to as TSN features. The TSN features may comprise at least one of time synchronization, guaranteed (e.g., low) latency transmissions (e.g., an upper bound on latency), and guaranteed (e.g., high) reliability (e.g., an upper bound on packet error rate). The time synchronization may comprise a time synchronization between components of the RAN (e.g., the RBSs) and/or network components (e.g., in a backhaul domain and/or the CN).

Optionally, the SI is indicative of the TSN features supported through the respective RBS.

The supported TSN features may comprise or be compatible with at least one of the following group of categories. A first category comprises time synchronization, e.g. according to the standard IEEE 802.1AS. A second category comprises bounded low latency, e.g. according to at least one of the standards IEEE 802.1Qav, IEEE 802.1Qbu, IEEE 802.1Qbv, IEEE 802.1Qch, and IEEE 802.1Qcr. A third category comprises ultra-reliability, e.g. according to at least one of the standards IEEE 802.1CB, IEEE 802.1Qca, and IEEE 802.1Qci. A fourth category comprises network configuration and management, e.g. according to at least one of the standards IEEE 802.1Qat, IEEE 802.1Qcc, IEEE 802.1Qcp and IEEE 802.1CS.

The configuration and/or management of a TSN network including the RAN can be implemented in different manners, e.g., in a centralized or in a distributed setup as defined by the standard IEEE 802.1Qcc. Examples of different configuration models are described with reference to FIGS. 138, 139, and 140.

FIG. 138 schematically illustrates a block diagram for a first example of a communications system 700 comprising embodiments of devices 100, 200 and 300, which may be configured to carry out the methods illustrated in FIGS. 135, 136, and 137, respectively. The communication system 700 comprises the RAN 710 and the CN 730. The RAN 710 may comprise at least one embodiment of the device 200. The CN 730 may comprise at least one embodiment of the device 300, e.g., a network component 300-1. The network component 300-1 may be a switch, a bridge or a router. A backhaul domain 720 provides data links between the RBSs 200 of the RAN 710 and/or between the at least one RBS 200 and the CN 730. The data links may comprise at least one of microwave links, Ethernet links and fiber optical links.

The SI 712 is broadcasted by the RBS 200 to the UE 100 according to the steps 402 and 502. The RBS 200 is configured to broadcast the SI 712 according to the step 502 and to support the TSN stream according to the step 504 responsive to the configuration message 722-1 received from or through the network component 300-1.

In a scheme for distributed TSN configuration, which is illustrated by the first example in FIG. 138, there is no CUC and no CNC for the TSN network. The TSN talker 100 is, therefore, responsible for initiation of a TSN stream in the step 404. As no CNC is present, the network components 300-1 (e.g., switches or bridges) are configuring themselves, which may not allow using, for example, time-gated queuing as defined in IEEE 802.1Qbv. The distributed TSN configuration may be compatible or consistent with the document IEEE P802.1Qcc/D2.3, "Draft Standard for Local and metropolitan area networks—Bridges and Bridged Networks Amendment: Stream Reservation Protocol (SRP) Enhancements and Performance Improvements", IEEE TSN Task Group, e.g., draft status 03-05-2018.

In a first scheme for centralized TSN configuration, which is schematically depicted in FIG. 139 for a second example of the communication system 700, the TSN talker 100 is responsible for initialization of the TSN stream in the step 404, while the network components 300-1 are configured by a CNC 300-2. The centralized TSN configuration may be compatible or consistent with the document IEEE P802.1Qcc/D2.3.

The SI 712 is broadcasted by the RBS 200 to the UE 100 according to the steps 402 and 502. Alternatively or additionally to the configuration message 722-1, the RBS 200 is configured to broadcast the SI 712 according to the step 502 and to support the TSN stream according to the step 504 responsive to the configuration message 722-2 received from or through the CNC 300-2.

In a second scheme for centralized TSN configuration (also: fully centralized TSN configuration), which is schematically depicted in FIG. 140 for a third example of the communication system 700, the network components 300-1 are configured by the CNC 300-2 and the CUC 300-3 with network configuration information and user configuration information, respectively. In one implementation, the CUC 300-3 may configure the network components to establish the TSN stream as soon as the TSN talker 100 is radio-connected to the RBS 200. In another implementation that is combinable with the one implementation, the TSN talker 100 is responsible for initialization of the at least one TSN stream, while quality requirements of the TSN talker 100 for the at least one TSN stream and/or the number of TSN streams for the TSN talker 100 is configured by the CUC 300-3. The fully centralized TSN configuration may be compatible or consistent with the document IEEE P802.1Qcc/D2.3.

The SI 712 is broadcasted by the RBS 200 to the UE 100 according to the steps 402 and 502. Alternatively or additionally to the configuration message 722-1 and/or the configuration message 722-2, the RBS 200 is configured to broadcast the SI 712 according to the step 502 and to support the TSN stream according to the step 504 responsive to the configuration message 722-3 received from the CUC 300-3.

Optionally, e.g. in any of the three examples for the communication system 700, the SI 712 is transmitted on a broadcast channel of the RAN 710. The SI 712 may (e.g., positively) indicate the support of the TSN, e.g., without user and/or network configuration information. The UE 100 may receive the user and/or network configuration information on a downlink control channel from the RBS 200, by TSN-specific protocols and/or from the CN 710 (e.g., the device 300-1) using a non-access stratum (NAS) protocol. Alternatively or in combination, the SI 712 may comprise (at least partly) the user and/or network configuration information.

The TSN communication between TSN talker (as an embodiment of the device 100) and TSN listener (which may or may not be a further embodiment of the device 100) happens in TSN streams. A TSN stream is based on certain requirements in terms of data rate and latency given by an application (TSN application) implemented at the TSN talker and the TSN listener. The TSN configuration and management features are used to setup the TSN stream and to guarantee the requirements of the TSN stream across the network.

In the distributed scheme (e.g., according to the first example in FIG. 138), the TSN talker 100 and the TSN listener 100 may use the Stream Reservation Protocol (SRP) to setup and configure the at least one TSN stream in every RBS 200 and/or every network component 300-1 (e.g., every switch) along the path from the TSN talker 100 to the TSN listener 100 in the TSN network. Optionally, some TSN features require the CNC 300-2 as a central management entity (e.g., according to the second example in FIG. 139). The CNC 300-2 uses for example a Network Configuration Protocol (Netconf) and/or "Yet Another Next Generation" (YANG) models to configure the RBS 200 and/or the network components 300-1 (e.g., switches) in the network for each TSN stream. This also allows the use of time-gated queuing as defined in IEEE 802.1Qbv that enables data transport in a TSN network with deterministic latency. With time-gated queuing on each RBS 200 and/or each network component 300-1 (e.g., switch), queues are opened or closed following a precise schedule that allows high priority packets to pass through the RBS 200 or network component 300-1 with minimum latency and jitter if it arrives at ingress port within the time the gate is scheduled to be open. In the fully centralized scheme (e.g., according to the third example in FIG. 140) the communication system 700 comprises a CUC 300-3 as a point of contact for the TSN listener 100 and/or the TSN talker 100. The CUC 300-3 collects stream requirements and/or endpoint capabilities from the TSN listener 100 and/or the TSN talker 100. The CUC 300-3 may communicate with the CNC 300-2 directly. The TSN configuration may be implemented as explained in the standard IEEE 802.1Qcc in detail.

FIG. 141 shows a functional block diagram for a fourth example of a communication system 700 comprising embodiments of the devices 100, 200 and 300. The fourth example may further comprise any of the feature described for the first, second and/or third example, wherein like reference signs refer to interchangeable or equivalent features. An optional interworking between the 5G network (e.g., comprising the RAN 710 and the CN 730) and the TSN network architecture (e.g., the CNC 300-2 and the CUC 300-3) may be based on at least one of the control messages 722-2 and 722-3 from the CNC 300-2 and the CUC 300-3, respectively, e.g., as illustrated in FIG. 141. At least one of the control messages 722-2 and 722-3 may be forwarded to the AMF 300-4 (in the CN 730) and/or to the RBS 200 (in the RAN 710) using a control plane of the 5G network. Alternatively or in addition, the CN 730, e.g., the AMF 300-4, may implement at least one of the CNC 300-2 and the CUC 300-3.

The technique enables connecting TSN listener 100 and TSN talker 100 wirelessly to a TSN network, e.g., using a 5G network as defined by 3GPP. The 5G standard defined by 3GPP addresses factory use cases through a plurality of features, especially on the RAN (e.g., providing 5G NR) to make it more reliable and reduce the transmit latency compared to an evolved UMTS radio access network (E-UTRAN, i.e., the radio access technology of 4G LTE).

The 5G network comprises the UE 100, the RAN 730 instantiated as the gNB 200 and nodes 300-4 within the core network (5G CN). An example for the 5G network architecture is illustrated on the left-hand side in FIG. 141. An example for the TSN network architecture is illustrated on the right-hand side in FIG. 141

Both technologies, the 5G network and the TSN network, define own methods for network management and/or configuration. Different mechanisms to achieve communication determinism are arranged to enable end-to-end deterministic networking to support TSN streams, e.g., for industrial networks. A study item for upcoming 3GPP release 16 has been initiated in the 3GPP document RP-181479 to support TSN, e.g., for factory automation use cases.

Here, the UE 100 being the radio device connected to the RAN 710 (and thus to the 5G network) may also be referred to as a 5G endpoint. A device connected to the TSN network (also, TSN domain) may be referred to as a TSN endpoint.

Despite what is shown in FIG. 141, is also possible that the UE 100 is not connected to a single endpoint but instead to a TSN network comprising at least one TSN bridge and at least one endpoint. The UE 100 is then part of a TSN-5G gateway.

The control plane of the 5G network may comprise at least one of a Network Repository Function (NRF), the AMF 300-4, a Session Management Function (SMF), a Network Exposure Function (NEF), a Policy Control Function (PCF), and a Unified Data Management (UDM).

A data plane of the 5G network comprises a User Plane Function (UPF), at least one embodiment of the RBS 200, and/or at least one embodiment of the UE 100.

A TSN listener 1002 may be embodied by or performed (e.g., as an application) at the UE 100. While the UE 100 operates as or is used by the TSN listener 1002 in the fourth example of the communication system 700 shown in FIG. 141, the UE 100 may alternatively or additionally operate as a TSN talker in any example. Optionally, a TSN talker 1004 is embodied by another UE 100 connected through the same or another RBS 200 to the communication system 700.

The step 604 of the method 600 may be implemented according to at least one of the following variants (e.g., in the context of any of the four examples of the communication system 700 in FIGS. 138 to 141). In a first variant, the CNC 300-2 configures the gNB 200 by sending the configuration message 722-2. In a second variant, the CUC 300-3 sends the configuration message 722-3 to the AMF 300-4 and, thereby, configures the gNB 200. For example, the AMF 300-4 forwards the configuration message 722-3 to the gNB 200 or derives the configuration message 722-4 from the configuration message 722-3. In a third variant (not shown), the CUC 300-3 sends the configuration message 722-3 to the gNB 200. In a fourth variant (not shown), the CNC 300-2 sends the configuration message 722-2 to the AMF 300-4. Optionally, e.g., in any of the variants, the AMF 300-4 implements at least one of the CNC 300-2 and the CUC 300-3.

Alternatively or in addition, the CNC 300-2 sends the configuration message 722-2 to the network component 300-1 (e.g., a switch or a router) and, thereby, configures the gNB 200. For example, the network component 300-1 forwards the configuration message 722-2 to the gNB 200 or derives the configuration message 722-1 from the configuration message 722-2.

While the technique is described herein with embodiments in the context manufacturing and factory automation for clarity and concreteness, the technique may further be applicable to automotive communication and home automation.

FIG. 142 shows a signaling diagram 1100 for TSN Stream Configuration involving exemplary embodiments of the device 100 (e.g., a UE 100 as the TSN talker and/or a UE 100 as the TSN listener) and exemplary embodiments of the device 300 (namely 300-1, 300-2 and 300-3). While these multiple embodiments of the devices 100 and 300 are shown and described in combination, any subcombination may be realized. For example, only one of the network component 300-1, the CNC 300-2 and the CUC 300-3 may embody the device 300. Alternatively or in addition, only one of the TSN talker and the TSN listener may be an embodiment of the device 100.

The steps for the TSN Stream Configuration (e.g., according to the signaling diagram 1100) may be performed after the UE 100 has decided to access (e.g., radio-connect and/or attach to) the RBS 200 (not shown in FIG. 141 for simplicity) based on the SI received in the step 402. The step 404 may initiate at least one of the steps for the TSN Stream Configuration.

Each UE 100 implementing a TSN talker or a TSN listener is radio-connected through an embodiment of the RBS 200 to at least one of the network component 300-1, the CNC 300-2 and the CUC 300-3. The UEs 100 may be radio-connected through the same RBS 200 or different RBSs 200. The TSN Stream Configuration may be compatible or consistent with IEEE 802.1Qcc.

The TSN Stream Configuration (i.e., setting up the at least one TSN stream in the TSN network) according to the fully centralized configuration scheme comprises at least one of the following steps.

In a first step 1102, the CUC 300-3 may take input from e.g. an industrial application or engineering tool (e.g. a programmable logic controller, PLC), which specifies for example the devices, which are supposed to exchange time-sensitive streams (i.e., TSN streams). The PLC may be adapted to control manufacturing processes, such as assembly lines, or robotic devices, or any activity that requires high reliability control and/or ease of programming and process fault diagnosis.

In a second step 1104, the CUC 300-2 reads the capabilities of end stations and applications in the TSN network, which includes period and/or interval of user traffic and payload sizes.

In a third step 1106, based on this above information, the CUC 300-3 creates at least one of a Stream ID as an identifier for each TSN stream, a Stream Rank, and User-toNetwork Requirements.

In a fourth step 1108, the CNC 300-2 discovers the physical network topology using, for example, a Link Layer Discovery Protocol (LLDP) and any network management protocol.

In a fifth step 1110, the CNC 300-2 uses a network management protocol to read TSN capabilities of bridges (e.g., IEEE 802.1Q, 802.1AS, 802.1CB) in the TSN network.

In a sixth step 1112, the CUC 300-3 initiates join requests to configure the at least one TSN stream in order to configure network resources at the bridges 300-1 for a TSN stream from one TSN talker 100 to one TSN listener 100.

In a seventh step, a group of the TSN talker 100 and the TSN listener 100 (i.e., a group of elements specifying a TSN stream) is created by the CUC 300-3, e.g., as specified in the standard IEEE 802.1Qcc, clause 46.2.2.

In an eighth step 1114, the CNC 300-2 configures the TSN domain, checks physical topology and checks if the time sensitive streams are supported by bridges in the network, and performs path and schedule computation of streams.

In a ninth step 1116, the CNC 300-2 configures TSN features in bridges along the path in the TSN network.

In a tenth step 1118, the CNC 300-2 returns status (e.g., success or failure) for resulting resource assignment for the at least one TSN stream to the CUC 300-3.

In an eleventh step 1120, the CUC 300-3 further configures end stations (wherein a protocol used for this information exchange may be out of the scope of the IEEE 802.1Qcc specification) to start the user plane traffic exchange, as defined initially between the TSN listener 100 and the TSN talker 100.

In the TSN network, the streamID is used to uniquely identify stream configurations. It is used to assign TSN resources to the TSN stream of a TSN talker. The streamID comprises the two tuples MacAddress and UniqueID. The MacAddress is associated with the TSN talker 100. The UniqueID distinguishes between multiple streams within end stations identified by the same MacAddress.

Any embodiment and implementation of the technique may encode the SI 712 in dedicated information elements in one or more SIBs. According to the step 402 and 502, a UE 100 is enabled to detect TSN features that are supported by the RBS 200 of the network and/or how they are supported. The UE 100 receives the SI 712 before it attaches to the network, and can check first by listening to an SIB message comprising the SI 712. The received SI 712 may be forward to the TSN application 1002 or 1004 the UE 100 is serving, and/or the UE 100 uses the SI 712 to setup a connection to the 5G network.

Any embodiment of the RBS 200 may implement the technique by including one or more SIBs and/or information elements in SIBs for indicating to the UE 100 the TSN features and/or TSN configuration details supported by the 5G network, e.g., specifically be the RBS 200.

Any embodiment of the UE 100 may implement the step 402 by reading the one or more SIBs and/or the information element included therein. Optionally, the included information as to supported TSN features and/or TSN configuration are forwarded to the TSN applications it is serving. Conditionally, i.e., depending on the features indicated as supported in the SI 712, the information is used to establish a connection to the RBS (e.g., to the 5G network).

An (e.g., expandable) example of a SIB block structure for the SI 712 in the steps 402 and 502 is outlined below using Abstract Syntax Notation One (ASN.1). The same information may also be included in the configuration message 722 of the method 600.

```
-- ASN1START
SystemInformationBlockType16-r11 ::=        SEQUENCE {
TSNFeatures                                SEQUENCE {
   Time synchronisation                       Boolean
   Time Synchornisation accuracy                 Integer OPTIONAL,
                                           -- Need
OR
   FRER                                       Boolean
   TSN configuration details               Integer
Credit based shaper                        boolean
   Time aware shaper                          boolean
   Max. Latency added by 5G network              integer }
}
```

Furthermore, the SIB blocks may be adapted to future versions of TSN features by, for example, introducing reserved fields to be defined in the future.

For end-to-end time synchronization (e.g., provisioning of an absolute time reference) multiple ways of implementation are possible. The SI 712 may comprise information about how the time synchronization is treated by the RAN (e.g., the 5G network).

The "FRER" parameter refers to the redundancy features that are supported by the 5G network. In case the network does not support redundancy, there is no need to establish, e.g., redundant protocol data unit (PDU) sessions.

The TSN configuration may include the presence of the CUC 300-3 and/or the CNC 300-2 in the TSN network and/or specific TSN configuration schemes that are supported.

The "Max. Latency added by 5G network" parameter may be used to signal a QoS level in terms of latency and/or reliability that can be supported by the 5G network to the UE 100. A field representing this parameter may comprise a latency value (e.g., in milliseconds) that can be guaranteed with a sufficient reliability or a classification value (e.g., non-real-time, real-time, hard-real-time or similar). The value may be indicated by a predefined index value. This information may be used by the UE 100 (or the endpoint 1002 or 1004 of the TSN network behind the UE 100) to find out before connection establishment if a connection to the RBS 200 (or the 5G network) will be able to support the requirements of the TSN application 1002 or 1004, or not.

The RBS 200 (e.g., a gNB) may further include a current cell load and/or other metrics into the calculation of that field. Optionally, the SI 712 is indicative of a traffic shaper support, which refers to a quality of service (QoS) that may be guaranteed by the RBS (e.g., the 5G network). For example, the SI 712 may be indicative of whether the shaper is based on credit (e.g., data volume per time and UE) or a time aware shaper (TAS) for TSN.

FIG. 143 shows a signaling diagram 1200 resulting from implementations of the methods 400, 500 and 600 being performed by embodiments of the devices 100, 200 and 300, respectively. More specifically, the technique enables an embodiment of the UE 100 to become aware of TSN features supported by the network over the SI 712 included in one or more SIBs. While the signaling diagram 1200 (and the corresponding flowchart) for TSN stream configuration uses the fully centralized configuration scheme (e.g., as shown in FIG. 140), the technique is readily applicable to other configuration schemes (e.g., as shown in FIG. 138 or 139).

The implementations of the methods 400, 500 and 600 enable the UE 100 to get aware of TSN features supported by the network and/or specifically by the RBS 200 over the one or more SIBs including the SI 712.

In the step 604, a 5G core function (e.g., the AMF 300-4) indicates by sending the configuration message 722 to specific RBSs 200 (e.g., gNBs) which TSN features (e.g., according to above non-exhaustive list) are supported or supposed to be enabled (e.g., only a subset of all gNBs might support TSN) and how these TSN features are supported.

Responsive to the reception of the configuration message 722 (e.g., any of the above implementations 722-1 to 722-4), the RBS 200 (e.g., a gNB) generates the SI 712 (e.g., the SIB block information as outlined above) and starts broadcasting the SI 712, e.g. over the DL-SCH, in the step 502.

The UE 100 receives and/or reads the SI 712 in the SIB in the step 402. Optionally, the UE 100 transfers at least some of the information in the SI 712 to the TSN application 1002 or 1004, e.g., a list of the TSN features supported by the RBS 200. The TSN application 1002 or 1004 may request a TSN connection towards the UE 100, if the supported list of TSN features is sufficient, as an example for the conditionality or selectivity in the step 404.

For initiating the TSN stream in the step 404, the UE 100 goes into RRC connected mode if not already in that mode and requests a PDU session, which may be of Ethernet type. UE may further provide information by means of NAS signaling on which TSN features are required.

A TSN controller (e.g., the CNC 300-2) receives a confirmation from the CN 730 and performs path computation and time scheduling. TSN stream communication starts, wherein the RBS 200 supports the TSN stream according to the step 504.

In any embodiment, the UE 100 may defer or refrain from requesting the RRC connection setup in the step 404, if the TSN application requires certain TSN features and the UE 100 did not receive in the SIB broadcast 402 that one or more of these features are supported, as an example for the conditionality or selectivity in the step 404.

In same or another embodiment, the UE 100 reads the SI 712 (i.e., the TSN information included in the one or more SIBs) of multiple RBSs 200 (e.g., gNBs) and selects the RBS 200, which best fulfills the TSN requirements of the UE 100. If all RBS 200 fulfill the requirements, the UE 100 may act according to a selection rule, e.g. selecting the RBS 200 indicating the lowest latency.

In any embodiment, the UE 100 may store the SI 712 received in the step 402. The technique may be implemented as described up until and including the step 402. When the TSN application 1002 or 1004 requests a TSN communication (i.e., one or more TSN streams), the UE 100 uses the stored SI 712 to either setup the at least one TSN stream in the supported way or declines the TSN request if it is not supported.

The UE 100 may further use the SI 712 from the SIB, e.g., to initialize packet filtering of packets coming in for TSN transmission. Furthermore, the received SI 712 may be used to establish a default PDU session with the 5G network Combination of TSN Support Detection and Header-Compression Techniques Once more, as indicated above, the various techniques described herein may be combined with each other, to provide advantages with respect to latency, reliability, etc. For example, one particular combination that is advantageous is the combination of the techniques described above for detecting support for TSN and the techniques described for compressing headers of TSN frames.

Thus, for example, the method illustrated in FIG. 135 can be combined with the method shown in FIG. 133, resulting in a method performed by a wireless device associated with a wireless communications network, for transport of data packets associated with a data stream in an external data network. This method includes the step of receiving system information (SI) from a radio base station (RBS) of a radio access network (RAN), the SI being indicative of support for time-sensitive networking (TSN) through the RBS, as shown at block 402 of FIG. 135, as well as the step of establishing at least one TSN stream with the external data network, through the RBS, as shown at block 404 of FIG. 135. The method further includes the steps of obtaining configuration information for the TSN stream, the configuration information indicating respective values for one or more fields within a header of data packets associated with the TSN stream which are to remain static, as shown at block XX102 of FIG. 133, and receiving, from the RBS, a data packet associated with the TSN stream, as shown at block XX104 of FIG. 133. The method still further includes the step of adding the one or more fields to the data packet to generate a decompressed data packet, as shown at block XX106 of FIG. 133.

In some embodiments, the SI is comprised in one or more system information blocks (SIBs). In some embodiments, the step of obtaining configuration information comprises receiving the configuration information from a network node of the wireless communications network. The data packet may comprise an identifier for the TSN stream; in some embodiments, this identifier is added by the core network node.

In some embodiments, the compressed data packet is received as part of a protocol data unit (PDU) session or a quality of service (QoS) flow. In some of these embodiments, the identifier for the TSN stream is unique within the PDU session or QoS flow.

In some embodiments, the configuration information is transmitted to the wireless device using non-access stratum (NAS) signaling. The configuration information may comprise an identifier for the TSN stream.

The method may further comprise, in some embodiments, obtaining updated configuration information for the TSN stream, where the updated configuration information comprises an indication of respective updated values for one or more fields within the header of data packets associated with the TSN stream which are to remain static. In these embodiments, the method may further comprise the step of utilizing the updated configuration information to add the respective updated values for one or more fields to data packets received from the RBS. In some of these embodiments, the updated configuration information further comprises an indication of a sequence number identifying a data packet associated with the TSN stream from which the respective updated values apply.

Some embodiments may further include steps of the method shown in FIG. 134. Such embodiments may include the step of obtaining a data packet associated with the TSN stream, as shown at block XX204 of FIG. 134, as well as the step of removing the one or more fields from the data packet to generate a compressed data packet, as shown at block XX206 of FIG. 134. The method may further include initiating transmission of the compressed data packet over the external data network via a transmission to the RBS, as shown at block XX206 of FIG. 134.

The step of obtaining configuration information may comprise receiving the configuration information from a core network node of the wireless communications network, in some embodiments, or receiving the configuration information from the external data network, in others. In some embodiments, the method further comprises initiating transmission, to a core network node of the wireless communications network, of an indication of the respective values for one or more fields within the header of data packets associated with the TSN stream which are to remain static, to enable the core network node to decompress the compressed data packet prior to its transmission over the external data network.

In some of these embodiments, the data packet comprises user data, and wherein the step of initiating transmission of the compressed data packet over the external data network comprises forwarding the user data to a host computer over the external data network.

Combination of TSN Support Detection and Resource Scheduling Techniques

Once more, as indicated above, the various techniques described herein may be combined with each other, to provide advantages with respect to latency, reliability, etc. For example, one particular combination that is advantageous is the combination of the techniques described above for detecting support for TSN and the techniques described for compressing headers of TSN frames.

Thus, for example, the method illustrated in FIG. 135 can be combined with the method shown in FIG. 119, resulting in a method performed by a wireless device configured for communication with a radio access network, RAN, for scheduling resources in the RAN according to a transmission schedule associated with an external network. This method includes the step of receiving system information (SI) from a radio base station (RBS) of a radio access network (RAN), the SI being indicative of support for time-sensitive networking (TSN) through the RBS, as shown at block 402 of FIG. 135, as well as the step of establishing at least one TSN stream with the external data network, through the RBS, as shown at block 404 of FIG. 135. The method further includes the steps of receiving, from the external network, a transmission schedule associated with the TSN stream, as shown at block 1410 of FIG. 119, and sending, sending, to a network associated with the RAN, a request to allocate radio resources for communication of the TSN stream between the wireless device and the RAN, as shown at block 1420 of FIG. 119, where the request further comprises information related to the transmission schedule. As shown at block 1430 of FIG. 119, the method further comprises receiving, from the network, a response indicating whether radio resources can be allocated to meet the transmission schedule associated with the TSN stream.

In some embodiments, the transmission schedule comprises cycle times and gate control lists for one or more traffic classes comprising the TSN stream. In some embodiments, if the response from the network indicates that radio resources cannot be allocated to meet the transmission schedule of the data stream, the response further comprises an indication of one or more further time windows during which radio resources can be allocated. In some embodiments, the method further comprises, based on the response from the network, sending, to the external network, an indication of whether the transmission schedule can be met.

In some of these embodiments, if the response comprises the indication of one or more further time windows, the indication sent to the external network further includes information related to the one or more further time windows.

In some embodiments, the network comprises a 5G core network (5GC), and the request is sent to and the response is received from an access management function (AMF) of the 5GC.

Support for Multiple Time Domains in 5G to Support TSN Transmission

The inter-working of 5G and TSN is illustrated in FIG. 144. Both technologies define own methods for network management and configuration and different mechanisms to achieve communication determinism that must somehow be arranged to enable end-to-end deterministic networking for industrial networks. In the following the device connected to the 5G network is referred to as 5G endpoint. A device connected to the TSN domain is referred to as TSN endpoint.

Despite what is shown in FIG. 144 it is also possible that the UE is not connected to a single endpoint but instead to a TSN network comprising of at least one TSN bridge and at least one endpoint. The UE is then part of a TSN-5G gateway.

It should be noted that the UPF of FIG. 144 is assumed to support Precision Time Protocol (PTP) and can therefore be synchronized to a GrandMaster clock in the TSN network using PTP messages transported using UDP/IP (e.g. per IEEE 1588-2008).

The method by which the UPF subsequently forwards clock information (derived from the GrandMaster clock) to a gNB is considered to be implementation specific.

The gNB can, if needed, send multiple instances of clock information derived from multiple sources (e.g. GPS based, GrandMaster based) to UEs using 5G network based methods.

Further distribution of clock information from a UE to one or more endpoints is possible (e.g. a UE in possession of clock information can serve as a source clock for one or more endpoints).

FIG. 144 can support two basic scenarios for ethernet PDU processing. A first scenario is Ethernet PDUs relayed over the 5G Network. This scenario assumes the case where a single UE needs to support multiple endpoints, each having a distinct ethernet MAC layer address (i.e. a UE supports multiple ethernet ports).

The UPF that interfaces with the TSN switch is assumed to support the reception and transmission of ethernet PDUs that do not carry IP packets as higher layer payload. Upon receiving an ethernet PDU from the TSN switch the UPF must have a method for associating the destination MAC address with a specific IP address and then relay the ethernet PDU to the appropriate node (e.g. PDN-GW) in the 5G network. The appropriate 5G network node uses the IP address to identify a specific UE and its corresponding RNTI so that the ethernet PDU can then be forwarded to the appropriate gNB for delivery using the identified RNTI.

The gNB sends the ethernet PDU to the UE using a data radio bearer (DRB) with reliability and latency attributes appropriate for supporting ethernet PDU transmission. The UE recovers the ethernet PDU (e.g. from the PDCP layer) and sends it to the endpoint associated with the destination MAC address (i.e. a UE may support one or more ethernet connected endpoints).

In summary, the original ethernet PDU received by the UPF from the TSN switch is delivered transparently through the 5G network.

For the uplink direction the 5G network is expected to determine when a RNTI is associated with ethernet operation thereby allowing uplink payload (i.e. an ethernet PDU) associated with such a RNTI to be routed to a UPF. The UPF then simply sends the received ethernet PDU to a TSN switch.

A second scenario is Ethernet PDUs terminated at the 5G network. This scenario assumes the case where a single UE supports a single endpoint in which case there is no need for the UE to support any ethernet ports. The UPF that interfaces with the TSN switch is assumed to support the reception and transmission of ethernet PDUs that carry IP packets as higher layer payload.

Upon receiving an ethernet PDU from the TSN switch the UPF extracts the IP packet from the ethernet PDU and sends it to the appropriate 5G network node for further routing. The 5G network uses the destination IP address to identify a specific UE and its corresponding RNTI so that the IP packet can be forwarded to the appropriate gNB for delivery using the identified RNTI.

The gNB sends the IP packet to the UE using a data radio bearer (DRB) with reliability and latency attributes appropriate for supporting ethernet PDU transmission (i.e. even though the ethernet PDU terminates at the UPF the 5G network must support ethernet like QoS attributes when delivering the IP packets carried by ethernet PDUs). The UE recovers the IP packet (e.g. from the PDCP layer) and sends it to the IP layer application.

In summary, the ethernet protocol layer is terminated when the ethernet PDU is received by the UPF from the TSN switch but its IP packet payload is delivered transparently through the 5G network.

For the uplink direction the 5G network is expected to determine when a RNTI is associated with ethernet operation thereby allowing uplink payload (i.e. an IP packet) associated with such a RNTI to be routed to a UPF. The UPF must then have a method by which it can map source and destination IP addresses to source and destination MAC addresses (e.g. using ARP) so that it can construct an ethernet PDU containing those MAC addresses and the IP packet as payload for transmission to the TSN switch.

Many TSN features are based on precise time synchronization between all peers. As introduced above this is achieved using e.g. IEEE 802.1AS or IEEE 802.1AS-rev. Within the TSN network it is therefore possible to achieve a synchronization with sub-microsecond error. To achieve this level of accuracy a hardware support is mandatory; e.g. for timestamping of packets.

In a network, a grandmaster (GM) is a node that transmits timing information to all other nodes in a master-slave architecture. It might be elected out of several potential nodes, by certain criteria that makes the selected grandmaster superior.

In a TSN-extension of 802.1AS, it has been defined that next to a main GM also a redundant backup GM can be configured. In case the first GM fails for any reason, devices in the TSN domain can be synched to the second GM. The redundant GM might work in a hot-standby configuration.

In TSN based on IEEE 802.1AS-rev (also called gPTP, generalized Precise Timing Protocol) there are multiple time domains supported in a TSN network. One time domain could be a global time domain based on for example the PTP epoch, and other might be local time domains with an arbitrary epoch. There are two timescales which are supported by gPTP, Timescale PTP: The epoch is the PTP epoch (details in IEEE 802.1 AS-rev section 8.2.2) and this timescale is continuous. The unit of measure of the time is the SI second as realized on the rotating period.

Timescale ARB (arbitrary): the epoch for this timescale is domain startup time and can be setup by administrative procedure (more details in IEEE 802.1AS-rev, section 3.2)

Devices in a TSN network can be synched to multiple time domains. A local arbitrary time domain is also referred to as a working clock. Working clocks are used in industrial networks for TSN functions.

One of the initial steps for setting up the TSN stream is establishing of a TSN domain by the CNC, by grouping endpoints (talkers and listeners) that are supposed to exchange time-sensitive streams. This list is provided by CUC to the CNC. The CNC further configures the bridges connecting these endpoints such that each TSN domain (talkers, listeners and bridges) has its own working clock. Technically this can be done according to IEEE 802.1AS-rev, by configuring external port role configuration, mechanism.

Multiple time domains in industrial application scenario is now described. As introduced above, a TSN domain works with different clocks (global and working clocks). Furthermore, the clocks of each TSN domain are not necessarily synchronized and a factory network might comprise of several TSN domains. Therefore, across a factory network it there might be several independent TSN domains with arbitrary timescales where different maybe overlapping subsets of devices need to be synchronized to. As shown in FIG. 145, each TSN domain can have their own working clock.

To satisfy time synchronization requirements for TSN in manufacturing use cases, a cellular network is required to provide a time reference to which all machines (sensor or actuators) can be synchronized.

Currently in 3GPP standardization, efforts are seen to realize a time synchronization over the LTE radio access in Release 15.

In one possible approach, two Information Elements (IE) are added into SIB 16, i.e., a time reference with 0.25 μs granularity and uncertainty value, and the DL RRC message UETimeReference to inform GPS time to the UE with three IEs added in RRC message. The main purpose of this procedure is to transfer GPS based time reference information to UEs along with inaccuracy of that information.

LTE defines several system information blocks (SIBs), related to timing information in SIB 16, which contains information related to GPS time and coordinated universal time (UTC). SIBs are transmitted over Downlink shared channel (DL-SCH). The presence of a SIB in the subframe is indicated by the transmission of a corresponding PDCCH marked with a special system-information RNTI (SI-RNTI). The IE SIB 16 contains information related to GPS time and UTC. The UE uses the parameter blocks to obtain the GPS and the local time.

This is the structure of a SIB 16 message:

```
-- ASN1START
\SystemInformationBlockType16-r11::=        SEQUENCE {
timeInfo-r11                                    SEQUENCE {
   timeInfoUTC-r11                              INTEGER
(0..549755813887),
   dayLightSavingTime-r11                     BIT STRING (SIZE (2))
OPTIONAL,      -- Need OR
   leapSeconds-r11                              INTEGER (-127..128)
   OPTIONAL,   -- Need OR
   localTimeOffset-r11                        INTEGER (-63..64)
OPTIONAL       -- Need OR
}
```

-continued

```
                          OPTIONAL,         -- Need OR
lateNonCriticalExtension                    OCTET STRING
OPTIONAL,
...,
[[ granularityOneQuarterUs-r15               INTEGER
                                            (0..36028797018963967)
OPTIONAL,      -- Need OR
  uncert-quarter-us-r15                      INTEGER (0..3999)
OPTIONAL
]]
}
```

The information elements are defined in Table 22

TABLE 22

| Proposed System Information Block Type 16<br>SystemInformationBlockType16 field descriptions |
|---|
| dayLightSavingTime |
| It indicates if and how daylight saving time (DST) is applied to obtain the local time. The semantics is the same as the semantics of the Daylight Saving Time IE in TS 24.301 [35] and TS 24.008 [49]. The first/leftmost bit of the bit string contains the b2 of octet 3, i.e. the value part of the Daylight Saving Time IE, and the second bit of the bit string contains b1 of octet 3. |
| leapSeconds |
| Number of leap seconds offset between GPS Time and UTC. UTC and GPS time are related i.e. GPS time − leapSeconds = UTC time. |
| localTimeOffset |
| Offset between UTC and local time in units of 15 minutes. Actual value = field value * 15 minutes. Local time of the day is calculated as UTC time + localTimeOffset. |
| granularityOneQuarterUs |
| Coordinated Universal Time corresponding to the SFN boundary at or immediately after the ending boundary of the SI-window in which SystemInformationBlockType16 is transmitted. This field counts the number of GPS time in 0.25 us units since 00:00:00 on Gregorian calendar date 6 Jan. 1980 (start of GPS time). |
| timeInfoUTC |
| Coordinated Universal Time corresponding to the SFN boundary at or immediately after the ending boundary of the SI-window in which SystemInformationBlockType16 is transmitted. The field counts the number of UTC seconds in 10 ms units since 00:00:00 on Gregorian calendar date 1 Jan. 1900 (midnight between Sunday, Dec. 31, 1899 and Monday, Jan. 1, 1900). NOTE 1.<br>This field is excluded when estimating changes in system information, i.e. changes of timeInfoUTC should neither result in system information change notifications nor in a modification of systemInfoValueTag in SIB1. |
| uncert-quarter-us |
| Indicates the uncertainty of the reference time, where a value of 'k' indicates an uncertainty of ±0.25 (k + 1) us, i.e., '0' indicates an uncertainty of ±0.25 us, a value of '1' indicates an uncertainty of ±0.5 us, and so on. The UE uses the value of this field to determine how to interpret the value of the granularityOneQuarterUs field. For example, if uncert-quarter-us = '3' then the uncertainty is 2 us and the UE will interpret the value of the granularityOneQuarterUs field to be within the range granularityOneQuarterUs ± 2 us. |

The time reference information message in RRC signaling may also be used to transmit the GPS time to the UE.

Certain problems exist. For example, as per the state-of-art, a UE can only be synchronized to one clock that is supported by the BS (e.g. eNB) to which it is connected. The main issue here is, that the clock used to provide time reference over 3GPP radio can be different than working clock (arbitrary GM clock) used to provide a time reference to a TSN domain. Currently there is no such mechanism to provide a TSN domain time clock that is not synchronized with a clock being used for time reference transmission from BS to UE.

Also, another issue is, if the UE is used as a TSN-Cellular gateway it might further be possible that an independent clock grandmaster is present on the UE-side of the cellular network. The TSN application is then connected to the time-synchronization source instead of the BS for the TSN network to work. In this scenario also, currently there is no way the UE might transfer this timing information to other peers within the cellular network.

Certain aspects of the present disclosure and their embodiments may provide solutions to these or other challenges. For example, according to certain embodiments, a method is provided to allow the establishment of multiple time domains on both, BS or UE sides based on a precise cellular network synchronization. The cellular network is thereby able to support, for example, two or more different time domains (e.g. a global clock and a working clock) towards a TSN application residing in a UE i.e. an application which is based on the receiving time synchronization information from a BS. Furthermore, the current invention provides a method whereby, in a cellular network, the UE can signal a time to the BS if a working clock GM is present on the UE-side and whereby the UE might be required to connect (i.e. provide precise cellular network synchronization information to) other TSN equipment located in the same TSN domain.

Certain embodiments may provide one or more of the following technical advantages. For example, one technical advantage may be that certain embodiments allow end-to-end time synchronization with multiple time-domains based on a single precise time reference signaling over the air. The efforts to support the additional time-domains are reduced due to the methods proposed herein.

In some embodiments, a more general term "network node" may be used and may correspond to any type of radio network node or any network node, which communicates with a UE (directly or via another node) and/or with another network node. Examples of network nodes are NodeB, MeNB, ENB, a network node belonging to MCG or SCG, base station (BS), multi-standard radio (MSR) radio node such as MSR BS, eNodeB, gNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc), O&M, OSS, SON, positioning node (e.g. E-SMLC), MDT, test equipment (physical node or software), etc.

In some embodiments, the non-limiting term user equipment (UE) or wireless device may be used and may refer to any type of wireless device communicating with a network node and/or with another UE in a cellular or mobile communication system. Examples of UE are target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles, UE category M1, UE category M2, ProSe UE, V2V UE, V2X UE, etc.

Additionally, terminologies such as base station/gNodeB and UE should be considered non-limiting and do in particular not imply a certain hierarchical relation between the two; in general, "gNodeB" could be considered as device 1 and "UE" could be considered as device 2 and these two devices communicate with each other over some radio channel. And in the following the transmitter or receiver could be either gNB, or UE.

According to certain embodiments, a method is provided by which a UE can synchronize to one or multiple TSN domain working clocks based on a time synchronization solution. Further, the solution is extended to support a device (which is connected to a TSN domain over a cellular link) getting synchronized with a working clock of the TSN domain running behind the UE (here UE acts as a TSN gateway). Also, in case a relevant GM clock is deployed on the UE side, the UE might be able to signal this clock signal to the cellular network such as, for example, a base station (BS). The cellular network might forward this info to a TSN endpoint or network it is connected to.

Herein, it is assumed that there is a mechanism to synchronize UEs to a BS in a cellular network with a sufficient precision. For a TSN end-to-end synchronization that is required by TSN features (for e.g. time aware traffic scheduler) this error might be in the order of 1 microsecond. Usually, the synchronization in the cellular network based on a common global clock from a trusted source available such as a GPS signal.

It is assume herein that the error for the 5G synchronization signal is sufficiently small to support the desired working clock accuracies for TSN communication. FIG. 146 illustrates how a BS can synchronize a UE to a cellular reference time.

According to certain embodiments, the methods introduced are exemplified by three scenarios described below and shown in FIGS. 147-149. The Devices (Dev x) are assumed to be TSN endpoints, the GMs are TSN endpoints acting as a clock GM for the TSN network.

Specifically, FIG. 147 illustrates a scenario where a Device (Dev 1) is assumed to be connected over a cellular link to a TSN domain. This TSN domain can have its working clock (GM). The cellular network is providing time reference information to UE over dedicated RRC signaling or with enhanced SIB block (as explained in above sections), based on e.g. GPS. According to certain embodiments, a method is proposed by which Dev 1 gets information on a TSN working clock which is based on the time reference that is already provided by the cellular network and based on e.g. GPS.

FIG. 148 is a shop floor scenario assuming a TSN domain which is connected to a virtual controller (Dev 2) over a cellular link. Here the challenge is, how Dev 2 can be synchronized to the working clock (GM) of the TSN domain connected via UE. We propose a method that enables the UE to be able to communicate this local working clock of the GM to the BS and Dev 2 respectively.

FIG. 149 illustrates the third scenario, where we assume two TSN networks connected over a Cellular link. The first part of the network considered as backbone of the cellular network and the other part assumed as a shop floor. The GM clock can be either on the backbone or on the shop floor side of the network. It is a generic combination of scenario a) and b).

To address the challenges exemplified in the three scenarios above, this invention defines two methods as embodiments:

Method 1: A method at BS to measure the timing offset and deviations between a common cellular reference timing signal (e.g. based on GPS) and various other timing signals (like e.g. working clocks of a TSN GM). This offset might be mapped to a TSN domain. The offset can be transmitted to a UE over dedicated RRC signaling or can be broadcasted using SIB blocks information elements (in case of broadcast over SIB, offset value need to be mapped with TSN domain identification parameter). A UE will use this offset to re-establish the original time signal based on the common cellular reference time. The UE might then provide this time to a TSN application. FIG. 150 illustrates the procedure of method 1.

Method 2: A UE method to measure the timing offset and deviations between a common cellular reference timing signal (e.g. based on GPS) it is receiving from a cellular network and various other timing signals like different working clocks it is receiving from different TSN domains or from a single TSN domain that it is a part of. Here the UE acts as a gateway between a TSN network (including a TSN clock grandmaster) and the cellular network. The UE will transmit this offset to a BS e.g. over RRC signaling. The BS uses this offset to re-establish the original time signal (i.e. corresponding to the TSN network the UE is a part of) based on the common cellular reference time. The BS then might provide this additional time signal to applications operating with same TSN domain. FIG. 151 illustrates the procedure of method 2, according to certain embodiments.

Both methods consider a periodic signaling of time-offsets to communicate to other side of the cellular network about the timing offsets to be able to support multiple time domains.

Method one will now be described in more detail. The base assumption of the procedure of method 1 is that, the epoch of the working clock and 5G time reference are the same or negotiated between UE and BS beforehand or the epoch of the additional time signals are arbitrary. Furthermore, the clocks used at UE and BS are of sufficient precision to support the time signals. Also, the UE is sufficiently synchronized to the BS to the common cellular reference time. Both, UE and BS might be equipped with multiple clocks and relevant functionality to support different time signals in parallel.

FIG. 152 illustrates the sequence flow for method 1, according to certain embodiments. The sequence for method 1 is also provided as follows:

- A GM clock (from TSN network) provides a local time reference to a BS in the cellular network
- The BS in the cellular network calculates the offset by comparing the received local time reference from GM with the cellular reference time (e.g. a global GPS based cellular reference time) that is periodically transmitted to UEs
- The calculated offset along with other necessary information (e.g. epoch, TSN domain number, time domain identifier) is delivered to one or multiple UE(s) over e.g. a dedicated RRC signal
- UE(s) decode the offset and adjusts the local time reference per the indicated offset before providing it to e.g., a TSN device, a bridge or a TSN endpoint.

According to certain embodiments, the embodiment of method 1 allows the definition of multiple time domains for the cellular UEs. As such, a cellular reference time (e.g. based on GPS) is broadcasted to all UEs.

Additionally, TSN domain specific working times are established between BS and UEs by transmission of time offsets to individual UEs. The offsets will be calculated at the BS based on the common broadcasted cellular reference time.

According to a particular embodiment, the BS transmits by broadcasts or unicast the offsets along with TSN domain identifiers to the UEs in the given domain. The UEs identify their required TSN domain (or are configured to use a specific TSN domain) and, thus, consider the time offset corresponding to that TSN domain to tune their clocks to the specific TSN domain working time/local reference time i.e. considering the cellular reference time plus the specific time offset.

In FIG. 150, method 1 is explained, assuming a 5G cellular network and one additional time signal from a TSN domain in the backbone. According to certain embodiments, the BS broadcasts the cellular reference time (10:00, 10:10, 10:20 . . . ) at defined points in time to all UEs; in addition, the BS will also transmit a TSN-domain specific working clock to UE1 by signaling the offset to the cellular reference time. Compared to the baseline cellular reference time synchronization method between BS and UE, the requirements for the transmission of the offsets is lowered as a calculation of the transmission and processing times is not necessary. Still, the offsets need to be communicated with sufficient periodicity and an indication of uncertainty/accuracy.

FIG. 153 illustrates the sequence flow for method 2, according to certain embodiments. The steps for method 2 are also provided as follows:

- A UE receives a working clock time reference directly from the TSN network it is connected to, then the UE compares this time reference with the cellular time reference received from BS in order to calculate an individual offset.
- UE further delivered the calculated offset to BS, e.g. by RRC signaling. The BS receive the offset message from UE and adjusts a time reference based on the received offset from UE. Subsequently, BS sends the modified time reference to a TSN device on the cellular network as described in the scenario 2. This way the TSN device on the network side is tuned to the TSN working time instead of the cellular reference time.

Method 2 is based on the same assumptions as method 1.

In FIG. 151, method 2 is explained, assuming a 5G cellular network and one additional time signal from a TSN domain on the UE side. In a particular embodiment, method 2 might include the need to have multiple clocks at the BS or a core network function that uses the offsets to calculate working clocks for TSN networks based on the cellular reference time that supports multiple clocks in parallel.

According to certain other embodiments, receiver-side offset calculation using timestamps may be performed. Specifically, the described solution may be used, for example, to transmit a PTP time information from an external grandmaster between UE and gNB in a time-aware manner. Therefore, a common reference time is used to evaluate the variable time t_d it took to transmit the packet from one layer at one of both nodes, to another layer at the other node.

The common reference time between UE and gNB is used to estimate t_d. As already explained above PTP is often used in industrial context to synchronize systems. This mechanism of course also works the other way around where the UE is synched to a PTP grandmaster. This transmission of ptp packets could be done transparently to the external PTP devices or by letting the UE and gNB jointly act like a boundary clock. Important to mention is that the timestamping in this case is not required in a round-way fashion as done in PTP to calculate the roundtrip delay—it can happen at a higher layer and only the one way delay t_d is required as both UE and gNB already have a sufficiently synchronization as a baseline This is illustrated in FIG. 154 for a gNB to UE sync.

In view of the detailed explanation just provided, it will be appreciated that FIG. 155 depicts a method 2600 performed by a wireless device for reducing deviations between a common cellular reference timing signal, according to certain embodiments. The method begins at step 2602 when the wireless device receives a first timing signal from a cellular network. At step 2604, the wireless device receives a second timing signal from at least on TSN to which the wireless device is connected. The first timing signal is compared to the second timing signal to determine an offset, at step 2606. At step 2608, the wireless device transmits the offset to a network node.

FIG. 156 illustrates a schematic block diagram of a virtual apparatus 2700 in a wireless network. The apparatus may be implemented in a wireless device or network node. Apparatus 2700 is operable to carry out the example method described with reference to FIG. 155 and possibly any other processes or methods disclosed herein. It is also to be understood that the method of FIG. 155 is not necessarily carried out solely by apparatus 2700. At least some operations of the method can be performed by one or more other entities.

Virtual Apparatus 2700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause first receiving module 2710, second receiving module 2720, comparing module 2730, transmitting module 2740, and any other suitable units of apparatus 2700 to perform corresponding functions according one or more embodiments of the present disclosure.

According to certain embodiments, first receiving module 2710 may perform certain of the receiving functions of the apparatus 2700. For example, first receiving module 2710 may receive a first timing signal from a cellular network.

According to certain embodiments, second receiving module 2720 may perform certain other of the receiving functions of the apparatus 2700. For example, second receiving module 2720 may receive a second timing signal from at least on TSN to which the wireless device is connected.

According to certain embodiments, comparing module 2730 may perform certain of the comparing functions of the apparatus 2700. For example, comparing module 2730 may compare the first timing signal to the second timing signal to determine an offset.

According to certain embodiments, transmitting module 2740 may perform certain of the transmitting functions of the apparatus 2700. For example, transmitting module 2740 may transmit the offset to a network node.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

FIG. 157 depicts a method by a network node such as, for example, a base station for reducing deviations between a common cellular reference timing signal, according to certain embodiments. The method begins at step 2802 when the network node transmits, to a wireless device, a first timing signal for a cellular network. At 2804, the network node receives, from the wireless device, an offset measured by the wireless device. The offset is based on a difference between the first timing signal for the cellular network and a second timing signal associated with at least on time sensitive network (TSN) to which the wireless device is connected. Based on the offset received from the wireless device, a third timing signal for the cellular network is determined at step 2806. The third timing signal is an adjusted time signal of the first timing signal. At step 2808, the network node transmits, to the wireless device, the third timing signal network node.

FIG. 158 illustrates a schematic block diagram of a virtual apparatus 2900 in a wireless network. The apparatus may be implemented in a wireless device or network node. Apparatus 2900 is operable to carry out the example method described with reference to FIG. 157 and possibly any other processes or methods disclosed herein. It is also to be understood that the method of FIG. 157 is not necessarily carried out solely by apparatus 2900. At least some operations of the method can be performed by one or more other entities.

Virtual Apparatus 2900 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause first transmitting module 2910, receiving module 2920, determining module 2930, and second transmitting module 2940, and any other suitable units of apparatus 2900 to perform corresponding functions according one or more embodiments of the present disclosure.

According to certain embodiments, first transmitting module 2910 may perform certain of the transmitting functions of the apparatus 2900. For example, first transmitting module 2910 may transmit, to a wireless device, a first timing signal for a cellular network.

According to certain embodiments, receiving module 2920 may perform certain of the receiving functions of the apparatus 2900. For example, receiving module 2920 may receive, from the wireless device, an offset measured by the wireless device. The offset is based on a difference between the first timing signal for the cellular network and a second timing signal associated with at least on time sensitive network (TSN) to which the wireless device is connected.

According to certain embodiments, determining module 2930 may perform certain of the determining functions of the apparatus 2900. For example, determining module 2930 may determine a third timing signal for the cellular network based on the offset received from the wireless device.

According to certain embodiments, second transmitting module 2940 may perform certain other of the transmitting functions of the apparatus 2900. For example, second transmitting module 2940 may transmit, to the wireless device, the third timing signal network node.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

FIG. 159 depicts a method 3000 performed by a wireless device for reducing deviations between a common cellular reference timing signal, according to certain embodiments. The method begins at step 3002 when the wireless device receives a first timing signal from a cellular network. At step 3004, the wireless device receives a second timing signal from at least one time sensitive network (TSN). At step 3006, the wireless device receives, from a network node associated with the cellular network, an offset measured by the network node. The offset is based on a difference between the first timing signal for the cellular network and the second timing signal from the at least one TSN. The offset is used to reduce a deviation between the first time signal and the second time signal, at step 3008.

FIG. 160 illustrates a schematic block diagram of a virtual apparatus 3170 in a wireless network. The apparatus may be implemented in a wireless device or network node. Apparatus 3100 is operable to carry out the example method described with reference to FIG. 159 and possibly any other processes or methods disclosed herein. It is also to be understood that the method of FIG. 159 not necessarily carried out solely by apparatus 3100. At least some operations of the method can be performed by one or more other entities.

Virtual Apparatus 3100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause first receiving module 3110, second receiving module 3120, third receiving module 3130, using module 3140, and any other suitable units of apparatus 3100 to perform corresponding functions according one or more embodiments of the present disclosure.

According to certain embodiments, first receiving module 3110 may perform certain of the receiving functions of the apparatus 3100. For example, first receiving module 3110 may receive a first timing signal from a cellular network.

According to certain embodiments, second receiving module 3120 may perform certain other of the receiving functions of the apparatus 3100. For example, second receiving module 3120 may receive a second timing signal from at least on time sensitive network (TSN).

According to certain embodiments, third receiving module 3130 may perform certain other of the receiving functions of the apparatus 3100. For example, third receiving module 3130 may receive, from a network node associated with the cellular network, an offset measured by the network node. The offset is based on a difference between the first timing signal for the cellular network and the second timing signal from the TSN.

According to certain embodiments, using module 3140 may perform certain of the using functions of the apparatus 3100. For example, using module 3140 may use the offset to reduce a deviation between the first time signal and the second time signal.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

FIG. 161 depicts a method by a network node such as, for example, a base station for reducing deviations between a common cellular reference timing signal, according to certain embodiments. The method begins at step 3202 when the network node receives a second timing signal from at least on time sensitive network (TSN). At step 3204, the network node performs a comparison the second timing signal to a first time signal for a cellular network. Based on the comparison, an offset comprising a difference between the first timing signal for the cellular network and a second timing signal from the TSN is determined at step 3206. At step 3208, the offset is transmitted to a wireless device connected to the TSN.

FIG. 162 illustrates a schematic block diagram of a virtual apparatus 3300 in a wireless network. The apparatus may be implemented in a wireless device or network node. Apparatus 3300 is operable to carry out the example method described with reference to FIG. 161 and possibly any other processes or methods disclosed herein. It is also to be understood that the method of FIG. 161 is not necessarily carried out solely by apparatus 3300. At least some operations of the method can be performed by one or more other entities.

Virtual Apparatus 3300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving module 3310, performing module 3320, determining module 3330, and transmitting module 3340, and any other suitable units of apparatus 3300 to perform corresponding functions according one or more embodiments of the present disclosure.

According to certain embodiments, receiving module 3310 may perform certain of the receiving functions of the apparatus 3300. For example, receiving module 3310 may receive a second timing signal from at least on time sensitive network (TSN).

According to certain embodiments, performing module 3320 may perform certain of the performing functions of the apparatus 3300. For example, performing module 3320 may perform a comparison the second timing signal to a first time signal for a cellular network.

According to certain embodiments, determining module 3330 may perform certain of the determining functions of the apparatus 3300. For example, determining module 3330 may an offset comprising a difference between the first timing signal for the cellular network and a second timing signal from the TSN based on the comparison.

According to certain embodiments, transmitting module 3340 may perform certain of the transmitting functions of the apparatus 3300. For example, transmitting module 3340 may transmit the offset to a wireless device connected to the TSN.

Combination of TSN Detection and Support for Multiple Time Domains

Again, as indicated above, the various techniques described herein may be combined with each other, to provide advantages with respect to latency, reliability, etc. For example, one particular combination that is advantageous is the combination of the techniques described above for detecting support for TSN and the techniques described just above for supporting multiple time domains.

Thus, for example, the method illustrated in FIG. 135 can be combined with the method shown in FIG. 155, resulting in a method performed by a wireless device associated with a wireless communications network. This method includes the step of receiving system information (SI) from a radio base station (RBS) of a radio access network (RAN), the SI being indicative of support for time-sensitive networking (TSN) through the RBS, as shown at block 402 of FIG. 135, as well as the step of establishing at least one TSN stream with the external data network, through the RBS, as shown at block 404 of FIG. 135. The method further includes the steps of receiving a first timing signal from the wireless communications network, via the RBS, as shown at block 2602 of FIG. 155, and receiving a second timing signal from the external TSN data network to which the wireless device is connected, as shown at block 2604 of FIG. 155. As shown at blocks 2606 and 2608 of FIG. 155, the method still further comprises comparing the first timing signal to the second timing signal to determine an offset and transmitting the offset to the wireless communications network.

In some of these embodiments, the SI is comprised in one or more system information blocks (SIBs). In some embodiments, the first timing signal comprises a cellular time reference. In some embodiments, the second timing signal comprises a working clock time reference. In some embodiments, the offset is a measurement of a difference in time between the first timing signal and the second timing signal. In some embodiments, the offset is transmitted to the wireless communications network via RRC signaling.

Some embodiments may further comprise the step of receiving, from the RBS, a third timing signal from the wireless communications network, the third timing signal being an adjusted time signal of the first timing signal.

In some embodiments, the method further comprises adjusting a local time reference based on the offset. In some embodiments, the method further comprises transmitting the offset to the external TSN data network. The method may further comprise transmitting at least one of an epoch, a TSN domain number, a time domain identifier to at least one of the RBS and the external TSN data network.

Prioritizing Grants

Uplink (UL) traffic can be scheduled with dynamic UL grants or configured UL grants. In case of dynamic grants, the gNB provides an UL grant to the UE for each UL transmission. Configured grants are pre-allocated, i.e. provided once to the UE, thereafter the configured UL grant is valid for usage for UL transmissions according to a configured periodicity. The UE does not need to transmit padding on those UL resources if no UL data is available for transmission, i.e. may skip an UL transmission on such grants.

A typical NR-IoT device would handle communication for multiple service types, e.g. periodic Ultra-reliable low latency communication (URLLC) type robot control messages, URLLC type of occasional alarm signals, for which periodic resources would need to be configured, occasional sensor data transmission, other mobile broadband (MBB) type traffic such as occasional video transmissions or software updates. It would lead to a traffic mix to be multiplexed by the UE for UL transmissions, i.e. on media access control (MAC) multiple logical channels with different priorities would need to be configured.

Periodic URLLC traffic must be delivered within a deterministic latency, i.e., robust transmissions must be guaranteed which is costly in terms of resource usage. On the other hand, sensor/MBB type of traffic must be served as well, for which resources should be used as efficient as possible, i.e. less robust. It is currently unclear how UE multiplexing of both traffic types with their different requirements can be efficiently handled in the NR system.

In particular, according to current standards, for example dynamic UL grants, e.g. less robust and large for MBB, or other UL grants, override configured UL grants, e.g. very robust for URLLC transmissions, either destroying the determinism for the URLLC transmissions or leading to a high complexity for the gNB to avoid those overriding, i.e. by scheduling "around" the configured UL grants, which in some resource situations may not be feasible. This may thus result in a reduced or limited performance of the wireless communication network.

According to embodiments herein a radio network node, such as a gNB or other radio base station (RBS) configures a UE with a configured grant and/or a dynamic grant for UL transmissions. The decision on whether dynamic or configured grant is used for an UL transmission by the UE is conditional on whether UL data has been obtained to transmit on the configured grant UL resources according to the logical channel prioritization decision, i.e. in particular whether a MAC Protocol data unit (PDU) is obtainable from the MAC multiplexing/assembly entity, i.e. whether the uplink grant is skipped due to no data available on logical channels allowed to transmit on the configured UL grant.

It is assumed that according to a logical channel restriction condition, which is configurable, data transmission of some logical channels is not permitted on a configured UL grant. i.e. for the MBB type non-critical logical channels. This way, valuable robust resources are not wasted by sending MBB type traffic that does not require robust resources, but could rather wait/be delayed some time more and be transmitted on more efficient, less robust dynamically scheduled resources.

More specifically, according to embodiments herein, for a configured UL grant (with wanted frequent and robust but small allocation intended for reliably transmitted data such as URLLC data):

- Prioritize a received UL dynamic grant for a new transmission, received on physical downlink control channel (PDCCH) for cell radio network temporary identifier (C-RNTI), e.g. a larger grant with efficient (less robust) transmission parameters, under the condition that there would be no UL transmission on the configured grant, previously received configured grant on PDCCH for configured scheduling (CS)-RNTI, in case it was prioritized, i.e. that no UL data is available for transmission on a configured grant, i.e. for URLLC type logical channel for which transmission on the configured grant is allowed, that there is no UL data available. Note that according to current standard, the received dynamic UL grant would always be prioritized, independently of UL data availability.
- Prioritize the UL configured grant when there is UL data available for transmission on the UL configured grant for any logical channel for which transmission on the UL configured grant is permitted according to configured logical channel restrictions. E.g. URLLC logical channel (LCH) data.
  - According to a further embodiment, the UL configured grant is only prioritized if according to the above conditions AND when for a logical channel transmission is ONLY permitted on the configured grant, i.e. this logical channel data had otherwise no possibility to be transmitted when dynamic grant were prioritized.

Note that requested retransmissions may always be prioritized, i.e. in another embodiment, the retransmission of a MAC PDU sent on a previous configured grant is prioritized over a later configured grant. In more detail, if the dynamic UL grant is for a retransmission of the configured grant, i.e., scrambled with CS-RNTI and a New Data Indicator (NDI) in the received hybrid automatic repeat request (HARQ) information is 1, this dynamic grant overrides the configured UL grant, irrespective of whether a MAC PDU has obtained or not.

In another embodiment, when prioritizing the UL configured grant according to the above, the following exception is considered: do not prioritize the UL configured grant if an LCH which is restricted to be transmitted only over the dynamic grant, is of higher priority than another LCH, for which restriction to transmit only on configured UL grant is configured.

In one embodiment, the gNB expecting transmission on either dynamic UL grant or configured UL grant, i.e. blindly decoding both possibilities.

The UE uses configured UL even if dynamic UL grant is received for overlapping resources, under the condition that UL data would be transmitted on the configured grant resources according to a logical channel prioritization procedure.

Note that in a general scenario the term “radio network node” can be substituted with “transmission point”. Distinction between the transmission points (TPs) may typically be based on CRSs or different synchronization signals transmitted. Several TPs may be logically connected to the same radio network node but if they are geographically separated, or are pointing in different propagation directions, the TPs may be subject to the same mobility issues as different radio network nodes. In subsequent sections, the terms “radio network node” and “TP” can be thought of as interchangeable.

FIG. 163 is a combined flowchart and signalling scheme according to embodiments herein. The actions illustrated therein and described below may be performed in any suitable order.

Action 201: The radio network node 12 may configure the UE 10 to prioritize UL transmission of configured periodic UL grant over UL transmission of a dynamic UL grant under a condition that there is UL data to be transmitted on the configured grant according to a logical channel prioritization procedure. The configured periodic UL grant may be for a first type of transmissions e.g. critical data transmissions such as URLLC transmissions, and the dynamic UL grant may be for a second type of transmissions e.g. non-critical data transmissions such as MBB transmissions.

Action 202: The radio network node 12 may schedule the UE 10 with a dynamic grant for UL transmissions of the second type e.g. non-critical data transmissions such as non-latency sensitive transmissions e.g. for a broadband service or similar. This may mean that the radio network node transmits a dynamic UL grant to the UE 10. The UE 10 may thus send a scheduling request for an UL transmission and may subsequently receive a dynamic UL grant for the UL transmission.

Action 203: The UE 10 prioritizes UL transmission of the configured periodic UL grant over UL transmission of the dynamic UL grant under the condition that there is UL data to be transmitted on the configured periodic UL grant according to a logical channel prioritization procedure. The configured periodic UL grant may be for the first type of transmissions such as URLLC transmission, and the dynamic UL grant may be for the second type of transmissions such as MBB transmission.

Action 204: When the UE 10 has prioritized periodic UL grant in action 203, the UE may transmit a transmission of the first type of transmissions such as URLLC transmission.

Action 205: When the UE 10 has prioritized dynamic UL grant in action 203, the UE may transmit a transmission of the second type of transmissions such as MBB transmission.

FIG. 164 is a block diagram depicting the UE 10 for handling configuration e.g. handling or enabling communication to the radio network node in the wireless communication network 1 according to embodiments herein. The UE 10 may comprise processing circuitry 801, e.g. one or more processors, configured to perform the methods herein. The UE 10 may comprise a receiving unit 802, e.g. a receiver or a transceiver. The UE 10, the processing circuitry 801, and/or the receiving unit 802 may be configured to receive configuration data from the radio network node 12. The configuration data may define that the UE prioritizes UL transmission of the configured periodic UL grant over UL transmission of a dynamic UL grant under the condition that there is UL data to be transmitted on the configured grant according to a logical channel prioritization procedure. The configured periodic UL grant may be for a first type of transmissions such as URLLC transmission, and the dynamic UL grant may be for a second type of transmissions such as MBB transmission. The UE 10, the processing circuitry 801, and/or the receiving unit 802 is configured to receive a dynamic UL grant for an UL transmission.

The UE 10 may comprise a prioritizing unit 803. The UE 10, the processing circuitry 801, and/or the prioritizing unit 803 may be configured to prioritize UL transmission of the configured periodic UL grant over UL transmission of the dynamic UL grant under the condition that there is UL data to be transmitted on the configured periodic UL grant according to a logical channel prioritization procedure. The UE 10 may comprise a transmitting unit 804, e.g. a transmitter or a transceiver. The UE 10, the processing circuitry 801, and/or the transmitting unit 804 may be configured to prioritize UL transmission of the configured periodic UL grant over UL transmission of the dynamic UL grant under the condition that there is UL data to be transmitted on the configured periodic UL grant according to a logical channel prioritization procedure. In some examples, the prioritizing unit 803 performs the prioritization. Therefore, in these examples, the UE 10, the processing circuitry 801, and/or the transmitting unit 804 may be configured to transmit transmission of the first type or transmission of the second type as prioritized by the UE 10, the processing circuitry 801, and/or the prioritizing unit 803.

The UE 10 further comprises a memory 807. The memory comprises one or more units to be used to store data on, such as RSs, strengths or qualities, UL grants, indications, requests, commands, applications to perform the methods disclosed herein when being executed, and similar. The UE 10 comprises a communication interface comprising one or more antennas.

The methods according to the embodiments described herein for the UE 10 are respectively implemented by means of e.g. a computer program product 805 or a computer program, comprising instructions, i.e., software code portions, which, when executed on at least one processor, cause the at least one processor to carry out the actions described herein, as performed by the UE 10. The computer program product 805 may be stored on a computer-readable storage medium 806, e.g. a universal serial bus (USB) stick, a disc or similar. The computer-readable storage medium 806, having stored thereon the computer program product, may comprise the instructions which, when executed on at least one processor, cause the at least one processor to carry out the actions described herein, as performed by the UE 10. In some embodiments, the computer-readable storage medium may be a non-transitory or a transitory computer-readable storage medium.

FIG. 165 is a block diagram depicting the radio network node 12 for handling, e.g. facilitating, configuration in the wireless communication network 1 according to embodiments herein. The radio network node 12 may comprise processing circuitry 1001, e.g. one or more processors, configured to perform the methods herein.

The radio network node 12 may comprise a configuring unit 1002. The radio network node 12, the processing circuitry 1001 and/or the configuring unit 1002 is configured to configure the UE 10 with an UL grant for UL transmission over a logic channel. The radio network node 12 may comprise a scheduling unit 1003, such as a scheduler. The radio network node 12, the processing circuitry 1001 and/or the scheduling unit 1003 may further be configured to schedule the UE 10 with a dynamic grant for UL transmission of a broadband service or similar.

The radio network node 12 may comprise a receiving unit 1004, e.g. a receiver or transceiver. The radio network node 12, the processing circuitry 1001 and/or the receiving module 1004 is configured to receive from the UE 10 data on a radio resource. The radio network node 12 further comprises a memory 1005. The memory comprises one or more units to be used to store data on, such as strengths or qualities, grants, scheduling information, applications to perform the methods disclosed herein when being executed, and similar. The radio network node 12 comprises a communication interface comprising transmitter, receiver, transceiver and/or one or more antennas.

The methods according to the embodiments described herein for radio network node 12 are respectively implemented by means of e.g. a computer program product 1006 or a computer program product, comprising instructions, i.e., software code portions, which, when executed on at least one processor, cause the at least one processor to carry out the actions described herein, as performed by the first radio network node 12. The computer program product 1006 may be stored on a computer-readable storage medium 1007, e.g. a USB stick, a disc or similar. The computer-readable storage medium 1007, having stored thereon the computer program product, may comprise the instructions which, when executed on at least one processor, cause the at least one processor to carry out the actions described herein, as performed by the radio network node 12. In some embodiments, the computer-readable storage medium may be a non-transitory or transitory computer-readable storage medium.

Combination of TSN Detection and Grant Prioritization

Once more, as indicated above, the various techniques described herein may be combined with each other, to provide advantages with respect to latency, reliability, etc. For example, one particular combination that is advantageous is the combination of the techniques described above for detecting support for TSN and the techniques described just above for prioritizing grants.

Thus, for example, the method illustrated in FIG. 135 can be combined with the method shown in FIG. 163, resulting in another method performed by a wireless device associated with a wireless communications network. This method includes the step of receiving system information (SI) from a radio base station (RBS) of a radio access network (RAN), the SI being indicative of support for time-sensitive networking (TSN) through the RBS, as shown at block 402 of FIG. 135, as well as the step of establishing at least one TSN stream with the external data network, through the RBS, as shown at block 404 of FIG. 135. The method further includes the steps of configuration information configuring periodic uplink grants indicating uplink resources to use for uplink transmissions to the wireless communications network, as shown at step 201 of FIG. 163, and receiving a dynamic uplink grant for an uplink transmission to the wireless communications network, as shown at step 202 of FIG. 163. As shown at step 203 of FIG. 163, this example method further includes the step of prioritizing uplink transmission using the configured periodic uplink grant over uplink transmission using the dynamic uplink grant, on the condition that there is uplink data to be transmitted on the configured periodic uplink grant according to a logical channel prioritization procedure.

In some embodiments, the SI is comprised in one or more system information blocks (SIBs). In some embodiments, the logical channel prioritization procedure prevents transmission of some logical channels on the configured periodic uplink grant. In some of these latter embodiments, the logical channel prioritization procedure may restrict transmission using the configured periodic uplink grant to ultra-reliable low latency communication (URLLC) messages. In some embodiments, the dynamic uplink grant is for a mobile broadband (MBB) transmission.

Device Enrollment in an IoT Environment

The Internet of things (IoT) is commonly known as a network of physical devices, vehicles, home appliances, and/or other items embedded with electronics, software, sensors, actuators, and connectivity which typically enable the devices to connect and exchange data. As discussed herein, the Industrial IoT is simply the IoT as applied to an industrial setting, such as in a factory.

Adding a new device to an IoT system or IoT environment (the terms may be used interchangeably in this disclosure), or deploying an entire IoT system for the very first time typically includes: physically installing the devices, i.e. sensors, actuators, etc., at their respective physical location; configuring the devices with identity and other attributes, such as e.g. geographical location, owner, purpose, etc.; setting up communication parameters, e.g. Wi-Fi access points and passwords, encryption keys and certificates; and enrollment of the devices, registering them with (cloud) services that will make use of them, and that they will make use of.

A typical example is installing a new surveillance system (either residential or commercial). Each device is preconfigured with its functionality, but typically requires specific configuration which may vary based on situation, context and/or intended usage, such as location (e.g. the living room) and communication (e.g. how to contact the communications hub of the IoT system). The communication hub should typically be configured with contact details to the owner, such as phone number (for GSM/GPRS communication) or network address (for IP-based communication), and password for services. Typically, some of the parameters can be configured en masse (e.g. during manufacture), and some of them should be configured after installment.

There exist various ways of handling the enrollment of the devices. Common ways typically include:

- configuring a device before/directly after installation. It is typically common to allow the devices to be "trusting" when first started (known as TOFU, Trust On First Use). This allows the installer or operator to easily configure the IoT devices by means of either using no security at all, or by using security credentials set during manufacturing such as user or password combination that are common for all of the devices and which often can be found on the Internet. A typical drawback with this approach is that its vulnerable to man-in-the-middle attacks, and that security is easily compromised since the default passwords often are left unchanged after configuration, enabling further tampering.

- bootstrapping the devices by typically having them "phone home" to a pre-determined address in order to receive configuration parameters. However this approach requires Internet access, or access to at least one pre-determined address typically using IP-based communication.

Hence, the conventional approaches for enrollment of devices to IoT environments are typically insecure and/or inflexible. Therefore, there is a need for providing secure and flexible means for device enrollment in IoT systems.

As just mentioned, adding a new device to a system, or deploying an IoT system for the very first time, typically includes

- physically installing the devices,
- configuring them with identity and other attributes,
- setting up communication parameters, and
- enrollment of the devices.

A typical example is adding a new controller to a factory automation system. The controller typically needs to know who is allowed to configure/reconfigure control loops, and where and how to send warnings/errors. It furthermore typically requires private keys for encrypting communication, and it typically requires knowing how to communicate with other devices and services (i.e., receive information on certificates, keys, etc.).

However, as previously mentioned, conventional enrollment processes may typically lead to insecure systems, since the configuration of the devices may be performed again by using the same default password, or enrollment is inhibited by the fact that Internet connection is required.

It is typically known that any computer application can be serialized in some form. Computer serialization is typically the process of translating data structures or object states into a format that can be stored or transmitted and reconstructed later (possibly in a different computer environment). The opposite operation, extracting a data structure from a series of bytes, is typically known as deserialization. The serialization, however, may have to be complex and detailed, and thus requiring more storage space, unless the environment the application will be executing in has support for high-level abstractions of even quite complex functionality.

The serialization/deserialization described herein may be done according to any suitable method for serializing/deserializing data.

According to some embodiments herein, the application may be an enrollment application comprising enrollment information for assisting/enabling execution of enrollment of a device to the IoT environment.

For example, encoding the enrollment application using a limited format such as QR codes or barcodes adds some restrictions on the available space (even a high-density format such as HCCB is limited to approx. 300 bytes/cm2).

However, using a high-level description of the enrollment application, it is possible to encode the application, complete with internal state, parameters etc., as a string, barcode or QR Code using a limited amount of space by using serialization.

According to some embodiments, this fact may be utilized in order to provide a secure encoded enrollment process which does not require Internet connection.

For example according to some embodiments herein, an enrollment application may be distributed over several devices, or several enrollment applications may in some embodiments be running on different devices where one device may be used for assisting in enrollment of another device, and may retrieve information on geographical & organizational location, ownership, encryption keys, communication parameters (e.g. Wi-Fi access point, login credentials and address to gateway or web service, etc.) from the assisting device, storing it persistently on e.g. one or more of the devices being enrolled. Furthermore, it may in the state of the application(s) be included all information necessary to assume ownership of the device from which information has been retrieved such as e.g. keys for communication and identity.

These enrollment applications are then serialized and supplied together with one or more IoT devices e.g. by means of a note inside the package, or printed on the side of the device, or generated and printed on the receipt, or downloaded from the manufacturer's website, or distributed in some other form.

Obtaining the code e.g. by means of an assisting device e.g. a mobile phone, or otherwise retrieving it, and then de-serializing by e.g. using an application or function in the mobile phone gives a digital representation of the enrollment application, which can then be deployed on a system consisting of at least the IoT-device and (for example) the mobile phone used for enrollment.

It should be noted that the assisting device does not necessarily have to be a mobile phone but could also in some embodiments be another IoT device, or other suitable device for deserializing the enrollment information.

The enrollment application may be distributed over the at least two devices (the IoT device(s) to be enrolled, and the mobile phone assisting the enrollment) and starts executing an enrollment process by delivering all relevant information to the IoT device as well as the mobile phone.

The enrollment application may also comprise enrollment information pertaining to steps of the enrollment that may in some embodiments need to be performed by either or both of the assisting device (e.g. the mobile phone) and the IoT device to be enrolled.

The IoT device stores the enrollment information persistently, terminates the application and then resumes its intended operation.

The IoT device could optionally burn a fuse or something similar to prevent tampering or changing the data, thus making ownership permanent. The mobile phone could optionally forward the result of the registration to a server.

In an IoT framework, using fairly high-level abstractions to describe functionality, i.e. functionality is described on a semantically high level using high level descriptions such as "trigger alarm" rather than detailed and low level commands such as "set_pin(18, 0)", it is possible to encode even quite large and complex applications as bar codes or QR codes which can be interpreted by e.g. a mobile device. The application itself can be either a distributed application covering several devices, or separate applications exchanging data.

The encoded application can then e.g. in some embodiments be either:

1) Printed on the IoT device
2) Included on a note in the IoT device packaging
3) Downloaded in batch from a web-service using unique identifiers supplied with IoT device.

Other options for delivering the encoded application are of course possible.

The technician or operator installing the IoT device may then use a mobile device as an assisting device to obtain the barcode/barcodes (e.g. by scanning the code) and deploy the application or applications. The application (or parts of an application) executing on the mobile phone then fills in configuration data such as location, purpose, ownership, credentials and other important information, whereas the application (or parts of an application) on the device to be enrolled stores this information persistently.

After the configuration/enrollment has completed, the application is disposed of, and the IoT device resumes normal operation, using the supplied configuration/enrollment data.

This approach allows for straightforward automated registration, configuration and enrollment of e.g. IoT devices without the devices requiring access to the Internet, or any other connectivity other than a means of communicating with a registration device (Bluetooth, NFC, Wi-Fi, etc.)

FIG. 168 illustrates an example method 100 of a first device according to some embodiments for initiating an enrollment process of a second device to an Internet of Things (IoT) environment.

The first device may e.g. be wireless communication device such as a mobile phone. The first device may be any device capable of deserializing high level abstractions, such as a handheld computer, lap top or surf pad. Although a mobile device is preferable it is not excluded that the first device is a stationary device, such as e.g. a stationary computer.

The second device may e.g. be a robot, physical device, sensor, camera or any other device suitable for an IoT system.

In some embodiments, the second device is an Internet of Things (IoT) device. In some embodiments the first device is a wireless communication device.

The method 100 starts in 110 with obtaining 110 a representation of an enrollment function associated with the second device, wherein the enrollment function is associated with at least one serialized enrollment application comprising enrollment information associated with the first and second device.

The representation of the enrollment function may e.g. be obtained by means of scanning the representation or otherwise capture the representation using e.g. a camera or other sensor.

The representation of the enrollment function may be a QR code printed on the second device, or supplied in the packaging of the second device or similar. The representation of the enrollment function could additionally or alternatively be e.g. a bar code or an RF-ID chip capable of analogue or digital storing of the serialized enrollment function. Other representations are possible.

The enrollment information associated with the first and second device comprised in the serialized enrollment application may e.g. comprise one or more of instructions for setting up communication between the first and second device, an indication of that an enrollment process is to be carried out, steps of an enrollment process, information associated with one or more of geographical location, organizational location, ownership, encryption keys, communication parameters, communication keys and identity, and information on what parameters should be exchanged between the devices such as credentials etc.

For example, the above parameters may represent a mix of information flowing between both devices. Additional data, originating in the first device, such as e.g. geographical location, organizational location, and ownership may be data sent by the first device to the second device and stored by the latter.

Encryption and communication keys/parameters may further be sent in either direction (e.g. during handshake, negotiation of means of communication etc.) during the deployment of the enrollment application, i.e. during the enrollment process.

Identity could be either sent from second device to first device (in the case of serial number or unique identifier set during manufacturing) or from first device to second device (in the case of human readable name, or identifier within organization The method 100 then continues in step 120 with deserializing the enrollment application such that enrollment information associated with the first device is separated from enrollment information associated with the second device.

Hence, the first and the second device may not necessarily receive the same enrollment information. The enrollment information associated with the first device may e.g. comprise instructions on which parameters the first device should supply to the second device. In the same manner, the enrollment information associated with the second device may comprise instructions that an enrollment is to take place, and directives on what parameters and/or information associated with the second device which the second device should supply the first device with.

It is to be noted that the parameters may comprise the same data as the information, i.e. the parameters may be the information or vice versa, hence in this disclosure the term parameter may be replaced by the term information if not explicitly stated otherwise.

In some embodiments, the method 100 may optionally comprise the step of connecting 130 to the second device in order to enable communication between the first and second device.

The connection may e.g. be established by means of e.g. BlueTooth, Wi-Fi, NFC, and physical connection or cable between the devices. However, this step may also be integrated into the next step of transmitting 140 the enrollment information associated with the second device to the second device for initiating execution by the second device of the enrollment process of the second device by configuration of the second device based on the enrollment information associated with the second device.

Hence, the deserialized enrollment information associated with the second device is transmitted from the first device to the second device, in order to initiate the enrollment process and enable the second device to execute the enrollment process as indicated by the (with the second device) associated enrollment information.

According to some embodiments, the enrollment information associated with the second device is unknown to the second device. Hence, enrollment cannot take place unless the first device supplies the second device with the enrollment information comprised in the deserialized enrollment application associated with the second device.

Furthermore, in some embodiments, the enrollment information associated with the second device comprises at least one of public encryption keys for communicating with the IoT system, software systems, capabilities and functions of the IoT-environment.

The method then continues with receiving 150 from the second device configuration information associated with the second device.

As elaborated on above, the enrollment information associated with the second device may comprise instructions that the second device should supply the first device with certain configuration information/parameters associated with the second device that is unknown to the first device.

Such configuration information associated with the second device may e.g. be physical identity of the second device, and public encryption keys for communication with the second device. The information associated with the second device may also in some embodiments comprise an acknowledgement of successful enrollment of the second device.

The first device may e.g. store the received configuration information and may in some embodiments relay it to the IoT system in order to enable connection of the second device to the IoT system.

For instance, according to some embodiments, for IoT-systems depending on a central cloud service, the necessary communication details (such as public keys, and identity) may to be forwarded to the cloud service in order to enable (secure) communication.

In some embodiments, the enrollment function may comprise or represent at least two serialized enrollment applications. In such case, one application may be intended for the first device, and one application may be intended for the second device.

The method may hence in some embodiments further comprise deserializing the at least two serialized enrollment applications into at least one enrollment application comprising enrollment information associated with the first device and at least one enrollment application comprising enrollment information associated with the second device. The first device may then transmit the at least one enrollment application associated with the second device to the second device.

Hence, according to some embodiments, the enrollment function may contain one application (i.e. one split application for both devices, or just one for the second device) or two applications (one for the first device and one for second device) and may also in some embodiments comprise specific configuration data (address, etc., that might not be part of any of the applications).

In some embodiments, the method may further comprise determining that the second device has successfully enrolled and terminating 160 the at least one enrollment application on the first device.

The determination of that the second device has successfully enrolled may e.g. be based on an indication received from the second device of successful enrollment. In some embodiments, the indication of successful enrollment may be comprised in the information received from, and associated with, the second device.

Hence, the method 100 describes steps for initiating and assisting e.g. an IoT device to enroll to an IoT system according to some embodiments.

Furthermore, FIG. 169 illustrates an example method 200 of a second device for executing an enrollment process to an Internet of Things (IoT) environment initiated and assisted by a first device.

The first and second device may e.g. be the first and second device as described in conjunction with FIG. 168.

The method 200 starts in 210 with receiving 210, from the first device, enrollment information associated with the second device (compare with step 140 of the method 100). The enrollment information may originate from at least one deserialized enrollment application, which enrollment application may have been deserialized by the first device according to the method 100.

In some embodiments, the method 200 may further comprise determining 220 that the enrollment information is for executing the enrollment process.

The second device may e.g. comprise different functions and processes which may be initiated when specific instructions or signals are received. The second device may e.g. comprise a function for enrollment which is utilized only when the correct enrollment information for executing the enrollment process is received.

This step may however also be performed automatically when the second device receives the enrollment information, i.e. the reception of the enrollment information may automatically trigger the enrollment process, and the step 220 may hence be seen as implicit in the method 200.

The method 200 then continues with executing 230 the enrollment process by configuring the second device based on the enrollment information.

The second device may e.g. already at least in part have access to the enrollment process but may lack certain information or parameters which may be supplied by the first device. The second device may e.g. have, as mentioned above, been configured at manufacture with a function for enrollment, this function may comprise some steps that should be taken by the device during enrollment but may e.g. lack information on certain necessary parameters or steps.

The enrollment information may hence comprise information which is unknown to the second device until the enrollment process is being deployed. Such information may e.g. pertain to information originating in the first device, such as e.g. geographical location, organizational location, gateway credentials, and (public) encryption keys for communication with the IoT system and ownership which may sent from the first device to the second device and stored by the latter.

In some embodiments, the enrollment information associated with the second device comprises at least one of public encryption keys, software systems, capabilities and functions of the IoT-environment.

In some embodiments, the enrollment information associated with the second device is unknown to the second device. Hence enrollment cannot take place unless initiated by the first device.

The method 200 may then continue with transmitting 240 configuration information associated with the second device to the first device (compare with step 150 of the method 100).

The configuration information associated with the second device transmitted to the first device may e.g. be one or more of physical identity of the second device and public encryption keys for communication with the second device. The configuration information associated with the second device may also in some embodiments comprise an acknowledgement of successful enrollment of the second device.

In some embodiments, the method 200 may further comprise determining that the enrollment is successful, and possibly terminating 250 the enrollment application e.g. by deleting the enrollment information from the second device.

In order to further strengthen security of the enrollment process and hinder future tampering of the data, the second device may e.g. blow a fuse, or in other manners delete the possibility to reconfigure it.

Furthermore, the information associated with the second device transmitted to the first device may also in some embodiments comprise an acknowledgement of successful enrollment of the second device.

FIG. 170 illustrates schematically the execution of the methods 100 and 200 according to some embodiments.

A representation of an enrollment function 330 comprises at least one serialized enrollment application 300 which in turn comprises enrollment information 301, 302 associated with a first device 310 and a second device 320 respectively. The first and the second device may e.g. be the first and second device as described in conjunction with any of FIGS. 169 and 170.

In this example, the representation of the enrollment function is a QR-code. But other representations are possible, such as bar codes, numeric sequences, RF-ID chips, etc.

The first device obtains the representation of the enrollment function, e.g. by scanning using a scanner or camera, or other means for detecting, acquiring or capturing the representation.

The first device 310 may then deserialize the enrollment application such that enrollment information 301 associated with the first device 310 is separated from enrollment information 302 associated with the second device 320 (compare with step 120 of the method 100).

In some embodiments, the first device may further obtain additional configuration information pertaining to the second device from an external data base 311, and may further in some embodiments be prompted by the enrollment application to obtain said additional configuration data from said external storage data base 311.

The first device keeps the enrollment information 301 associated with the first device and transmits the enrollment information 302 associated with the second device 320 to the second device 320 (compare with steps 140 and 210 of the methods 100 and 200 respectively).

It should be noted that the enrollment function may comprise more than one serialized application. In the case of more than one serialized applications, the first device and the second device may be associated with one application each, and the first device may deserialize the applications into one application for the first device and one application for the second device.

In the case of a single serialized application, the first device may deserialize it into information pertaining to the first device, and into information pertaining to the second device, i.e. split the application on the two devices. In some embodiments, in the case with one serialized application, the single application may be intended for the second device only.

The second device may in turn comprise a number of functions which may be associated with different processes. In this example, the second device may comprise function #1-#4, 321, 322, 323, and 324 respectively. These functions may have been configured/added to the second device during manufacture.

In this particular example the representation of the enrollment function information 330 corresponds to function #3, 223. Hence, when the second device receives the deserialized information it will determine that function #3 is to be initiated. In this case, function #3 is the enrollment process (compare with step 220 of the method 200).

Function #3 may comprise some enrollment steps but may lack information which may be provided in the enrollment information obtained from the deserialized enrollment application and received by the second device 320, compare e.g. with the methods 100 and 200.

The second device may then perform the enrollment according to the received enrollment information. In some embodiments, also the first device may use the enrollment information associated with the first device as well as the information received from and associated with the second device in order to configure itself.

It should be noted that also the other functions of the second device may be used for enrollment. Hence, it should be understood that the enrollment function does not comprise of a single function (e.g. function #3) but may also be instructions involving one or more of the other functions on the second device. E.g., the enrollment information may e.g. comprise instructions telling the second device to execute function #1 using parameters a, b and execute function #4 using parameters x, y etc., with functions #1 and #4 being pre-existing functions.

It should be noted that the methods 100 and 200 are closely related as they are performed respectively by a first device and a second device in order to enable enrollment of the second device. Hence, the method 100 and 200 may in some embodiments be combined into one method 400 as illustrated by FIG. 171.

Figure 1:
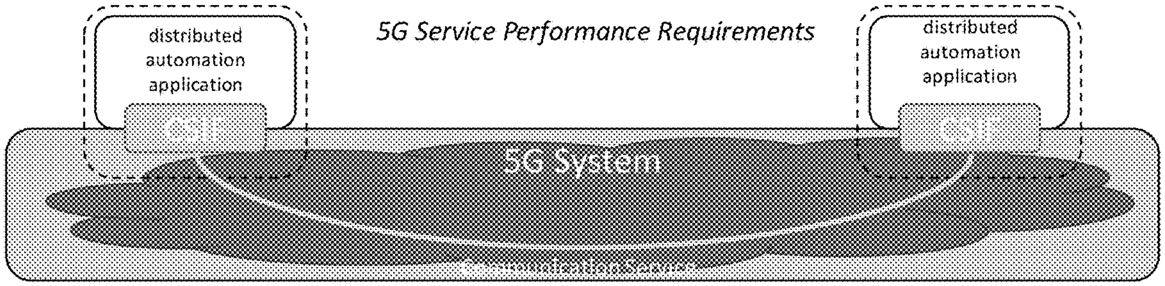
FIG. 1 illustrates a network perspective of the 5G system.

In FIG. 171 a first device (DEV 1) 401, and a second device (DEV 2) 402 may communicate with each other. The first device 401 and the second device 402 may e.g. be the first and second device as respectively described in conjunction with any of the FIGS. 1-3. In the same manner the method 400 may be a combination of the methods 100 and 200 as previously described.

The method 400 starts in 410 where the first device 401 obtains a representation of an enrollment function associated with the second device 402 (compare with step 110 of the method 100). The representation may e.g. be one or more of a QR-code, barcode or similar. The representation may e.g. be obtained through scanning or NFC reader other suitable means.

The representation of the enrollment function comprises or is associated with at least one serialized enrollment application, which enrollment application may comprise enrollment information associated with the first device and with the second device respectively. The serialization enables large amounts of data to be stored in the representation using limited space.

The representation may in some embodiments be stored on the second device. The barcode may e.g. be printed onto the housing of the second device, or it could be supplied on e.g. a piece of paper and be part of the packaging of the second device. It may also be possible in some embodiments to retrieve the representation from e.g. the Internet.

When the first device has obtained the representation of the enrollment function, the method continues in 411 where the first device deserializes the serialized enrollment application in order to extract the digital representation of the information as well as separate the enrollment information which is associated with the first device from the enrollment information which is associated with the second device (compare with step 120 of the method 100).

The enrollment function may in some embodiments comprise a single serialized enrollment application which is deserialized into different blocks of information pertaining to the first or second device. In some embodiments, the enrollment function may comprise more than one serialized enrollment applications, which may be deserialized into one or more applications intended for the first device and one or more applications intended for the second device.

In some embodiments, in the case of a single application, the single application may be intended entirely for one of the devices.

After obtaining, the method 400 may comprise establishing a connection between the first device and the second device for communication (as indicated by the dashed arrow between the first and second device, compare with step 130 of the method 100). The connection may e.g. be established through a Bluetooth connection, NFC, Wi-Fi, or by cable and does not necessarily require Internet or network access.

The connection may be initiated as a separate step of the method, or it may be automatically performed or triggered after having obtained the representation. It may hence be integrated as an implicit action into the next step 412 of transmitting the enrollment information associated with the second device extracted from the deserialized enrollment application to the second device (compare with step 140 of the method 100).

The enrollment information comprised in the enrollment application may to some extent be unknown to the devices prior to deployment of the enrollment process. Hence, the representation of the enrollment function may comprise enrollment information associated with e.g. the second device, which the second device is not aware of as it has not been previously configured with the information.

Such enrollment information may e.g. be credentials associated with e.g. the first device or the IoT system into which the second device is to enroll. Such as e.g. credentials necessary for communicating with other devices or services in the IoT system, as well as ownership, location (e.g. GPS coordinates or address), a human readable name of the second device, or other information that is not known before the time of the enrollment. Other such information may e.g. be geographical location of the second device, organizational location and ownership.

In step 420 of the method 400 the second device receives the enrollment information associated with the second device comprised in the deserialized enrollment application (compare with step 210 of the method 200). This reception may trigger the second device to initiate an enrollment process (compare e.g. to FIG. 169 and the steps 220-230 of the method 200).

Hence in step 421 of the method 400 the second device executes the enrollment process based on the received enrollment information (compare with step 230 of the method 200).

During the enrollment process additional data may be exchanged between the first and second device, such data may e.g. be encryption keys, credentials, identity of the devices etc.

The second device may e.g. transmit in step 422 information associated with the second device to the first device (compare with step 240 of the method 200). Such information may e.g. be public encryption keys, software versions, capabilities and functions associated with the second device, etc.

The second device may also transmit an indication or acknowledgement to the first device that enrollment has been successful.

In step 413 of the method 400, the first device receives from the second device the information associated with the second device (compare with step 150 of the method 100). The first device may e.g. store this information and relay it to the IoT system in order to enable connection of the second device to the IoT system.

Then, after successful enrollment, in step 414 and 423 the first and second device may terminate the enrollment application at their own end respectively (compare with steps 160 and 250 of the methods 100 and 200 respectively). In order to further strengthen security once the enrollment has been completed, the second device may e.g. burn a fuse which hinders further tampering of data, or completely delete the enrollment functionality.

It is contemplated that the enrollment information may comprise instructions to the second device on what actions should be taken when the enrollment is complete, or the second device may already be preconfigured with these steps.

It is also contemplated that the first device may be configured during the enrollment process of the second device. This may be the case when the first device is a part of the IoT system and should maintain knowledge of the second device. The first device may in such case configure itself based on the enrollment information comprised in the serialized enrollment application and the information received from the second device during execution of the enrollment process. This would be the case when, for example, the first device acts as a gateway which the second device utilizes for communication with the IoT system.

The first and second devices described herein are typically physical devices, however in some embodiments the first device comprises more computing resources than the second device. It should however be noted that both the first and the second device may be IoT devices.

FIG. 172 illustrates an example arrangement 500 of a first device for initiating and assisting an enrollment process of a second device to an Internet of things (IoT) environment according to some embodiments.

It is to be noted that in this disclosure, the term arrangement is to be interpreted as a system of aggregated components such as e.g. a circuit board with integrated or removeably attached components. The term arrangement may e.g. be replaced by the term system.

The first device may e.g. be the first device as described in conjunction with any of the FIGS. 168-171. The second device may e.g. be the second device as described in conjunction with any of FIGS. 168-171.

The arrangement 500 may be further configured to carry out the methods as described in conjunction with any of FIGS. 168-171.

The arrangement 500 comprises a controlling circuitry (CNTR; e.g. a controller) 520 and a transceiver circuitry (RX/TX; e.g. a transceiver) 510. In some embodiments, the controlling circuitry may further comprise an obtaining circuitry (OB; obtaining module) 523, a deserializing circuitry (DESER; e.g. a derserializer) 522 and a determination circuitry (DET; e.g. a determiner) 521.

The transceiver circuitry 510 may in some embodiments be a separate transmitter and a separate receiver.

The controlling circuitry 520 may be configured to cause obtaining, e.g. by causing the obtaining circuitry 523, of a representation of an enrollment function associated with the second device, wherein the enrollment function is associated with at least one serialized enrollment application comprising enrollment information associated with the first and second device (compare with step 110 of the method 100).

The obtaining circuitry may e.g. comprise a camera, supplied on a mobile phone. The obtaining circuitry 523 may in some embodiments be any suitable circuitry/means for obtaining or capturing information comprised in an image or on a chip or similar.

The controlling circuitry 520 may be further configured to cause deserializing, e.g. by causing the deserializing circuitry 522, of the enrollment function information such that enrollment information associated with the first device is separated from enrollment information associated with the second device (compare with step 120 of the method 100).

The controlling circuitry 520 may be further configured to cause connection, e.g. by causing the transceiver circuitry to signal the second device, to the second device, such that communication between the first and second device is enabled (compare with step 130 of the method 100).

The controlling circuitry 520 may be further configured to cause transmission, e.g. by causing the transceiver circuitry 510 to signal the second device, of the enrollment information associated with the second device to the second device for initiating execution by the second device of the enrollment process of the second device by configuration of the second device based the enrollment information associated with the second device (compare with step 140 of the method 100).

During and/or after execution of the enrollment process, the controlling circuitry may be further configured to cause, e.g. by causing the transceiver circuitry to receive, reception from the second device of configuration information associated with the second device (compare with step 150 of the method 100).

In some embodiments, the controlling circuitry 520 may be further configured to cause determination, e.g. by causing the determination circuitry 521, that the enrollment process is being executed or has been completed e.g. based on the reception of the information from the second device. The controlling circuitry may then be configured to cause the storage (e.g. in a memory not shown in FIG. 5) of the information received from the second device and the relay of the information to the IoT system.

In some embodiments, the controlling circuitry 520 may further configured to cause the termination of the enrollment application e.g. when it has been determined that the enrollment of the second device has been completed and/or when the first device has performed a configuration of itself based on the deserialized enrollment application comprising enrollment information associated with the first device (compare with step 160 of the method 100).

The arrangement 500 may e.g. be comprised in a wireless communication device. A wireless communication device may e.g. be a mobile phone, smart phone, surf pad, laptop, hand held computer, or similar. The arrangement 500 may also in some embodiments be comprised in an IoT device such as a camera, robot, sensor etc.

FIG. 173 illustrates an arrangement 600 of a second device for executing an enrollment process to an Internet of things (IoT) environment and assisted by a first device.

The first and second devices may e.g. be the first and second device respectively described in conjunction with any of the FIGS. 168-172.

It should be noted that the arrangement 600 may further be combined with or comprise the same or similar features as those described in conjunction with FIG. 172 and the arrangement 500.

The arrangement 600 may e.g. be configured to carry out the methods as described in conjunction with any of the FIGS. 168-171.

The arrangement 600 may comprise a controlling circuitry (CNTR; e.g. a controller) 620 and a transceiver circuitry (RX/TX; e.g. a transceiver) 610. The transceiver circuitry 610 may in some embodiments be a separate transmitter and a separate receiver and/or comprise multiple antennas.

The controlling circuitry 620 may in some embodiments further comprise a functionality circuitry (FUNC; e.g. a functionality module) 622 and a determination circuitry (DET; e.g. a determiner) 621.

The controlling circuitry 620 may in some embodiments be configured to cause reception, e.g. by causing the transceiver circuitry 610, from the first device, enrollment information associated with the second device (compare with step 210 of the method 200).

In some embodiments, the controlling circuitry 620 may be further configured to cause determination, e.g. by causing the determination circuitry 621, of that the enrollment information is for executing the enrollment process (compare with step 220 of the method 200).

In some embodiments, the controlling circuitry 620 may further be configured to cause execution, e.g. by causing the functionality circuitry 622, of the enrollment process by configuring the second device based on the enrollment information (compare with step 230 of the method 200) and cause transmission of configuration information associated with the second device to the first device, e.g. by causing the transceiver circuitry 610 to transmit to the first device (compare with step 240 of the method 200).

In some embodiments, the controlling circuitry 620 may be further configured to terminate the enrollment application when enrollment/configuration has been completed (compare with step 250 of the method 200).

The arrangement 600 may in some embodiments be comprised in an Internet of Things (IoT) device. Such a device may e.g. be a robot, kitchen appliance, camera, sensor, traffic light, machine etc.

An advantage with the embodiments described herein is that an executable application is encoded e.g. as a QR-code and distributed together with an IoT device. When registering the IoT device, the application is decoded and deployed as a distributed application on the IoT device as well as on another device, e.g. a mobile phone used for enrollment of the IoT device. The embodiments disclosed herein do hence not rely on central server/repository for software.

Furthermore, the embodiments herein allows for straight forward automated registration, configuration and enrollment of devices without requiring access to e.g. the Internet or any other connectivity other than means of communicating with a registration device (such as e.g. Bluetooth, NFC, Wi-Fi, etc.).

Furthermore since the device to be enrolled is not preconfigured with all necessary information for the enrollment, security is enhanced.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device) comprising circuitry/logic or performing methods according to any of the embodiments. The electronic apparatus may, for example, be a portable or handheld mobile radio communication equipment, a mobile radio terminal, a mobile telephone, a base station, a base station controller, a pager, a communicator, an electronic organizer, a smartphone, a computer, a notebook, a USB-stick, a plug-in card, an embedded drive, or a mobile gaming device.

Secure Device Operation Using Transferred Code Modules

To make use of the functions of a device, whether locally or over the network, a user must typically authenticate with that device. Once authenticated, the user is then able to use the device to perform one or more functions.

Authentication is often performed by providing certain credentials recognized by the device. For example, a user may provide a password, or an application may provide a digital key. If the password or key are stolen or forged, the security of the device may be compromised. Once such a device is compromised, any number of its functions may be exploited. In general, the increasing sophistication of malicious users has created a continuing pressure on developers to devise new and better techniques for securing devices.

Embodiments of the present disclosure invoke device functions differently than traditional approaches. As just one example, a smart lock executes a runtime environment that supports an unlocking function. To gain access to the unlocking function, another device (e.g., a user's smart phone) obtains authorization to transfer a code module to the smart lock. The code module is configured to execute within the smart lock's runtime environment and expose the unlocking function to the user's smart phone (e.g., via wireless communication). Once the unlocking function is exposed to the user's device, an application running within the runtime environment on the user's device can invoke the unlocking function via the code module.

According to particular embodiments, such a system is resilient against intrusion. For example, even if the above-discussed smart lock is compromised in some way, without the code module, there may be no way to readily invoke the unlocking function. Additionally or alternatively, malicious software agents downloaded to the user's device may be unable to intercept the credentials exchanged between the smart lock and user device runtime environments. Other advantages will discussed below, or will be apparent to those skilled in the relevant arts, along with other embodiments in which a first device makes use of a second device.

Consistent with the above, particular embodiments include a method, implemented by a first Embodiments of the present disclosure include a code module that exposes a function of a device to another device. The code module is securely transferred via wireless communication between runtime environments so that the function may be remotely invoked. This transfer may be triggered by the devices coming within proximity of one another. Authorization to transfer the code module is handled between the runtime environments, such that the remote application need not support any particular security scheme used by the devices. The function may be inaccessible via remote invocation without the code module, and the code module may be deleted or returned after the function has been invoked and/or once the devices are no longer in proximity, e.g., to prevent other devices from invoking the function without authorization.

In some embodiments, the devices are part of a distributed Internet-of-Things (IoT) system. An example of such a system may be based on the Calvin application environment. In such a Calvin-based system, applications may be built from functional blocks (sometimes referred to as actors) that execute on runtimes that are tied to devices. According to embodiments, the actors may move between runtimes as needed in order to execute their functionality on particular devices.

FIG. 174 illustrates an example network environment 100 that includes a first device 110 and a second device 115. The first device 110 and the second device 115 are both communicatively connected to, and exchange signals with, each other (e.g., wirelessly, via a point-to-point connection). In some embodiments, the first device 110 and/or the second devices 115 are connected to a network 105 and configured to communicate via the network 105 with a remote device 145 and/or with each other. Accordingly, the first and second device 110, 115 may each support wired and/or wireless communication via one or more compatible technologies, e.g., near-field communication (NFC), Wi-Fi, BLUETOOTH, ZIGBEE, Long-Term Evolution (LTE), new radio (NR), Ethernet, and the like.

The first and second devices 110, 115 execute first and second runtime environments 120, 125, respectively. The first runtime environment 120 of the first device 110 is configured to transfer a code module 140 to the second runtime environment 125 of the second device 115, e.g., by controlling a wireless transmitter of the first device 110. Correspondingly, the second device 115 is configured to transfer the code module 140 from the first runtime environment 120 to the second runtime environment 125, e.g., by actively controlling a wireless receiver of the second device 115, or by passively allowing a memory of the second device 115 to be written to by the first device 110 (e.g., using a circuit that converts RF transmissions from the first device 110 into memory write instructions, such a circuit being powered, in some embodiments, by the RF energy of those transmissions).

The code module 140 is configured to execute within the second runtime environment 125 and expose a function of the second device 115, supported by the second runtime environment 125, to the first device 110. As will be discussed further below, an application 130 executing within the first runtime environment 120 of the first device 110 invokes the function of the second device 115 via the transferred code module 140 and the second runtime environment 125.

Typical examples of the first device 110 include (but are not limited to) a mobile device, such as a smartphone, a user equipment, a laptop computer, a tablet computer, and/or a wearable computer. Typical examples of the second device 115 include (but are not limited to) a computer and/or a smart appliance. Other examples of the first and second devices 110, 115 include other types of computing devices.

The network 105 includes one or more physical devices and/or signaling mediums capable of exchanging communication signals with the first and/or second devices 110, 115. Examples of such a network 105 include (but are not limited to) one or more of: the Internet (or a portion thereof); one or more local area networks; one or more wireless networks; one or more cellular networks; one or more Internet Protocol-based networks; one or more Ethernet networks; one or more optical networks; and/or one or more circuit switched networks. Such a network 105 may comprise any number of networking devices such as routers, gateways, switches, hubs, firewalls, and the like (not shown) supporting the exchange of such communication signals.

The remote device 145 may be any computing device communicatively coupled to the first and/or second device 110, 115 via the network 105. The remote device 145 may, for example, act as a first device 110 except in a different capacity. For example, the remote device 145 may be an administrator workstation that has secure access to the second device 115 via the network 105, e.g., via a physically secured or encrypted network connection to the second device 115. Accordingly, a user of the remote device 145 may be able to invoke the same and/or different functions of the second device 115 by also transferring a code module 140 to the second device and invoking particular functions, e.g., to assist a user of the first device 110. A typical example of the remote device 145 includes (but is not limited to) a workstation, personal computer, laptop computer, and/or tablet computer.

FIG. 175 illustrates an example call flow between a mobile device 210 and a smart lock 215, consistent with aspects discussed above. In the example of FIG. 175, the mobile device 210 is an example of a first device 110, and the smart lock 215 is an example of a second device 115. Although FIG. 175 illustrates a particular example in which a mobile device 210 and smart lock 215 interact, alternative embodiments may include other devices acting as the first and/or second device 110, 115 to securely access other functions than those described below.

Consistent with the general discussion of FIG. 174, the mobile device 210 illustrated in FIG. 175 executes a mobile runtime environment 220. Lock control software 230 executes within the mobile runtime environment 220, e.g., as a service or responsive to being launched by a user of the mobile device 210. The smart lock 215 executes a smart lock runtime 225. The smart lock runtime 225 supports lock control operations, e.g., locking and unlocking the smart lock 215. However, the smart lock runtime 225 does not permit remote invocation of these operations without code module 140, which in this example is provided by the mobile device 210.

According to the example illustrated in FIG. 175, each of the mobile and smart lock runtime environments 220, 225 detect one another, e.g., by sensing radio frequency (RF) energy produced by the other device (step 250). In some embodiments, either or both of the devices 210, 215 may detect each other using additional or alternative proximity detection technology, e.g., optical and/or aural detection via corresponding sensors and/or receivers.

In response to detecting each other, the mobile and smart lock runtime environments 220, 225 participate in an authentication procedure (step 252). This authentication procedure may include the exchange of one or more credentials by which the smart lock runtime environment 225 may determine whether or not the mobile device 210 is permitted to use certain protected functions of the smart lock 215 (e.g., the unlock function). In particular, by performance of this authentication procedure may establish a trust relationship between the mobile and smart lock runtime environments 220, 225.

After successful authentication, the mobile runtime environment 220 transfers a code module 140 to the smart lock runtime environment 225 (step 254). The code module 140 is configured to execute within the smart lock runtime environment 225 and expose the unlock function of the smart lock 215 to the mobile device 210.

The lock control software 230 then invokes the unlock function of the smart lock 215 via the transferred code module 140, e.g., using an appropriate function call to an Application Programming Interface (API) of the code module 140, as represented in FIG. 175 by the function call "module.unlock( )" (step 256). Notably, the lock control software 230 is able to take advantage of the trust relationship established between the mobile and smart lock runtime environments 220, 225 in order to invoke the unlock function, with requiring the credentials upon which the trust relationship was established. This may be advantageous, e.g., in avoiding providing sensitive credentials to certain applications. In particular, embodiments may enable a user to freely download and use third-party and/or untrusted applications to invoke functions without concern that the applications will be able to obtain the credentials of either device 210, 215.

The code module 140 executes within the smart lock runtime environment 225 to handle the "module.unlock( )" function call by correspondingly invoking an API supported by the smart lock runtime environment, represented in FIG. 175 by the function call "runtime.unlock( )" (step 258). Thus, according to the embodiment illustrated in FIG. 175, the code module 140 may, among other things, serve as a translation layer between the lock control software 230 on the mobile device 210 and the smart lock runtime environment 225 that controls the unlocking function of the smart lock 215. In response to the unlock function call from the code module 140, the smart lock runtime environment 225 responds by controlling the smart lock 215 accordingly, i.e., by unlocking the smart lock 215 (step 260).

After the unlocking has been performed, the smart lock runtime environment 225 detects that one or more criteria for deleting the code module 140 have been satisfied (step 266). In this particular example, the code module 140 is not permitted to remain loaded on the smart lock 215 indefinitely. Accordingly, the smart lock runtime environment has one or more criteria for determining when the code module 140 is to be deleted. The criteria for deleting the code module 140 may include whether or not the mobile device 210 can be detected and/or whether or not a threshold period of time has passed since the code module 140 was transferred.

For example, while the code module 140 exists on the smart lock 215, the smart lock 215 may be vulnerable to some other device (not shown) invoking protected functions of the smart lock 215 via the code module 140, e.g., without authenticating and/or by spoofing characteristics of the mobile device 210. Accordingly, after a threshold period of time has passed since the code module 140 was transferred and/or if the mobile device 210 is no longer in proximity to the smart lock 215, the smart lock runtime environment 225 may determine that the code module 140 should be deleted. In particular, the smart lock runtime environment 225 may determine that the mobile device 210 has left the area around the smart lock 215 by failing to detect certain RF energy from the mobile device 210.

Having detected that certain module deletion criteria has been met, the smart lock runtime environment 225 deletes the code module 140 (step 268). In some embodiments, the smart lock runtime environment 225 also transfers the code module 140 back to the mobile device 210 (e.g., to the mobile runtime environment 220). Thus, in some embodiments, the code module 140 may act as a token that limits how the lock control software 230 is used. That is, while the code module 140 is transferred to the smart lock 215, the lock control software 230 may be prevented from sending a module.unlock( ) command to a different device, for example.

In some embodiments, the smart lock runtime environment 225 supports other functions that do not require the code module 140. Such functions may, for example, be public and/or read only functions that may be invoked without the need for authorization. Accordingly, in some embodiments, the mobile runtime environment 220 and/or the lock control software 230 may invoke functions of the smart lock 215 by communicating directly with the smart lock runtime environment 225. In the example of FIG. 175, this is illustrated by the mobile runtime environment 220 and lock control software 230 each invoking a "runtime.info( )" function call of the smart lock runtime environment 225 (steps 262, 264). Such a function call may, for example, return device status information about the smart lock 215. Such information may include device identity, owner identity, contact information for an administrator, whether the lock is locked or unlocked, and/or other information pertaining to the smart lock 215.

For example, a user of the mobile device 210 may encounter difficulty in attempting to unlock the smart lock 215. In such a scenario, the user may use the lock control software 230 to obtain information on how to contact an administrator who can use a remote device 145 to transfer a code module 140 to the smart lock runtime environment 225 and unlock the smart lock 215 themselves, or enable the user of the mobile device 210 to do it using their lock control software 230. One example of such an administrator may be a hotel manager, who can help guests having trouble using the system enter their rooms remotely, though there are myriad embodiments that may include other devices, contexts, and/or user roles.

It should further be noted that although the actions performed in steps 254, 256, 258, 262, and 264, and 268 are illustrated as being unidirectional actions, one or more of these steps may trigger a corresponding response in which a value is returned, e.g., to indicate a result of the illustrated action. For example, the smart lock runtime environment 225 may respond to the runtime.unlock( ) function call with a zero or non-zero value based respectively on whether or not the smart lock has successfully unlocked.

Consistent with the above, embodiments of the present disclosure include a method 300 of using a second device 115 implemented by a first device 110, such as the method 300 illustrated in FIG. 176. The method 300 comprises using a first runtime environment 120 executing on the first device 110 to transfer a code module 140 to a second runtime environment 125 executing on the second device 115 (block 310). The code module 140 is configured to execute within the second runtime environment 125 and expose a function of the second device 115, supported by the second runtime environment 125, to the first device 110. The method 300 further comprises executing an application 130 within the first runtime environment 120 (block 320). The application remotely invokes the function of the second device 115 via the transferred code module 140 and the second runtime environment 125.

Other embodiments include a method 400 of providing a first device 110 with access to a function of the second device 115 implemented by the second device 115, as shown in FIG. 177. The method 400 comprises transferring a code module 140, from a first runtime environment 120 executing on the first device 110, to a second runtime environment 125 executing on the second device 115 to expose a function of the second device 115 supported by the second runtime environment 125 to the first device 110 (block 410). The method 400 further comprises using the second runtime environment 125 to control performance of the function of the second device 115 responsive to a remote invocation of the function received via the code module 140 from an application 130 executing within the first runtime environment 120 (block 420).

FIG. 178 illustrates hardware 500 suitable for implementing and/or supporting the first and/or second devices 110, 115, in accordance with one or more embodiments. As shown, the hardware 500 includes processing circuitry 510 and radio circuitry 520. The radio circuitry 520 may be configured to transmit and/or receive via one or more antennas (not shown) that are part of, or coupled to, the hardware 500. The processing circuitry 510 is configured to perform processing described above, e.g., in FIGS. 175 and/or 176, such as by executing instructions stored in memory 530. As will be discussed below, the processing circuitry 510 in this regard may comprise one or more physical units. Additionally or alternatively, the instructions stored in memory 530 may be comprised in one or more software modules.

FIG. 179 in this regard illustrates additional details of a first device 110 in accordance with particular embodiments. Specifically, the first device 110 may include a transferring unit or module 605 and an executing unit or module 610. The transferring unit or module 605 may be configured to use a first runtime environment 120 executing on the first device 110 to transfer a code module 140 to a second runtime environment 125 executing on the second device 115. The code module 140 is configured to execute within the second runtime environment 125 and expose a function of the second device 115, supported by the second runtime environment 125, to the first device 110.

FIG. 180 illustrates additional details of a second device 115 in accordance with particular embodiments. Specifically, the second device 115 may include a transfer unit or module 705 and a control unit or module 710. The transfer unit or module may be configured to transfer a code module 140, from a first runtime environment 120 executing on the first device 110, to a second runtime environment 125 executing on the second device 115 to expose a function of the second device 115 supported by the second runtime environment 125 to the first device 110. The control unit or module 710 may be configured to use the second runtime environment 125 to control performance of the function of the second device 115 responsive to a remote invocation of the function received via the code module 140 from an application 130 executing within the first runtime environment 120.

Combination of Device Enrollment and Secure Device Operation Using Transferred Code Modules Once more, as indicated above, the various techniques described herein may be combined with each other, to provide advantages with reliability, security, etc. For example, one particular combination that is advantageous is the combination of the techniques described above for device enrollment in an IoT environment and secure device operation using transferred modules.

Thus, for example, the method illustrated in FIG. 168 can be combined with the method shown in FIG. 176, to obtain a method of a first device for assisting enrollment of a second device to an Internet of Things (IoT) environment and using the second device. This example method comprises, as shown at blocks 110, 120, and 140 of FIG. 168, the steps of obtaining a representation of an enrollment function associated with the second device, wherein the enrollment function is associated with at least one serialized enrollment application comprising enrollment information associated with the first and second device, deserializing the enrollment application such that enrollment information associated with the first device is separated from enrollment information associated with the second device, and transmitting the enrollment information associated with the second device to the second device for initiating execution by the second device of the enrollment process of the second device by configuring the second device based on the enrollment information associated with the second device. The method further comprises, as shown at block 150 of FIG. 168, receiving from the second device configuration information associated with the second device.

This example still further comprises, as shown at block 310 of FIG. 176, the step of using a first runtime environment executing on the first device to transfer a code module to a second runtime environment executing on the second device, wherein the code module is configured to execute within the second runtime environment and expose a function of the second device, supported by the second runtime environment, to the first device. Finally, this example method comprises the step of executing an application within the first runtime environment, the application remotely invoking the function of the second device via the transferred code module and the second runtime environment.

The second device may be an Internet of Things (IoT) device, in some embodiments, and the first device may be a wireless communication device. The representation of the enrollment function may be one or more of a QR-code, a bar code and a RF-ID chip, for example. The enrollment information associated with the second device may comprise at least one of public encryption keys, software systems, capabilities, steps pertaining to the enrollment process and functions of the IoT-environment, in some embodiments. The enrollment information may comprise information associated with one or more of geographical location, organizational location, ownership, encryption keys, communication parameters, communication keys and identity, in some embodiments.

In some embodiments, the enrollment function comprises at least two serialized enrollment applications, and the method further comprises deserializing the at least two serialized enrollment applications into at least one enrollment application comprising enrollment information associated with the first device and at least one enrollment application comprising enrollment information associated with the second device, and transmitting the at least one enrollment application associated with the second device to the second device.

In some embodiments, the method further comprises determining that the second device has successfully enrolled and terminating the at least one enrollment application on the first device.

In some embodiments, the method further comprises authenticating the first runtime environment with the second runtime environment to obtain authorization to transfer the code module to the second runtime environment for execution within the second runtime environment, and/or communicating directly with the second runtime environment to invoke a different function of the second device.

In some embodiments, the transfer of the code module to the second runtime environment is performed over a wireless point-to-point connection between the first device and the second device. The second device may be an electronic lock, for example, where the function supported by the second runtime environment locks or unlocks the electronic lock.

Similarly, the method shown in FIG. 169 can be combined with the method shown in FIG. 177, to obtain a method of a second device for executing an enrollment process to an Internet of Things (IoT) environment assisted by a first device and providing the first device with access to a function of the second device. This example method, includes, as shown at blocks 210, 230, and 240 of FIG. 169, the steps of receiving, from the first device, enrollment information associated with the second device, executing the enrollment process by configuring the second device based on the enrollment information, and transmitting configuration information associated with the second device to the first device. The method further includes, as shown at blocks 410 and 420 of FIG. 177, the steps of receiving a code module from a first runtime environment executing on the first device, to a second runtime environment executing on the second device, to expose a function of the second device supported by the second runtime environment to the first device, and using the second runtime environment to control performance of the function of the second device responsive to a remote invocation of the function received via the code module from an application executing within the first runtime environment.

In some embodiments, the method further comprises determining that the enrollment is successful and deleting the enrollment information from the second device. In some embodiments, the enrollment information associated with the second device comprises at least one of public encryption keys, software systems, capabilities, steps pertaining to the enrollment process and functions of the IoT-environment.

In some embodiments, the method further comprises authenticating the first runtime environment with the second runtime environment to authorize the transferring of the code module to the second runtime environment for execution within the second runtime environment. In some embodiments, the method further comprises using the second runtime environment to control performance of a different function of the second device responsive to a direct communication from the first device to the second runtime environment.

The transferring of the code module from the first runtime environment may be performed over a wireless point-to-point connection between the first device and the second device, in some embodiments. The second device may be an electronic lock, for example, where the function supported by the first runtime environment locks or unlocks the electronic lock.

Querying Federated Databases in Conformance with Jurisdictional Privacy Restrictions Companies and organizations in many business sectors such as healthcare, e-commerce, government, and retail are entrusted with identifiable information (e.g., personal information, private information, confidential information, or the like) that makes preserving the privacy of this information of utmost concern to these entities. Most often, these entities specify and define how the privacy of this information is to be preserved.

The authors of a white paper entitled "Hippocratic Database: A Privacy-Aware Database" proposed a database architecture that uses metadata consisting of privacy policies and privacy authorizations stored in a respective privacy-policies table and privacy authorization table. N. Ghani, Z. Sidek, Hippocratic Database: A Privacy-Aware Database, Intl J. Computer Info. Engineering, vol. 2, No. 6 (2008). The authors describe a framework in which the database performs privacy checking during query processing. For instance, the database checks whether the user who issued the query is authorized to access the database. It also checks whether the query accessed only attributes that are explicitly listed in the privacy-authorization table. Also, the database only allows access to information in the database whose purpose attribute includes the purpose of the query. Accordingly, only users that are authorized for an intended purpose can access information in the database. However, this privacy-aware database does not consider privacy restrictions of the jurisdiction that it is located. Further, this database does not protect identifiable information that can be inferred from responses to a query from multiple databases.

A federated database system is a meta-database management system that maps constituent databases into a single federated database. As such, a federated database is a virtual database this is a composite of the constituent databases that it represents. The federated database system is perceived to be one database system by sending a query to each constituent database and then combining the responses to the query received from each constituent database. Further, each constituent database may be an autonomous database with the ability to independently communicate with other databases, execute and control its operations, or associate (or dissociate) itself with other databases. However, current federated database systems do not consider privacy restrictions of the jurisdiction(s) that it represents and do not protect identifiable information that can be inferred from responses to a query from multiple databases in the same or different jurisdiction.

As previously discussed, current privacy-aware databases and federated database systems do not consider privacy restrictions of the jurisdiction(s) that they represent. However, database users typically want to combine responses to a query from databases in the same or different jurisdictions. By doing so, identifiable information contained in or inferred by the responses may not be protected in conformance with the privacy laws of the jurisdiction of each accessed database. In one example, a query related to counting the number of persons that have an income in a specific range and a certain range of education from two different databases requires combining the responses to the query based on the personal identifiable information (e.g., name, social security number, address, or the like), which may violate the privacy restrictions in the jurisdiction of each database. In another example, a query related to a list of persons (e.g., user identifier) in a first database and a log of visited webpages indexed by visitors (e.g., user identifier) may not be combined in violation of the privacy restrictions of the jurisdiction of each database (e.g., a EU citizen whose surfing habits are stored in a US database). In yet another example, a query related to linking like expectancy to food habits may be able to combine a first response from a database with grocery shopping receipts from grocery store chains, a second response from a database with restaurant receipts from credit card companies, and a third response from a database with life duration from government tax offices based on the identifiable information in the responses in violation of the privacy restrictions of the jurisdiction of each database.

Accordingly, there is a need for improved techniques for querying a federated database in conformance with jurisdictional privacy restrictions. In addition, other desirable features and characteristics of the present disclosure will become apparent from the subsequent detailed description and embodiments, taken in conjunction with the accompanying figures and the foregoing technical field and background.

This disclosure includes describing systems and methods of querying a federated database in conformance with jurisdictional privacy restrictions. Further, this disclosure describes novel techniques of composing or combining responses to a query received from databases located in the same or different jurisdictions while honoring the integrity of personal data stored in these databases. For example, FIG. 181 is a flow diagram of one embodiment of a system 100 for querying a federated database in accordance with various aspects as described herein. In FIG. 181, the system 100 includes a client node 101 (e.g., smartphone), a network node 121 (e.g., computer server) having a federated database, and a network node 141 (e.g., computer server) having an autonomous database (e.g., personal records at the Internal Revenue Service). The federated database represents directly, or indirectly via a sub-federated database, one or more autonomous database that is located in a certain jurisdiction (e.g., United States).

In FIG. 181, in one embodiment, the client device 101 sends a query (e.g., identifying the number of persons that have a certain income range) that is related to identifiable information stored in the autonomous database or that is determinable from a combination of responses to the query 161 received from the autonomous database and another autonomous database that is located in the same jurisdiction, as represented by reference 161. The federated network node 221 receives the query and adapts the query for the autonomous database based on one or more privacy restrictions for the jurisdiction of that autonomous database, as represented by block 123. The federated network node 121 then sends the adapted query to the autonomous network node 141, as represented by reference 163. The autonomous network node 141 receives the adapted query and obtains a response 167 to the adapted query from the autonomous database, as represented by block 143. The autonomous network node 141 sends the response to the federated network node 221, as represented by reference 165. The federated network node 121 composes an adapted response to the query based on the received response, as represented by block 127. In addition, the federated network node 121 sends the adapted response to the client node 101, as represented by reference 171.

The client node 101 may be user equipment, a mobile station (MS), a terminal, a cellular phone, a cellular handset, a personal digital assistant (PDA), a smartphone, a wireless phone, an organizer, a handheld computer, a desktop computer, a laptop computer, a tablet computer, a set-top box, a television, an appliance, a game device, a medical device, a display device, a metering device, or the like. Each network node 121, 141 may be a computer-implemented node that is a communication redistribution point or a communication endpoint in a network such as a computer server, a base station, a core network node, a handheld computer, a desktop computer, a laptop computer, a tablet computer, a set-top box, a television, an appliance, a medical device, or some other like terminology.

The identifiable information may be any information that is associated with a particular person, place, or thing. Further, the identifiable information may include personal information associated with a person, business, organization, government entity, or the like. The identifiable information may also include secret or confidential information. Confidential information includes information that is shared with the expectation that it will not be disclosed to unauthorized third parties. A jurisdiction may represent the authority granted to a particular body to administer certain privacy restrictions within a defined field of responsibility (e.g., U.S. federal law, Michigan tax law, Internal Review Service, Environmental Protection Agency, and the like). Further, a jurisdiction may be associated with a particular territory such as a federation (e.g., EU), country, state, province, city, county, municipality, township, and the like). The privacy restrictions are associated with the laws, rules, or regulations of a jurisdiction. For instance, the privacy restrictions may restrict or limit the ability to share personal information such as a name, address, phone number, financial record, medical record, location, personal attribute, or the like.

FIG. 182 is a flow diagram of one embodiment of a system 200 for querying a federated database in accordance with various aspects as described herein. In FIG. 182, the system 200 includes a client node 201, a network node 221 having a federated database, a network node 241*a* having a first autonomous database (e.g., personal records at the Internal Revenue Service), and a network node 241*b* having a second autonomous database (e.g., personal records at U.S. Census Bureau). The federated database represents directly, or indirectly via a sub-federated database, the first and second databases that are located in a same or different jurisdiction (e.g., United States).

In FIG. 182, in one embodiment, the client device 201 sends a query that is related to identifiable information stored in the first or second autonomous database or that is determinable from a combination of responses to the query received from the first and second databases, as represented by reference 261. The federated network node 221 receives the query and identifies one or more data fields of the query that correspond to the identifiable information based on one or more privacy restrictions for the jurisdiction of the corresponding autonomous database, as represented by block 223. In response to identifying that one or more fields of the query corresponds to identifiable information, the federated network node 221 determines a randomized salt for the query, as represented by block 225. The federated network node 221 then sends the query and the salt to the autonomous network node 241*a*, as represented by reference 263*a*.

In this embodiment, the autonomous network node 241*a* receives the query and salt and obtains a response to the query from the first autonomous database, as represented by block 243*a*. The autonomous network node 241*a* then anonymizes the identifiable information of the response based on the salt, as represented by block 245*a*. In one example, the identifiable information and the salt are processed with a cryptographic hash function to obtain the anonymized information. The autonomous network node 241*a* sends the response having the anonymized information to the federated network node 221, as represented by reference 265*a*. The federated network node 221 composes an adapted response to the query based on the response and its anonymized information, as represented by block 227. In addition, the federated network node 221 sends the adapted response to the client node 201, as represented by reference 271.

In another embodiment, the federated network node 221 sends the same query and salt to each autonomous network node 241*a*, 241*b*, as represented by references 263*a*, 263*b*. The autonomous network nodes 241*a*, 241*b* may be in the same jurisdiction or in different jurisdictions. Each autonomous network node 241*a*, 241*b* receives the query and salt and obtains a corresponding response to the query via its autonomous database. Further, each autonomous network node 241*a*, 241*b* anonymizes the identifiable information of the corresponding response based on the salt. Each autonomous network node 241*a*, 241*b* sends the corresponding response having the anonymized information to the federated network node 221, as represented by respective reference 265*a*, 265*b*. The federated network node 221 then combines the responses to the queries from the first and second autonomous databases based on the anonymized information received in each response.

Note that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

FIG. 183 illustrates one embodiment of a network node 300 having a federated database in accordance with various aspects as described herein. As shown, the network node 300 includes processing circuitry 310 and communication circuitry 330. The communication circuitry 330 is configured to transmit and/or receive information to and/or from one or more other nodes, e.g., via any communication technology. The processing circuitry 310 is configured to perform processing described above, such as by executing instructions stored in memory 320. The processing circuitry 310 in this regard may implement certain functional means, units, or modules.

FIG. 184 illustrates another embodiment of a network node 400 having a federated database in accordance with various aspects as described herein. As shown, the network node 400 implements various functional means, units, or modules (e.g., via the processing circuitry 310 in FIG. 183, via software code), or circuits. In one embodiment, these functional means, units, modules, or circuits (e.g., for implementing the method(s) herein) may include for instance: an obtaining unit 413 for obtaining a query that is related to identifiable information stored in at least one autonomous database or that is determinable from a combination of responses to the query received from at least two autonomous or sub-federated databases; an adapting unit 415 for adapting the query for each autonomous or sub-federated database based on one or more privacy restrictions 431 for the jurisdiction of that autonomous or sub-federated database; a sending unit 421 for sending, to each autonomous or sub-federated database, the adapted query for that database; a receiving unit 411 for receiving, from each autonomous or sub-federated database, a response to the corresponding adapted query; and a composing unit 423 for composing an adapted response to the query based on the response to the corresponding adapted query received from each autonomous or sub-federated database so that the adapted response meets the one or more privacy restrictions 431 for the jurisdiction of each autonomous or sub-federated database.

In another embodiment, these functional means, units, modules, or circuits may include for instance: the obtaining unit 413 for obtaining a query that is related to identifiable information stored in at least one autonomous database or that is determinable from a combination of responses to the query received from at least two autonomous or sub-federated databases; a salt determining unit 419 for determining a randomized salt for the query; a sending unit 421 for sending, to each autonomous or sub-federated database, the adapted query for that database; a receiving unit 411 for receiving, from each autonomous or sub-federated database, a response to the corresponding adapted query; and a combining unit 425 for combining the responses to the adapted query from the autonomous or sub-federated databases based on the anonymized information received in each response.

In another embodiment, these functional means, units, modules, or circuits may include, for instance, an identifying unit 417 for identifying one or more data fields of the query that correspond to the identifiable information based on one or more privacy restrictions 431 for the jurisdiction of that database.

In another embodiment, these functional means, units, modules, or circuits may include, for instance, the receiving unit 411 for receiving, from each autonomous or sub-federated database, an authorization key 433 from that database that authorizes the federated database to query that database in conformance with one or more privacy restrictions 431 for the jurisdiction of that database.

In another embodiment, these functional means, units, modules, or circuits may include, for instance, the receiving unit 411 for receiving, from each autonomous or sub-federated database, one or more privacy restrictions 431 for a corresponding jurisdiction of that database.

In another embodiment, these functional means, units, modules, or circuits may include, for instance, the sending unit 421 for sending, to a client device, the adapted response.

In another embodiment, these functional means, units, modules, or circuits may include, for instance, a deleting unit 427 for deleting the salt for the query responsive to combining the responses so that an ability to determine the identifiable information from the anonymized information only occurs between receiving the anonymized information from each autonomous or sub-federated database and deleting the salt.

In another embodiment, these functional means, units, modules, or circuits may include, for instance, a restriction obtaining unit 431 for obtaining one or more privacy restrictions for a jurisdiction.

FIG. 185 illustrates one embodiment of a method 500*a* performed by a network node having a federated database representing one or more autonomous or sub-federated databases that are located in a same or different jurisdiction in accordance with various aspects as described herein. In FIG. 185, the method 500*a* may start, for instance, at block 501*a*, where it may include receiving, from each autonomous or sub-federated database, an authorization key from that database that authorizes the federated database to query that database in conformance with one or more privacy restrictions for the jurisdiction of that database. Further, the method 500*a* may include receiving, from each autonomous or sub-federated database, one or more privacy restrictions for a corresponding jurisdiction of that database, as referenced by block 503*a*. At block 505*a*, the method 500*a* includes obtaining (e.g., receiving from a client device) a query that is related to identifiable information stored in at least one autonomous database or that is determinable from a combination of responses to the query received from at least two autonomous or sub-federated databases. Also, the method 500*a* may include identifying one or more data fields of the query that correspond to the identifiable information based on the one or more privacy restrictions for the jurisdiction of that database, as referenced by block 507*a*.

In FIG. 185, at block 509*a*, the method 500*a* includes adapting the query for each autonomous or sub-federated database based on one or more privacy restrictions for the jurisdiction of that autonomous or sub-federated database, which may be responsive to identifying the identifiable information. At block 511*a*, the method 500*a* includes sending, to each autonomous or sub-federated database, the adapted query for that database. At block 513*a*, the method 500*a* includes receiving, from each autonomous or sub-federated database, a response to the corresponding adapted query. At block 515*a*, the method 500*a* includes composing an adapted response to the query based on the response to the corresponding adapted query received from each autonomous or sub-federated database so that the adapted response meets the one or more privacy restrictions for the jurisdiction of each autonomous or sub-federated database. In addition, the method 500*a* may include sending, to a client device, the adapted response, as represented by block 517*a*.

FIG. 186 illustrates one embodiment of a method 500*b* performed by a network node having a federated database representing one or more autonomous or sub-federated databases that are located in a same or different jurisdiction in accordance with various aspects as described herein. In FIG. 186, the method 500*b* may start, for instance, at block 505*b*, where it may include obtaining a query that is related to identifiable information stored in at least one autonomous database or that is determinable from a combination of responses to the query received from at least two autonomous or sub-federated databases. Further, the method 500*b* may include identifying one or more data fields of the query that correspond to the identifiable information based on one or more privacy restrictions for the jurisdiction of that database, as represented by block 507*b*. An adapted query for each autonomous or sub-federated database includes the query and a randomized salt so that each autonomous or sub-federated database is operable to anonymize the identifiable information in each response to the query based on the salt. Accordingly, at block 509*b*, the method 500*b* includes determining the salt for the query. At block 511*b*, the method 500*b* includes sending, to each autonomous or sub-federated database, the query and the salt. At block 513*b*, the method 500*b* includes receiving, from each autonomous or sub-federated database, a response to the query with the identifiable information in each response being anonymized based on the salt. At block 515*b*, the method 500*b* includes combining the responses to the adapted query from the autonomous or sub-federated databases based on the anonymized information received in each response. In addition, the method may include deleting the salt for the query responsive to combining the responses so that an ability to determine the identifiable information from the anonymized information only occurs between receiving the anonymized information from each autonomous or sub-federated database and deleting the salt, as represented by block 519*b*.

FIG. 187 illustrates one embodiment of a network node 600 having an autonomous database 640 in accordance with various aspects as described herein. As shown, the network node 600 includes processing circuitry 610, communication circuitry 620, and the autonomous database 640. The communication circuitry 620 is configured to transmit and/or receive information to and/or from one or more other nodes, e.g., via any communication technology. The processing circuitry 610 is configured to perform processing such as by executing instructions stored in memory 630. Further, the processing circuitry 610 is configured to perform processing associated with the autonomous database 640. The processing circuitry 610 in this regard may implement certain functional means, units, or modules.

FIG. 188 illustrates another embodiment of a network node 700 having an autonomous database 735 in accordance with various aspects as described herein. As shown, the network node 700 implements various functional means, units, or modules (e.g., via the processing circuitry 610 in FIG. 187 and/or via software code), or circuits. In one embodiment, these functional means, units, modules, or circuits (e.g., for implementing the method(s) herein) may include for instance: a receiving unit 711 for receiving, from the federated or sub-federated database, a query and a randomized salt for the query; a response obtaining unit 713 for obtaining a response to the query from the autonomous database 735 with the response having the identifiable information; an anonymizing unit 715 for anonymizing the identifiable information of the response based on the received salt; and a sending unit 717 for sending, to the federated or sub-federated database, the response having the anonymized information so that the response meets one or more privacy restrictions 731 for the jurisdiction of the autonomous database.

In another embodiment, these functional means, units, modules, or circuits may include for instance: a key obtaining unit 721 for obtaining an authorization key 733 that authorizes the federated or sub-federated database to query the autonomous database 735 in conformance with the one or more privacy restrictions for the jurisdiction; the sending unit 717 for sending, to the federated or sub-federated database, the authorization key 733; the receiving unit 711 for receiving, from the federated or sub-federated database, a query, a randomized salt for the query and a key; an authorization determining unit 719 for determining whether the federated or sub-federated database is authorized to query the autonomous database 735 based on the received key and the authorization key 733.

In another embodiment, these functional means, units, modules, or circuits may include for instance: a restriction obtaining unit 723 for obtaining one or more privacy restrictions 731 for the jurisdiction of the autonomous database 735; and the sending unit 717 for sending, to the federated or sub-federated database, the one or more privacy restrictions 731 for the jurisdiction.

FIG. 189 illustrates one embodiment of a method 800*a* performed by a network node having an autonomous database, in a certain jurisdiction, that is represented by a federated or sub-federated database in accordance with various aspects as described herein. In FIG. 189, the method 800*a* may start, for instance, at block 801*a* where it includes receiving, from the federated or sub-federated database, a query and a randomized salt for the query. Further, the query is related to identifiable information stored in the autonomous database or that is determinable from a combination of responses to the query that are received by the federated or sub-federated database from the autonomous database and one or more other autonomous or sub-federated databases that are represented by the federated or sub-federated database. Further, the method 800*a* includes obtaining a response to the query from the autonomous database with the response having the identifiable information, as represented by block 803*a*. Also, the method 800*a* includes anonymizing the identifiable information of the response based on the received salt, as represented by block 805*a*. In addition, the method 800*a* includes sending, to the federated or sub-federated database, the response having the anonymized information so that the response meets one or more privacy restrictions for the jurisdiction of the autonomous database, as represented by block 807*a*.

FIG. 190 illustrates one embodiment of a method 800*b* performed by a network node having an autonomous database, in a certain jurisdiction, that is represented by a federated or sub-federated database in accordance with various aspects as described herein. In FIG. 190, the method 800*b* may start, for instance, at block 801*b* where it includes obtaining an authorization key that authorizes the federated or sub-federated database to query the autonomous database in conformance with the one or more privacy restrictions for the jurisdiction. Further, the method 800*b* includes sending, to the federated or sub-federated database, the authorization key, as represented by block 803*b*. At block 805*b*, the method 800*b* may include obtaining one or more privacy restrictions for the jurisdiction of the autonomous database. Also, the method 800*b* may include sending, to the federated or sub-federated database, the one or more privacy restrictions for the jurisdiction, as represented by block 807*b*.

In FIG. 190, at block 809*b*, the method 800*b* includes receiving, from the federated or sub-federated database, a query, a randomized salt for the query and a key. The query is related to identifiable information stored in the autonomous database or that is determinable from a combination of responses to the query that are received by the federated or sub-federated database from the autonomous database and one or more other autonomous or sub-federated databases that are represented by the federated or sub-federated database. In addition, the method 800*b* includes determining whether the federated or sub-federated database is authorized to query the autonomous database based on the received key and the authorization key, as represented by block 811*b*. In response to determining that the federated or sub-federated database is authorized to query the autonomous database, the method 800*b* includes obtaining a response to the query, anonymizing the identifiable information of the response based on the received salt, and sending the response having the anonymized information to the federated or sub-federated database, as represented by block 813*b*.

FIG. 191 illustrates another embodiment of a system 900 for querying a federated database in accordance with various aspects as described herein. In FIG. 191, the system 900 includes a network node 901 having a federated database and a network node 941*a* having an autonomous database that is located in a certain jurisdiction. The federated network node 901 sends a query and an optional key to the autonomous network node 941*a*, as represented by block 903. Further, the key is used to authorize the federated or sub-federated database to query the autonomous database in conformance with privacy restrictions for the jurisdiction of that autonomous database.

In FIG. 191, the autonomous network node 941*a* receives the query and the optional key, as represented by block 943*a*. The autonomous network node 941*a* may determine whether the query is authorized based on the received key and an authorization key stored in the autonomous network node 941*a*, as represented by block 945*a*. The autonomous network node 941*a* obtains a response to the query from its autonomous database, as represented by block 947*a*. Further, the autonomous network node 941*a* sends the response to the query to the federated network node 901, as represented by block 949*a*. The federated network node 901 receives the response, composes an adapted response to the query based on the received response, and sends the adapted response such as to a client device, as represented by respective blocks 905, 909.

In another embodiment, the federated network node 901 sends the query and optional key to the autonomous network nodes 941*a*, 941*b*. The autonomous network nodes 941*a*, 941*b* may be located in the same jurisdiction or different jurisdictions. Each autonomous network node 941*a*, 941*b* receives the query and optional key and may determine whether the query is authorized based on the received key and an authorization key stored in that autonomous network node 941*a*, 941*b*. Each autonomous network node 941*a*, 941*b* obtains a response to the query from its autonomous database and sends the response to the federated network node 901. The federated network node 901 receives each response and combines the responses to the query, as represented by respective blocks 905, 909. The federated network node 901 may then send the combined response such as to a client device, as represented by block 909.

FIG. 192 illustrates another embodiment of a system 1000 for querying a federated database in accordance with various aspects as described herein. In FIG. 192, the system 1000 includes a network node 1001 having a federated database, a network node 1021 having a sub-federated database that is associated with a certain jurisdiction, and a network node 1041 having an autonomous database that is associated with that certain jurisdiction. The federated network node 1001 sends a query and an optional key to the sub-federated network node 1021, as represented by block 1003.

In FIG. 192, the sub-federated network node 1021 receives the query and optional key 1061, as represented by block 1023. The sub-federated network node 1021 may determine to divide or adapt the query for each autonomous database based on the data fields of the query and the privacy restriction(s) of that database to obtain an adapted query for that database, as represented by block 1025. The sub-federated network node 1021 sends the query, or the adapted query, and the optional key to the autonomous network node 1041, as represented by block 1025. The autonomous network node 1041 receives the query, or the adapted query, and the optional key, as represented by block 1043. Further, the autonomous network node 1041 may determine whether the query, or the adapted query, is authorized based on the received key and an authorization key stored in the network node 1041, as represented by block 1045. The autonomous network node 1041 then obtains a response to the query, or the adapted query, from its autonomous database, as represented by block 1047. The autonomous network node 1041 sends the response to the sub-federated network node 1021, as represented by block 1049.

Furthermore, the sub-federated network node 1021 receives the response and composes a response based on the received response (or combines received responses if from more than one network node having an autonomous database), as represented by block 1029. The sub-federated network node 1021 may perform other functions that are allowed by the jurisdiction such as updating another database, applying a relational database model (e.g., ML model), sending an indication (e.g., text message, e-mail), or the like, as represented by block 1031. The sub-federated network node 1021 sends the response to the federated network node 1001, as represented by block 1033. The federated network node 1001 receives the response 1063 and then composes a response based on the received response 1063 (or combines received responses if from more than one network node having an autonomous database). The federated network node 1001 may send the composed response (or the combined response).

FIG. 193 illustrates another embodiment of a system 1100 for querying a federated database in accordance with various aspects as described herein. In FIG. 193, the system 1100 includes a network node 1101 having a federated or sub-federated database and a network node 1141*a* having an autonomous database that is located in a certain jurisdiction. The sub/federated network node 1101 sends a query, a randomized salt for that query, and an optional key 1161*a* to the autonomous network node 1141*a*, as represented by block 1103.

In FIG. 193, the autonomous network node 1141*a* receives the query, the randomized salt, and the optional key, as represented by block 1143*a*. The autonomous network node 1141*a* may determine whether the query is authorized based on the received key and an authorization key stored in the autonomous network node 1141*a*, as represented by block 1145*a*. The autonomous network node 1141*a* obtains a response to the query from its autonomous database, as represented by block 1147*a*. Further, the autonomous network node 1141*a* anonymizes the identifiable information in the response based on the received salt, as represented by block 1149*a*. The autonomous network node 1141*a* then sends the response having the anonymized information to the sub/federated network node 1101, as represented by block 1151*a*. The sub/federated network node 1101 receives the response, as represented by block 1105. Also, the sub/federated network node 1101 composes a response based on the received response and the anonymized information, as represented by block 1109. The sub/federated network node 1101 may then send the composed response, as represented by block 1109.

In another embodiment, the federated network node 1101 sends the query, the randomized salt, and the optional key to the autonomous network nodes 1141*a*, 1141*b*. The autonomous network nodes 1141*a*, 1141*b* may be located in the same jurisdiction or different jurisdictions. Each autonomous network node 1141*a*, 1141*b* receives the query, the randomized salt, and the optional key and may determine whether the query is authorized based on the received key and the authorization key stored in that autonomous network node 1141*a*, 1141*b*. Each autonomous network node 1141*a*, 1141*b* obtains the response to the query from its autonomous database. Further, each autonomous network node 1141*a*, 1141*b* anonymizes the identifiable information in its response based on the received salt. Each autonomous network node 1141*a*, 1141*b* then sends the response having the anonymized information to the federated network node 1101. The federated network node 1101 receives each response and combines the responses to the query based on the anonymized information, as represented by respective blocks 1105, 1107. The federated network node 1101 may then send the combined response such as to a client device, as represented by block 1109.

FIG. 194 illustrates another embodiment of a system 1200 for querying a federated database in accordance with various aspects as described herein. In FIG. 194, a federated database 1201 is located in jurisdiction 1203. The federated database 1201 represents sub-federated databases 1211, 1221 located in respective jurisdictions 1213, 1223. Further, each sub-federated database 1211, 1221 represents respective autonomous databases 1215-1217, 1225-1227 located in respective jurisdictions 1211, 1221. The federated database 1201 also represents via the sub-federated databases 1211, 1211 these respective autonomous databases.

In one embodiment, the federated database 1201 represents a first sub-federated database 1211 having one or more first autonomous databases 1215-1217 that are located in a first jurisdiction 1213 with one or more first privacy restrictions.

Additionally or alternatively, the federated database 1201 represents a second sub-federated database 1223 having one or more second autonomous databases 1225-1227 that are located in a second jurisdiction 1223 with one or more second privacy restrictions.

In another embodiment, the federated database 1201 represents a single autonomous database 1215 that is located in a certain jurisdiction 1213 with one or more privacy restrictions.

In another embodiment, the federated database 1201 represents a plurality of autonomous databases 1215-1217 that are located in a same jurisdiction 1213 with one or more privacy restrictions.

In another embodiment, the federated database 1201 represents a plurality of autonomous databases 1215-1217, 1225-1227 that are located in different jurisdictions 1213, 1223 with one or more different privacy restrictions.

FIG. 195 illustrates another embodiment of a network node in accordance with various aspects as described herein.

In some instances, the network node 1300 may be referred as a server, a base station, a core network node, a handheld computer, a desktop computer, a laptop computer, a tablet computer, a set-top box, a television, an appliance, a medical device, or some other like terminology. In other instances, the network node 1300 may be a set of hardware components. In FIG. 195, the network node 1300 may be configured to include a processor 1301 that is operatively coupled to a radio frequency (RF) interface 1309, a network connection interface 1311, a memory 1315 including a random access memory (RAM) 1317, a read only memory (ROM) 1319, a storage medium 1331 or the like, a communication subsystem 1351, a power source 1333, another component, or any combination thereof. The memory 1315 may be used to store one or more databases. The storage medium 1331 may include an operating system 1333, an application program 1335, data or database 1337, or the like. Specific devices may utilize all of the components shown in FIG. 13, or only a subset of the components, and levels of integration may vary from device to device. Further, specific devices may contain multiple instances of a component, such as multiple processors, memories, transceivers, transmitters, receivers, etc. For instance, a computing device may be configured to include a processor and a memory.

In FIG. 195, the processor 1301 may be configured to process computer instructions and data. The processor 1301 may be configured as any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above. For example, the processor 1301 may include two computer processors. In one definition, data is information in a form suitable for use by a computer. It is important to note that a person having ordinary skill in the art will recognize that the subject matter of this disclosure may be implemented using various operating systems or combinations of operating systems.

In FIG. 195, the RF interface 1309 may be configured to provide a communication interface to RF components such as a transmitter, a receiver, and an antenna. The network connection interface 1311 may be configured to provide a communication interface to a network 1343*a*. The network 1343*a* may encompass wired and wireless communication networks such as a local-area network (LAN), a wide-area network (WAN), a computer network, a wireless network, a telecommunications network, another like network or any combination thereof. For example, the network 1343*a* may be a Wi-Fi network. The network connection interface 1311 may be configured to include a receiver and a transmitter interface used to communicate with one or more other nodes over a communication network according to one or more communication protocols known in the art or that may be developed, such as Ethernet, TCP/IP, SONET, ATM, or the like. The network connection interface 1311 may implement receiver and transmitter functionality appropriate to the communication network links (e.g., optical, electrical, and the like). The transmitter and receiver functions may share circuit components, software or firmware, or alternatively may be implemented separately.

In this embodiment, the RAM 1317 may be configured to interface via the bus 1303 to the processor 1301 to provide storage or caching of data or computer instructions during the execution of software programs such as the operating system, application programs, and device drivers. The ROM 1319 may be configured to provide computer instructions or data to the processor 1301. For example, the ROM 1319 may be configured to be invariant low-level system code or data for basic system functions such as basic input and output (I/O), startup, or reception of keystrokes from a keyboard that are stored in a non-volatile memory. The storage medium 1331 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives. In one example, the storage medium 1331 may be configured to include an operating system 1333, an application program 1335 such as a web browser application, a widget or gadget engine or another application, and a data file 1337.

In FIG. 195, the processor 1301 may be configured to communicate with a network 1343*b* using the communication subsystem 1351. The network 1343*a* and the network 1343*b* may be the same network or networks or different network or networks. The communication subsystem 1351 may be configured to include one or more transceivers used to communicate with the network 1343*b*. The one or more transceivers may be used to communicate with one or more remote transceivers of another network node or client device according to one or more communication protocols known in the art or that may be developed, such as IEEE 802.xx, CDMA, WCDMA, GSM, LTE, NR, NB IoT, UTRAN, WiMax, or the like.

In another example, the communication subsystem 1351 may be configured to include one or more transceivers used to communicate with one or more remote transceivers of another network node or client device according to one or more communication protocols known in the art or that may be developed, such as IEEE 802.xx, CDMA, WCDMA, GSM, LTE, NR, NB IoT, UTRAN, WiMax, or the like. Each transceiver may include a transmitter 1353 or a receiver 1355 to implement transmitter or receiver functionality, respectively, appropriate to the RAN links (e.g., frequency allocations and the like). Further, the transmitter 1353 and the receiver 1355 of each transceiver may share circuit components, software, or firmware, or alternatively may be implemented separately.

In the current embodiment, the communication functions of the communication subsystem 1351 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 1351 may include cellular communication, Wi-Fi communication, Bluetooth communication, and GPS communication. The network 1343*b* may encompass wired and wireless communication networks such as a local-area network (LAN), a wide-area network (WAN), a computer network, a wireless network, a telecommunications network, another like network or any combination thereof. For example, the network 1343*b* may be a cellular network, a Wi-Fi network, and a near-field network. The power source 1313 may be configured to provide an alternating current (AC) or direct current (DC) power to components of the network node 1300.

In FIG. 195, the storage medium 1331 may be configured to include a number of physical drive units, such as a redundant array of independent disks (RAID), a floppy disk drive, a flash memory, a USB flash drive, an external hard disk drive, thumb drive, pen drive, key drive, a high-density digital versatile disc (HD-DVD) optical disc drive, an internal hard disk drive, a Blu-Ray optical disc drive, a holographic digital data storage (HDDS) optical disc drive, an external mini-dual in-line memory module (DIMM) synchronous dynamic random access memory (SDRAM), an external micro-DIMM SDRAM, a smartcard memory such as a subscriber identity module or a removable user identity (SIM/RUIM) module, other memory, or any combination thereof. The storage medium 1331 may allow the network node 1300 to access computer-executable instructions, application programs or the like, stored on transitory or non-transitory memory media, to off-load data, or to upload data. An article of manufacture, such as one utilizing a communication system may be tangibly embodied in storage medium 1331, which may comprise a computer-readable medium.

The functionality of the methods described herein may be implemented in one of the components of the network node 1300 or partitioned across multiple components of the network node 1300. Further, the functionality of the methods described herein may be implemented in any combination of hardware, software or firmware. In one example, the communication subsystem 1351 may be configured to include any of the components described herein. Further, the processor 1301 may be configured to communicate with any of such components over the bus 1303. In another example, any of such components may be represented by program instructions stored in memory that when executed by the processor 1301 performs the corresponding functions described herein. In another example, the functionality of any of such components may be partitioned between the processor 1301 and the communication subsystem 1351. In another example, the non-computative-intensive functions of any of such components may be implemented in software or firmware and the computative-intensive functions may be implemented in hardware.

Those skilled in the art will also appreciate that embodiments herein further include corresponding computer programs. A computer program comprises instructions which, when executed on at least one processor of an apparatus, cause the apparatus to carry out any of the respective processing described above. A computer program in this regard may comprise one or more code modules corresponding to the means or units described above. Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above. Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

As previously mentioned, current federated, sub-federated, and autonomous databases do not consider jurisdictional laws when performing queries. Accordingly, this disclosure describes embodiments to this problem, including using different methods of performing statistical queries for when data needs to be combined based on personal identifiable information between database systems within or between jurisdictions.

In one exemplary embodiment, queries are sent to a modified federated database system that adapts the queries and responses based on formalized jurisdictional regulations, including any other adaption needed to combine the database systems. The autonomous databases annotate the data with the type of information it contains such as with tags like "identifying information," "sensitive information," "general information," "export restriction to jurisdiction X," "only non-commercial use," "reduced resolution may be exported" (e.g., location, images, numbers like income), and the like. These tags formalize the processing/transactions by the federated or sub-federated databases for the associated data. Accordingly, the federated or sub-federated database receives these tags from the autonomous databases to inform the federated or sub-federated database how to adapt the queries.

In another embodiment, for queries that require statistical operations within a database system having a federated or sub-federated database that represents one more autonomous databases that are located in the same or different jurisdictions and each identifying information is in one of the autonomous databases, the federated or sub-federated database sends the query to each autonomous database. Further, the federated or sub-federated database receives the results from each autonomous database and then combines the results based on one or more statistical operations. For instance, for a query associated with counting visits to a web-page based on data from several autonomous databases (e.g., with a log of identity, time, and web page), the federated or sub-federated database performs the counting in each response to the query and then combine the counts. These statistical operations may be associated with median, average, sum, advanced filtering utilizing several databases, or the like. Further, these statistical operations may be associated with vectors, tables, columns, or the like.

In another embodiment, for a query that receives responses from different jurisdictions, including from a jurisdiction that requires combining responses from autonomous databases in that jurisdiction and that allow such combining, a database hierarchy may be used comprising of a federated database having one or more sub-federated databases in different jurisdictions, with each sub-federated database representing one or more autonomous databases in the same jurisdiction. For example, this hierarchy may be used to count visits to a web-page from persons in different jurisdictions (e.g., different rural areas). Further, each sub-federated database combines the responses to the query received from each autonomous database that is in the same jurisdiction. The federated database then combines the responses from each sub-federated database.

In another embodiment, the federated database sends the query to each sub-federated database. Each sub-federated database divides the query to extract any identifying information. For instance, for a query associated with counting visits to a webpage from rural addresses based on data from a sub-federated database that represents a first autonomous database with webpage visits, a log of the identity of each webpage visitor and the time of each webpage visit, and a second autonomous database, in the same jurisdiction as the first autonomous database, with the identity of each webpage visitor, the address of each webpage visitor, and an indication of whether each address is a rural address, the sub-federated database will divide the query to extract the identifying information from each count that has visited the webpage. As such, the sub-federated database sends the divided query to the second database and receives the identities of the rural addresses. Further, the sub-federated database adds the individual counts from the rural addresses into a sub-total count, which is sent to the federated database. The federated database adds the sub-total counts from each sub-federated database to obtain a total count.

Additionally or alternatively, for a federated database that combines responses from autonomous or sub-federated databases in different jurisdictions, the autonomous or sub-federated databases may anonymize the responses to queries before the federated database combines the responses. A one-way cryptographic hash function that uses a random salt may be utilized, with a new salt used for each query to generate the anonymized information. Further, any and all records of the salt may be destroyed at the completion of processing each query (one query may contain e.g. several SQL statements, not limited to only one statement) by the federated or sub-federated database. Accordingly, only during the processing of the query is it possible to derive the identifiable information from the anonymized information. Further, given the computationally complexity of deriving the identifiable information from the anonymized information, it is unlikely that the identifiable information could be derived during this brief query processing duration.

Furthermore, the federated database creates the random salt and sends it with each query or sub-query to the autonomous or sub-federated database. Further, the database hierarchy of federated, sub-federated, and autonomous databases uses the same one-way cryptographic hash function with the salt to anonymize the identifiable information that is sent with each response. Hence, the federated database receives responses from the autonomous or sub-federated databases that have the same anonymized information that corresponds to the same identifiable information, allowing, for instance, counting visits to a webpage for each rural address based on the anonymized information for that rural address.

In one example, a query related to counting the number of visits to a webpage that result in buying from that webpage is processed by a federated database. The federated database represents a first autonomous database with webpage visit logs, with the first database being in a jurisdiction where the identifying information is not allowed to be exported from that jurisdiction. Further, a second autonomous database has credit card information, with the second database being in a different jurisdiction from the first database, and the identifiable information is not allowed to be exported from that jurisdiction. Also, the first and second databases contain the same identifiable information. The federated database generates a randomized salt for a first query and sends the first query and the randomized salt to the first database. The first database receives the first query and salt, obtains a response to the first query associated with the webpage visit logs, anonymizes the identifiable information (e.g., visitor's name) of the response based on the randomized salt and a one-way cryptographic hash function, and sends the response with the anonymized information to the federated database.

In addition, the federated database sends a second query and the randomized salt to the second database. The second database receives the second query and salt, obtains a response to the query associated with the credit card information, anonymizes the identifiable information (e.g., credit card owner) of the response based on the randomized salt and a one-way cryptographic hash function, and sends the response with the anonymized information to the federated database. The federated database combines the received responses based on the anonymized information.

The one-way cryptographic hash function may be applied to data categories other than identifiable information, which may also be combined by the federated database. Further, this combining process may be applied to category-based data. For instance, category-based data may include medical diagnosis data, reduced-resolution location, city, or the like. In addition, the federated database system may cluster or combine the category-based data so that the particular diagnosis or city cannot be identified from the cluster or combination.

In another embodiment, homomorphic encryption schemes may be used for other one-way functions for sensitive scalar information. This allows responses with this sensitive encrypted scalar information to be compared (e.g., greater than, less than, equivalent to, and the like) by the federated database. This requires the autonomous databases to use the same homomorphic encryption schemes and keys. A randomized salt may be provided by the federated database system to the autonomous or sub-federated databases in the same manner as previously described.

A query should be understood to include a structured query language (SQL) query, non-SQL (NOSQL) query, graph database query, relational database query, analytic query (e.g., Spark or Hadoop), machine learning query, deep learning query, web-based front-end to information query, and the like.

The annotation could be done manually or automatically based on the actual data. One example of the latter is a name or an address may automatically be recognized as identifying information, medical records or location information could be identified as sensitive information, images that show faces could be annotated only non-commercial use, etc.

Interworking Between Wireless and Wired Communication Networks

As discussed above, an ongoing research challenge is the inter-working of 5G and TSN. Both technologies define own methods for network management and configuration and different mechanisms to achieve communication determinism that must somehow be arranged to enable end-to-end deterministic networking for industrial networks.

One way of 5G-TSN interworking is to let the 5G system act as a TSN bridge. The 5G network needs to offer some control interfaces towards the TSN network depending upon the TSN configuration model chosen as explained above. In the central configuration model, the central control entities CUC/CNC might occur on both sides of the 5G network. Furthermore, TSN networks of various topologies could be deployed on both sides in contrast to FIG. 5 where only a single endpoint is depicted behind the UE. If the 5G network acts as a TSN bridge, it is required that TSN-capable devices, e.g. bridges and endpoints, are deployed on both sides of the 5G network.

In 3GPP TS 23.501 section 5.6.10.2, the support of Protocol Data Unit (PDU) sessions of type Ethernet in a 5G network is explained. On the N6 interface between PDU Session Anchor (PSA) UPF and a Data Network (DN), two potential options are explained for PDU sessions of type Ethernet. At first it is possible to have a one-to-one mapping between an N6 interface and a PDU session and as a second option a mapping based on MAC addresses of multiple PDU sessions to a N6 interface. The solution explained herein can be applied to any configuration option.

FIG. 196 illustrates the protocol transition at PSA UPF for Ethernet type PDU sessions as explained in 3GPP TS 29.561, i.e. Ethernet frame handling at UPF.

There are no methods available to allow a connection of devices using 5G, supporting no or just a limited set of TSN-features to a TSN network over a 5G network.

Any traffic bridged to a TSN network without being registered (as explained above) in the TSN domain as a TSN stream will be handled as best-effort traffic without guarantees on quality-of-service (QoS). This way, end-to-end QoS may not be guaranteed.

Therefore it is an object of embodiments herein to provide a method for enabling end-to-end connectivity with guaranteed QoS between a wireless communication network, e.g. a 5G network and a wired communication network, e.g. a TSN network.

According to embodiments herein, a solution defines a function in the 5G user plane, that handles certain TSN features for devices being connected over 5G to a TSN network. The solution therefore allows an interworking between the 5G and TSN network with end-to-end guaranteed QoS. This function may be called a Virtual Endpoint (VEP). The VEP may be realized as virtual listener and/or virtual talker depending upon the role of a 5G device, for example a UE or an application running on top respectively.

The VEP may be used in any TSN configuration mode, so either distributed, centralized or fully centralized, as introduced above.

In the case of distributed TSN configuration model, the VEP may directly communicate to the nearest switch in the TSN network. In the fully centralized model it may be a reference point to CUC.

Multiple VEP instances may be implemented in the 5G network. In TSN, one endpoint is able to communicate using multiple TSN streams. A VEP from an TSN perspective is a single endpoint. In the most common scenario, a VEP also corresponds to one 5G device with one PDU session in the 5G network. Traffic from one TSN stream will be mapped at the VEP to one QoS Flow and vice-versa. Traffic from multiple TSN streams will be mapped to multiple QoS Flows within the same PDU session.

Multiple benefits may be achieved by introducing the Virtual Endpoint (VEP) function in the 5G user plane:

- It allows to connect non-TSN devices to a TSN network with guaranteed end-to-end QoS.
- It allows to connect non-Ethernet devices to a TSN network with guaranteed end-to-end QoS
- TSN features may be implemented in the 5G network centrally, for example to avoid a configuration over the air interface or in case of a feature-lacking at endpoints or bridges.
- TSN and Ethernet control traffic, e.g. Link Layer Discovery Protocol (LLDP), time synchronization etc., does not need to be carried over the 5G radio interface but handled by VEP.

According to embodiments herein, a solution to connect 5G endpoints to a TSN network is to introduce a new 5G user plane feature. The new 5G user plane feature enables end-to-end QoS-guaranteed connectivity in a network comprising of a 5G and a TSN part. The function or feature introduced may be called Virtual Endpoint (VEP).

A generic example where an VEP may be used from the industrial domain is given in FIG. 197, which shows 5G-TSN interworking in an industrial setup. The 5G endpoint therein may be an industrial robot wirelessly connected to the 5G network. The robot may be on the factory shop floor. The corresponding robot controller e.g. a Programmable Logic Controller (PLC) is connected to a TSN network e.g. in the factory's IT room. For a robot to be able to communicate to the controller in an end-to-end QoS-enabled way, it is necessary that both belong to the same TSN domain, as explained above. A VEP implements a complete set or a part of the TSN features and corresponding mapping to 5G QoS functions required for TSN-5G interworking.

The VEP is implemented in the 5G user plane close to or as part of the User Plane Function (UPF). It is responsible to map QoS in the 5G network and in the TSN network and is involved in the configuration.

A VEP may be used for PDU sessions of Type Ethernet or IP. In the most common scenario a VEP may be used to map traffic from one QoS Flow to one TSN stream and vice versa. Nevertheless, it may also be possible to map traffic between one or more TSN streams and one or more QoS Flows using one VEP instance. This means using one VEP instance for one PDU session. In addition, it may also be possible to combine traffic from multiple PDU sessions in a single VEP.

Multiple VEP instances may be used within one UPF. If one VEP instance is used for one PDU session then multiple TSN streams may be connected to that VEP and for example one-to-one mapped to multiple QoS Flows within the PDU session as explained above.

FIG. 198 illustrates the flow of control and user plane when introducing the VEP in case all Ethernet and TSN control plane traffic is handled at the VEP, for example for an PDU session of type IP, e.g. a non-Ethernet, non-TSN device behind the UE.

FIG. 199 illustrates how a VEP may be implemented as part of the UPF for PDU sessions of type IP or of type Ethernet. Further functionalities of the UPF like packet filtering are not displayed in here but may also be used in conjunction with a VEP. A VEP for PDU sessions that are not fully supporting TSN may be used within a UPF in parallel to PDU sessions of type Ethernet where TSN is supported end-to-end between two endpoints across the 5G network, as also illustrated in FIG. 200.

The main functionalities of a VEP are:

- mapping of PDU session(s) to TSN stream(s)—only relevant if the PDU session is of type IP, otherwise it's a standard action done at the UPF.
- establishing or modifying TSN streams or PDU sessions or QoS Flows and translating the different QoS domains correspondingly.
- implementing and supporting certain user and control plane features used in TSN, like time-aware traffic shaping as defined in 802.1Qbv and time synchronization as defined in 802.1AS-rev used for that purpose.
- interfacing with CUC and or the nearest TSN bridge in the TSN domain.

A VEP maps one or more TSN streams to one or more PDU sessions or QoS Flows as explained above. It therefore maintains a mapping table internally. For mapping purposes, the VEP may use the TSN stream ID or PDU session ID or QoS Flow IDs (QFIs) respectively. In case of one-to-one mapping of e.g. one QoS Flow to one TSN stream this mapping is of course much simpler.

In case a PDU session of type IP is used, the VEP will use a Medium Access Control (MAC) address from a local MAC address pool or from another source, like e.g. a manually assigned MAC address. Ethernet forwarding of the IP packets from an IP PDU session is then possible to an external Ethernet DN network. This MAC address will be advertised towards the DN and also populated towards the TSN control instances.

For mapping purposes, it is further necessary that the VEP may also support various TSN features like 802.1AS, 802.1Qbv, 802.1Qcc etc.

To be able to create or modify PDU sessions, the VEP may need to interface the SMF in the 5G network. This interfacing may be done using the existing N4 interface if a VEP is implemented as part of the UPF. Furthermore, below are the two embodiment methods, describing the sequence of the communication between a VEP and the 5G endpoint acting as Talker i.e. transmitter of data, or Listener, i.e. receiver of data.

Procedure if 5G endpoint is a talker:

1. Application at the 5G endpoint will request a communication link from UE.
2. UE PDU session request or use existing one to VEP/UPF.
3. VEP estimates the required QoS for a TSN stream by either or a combination of:
   a. Mapping of QoS Flow ID (QFI) selected by UE to TSN stream QoS;
   b. Dedicated application QoS specific to TSN given by the UE or the application on top;
   c. Pre-configured QoS settings within the VEP for the TSN network;
   d. Check QoS settings with CUC in the TSN network for the TSN network;
4. Based on the QoS settings, the VEP will try to establish a TSN stream; or map it to an existing TSN stream or initiate a TSN stream setup towards the CNC or CUC depends upon how the TSN network is configured, which the VEP shall be aware of by using TSN features as defined in e.g. 802.1Qcc.
5. In case the TSN stream setup is successful the user plane communication starts; the VEP will then map user plane packets from the PDU session or the specific QoS Flow as explained above to the established TSN stream as well as performing required actions defined by the TSN features used in the TSN network.

According to one embodiment, when estimating the required QoS for the TSN stream in step 3), the VEP considers the internal communication performance parameters within the 5G network, i.e. between the VEP and the end-device. e.g. one way or round-trip latency, packet error rate or reliability indicator, etc. When the VEP communicates QoS requirements to the TSN network, it considers those internal performance parameters, since the TSN network "thinks" that the VEP and the endpoint are the same. Therefore, when it comes for example to a required end-to-end latency value to be communicated to the TSN network, instead of indicating the real requirement of X ms, a harder requirement of X ms-(VEP to end-device delay) is indicated. To find out the internal communication performance parameters, communication protocols within the 5G network may be used, such as:

VEP communicates directly or via further 5G core function with the gNB to obtain measurements or estimates of the UE-gNB, i.e. 5G radio interface communication performance. For example, latency measurements or estimates. The gNB may use measurements to the UE itself, and may also consider its own traffic or load situation to further estimate how well or fast it can serve the specific UE.

Probing packets may be used between the VEP and the UE, and back, e.g. in order to obtain the latency between VEP and UE.

Procedure if 5G endpoint is a listener:

1. Application at the TSN endpoint will request a TSN stream or a TSN stream will be requested by the CUC depending upon the configuration model.
2. A TSN stream request will be received at the VEP.
3. The VEP will also receive the QoS for the TSN stream and map it to 5G QoS. The mapping may be based on a fixed configuration setting. If the VEP analyzes that the QoS cannot be supported by the 5G network it might decline the TSN stream request.
4. Based on the QoS settings the VEP will either establish a new PDU session or use an existing PDU session or modify an existing PDU session to meet the requested QoS.
5. In case the TSN stream and PDU session setup is successful the user plane communication starts. The VEP will then map user plane packets from the TSN stream to the corresponding PDU session and QoS Flow, as well as performing required actions defined by the TSN features used in the TSN network.

According to an embodiment, in step 3), in order to be able to decide whether the QoS of the TSN stream can be fulfilled, the VEP considers measurements or estimates of the 5G internal communication performance between the VEP and the end-device. Those measurements may be obtained as described above for step 3) for the talker procedure.

Specific features a VEP may support are for-example time synchronization to an external grandmaster clock as explained in IEEE 802.1AS-rev to support for example time-aware scheduling as defined in IEEE 802.1Qbv. The VEP will be involved in the setup of a time-aware TSN communication and forward packets to/from a 5G endpoint that is not time-aware accordingly.

In the future it is envisioned that 5G network will interwork with TSN enabling industrial use case. In such situation, implementing complex TSN features on UE side will become a cumbersome task. The embodiments herein proposes a new feature to the 5G user plane called Virtual Endpoint (VEP) which enables interworking of TSN and 5G network. It further allows also connection of non-TSN devices and also non-Ethernet devices to a TSN network using 5G.

Example Embodiments of methods for enabling end-to-end connectivity between a wireless communication network, e.g. 5G and a wired communication network, e.g. TSN network, will be described in the following.

Embodiment 1

A method in a communication network for enabling end-to-end connectivity between a wireless communication network, e.g. 5G and a wired communication network, e.g. TSN network. The method comprising:

- implementing a Virtual Endpoint, VEP, in the wireless communication network;
- implementing in the VEP certain user and control plane features used in the wired communication network;
- mapping data traffic, in the VEP, between a device in the wireless communication network and a device in the wired communication network based on Quality-of-Service, QoS;
- performing required actions defined by the features used in the wired communication network.

According to some embodiments, the VEP may be implemented in the 5G network user plane close to or as a part of User Plane Function, UPF.

According to some embodiments, mapping data traffic between a device in the wireless communication network and a device in the wired communication network based on QoS may comprise establishing or modifying TSN streams or Protocol Data Unit, PDU sessions or QoS Flows and translating different QoS domains correspondingly.

Embodiment 2

A method performed in a Virtual Endpoint, VEP implemented in a wireless communication network for enabling end-to-end connectivity to a wired communication network. The method comprising:

- receiving a communication request from a device in either the wireless communication network or the wired communication network;
- estimating a required QoS;
- mapping data traffic between a device in the wireless communication network and a device in the wired communication network based on the required QoS;
- performing required actions defined by features used in the wired communication network.

The wireless communication network may be a 5th generation, 5G, network and the wired communication network may be a Time Sensitive Networking, TSN, network. The communication session is a Protocol Data Unit, PDU, session, the data stream is a TSN stream.

Embodiment 3

A method performed in a Virtual Endpoint, VEP implemented in a wireless communication network for enabling end-to-end connectivity to a wired communication network. The endpoint or device in the wireless communication network is a talker, the method comprising:

- receiving a communication session request from a device in the wireless communication network;
- estimating a required QoS for a data stream in the wired communication network;
- establishing a data stream in the wired communication network based on the required QoS;
- mapping user plane packets from the communication session or a specific QoS Flow to the established data stream;
- performing required actions defined by features used in the wired communication network.

The wireless communication network may be a 5th generation, 5G, network and the wired communication network may be a Time Sensitive Networking, TSN, network. The communication session may be a Protocol Data Unit, PDU, session, the data stream is may be a TSN stream.

According to some embodiments herein, establishing a data stream based on the required QoS comprising mapping to an existing data stream or initiating a data stream setup in the wired communication network.

According to some embodiments herein, estimating a required QoS may be performed by one or a combination of:

- mapping a QoS Flow ID, QFI, selected by the device to a TSN stream QoS;
- choosing a dedicated application QoS specific to the TSN given by the device;
- choosing from pre-configured QoS settings within the VEP for the TSN network;
- checking QoS settings with CUC in the TSN network for a TSN stream.

Embodiment 4

A method performed in a Virtual Endpoint, VEP implemented in a wireless communication network for enabling end-to-end connectivity to a wired communication network. The endpoint or device in the wireless communication network is a listener, the method comprises:

- receiving a data stream request from a device in the wired communication network;
- receiving a QoS for the data stream;
- checking if QoS of the wireless communication network meets the QoS of the data stream;
- if the QoS of the wireless communication network meets the QoS of the data stream,
  - a. establishing a communication session in the wireless communication network based on the QoS for the data stream;
  - b. performing required actions defined by features used in the wired communication network.

According to some embodiments herein, establishing a communication session based on the QoS of the data stream comprising establishing a new communication session or using an existing communication session or modify an existing communication session to meet the QoS of the data stream.

Performing Operations Based on Distributed Stored Data

In data storage, data is often replicated to several nodes, e.g., to obtain swift data availability and/or prevent data corruption/loss. Thus, several representations of the same data may be kept in different storage entities. For example, in cloud-based systems and in edge compute systems, storage is often distributed over several nodes (e.g., computers, servers, storage units, etc.) and over several tiers of performance (e.g., cache, dynamic random-access memory-DRAM, flash disk, spinning disk, etc.).

Performing a set of operations based on data stored as several representations kept in different storage entities may be time consuming, and the latency until a result of performing the operations is provided may be unacceptably high in some situations.

Therefore, there is a need for alternative approaches for performing a set of operations based on data, wherein a plurality of representations of the data are kept in respective ones of a plurality of storage entities. Preferably, such approaches provide a reduction of the latency from sending of a data query until a result of performing the set of operations is provided.

It is an object of some embodiments to solve or mitigate, alleviate, or eliminate at least some of the above or other disadvantages.

A first aspect is a method of a controller for management of performing a set of operations based on data, wherein a plurality of representations of the data are kept in respective ones of a plurality of storage entities.

The method comprises (for each of two or more storage entities of the plurality of storage entities) sending—to the storage entity—a respective query relating to the data, and receiving—from the storage entity—a response comprising the representation of the data kept in the storage entity.

The method also comprises (for each of at least two of the two or more storage entities) initiating an activity of performing the set of operations based on the representation of the data comprised in the response.

Furthermore, the method comprises determining (based on the representations of the data comprised in the responses) one of the initiated activities—a conclusive activity—as being based on a conclusive representation of the data, and causing provision of a result of the conclusive activity as result for performing the set of operations based on the data.

In some embodiments, activities of performing the set of operations are initiated only for storage entities for which the representation of the data comprised in the response differs from representations of the data comprised in previously received responses.

In some embodiments, the method further comprises determining the conclusive representation of the data by taking a majority, or weighted majority, decision among the representations of the data comprised in the responses.

In some embodiments, the determination of the conclusive activity is performed before all initiated activities are completed.

In some embodiments, the activities are initiated before the determination of the conclusive activity.

In some embodiments, the conclusive representation coincides with the representation of the data kept in the storage entity for at least one of the two or more storage entities.

In some embodiments, the method further comprises, in response to determining the conclusive activity, canceling initiated activities that are not based on the conclusive representation.

In some embodiments, the method further comprises, in response to determining the conclusive activity, canceling all initiated activities, except for one that is based on the conclusive representation.

In some embodiments, the method further comprises, before determining the conclusive activity, canceling or pausing initiated activities for which a probability of being based on the conclusive representation of the data falls below a probability threshold value.

In some embodiments, at least two of the two or more storage entities have differing signaling delay between the controller and the storage entity.

Having differing signaling delay may be interpreted as having different signaling delay according to some embodiments.

In some embodiments, a storage client comprises the controller and one of the two or more storage entities, and the one storage entity keeps a representation of the data which is a default representation or a last known representation.

A second aspect is a method of a controller for management of performing a set of operations based on data, wherein a plurality of representations of the data are kept in respective ones of a plurality of storage entities.

The method comprises (for each of two or more storage entities of the plurality of storage entities) sending—to the storage entity—a respective query relating to the data, thereby causing initiation of an activity of performing the set of operations based on the representation of the data kept in the storage entity, and receiving—from the storage entity—a response comprising an indicator of the representation of the data kept in the storage entity.

The method also comprises determining (based on the indicators comprised in the responses) one of the initiated activities—a conclusive activity—as being based on representation of the data corresponding to a conclusive indicator, and causing provision of a result of the conclusive activity as result for performing the set of operations based on the data.

In some embodiments, the method further comprises determining the conclusive indicator by taking a majority, or weighted majority, decision among the indicators comprised in the responses.

In some embodiments, the determination of the conclusive activity is performed before all initiated activities are completed.

In some embodiments, the activities are initiated before the determination of the conclusive activity.

In some embodiments, the representation of the data corresponding to the conclusive indicator coincides with the representation of the data kept in the storage entity for at least one of the two or more storage entities.

In some embodiments, the method further comprises, in response to determining the conclusive activity, canceling initiated activities that are not based on the representation of the data corresponding to the conclusive indicator.

In some embodiments, the method further comprises, in response to determining the conclusive activity, canceling all initiated activities, except for one that is based on the representation of the data corresponding to the conclusive indicator.

In some embodiments, the method further comprises, before determining the conclusive activity, canceling or pausing initiated activities for which a probability of being based on representation of the data corresponding to the conclusive indicator falls below a probability threshold value.

In some embodiments, at least two of the two or more storage entities have differing signaling delay between the controller and the storage entity.

Having differing signaling delay may be interpreted as having different signaling delay according to some embodiments.

In some embodiments, a storage client comprises the controller and one of the two or more storage entities, and wherein the one storage entity keeps a representation of the data which is a default representation or a last known representation.

The first and second aspects may be described as a method of a controller for management of performing a set of operations based on data, wherein a plurality of representations of the data are kept in respective ones of a plurality of storage entities.

The method comprises (for each of two or more storage entities of the plurality of storage entities) sending—to the storage entity—a respective query relating to the data, and receiving—from the storage entity—a response comprising information relating to the representation of the data kept in the storage entity (the information comprising, e.g., the representation, or an indicator of the representation).

The method also comprises (for each of at least two of the two or more storage entities) causing initiation of an activity of performing the set of operations based on the representation of the data (wherein the initiation may be caused, e.g., by sending of the query or by performing the initiation).

Furthermore, the method comprises determining (based on the information relating to the representations of the data comprised in the responses) one of the initiated activities—a conclusive activity—as being based on representation of the data corresponding to conclusive information relating to the representation of the data (wherein the conclusive information may, e.g., be a conclusive representation of the data or a conclusive indicator), and causing provision of a result of the conclusive activity as result for performing the set of operations based on the data.

Generally, the conclusive activity is one of the initiated activities of performing the set of operations. The initiated activities of performing the set of operations are also referred to as speculative activities later herein. Thus, in that terminology the conclusive activity is one of the speculative activities. The conclusive activity is typically chosen among the initiated activities based on a data consistency decision.

The data consistency decision may, for example, determine one of the representations of the data as a conclusive representation and the conclusive activity may be chosen as an activity that was initiated based on the conclusive representation. For example, a majority decision among the representations of the data comprised in the received responses may provide the conclusive representation.

Alternatively or additionally, the data consistency decision may, for example, determine one of the indicators of representations of the data as a conclusive indicator and the conclusive activity may be chosen as an activity that was initiated based on a representation of the data that corresponds to the conclusive indicator. For example, a majority decision among indicators comprised in the received responses may provide the conclusive indicator.

A third aspect is a computer program product comprising a non-transitory computer readable medium, having thereon a computer program comprising program instructions. The computer program is loadable into a data processing unit and configured to cause execution of the method according to any of the first and second aspects when the computer program is run by the data processing unit.

A fourth aspect is an apparatus for a controller and for management of performing a set of operations based on data, wherein a plurality of representations of the data are kept in respective ones of a plurality of storage entities.

The apparatus comprises controlling circuitry configured to cause (for each of two or more storage entities of the plurality of storage entities) sending—to the storage entity—of a respective query relating to the data, and reception—from the storage entity—of a response comprising the representation of the data kept in the storage entity.

The controlling circuitry is also configured to cause (for each of at least two of the two or more storage entities) initiation of an activity of performing the set of operations based on the representation of the data comprised in the response.

Furthermore, the controlling circuitry is configured to cause determination (based on the representations of the data comprised in the responses) of one of the initiated activities—a conclusive activity—as being based on a conclusive representation of the data, and provision of a result of the conclusive activity as result for performing the set of operations based on the data.

A fifth aspect is an apparatus for a controller and for management of performing a set of operations based on data, wherein a plurality of representations of the data are kept in respective ones of a plurality of storage entities.

The apparatus comprises controlling circuitry configured to cause (for each of two or more storage entities of the plurality of storage entities) sending—to the storage entity—of a respective query relating to the data, thereby causing initiation of an activity of performing the set of operations based on the representation of the data kept in the storage entity, and reception—from the storage entity—of a response comprising an indicator of the representation of the data kept in the storage entity.

Furthermore, the controlling circuitry is configured to cause determination (based on the indicators comprised in the responses) of one of the initiated activities—a conclusive activity—as being based on representation of the data corresponding to a conclusive indicator, and provision of a result of the conclusive activity as result for performing the set of operations based on the data.

The fourth and fifth aspects may be described as an apparatus for a controller and for management of performing a set of operations based on data, wherein a plurality of representations of the data are kept in respective ones of a plurality of storage entities.

The apparatus comprises controlling circuitry configured to cause the method steps of any of the first and second aspects, or of the method combining the first and second aspects.

A sixth aspect is a storage client comprising the apparatus of any of the fourth and fifth aspects.

A seventh aspect is a client node comprising the apparatus of any of the fourth and fifth aspects and/or the storage client of the sixth aspect.

In some embodiments, any of the above aspects may additionally have features identical with or corresponding to any of the various features as explained above for any of the other aspects.

An advantage of some embodiments is that alternative approaches are provided for performing a set of operations based on data, wherein a plurality of representations of the data are kept in respective ones of a plurality of storage entities.

Another advantage of some embodiments is that a reduction of the latency—from sending of a data query until a result of performing the set of operations is provided—may be achieved.

Yet an advantage of some embodiments is that reduced power consumption and/or reduced utilization of operation-performing resources may be achieved.

Yet a further advantage is that the result of the performing of the set of operations corresponds to the result achieved when data consistency is obtained before any activity of performing the set of operations is initiated.

As mentioned above, there may be latency issues when a set of operations are to be performed based on data stored in several representations, each kept by a respective storage entity.

When a set of operations are to be performed based on data stored in several representations, two or more of the representations are typically obtained and a data consistency decision (e.g., a majority decision) is taken to determine which representation of the data to use when the set of operations is performed. The representation of the data that is used for performing the set of operations may be termed a conclusive representation of the data.

For example, if there are seven representations of the data, wherein four of the representations are identical (coincide), that representation is selected as the conclusive representation if a majority decision is applied. To further illustrate this example, assume that four of the seven representations have a first value "a", that two of the seven representations have a second value "b" and that one of the seven representations has a third value "c". Then, the conclusive representation has the first value "a" if a majority decision is applied since the representations having the first value "a" are in majority among the seven representations.

There is typically a delay, after sending a data query, before the representations of the data can be obtained. The delay may be more prominent in some cases, e.g., when there is a relatively large geographical distance between the device sending the query and the storage entity keeping the representation of the data, and/or when the storage entity keeping the representation of the data is a slow-access storage entity. Furthermore, the delay may be different for different storage entities.

For example, the first response (comprising a representation of the data) may arrive relatively fast after the query has been sent; for example, if that representation of the data is kept locally and maybe even in a memory/cache comprised in the same apparatus as the querying party. Other responses (comprising a representation of the data) that are needed to obtain data consistency may arrive several orders of magnitude later; e.g., approximately 100 milliseconds or more after the query has been sent for geo-distributed systems.

Thus, the representations of the data may arrive with different delay; at different points in time. These delay issues postpone the majority decision (and thereby the performing of the operations based on the conclusive representation of the data and the provision of a result thereof) until all representations have been obtained.

In the following, embodiments will be described for management of performing a set of operations based on data, wherein a plurality of representations of the data are kept in respective ones of a plurality of storage entities.

A controller (e.g., controlling circuitry or a control entity/module) may be managing the performing of the set of operations. The controller may, for example, be comprised in a storage client.

The plurality of representations of the data provide several sources of truth for the data. The plurality of representations of the data may, for example, be for one or more of: consistency handling, redundancy, reliability, validity, error protection, error detection, error correction, etc.

One or more of the plurality of representations of the data may differ from other representations of the same data. For example, some representations may have undergone an update via a write operation while other representations have not yet undergone the update (e.g., due to signaling delay).

The data can have any suitable form, including (but not limited to) one or more scalar or complex values, one or more vectors, one or more matrices, one or more other data structures, one or more documents, one or more data file, one or more images, one or more videos, one or more audio tracks, etc.

The plurality of storage entities may, for example, comprise storage at different (physical or virtual) nodes and/or storage in different tiers at the same (physical or virtual) node. In some embodiments, different tiers may be comprised in the same storage arrangement (e.g., an arrangement of several computers in a same data center or a same rack of computers).

Generally, different tiers may refer to a lower numbered tier keeping some partial set of data stored in a higher numbered tier, wherein the lower numbered tier has lower latency than the higher numbered tier. For example, tier 0 may be a dynamic random-access memory (DRAM), tier 1 may be a solid-state drive (SSD) disk, and tier 2 may be spinning hard disk.

Furthermore, one or more of the storage entities may apply cloud-based storage. One or more—but not all—of the storage entities may be a local storage entity (e.g., a cache memory or a register) of the controller managing the performing of the set of operations. For example, a storage client may comprise the controller and one storage entity that keeps a representation of the data which is a default representation or a last known representation.

Thus, the storing of the plurality of representations of the data is distributed (e.g., over one or more of: different tiers, different nodes, different geographical locations, etc.)

According to some embodiments, activities of performing the set of operations is initiated before the data consistency decision has been made. Typically, this means that performing of the set of operations is initiated in several instances; each of which may be seen as a speculative activity of performing the set of operations. For example, a speculative activity of performing the set of operations may be initiated based on each of a number of representations of the data (e.g., a number of unique representations of the data).

When used herein, the term "activity of performing the set of operations" may, for example, refer to an activity comprising (or consisting of) performing of the set of operations.

A speculative activity of performing the set of operations may be defined as performing (at least part of) the set of operations before the data consistency decision has been made. Typically, all initiated speculative activities comprise performing of the same set of operations, while the representation of the data that the set of operations are performed based on may differ between initiated speculative activities of performing the set of operations.

Then, when a data consistency decision has been made, some embodiments comprise cancelling speculative activities of performing the set of operations that are not based on a representation of the data corresponding to the data consistency decision (and possibly cancelling duplicate speculative activities of performing the set of operations that are based on a representation of the data corresponding to the data consistency decision). Some embodiments may comprise letting one or more of the speculative activities continue after the data consistency decision has been made, even if they are duplicates and/or are not based on a representation of the data corresponding to the data consistency decision.

Generally, cancelling activities of performing the set of operations may be seen as aborting, stopping, or prematurely ending the activities of performing the set of operations.

In any case, when the data consistency decision has been made, a result of a speculative activity of performing the set of operations that is based on a representation of the data corresponding to the data consistency decision may be provided as result for performing the set of operations based on the data.

The data consistency decision will be referred to herein as providing a conclusive (consistent) representation of the data and/or a conclusive (consistent) indicator of the representation of the data. The conclusive representation of the data may, for example, correspond to one of the representations of the data. The data consistency decision may be a consensus-based decision; e.g., a majority, or weighted majority, decision among, e.g., obtained representations of the data or obtained indicators of the representation of the data.

Performing a set of operations in a speculative activity may, for example, comprise executing a software code portion. The set of operations may comprise an executable, or a software artefact. Alternatively or additionally, the set of operations may comprise execution in hardware. Examples of an executable, or a software artefact, include a software function, a method, a script, a binary executable module, an executable context, a software code portion, etc. Any of these, and/or other, examples of sets of operations may be performed in a speculative activity. A speculative activity of performing the set of operations may, in some scenarios, be termed a speculative execution.

FIG. 201 illustrates an example method 100 according to some embodiments. The method is for a controller, and for management of performing a set of operations based on data, wherein a plurality of representations of the data are kept in respective ones of a plurality of storage entities.

In step 110, a respective query is sent to each storage entity of a collection of storage entities of the plurality of storage entities. How the collection of storage entities are selected from the plurality of storage entities may be in accordance with any suitable approach. Numerous such suitable approaches are known in the art.

The query is related to the data. For example, the query may comprise a request or prompt for the data (the representation of the data kept in the storage entity).

In steps 120, a response (e.g., a query response) is received from two or more storage entities of the collection of entities. The response comprises the representation of the data kept in the storage entity from which the response is received. Typically, the responses are received at different points in time due to different delays, for the different storage entities, between storage entity and the controller. As mentioned before, the different delays may, for example, be due to different signaling delays (e.g., due to different geographical distances) and/or different storage access times.

In FIG. 201, the two or more storage entities are represented by four storage entities denoted as a first storage entity, an n:th storage entity, a p:th storage entity, and an x:th storage entity.

In some embodiments, a response is received from all storage entities in the collection of storage entities (i.e., the collection of storage entities consists of the two or more entities). In some embodiments, a response is received from less than all storage entities in the collection of storage entities (i.e., the collection of storage entities consists of the two or more entities and one or more other storage entities). In any case, the collection of storage entities comprises the two or more entities. Thus, sending a respective query to each storage entity of the collection of storage entities comprises sending a respective query to each of the two or more storage entities.

For example, a response may be received from seven storage entities; thus providing seven representations of the data wherein, for example, four of the representations have a value “a”, two of the representations have a value “b” and one of the representations has a value “c”.

Activities of performing the set of operations is then initiated for at least two of the two or more storage entities as illustrated by steps 130. Typically, each initiation is performed directly responsive to the reception of the corresponding response. Then, if the responses are received at different points in time, the initiations will be performed at different point in time.

The set of operations may be performed in the controller itself or in an apparatus connected to, or otherwise associated with, the controller. For example, the set of operations may be performed in the storage client, or may be distributedly performed (e.g., cloud-based execution).

The initiated activity is based on the representation of the data comprised in the response.

Typically, activities of performing the set of operations are initiated only for storage entities for which the representation of the data comprised in the response differs from representations of the data comprised in previously received responses (related to the same request for performing the set of operations). Thus, activities of performing the set of operations are initiated only for unique representations of the data. This has the advantage of not unnecessarily utilizing resources (processing hardware, power consumption, etc.) for performing of the set of operations.

For example, an activity of performing the set of operations is typically initiated for the first storage entity (illustrated by a solid line for the corresponding step 130). Then, for each new response it is determined whether the representation of the data comprised in the response coincides with the representation of the data comprised in an already received response.

If so, it may be decided to not initiate any activity of performing the set of operations for that storage entity (illustrated for the n:th and x:th storage entities by a dashed line for the corresponding steps 130).

If the representation of the data comprised in the response does not coincide with any of the representations of the data comprised in already received responses (i.e., if the representation of the data comprised in the response is unique), an activity of performing the set of operations is initiated for that storage entity (illustrated for the p:th storage entities by a solid line for the corresponding step 130).

For the example with seven received responses wherein four of the representations have a value “a”, two of the representations have a value “b” and one of the representations has a value “c”, three (speculative) activities of performing the set of operations may be initiated—one based on the value “a”, one based on the value “b” and one based on the value “c”.

In step 150, one of the initiated activities of performing the set of operations is determined as being based on a conclusive representation of the data. This activity is termed the conclusive activity. Thus, the conclusive activity is one of the initiated activities of performing the set of operations. The determination of the conclusive activity is based on the representations of the data comprised in the responses. For example, step 150 may comprise determining the conclusive representation of the data by taking a majority, or weighted majority, decision among the representations of the data comprised in the responses, and selecting the conclusive activity as an initiated activity of performing the set of operations that is based on a representation of the data that corresponds to (e.g., coincides with) the conclusive representation of the data.

Determining the conclusive representation of the data and/or determining the conclusive activity may be seen as comprised in a data consistency decision.

Thus, the conclusive activity is chosen among the initiated activities based on a data consistency decision, wherein the data consistency decision determines one of the representations of the data as a conclusive representation and the conclusive activity is chosen as an activity that was initiated based on the conclusive representation.

Step 150 may be performed when responses have been received from all storage entities of the collection of storage entities. Alternatively, step 150 may be performed before responses have been received from all storage entities of the collection of storage entities, e.g., when a certain number of responses have been received (e.g., the number exceeding a threshold value), or when a certain number of responses comprising the same representation of the data have been received (e.g., the number exceeding a threshold value).

Typically, step 150 is performed before all initiated activities of performing the set of operations are completed.

In response to determining the conclusive activity, initiated activities that are not based on the conclusive representation may be cancelled as illustrated by optional step 160. Alternatively or additionally, all initiated activities, except for one that is based on the conclusive representation, may be cancelled in response to determining the conclusive activity as also illustrated by optional step 160.

This may have the advantage of not unnecessarily utilizing resources (processing hardware, power consumption, etc.) for performing the set of operations.

It should be noted that, in some embodiments, also initiated activities other than the conclusive activity (e.g., all initiated activities) are allowed to be completed even after the conclusive activity is determined. This may be beneficial, for example, if it is computationally and/or signal-wise cheaper to allow continued performance of operations than to cancel performance of operations.

In some embodiments, some initiated activities may be cancelled or paused even before the conclusive activity is determined as illustrated by optional step 140. For example, initiated activities may be cancelled or paused for which a probability of being based on the conclusive representation of the data falls below a probability threshold value.

The threshold value may be equal to zero (cancelling/pausing only for representations that cannot become the conclusive representation), or may be larger than zero but less than one (cancelling/pausing for representations that cannot become the conclusive representation and for representations that are unlikely to become the conclusive representation).

The probability of being based on the conclusive representation may be estimated via intermediate data consistency decisions. For example, if ten responses are needed for determining the conclusive representation and if eight responses have been received which comprises a first representation of the data once, a second representation of the data thrice, and a third representation of the data four times, it is clear that the first representation of the data cannot become the conclusive representation. Then the initiated activity of performing the set of operations based on the first representation of the data may be cancelled.

This may have the advantage of not unnecessarily utilizing resources (processing hardware, power consumption, etc.) for performing the set of operations.

In step 170, a result of the conclusive activity is provided (or is caused to be provided) as result for performing the set of operations based on the data.

Since the conclusive activity is initiated (as one of the speculative activities of performing the set of operations) before the data consistency decision, the overall latency may be decreased compared to when the data consistency decision is taken before performing the set of operations.

Continuing the example with seven received responses wherein four of the representations have a value "a", two of the representations have a value "b" and one of the representations has a value "c", the conclusive representation has the value "a" if a majority decision is applied. The two (speculative) activities that were initiated based on the value "b" and based on the value "c" may be cancelled when the conclusive representation is determined, and the result of the (speculative) activity that was initiated based on the value "a" may be provided as result for performing the set of operations based on the data.

FIG. 202 illustrates an example method 105 according to some embodiments. The method is for a controller, and for management of performing a set of operations based on data, wherein a plurality of representations of the data are kept in respective ones of a plurality of storage entities.

For example, seven representations of the data may be kept in different storage entities wherein, for example, four of the representations have a value "a", two of the representations have a value "b" and one of the representations has a value "c".

In step 110, a respective query is sent to each storage entity of a collection of storage entities of the plurality of storage entities. How the collection of storage entities are selected from the plurality of storage entities may be in accordance with any suitable approach. Numerous such suitable approaches are known in the art.

The query is related to the data. For example, the query may comprise a request or prompt for the data (the representation of the data kept in the storage entity), or a request for an indicator of the representation of the data. The indicator may be more easily conveyed than the data (e.g., it may be more compact). The indicator may be derived from the (representation of the) data. For example, the indicator may be a compressed version of the data, a hash-function of the data, a checksum of the data, a data fingerprint, a cryptographic hash-function of the data, etc.

Furthermore, the query is configured to cause initiation of an activity of performing the set of operations based on the representation of the data kept in the storage entity as illustrated by sub-steps 135 for four example storage entities denoted as a first storage entity, an n:th storage entity, a p:th storage entity, and an x:th storage entity. This may, for example, be achieved by including an operation request, a software function identifier, an executable, or similar in the query. The initiated activity is based on the representation of the data kept in the storage entity. Typically, each initiation is performed directly responsive to the reception of the query.

The set of operations may be performed at the corresponding storage entity. The set of operations may be performed in the storage entity itself or in an apparatus connected to, or otherwise associated with, the storage entity. For example, the set of operations may be distributedly performed (e.g., cloud-based execution).

For example, an SQL (structured query language) query can cause activities of performing a set of operations to be initiated before returning a response. Examples of such activities includes simple processing (e.g., summing) and advanced processing (e.g., execution of registered software function).

For the example with seven representations of which four representations have a value "a", two of the representations have a value "b" and one of the representations has a value "c", seven (speculative) activities of performing the set of operations may be initiated—four based on the value "a", two based on the value "b" and one based on the value "c".

In steps 125, a response (e.g., a query response) is received from two or more storage entities of the collection of entities. The response comprises an indicator of the representation of the data kept in the storage entity from which the response is received. Typically, the responses are received at different points in time due to different delays, for the different storage entities, between storage entity and the controller. As mentioned before, the different delays may, for example, be due to different signaling delays (e.g., due to different geographical distances) and/or different storage access times.

In some embodiments, a response is received from all storage entities in the collection of storage entities (i.e., the collection of storage entities consists of the two or more entities). In some embodiments, a response is received from less than all storage entities in the collection of storage entities (i.e., the collection of storage entities consists of the two or more entities and one or more other storage entities). In any case, the collection of storage entities comprises the two or more entities. Thus, sending a respective query to each storage entity of the collection of storage entities comprises sending a respective query to each of the two or more storage entities.

Typically, the responses are received before the initiated activities of performing the set of operations are completed.

In step 150, one of the initiated activities of performing the set of operations is determined as being based on representation of the data corresponding to a conclusive indicator. This activity of performing the set of operations is termed the conclusive activity. Thus, the conclusive activity is one of the initiated activities of performing the set of operations.

The determination of the conclusive activity is based on the indicators of the representations of the data comprised in the responses. For example, step 150 may comprise determining the conclusive indicator by taking a majority, or weighted majority, decision among the indicators comprised in the responses, and selecting the conclusive activity as an initiated activity of performing the set of operations that is based on a representation of the data that corresponds to the conclusive indicator.

Determining the conclusive indicator and/or determining the conclusive activity may be seen as comprised in a data consistency decision.

Thus, the conclusive activity is chosen among the initiated activities based on a data consistency decision, wherein the data consistency decision determines one of the indicators of representations of the data as a conclusive indicator and the conclusive activity is chosen as an activity that was initiated based on a representation of the data that corresponds to the conclusive indicator.

Preferably, the conclusive activity is selected among the initiated activities that are based on representations corresponding to the conclusive indicator, as the initiated activity that is expected to be completed first.

Step 150 may be performed when responses have been received from all storage entities of the collection of storage entities. Alternatively, step 150 may be performed before responses have been received from all storage entities of the collection of storage entities, e.g., when a certain number of responses have been received (e.g., the number exceeding a threshold value), or when a certain number of responses comprising the same indicator have been received (e.g., the number exceeding a threshold value).

Typically, step 150 is performed before all initiated activities of performing the set of operations are completed.

In response to determining the conclusive activity, initiated activities of performing the set of operations that are not based on a representation corresponding to the conclusive indicator may be cancelled as illustrated by optional step 160. Alternatively or additionally, all initiated activities of performing the set of operations, except for one that is based on a representation corresponding to the conclusive indicator, may be cancelled in response to determining the conclusive activity as also illustrated by optional step 160.

This may have the advantage of not unnecessarily utilizing resources (processing hardware, power consumption, etc.) for performing the set of operations.

It should be noted that, in some embodiments, also initiated activities other than the conclusive activity (e.g. all initiated activities) are allowed to be completed even after the conclusive activity is determined. This may be beneficial, for example, if it is computationally and/or signal-wise cheaper to allow continued performance of operations than to cancel performance of operations.

In some embodiments, some initiated activities of performing the set of operations may be cancelled or paused even before the conclusive activity is determined as illustrated by optional step 140. For example, initiated activities may be cancelled or paused for which a probability of being based on the representation corresponding to the conclusive indicator of the data falls below a probability threshold value.

The probability threshold value may be equal to zero (cancelling/pausing only for representations that correspond to an indicator that cannot become the conclusive indicator), or may be larger than zero but less than one (cancelling/pausing representations that correspond to an indicator that cannot become the conclusive indicator and for representations that correspond to an indicator that is unlikely to become the conclusive indicator).

The probability of being based on a representation that corresponds to the conclusive indicator may be estimated via intermediate data consistency decisions as explained above in connection to FIG. 201.

This may have the advantage of not unnecessarily utilizing resources (processing hardware, power consumption, etc.) for performing the set of operations.

In step 170, a result of the conclusive activity is provided (or is caused to be provided) as result for performing the set of operations based on the data.

Since the conclusive activity is initiated (as one of the speculative activities of performing the set of operations) before the data consistency decision, the overall latency may be decreased compared to when the data consistency decision is taken before performing the set of operations.

Continuing the example with seven representations of which four representations have a value “a”, two of the representations have a value “b” and one of the representations has a value “c”, seven responses may be received wherein four comprise an indicator having the value “a1” (derivable from the representation having value “a”), two comprise an indicator having the value “b1” (derivable from the representation having value “b”) and one comprises an indicator having the value “c1” (derivable from the representation having value “c”). Then, the conclusive indicator has the value “a1” (corresponding to the representation having the value “a”) if a majority decision is applied. The two (speculative) activities that were initiated based on the value “b” and the (speculative) activity that was initiated based on the value “c” may be cancelled when the conclusive representation is determined, as well as three of the four (speculative) activities that were initiated based on the value “a”. The result of the non-cancelled (speculative) activity that was initiated based on the value “a” may be provided as result for performing the set of operations based on the data.

FIG. 203 illustrates method steps and signaling to exemplify some embodiments implementing the method 100 of FIG. 201.

FIG. 203 schematically shows a client node (CN) 200 comprising an application (APP) 201 and a storage client (SC) 202, which in turn comprises a storage client library (SCL) 203 and a local storage entity (SE) 204. The local storage entity may, for example, be a cache memory. FIG. 203 also schematically shows three storage nodes (SN) 291, 292, 293, wherein storage node 291 comprises a storage entity (SE) 294, storage node 292 comprises two storage entities (SE) 295, 296, and storage node 293 comprises a storage entity (SE) 297. The two storage entities 295, 296 may, for example, be a tier 0 storage entity 295 and a tier 1 storage entity 296.

The storage client and/or the storage client library may be interpreted as comprising the controller configured to perform the method 100 of FIG. 201, for management of performing a set of operations based on data. A plurality of representations of the data are kept in respective ones of the storage entities 204, 294, 295, 296, 297.

The process of FIG. 203 starts by the application 201 sending a trigger signal 280 to the storage client 202. The trigger signal may typically comprise a query and a software function identifier, for example. The trigger signal 280 is received at the storage client library 203 as illustrated by 205.

In step 210 (compare with step 110 of FIG. 201), a respective query 281*a-e* is sent to each of the storage entities. The respective queries may typically be based on the trigger signal 280. For example, a query included in the trigger signal 280 may be used as, or may translate to, the queries 281*a-e*.

In steps 220*a-e* (compare with steps 120 of FIG. 201), a response 282*a-e* is received from each of the storage entities. The response comprises the representation of the data kept in the storage entity from which the response is received. The responses are received at different points in time due to different delays, for the different storage entities, between storage entity and the storage client library.

First, in step 220*a*, a response 282*a* is received from the local storage entity 204. An activity of performing the set of operations—based on the representation of the data kept in the local storage entity 204 and comprised in the response 282*a*—is initiated responsive to the reception of the response 282*a*, as illustrated by step 230*a* (compare with steps 130 of FIG. 201) and initiation signal 283*a*. In this example, the set of operations for the local storage entity 204 are performed in the storage client as illustrated by 231*a*.

Later, in step 220*b*, a response 282*b* is received from the storage entity 294. It is checked whether the representation of the data comprised in response 282*b* differs from the representation of the data comprised in response 282*a*. If so, an activity of performing the set of operations—based on the representation of the data kept in the storage entity 294 and comprised in the response 282*b*—is initiated responsive to the reception of the response 282*b*, as illustrated by step 230*b* (compare with steps 130 of FIG. 201) and initiation signal 283*b*. In this example, the set of operations for the storage entity 294 are also performed in the storage client as illustrated by 231*b*.

Even later, in steps 220*c-e*, responses 282*c-e* are received from the storage entities 295, 296, 297. For each response, it is checked whether the representation of the data comprised in the response differs from the representation of the data comprised in any previously received response. If so, an activity of performing the set of operations—based on the representation of the data kept in the storage entity and comprised in the response—is initiated responsive to the reception of the response (compare with steps 130 of FIG. 201). If not, no new activity of performing the set of operations is initiated. The latter is the case for the example of FIG. 203 in relation to the responses 282*c-e*.

For example, the responses 282*c* and 282*e* may comprise representations of the data that coincide with the representation of the data comprised in the response 282*a*, and the response 282*d* may comprise a representation of the data that coincides with the representation of the data comprised in the response 282*b*.

In step 250 (compare with step 150 of FIG. 201), one of the initiated activities 231*a*, 231*b* of performing the set of operations is determined as being based on a conclusive representation of the data. The determination of the conclusive activity is based on the representations of the data comprised in the responses. For example, step 250 may comprise determining the conclusive representation of the data by taking a majority decision among the representations of the data comprised in the responses, and selecting the conclusive activity as an initiated activity of performing the set of operations that is based on a representation of the data that coincides with the conclusive representation of the data.

In the example of FIG. 203, the initiated activity 231*a* is determined as the conclusive activity. This may, for example be due to that it is based on a representation of the data that was comprised in a majority 282*a*, 282*c*, 282*e* of the responses 282*a-e*.

In response to determining the conclusive activity 231*a*, the initiated activity 231*b* is cancelled as illustrated by step 260 (compare with step 160 of FIG. 201) and cancellation signal 284, because it is not based on the conclusive representation.

When the conclusive activity is completed, the result 285 thereof is provided to the application 201 as result for performing the set of operations based on the data, as illustrated by step 270 (compare with step 170 of FIG. 201) and result signal 286.

FIG. 204 illustrates method steps and signaling to exemplify some embodiments implementing the method 105 of FIG. 202.

FIG. 204 schematically shows a client node (CN) 300 comprising an application (APP) 301 and a storage client (SC) 302, which in turn comprises a storage client library (SCL) 303. FIG. 204 also schematically shows three storage nodes (SN) 391, 392, 393, wherein storage node 391 comprises a storage entity (SE) 394, storage node 392 comprises two storage entities (SE) 395, 396, and storage node 393 comprises a storage entity (SE) 397. The two storage entities 395, 396 may, for example, be a tier 0 storage entity 395 and a tier 1 storage entity 396.

The storage client and/or the storage client library may be interpreted as comprising the controller configured to perform the method 105 of FIG. 202, for management of performing a set of operations based on data. A plurality of representations of the data are kept in respective ones of the storage entities 394, 395, 396, 397.

The process of FIG. 204 starts by the application 301 sending a trigger signal 380 to the storage client 302. The trigger signal may typically comprise a query and a software function identifier, for example. The trigger signal 380 is received at the storage client library 303 as illustrated by 305.

In step 310 (compare with step 110 of FIG. 202), a respective query 381*b-e* is sent to each of the storage entities. The respective queries may typically be based on the trigger signal 380. For example, a query included in the trigger signal 380 may be used as, or may translate to, the queries 381*b-e*.

The queries 381*b-e* are related to the data. For example, the queries 381*b-e* may comprise a request for a hash-function of the data. Furthermore, the queries 381*b-e* are configured to cause initiation (compare with sub-steps 135 of FIG. 202) of activities of performing the set of operations based on the representation of the data kept in the storage entities, as illustrated by 331*b-e*.

In steps 320*b-e* (compare with steps 125 of FIG. 202), a response 382*b-e* is received from each of the storage entities. The response comprises an indicator (in this example, a hash-function) of the representation of the data kept in the storage entity from which the response is received. The responses are received at different points in time due to different delays, for the different storage entities, between storage entity and the storage client library.

For example, the responses 382*b*, 382*c* and 382*e* may comprise the same indicator value (hash-value), and the response 382*d* may comprise another indicator (hash-value).

In step 350 (compare with step 150 of FIG. 202), one of the initiated activities 331*b-e* of performing the set of operations is determined as being based on representation of data corresponding to a conclusive indicator. The determination of the conclusive activity is based on the indicators comprised in the responses. For example, step 350 may comprise determining the conclusive indicator by taking a majority decision among the indicators comprised in the responses, and selecting the conclusive activity as an initiated activity of performing the set of operations that is based on a representation of the data that correspond to the conclusive indicator.

In the example of FIG. 204, the initiated activity 331*b* is determined as the conclusive activity. This may, for example be due to that it is based on a representation of the data that was comprised in a majority 382*b*, 382*c*, 382*e* of the responses 382*b-e*, and due to that it is expected to be completed before the initiated activities 331*c* and 331*e*.

In response to determining the conclusive activity 331*b*, the initiated activities 331*c-e* are cancelled as illustrated by step 360 (compare with step 160 of FIG. 202) and cancellation signals 384*c-e*, because they are either not based on a representation corresponding to the conclusive indicator, or are presumed duplicates of the conclusive activity.

When the conclusive activity is completed, the result 385 thereof is provided to the application 301 as result for performing the set of operations based on the data, as illustrated by step 370 (compare with step 170 of FIG. 202) and result signal 386.

Some examples of the triggering (compare with triggering signals 280, 380) of the above-described methods will now be given. Such triggering may, for example, be implemented in an application interface.

Typically, the application sends an instruction to the storage client for triggering speculative performance of a set of operations (e.g., speculative execution). The instruction typically includes an operation request, a software function identifier, an executable, or similar.

An executable could be represented in many different ways, e.g., by reference to a symbol or position in the executable image (of the application), by a copy of an executable blob, by interpretable code or script, by a copy of—or reference to—bytecode, etc.

The instruction may also comprise a scheduling policy for scheduling of the speculative executions. An example scheduling policy might be to schedule initiations of speculative executions on resources with successively lower processing speed (to allow the first-initiated execution(s) to finish as early as possible).

The instruction may also comprise context, e.g., data structures declared before any call to the executable, software functions or libraries declared elsewhere, etc.

The instruction may further comprise the query. The query could be formulated in many ways, e.g., as a key to value lookup, as an SQL query, as a graph query, etc.

An example of a direct application interface may be expressed in pseudo code as:

```
def myfunc(value):
  return heavyprocessing.do(value)
mykey = “something”
response = storageclientgetkey(myfunc, mykey)
```

An example of a more evolved application interface may be expressed in pseudo code as:

```
mykey = “something”
with StorageClient(key=mykey) as client:
    response = spawn heavyprocessing.do(client.value)
```

Here myfunc denotes an executable, value denotes representation of data, and mykey denotes a query. In the more evolved application interface, the executable is the expression after the spawn keyword.

FIG. 205 schematically illustrates an example apparatus 410 according to some embodiments. The apparatus may, for example, be comprised in a client node (CN) 430. The client node may further comprise an application (APP) 440 and/or a local storage entity (LS) 450.

The apparatus comprises controlling circuitry (CNTR; e.g., a controller) 400 for management of performing a set of operations based on data, wherein a plurality of representations of the data are kept in respective ones of a plurality of storage entities. The controlling circuitry may, for example, be configured to cause execution of (e.g., execute) one or more of the method steps as described above in relation to FIGS. 207, 208, 209, and 210.

The controlling circuitry is configured to cause (for each of two or more storage entities of the plurality of storage entities) sending, to the storage entity, of a respective query relating to the data (compare with 110, 210, 310).

The controlling circuitry is also configured to cause (for each of the two or more storage entities of the plurality of storage entities) reception, from the storage entity, of a response to the query (compare with 120, 125, 220*a-e*, 320*b-e*). The response may comprise the representation of the data kept in the storage entity or an indicator of the representation of the data kept in the storage entity.

To this end the controlling circuitry may be associated with (e.g., connected—or connectable—to) a communication interface (I/O) 420. The communication interface may be configured to, for storage entities other than the local storage entity, send the respective query relating to the data and receive the response to the query.

Furthermore, the controlling circuitry is configured to cause (for each of at least two of the two or more storage entities) initiation of activities of performing the set of operations based on the representation of the data (compare with 130, 135, 230a-b, 310).

To this and, the communication interface 420 may be configured to send initiation signals according to some embodiments. Alternatively, the controlling circuitry may be configured to perform the set of operations itself.

The controlling circuitry is also configured to cause determination, based on the representations of the data or the indicators comprised in the responses, of one of the initiated activities of performing the set of operations (called the conclusive activity) as being based on a conclusive representation of the data or on representation of the data corresponding to a conclusive indicator (compare with 150, 250, 350).

To this end the controlling circuitry may comprise, or be otherwise associated with (e.g., connected—or connectable—to), a determiner (DET; e.g., determination circuitry) 401. The determiner may be configured to determine the conclusive activity.

The controlling circuitry is further configured to cause provision—e.g., to the application 440—of a result of the conclusive activity as result for performing the set of operations based on the data. To this and, the communication interface 420 may be configured to provide the result of the conclusive activity as result for performing the set of operations based on the data.

Generally, when an arrangement is referred to herein, it is to be understood as a physical product; e.g., an apparatus. The physical product may comprise one or more parts, such as controlling circuitry in the form of one or more controllers, one or more processors, or the like.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a client node (e.g., server, computer, etc.).

Embodiments may appear within an electronic apparatus (such as a client node) comprising arrangements, circuitry, and/or logic according to any of the embodiments described herein. Alternatively or additionally, an electronic apparatus (such as a client node) may be configured to perform methods according to any of the embodiments described herein.

Configuration of Redundant Paths

As discussed in depth above, future mobile communication systems aim to support communications in fields such as the industrial manufacturing domain. Compared to typical use cases of mobile communication traffic, such as phone calls and internet data, industrial manufacturing applications/service require higher reliability, availability, and low and deterministic latency. Other use cases may have similar requirements, such as remote surgery, autonomous vehicles, etc.

Such communication will typically travel via paths which traverse both wireless networks (e.g., cellular networks, such as those standardized by 3GPP: LTE, NR, etc) and wired networks (e.g. Ethernet networks, etc). Various efforts have been made to achieve high reliability, availability and low and deterministic in wired and wireless communication networks.

IEEE 802.1 time-sensitive networking (TSN) is based on the IEEE 802.3 Ethernet standard, so it is a wired communications standard. TSN describes a collection of features for, e.g., time synchronization, guaranteed low latency transmissions and high reliability to make Ethernet deterministic, which was used previously mostly for best-effort communications. The features can be grouped into the following categories:

- Time Synchronization (e.g., IEEE 802.1AS)
- Bounded Low Latency (e.g., IEEE 802.1Qav, IEEE 802.1Qbu, IEEE 802.1Qbv, IEEE 802.1Qch, IEEE 802.1Qcr)
- Ultra-Reliability (e.g., IEEE 802.1CB, IEEE 802.1Qca, IEEE 802.1Qci)
- Network Configuration and Management (e.g., IEEE 802.1Qat, IEEE 802.1Qcc, IEEE 802.1Qcp, IEEE 802.1CS)

TSN uses the concept of streams (or flows) for exchange of data between one or more talkers and one or more listeners. The talkers and listeners may also be called "end devices", i.e., the source and destination devices of the TSM streams. To configure a TSN stream, the listeners and talkers provide requirements to the TSN network which are used for scheduling and configuration decisions, e.g., how bridges (also known as switches or Ethernet switches) should behave between a listener and a talker.

The IEEE 802.1Qcc standard specifies three TSN configuration models: the fully distributed model; the centralized network and distributed user model; and the fully centralized model. For the industrial manufacturing use case, the fully centralized configuration model might be the most suitable. However, embodiments of the disclosure may alternatively use the fully distributed model or the centralized network and distributed user model.

For the fully centralized configuration model, the Central User Configuration (CUC) and Central Network Configuration (CNC) are logical functions rather than actual physical nodes in the network. The CUC is the entity which is responsible for configuration of the listeners and the talkers. The CNC is the entity that configures the TSN features in the bridges in the network.

The description of wireless communication networks is in the context of 5G networks, using Long Term Evolution (LTE) and/or New Radio (NR). Embodiments of the disclosure may alternatively relate to other wireless communication networks, particularly cellular networks such as those standardized by 3GPP.

The 5G system (5GS) architecture as described in TS 23.501, v 15.3.0 specifies the support of Ethernet protocol data unit (PDU) sessions. The medium access control (MAC) address for this PDU session is not provided by the 5G system.

For Ethernet PDU session setup, the session management function (SMF) and the user plane function (UPF) act as PDU session anchors. Also, based on the configuration, the SMF may request the UPF acting as the PDU session anchor to redirect address resolution protocol (ARP) traffic from UPF to the SMF. Also, UPF is supposed to store MAC addresses received from UE, and associate those with the appropriate PDU session.

Moreover, for quality of service (QoS) provisioning, the SMF provides Ethernet Packet Filter Set and forwarding rules based on the Ethernet frame structure and user equipment MAC address.

The Application Function (AF) in 3GPP system architecture is a functional node, which interacts with the 3GPP core network to provide services as for example:

- Application influence on traffic routing (TS 23.501, v 15.3.0, clause 5.6.7).
- Accessing Network Exposure Function (TS 23.501, v 15.3.0, clause 5.20).
- Interacting with policy control framework for policy control (TS 23.501, v 15.3.0, clause 5.14).

Further, the AF can trigger particular services towards UE, for example PDU session modification. Further details on application triggering services is described in 3GPP TS 23.501, v 15.3.0, clause 4.4.5.

Currently there is no mechanism on how to configure redundant TSN streams over 5GS. The current 3GPP standards support different ways to increase reliability of transmissions, such as dual or multi connectivity (DC), carrier aggregation (CA) and packet duplication. However, there is no interfacing or communication defined between the 5GS and the TSN network about how to set up redundancy (which might use those methods of increasing transmission reliability).

As a use case example, interworking between 5GS and TSN networks is highly relevant for an industrial network deployment. Unfortunately, this type of seamless internetworking is not feasible with current networks.

Certain aspects of the present disclosure and their embodiments may provide solutions to these or other challenges.

For example, in one aspect the disclosure provides a method in a core network node for a wireless communication network. The method comprises: receiving a configuration message via an interface with a configuring node associated with a wired communication network, the configuration message comprising settings for a plurality of paths between a first node coupled to the wired communication network and a second node coupled to the wireless communication network, the plurality of paths carrying a plurality of data streams between the first and second nodes, the plurality of data streams comprising at least one redundant data stream; and configuring the plurality of paths within the wireless communication network according to the settings.

In another aspect, the disclosure provides a method in a configuring node for a wired communication network. The method comprises: transmitting a request message via an interface with a core network node for a wireless communication network, the request message comprising a request for information related to a topology of the wireless communication network; and receiving an information message via the interface with the core network node, the information message comprising information related to the topology of the wireless communication network.

Certain embodiments may provide one or more of the following technical advantage(s): End-to-end deterministic packet transport over TSN and 5GSs; TSN stream redundancy features configuration over 5GS; and seamless integration into the architecture of the 5G core network FIG. 206 shows transmission of TSN data streams using redundant paths.

In the future, it is envisioned, that 5G will support TSN features and will transport TSN streams, over 5G wireless links. This is highly relevant for industrial use cases, as TSN is expected to become a major communication technology in this sector. With the support of TSN traffic in the 5G network, wireless communication can be used, as a cable replacement, for industrial networks deployed with TSN. One of the important features of TSN is IEEE 802.1CB—Frame Replication and Elimination for Reliability, which enables redundant transmissions to increase reliability in case of failures in one of the transmitted paths appear.

This scenario is illustrated in FIG. 206. The grey arrows illustrate the duplicated frames across the network. Black arrows depict a single TSN stream. The Talker's stream is shown at the left, and the data stream that is delivered at the Listener at the right part of the figure.

According to embodiments of the disclosure, an interface is proposed in the 5GS that enables such interactions with the TSN network. This interface at the 5G side can be part of the Application Function (AF) or another network entity (such as another core network node or function). One role of this new proposed interface is to interact with one or more nodes within a TSN network, such as for example the CNC, that configures the redundant paths of frames through the network, and to convert the requirements for the TSN streams into the relevant features over the 5GS.

FIG. 207 shows an example of such integration. The 5GS, by using the AF (or an alternative core network node or function as described above), acts as one or multiple TSN switches and is seen as one or more TSN switches by the CNC and other TSN switches in the TSN network.

The configuration of two independent data paths in TSN depends on the requirements from the application software (e.g., a programmable logic controller, PLC). The relevant configuration parameter may be "NumSeamlessTrees", specified in IEEE 802.1Qcc 46.2.3.6.1. If the value of this parameter is greater than one, then CNC needs to calculate and set-up maximally disjoint trees (for a value of 2 there are two almost disjoint trees).

In one embodiment of the disclosure, a 5G core network function (interacting with AF) determines if two independent paths (seamless trees) can be set up within the 5G network. To do this, a request might be sent to RAN, e.g. to a single gNB, or multiple gNBs. The 5G network can support redundancy of the transmitted packets (e.g., to increase reliability) by using one or multiple techniques from the 5G network. Suitable examples may include dual connectivity, carrier aggregation and duplication. In order to use redundant paths or multiple paths for TSN streams in a 5GS, two or more UEs can be attached to the same Ethernet network or device and used as an alternative to or in combination with other features for redundancy. FIGS. 209 to 211 give various examples of redundant paths in a wireless network.

FIG. 211 shows an architecture where two UEs are used for redundancy reasons. FIG. 209 shows a 5GS simulating different TSN paths. FIG. 210 provides more insights on how these multiple paths can be simulated by showing some of the possible 5G permutations on enabling such increased redundancy.

For example, in the simplest case both incoming redundant streams are forwarded over the same UPF, gNB and UE. The UE might forward them to multiple redundant TSN nodes.

This scenario might be applicable if the 5GS is assumed to be reliable enough without using physical redundancy. Another option would be to use redundancy only in the radio network but using a single UPF in the core network—or a single UE but dual connectivity. Those skilled in the art will appreciate that there are multiple options.

According to some embodiments of the disclosure, how redundancy is supported in the 5GS is not exposed to the external TSN network; in such embodiments, the only thing that is communicated through the AF may be whether and to what degree redundancy is supported (e.g., how many redundant paths or what the redundant topology looks like).

As noted above, embodiments of the disclosure provide a new interface that enables the functionality to set up and enable end-to-end redundancy between a wired communication network (such as a TSN network) and a wireless communication network (such as a 5G network).

FIG. 207 shows a communication system according to embodiments of the disclosure, and particularly shows this interaction between the 5GS and TSN is depicted for the fully centralized approach to TSN networking discussed above with respect to FIG. 206.

The scenario in FIG. 207 assumes that the AF is part of the wireless network domain. An interface for communication between the wireless network and the wired network is proposed. In terms of improving clarity we provide an example between the AF and CNC although this type of interaction can also take place at other parts/entities of both networks. A device in the TSN network might be a Talker and the device connected to the 5G network might be the Listener. In other embodiments this scenario might be different, e.g., the Talker might be in the wireless network (e.g., 5GS) and the Listener in the wired network (e.g., TSN)

FIG. 208 is a signalling diagram according to embodiments of the disclosure, showing the interaction between the AF and the CNC. The sequence of the interaction to setup the TSN flow is as follows.

0. 5GS connects to a TSN network and might use link layer discovery protocol (LLDP) or another suitable management protocol (e.g, simple network management protocol, SNMP, Network Configuration Protocol, NETCONF, Representational State Transfer Configuration Protocol, RESTCONF) to discover TSN bridges in the TSN network and reply to LLDP requests by TSN bridges
1. PLC initiates the communication by providing device ID and possibly a public 3GPP identifier (e.g., mobile station international subscriber directory number, MSISDN) to CUC or other addresses, like MAC addresses. The message sent to the CUC or other addresses may include one or more of the following information content:
   i. Payload size of the data being transferred between sensors and actuators with device ID
   ii. Time interval
   iii. 3GPP UE public identifier (MSISDN) (optional)
2. CNC discovers the physical topology of the network (e.g., the network nodes and the links between them). To discover the physical links between end stations and Bridges, the CNC might use IEEE Std 802.1AB (for example LLDP) and/or any remote management protocol.

In one embodiment of the disclosure, the AF answers a topology request and advertises multiple paths across the 5GS to be able to satisfy any redundancy needs. The multiple paths may comprise two or more paths. Redundant paths in the 5GS can be advertised with different topologies internally as well, for example as a single TSN switch or as multiple TSN switches per path.

This advertisement can be made by knowing all the relevant 5G mechanisms that can support increased transmission reliability, such as PDCP duplication and/or multi UE connectivity, transport and core network and function redundancy—this may include complete physical redundancy in the 5GS end-to-end.

As a further embodiment the disclosure, the redundancy can also be simulated towards the TSN network. The 5GS can simulate multiple paths and then enable the relevant mechanisms to support the needed reliability—the AF will announce these simulated disjoint paths as legal disjoint paths toward the CNC.

If the AF has announced multiple paths to the CNC, they can be dynamically changed or modified internally but at the same time they may be static towards the CNC. For established streams these paths should not change as long a specific stream agreement is valid.
3. The CNC, based on the information retrieved from the network (including the topology information from the AF) and from the CUC, and for a specific PLC application, generates TSN configuration parameters that may include one or more of:

Traffic specification: e.g. specifying how the Talker transmits frames for the stream Stream ID User to Network Requirement: specifying one or more user requirements for the stream such as latency and redundancy The above and additional parameters are being specified in IEEE 802.1Qcc, clause 46.2.3. Such configuration information can also be collected and created within different TSN configuration models such as the centralized and the distributed user approach.
4. CUC creates Talker group and Listener group (information required) and creates a join request to CNC.
5. CNC receives the join request and performs path computation of TSN stream (including paths through the 5GS from edge bridge to end stations). The computation algorithm is not specified in the standard, and those skilled in the art will appreciate that multiple methods and algorithms for computing paths exist. The present disclosure is not limited in that respect. Such algorithms may seek to minimize or maximize one or more network performance metrics, for example, such as network throughput, overall network latency, path latency, etc.

Path computation comprises computing paths used for transmitting frames from Talker to Listener including 5G paths.

CUC also allocates for each stream a unique identifier (streamID) including destination MAC address, VLAN ID and PCP (priority code point), and communicates StreamID to CNC.
6. CNC provides output for the scheduling settings. This scheduling and path settings are returned to CUC via status group (IEEE 802.1 Qcc, 46.2.5).
7. CNC configures path setting in bridges via management protocols as for example netconf or Yet Another Next Generation (YANG) managed objects in the bridges as specified in IEEE 802.1Q These settings define how a switch forwards a packet In one embodiment the AF gets this configuration information from the CNC and knows about the paths that have been set and is aware about the redundancy—it uses this information to enable and ensure redundancy features
8. If the status group does not contain any failure code, CNC provides configuration settings to AF.
9. AF converts the TSN configuration settings for the 5GS, triggers PDU session modification and further provides SMF with relevant forwarding rules and packet filter set which are further used by SMF to configure UPF forwarding rules and packet filter set. This may include knowledge about which paths have been selected by the CNC for forwarding stream traffic in the 5GS; this knowledge might be used by the 5GS to route streams accordingly.

The description above has focused on the interactions between the CNC, the CUC and the AF (or other core network node or function). In embodiments where the TSN network does not use central coordination (i.e., no CNC and no CUC are present), the methods described in this disclosure can be applied in a similar manner, but the AF will talk to the switches (e.g., TSN switches) connected to the 5GS directly.

FIG. 209 is a schematic diagram showing redundant paths in a wireless network according to embodiments of the disclosure. It can be seen that the redundant paths may arrive at the 5GS from multiple switches in the wired network, and be directed to corresponding paths in the wireless network.

FIG. 210 is a schematic diagram showing redundant paths in a wireless network according to further embodiments of the disclosure. The redundant paths are shown in more detail, and may comprise one or more elements in common (e.g., a single element in the wireless network may be utilized in more than one path). In an extreme example of this, the paths may comprise two or more paths which are identical to each other (e.g., the same data is transmitted more than once via the same physical or virtual path). The paths may also comprise one or more elements which are distinct from each other (e.g., two or more paths may be different in one or more respects). For example, the paths may comprise one or more of: a different core network node or function (such as the user plane function illustrated in FIG. 210); a different radio access network node (such as the gNodeB shown in FIG. 210); and a different terminal device (such as the UE shown in FIG. 210). The paths may thus comprise two or more paths which are maximally disjoint, and/or entirely disjoint.

FIG. 211 is a schematic diagram showing redundant paths in a wireless network according to further embodiments of the disclosure, and includes the most detail. In this embodiment, two redundant paths are shown, which are disjoint between the Talker and the Listener (i.e., between the Ethernet hosts in the PLC and the device which it controls). Each Ethernet host comprises a frame replication and elimination for reliability (FRER) module which permits frames to be replicated (i.e. at the Talker or transmitting device) and de-duplicated or eliminated (e.g. at the Listener or receiving device).

FIG. 212 is a flow chart of a method in a core network node or function according to embodiments of the disclosure. The core network node may perform the signalling and functions of the AF described above with respect to one or more of FIGS. 213, 214 and 217, for example, and therefore may comprise or implement an application function (AF). As noted above, however, this functionality may be implemented in alternative core network nodes or functions. Further, the steps set out below and with respect to FIG. 212 may be performed in more than one core network function.

In step 700, the core network node receives request message from a configuring node associated with a wired communication network (e.g., a CNC or a TSN switch as described above). The request message may be configured according to LLDP, SNMP, NETCONF, RESTCONF or any suitable network management protocol. The request message may comprises a request for information related to a topology of the wireless communication network, e.g., identities of one or more nodes in the wireless communication network, the links between those nodes, the capabilities of those nodes to enable redundant paths, etc.

In step 702, the core network node transmits an information message to the configuring node comprising information related to the topology of the wireless communication network. For example, the information message may comprise an indication of the ability of the wireless network to provide redundant paths. The information message may comprise an indication of a number of paths which can be configured in the wireless communication network to a particular end point or device (which may have been identified in the request message). The information message may also be configured via LLDP, SNMP, NETCONF, RESTCONF or any suitable management protocol.

In step 704, the core network node receives a configuration message from the configuring node. The configuration message comprises settings for a plurality of paths between a first node coupled to the wired communication network and a second node coupled to the wireless communication network. For example, the settings may include a set of associations between an input port and an output port for each of the plurality of paths, i.e. instructions for which output port data from respective input ports is to be forwarded to. See FIGS. 215 and 216, for example. The plurality of paths carry a plurality of data streams between the first and second nodes, comprising at least one redundant data stream.

In one embodiment, the plurality of paths comprise a first path and a second path which have at least one element in common with each other in the wireless communication network. For example, in one embodiment the first path and the second path are identical in the wireless communication network.

In another embodiment, the plurality of paths comprise a third path and a fourth path (which may be in addition to or as alternatives to the first and second paths disclosed above) which have at least one element not in common with each other in the wireless communication network. For example, the third path and the fourth path may be disjoint paths in the wireless communication network, or maximally disjoint paths in the wireless communication network. The at least one element not in common between the third and fourth paths may comprise one or more of: a user equipment; a radio access network node; and a core network node or function. The third and fourth paths may utilize a dual connectivity mechanism between a user equipment and multiple radio access network nodes, and/or a carrier aggregation mechanism between a user equipment and one or more radio access network nodes.

The paths may comprise one or more physical paths and/or one or more virtual paths.

In step 706, the core network node coverts the settings in the configuration message into one or more of: a packet filter set and one or more forwarding rules. For example, the AF may perform this function or, alternatively, it may forward the settings to another core network node or function, such as the policy control function (PCF) to perform this function. The AF or PCF may be configured with information as to how redundancy is to be supported in the wireless communication network (e.g., using any of the techniques described above). The PCF or AF may request this information (i.e. how those redundant paths are actually setup in the wireless communication network—from a CNC point of view this is irrelevant. Internally some wireless network functions might only be virtually redundant, e.g. only one UPF is used).

In step 708, the core network node configures the plurality of paths within the wireless communication network according to the settings. Optionally, particularly where the settings have been converted into one or more of a packet filter set and forwarding rules in step 706, this may comprise forwarding the packet filter set and/or the forwarding rules to a second core network node (e.g., an SMF). For example, the AF (or PCF) may signal to the SMF to set up modify PDU sessions if that is required, to support the redundancy based on the AF input and the information about how redundancy is supported in the 5GS. The SMF will then modify PDU sessions in UPF(s) accordingly.

In further embodiments, the AMF is informed how redundancy has to be setup in the RAN according to the input from AF and the 5GS internal information about how redundancy is supported.

FIG. 213 is a flow chart of a method in a configuring node according to embodiments of the disclosure, the configuring node associated with a wired communication network such as an Ethernet network. The configuring node may perform the signalling and functions of the CNC and/or the CUC functions described above with respect to one or more of FIGS. 213, 214 and 217, for example, and therefore may comprise or implement a CNC and/or a CUC. In alternative embodiments, however, particularly where the wired network is not centrally configured (and thus no CNC or CUC is present), the configuring node may comprise a switch of the wired network (e.g., a TSN switch). Further, the steps set out below and with respect to FIG. 213 may be performed in more than one network node or function.

In step 800, the configuring node transmits a request message to a core network node associated with a wireless communication network (e.g., an AF as described above). The request message may be configured according to LLDP, SNMP, NETCONF, RESTCONF or any suitable network management protocol. The request message may comprise a request for information related to a topology of the wireless communication network, e.g., identities of one or more nodes in the wireless communication network, the links between those nodes, the capabilities of those nodes to enable redundant paths, etc.

In step 802, the configuring node receives an information message from the core network node comprising information related to the topology of the wireless communication network. For example, the information message may comprise an indication of the ability of the wireless network to provide redundant paths. The information message may comprise an indication of a number of paths which can be configured in the wireless communication network to a particular end point or device (which may have been identified in the request message). The information message may also be configured via LLDP, SNMP, NETCONF, RESTCONF or any suitable management protocol.

In some embodiments, the redundant paths through the wireless communication network may not themselves be made known in the information message. That is, the configuring node may be unaware of how the redundant paths are established in the wireless communication network, or of the redundancy techniques which are employed in the wireless network to achieve that redundancy and increase in reliability (e.g., dual connectivity, packet duplication, carrier aggregation, etc). However, the information message may comprise an indication of the number of redundant paths which can be supported in the wireless communication network, for example.

In step 804, the configuring node determines a plurality of paths for redundant data streams between a first node coupled to the wired communication network and a second node coupled to the wireless communication network. The plurality of paths carry a plurality of data streams between the first and second nodes, comprising at least one redundant data stream.

In one embodiment, where the configuring node is unaware of the precise paths within the wireless communication network, this step may assume that the entire wireless communication network is equivalent to one or more TSN bridges.

In step 806, the configuring node transmits a configuration message to the core network node, comprising settings for each of the plurality of paths. For example, the settings may include a set of associations between an input port and an output port for each of the plurality of paths, i.e. instructions for which output port data from respective input ports is to be forwarded to. See FIGS. 215 and 216, for example.

Handling Precise Timing Protocol Signaling from a Time Sensitive Network

Time Sensitive Networking (TSN) is based on the IEEE 802.3 Ethernet standard. TSN provides deterministic services through IEEE 802.3 networks, such as e.g. time synchronization, guaranteed low latency transmissions and high reliability to make legacy Ethernet, designed for best-effort communication, deterministic. The TSN features available today may be grouped into the following categories:

- Time Synchronization (e.g. IEEE 802.1AS)
- Bounded Low Latency (e.g. IEEE 802.1Qav, IEEE 802.1Qbu, IEEE 802.1Qbv, IEEE 802.1Qch, IEEE 802.1Qcr)
- Ultra-Reliability (e.g. IEEE 802.1CB, IEEE 802.1Qca, IEEE 802.1Qci)
- Network Configuration and Management (e.g. IEEE 802.1Qat, IEEE 802.1Qcc, IEEE 802.1Qcp, IEEE 802.1CS)

The configuration and management of the TSN network may be implemented in different manners, either in a centralized or in a distributed setup as defined in IEEE 802.1Qcc. The different configuration models are shown in FIGS. 106-108. FIG. 106 shows a distributed TSN configuration model, FIG. 107 shows a centralized TSN configuration model, and FIG. 108 shows a fully centralized TSN Configuration Model, as defined in IEEE P802.1Qcc/D2.3.

The communication endpoints inside the TSN are referred to as Talker and Listener. A TSN network consist of multiple entities and features. All the switches, which are referred to as bridges in the FIGS. 106 to 108, in between the Talker and the Listener need to support certain TSN features, like e.g. IEEE 802.1AS time synchronization. A TSN domain enables synchronized communication among nodes. The communication between Talker and Listener is performed in streams. A stream is based on certain requirements in terms of data rate and latency given by an application implemented at the Talker and/or the Listener. The TSN configuration and management features are used to setup the stream and guarantee the stream's requirements across the network. In the distributed model shown in FIG. 106, the Talker and Listener might for example use a Stream Reservation Protocol (SRP) to setup and configure a TSN stream in every switch along the path from Talker to Listener in the TSN network. Nevertheless, some TSN features require a central management entity referred to as Centralized Network Configuration (CNC) tool as shown in FIG. 107. The CNC may for example use Netconf and YANG models to configure the switches in the network for each TSN stream. This also allows the use of time-gated queueing as defined in IEEE 802.1Qbv that enables data transport in a TSN network with deterministic latency. With time-gated queueing on each switch queues are opened or closed following a precise schedule that allows high priority packets to pass through the switch with minimum latency and jitter if it arrives at ingress port within the time the gate is scheduled to be open. In the fully centralized model, as shown in FIG. 108, a Centralized User Configuration (CUC) entity is further added that is used as a point of contact for Listener and Talker. The CUC collects stream requirements and endpoint capabilities from the devices and communicates with the CNC directly. The details about TSN configuration is explained in further detail in IEEE 802.1Qcc.

FIG. 109 shows a sequence chart of the procedure of TSN stream configuration using the fully centralized configuration model as shown in FIG. 108.

The steps performed to setup an TSN stream in the TSN network in fully centralized configuration mode are the following:

1. The CUC may receive input from e.g. an industrial application/engineering tool, such as e.g. a Programmable Logic Controller (PLC), which specifies the devices which are supposed to exchange time-sensitive streams.

2. The CUC reads the capabilities of end stations and applications in the TSN network that includes information about period/interval of user traffic and payload sizes.
3. Based on this above information the CUC creates:
   A StreamID as an identifier for each TSN stream,
   A StreamRank, and
   UsertoNetwork Requirements.
4. The CNC discovers a physical network topology using for example a Link Layer Discovery Protocol (LLDP) and any network management protocol.
5. The CNC read TSN capabilities of the bridges (e.g. IEEE 802.1Q, 802.1AS, 802.1CB) in the TSN network, e.g. by means of a network management protocol.
6. The CUC initiates join requests to configure the streams in order to configure network resources at the bridges for a TSN stream from one Talker to one Listener.
7. Talker and Listener groups (a group of elements specifying a TSN stream) are created by CUC, as specified in IEEE 802.1Qcc, 46.2.2.
8. The CNC configures the TSN domain
9. The CNC checks the physical topology and checks if the time sensitive streams are supported by the bridges in the network.
10. The CNC performs scheduling and path computation of the streams.
11. The CNC configures TSN features in the bridges along the path in the TSN network.
12. The CNC returns a status (success or failure) of resulting resource assignment for streams to the CUC.
13. The CUC further configures end stations to start the user plane traffic exchange as defined initially between the Listener and the Talker.

In the TSN network, the streamID may be used to uniquely identify stream configurations. It is used to assign TSN resources to a user's stream. The streamID consists of two tuples, namely:

1. A MacAddress associated with the TSN Talker
2. A UniqueID to distinguish between multiple streams within end stations identified by MacAddress In the distributed configuration model as illustrated in FIG. 106, there is no CUC and no CNC. The Talker is therefore responsible for initiation of a TSN stream. As no CNC is present, the bridges are configuring themselves which does not allow the use of for example time-gated queuing as defined in 802.1Qbv.

In the centralized model as depicted in FIG. 107 the Talker is responsible for stream initialization but the bridges are configured by CNC.

To connect devices wirelessly to a TSN network, 5G is a promising solution. The 5G standard also addresses factory use cases through a lot of new features, especially on the RAN to make it more reliable and reduce the transmit latency compared to 4G. The 5G network comprises three main components, which are the UE, the RAN instantiated as the gNB and nodes, such as a User Plane Function (UPF) within the 5G core network (SGCN). The 5G network architecture is illustrated in FIG. 110. A control plane of the 5G network further comprises a Network Repository Function (NRF), an Access Management Function (AMF), a Session Management Function (SMF), a Network Exposure Function (NEF), a Policy Control Function (PCF) and a Unified Data Management (UDF).

An ongoing research challenge is the inter-working of 5G and TSN as illustrated in FIG. 111. Both technologies define their own methods for network management and configuration and different mechanisms to achieve communication determinism that must somehow be arranged to enable end-to-end deterministic networking for industrial networks. In the following the device connected to the 5G network is referred to as 5G endpoint. A device connected to the TSN domain is referred to as a TSN endpoint.

Despite what is shown in FIG. 111 it is also possible that the UE is not connected to a single endpoint but instead to a TSN network comprising of at least one TSN bridge and at least one endpoint. The UE is in such a situation part of a TSN-5G gateway, in which end stations communicate with UEs within the context of a local TSN network that is isolated from the primary TSN network by the 5G network.

In the following an example of how Ethernet transport in a 5G system (5GS) according to the scenario shown in FIG. 111 could work shall be described.

- This scenario assumes the cases where a single UE needs to support one or multiple endpoints, each having a distinct Ethernet MAC layer address. In other words, the UE may support multiple Ethernet ports.
- The User Plane Function (UPF) that interfaces with the TSN switch is assumed to support the reception and transmission of Ethernet PDUs.
- Upon receiving an Ethernet PDU from the TSN switch, the UPF must be able to associate the destination MAC address or addresses to, for example, a PDU session, e.g. based on the IP address of the UE associated with the destination MAC address, and then relay the Ethernet PDU to the appropriate node in the 5G network.
- The gNB sends the Ethernet PDU to the UE using a data radio bearer (DRB) with reliability and latency attributes appropriate for supporting the Ethernet PDU transmission.
- The UE recovers the Ethernet PDU, e.g. from the PDCP layer, and sends the Ethernet PDU to the endpoint associated with the destination MAC address, since the UE may support one or more Ethernet connected endpoints.
- In summary, the original Ethernet PDU received by the UPF from the TSN switch is delivered transparently through the 5G network.
- For the uplink direction the 5G network is expected to determine when a Radio Network Temporary Identifier (RNTI) is associated with the Ethernet operation, thereby allowing uplink payload, such as e.g. an Ethernet PDU, associated with the RNTI to be routed to a UPF. The UPF then simply sends the received Ethernet PDU to a TSN switch.

Many TSN features are based on precise time synchronization between all peers. Also, a lot of industrial applications rely on a precise synchronization. As introduced above this is achieved using e.g. IEEE 802.1AS or IEEE P802.1AS-rev. Within the TSN network it is therefore possible to achieve a synchronization with sub-microsecond error. In order to achieve this level of accuracy a hardware support might be required; e.g. for timestamping of packets.

In the network, a grandmaster (GM) is a node that transmits timing information to all other nodes in a master-slave architecture. The GM might be elected out of several potential nodes, by certain criteria that makes the selected grandmaster superior.

In a TSN-extension of 802.1AS (i.e. P802.1AS-rev), it has been defined that next to a main GM also a second redundant backup GM may be configured. In case the main GM fails for any reason, devices in the TSN domain may be synched to the second redundant GM. The redundant GM might work in a hot-standby configuration.

In TSN based on IEEE P802.1AS-rev, which is also referred to as generalized Precise Timing Protocol (gPTP) there can be multiple time domains and associated gPTP domains supported in a TSN network. The gPTP supports two timescales:

- Timescale PTP: The epoch is the PTP epoch (details in IEEE 802.1 AS-rev section 8.2.2) and this timescale is continuous. The unit of measure of the time is the SI second as realized on the rotating period.
- Timescale ARB (arbitrary): The epoch for this timescale is domain startup time and can be setup by administrative procedure (more details in IEEE 802.1AS-rev, section 3.2).

Devices in the TSN network may be synched to multiple time domains. A local arbitrary time domain may also be referred to as a working clock.

One of the initial steps for setting up the TSN stream, as explained above, and shown in FIG. 109, is the establishment of a TSN domain by the CNC, by grouping endpoints (talkers and listeners) that are supposed to exchange time-sensitive streams. This list is provided by the CUC to the CNC. The CNC further configures the bridges connecting these endpoints such that each TSN domain (talkers, listeners and bridges) has its own working clock. Technically this can be done according to IEEE P802.1AS-rev, by configuring external port role configuration, mechanism.

FIG. 214 shows a PTP header used for every PTP packet (note, interpretation of some fields is being revised in the new edition of the IEEE1588 and correspondingly in the IEEE P802.1ASRev). The domainNumber defines for each frame, which time domain the frame belongs to. PTP time domains allow using multiple independent PTP clocks on a single network infrastructure. These numbers need to be configured at each end-station—so that each end-station is aware about which time domain it requires.

As per IEEE P802.1AS-Rev/D7.3, it is specified that the destination address of announce and signaling messages shall be reserved a multicast address 01-80-C2-00-00-0E. Furthermore, also the destination MAC address of SYNC, Follow-Up, Pdelay_Request, Pdelay_Response and Pdelay_Response_Follow_Up which are all used for peer-to-peer synchronization shall be reserved the multicast address 01-80-C2-00-00-0E. It shall be noted that as per IEEE802.1Q, frames with this address can never be forwarded (non-forwardable address) but must be terminated by the bridge. As Source address they shall use the MAC address of any egress physical port.

As introduced above, the TSN domain works with different clocks, such as e.g. global and working clocks. Furthermore, the clocks of each TSN domain are not necessarily synchronized and a factory network might comprise of several TSN domains. Therefore, across a factory network there might be several independent TSN domains with arbitrary timescales where different maybe overlapping subsets of devices need to be synchronized. As shown in FIG. 145, each TSN domain may have its own working clock.

To satisfy time synchronization requirements for TSN in manufacturing use cases, a cellular network is required to provide a time reference to which all machines, such as e.g. sensors or actuators, can be synchronized.

Currently in 3GPP standardization release 15 for LTE radio, a mechanism has been developed that allows time synchronization between Base Stations (BSs) and UEs with a sub-microseconds accuracy.

It has been proposed in 3GPP RAN 2, to add two Information Elements (IE) into SIB 16, such as e.g. time reference with a certain granularity, e.g. 0.25 μs, and an uncertainty value, and the DL Radio Resource Control (RRC) message UETimeReference to transmit a GPS time to the UE with three IEs added in an RRC message.

The main purpose of this procedure is to transfer GPS based time reference information to UEs along with inaccuracy of that information.

LTE defines several system information blocks (SIBs), related to timing information in SIB 16, which contains information related to GPS time and coordinated universal time (UTC).

SIBs are transmitted over a Downlink Shared Channel (DL-SCH). The presence of a SIB in a subframe is indicated by the transmission of a corresponding Physical Downlink Control Channel (PDCCH) marked with a special system-information RNTI (SI-RNTI).

The Information Element (IE) SIB 16 contains information related to GPS time and UTC. The UE may use the parameter blocks to obtain the GPS and the local time.

Another way of providing time synchronization may be to use a time reference information message in RRC signaling to transmit the GPS time to the UE.

The release 16 work is ongoing and different options are discussed to address the needs for time synchronization as required by TSN and industrial applications. Especially the support of multiple time domains in 5G is an open topic.

For the purposes of this present discussion, it is assumed that 5GS internal signaling is used to transport time information. In this case the 5GS may act as a gPTP time-aware device (which is defined to be compliant with an IEEE1588 boundary clock)—it may use ingress gPTP frames to get time aware itself or may have separate gPTP instances handling the 5G system clock and external TSN clocks. An internal signaling in the RAN and Core may be used to transport the relevant gPTP information internally and when received by the UE it may then act as a gPTP master at the UE egress. The 5GS in this case must support and participate in all Best Master Clock Algorithms (BMCAs) (one gPTP instance per gPTP domain must operate in this case) or being configured to its gPTP role by an external entity. A simplified option is possible where a static BMCA is implemented. The actual operation of the BMCA is out of the scope of this disclosure, but the solutions identified herein support the transfer of the related information received via Announce messages. Generation of Announce messages may also be required at the 5GS interfaces or at the internal interfaces of the 5GS nodes, if cascaded time-aware systems are implemented.

gPTP messages are sent to synchronize slaves to a master. In gPTP, for example domain numbers are used to establish multiple time domains in parallel in a network. These numbers help a slave to synchronize its clock to a certain time domain master. Until now, there is no way a 5G system can efficiently support multiple time domains as required by industrial automation applications. This is particularly important in case a large number of domains need to be supported, such as e.g. 32 domains, and large number of UEs are connected.

Depending on how time signals are transported in the 5GS, and especially what transmission type (Broadcast, Multicast, Unicast) is chosen at the RAN, RAN knowledge about which UE needs which time domain signal may be very important. This is however not supported today.

FIG. 215 depicts an example of a communications network 100 according to a first scenario in which embodiments herein may be implemented. The communications network 100 is a wireless communication network such as e.g. an LTE, E-Utran, WCDMA, GSM network, any 3GPP cellular network, Wimax, or any cellular network or system.

The communications network 100 comprises a Radio Access Network (RAN) and a Core Network (CN). The communication network 100 may use a number of different technologies, such as Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), Wi-Fi, or Ultra Mobile Broadband (UMB), just to mention a few possible implementations. In the communication network 100, one or more UEs 120 may communicate via one or more Access Networks (AN), e.g. RAN, to one or more CNs. The UE 120 may e.g. be a wireless device (WD), a mobile station, a non-access point (non-AP) STA, a STA, and/or a wireless terminal. It should be understood by those skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a base station communicating within a cell.

The RAN comprises a set of radio network nodes, such as radio network nodes 110, 111 each providing radio coverage over one or more geographical areas, such as a cell 130, 131 of a radio access technology (RAT), such as 5 g, LTE, UMTS, Wi-Fi or similar. The radio network node 110, 111 may be a radio access network node such as radio network controller or an access point such as a wireless local area network (WLAN) access point or an Access Point Station (AP STA), an access controller, a base station, e.g. a radio base station such as a gNB, a NodeB, an evolved Node B (eNB, eNodeB), a base transceiver station, Access Point Base Station, base station router, a transmission arrangement of a radio base station, a stand-alone access point or any other network unit capable of serving a wireless device within the cell, which may also be referred to as a service area, served by the radio network node 110, 111 depending e.g. on the first radio access technology and terminology used.

The CN further comprises a core network node 140 which is configured to communicate with the radio network nodes 110, 111, via e.g. an S1 interface. The core network node may e.g. be a Mobile Switching Centre (MSC), a Mobility Management Entity (MME), an Operations & Management (O&M) node, an Operation, Administration and Maintenance (OAM) node, an Operations Support Systems (OSS) node and/or a Self-Organizing Network (SON) node. The core network node 140 may further be a distributed node comprised in a cloud 141.

The UE 120 is located in the cell 130 of the network node 110, which is referred to as the serving cell, whereas the cell 131 of the network nodes 111 are referred to as neighboring cells. Although, the network node 110 in FIG. 215 is only depicted providing a serving cell 130, the network node 110 may further provide one or more neighboring cells 131 to the serving cell 130.

Note that although terminology from 3GPP 5G has been used in this disclosure to exemplify the embodiments herein, this should not be seen as limiting the scope of the embodiments herein to only the aforementioned system. Other wireless systems, including WCDMA, WiMax, UMB, GSM network, any 3GPP cellular network or any cellular network or system, may also benefit from exploiting the ideas covered within this disclosure.

In the following, the embodiments herein will be described in further detail.

According to the embodiments herein the 5GS may receive gPTP messages from an external network in which a grandmaster is deployed. The gPTP messages from the GM may be received either on a UE or UPF side of the 5GS. As multiple time domains are used in industrial networks as introduced above, there may be multiple signals arriving at the 5GS. One example of multiple time domain support in the 5GS for a scenario in which the grandmaster is located on the UPF-side of the 5GS is illustrated in FIG. 89. In FIG. 89 gPTP messages are directly transported to a gNB, which is one possible implementation. Any gPTP message comprises a domain number which defines the time domain which the gPTP message belongs to.

This embodiments herein assume a non-transparent transport of gPTP frames in the 5GS is used, in other words the information is extracted from gPTP frames and relayed through the 5GS using 3GPP signalling. The information about the time domains and which UE belongs to which time domain is particularly important for cases where a large number of UEs are connected and a significant number of gPTP domains need to be supported, such as e.g. more than two gPTP domains.

One scenario is where the Grandmaster is on UPF side of the 5GS—downlink: Either the UPF or the gNB may receive gPTP messages and may act as a slave to an external TSN network. Hence, one specific gPTP instance, such as e.g. an instantiation of a gPTP application, implemented in either the UPF or in a gNB may handle the gPTP messages belonging to that specific gPTP domain, as indicated by the domainNumber attribute, and, as a result of for example a BMCA for the specific gPTP domain, lock to the related GM. In case the UPF provides the instantiation, the UPF will forward the time information extracted from the gPTP message to one or more gNB(s) plus the information about the time domain it belongs to. The UPF may e.g. be configured with a set of ethernet MAC multicast addresses for which it will relay corresponding time information and time domain information to one or more gNBs. Note that when the UPF acquires the timing information, such as e.g. an external TSN working clock value and a corresponding time domain, from gPTP messages it relays it to the gNB for further distribution to the UE, the actual gPTP messages are not relayed. Different options are available for transmitting timing information in RAN, in particular, not necessarily requiring involvement of the gNB. For example, in case a distributed time-aware approach is implemented, only the devices at the edges of the 5GS may need to handle and process the gPTP messages. However, the embodiments herein focus on the case where RAN is necessarily involved and uses SIB based or RRC based methods for conveying timing information to UEs.

If a radio broadcast (for example SIB messages) is used in the RAN: The UEs need to know which broadcasted signal belongs to which time domain. Each time domain may be broadcasted individually, or one broadcast signal might carry information for multiple time domains.

In one embodiment this may for example be solved by adding an additional parameter sent in the SIB signals to UEs that indicate the domainNumber, such as e.g. an integer between for example 0-127; either in each broadcasted signal or multiple in one signal.

In another embodiment, the broadcasted signal does not carry any additional parameter, but when broadcasted, it always carries a specific time domain signal such as of domain 0 or a list of domain numbers such as domain 0, 1, 2, . . . , N. Which domain number or which list of the domain numbers that is sent in the broadcast message may be preconfigured or may be sent to the UE prior to sending the broadcast message with timing information.

According to yet another embodiment, the UE may learn which time domain(s) an end station or end stations which the UE is connected to require(s). The UE may e.g. learn this by listening to the gPTP Announce messages delivered periodically by the end station(s). As a result of the BMCA, the UE will implement a PTP port operating in the master state forwarding time signals from the 5G network and will only operate in the specific PTP domain that it needs to support. This means that the UE will only select the time domains from the broadcasted time signal information that it requires.

In one way, the 5GS may obtain information from a TSN network controller about which time domain signal that needs to be directed to which UE, e.g. by means of an UE identifier, or a MAC address of an end station connected to the UE respectively. The information may for example be sent from the external TSN CNC towards an Application Function (AF) when the CNC sets up TSN domains in the TSN network. The CNC may announce which time domain signals that need to be forwarded to which port, such as e.g. to a UE or a MAC address. The AF may trigger SMF or AMF or another core network function to tell the UEs which time domain signal they should listen to. In detail:

The CUC may know exactly what clock domain an end station desires.

The CUC may then tell the CNC to configure a 5G "bridge" (i.e. the 5G system modeled as a bridge/time aware relay). The CNC may e.g. ask 5GS to setup a link between northbound of 5G bridge and southbound of the 5G bridge, so that the correct timing can be delivered to the corresponding end station.

The 5GS may receive the AF information from the CNC and may translate the CNC command to 5GS signaling. This may be referred to as an external port configuration that may be performed by a CNC to define the gPTP rapid spanning tree inside a switch, or inside the 5GS according to the embodiments herein. If the external port configuration is available as information from the CNC then the BCMA is no longer required. Ports may be configured by the CNC to take different roles, such as e.g. MasterPort, SlavePort, PassivePort, or DisabledPort, which may be interpreted into where each time domain signal needs to be routed in the 5GS according to the IEEE P802.1AS-rev standard. The 5GS internal signaling from the AF may be used e.g. to inform UEs about which time domain signal they should listen to in case a broadcast is used.

If a radio multicast or unicast (using e.g. RRC signaling) is used: The gNB or gNBs in general needs to know which UE or UEs requires which time signal from which time domain.

According to one embodiment, this may be achieved by sending a signal from the UE to the gNB about which time domain the UE is interested in, or more precisely which time domain the end station or end stations connected to the UE are interested in. This information is available in the end station the UE is connected to, since each device knows which time signal it should listen to. Methods from BCMA may be used to obtain said information. This might be a single or multiple time domains depending on how the UE is connected, such as e.g. to a single end station or a switch followed by multiple end stations, and methods like the ones described in relation to the broadcasting case are valid to learn the interests of end-stations. The gNB may query the UE information about the time domain the UE requires or the UE may send the information about which time domain it requires to the gNB after being connected to the network. This may e.g. be performed using RRC messaging between the UE and the gNB(s).

According to another embodiment, the UE may be manually configured to a specific time domain or time domains and the information about the time domain the UE requires may be available at a core network function. A UE 5G internal identifier may be used to query a database, e.g. in the 5GS, wherein it is noted in the database which time domains the UE is to be synched to. The gNB may query a core network function. The core network function may tell the gNB which UE requires which time domain signal. One solution may be that the SMF provides this information to the RAN when a PDU session is setup. As for the broadcast case this configuration or information about which time domain signal needs to be forwarded to which UE may be received from an external TSN CNC (external port configuration) during the TSN domain setup phase e.g. through the AF. This information may be internally forwarded in the 5GS to the RAN, in order to let the RAN know which UE needs which time domain signal. The UE will only receive a time signal or signals that it is required to forward to other devices since only these signals may be sent to the UE by the gNB. In order to separate different time signals that are sent to the UE, identifiers might be negotiated between the UE and the gNB or may be pre-configured to allow the UE to distinguish between different time domains and forward gPTP frames accordingly, i.e. put the right domainNumbers into the gPTP frames. The pre-configuration may be such that the domain number is not signaled in the unicast RRC message but the UE is aware of which domain number the message refers to. If there is only one time domain supported by the UE, this is straightforward. If there are multiple time domains supported by the UE, the unicast message may include a list of time information ordered in, for example, an ascending or descending order of the time domain number.

At the egress of the 5GS, i.e. when the message leaves the 5GS, the UE may act as a gPTP master to any device connected to it. This may involve a creation or re-creation of various gPTP frames, such as e.g. Sync, Follow_up, Pdelay_request, Pdelay_response, PDelay_Response_Follow_up, Announce etc., based on the timing and other information, such as e.g. domainNumbers, from a gNB. This is similar to action 1202 described with regards to the method performed by the receiving device in FIG. 217.

For all the embodiments mentioned above it is not important how the time signals are transported in the RAN (i.e. which signals are used and how these signals are designed to achieve a sufficient accuracy), besides whether it is unicasted, multicasted or broadcasted.

For all embodiments mentioned above it might further be relevant to also transmit other gPTP information to/from the UE, such as e.g. information related to the handling of BMCA and related information required to generate the outgoing PTP messages, such as e.g. a clock identifier. This may be the case in all three cases described above, i.e. broadcast, multicast, and unicast, either as dedicated RRC or SIB signaling next to the time signal transmission or as part of the time signaling in RRC or SIB messages.

Furthermore, an Internet Protocol (IP) may be used for transporting the gPTP frames. All methods in here might be applicable in a similar manner in this case where IP is used above Ethernet on Layer 3 (L3).

Another scenario is when the grandmaster on the UE side of the 5GS—Uplink: When the grandmaster is on the UE side of the 5GS, then the UE needs to forward time information to the gNB. The UE may receive gPTP messages and is therefore time aware. The 5GS needs to be informed about which time domain a transmitted signal belongs to. Only unicast, such as e.g. using RRC signaling, is possible in uplink.

In one embodiment, the 5G network may be informed about the time domain by means of a dedicated RRC signaling from the UE to the gNB that indicates the time domain number. When multiple time domains are present the dedicated RRC signaling may comprise multiple time domain numbers. The gNB may receive this information and either forward it to the UPF or may use it itself in order to forward the timing information from the UE to the correct time domain, in order to ultimately re-establish gPTP frames with the correct domainNumber. The RRC signaling may be performed as part of the time signaling or may be negotiated beforehand. If it is negotiated that the UE will signal time from multiple time domains an identifier might be used to distinguish the time domains within the time signals.

According to a further embodiment the time domains may also be pre-configured (UE #12345 may be configured to only uplink a time domain signal belonging to time domain i). If it is pre-configured that the UE will signal time from multiple time domains, an identifier might be used to distinguish them. A pre-configuration may also be performed as described in the embodiments above, based on input from an external TSN CNC e.g. through the AF as explained for the downlink embodiments.

The embodiments herein have the benefit that they allow end-to-end time synchronization with multiple time-domains. Thereby the 5GS system is now able to forward time signals from multiple time domains efficiently.

FIG. 216 illustrates the method actions performed by the transmitting device, such as e.g. the UE 120, the network node 110 and/or the UPF, in the wireless communication system (100), such as e.g. the 5G system, for handling gPTP signaling from the TSN.

Action 1101: The transmitting device may receive, from a TSN network, a gPTP message. The gPTP message comprises time information and a time domain related to the time information.

Action 1102: The transmitting device may extract the time information and the time domain from the gPTP message.

Action 1103: The transmitting device may obtain information regarding the time domain to which a receiving device is related. The information regarding the time domain to which a specific device is related may be obtained by receiving a signal from the receiving device indicating which time domain the receiving device is related to: The indication may e.g. be signaled by means of RRC signaling. In some embodiments the receiving device may be preconfigured with one or more specific time domains and the information regarding the time domain to which the receiving device is related may be obtained by the transmitting device by querying, i.e. by sending a query to, a database comprising the time domains that the specific receiving device is configured to support. The time domain comprised in the 3GPP message may be indicated using an identifier. The identifier may be used when querying the data base.

Action 1104: The transmitting device may further transmit, to the receiving device, such as e.g. the radio network node 110, the UPF and/or the UE 120, a 3GPP message comprising the time information and the time domain related to the time information. The 3GPP message may e.g. be a Session Initiation Protocol (SIP) message used for broadcasting or a Radio Resource Control (RRC) message.

Action 1104a: The transmitting device may transmit the 3GPP message comprising the time information and the time domain related to the time information to one or more receiving devices related to the time domain comprised in the 3GPP message using multicast or unicast, based on the information received in action 1103.

Action 1104b: When the transmitting device is a radio network node or a UPF, the transmitting device may transmit the 3GPP message to the receiving device using broadcasting. The transmission device may transmit an additional parameter or a dedicated signaling in the 3GPP message. The additional parameter may indicates the time domain or a time domain number which the broadcasted 3GPP message relates to.

FIG. 217 illustrates the method actions performed by the receiving device, such as e.g. the UE 120, the network node 110 and/or the UPF, in the 3GPP wireless communication system 100, such as e.g. the 5G system, for handling gPTP signaling from the TSN. The receiving device may herein also be referred to as a receiving entity.

Action 1201: The receiving device may receive, from a transmitting device, such as e.g. the radio network node 110, the UPF and/or the UE 120, a 3GPP message comprising a time information and a time domain related to the time information. The 3GPP message may be received using multicasting, unicasting or broadcasting.

Action 1202: The receiving device may create and/or re-create, based on the time information and the time domain comprised in the 3GPP message, a gPTP message comprising the time information and the time domain related to the time information.

Action 1203: When the 3GPP message is received as a broadcasted message, the receiving device may further obtain information regarding the time domain supported by the one or more end stations in the TSN network, which end stations are connected to the receiving device. The information regarding the time domain supported by the end stations in the TSN, may e.g. be obtained by receiving a gPTP message, such as e.g. a gPTP Announce message, delivered periodically by the end station. The information regarding the time domain supported by the end stations in the TSN, may in a further embodiment be obtained by receiving information from a TSN network controller, wherein the information comprises a receiving device identifier, such as e.g. a UE identifier, or a MAC address of an end station.

Action 1204: The receiving device may transmit, to one or more end stations in the TSN network, a gPTP message, wherein the gPTP message comprises the time information and the time domain related to the time information extracted from the 3GPP message.

Action 1204a: The receiving device may transmit, to the end station, the broadcasted time information relating to the time domain supported by the end station of the TSN, based on the information obtained in action 1203. Hence, any broadcasted time information not relating to the time domain supported by the end station of the TSN which is connected to the receiving device will not be transmitted to the end station by the receiving device.

Additional embodiments of techniques for handling precise timing protocol signaling from a time sensitive network are described below.

According to the embodiments herein the 5GS may receive gPTP messages from an external network in which a grandmaster (GM) is deployed. The gPTP messages from the GM may be received either on a UE or UPF side of the 5GS. As multiple time domains are used in industrial networks as introduced above, there may be multiple signals arriving at the 5GS. In the embodiments below it is assumed that the gPTP frames are transparently transported in the 5GS. In this case it is particularly important to know about which nodes require which time domain signals, (i.e. gPTP frames carrying to a certain domainNumber), for cases where a large number of UEs are connected and a significant number of gPTP domains need to be supported, such as e.g. more than two gPTP domains. Solutions for both uplink and downlink transmission of time signals are introduced. The information about the time domains and which UE belongs to which time domain is particularly important for cases where a large number of UEs are connected and a significant number of gPTP domains need to be supported, such as e.g. more than two gPTP domains.

Grandmaster on UPF side of the 5GS—Downlink: The 5GS forwards gPTP frames end-to-end (i.e. TSN source node supporting a given working clock exchanges gPTP frames with a UE or with an end station associated with that UE) which gPTP frames carry time information. Each gPTP frame may comprise the domainNumber header field which indicates the time domain the gPTP frame belongs to. The gPTP frames may need to be transported in PDU sessions to a UE or to a plurality of UEs. The details of the related solutions depend on the specific mechanism that is implemented in order to "transparently" carry the PTP time information across the 5GS, such as e.g., acting as a distributed transparent clock, or equalizing the delays on both direction so as to create a symmetric channel. In this case there is no need for the 5GS to participate in the BMCA.

If a broadcast of gPTP frames is used in the 5GS: In case a broadcast of gPTP frames is performed in the 5GS instead, e.g. by means of the gNB, then the UE or UEs need to decide whether they are listening to a certain broadcast or not. This may be performed in a similar manner as in the first embodiment above by checking whether any device connected to the UE sends Announce messages belonging to a specific PTP domain. The UE may not listen to the specific gPTP time domain broadcast any longer or not forward any gPTP frames if the connected end stations or end stations is/are not operating in this PTP domain. This is illustrated in FIG. 218 for the case where the UE forwards all broadcasted gPTP frames or FIG. 219 where the UE only forwards relevant gPTP frames to the respective end stations. The UE may also send for example gPTP frames such as e.g. Announce messages to end stations to check for replies to certain domain numbers in order to learn which endstations needs which time domain signal.

If a unicast or multicast of gPTP frames is used in the 5GS: Ingress frames to the 5GS will carry a multicast destination MAC address—the 5G network (for example the UPF) needs to decide to which UE (i.e. PDU sessions) it will forward gPTP frames to; gPTP frames might be detected by the PTP-specific Ethertype field.

In one embodiment, an end station connected to a UE will generate Announce messages carrying information on the gPTP domain (domainNumber carried in the PTP header) it is operating or a 5GS node might use for example Announce messages to detect the interests of end stations. A node in the 5GS, like for example the UPF could learn which UE, respectively end stations behind a UE are interested in which gPTP messages and establish for example rules for routing incoming gPTP frames accordingly.

Any follow up/sync messages are only transmitted to UEs interested in these gPTP packets (which are these ones that operate in that specific gPTP domain); a UE will transparently forward gPTP messages from an end station or end stations it is connected to, to for example the UPF to learn about end-stations' needs.

Example of this embodiment:

gPTP frames (for example an announce message or sync message or other) arrive at the UPF from an external TSN network; these frames carry the gPTP multicast Ethernet destination MAC address and a specific domainNumber that indicate the time domain they are referring to UPF does not know at that point which UE is interested in frames from this time domain (domainNumber) as the MAC address indicates a multicast; therefore it sends all or a subset of gPTP frames or a specific gPTP frame (like an Announce message) to all UEs or any subset of relevant UEs (Option A). In addition or as another solution (Option B), end stations send any gPTP frames to the 5GS themselves that the UE will forward to the 5G network (Option A) A UE that receives gPTP frames from the 5G network will forward them to an end station it is connected to. If the end station or any other peer connected to that end station is interested in gPTP frames from this time domain (by checking the domainNumber) it will reply to these gPTP frames in a way it is defined in the gPTP protocol (this is an approach that could be applicable in case the 5GS emulates the behavior of a PTP link, where the pdelay messages are exchanged across the 5G system). These packets are forwarded by the UE back to the 5G network which allows the 5G network to detect which UE is interested in frames from which time domain (Option B): A UE receives for example an Announce message or any other PTP message from an end station or multiple end stations; the UE forwards them to the 5G network; based on the domainNumber carried by the Announce messages the 5GS learns the correct domainNumber to be sent to the end station or stations or UE or UEs respectively According to another embodiment it may be pre-configured in the 5G network, which UEs will receive frames from a specific time domain; the frames may be forwarded in UPF to PDU sessions based on the domainNumber. The SMF may be an entity configuring filters in UPF at setup or modification of PDU sessions. In one way, the 5GS will obtain information from the TSN network about which time domain signal need to be directed to which UE i.e. UE identifier, or MAC address of an end station connected to the UE respectively. This may e.g. obtained from the external TSN CNC towards the Application Function (AF) when the CNC sets up TSN domains in the TSN network. The CNC may announce which time domain signals need to be forwarded to which port, i.e. UE or MAC address. AF might trigger any other core network function to set the right filter or rules in UPF to forward gPTP frames to the right PDU sessions using domainNumbers.

Figure 225:
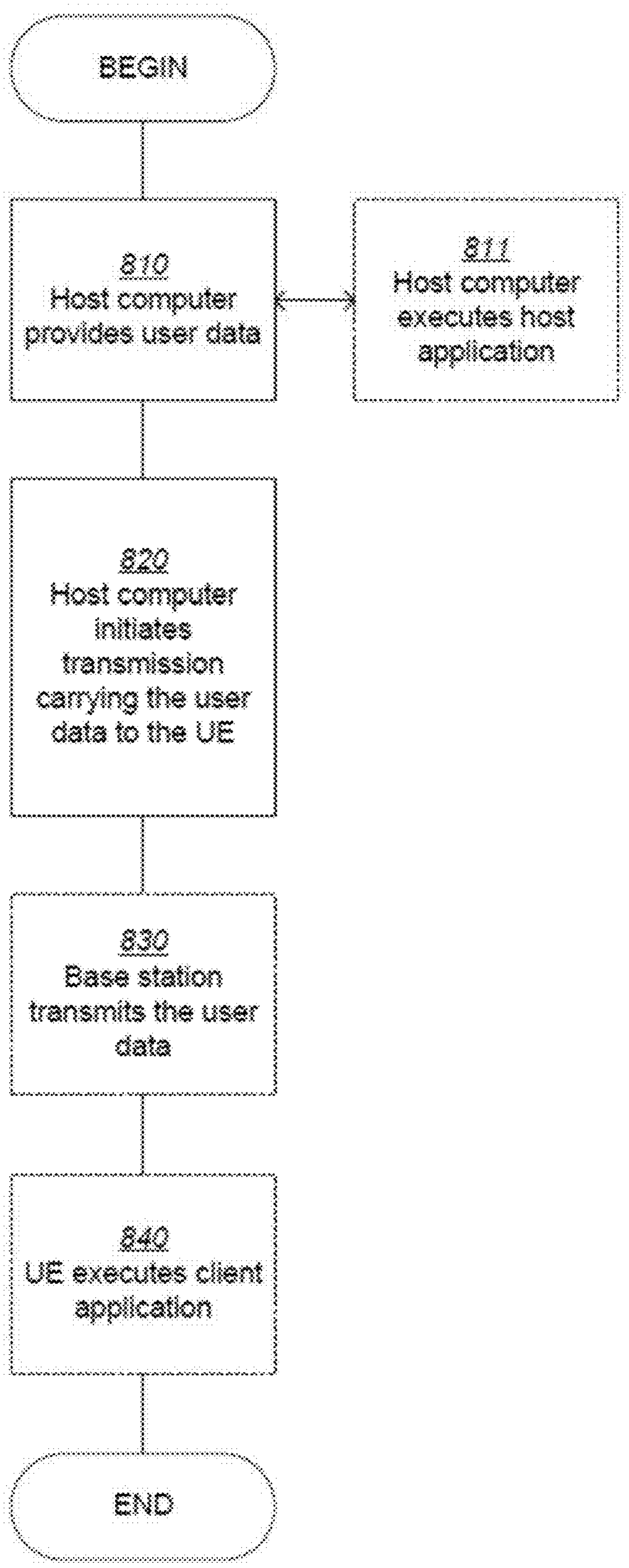
Figure 226:
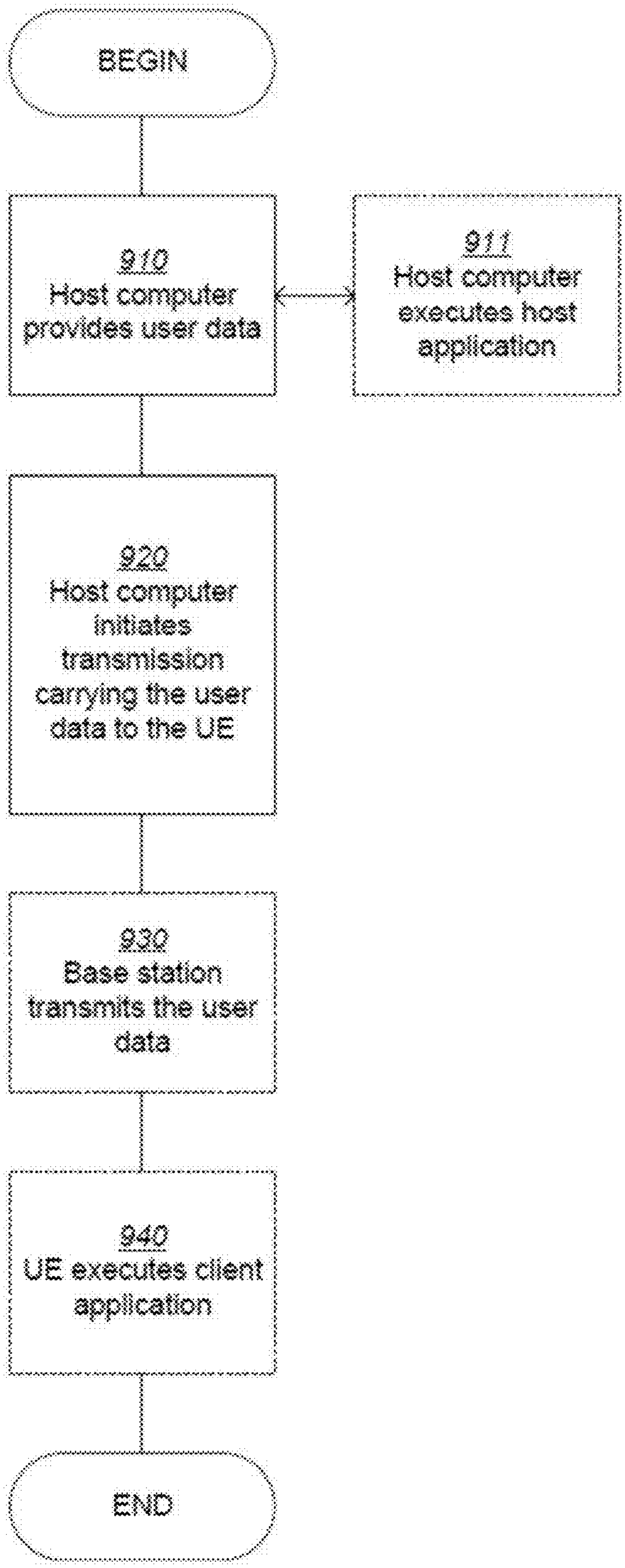

This is illustrated in FIG. 220. In detail:

1. The CUC may know exactly what clock domain an end station wants.
2. The CUC may then tell, which may also be referred to as instruct, the CNC to configure the 5G "bridge" (5G system modeled as a bridge/time aware relay). e.g. CNC asks 5GS to setup a link between northbound of 5G bridge and southbound of the 5G bridge, so that the correct timing can be delivered to the corresponding end station (e.g. from which ingress port to which egress port).
3. The 5GS may receive, on the AF which may comprise the translator function, information from the CNC and may translate the CNC command to 5GS signaling, which may also be referred to as 3GPP signaling. In the IEEE P802.1AS-rev document it is referred to as an external port configuration that may be performed by a CNC to define the gPTP rapid spanning tree inside a switch, or in our case inside the 5GS. If the external port configuration is available as information from a CNC than a BCMA is no longer required. Ports can be configured by the CNC to different roles like MasterPort, SlavePort, PassivePort, or DisabledPort which can be interpreted into where each time domain signal need to be routed in the 5GS according to the IEEE P802.1ASrev standard. The 5GS internal signaling from the AF is used to e.g. setup/update PDU sessions from the UPF to the UE, in this case only the selected/filtered clock domain will be transferred to the corresponding UE/end station For all embodiments described above (such as e.g. unicast or broadcast) it is further not relevant how the gPTP are transported in the 5GS, besides whether the gPTP frame is unicasted, multicasted or broadcasted to the UE. This may comprise time stamping of gPTP frames in the 5GS ingress and egress to calculate a correction time and compensate varying delays in the 5GS. This is shown in FIGS. 224, 225, and 226 in which the time of the 5GS is added to the message when the message enters the 5GS. It is not specified whether the 5GS may need to transmit all gPTP packets (Sync, Follow_up, Pdelay_request, Pdelay_response, PDelay_Response_Follow_up, Announce etc.) or just any subset of them over the RAN, like for example only Follow-Up messages containing the actual time stamps and then any not transmitted packet could been created, e.g. on the UE side, to ensure a valid gPTP communication handling with any connected end station. According to one embodiment, at least one gPTP frame will be transmitted periodically carrying all necessary information (domain Number, timestamp, etc.). The gPTP frames may be transmitted as data packets.

Furthermore, it is also possible that an Internet Protocol (IP) is used as for transporting the gPTP frames. All embodiments described herein may be applicable in a similar manner in the case where IP is used above Ethernet on Layer 3 (L3). The translator function as illustrated in FIGS. 225 and 226 may be an individual entity or may be part of the UPF function. The translator function may send clock/time domains to UEs via Point-to-Point PDU sessions or may send multiple flows inside the PDU session. The translator function may also be a transmitting device according to the example embodiments described herein. FIG. 220 shows an example of an embodiment in which the TSN CNC provides input to the UPF and/or the gNB on how to forward the time domain signals. In the scenario shown in FIG. 220 the gPTP frames are forwarded to the receiving device, such as e.g. the UE, by the UPF using unicast and/or multicast.

Grandmaster on the UE side of the 5GS—Uplink: If the grandmaster is located on the UE side of the 5GS, then the UE needs to forward the time information to the gNB. In this case the UE may be the transmitting device, and the gNB and/or the UPF may be the receiving device. The UE may receive gPTP messages from the TSN and will therefore be time aware. The 5GS may require information regarding the time domains in order to be aware about to which time domain the time information forwarded from the UE belongs to.

The UE always uses unicast to forward gPTP frames to the 5G network. Based on the gPTP frame headers, the network is able to determine the time domain. According to one embodiment herein it might not be necessary to transmit all gPTP frames but only a subset and filter others at the UE side. The 5G network, for example at the UPF, may recreate any not transmitted gPTP frames.

According to a special case it may be necessary to forward the time signal to another UE instead of to an external TSN network, such as a Data Network. In this case the 5GS may use one of the methods introduced above in relation to the embodiments related to Downlink, obtaining the information regarding the time domain number from the frame headers it receives.

The embodiments herein have the benefit that they allow end-to-end time synchronization with multiple time-domains. Thereby the 5GS system is now able to forward time signals from multiple time domains efficiently.

FIG. 221 illustrates the method actions performed by the transmitting device, such as e.g. the UE 120, the network node 110, the UPF and/or the translator function, in a 3GPP wireless communication system 100, such as e.g. the 5G system, for handling gPTP signaling from the TSN.

Action 1301: The transmitting device may receive, from the TSN network, a gPTP frame, such as e.g. an Announce message or a sync message. The gPTP frame may comprise time information, an indication of a time domain related to the time information and/or a MAC address of a second end station connected to a receiving device.

Action 1302: The transmitting device may determine, based on the indication of the time domain and/or the MAC address, the receiving device which the gPTP frame relates to.

Action 1302a: The transmitting device may determine the receiving device which the gPTP frame relates to by obtaining information regarding the time domain to which the receiving device and/or one or more second end stations connected to the receiving device are related. The transmitting device may obtain the information by receiving the information from the receiving device. The transmitting device may obtain the information by receiving a pre-configuration indicating which receiving devices are related to a specific time domain. The transmitting device may further obtain the information regarding the time domain supported by the one or more second end stations in the TSN, by receiving information from a TSN network controller, wherein the information comprises a receiving device identifier, such as e.g. a UE identifier, or a MAC address of the one or more second end stations.

Action 1302b: The transmitting device may further determine the receiving device which the gPTP frame relates to, by determining that the received gPTP frame relates to a receiving device when the indication of the time domain or the MAC address comprised in the gPTP frame corresponds to the obtained information regarding the time domain to which the receiving device and/or the one or more second end stations connected to the receiving device are related.

Action 1303: The transmitting device may further set a first time stamp on the gPTP frame when the gPTP frame is received and/or transmitted by the transmitting device, wherein the first time stamp may be used to calculate a correction time for compensating for varying delays in the 3GPP wireless communication system 100.

Action 1304: The transmitting device may transmit, to the determined receiving device, such as e.g. the radio network node 110 or the UPF in UL and/or the UE 120 in DL, the gPTP frame in a PDU session related to the determined receiving device. The transmitting device may be a radio network node or a UPF, and the gPTP frame may be transmitted using broadcasting. The transmitting device may further transmit the gPTP frame using multicasting or unicasting.

FIG. 222 illustrates the method actions performed by the receiving device, such as e.g. the UE 120, the radio network node 110, the UPF and/or the translator function, in the 3GPP wireless communication system 100, such as e.g. the 5G system, for handling gPTP signaling from the TSN. The receiving device may herein also be referred to as a receiving entity.

Action 1401: The receiving device may receive, from a transmitting device, such as e.g. the radio network node 110, the UPF and/or the UE 120, a PDU session comprising a gPTP frame which in turn comprises a time information an indication of a time domain related to the time information and/or a MAC address of one or more second end stations connected to the receiving device. The PDU session may be received using multicasting, unicasting or broadcasting.

Action 1402: The receiving device may determine, based on the indication of the time domain and/or the MAC address, one or more second end stations in the TSN network to transmit the received gPTP frame to.

Action 1403: When the PDU session is received as a broadcasted message, the receiving device may further obtain information regarding the time domain supported by the one or more second end stations in the TSN network, which end stations are connected to the receiving device. The information regarding the time domain supported by the end stations in the TSN, may e.g. be obtained by receiving a gPTP message, such as e.g. a gPTP Announce message, delivered periodically by the one or more second end stations. The information regarding the time domain supported by the one or more end stations in the TSN, may in a further embodiment be obtained by receiving information from a TSN network controller, wherein the information comprises a receiving device identifier, such as e.g. a UE identifier, or a MAC address of the one or more second end stations.

Action 1404: The receiving device may further set a second time stamp on the gPTP frame when the PDU session comprising the gPTP frame is received and/or the gPTP frame is transmitted by the receiving device. The second time stamp may be used in combination with the first time stamp received on the gPTP frame, to calculate a correction time for compensating for varying delays in the 3GPP wireless communication system 100.

Action 1405: The receiving device may transmit, to the one or more second end stations in the TSN network, the gPTP frame. The gPTP frame comprises the time information and the time domain related to the time information comprised in the PDU session.

Action 1405a: The receiving device may transmit, to the one or more second end stations, the broadcasted time information when the broadcasted PDU session relates to a time domain supported by the one or more second end stations of the TSN, based on the information obtained in action 1403. Hence, any broadcasted time information not relating to the time domain supported by the end station of the TSN which is connected to the receiving device will not be transmitted to the end station by the receiving device.

It will be appreciated that the methods described above may be carried out by various ones of the nodes described elsewhere in this document. Likewise, any combinations of the above, as implemented by appropriate nodes, are possible and are contemplated by the present disclosure.

Wireless Devices/UEs

Many of the techniques described above are carried out, in whole or in part, by a wireless device, or UE. As used herein, the terms "wireless device," "user equipment," and "UE" are used interchangeably, unless the context of a specific use clearly indicates otherwise, and refer to a device capable, configured, arranged and/or operable to communicate wirelessly with network equipment and/or another wireless device. In the present context, communicating wirelessly involves transmitting and/or receiving wireless signals using electromagnetic signals. In particular embodiments, wireless devices may be configured to transmit and/or receive information without direct human interaction. For instance, a wireless device may be designed to transmit information to a network on a predetermined schedule, when triggered by an internal or external event, or in response to requests from the network. Generally, a wireless device may represent any device capable of, configured for, arranged for, and/or operable for wireless communication, for example radio communication devices. Examples of wireless devices include, but are not limited to, user equipment (UE) such as smart phones. Further examples include wireless cameras, wireless-enabled tablet computers, laptop-embedded equipment (LEE), laptop-mounted equipment (LME), USB dongles, and/or wireless customer-premises equipment (CPE).

As one specific example, a wireless device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. Instead, a UE may represent a device that is intended for sale to, or operation by, a human user but that may not initially be associated with a specific human user. It should also be appreciated that in the previous detailed discussion, the term "UE" is used, for convenience, even more generally, so as to include, in the context of 5G, any type of wireless device that accesses and/or is served by the 5G network, whether or not the UE is associated with a "user" per se. Thus, the term "UE" as used in the above detailed discussion includes machine-type-communication (MTC) devices (sometimes referred to as machine-to-machine, or M2M devices), for example, as well as handsets or wireless devices that may be associated with a "user."

Some wireless devices may support device-to-device (D2D) communication, for example by implementing a 3GPP standard for sidelink communication, and may in this case be referred to as D2D communication devices.

As yet another specific example, in an Internet of Things (IOT) scenario, a wireless device may represent a machine or other device that performs monitoring and/or measurements, and transmits the results of such monitoring and/or measurements to another wireless device and/or a network equipment. A wireless device may in this case be a machine-to-machine (M2M) device, which may in a 3GPP context be referred to as a machine-type communication (MTC) device. As one particular example, a wireless device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a wireless device may represent a vehicle or other equipment that is capable of monitoring and/or reporting on its operational status or other functions associated with its operation.

A wireless device as described above may represent the endpoint of a wireless connection, in which case the device may be referred to as a wireless terminal. Furthermore, a wireless device as described above may be mobile, in which case it may also be referred to as a mobile device or a mobile terminal.

Although it will be appreciated that specific embodiments of the wireless devices discussed herein may include any of various suitable combinations of hardware and/or software, a wireless device configured to operate in the wireless communications networks described herein and/or according to the various techniques described herein may, in particular embodiments, be represented by the example wireless device 1000 shown in FIG. 166.

As shown in FIG. 166, example wireless device 1000 includes an antenna 1005, radio front-end circuitry 1010, and processing circuitry 1020, which in the illustrated example includes a computer-readable storage medium 1025, e.g., one or more memory devices. Antenna 1005 may include one or more antennas or antenna arrays, and is configured to send and/or receive wireless signals, and is connected to radio front-end circuitry 1010. In certain alternative embodiments, wireless device 1000 may not include antenna 1005, and antenna 1005 may instead be separate from wireless device 1000 and be connectable to wireless device 1000 through an interface or port.

Radio front-end circuitry 1010, which may comprise various filters and amplifiers, for example, is connected to antenna 1005 and processing circuitry 1020 and is configured to condition signals communicated between antenna 1005 and processing circuitry 1020. In certain alternative embodiments, wireless device 1000 may not include radio front-end circuitry 1010, and processing circuitry 1020 may instead be connected to antenna 1005 without radio front-end circuitry 1010. In some embodiments, radio-frequency circuitry 1010 is configured to handle signals in multiple frequency bands, in some cases simultaneously.

Processing circuitry 1020 may include one or more of radio-frequency (RF) transceiver circuitry 1021, baseband processing circuitry 1022, and application processing circuitry 1023. In some embodiments, the RF transceiver circuitry 1021, baseband processing circuitry 1022, and application processing circuitry 1023 may be on separate chipsets. In alternative embodiments, part or all of the baseband processing circuitry 1022 and application processing circuitry 1023 may be combined into one chipset, and the RF transceiver circuitry 1021 may be on a separate chipset. In still alternative embodiments, part or all of the RF transceiver circuitry 1021 and baseband processing circuitry 1022 may be on the same chipset, and the application processing circuitry 1023 may be on a separate chipset. In yet other alternative embodiments, part or all of the RF transceiver circuitry 1021, baseband processing circuitry 1022, and application processing circuitry 1023 may be combined in the same chipset. Processing circuitry 1020 may include, for example, one or more central processing units (CPUs), one or more microprocessors, one or more application specific integrated circuits (ASICs), and/or one or more field programmable gate arrays (FPGAs).

In particular embodiments, some or all of the functionality described herein as relevant to a user equipment, MTC device, or other wireless device may be embodied in a wireless device or, as an alternative, may be embodied by the processing circuitry 1020 executing instructions stored on a computer-readable storage medium 1025, as shown in FIG. 166. In alternative embodiments, some or all of the functionality may be provided by the processing circuitry 1020 without executing instructions stored on a computer-readable medium, such as in a hard-wired manner. In any of those particular embodiments, whether executing instructions stored on a computer-readable storage medium or not, the processing circuitry 1020 can be said to be configured to perform the described functionality. The benefits provided by such functionality are not limited to the processing circuitry 1020 alone or to other components of the wireless device, but are enjoyed by the wireless device as a whole, and/or by end users and the wireless network generally.

The processing circuitry 1020 may be configured to perform any determining operations described herein. Determining as performed by processing circuitry 1020 may include processing information obtained by the processing circuitry 1020 by, for example, converting the obtained information into other information, comparing the obtained information or converted information to information stored in the wireless device, and/or performing one or more operations based on the obtained information or converted information, and as a result of said processing making a determination.

Antenna 1005, radio front-end circuitry 1010, and/or processing circuitry 1020 may be configured to perform any transmitting operations described herein. Any information, data and/or signals may be transmitted to a network equipment and/or another wireless device. Likewise, antenna 1005, radio front-end circuitry 1010, and/or processing circuitry 1020 may be configured to perform any receiving operations described herein as being performed by a wireless device. Any information, data and/or signals may be received from a network equipment and/or another wireless device Computer-readable storage medium 1025 is generally operable to store instructions, such as a computer program, software, an application including one or more of logic, rules, code, tables, etc. and/or other instructions capable of being executed by a processor. Examples of computer-readable storage medium 1025 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information, data, and/or instructions that may be used by processing circuitry 1020. In some embodiments, processing circuitry 1020 and computer-readable storage medium 1025 may be considered to be integrated.

Alternative embodiments of the wireless device 1000 may include additional components beyond those shown in FIG. 166 that may be responsible for providing certain aspects of the wireless device's functionality, including any of the functionality described herein and/or any functionality necessary to support the solution described above. As just one example, wireless device 1000 may include input interfaces, devices and circuits, and output interfaces, devices and circuits. Input interfaces, devices, and circuits are configured to allow input of information into wireless device 1000 and are connected to processing circuitry 1020 to allow processing circuitry 1020 to process the input information. For example, input interfaces, devices, and circuits may include a microphone, a proximity or other sensor, keys/buttons, a touch display, one or more cameras, a USB port, or other input elements. Output interfaces, devices, and circuits are configured to allow output of information from wireless device 1000, and are connected to processing circuitry 1020 to allow processing circuitry 1020 to output information from wireless device 1000. For example, output interfaces, devices, or circuits may include a speaker, a display, vibrating circuitry, a USB port, a headphone interface, or other output elements. Using one or more input and output interfaces, devices, and circuits, wireless device 1000 may communicate with end users and/or the wireless network, and allow them to benefit from the functionality described herein.

As another example, wireless device 1000 may include power supply circuitry 1030. The power supply circuitry 1030 may comprise power management circuitry. The power supply circuitry may receive power from a power source, which may either be comprised in, or be external to, power supply circuitry 1030. For example, wireless device 1000 may comprise a power source in the form of a battery or battery pack which is connected to, or integrated in, power supply circuitry 1030. Other types of power sources, such as photovoltaic devices, may also be used. As a further example, wireless device 1000 may be connectable to an external power source (such as an electricity outlet) via an input circuitry or interface such as an electrical cable, whereby the external power source supplies power to power supply circuitry 1030.

Power supply circuitry 1030 may be connected to radio front-end circuitry 1010, processing circuitry 1020, and/or computer-readable storage medium 1025 and be configured to supply wireless device 1000, including processing circuitry 1020, with power for performing the functionality described herein.

Wireless device 1000 may also include multiple sets of processing circuitry 1020, computer-readable storage medium 1025, radio circuitry 1010, and/or antenna 1005 for different wireless technologies integrated into wireless device 1000, such as, for example, GSM, WCDMA, LTE, NR, WiFi, or Bluetooth wireless technologies. These wireless technologies may be integrated into the same or different chipsets and other components within wireless device 1000.

Wireless device 1000, in various embodiments, is adapted to carry out any of a variety of combinations of the features and techniques described herein. Several non-limiting examples are described below.

In a first example, a wireless device comprises transceiver circuitry configured to communicate with a wireless communications network and processing circuitry operatively coupled to the transceiver circuitry. The processing circuitry is configured (e.g., using program code stored in a memory) to control the transceiver circuitry and to receive system information (SI) from a radio base station (RBS) of a radio access network (RAN), the SI being indicative of support for time-sensitive networking, TSN, through the RBS, establish at least one TSN stream with the external TSN data network, through the RBS, and receive a first timing signal from the wireless communications network, via the RBS. The processing circuitry is further configured to receive a second timing signal from the external TSN data network to which the wireless device is connected, compare the first timing signal to the second timing signal to determine an offset, and transmit the offset to the wireless communications network. All of the variations described above for the methods that correspond to this wireless device embodiment may apply to this example wireless device, in various embodiments, and embodiments of this wireless device may be configured to carry out additional techniques described herein.

Another example wireless device configured for use in a wireless communications network likewise comprises transceiver circuitry configured to communicate with a wireless communications network and processing circuitry operatively coupled to the transceiver circuitry and configured to control the transceiver circuitry. The processing circuitry in this example wireless device is further configured to receive SI from an RBS of a RAN, the SI being indicative of support for TSN through the RBS, establish at least one TSN stream with the external data network, through the RBS, and obtain configuration information for the TSN stream, the configuration information indicating respective values for one or more fields within a header of data packets associated with the TSN stream which are to remain static. The processing circuitry is further configured to receive, from the RBS, a data packet associated with the TSN stream, and add the one or more fields to the data packet to generate a decompressed data packet. Again, all of the variations described above for the methods that correspond to this wireless device embodiment may apply to this example wireless device, in various embodiments, and embodiments of this wireless device may be configured to carry out additional techniques described herein.

Another example wireless device configured for communication with a RAN also comprises transceiver circuitry configured to communicate with a wireless communications network and processing circuitry operatively coupled to the transceiver circuitry and configured to control the transceiver circuitry. The processing circuitry in this example is configured to receive SI from an RBS of the RAN, the SI being indicative of support for TSN through the RBS, establish at least one TSN stream with the external data network, through the RBS, and receive, from the external network, a transmission schedule associated with the TSN stream. The wireless device is further configured to send, to a network associated with the RAN, a request to allocate radio resources for communication of the TSN stream between the wireless device and the RAN, wherein the request further comprises information related to the transmission schedule, and receive, from the network, a response indicating whether radio resources can be allocated to meet the transmission schedule associated with the TSN stream. Once more, all of the variations described above for the methods that correspond to this wireless device embodiment may apply to this example wireless device, in various embodiments, and embodiments of this wireless device may be configured to carry out additional techniques described herein.

Still another example wireless device configured for use in a wireless communications network comprises transceiver circuitry configured to communicate with a wireless communications network and processing circuitry operatively coupled to the transceiver circuitry and configured to control the transceiver circuitry. The processing circuitry is configured to receive SI from an RBS of a RAN, the SI being indicative of support for TSN through the RBS, establish at least one TSN stream with the external TSN data network, through the RBS, receive configuration information configuring periodic uplink grants indicating uplink resources to use for uplink transmissions to the wireless communications network, and receive a dynamic uplink grant for an uplink transmission to the wireless communications network. The processing circuitry is further configured to prioritize uplink transmission using the configured periodic uplink grant over uplink transmission using the dynamic uplink grant, on the condition that there is uplink data to be transmitted on the configured periodic uplink grant, according to a logical channel prioritization procedure. Again, all of the variations described above for the methods that correspond to this wireless device embodiment may apply to this example wireless device, in various embodiments, and embodiments of this wireless device may be configured to carry out additional techniques described herein.

Other examples include a first device configured to assist enrollment of a second device to an Internet of Things (IoT) environment, the first device comprising transceiver circuitry configured to communicate with the second device and processing circuitry operatively coupled to the transceiver circuitry and configured to control the transceiver circuitry. The processing circuitry is configured to obtain a representation of an enrollment function associated with the second device, where the enrollment function is associated with at least one serialized enrollment application comprising enrollment information associated with the first and second device, deserialize the enrollment application such that enrollment information associated with the first device is separated from enrollment information associated with the second device, and transmit the enrollment information associated with the second device to the second device for initiating execution by the second device of the enrollment process of the second device by configuring the second device based on the enrollment information associated with the second device. The processing circuitry is further configured to receive, from the second device, configuration information associated with the second device, use a first runtime environment executing on the first device to transfer a code module to a second runtime environment executing on the second device, wherein the code module is configured to execute within the second runtime environment and expose a function of the second device, supported by the second runtime environment, to the first device, and execute an application within the first runtime environment, the application remotely invoking the function of the second device via the transferred code module and the second runtime environment. Once more, all of the variations described above for the methods that correspond to this wireless device embodiment may apply to this example wireless device, in various embodiments, and embodiments of this wireless device may be configured to carry out additional techniques described herein Yet another example is a corresponding second device configured to execute an enrollment process to an IoT environment assisted by a first device, the second device comprising transceiver circuitry configured to communicate with the first device and processing circuitry operatively coupled to the transceiver circuitry and configured to control the transceiver circuitry. The processing circuitry in this second device is configured to receive, from the first device, enrollment information associated with the second device, execute the enrollment process by configuring the second device based on the enrollment information, and transmit configuration information associated with the second device to the first device. The processing circuitry is further configured to receive a code module from a first runtime environment executing on the first device, to a second runtime environment executing on the second device, to expose a function of the second device supported by the second runtime environment to the first device, and use the second runtime environment to control performance of the function of the second device responsive to a remote invocation of the function received via the code module from an application executing within the first runtime environment. Yet again, all of the variations described above for the methods that correspond to this wireless device embodiment may apply to this example wireless device, in various embodiments, and embodiments of this wireless device may be configured to carry out additional techniques described herein Network Equipment and Methods As used herein, the term "network equipment" or "network node" refers to equipment capable, configured, arranged and/or operable to communicate directly or indirectly with a wireless device and/or with other equipment in the wireless communication network that enable and/or provide wireless access to the wireless device. Examples of network equipment include, but are not limited to, access points (APs), in particular radio access points. Network equipment may represent base stations (BSs), such as radio base stations. Particular examples of radio base stations include Node Bs, and evolved Node Bs (eNBs). Base stations may be categorized based on the amount of coverage they provide (or, stated differently, their transmit power levels) and may then also be referred to as femto base stations, pico base stations, micro base stations, or macro base stations. "Network equipment" also includes one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base stations may also be referred to as nodes in a distributed antenna system (DAS).

As a particular non-limiting example, a base station may be a relay node or a relay donor node controlling a relay.

Yet further examples of network equipment include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, network equipment may represent any suitable device (or group of devices) capable, configured, arranged, and/or operable to enable and/or provide a wireless device access to the wireless communication network or to provide some service to a wireless device that has accessed the wireless communication network.

As used herein, the term "radio network equipment" is used to refer to network equipment that includes radio capabilities. Thus, examples of radio network equipment are the radio base stations and radio access points discussed above. It will be appreciated that some radio network equipment may comprise equipment that is distributed—such as the distributed radio base stations (with RRHs and/or RRUs) discussed above. It will be appreciated that the various references herein to eNBs, eNodeBs, Node Bs, and the like are referring to examples of radio network equipment. It should also be understood that the term "radio network equipment" as used herein may refer to a single base station or a single radio node, in some cases, or to multiple base stations or nodes, e.g., at different locations. In some cases, this document may refer to an "instance" of radio network equipment, to more clearly describe certain scenarios where multiple distinct embodiments or installations of radio equipment are involved. However, the lack of reference to an "instance" in connection with a discussion of radio network equipment should not be understood to mean that only a single instance is being referred to. A given instance of radio network equipment may alternatively be referred to as a "radio network node," where the use of the word "node" denotes that the equipment referred to operate as a logical node in a network, but does not imply that all components are necessarily co-located.

While radio network equipment may include any suitable combination of hardware and/or software, an example of an instance of radio network equipment 1100 is illustrated in greater detail by FIG. 167. As shown in FIG. 167, example radio network equipment 1100 includes an antenna 1105, radio front-end circuitry 1110, and processing circuitry 1120, which in the illustrated example includes a computer-readable storage medium 1025, e.g., one or more memory devices. Antenna 1105 may include one or more antennas or antenna arrays and is configured to send and/or receive wireless signals, and is connected to radio front-end circuitry 1110. In certain alternative embodiments, radio network equipment 1100 may not include antenna 1005, and antenna 1005 may instead be separate from radio network equipment 1100 and be connectable to radio network equipment 1100 through an interface or port. In some embodiments, all or parts of radio front-end circuitry 1110 may be located at one or several locations apart from the processing circuitry 1120, e.g., in a RRH or RRU. Likewise, portions of processing circuitry 1120 may be physically separated from one another. Radio network equipment 1100 may also include communication interface circuitry 1140 for communicating with other network nodes, e.g., with other radio network equipment and with nodes in a core network.

Radio front-end circuitry 1110, which may comprise various filters and amplifiers, for example, is connected to antenna 1105 and processing circuitry 1120 and is configured to condition signals communicated between antenna 1105 and processing circuitry 1120. In certain alternative embodiments, radio network equipment 1100 may not include radio front-end circuitry 1110, and processing circuitry 1120 may instead be connected to antenna 1105 without radio front-end circuitry 1110. In some embodiments, radio-frequency circuitry 1110 is configured to handle signals in multiple frequency bands, in some cases simultaneously.

Processing circuitry 1120 may include one or more of RF transceiver circuitry 1121, baseband processing circuitry 1122, and application processing circuitry 1123. In some embodiments, the RF transceiver circuitry 1121, baseband processing circuitry 1122, and application processing circuitry 1123 may be on separate chipsets. In alternative embodiments, part or all of the baseband processing circuitry 1122 and application processing circuitry 1123 may be combined into one chipset, and the RF transceiver circuitry 1121 may be on a separate chipset. In still alternative embodiments, part or all of the RF transceiver circuitry 1121 and baseband processing circuitry 1122 may be on the same chipset, and the application processing circuitry 1123 may be on a separate chipset. In yet other alternative embodiments, part or all of the RF transceiver circuitry 1121, baseband processing circuitry 1122, and application processing circuitry 1123 may be combined in the same chipset. Processing circuitry 1120 may include, for example, one or more central CPUs, one or more microprocessors, one or more ASICs, and/or one or more field FPGAs.

In particular embodiments, some or all of the functionality described herein as being relevant to radio network equipment, radio base stations, eNBs, gNBs, etc., may be embodied in radio network equipment or, as an alternative may be embodied by the processing circuitry 1120 executing instructions stored on a computer-readable storage medium 1125, as shown in FIG. 183. In alternative embodiments, some or all of the functionality may be provided by the processing circuitry 1120 without executing instructions stored on a computer-readable medium, such as in a hard-wired manner. In any of those particular embodiments, whether executing instructions stored on a computer-readable storage medium or not, the processing circuitry can be said to be configured to perform the described functionality. The benefits provided by such functionality are not limited to the processing circuitry 1120 alone or to other components of the radio network equipment, but are enjoyed by the radio network equipment 1100 as a whole, and/or by end users and the wireless network generally.

The processing circuitry 1120 may be configured to perform any determining operations described herein. Determining as performed by processing circuitry 1120 may include processing information obtained by the processing circuitry 1120 by, for example, converting the obtained information into other information, comparing the obtained information or converted information to information stored in the radio network equipment, and/or performing one or more operations based on the obtained information or converted information, and as a result of said processing making a determination.

Antenna 1105, radio front-end circuitry 1110, and/or processing circuitry 1120 may be configured to perform any transmitting operations described herein. Any information, data and/or signals may be transmitted to any network equipment and/or a wireless device. Likewise, antenna 1105, radio front-end circuitry 1110, and/or processing circuitry 1120 may be configured to perform any receiving operations described herein as being performed by a radio network equipment. Any information, data and/or signals may be received from any network equipment and/or a wireless device.

Computer-readable storage medium 1125 is generally operable to store instructions, such as a computer program, software, an application including one or more of logic, rules, code, tables, etc. and/or other instructions capable of being executed by a processor. Examples of computer-readable storage medium 1125 include computer memory (for example, RAM or ROM), mass storage media (for example, a hard disk), removable storage media (for example, a CD or a DVD), and/or any other volatile or non-volatile, non-transitory computer-readable and/or computer-executable memory devices that store information, data, and/or instructions that may be used by processing circuitry 1120. In some embodiments, processing circuitry 1120 and computer-readable storage medium 1125 may be considered to be integrated.

Alternative embodiments of the radio network equipment 1100 may include additional components beyond those shown in FIG. 167 that may be responsible for providing certain aspects of the radio network equipment's functionality, including any of the functionality described herein and/or any functionality necessary to support the solution described above. As just one example, radio network equipment 1100 may include input interfaces, devices and circuits, and output interfaces, devices and circuits. Input interfaces, devices, and circuits are configured to allow input of information into radio network equipment 1100, and are connected to processing circuitry 1120 to allow processing circuitry 1120 to process the input information. For example, input interfaces, devices, and circuits may include a microphone, a proximity or other sensor, keys/buttons, a touch display, one or more cameras, a USB port, or other input elements. Output interfaces, devices, and circuits are configured to allow output of information from radio network equipment 1100, and are connected to processing circuitry 1120 to allow processing circuitry 1120 to output information from radio network equipment 1100. For example, output interfaces, devices, or circuits may include a speaker, a display, a USB port, a headphone interface, or other output elements. Using one or more input and output interfaces, devices, and circuits, radio network equipment 1100 may communicate with end users and/or the wireless network, and allow them to benefit from the functionality described herein.

As another example, radio network equipment 1100 may include power supply circuitry 1130. The power supply circuitry 1130 may comprise power management circuitry. The power supply circuitry 1130 may receive power from a power source, which may either be comprised in, or be external to, power supply circuitry 1130. For example, radio network equipment 1100 may comprise a power source in the form of a battery or battery pack which is connected to, or integrated in, power supply circuitry 1130. Other types of power sources, such as photovoltaic devices, may also be used. As a further example, radio network equipment 1100 may be connectable to an external power source (such as an electricity outlet) via an input circuitry or interface such as an electrical cable, whereby the external power source supplies power to power supply circuitry 1130.

Power supply circuitry 1130 may be connected to radio front-end circuitry 1110, processing circuitry 1120, and/or computer-readable storage medium 1125 and be configured to supply radio network equipment 1100, including processing circuitry 1120, with power for performing the functionality described herein.

Radio network equipment 1100 may also include multiple sets of processing circuitry 1120, computer-readable storage medium 1125, radio circuitry 1110, antenna 1105 and/or communication interface circuitry 1140 for different wireless technologies integrated into radio network equipment 1100, such as, for example, GSM, WCDMA, LTE, NR, WiFi, or Bluetooth wireless technologies. These wireless technologies may be integrated into the same or different chipsets and other components within radio network equipment 1100.

One or more instances of the radio network equipment 1100 may be adapted to carry out some or all of the techniques described herein, in any of various combinations, including the methods and techniques described herein as carried out by a radio base station, a gNB, or the like. It will be appreciated that in a given network implementation, multiple instances of radio network equipment 1100 will be in use. In some cases, several instances of radio network equipment 1100 at a time may be communicating with or transmitting signals to a given wireless device or group of wireless devices. Thus, it should be understood that while many of the techniques described herein may be carried out by a single instance of radio network equipment 1100, these techniques may be understood as carried out by a system of one or more instances of radio network equipment 1100, in some cases in a coordinated fashion. The radio network equipment 1100 shown in FIG. 167 is thus the simplest example of this system.

Others of the network equipment or network nodes described herein are not radio network equipment, in that they lack radio transceivers for communicating with one or more wireless devices, but are instead configured to communicate with one or more other network nodes in the communication system, typically via standardized interfaces. These other network nodes may be understood as comprising many of the same features shown in the example radio network equipment 1100 illustrated in FIG. 167, but without the radio features. One or a combination of these other network nodes may be configured to carry out many of the methods and techniques described herein, e.g., with appropriate program code stored in a computer-readable medium, for execution by processing circuitry.

Network nodes like those described above may be configured to carry out one or several of the methods described herein. In one non-limiting example, a network node configured for use in a core network associated with a RAN, for handling a time-sensitive data stream associated with a user equipment UE and an external network, comprises communication interface circuitry configured to communicate with one or more other network nodes and processing circuitry operatively coupled to the communication interface circuitry. The processing circuitry is configured to receive, from the external network, a transmission schedule associated with a time-sensitive data stream, send, to the RAN, a request to allocate radio resources for communication of the data stream between the RAN and a first UE, wherein the request further comprises information related to the transmission schedule, and receive, from the RAN, a response indicating whether radio resources can be allocated to meet the transmission schedule associated with the data stream. The processing circuitry is further configured to obtain configuration information for the data stream, the configuration information indicating respective values for one or more fields within a header of data packets associated with the data stream which are to remain static, initiate transmission of the configuration information to the first UE, receive a data packet associated with the data stream from the external data network, remove the one or more fields from the data packet to generate a compressed data packet, and initiate transmission of the compressed data packet to the first UE. All of the variations described above for the methods that correspond to this network node embodiment may apply to this example network node, in various embodiments, and embodiments of this network node may be configured to carry out additional techniques described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Application of the Presently Disclosed Techniques to a Network Comprising a Host Computer In the detailed discussion and examples provided above, several techniques have been described with respect to operations carried out in a wireless device, a radio access network, or a wireless telecommunications core network node, for example. It will be appreciated, however, that these techniques may be understood as being carried out in a broader context of a communication system that encompasses, but is not limited to, these wireless network components. This communication system may thus further comprise fixed (wired) networks, application servers, server farms, user computers accessing services related to a wireless network, etc. Likewise, the techniques described herein may encompass or be utilized by services and/or applications that transcend the wireless network itself. Consequently, the advantages described herein for many of the disclosed techniques, such as improved latency, reliability, security, etc., may accrue to these services and/or applications.

FIG. 223, according to some embodiments, illustrates a communication system that includes a telecommunication network 610, such as a 3GPP-type cellular network, which comprises an access network 611, such as a radio access network, and a core network 614. The access network 611 comprises a plurality of base stations 86*a*, 612*b*, 612*c*, such as NBs, eNBs, gNBs or other types of wireless access points, each defining a corresponding coverage area 613*a*, 613*b*, 613*c*. Each base station 612*a*, 612*b*, 612*c* is connectable to the core network 614 over a wired or wireless connection 615. A first user equipment (UE) 691 located in coverage area 613*c* is configured to wirelessly connect to, or be paged by, the corresponding base station 66*c*. A second UE 692 in coverage area 613*a* is wirelessly connectable to the corresponding base station 612*a*. While a plurality of UEs 691, 692 are illustrated in this example, the disclosed embodiments are equally applicable to a situation where a sole UE is in the coverage area or where a sole UE is connecting to the corresponding base station 612.

The telecommunication network 610 is itself connected to a host computer 630, which may be embodied in the hardware and/or software of a standalone server, a cloud-implemented server, a distributed server or as processing resources in a server farm. The host computer 630 may be under the ownership or control of a service provider, or may be operated by the service provider or on behalf of the service provider. The connections 621, 622 between the telecommunication network 610 and the host computer 630 may extend directly from the core network 614 to the host computer 630 or may go via an optional intermediate network 620. The intermediate network 620 may be one of, or a combination of more than one of, a public, private or hosted network; the intermediate network 620, if any, may be a backbone network or the Internet; in particular, the intermediate network 620 may comprise two or more sub-networks (not shown).

The communication system of FIG. 223 as a whole enables connectivity between one of the connected UEs 691, 692 and the host computer 630. The connectivity may be described as an over-the-top (OTT) connection 650. The host computer 630 and the connected UEs 691, 692 are configured to communicate data and/or signaling via the OTT connection 650, using the access network 611, the core network 614, any intermediate network 620 and possible further infrastructure (not shown) as intermediaries. The OTT connection 650 may be transparent in the sense that the participating communication devices through which the OTT connection 650 passes are unaware of routing of uplink and downlink communications. For example, a base station 612 may not or need not be informed about the past routing of an incoming downlink communication with data originating from a host computer 630 to be forwarded (e.g., handed over) to a connected UE 691. Similarly, the base station 612 need not be aware of the future routing of an outgoing uplink communication originating from the UE 691 towards the host computer 630.

Example implementations, in accordance with an embodiment, of the UE, base station and host computer discussed in the preceding paragraphs will now be described with reference to FIG. 224. In a communication system 700, a host computer 710 comprises hardware 715 including a communication interface 716 configured to set up and maintain a wired or wireless connection with an interface of a different communication device of the communication system 700. The host computer 710 further comprises processing circuitry 718, which may have storage and/or processing capabilities. In particular, the processing circuitry 718 may comprise one or more programmable processors, application-specific integrated circuits, field programmable gate arrays or combinations of these (not shown) adapted to execute instructions. The host computer 710 further comprises software 711, which is stored in or accessible by the host computer 710 and executable by the processing circuitry 718. The software 711 includes a host application 712. The host application 712 may be operable to provide a service to a remote user, such as a UE 730 connecting via an OTT connection 750 terminating at the UE 730 and the host computer 710. In providing the service to the remote user, the host application 712 may provide user data which is transmitted using the OTT connection 750.

The communication system 700 further includes a base station 720 provided in a telecommunication system and comprising hardware 725 enabling it to communicate with the host computer 710 and with the UE 730. The hardware 725 may include a communication interface 726 for setting up and maintaining a wired or wireless connection with an interface of a different communication device of the communication system 700, as well as a radio interface 727 for setting up and maintaining at least a wireless connection 770 with a UE 730 located in a coverage area (not shown in FIG. 224) served by the base station 720. The communication interface 726 may be configured to facilitate a connection 760 to the host computer 710. The connection 760 may be direct or it may pass through a core network (not shown in FIG. 224) of the telecommunication system and/or through one or more intermediate networks outside the telecommunication system. In the embodiment shown, the hardware 725 of the base station 720 further includes processing circuitry 728, which may comprise one or more programmable processors, application-specific integrated circuits, field programmable gate arrays or combinations of these (not shown) adapted to execute instructions. The base station 720 further has software 721 stored internally or accessible via an external connection.

The communication system 700 further includes the UE 730 already referred to. Its hardware 735 may include a radio interface 737 configured to set up and maintain a wireless connection 770 with a base station serving a coverage area in which the UE 730 is currently located. The hardware 735 of the UE 730 further includes processing circuitry 738, which may comprise one or more programmable processors, application-specific integrated circuits, field programmable gate arrays or combinations of these (not shown) adapted to execute instructions. The UE 730 further comprises software 731, which is stored in or accessible by the UE 730 and executable by the processing circuitry 738. The software 731 includes a client application 732. The client application 732 may be operable to provide a service to a human or non-human user via the UE 730, with the support of the host computer 710. In the host computer 710, an executing host application 712 may communicate with the executing client application 732 via the OTT connection 750 terminating at the UE 730 and the host computer 710. In providing the service to the user, the client application 732 may receive request data from the host application 712 and provide user data in response to the request data. The OTT connection 750 may transfer both the request data and the user data. The client application 732 may interact with the user to generate the user data that it provides.

It is noted that the host computer 710, base station 720 and UE 730 illustrated in FIG. 224 may be identical to the host computer 630, one of the base stations 612*a*, 612*b*, 612*c* and one of the UEs 691, 692 of FIG. 223, respectively. This is to say, the inner workings of these entities may be as shown in FIG. 224 and independently, the surrounding network topology may be that of FIG. 223.

In FIG. 224, the OTT connection 750 has been drawn abstractly to illustrate the communication between the host computer 710 and the use equipment 730 via the base station 720, without explicit reference to any intermediary devices and the precise routing of messages via these devices. Network infrastructure may determine the routing, which it may be configured to hide from the UE 730 or from the service provider operating the host computer 710, or both. While the OTT connection 750 is active, the network infrastructure may further take decisions by which it dynamically changes the routing (e.g., on the basis of load balancing consideration or reconfiguration of the network).

The wireless connection 770 between the UE 730 and the base station 720 is in accordance with the teachings of the embodiments described throughout this disclosure. The various techniques have the potential to improve data rate, capacity, latency, reliability, security, and/or power consumption for the network and UE 730 using the OTT connection 750, as described above in connection with each of the described techniques, and thereby provide benefits such as reduced user waiting time, more capacity, better responsiveness, and better device battery time.

A measurement procedure may be provided for the purpose of monitoring data rate, latency and other factors which the one or more embodiments improve. There may further be an optional network functionality for reconfiguring the OTT connection 750 between the host computer 710 and UE 730, in response to variations in the measurement results. The measurement procedure and/or the network functionality for reconfiguring the OTT connection 750 may be implemented in the software 711 of the host computer 710 or in the software 731 of the UE 730, or both. In embodiments, sensors (not shown) may be deployed in or in association with communication devices through which the OTT connection 750 passes; the sensors may participate in the measurement procedure by supplying values of the monitored quantities exemplified above, or supplying values of other physical quantities from which software 711, 731 may compute or estimate the monitored quantities. The reconfiguring of the OTT connection 750 may include message format, retransmission settings, preferred routing etc.; the reconfiguring need not affect the base station 720, and it may be unknown or imperceptible to the base station 720. Such procedures and functionalities may be known and practiced in the art. In certain embodiments, measurements may involve proprietary UE signaling facilitating the host computer's 710 measurements of throughput, propagation times, latency and the like. The measurements may be implemented in that the software 711, 731 causes messages to be transmitted, in particular empty or 'dummy' messages, using the OTT connection 750 while it monitors propagation times, errors etc.

FIG. 226 is a flowchart illustrating a method implemented in a communication system, in accordance with one embodiment. The communication system includes a host computer, a base station and a UE which may be those described with reference to FIGS. 229 and 230. For simplicity of the present disclosure, only drawing references to FIG. 226 will be included in this section. In a first step 810 of the method, the host computer provides user data. In an optional substep 811 of the first step 810, the host computer provides the user data by executing a host application. In a second step 820, the host computer initiates a transmission carrying the user data to the UE. In an optional third step 830, the base station transmits to the UE the user data which was carried in the transmission that the host computer initiated, in accordance with the teachings of the embodiments described throughout this disclosure. In an optional fourth step 840, the UE executes a client application associated with the host application executed by the host computer.

FIG. 226 is a flowchart illustrating a method implemented in a communication system, in accordance with one embodiment. The communication system includes a host computer, a base station and a UE which may be those described with reference to FIGS. 223 and 224. For simplicity of the present disclosure, only drawing references to FIG. 226 will be included in this section. In a first step 910 of the method, the host computer provides user data. In an optional substep (not shown) the host computer provides the user data by executing a host application. In a second step 920, the host computer initiates a transmission carrying the user data to the UE. The transmission may pass via the base station, in accordance with the teachings of the embodiments described throughout this disclosure. In an optional third step 830, the UE receives the user data carried in the transmission.

Figure 227:
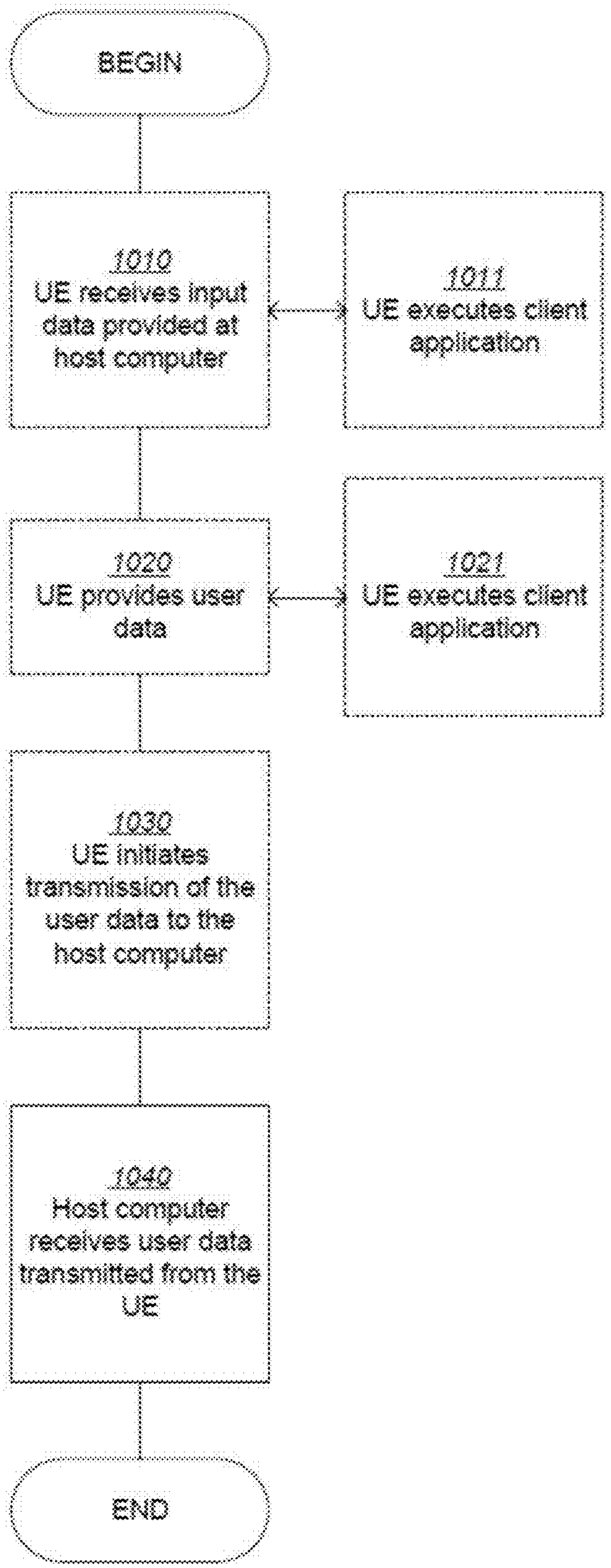

FIG. 227 is a flowchart illustrating a method implemented in a communication system, in accordance with one embodiment. The communication system includes a host computer, a base station and a UE which may be those described with reference to FIGS. 223 and 224. For simplicity of the present disclosure, only drawing references to FIG. 227 will be included in this section. In an optional first step 1010 of the method, the UE receives input data provided by the host computer. Additionally, or alternatively, in an optional second step 1020, the UE provides user data. In an optional substep 1021 of the second step 1020, the UE provides the user data by executing a client application. In a further optional substep 1011 of the first step 1010, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1030, transmission of the user data to the host computer. In a fourth step 1040 of the method, the host computer receives the user data transmitted from the UE, in accordance with the teachings of the embodiments described throughout this disclosure.

Figure 228:
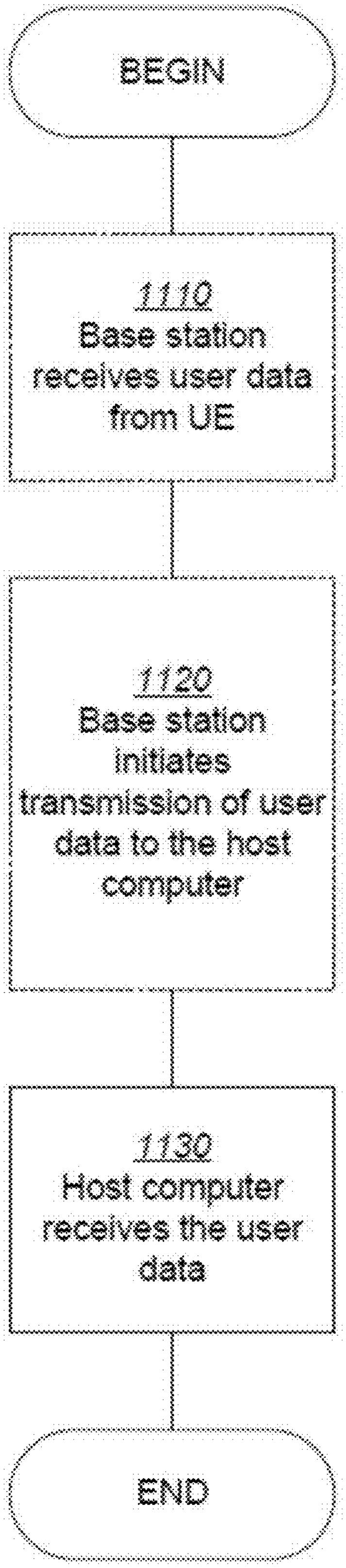

FIG. 228 is a flowchart illustrating a method implemented in a communication system, in accordance with one embodiment. The communication system includes a host computer, a base station and a UE which may be those described with reference to FIGS. 223 and 224. For simplicity of the present disclosure, only drawing references to FIG. 228 will be included in this section. In an optional first step 1110 of the method, in accordance with the teachings of the embodiments described throughout this disclosure, the base station receives user data from the UE. In an optional second step 1120, the base station initiates transmission of the received user data to the host computer. In a third step 1130, the host computer receives the user data carried in the transmission initiated by the base station.

It will be appreciated that the methods illustrated in FIGS. 231 and 234 can be combined with any of the various other methods described herein and involving the same or overlapping devices or nodes.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the examples of embodiments and their equivalents, and shall not be restricted or limited by the foregoing detailed description.

What is claimed is:

1. A method performed by a wireless device associated with a wireless communications network, the method comprising:

receiving a first timing signal originating within the wireless communications network;

receiving a second timing signal from a time-sensitive networking (TSN) data network to which the wireless device is connected, wherein the TSN data network is external to the wireless communication network; and establishing at least one TSN stream with the external TSN data network, through a radio base station (RBS) in the wireless communications network.

2. The method of claim 1, wherein the first timing signal comprises a cellular time reference and the second timing signal comprises a working clock time reference.

3. The method of claim 1, further comprising transmitting at least one of an epoch, a TSN domain number, and a time domain identifier to at least one of the RBS and the external TSN data network.

4. The method of claim 1, wherein the external TSN data network is an Ethernet network.

5. The method of claim 1, wherein the wireless communications network is a cellular communications network.

6. The method of claim 1, wherein the first timing signal is received in system information (SI) received from the RBS, the SI being indicative of support for TSN through the RBS.

7. The method of claim 6, wherein the SI is comprised in one or more system information blocks (SIBs).

8. The method of claim 1, wherein the first timing signal is received in a Radio Resource Control (RRC) message).

9. The method of claim 1, further comprising:

receiving, from the external TSN data network and via the RBS in the wireless communication network, a transmission schedule associated with the TSN data stream.

10. The method of claim 9, wherein the first timing signal is received in system information (SI) received from the RBS, the SI being indicative of support for TSN through the RBS.

11. The method of claim 10, wherein the SI is comprised in one or more system information blocks (SIBs).

12. The method of claim 10, wherein the first timing signal is received in a Radio Resource Control (RRC) message.

13. The method of claim 10, wherein the first timing signal comprises a cellular time reference and the second timing signal comprises a working clock time reference.

14. The method of claim 10, wherein the transmission schedule comprises cycle times and gate control lists for one or more traffic classes comprising the TSN data stream.

15. The method of claim 10, wherein the method further comprises:

sending, to a network associated with the RBS, a request to allocate radio resources for communication of the TSN data stream between the wireless device and the RBS, wherein the request further comprises information related to the transmission schedule; and receiving, from the network, a response indicating whether radio resources can be allocated to meet the transmission schedule associated with the TSN data stream.

16. The method of claim 15, wherein if the response from the network indicates that radio resources cannot be allocated to meet the transmission schedule of the TSN data stream, the response further comprises an indication of one or more further time windows during which radio resources can be allocated.

17. The method of claim 15, further comprising, based on the response from the network, sending, to the external TSN data network, an indication of whether the transmission schedule can be met.

18. The method of claim 17, wherein the response from the network comprises an indication of one or more further time windows during which radio resources can be allocated, and wherein the indication sent to the external network further includes information related to the one or more further time windows.

19. The method of claim 15, wherein:

the network comprises a 5G core network (5GC); and the request is sent to and the response is received from an access management function (AMF) of the 5GC.

20. The method of claim 15, wherein the external TSN data network is an Ethernet network.

21. The method of claim 15, wherein the wireless communications network is a cellular communications network.

22. The method of claim 1, wherein the method further comprises receiving, from a radio base station (RBS) of the wireless communications network, system information (SI) or a Radio Resource Control (RRC) message, wherein the SI or RRC message is indicative of support of at least one time-sensitive networking (TSN) feature through the RBS, and wherein said establishing depends on the received SI or RRC message.

23. A wireless device comprising:

transceiver circuitry configured to communicate with a wireless communications network; and processing circuitry operatively coupled to the transceiver circuitry and configured to control the transceiver circuitry and to:

receive a first timing signal originating within the wireless communications network;

receive a second timing signal from a time-sensitive network (TSN) data network to which the wireless device is connected, wherein the TSN data network is external to the wireless communications network; and establish at least one TSN stream with the external TSN data network, through a radio base station (RBS) in the wireless communications network.

24. The wireless device of claim 23, wherein the first timing signal comprises a cellular time reference and the second timing signal comprises a working clock time reference.

25. The wireless device of claim 23, wherein the processing circuitry is further configured to transmit at least one of an epoch, a TSN domain number, and a time domain identifier to at least one of the RBS and the external TSN data network.

26. The wireless device of claim 23, wherein the external TSN data network is an Ethernet network.

27. The wireless device of claim 23, wherein the wireless communications network is a cellular communications network.

28. The wireless device of claim 23, wherein the processing circuitry is configured to receive the first timing signal in system information (SI) received from the RBS, the SI being indicative of support for TSN through the RBS.

29. The wireless device of claim 28, wherein the SI is comprised in one or more system information blocks (SIBs).

30. The wireless device of claim 28, wherein the processing circuitry is configured to receive the first timing signal in a Radio Resource Control (RRC) message).

31. The wireless device of claim 28, wherein the processing circuitry is configured to receive, from the external TSN data network, a transmission schedule associated with the TSN data stream.

32. The wireless device of claim 31, wherein the wireless device is adapted to receive the first timing signal in system information, SI, received from the RBS, the SI being indicative of support for TSN through the RBS.

33. The wireless device of claim 31, wherein the wireless device is adapted to receive the first timing signal in a Radio Resource Control, RRC, message.

34. The wireless device of claim 31, wherein the first timing signal comprises a cellular time reference and the second timing signal comprises a working clock time reference.

35. The wireless device of claim 23, wherein the processing circuitry is further configured to receive, from a radio base station (RBS) of the wireless communications network, system information (SI) or a Radio Resource Control (RRC) message, wherein the SI or RRC message is indicative of support of at least one time-sensitive networking (TSN) feature through the RBS, and wherein the processing circuitry is configured to perform said establishing depending on the received SI or RRC message.

36. A method performed by a wireless device associated with a wireless communications network, the method comprising:

establishing at least one time-sensitive networking (TSN) data stream with an external TSN data network, through a radio base station (RBS) in the wireless communications network;

obtaining configuration information for the TSN data stream, the configuration information indicating respective values for one or more fields within a header of data packets associated with the TSN data stream which are to remain static;

receiving, from the RBS, a data packet associated with the TSN data stream; and adding the one or more fields to the data packet to generate a decompressed data packet.

37. The method of claim 36, further comprising:

receiving system information (SI) from the RBS, the SI being indicative of support for TSN through the RBS.

38. The method of claim 36, further comprising:

receiving a Radio Resource Control, RRC, message being indicative of support for TSN through the RBS.

39. The method of claim 36, wherein the data packet comprises an identifier for the TSN data stream.

40. The method of claim 36, further comprising:

obtaining updated configuration information for the TSN data stream, the updated configuration information comprising an indication of respective updated values for one or more fields within the header of data packets associated with the TSN data stream which are to remain static; and utilizing the updated configuration information to add the respective updated values for one or more fields to data packets received from the RBS.

41. The method of claim 40, wherein the updated configuration information further comprises an indication of a sequence number identifying a beginning data packet associated with the TSN data stream from which the respective updated values apply.

42. The method of claim 36, further comprising:

obtaining a second data packet, the second data packet being associated with the TSN data stream;

removing the one or more fields from the second data packet to generate a compressed data packet; and initiating transmission of the compressed data packet over the external data network via a transmission to the RBS.

43. The method of claim 42, further comprising initiating transmission, to a core network node of the wireless communications network, of an indication of the respective values for one or more fields within the header of data packets associated with the TSN data stream which are to remain static, to enable the core network node to decompress the compressed data packet prior to its transmission over the external data network.

44. The method of claim 42, wherein the second data packet comprises user data, and wherein the step of initiating transmission of the compressed data packet over the external data network comprises forwarding the user data to a host computer over the external data network.

45. A method performed by a wireless device associated with a wireless communications network, the method comprising:

establishing at least one time-sensitive networking (TSN) data stream with a TSN data network external to the wireless communications network, through a radio base station (RBS) in the wireless communications network; and receiving, from the external TSN data network, a transmission schedule associated with the TSN data stream.

46. The method of claim 45, further comprising:

receiving system information (SI) from the RBS, the SI being indicative of support for TSN through the RBS.

47. The method of claim 45, further comprising:

receiving a Radio Resource Control (RRC) message being indicative of support for TSN through the RBS.

48. The method of claim 45, wherein the transmission schedule comprises cycle times and gate control lists for one or more traffic classes comprising the TSN data stream.

49. The method of claim 45, wherein the method further comprises:

sending, to a network associated with the RBS, a request to allocate radio resources for communication of the TSN data stream between the wireless device and the RBS, wherein the request further comprises information related to the transmission schedule; and receiving, from the network, a response indicating whether radio resources can be allocated to meet the transmission schedule associated with the TSN data stream.

50. The method of claim 49, wherein if the response from the network indicates that radio resources cannot be allocated to meet the transmission schedule of the TSN data stream, the response further comprises an indication of one or more further time windows during which radio resources can be allocated.

51. The method of claim 49, further comprising, based on the response from the network, sending, to the external network, an indication of whether the transmission schedule can be met.

52. The method of claim 51, wherein the response from the network comprises an indication of one or more further time windows during which radio resources can be allocated, and wherein the indication sent to the external network further includes information related to the one or more further time windows.

53. The method of claim 49, wherein:

the network comprises a 5G core network (5GC); and the request is sent to and the response is received from an access management function (AMF) of the 5GC.

54. The method of claim 45, wherein the method further comprises receiving, from a radio base station (RBS) of the wireless communications network, system information (SI) or a Radio Resource Control (RRC) message, wherein the SI or RRC message is indicative of support of at least one time-sensitive networking (TSN) feature through the RBS, and wherein said establishing depends on the received SI or RRC message.

55. A wireless device comprising:

transceiver circuitry configured to communicate with a wireless communications network; and processing circuitry operatively coupled to the transceiver circuitry and configured to control the transceiver circuitry and to:

establish at least one time-sensitive networking (TSN) data stream with the external TSN data network, through a radio base station (RBS) in the wireless communications network;

obtain configuration information for the TSN data stream, the configuration information indicating respective values for one or more fields within a header of data packets associated with the TSN data stream which are to remain static;

receive, from the RBS, a data packet associated with the TSN data stream; and add the one or more fields to the data packet to generate a decompressed data packet.

56. The wireless device of claim 55, wherein the processing circuitry is further configured to:

receive system information (SI) from the RBS, the SI being indicative of support for TSN through the RBS.

57. The wireless device of claim 55, wherein the processing circuitry is further configured to:

receive a Radio Resource Control (RRC) message being indicative of support for TSN through the RBS.

58. A wireless device comprising:

transceiver circuitry configured to communicate with a wireless communications network; and processing circuitry operatively coupled to the transceiver circuitry and configured to control the transceiver circuitry and to:

establish at least one time-sensitive networking (TSN) data stream with a TSN data network, through a radio base station (RBS) in the wireless communications network, wherein the TSN data network is external to the wireless communication network;

receive, from the external TSN data network, a transmission schedule associated with the TSN data stream.

59. The wireless device of claim 58, wherein the processing circuitry is further configured to:

receive system information (SI) from the RBS, the SI being indicative of support for TSN through the RBS.

60. The wireless device of claim 58, wherein the processing circuitry is further configured to:

receive a Radio Resource Control (RRC) message being indicative of support for TSN through the RBS.

61. The wireless device of claim 58, wherein the processing circuitry is further configured to receive, from a radio base station (RBS) of the wireless communications network, system information (SI) or a Radio Resource Control (RRC) message, wherein the SI or RRC message is indicative of support of at least one time-sensitive networking (TSN) feature through the RBS, and wherein the processing circuitry is configured to perform said establishing depending on the received SI or RRC message.

* * * * *